US008671064B2

(12) United States Patent
Schmitt et al.

(10) Patent No.: US 8,671,064 B2
(45) Date of Patent: *Mar. 11, 2014

(54) MANAGING CONSISTENT INTERFACES FOR SUPPLY CHAIN MANAGEMENT BUSINESS OBJECTS ACROSS HETEROGENEOUS SYSTEMS

(75) Inventors: Torsten Schmitt, Munich (DE); Ahmed Daddi Moussa, Edingen-Neckarhausen (DE); Oliver Dannat, Walldorf (DE); Ruediger Fritz, Karlsruhe (DE); Frank Guillaume, Voelklingen (DE); Andreas Schoknecht, Linkenheim-Hochstetten (DE); Heidi Johann, Sandhausen (DE); Antonio Cannone, Hanau (DE); Klaas Tanaka, Heidelberg (DE); Norbert Kraemer, Mannheim (DE)

(73) Assignee: SAP AG, Walldorf (DE)

( * ) Notice: Subject to any disclaimer, the term of this patent is extended or adjusted under 35 U.S.C. 154(b) by 1203 days.

This patent is subject to a terminal disclaimer.

(21) Appl. No.: 12/147,378

(22) Filed: Jun. 26, 2008

(65) Prior Publication Data

US 2009/0327009 A1 Dec. 31, 2009

(51) Int. Cl.
*G06Q 30/00* (2006.01)
*G06Q 10/00* (2006.01)

(52) U.S. Cl.
USPC .......... 705/330; 705/348; 705/7.25; 705/7.11

(58) Field of Classification Search
CPC .............. G06Q 10/083; G06Q 10/067; G06Q 10/06315; G06Q 10/063
USPC ............... 705/330, 348, 1.1, 7.11, 7.12, 7.13, 705/7.16, 7.17, 7.22, 7.23, 7.25, 7.26, 7.36, 705/30, 29, 28, 334, 335, 336, 337; 709/201–203, 217–219, 249, 250; 707/635, 609, 610
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

BC-Central Maintenance and Transport Objects; Release 4.6C; SAP; pp. 15.*

(Continued)

*Primary Examiner* — Igor Borissov
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a freight request, a house shipment, a shipment request, a supplier freight invoice request, and/or a transportation booking request business object.

22 Claims, 1025 Drawing Sheets

(56) References Cited

U.S. PATENT DOCUMENTS

| | | | |
|---|---|---|---|
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,058,378 | A | 5/2000 | Clark et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,523,027 | B1 | 2/2003 | Underwood |
| 6,542,912 | B2 | 4/2003 | Meltzer et al. |
| 6,591,260 | B1 | 7/2003 | Schwartzhoff et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,249,195 | B2 | 7/2007 | Panec et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,426,520 | B2 | 9/2008 | Gorelik et al. |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,523,466 | B2 | 4/2009 | DeAngelis |
| 7,536,697 | B2 | 5/2009 | Wiseman et al. |
| 7,574,383 | B1 | 8/2009 | Parasnis et al. |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,689,711 | B2 | 3/2010 | Brouk et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 7,962,385 | B2 | 6/2011 | Falk et al. |
| 8,082,243 | B2 | 12/2011 | Gorelik et al. |
| 8,150,798 | B2 | 4/2012 | Ma et al. |
| 2001/0042032 | A1 | 11/2001 | Crawshaw et al. |
| 2001/0047372 | A1 | 11/2001 | Gorelik et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0041178 | A1 | 2/2003 | Brouk et al. |
| 2003/0069648 | A1 | 4/2003 | Douglas et al. |
| 2003/0086594 | A1 | 5/2003 | Gross |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220875 | A1 | 11/2003 | Lam et al. |
| 2003/0229522 | A1 | 12/2003 | Thompson et al. |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0015366 | A1 | 1/2004 | Wiseman et al. |
| 2004/0024662 | A1 | 2/2004 | Gray et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0083233 | A1 | 4/2004 | Willoughby |
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0172360 | A1 | 9/2004 | Mabrey et al. |
| 2004/0186891 | A1 | 9/2004 | Panec et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0055369 | A1 | 3/2005 | Gorelik et al. |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |

(56) References Cited

U.S. PATENT DOCUMENTS

2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234754 A1 10/2005 Veit
2005/0246240 A1 11/2005 Padilla
2005/0256753 A1 11/2005 Veit et al.
2006/0004934 A1 1/2006 Guldner et al.
2006/0005098 A1 1/2006 Lotz et al.
2006/0020515 A1 1/2006 Lee et al.
2006/0026552 A1 2/2006 Mazzitelli et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0184435 A1 8/2006 Mostowfi
2006/0212376 A1 9/2006 Snyder et al.
2006/0280302 A1 12/2006 Baumann et al.
2006/0282360 A1 12/2006 Kahn et al.
2007/0027742 A1 2/2007 Emuchay et al.
2007/0043583 A1 2/2007 Davulcu et al.
2007/0055688 A1 3/2007 Blattner
2007/0067411 A1 3/2007 Angelov
2007/0078799 A1 4/2007 Huber-Buschbeck et al.
2007/0112574 A1 5/2007 Greene
2007/0124227 A1 5/2007 Dembo et al.
2007/0129978 A1 6/2007 Shirasu et al.
2007/0132585 A1 6/2007 Llorca et al.
2007/0150387 A1 6/2007 Seubert et al.
2007/0150836 A1 6/2007 Deggelmann et al.
2007/0156428 A1 7/2007 Brecht-Tillinger et al.
2007/0156545 A1 7/2007 Lin
2007/0156552 A1 7/2007 Manganiello
2007/0156690 A1 7/2007 Moser et al.
2007/0165622 A1 7/2007 O'Rourke et al.
2007/0214065 A1 9/2007 Kahlon et al.
2007/0225949 A1 9/2007 Sundararajan et al.
2007/0226090 A1 9/2007 Stratton
2007/0255639 A1 11/2007 Seifert
2007/0265860 A1 11/2007 Herrmann et al.
2007/0265862 A1 11/2007 Freund et al.
2007/0288250 A1 12/2007 Lemcke et al.
2007/0294159 A1 12/2007 Cottle
2008/0005012 A1 1/2008 Deneef
2008/0016242 A1 1/2008 Panec et al.
2008/0021754 A1 1/2008 Horn et al.
2008/0040243 A1 2/2008 Chang et al.
2008/0046104 A1 2/2008 Van Camp et al.
2008/0046421 A1 2/2008 Bhatia et al.
2008/0120129 A1 5/2008 Seubert et al.
2008/0120190 A1 5/2008 Joao et al.
2008/0120204 A1 5/2008 Conner et al.
2008/0120313 A1 5/2008 O'Brien et al.
2008/0133303 A1 6/2008 Singh et al.
2008/0154969 A1 6/2008 DeBie
2008/0162266 A1 7/2008 Griessmann et al.
2008/0184265 A1 7/2008 Kasi et al.
2008/0196108 A1 8/2008 Dent et al.
2008/0215354 A1 9/2008 Halverson et al.
2008/0243578 A1 10/2008 Veit
2008/0288317 A1 11/2008 Kakar
2009/0006203 A1 1/2009 Fordyce et al.
2009/0063287 A1 3/2009 Tribout et al.
2009/0077074 A1 3/2009 Hosokawa
2009/0089198 A1 4/2009 Kroutik
2009/0094274 A1 4/2009 Gorelik et al.
2009/0164497 A1 6/2009 Steinmaier et al.
2009/0192926 A1 7/2009 Tarapata
2009/0193432 A1 7/2009 McKegney et al.
2009/0222360 A1 9/2009 Schmitt et al.
2009/0248429 A1 10/2009 Doenig et al.
2009/0248430 A1 10/2009 Hubert et al.
2009/0248431 A1 10/2009 Schoknecht et al.
2009/0248463 A1 10/2009 Piochon et al.
2009/0248473 A1 10/2009 Doenig et al.
2009/0248487 A1 10/2009 Santoso et al.
2009/0248547 A1 10/2009 Doenig et al.
2009/0248558 A1 10/2009 Hollberg et al.
2009/0248586 A1 10/2009 Kaisermayr et al.
2009/0248698 A1 10/2009 Rehmann
2009/0249358 A1 10/2009 Schuette
2009/0249362 A1 10/2009 Lindemann et al.
2009/0271245 A1 10/2009 Joshi et al.
2009/0300578 A1 12/2009 Neil
2009/0326988 A1 12/2009 Barth et al.
2009/0327009 A1 12/2009 Schmitt et al.
2009/0327105 A1 12/2009 Moussa et al.
2009/0327106 A1 12/2009 Bartelt et al.
2010/0001834 A1 1/2010 Brunswig et al.
2010/0014510 A1 1/2010 Boreli et al.
2010/0070391 A1 3/2010 Storr et al.
2010/0070395 A1 3/2010 Elkeles et al.
2010/0106555 A1 4/2010 Mneimneh et al.
2010/0131379 A1 5/2010 Dorais et al.
2010/0131394 A1 5/2010 Rutsch et al.
2010/0153297 A1 6/2010 Haaf et al.
2010/0161425 A1 6/2010 Sideman
2010/0217645 A1 8/2010 Jin et al.
2010/0217820 A1 8/2010 Brouk et al.
2010/0218245 A1 8/2010 Brouk et al.
2010/0241729 A1 9/2010 Angelov
2010/0306536 A1 12/2010 Brouk et al.
2011/0046775 A1 2/2011 Bailey et al.
2011/0077999 A1 3/2011 Becker et al.
2011/0078048 A1 3/2011 Becker et al.
2011/0153767 A1 6/2011 Coldicott et al.
2011/0276636 A1 11/2011 Cheng et al.

FOREIGN PATENT DOCUMENTS

CN 1632806 6/2005
CN 1765138 4/2006
CN 1767537 5/2006
CN 101174957 5/2008
CN 101288092 10/2008
WO WO 2008/005102 1/2008

OTHER PUBLICATIONS

Annevelink et al.: Heterogenous Database Intergration in a Physician Workstation; 1992; pp. 5.*

(56) References Cited

OTHER PUBLICATIONS

Ketabchi et al.: Object-Oriented Database Management Support for Software Maintenance and Reverse Engineering; Santa Clara University; 1989; pp. 4.*
Diehl et al.: Service Architecture for an Object-Oriented Next Generation Profile Register; pp. 8.*
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise: Modeling CORBA, Components, XML/XMI and Metadata Workshop"; <http://www.omg.org/news/meetings/workshops/uml_presentations.htm>.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10, Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.

(56) References Cited

OTHER PUBLICATIONS

Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anal et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.

(56) References Cited

OTHER PUBLICATIONS

"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in related U.S. Appl. No. 11/864,871 on Oct. 1, 2010; 30 pages.
Office Action issued in U.S. Appl. No. 12/147,414 on Apr. 14, 2011; 30 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,192 on Sep. 6, 2011; 18 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Communication Pursuant to Article 94(3) issued in European Application No. 05766672.9 on Jul. 14, 2011; 4 pages.
Notice of Allowance issued in related U.S. Appl. No. 11/731,857, filed Dec. 14, 2011; 7 pages.
Office Action issued in U.S. Appl. No. 12/147,414, filed Oct. 26, 2011; 27 pages.
Office Action issued in U.S. Appl. No. 12/323,116, filed Sep. 6, 2011; 8 pages.
Office Action issued in U.S. Appl. No. 12/571,140, filed Sep. 26, 2011; 14 pages.
Office Action issued in related U.S. Appl. No. 12/060,054, filed Dec. 7, 2011; 15 pages.
Office Action issued in U.S. Appl. No. 12/060,144, filed Dec. 8, 2011; 18 pages.
Office Action issued in U.S. Appl. No. 12/059,804, filed Nov. 14, 2011; 15 pages.
Notice of Allowance issued in related U.S. Appl. No. 12/060,178, filed Sep. 2, 2011; 9 pages.
Office Action issued in related U.S. Appl. No. 12/060,155, filed Oct. 31, 2011; 15 pages.
Notice of Allowance issued in U.S. Appl. No. 11/155,368, filed Nov. 8, 2011; 7 pages.
Office Action issued in U.S. Appl. No. 12/815,698, filed Jan. 20, 2012; 10 pages.
Office Action issued in U.S. Appl. No. 12/815,618, filed Dec. 22, 2011; 8 pages.
Notice of Allowance issued in U.S. Appl. No. 11/775,821, filed Sep. 21, 2011; 5 pages.
Notice of Allowance issued in U.S. Appl. No. 11/775,821, filed Dec. 30, 2011; 5 pages.
Notice of Allowance issued in U.S. Appl. No. 11/864,811, filed Nov. 14, 2011; 8 pages.
Office Action issued in related U.S. Appl. No. 11/864,863, filed Dec. 22, 2011; 20 pages.
Notice of Allowance issued in U.S. Appl. No. 11/640,422, filed Sep. 29, 2011; 7 pages.

(56) References Cited

OTHER PUBLICATIONS

Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML—Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
International Search Report and Written Opinion issued in International Application No. PCT/CN2011/001238 on May 3, 2012; 9 pages.
Notice of Allowance issued in related U.S. Appl. No. 11/864,866 on Mar. 13, 2012; 7 pages.
Notice of Allowance issued in related U.S. Appl. No. 11/145,464 on Feb. 6, 2012; 7 pages.
Notice of Allowance issued in related U.S. Appl. No. 11/166,065 on Oct. 9, 2012; 10 pages.
Notice of Allowance issued in related U.S. Appl. No. 11/364,538 on Jul. 13, 2012; 7 pages.
Notice of Allowance issued in related U.S. Appl. No. 11/731,857 on Oct. 9, 2012; 7 pages.
Notice of Allowance issued in related U.S. Appl. No. 11/803,178 on Jul. 17, 2012; 15 pages.
Notice of Allowance issued in related U.S. Appl. No. 11/864,832 on Jan. 9, 2012; 12 pages.
Notice of Allowance issued in related U.S. Appl. No. 11/864,832 on Jul. 30, 2012; 12 pages.
Notice of Allowance issued in U.S. Appl. No. 11/155,368 on Jul. 23, 2012; 7 pages.
Notice of Allowance issued in U.S. Appl. No. 11/166,065 on Feb. 15, 2012; 7 pages.
Notice of Allowance issued in U.S. Appl. No. 11/640,422 on May 22, 2012; 7 pages.
Notice of Allowance issued in U.S. Appl. No. 11/864,811 on Sep. 10, 2012; 10 pages.
Notice of Allowance issued in U.S. Appl. No. 11/864,811 on Mar. 2, 2012; 8 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,171 on Oct. 3, 2012; 10 pages.
Notice of Allowance issued in U.S. Appl. No. 12/060,192 on Mar. 2, 2012; 18 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 12/059,860 on Jan. 23, 2012; 16 pages.
Office Action issued in related U.S. Appl. No. 12/060,171 on Mar. 1, 2012; 19 pages.
Office Action issued in U.S. Appl. No. 11/864,786 on Mar. 30, 2012; 12 pages.
Office Action issued in U.S. Appl. No. 12/323,116 on Jan. 27, 2012; 7 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,639 on May 24, 2012; 7 pages.
Office Action issued in U.S. Appl. No. 12/815,698 on Jul. 20, 2012; 13 pages.
Office Action issued in U.S. Appl. No. 12/815,750 on Sep. 28, 2012; 66 pages.
Office Action issued in U.S. Appl. No. 12/815,802 on Jul. 20, 2012; 16 pages.
Office Action issued in U.S. Appl. No. 12/815,911 on Sep. 26, 2012; 14 pages.
Office Action issued in U.S. Appl. No. 12/816,083 on May 9, 2012; 20 pages.
Office Action issued in U.S. Appl. No. 12/816,083 on Sep. 21, 2012; 22 pages.
Office Action issued in U.S. Appl. No. 12/816,170 on Jul. 24, 2012; 9 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.

* cited by examiner

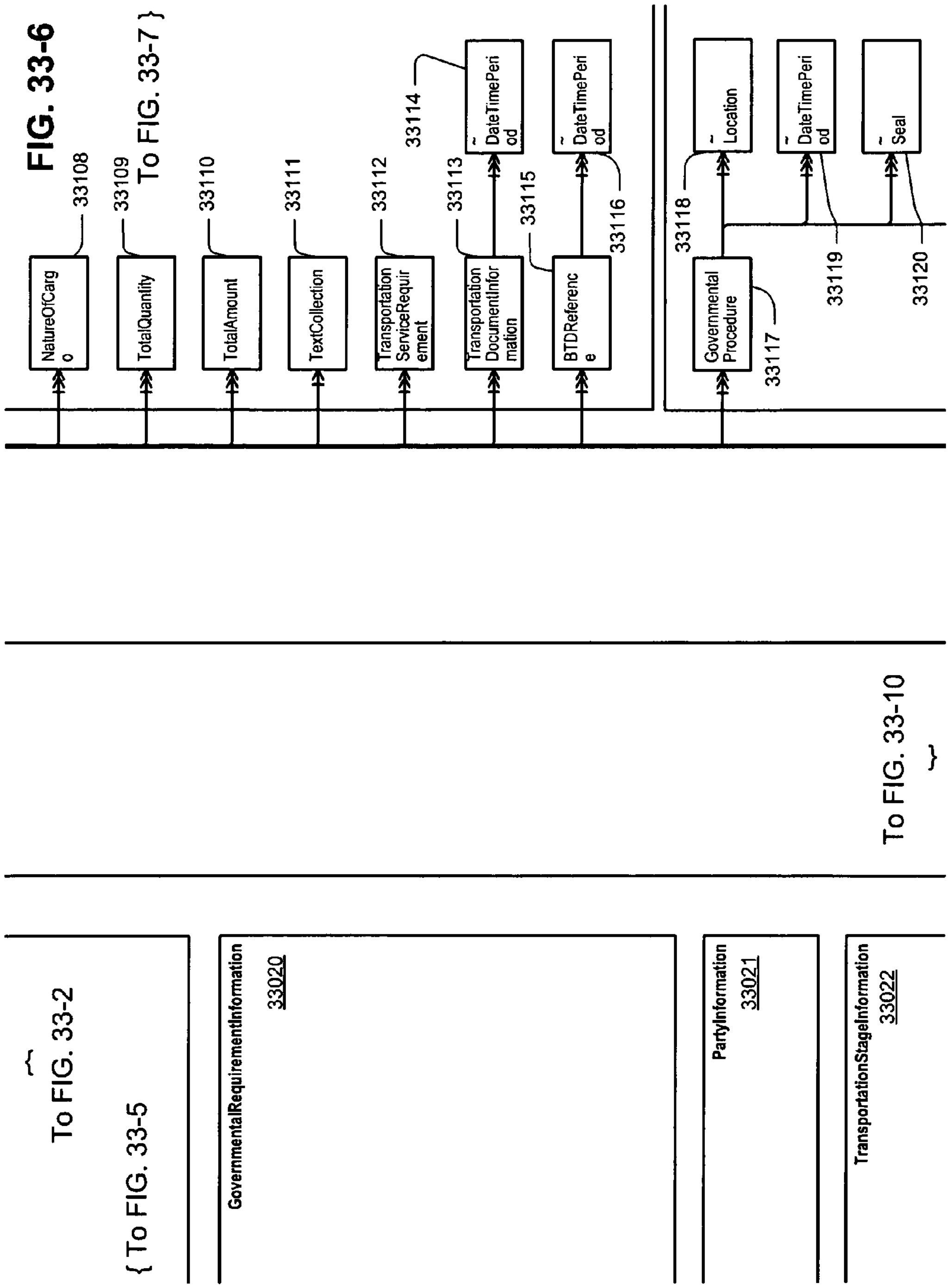

To FIG. 33-2
To FIG. 33-5
GovernmentalRequirementInformation
33020
PartyInformation
33021
TransportationStageInformation
33022
To FIG. 33-10
FIG. 33-6
To FIG. 33-7
NatureOfCargo
33108
TotalQuantity
33109
TotalAmount
33110
TextCollection
33111
TransportationServiceRequirement
33112
TransportationDocumentInformation
33113
~DateTimePeriod
33114
33115
BTDReference
~DateTimePeriod
33116
GovernmentalProcedure
33117
~Location
33118
~DateTimePeriod
33119
~Seal
33120

To FIG. 33-14
To FIG. 33-17
To FIG. 33-9
Quantity
33066
Seal
33067
BusinessTransaction DocumentReference
33068
DateTimePeriod
33069
TextCollection
33070
Party
33071
Location
33072
DateTimePeriods
33073
ContactInformation
33074
TextCollection
33075
DangerousGoods
33076
TransportationChargesInformation
33077
TransportationCharges
33078
Location
33079
TextCollection
33080

| Package | level1 | level2 | level3 | level4 | level5 | level6 | Cardinality | Data Type Name |
|---|---|---|---|---|---|---|---|---|
| FreightRequestCancelRequestMessage 38000 | FreightRequestCancelRequest-Message 38002 | | | | | | | FreightRequestCancelRequestMessage 38004 |
| MessageHeader 38006 | | MessageHeader 38008 | | | | | 1 38010 | BusinessDocumentMessageHeader 38012 |
| FreightRequest 38014 | | FreightRequest 38016 | | | | | 1 38018 | |
| | | | ID 38020 | | | | 1 38022 | BusinessTransactionDocumentID 38024 |
| Request 38026 | | | Request 38028 | | | | 1 38030 | ... |

FIG. 38-2

| Package | level1 | level2 | level3 | level4 | level5 | level6 | Cardinality | Data Type Name |
|---|---|---|---|---|---|---|---|---|
| BusinessTrans-actionDocumen-tReference 38032 | | | | BusinessTransac-tionDocumen-tReference 38034 | | | 0..n 38036 | ... |
| | | | | | BusinessTransac-tionDocumentRefer-ence 38038 | | 0..1 38040 | BusinessTransactionDocu-mentReference 38042 |
| | | | | | BusinessTransac-tionDocumentRela-tionshipRoleCode 38044 | | 0..1 38046 | BusinessTransactionDocu-mentRelationshipRoleCode 38048 |
| | | | | | BusinessTransac-tionDocumentRela-tionshipTypeCode 38050 | | 0..1 38052 | BusinessTransactionDocu-mentRelationshipTypeCode 38054 |
| | | | | | TransportationDocu-mentTypeCode 38056 | | 0..1 38058 | TransportationDocument-TypeCode 38060 |

FIG. 38-3

| Package | level1 | level2 | level3 | level4 | level5 | level6 | Cardinality | Data Type Name |
|---|---|---|---|---|---|---|---|---|
| | | | | | TransportationDocumentNote 38062 | | 0..1 38064 | SHORT_Note 38066 |
| | | | | | TransportationDocumentID 38068 | | 0..1 38070 | TransportationDocumentID 38072 |
| | | | | | DateTimePeriod 38074 | | 0..n 38076 | ... |
| | | | | | | DateTimePeriod 38078 | 1 38080 | DateTimePeriod 38082 |
| | | | | | | PeriodRoleCode 38084 | 1 38086 | PeriodRoleCode 38088 |

FIG. 39-1

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| FreightRequestConfirmationMessage 390000 | FreightRequestConfirmationMessage 390002 | | | | | | | | | | | | FreightRequestConfirmationMessage 390004 |
| MessageHeader 390006 | | MessageHeader 390008 | | | | | | | | | | 1..1 390010 | BusinessDocumentMessageHeader 390012 |
| FreightRequest 390014 | | FreightRequest 390016 | | | | | | | | | | 1..1 390018 | ... |
| | | | @actioncode 390020 | | | | | | | | | 1..1 390022 | ActionCode 390024 |
| | | | ID 390026 | | | | | | | | | 1..1 390028 | BusinessTransactionDocumentID 390030 |
| Confirmation 390032 | | | Confirmation 390034 | | | | | | | | | 1..1 390036 | ... |

FIG. 39-2

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | AccpetanceStatusCode 390038 | | | | | | | | 1 390040 | AcceptanceStatusCode 390042 |
| HeaderInformation 390044 | | | | DateTimePeriods 390046 | | | | | | | | 0..n 390048 | ... |
| | | | | | RequestedFulfillmentPeriod 390050 | | | | | | | 0..1 390052 | DateTimePeriod 390054 |
| | | | | | AcceptableFulfillmentPeriod 390056 | | | | | | | 0..1 390058 | DateTimePeriod 390060 |
| | | | | | PeriodRoleCode 390062 | | | | | | | 1..1 390064 | PeriodRoleCode 390066 |
| | | | | NatureOfCargo 390068 | | | | | | | | 0..n 390070 | ... |

FIG. 39-3

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | ClassificationCode 390072 | | | | | | | 1..1 390074 | NatureOfCargoClassificationCode 390076 |
| | | | | TotalQuantity 390078 | | | | | | | | 0..n 390080 | ... |
| | | | | | Quantity 390082 | | | | | | | 1 390084 | Quantity 390086 |
| | | | | | RoleCode 390088 | | | | | | | 0..1 390090 | QuantityRoleCode 390092 |
| | | | | | TypeCode 390094 | | | | | | | 0..1 390096 | QuantityTypeCode 390098 |
| | | | | TotalAmount 390100 | | | | | | | | 0..n 390102 | ... |
| | | | | | Amount 390104 | | | | | | | 1..1 390106 | Amount 390108 |
| | | | | | RoleCode 390110 | | | | | | | 1..1 390112 | AmountRoleCode 390114 |

FIG. 39-4

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | TextCollection 390116 | | | | | | | | 0..1 390118 | ... |
| | | | | | TextCollection 390120 | | | | | | | 1..1 390122 | TextCollection 390124 |
| | | | | BusinessTransactionDocumentReference 390126 | | | | | | | | 0..n 390128 | ... |
| | | | | | BusinessTransactionDocumentReference 390130 | | | | | | | 0..1 390132 | BusinessTransactionDocumentReference 390134 |
| | | | | | BusinessTransactionDocumentRelationshipRoleCode 390136 | | | | | | | 0..1 390138 | BusinessTransactionDocumentRelationshipRoleCode 390140 |

FIG. 39-5

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentRelationshipTypeCode 390142 | | | | | | | 0..1 390144 | BusinessTransactionDocumentRelationshipTypeCode 390146 |
| | | | | | TransportationDocumentTypeCode 390148 | | | | | | | 0..1 390150 | TransportationDocumentTypeCode 390152 |
| | | | | | TransportationDocumentNote 390154 | | | | | | | 0..1 390156 | SHORT_Note 390158 |
| | | | | | TransportationDocumentID 390160 | | | | | | | 0..1 390162 | TransportationDocumentID 390164 |
| | | | | | DateTimePeriod 390166 | | | | | | | 0..n 390168 | ... |

FIG. 39-6

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTimePeriod 390170 | | | | | | 1..1 390172 | DateTimePeriod 390174 |
| | | | | | | PeriodRoleCode 390176 | | | | | | 1..1 390178 | PeriodRoleCode 390180 |
| GovernmentalRequirementInformation 390182 | | | | GovernmentalProcedure 390184 | | | | | | | | 0..n 390186 | ... |
| | | | | | TransportationGovernmentAgencyTypeCode 390188 | | | | | | | 0..1 390190 | TransportationGovernmentAgencyTypeCode 390192 |
| | | | | | TransportationMovementTypeCode 390194 | | | | | | | 0..1 390196 | TransportationMovementTypeCode 390198 |

FIG. 39-7

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationGovernmentAgencyInvolvementStatusCode 390200 | | | | | | | 0..1 390202 | TransportationGovernmentAgencyInvolvementStatusCode 390204 |
| | | | | | TransportationGovernmentAgencyActionCode 390206 | | | | | | | 0..1 390208 | TransportationGovernmentAgencyActionCode 390210 |
| | | | | | TransportationGovernmentAgencyProcedureStatusCode 390212 | | | | | | | 0..1 390214 | TransportationGovernmentAgencyProcedureStatusCode 390216 |
| | | | | | Location 390218 | | | | | | | 0..n 390220 | ... |

FIG. 39-8

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Location 390222 | | | | | | 1..1 390224 | BusinessTransactionDocumentLocation 390226 |
| | | | | | | RoleCode 390228 | | | | | | 1..1 390230 | LocationRoleCode 390232 |
| | | | | | | TypeCode 390234 | | | | | | 0..1 390236 | LocationTypeCode 390238 |
| | | | | | | Name 390240 | | | | | | 0..1 390242 | MEDIUM_Name 390244 |
| | | | | | DateTimePeriod 390246 | | | | | | | 0..n 390248 | ... |
| | | | | | | DateTimePeriod 390250 | | | | | | 1..1 390252 | DateTimePeriod 390254 |
| | | | | | | PeriodRoleCode 390256 | | | | | | 1..1 390258 | PeriodRoleCode 390260 |

FIG. 39-9

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | Seal 390262 | | | | | | | 0..n 390264 | ... |
| | | | | | | ID 390266 | | | | | | 0..1 390268 | SealID 390270 |
| | | | | | | PartyRoleCode 390272 | | | | | | 0..1 390274 | PartyRoleCode 390276 |
| | | | | | | PartyFormattedName 390278 | | | | | | 0..1 390280 | LONG_Name 390282 |
| | | | | | | StatusCode 390284 | | | | | | 0..1 390286 | SealStatusCode 390288 |
| | | | | | TextCollection 390290 | | | | | | | 0..1 390292 | ... |
| | | | | | | TextCollection 390294 | | | | | | 1..1 390296 | TextCollection 390298 |

FIG. 39-10

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationDocumentInformation 390300 | | | | | | | 0..n 390302 | ... |
| | | | | | | TransportationDocumentTypeCode 390304 | | | | | | 0..1 390306 | TransportationDocumentTypeCode 390308 |
| | | | | | | TransportationDocumentNote 390310 | | | | | | 0..1 390312 | SHORT_Note 390314 |
| | | | | | | TransportationDocumentID 390316 | | | | | | 0..1 390318 | TransportationDocumentID 390320 |
| | | | | | | TransportationDocumentStatusCode 390322 | | | | | | 0..1 390324 | TransportationDocumentStatusCode 390326 |

FIG. 39-11

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | LanguageCode 390328 | | | | | | 0..1 390330 | LanguageCode 390332 |
| | | | | | | CommunicationMediumTypeCode 390334 | | | | | | 0..1 390336 | CommunicationMediumTypeCode 390338 |
| | | | | | | RequiredIndicator 390340 | | | | | | 1 390342 | Indicator 390344 |
| | | | | | | OutputCopyNumberValue 390346 | | | | | | 0..1 390348 | NumberValue 390350 |
| | | | | | | OutputOriginalNumberValue 390352 | | | | | | 0..1 390354 | NumberValue 390356 |
| | | | | | | DateTimePeriod 390358 | | | | | | 0..n 390360 | ... |

FIG. 39-12

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTimePeriod 390362 | | | | | 1..1 390364 | DateTimePeriod 390366 |
| | | | | | | | PeriodRoleCode 390368 | | | | | 1..1 390370 | PeriodRoleCode 390372 |
| PartyInformation 390374 | | | | Party 390376 | | | | | | | | 0..n 390378 | ... |
| | | | | | Party 390380 | | | | | | | 1 390382 | BusinessTransactionDocumentParty 390384 |
| | | | | | RoleCode 390386 | | | | | | | 1 390388 | PartyRoleCode 390390 |
| | | | | | FormattedName 390392 | | | | | | | 0..1 390394 | LONG_Name 390396 |
| | | | | | BusinessTransactionDocumentReference 390398 | | | | | | | 0..n 390400 | ... |

FIG. 39-13

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentReference 390402 | | | | | | 0..1 390404 | BusinessTransactionDocumentReference 390406 |
| | | | | | | BusinessTransactionDocumentRelationshipRoleCode 390408 | | | | | | 0..1 390410 | BusinessTransactionDocumentRelationshipRoleCode 390412 |
| | | | | | | BusinessTransactionDocumentRelationshipTypeCode 390414 | | | | | | 0..1 390416 | BusinessTransactionDocumentRelationshipTypeCode 390418 |
| | | | | | | TransportationDocumentTypeCode 390420 | | | | | | 0..1 390422 | TransportationDocumentTypeCode 390424 |

FIG. 39-14

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentNote 390426 | | | | | | 0..1 390428 | SHORT_Note 390430 |
| | | | | | | TransportationDocumentID 390432 | | | | | | 0..1 390434 | TransportationDocumentID 390436 |
| | | | | | | DateTimePeriod 390438 | | | | | | 0..n 390440 | ... |
| | | | | | | | DateTimePeriod 390442 | | | | | 1 390444 | DateTimePeriod 390446 |
| | | | | | | | PeriodRoleCode 390448 | | | | | 1 390450 | PeriodRoleCode 390452 |
| TransportationStageInformation 390454 | | | | TransportationStage 390456 | | | | | | | | 0..n 390458 | ... |

FIG. 39-15

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | ID 390460 | | | | | | | 1 390462 | TransportationStageID 390464 |
| | | | | | OrdinalNumberValue 390466 | | | | | | | 0..1 390468 | OrdinalNumberValue 390470 |
| | | | | | TypeCode 390472 | | | | | | | 0..1 390474 | TransportationStageTypeCode 390476 |
| | | | | | JourneyID 390478 | | | | | | | 0..1 390480 | JourneyID 390482 |
| | | | | | TransportModeCode 390484 | | | | | | | 0..1 390486 | TransportModeCode 390488 |
| | | | | | TransportMeansDescriptionCode 390490 | | | | | | | 0..1 390492 | TransportMeansDescriptionCode 390494 |

FIG. 39-16

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportMeansDescription 390496 | | | | | | | 0..1 390498 | SHORT_Description 390500 |
| | | | | | TransportMeansID 390502 | | | | | | | 0..1 390504 | TransportMeansID 390506 |
| | | | | | TransportMeansHomeCountryCode 390508 | | | | | | | 0..1 390510 | CountryCode 390512 |
| | | | | | TransportMeansOwnershipTypeCode 390514 | | | | | | | 0..1 390516 | TransportMeansOwnershipTypeCode 390518 |
| | | | | | CarrierStandardID 390520 | | | | | | | 0..1 390522 | PartyStandardID 390524 |

FIG. 39-17

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | CarrierFormattedName 390526 | | | | | | | 0..1 390528 | LONG_Name 390530 |
| | | | | | TransportationTransitDirectionCode 390532 | | | | | | | 0..1 390534 | TransportationTransitDirectionCode 390536 |
| | | | | | CalculatedDistanceMeasure 390538 | | | | | | | 0..1 390540 | Measure 390542 |
| | | | | | GivenDistanceMeasure 390544 | | | | | | | 0..1 390546 | Measure 390548 |
| | | | | | ContactInformation 390550 | | | | | | | 0..n 390552 | ... |

FIG. 39-18

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ContactPersonFunctionTypeCode 390554 | | | | | | 1..1 390556 | ContactPersonFunctionTypeCode 390558 |
| | | | | | | Address 390560 | | | | | | 1..1 390562 | Address 390564 |
| | | | | | Quantity 390566 | | | | | | | 0..n 390568 | ... |
| | | | | | | Quantity 390570 | | | | | | 1 390572 | Quantity 390574 |
| | | | | | | RoleCode 390576 | | | | | | 0..1 390578 | QuantityRoleCode 390580 |
| | | | | | | TypeCode 390582 | | | | | | 0..1 390584 | QuantityTypeCode 390586 |
| | | | | | Party 390588 | | | | | | | 1..n 390590 | ... |

FIG. 39-19

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Party 390592 | | | | | | 1 390594 | BusinessTransactionDocumentParty 390596 |
| | | | | | | RoleCode 390598 | | | | | | 1 390600 | PartyRoleCode 390602 |
| | | | | | | FormattedName 390604 | | | | | | 0..1 390606 | LONG_Name 390608 |
| | | | | | | TransportationDocumentInformation 390610 | | | | | | 0..n 390612 | ... |
| | | | | | | | TransportationDocumentTypeCode 390614 | | | | | 0..1 390616 | TransportationDocumentTypeCode 390618 |
| | | | | | | | TransportationDocumentNote 390620 | | | | | 0..1 390622 | SHORT_Note 390624 |

FIG. 39-20

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentID 390626 | | | | | 0..1 390628 | TransportationDocumentID 390630 |
| | | | | | | | TransportationDocumentStatusCode 390632 | | | | | 0..1 390634 | TransportationDocumentStatusCode 390636 |
| | | | | | | | LanguageCode 390638 | | | | | 0..1 390640 | LanguageCode 390642 |
| | | | | | | | CommunicationMediumTypeCode 390644 | | | | | 0..1 390646 | CommunicationMediumTypeCode 390648 |
| | | | | | | | RequiredIndicator 390650 | | | | | 1 390652 | Indicator 390654 |

FIG. 39-21

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputCopyNumberValue 390656 | | | | | 0..1 390658 | NumberValue 390660 |
| | | | | | | | OutputOriginalNumberValue 390662 | | | | | 0..1 390664 | NumberValue 390666 |
| | | | | | | | DateTimePeriod 390668 | | | | | 0..n 390670 | ... |
| | | | | | | | | DateTimePeriod 390672 | | | | 1 390674 | DateTimePeriod 390676 |
| | | | | | | | | PeriodRoleCode 390678 | | | | 1 390680 | PeriodRoleCode 390682 |

FIG. 39-22

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentReference 390684 | | | | | | 0..n 390686 | ... |
| | | | | | | | BusinessTransactionDocumentReference 390688 | | | | | 0..1 390690 | BusinessTransactionDocumentReference 390692 |
| | | | | | | | BusinessTransactionDocumentRelationshipRoleCode 390694 | | | | | 0..1 390696 | BusinessTransactionDocumentRelationshipRoleCode 390698 |
| | | | | | | | BusinessTransactionDocumentRelationshipTypeCode 390700 | | | | | 0..1 390702 | BusinessTransactionDocumentRelationshipTypeCode 390704 |

FIG. 39-23

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 390706 | | | | | 0..1 390708 | TransportationDocumentTypeCode 390710 |
| | | | | | | | TransportationDocumentNote 390712 | | | | | 0..1 390714 | SHORT_Note 390716 |
| | | | | | | | TransportationDocumentID 390718 | | | | | 0..1 390720 | TransportationDocumentID 390722 |
| | | | | | | | DateTimePeriod 390724 | | | | | 0..n 390726 | ... |
| | | | | | | | | DateTimePeriod 390728 | | | | 1..1 390730 | DateTimePeriod 390732 |
| | | | | | | | | PeriodRoleCode 390734 | | | | 1..1 390736 | PeriodRoleCode 390738 |

FIG. 39-24

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | Location 390740 | | | | | | | 1..n 390742 | ... |
| | | | | | | Location 390744 | | | | | | 1 390746 | BusinessTransactionDocumentLocation 390748 |
| | | | | | | RoleCode 390750 | | | | | | 1 390752 | LocationRoleCode 390754 |
| | | | | | | TypeCode 390756 | | | | | | 0..1 390758 | LocationTypeCode 390760 |
| | | | | | | Name 390762 | | | | | | 0..1 390764 | MEDIUM_Name 390766 |
| | | | | | | DateTimePeriods 390768 | | | | | | 0..n 390770 | ... |
| | | | | | | | RequestDateTimePeriod 390772 | | | | | 0..1 390774 | DateTimePeriod 390776 |

FIG. 39-25

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AcceptableDateTimePeriod 390778 | | | | | 0..1 390780 | DateTimePeriod 390782 |
| | | | | | | | PeriodRoleCode 390784 | | | | | 1..1 390786 | PeriodRoleCode 390788 |
| | | | | | Seal 390790 | | | | | | | 0..n 390792 | ... |
| | | | | | | ID 390794 | | | | | | 1 390796 | SealID 390798 |
| | | | | | | PartyRoleCode 390800 | | | | | | 0..1 390802 | PartyRoleCode 390804 |
| | | | | | | PartyFormattedName 390806 | | | | | | 0..1 390808 | LONG_Name 390810 |
| | | | | | | StatusCode 390812 | | | | | | 0..1 390814 | SealStatusCode 390816 |

FIG. 39-26

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TextCollection 390818 | | | | | | | 0..1 390820 | ... |
| | | | | | | TextCollection 390822 | | | | | | 1..1 390824 | TextCollection 390826 |
| | | | | | BusinessTransactionDocumentReference 390828 | | | | | | | 0..n 390830 | ... |
| | | | | | | BusinessTransactionDocumentReference 390832 | | | | | | 0..1 390834 | BusinessTransactionDocumentReference 390836 |
| | | | | | | BusinessTransactionDocumentRelationshipRoleCode 390838 | | | | | | 0..1 390840 | BusinessTransactionDocumentRelationshipRoleCode 390842 |

FIG. 39-27

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 390844 | | | | | | 0..1 390846 | BusinessTransactionDocumentRelationshipTypeCode 390848 |
| | | | | | | TransportationDocumentTypeCode 390850 | | | | | | 0..1 390852 | TransportationDocumentTypeCode 390854 |
| | | | | | | TransportationDocumentNote 390856 | | | | | | 0..1 390858 | SHORT_Note 390860 |
| | | | | | | TransportationDocumentID 390862 | | | | | | 0..1 390864 | TransportationDocumentID 390866 |
| | | | | | | DateTimePeriod 390868 | | | | | | 0..n 390870 | ... |

FIG. 39-28

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTimePeriod 390872 | | | | | 1..1 390874 | DateTimePeriod 390876 |
| | | | | | | | PeriodRoleCode 390878 | | | | | 1 390880 | PeriodRoleCode 390882 |
| | | | | | TransportationServiceRequirement 390884 | | | | | | | 1..1 390886 | ... |
| | | | | | | TransportationServiceRequirementCode 390888 | | | | | | 0..1 390890 | TransportationServiceRequirementCode 390892 |
| | | | | | | AdditionalTransportationServiceRequirementCode 390894 | | | | | | 0..1 390896 | TransportationServiceRequirementCode 390898 |

FIG. 39-29

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationContractConditionCode 390900 | | | | | | 0..1 390902 | TransportationContractConditionCode 390904 |
| | | | | | | TransportServiceLevelCode 390906 | | | | | | 0..1 390908 | TransportServiceLevelCode 390910 |
| | | | | | | NatureOfCargoClassificationCode 390912 | | | | | | 0..1 390914 | NatureOfCargoClassificationCode 390916 |
| TransportationUnitResourceInformation 390918 | | | | TransportationUnitResourceInformation 390920 | | | | | | | | 0..n 390922 | ... |
| | | | | | ID 390924 | | | | | | | 1 390926 | ResourceInformationID 390928 |

FIG. 39-30

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | ResourceNumberValue 390930 | | | | | | | 0..1 390932 | NumberValue 390934 |
| | | | | | ResourceID 390936 | | | | | | | 0..1 390938 | ResourceID 390940 |
| | | | | | ResourceHomeCountryCode 390942 | | | | | | | 0..1 390944 | CountryCode 390946 |
| | | | | | TransportationUnitResourceCategoryCode 390948 | | | | | | | 0..1 390950 | TransportationUnitResourceCategoryCode 390952 |
| | | | | | TransportationUnitResourceTypeCode 390954 | | | | | | | 0..1 390956 | TransportationUnitResourceTypeCode 390958 |

FIG. 39-31

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | FillLevelCode 390960 | | | | | | | 0..1 390962 | FillLevelCode 390964 |
| | | | | | ShippingTypeCode 390966 | | | | | | | 0..1 390968 | ShippingTypeCode 390970 |
| | | | | | HaulageArrangerCode 390972 | | | | | | | 0..1 390974 | HaulageArrangerCode 390976 |
| | | | | | TransportationHandlingInstructionCode 390978 | | | | | | | 0..1 390980 | TransportationHandlingInstructionCode 390982 |
| | | | | | TransportationHandlingInstructionNote 390984 | | | | | | | 0..1 390986 | LONG_Note 390988 |

FIG. 39-32

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationStageAssignment 390990 | | | | | | | 0..n 390992 | ... |
| | | | | | | FreightRequestTransportationStageID 390994 | | | | | | 1..1 390996 | TransportationStageID 390998 |
| | | | | | AttachedEquipment 391000 | | | | | | | 0..n 391002 | ... |
| | | | | | | FreightRequestResourceInformationD 391004 | | | | | | 1..1 391006 | ResourceID 391008 |
| | | | | | Quantity 391010 | | | | | | | 0..n 391012 | ... |

FIG. 39-33

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Quantity 391014 | | | | | | 1 391016 | Quantity 391018 |
| | | | | | | RoleCode 391020 | | | | | | 0..1 391022 | QuantityRoleCode 391024 |
| | | | | | | TypeCode 391026 | | | | | | 0..1 391028 | QuantityTypeCode 391030 |
| | | | | | Seal 391032 | | | | | | | 0..n 391034 | ... |
| | | | | | | ID 391036 | | | | | | 1 391038 | SealID 391040 |
| | | | | | | PartyRoleCode 391042 | | | | | | 0..1 391044 | PartyRoleCode 391046 |
| | | | | | | PartyFormattedName 391048 | | | | | | 0..1 391050 | LONG_Name 391052 |
| | | | | | | StatusCode 391054 | | | | | | 0..1 391056 | SealStatusCode 391058 |

FIG. 39-34

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 391060 | | | | | | | 0..n 391062 | ... |
| | | | | | | BusinessTransactionDocumentReference 391064 | | | | | | 0..1 391066 | BusinessTransactionDocumentReference 391068 |
| | | | | | | BusinessTransactionDocumentRelationshipRoleCode 391070 | | | | | | 0..1 391072 | BusinessTransactionDocumentRelationshipRoleCode 391074 |
| | | | | | | BusinessTransactionDocumentRelationshipTypeCode 391076 | | | | | | 0..1 391078 | BusinessTransactionDocumentRelationshipTypeCode 391080 |

FIG. 39-35

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentTypeCode 391082 | | | | | | 0..1 391084 | TransportationDocumentTypeCode 391086 |
| | | | | | | TransportationDocumentNote 391088 | | | | | | 0..1 391090 | SHORT_Note 391092 |
| | | | | | | TransportationDocumentID 391094 | | | | | | 0..1 391096 | TransportationDocumentID 391098 |
| | | | | | | DateTimePeriod 391100 | | | | | | 0..n 391102 | ... |
| | | | | | | | DateTimePeriod 391104 | | | | | 1..1 391106 | DateTimePeriod 391108 |
| | | | | | | | PeriodRoleCode 391110 | | | | | 1..1 391112 | PeriodRoleCode 391114 |

FIG. 39-36

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TextCollection 391116 | | | | | | | 0..1 391118 | ... |
| | | | | | | TextCollection 391120 | | | | | | 1..1 391122 | TextCollection 391124 |
| | | | | | Party 391126 | | | | | | | 1..n 391128 | ... |
| | | | | | | Party 391130 | | | | | | 1..1 391132 | BusinessTransactionDocumentParty 391134 |
| | | | | | | RoleCode 391136 | | | | | | 1..1 391138 | PartyRoleCode 391140 |
| | | | | | Location 391142 | | | | | | | 0..n 391144 | ... |
| | | | | | | Location 391146 | | | | | | 1 391148 | BusinessTransactionDocumentLocation 391150 |
| | | | | | | RoleCode 391152 | | | | | | 1 391154 | LocationRoleCode 391156 |

FIG. 39-37

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TypeCode 391158 | | | | | | 0..1 391160 | LocationTypeCode 391162 |
| | | | | | | Name 391164 | | | | | | 0..1 391166 | MEDIUM_Name 391168 |
| | | | | | | DateTimePeriods 391170 | | | | | | 0..n 391172 | ... |
| | | | | | | | RequestDateTimePeriod 391174 | | | | | 0..1 391176 | DateTimePeriod 391178 |
| | | | | | | | AcceptableDateTimePeriod 391180 | | | | | 0..1 391182 | DateTimePeriod 391184 |
| | | | | | | | PeriodRoleCode 391186 | | | | | 1..1 391188 | PeriodRoleCode 391190 |
| | | | | | DangerousGoods 391192 | | | | | | | 0..n 391194 | ... |

FIG. 39-38

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ID 391196 | | | | | | 0..1 391198 | DangerousGoodsID 391200 |
| | | | | | | RegulationsCode 391202 | | | | | | 0..1 391204 | DangerousGoodsRegulationsCode 391206 |
| | | | | | | HazardCode 391208 | | | | | | 0..1 391210 | DangerousGoodsHazardCode 391212 |
| | | | | | | FlashpointMeasureInterval 391214 | | | | | | 0..1 391216 | MeasureInterval 391218 |
| | | | | | | PackagingGroupCode 391220 | | | | | | 0..1 391222 | DangerousGoodsPackagingGroupCode 391224 |
| | | | | | | EmergencySchedule 391226 | | | | | | 0..1 391228 | DangerousGoodsEmergencySchedule 391230 |

FIG. 39-39

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportEmergencyCardCode 391232 | | | | | | 0..1 391234 | TransportEmergencyCardCode 391236 |
| | | | | | | DangerousGoodsLabelCode 391238 | | | | | | 0..1 391240 | DangerousGoodsLabelCode 391242 |
| | | | | | | DangerousGoodsLabelCode2 391244 | | | | | | 0..1 391246 | DangerousGoodsLabelCode 391248 |
| | | | | | | DangerousGoodsLabelCode3 391250 | | | | | | 0..1 391252 | DangerousGoodsLabelCode 391254 |
| | | | | | | PackagingInstructionTypeCode 391256 | | | | | | 0..1 391258 | PackagingInstructionTypeCode 391260 |

FIG. 39-40

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportMeansDescriptionCode 391262 | | | | | | 0..1 391264 | TransportMeansDescriptionCode 391266 |
| | | | | | | TransportationAuthorisationCode 391268 | | | | | | 0..1 391270 | DangerousGoodsTransportationAuthorisationCode 391272 |
| | | | | | | ContactInformation 391274 | | | | | | 0..n 391276 | ... |
| | | | | | | | ContactPersonFunctionTypeCode 391278 | | | | | 1..1 391280 | ContactPersonFunctionTypeCode 391282 |
| | | | | | | | Address 391284 | | | | | 1..1 391286 | Address 391288 |
| | | | | | | TextCollection 391290 | | | | | | 0..1 391292 | ... |

FIG. 39-41

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 391294 | | | | | 1..1 391296 | TextCollection 391298 |
| TransportationChargesInformation 391300 | | | | TransportationChargesInformation 391302 | | | | | | | | 0..n 391304 | ... |
| | | | | | TransportationChargesUsageCode 391306 | | | | | | | 1..1 391308 | TransportationChargesUsageCode 391310 |
| | | | | | FreightRequestPartyStandardID 391312 | | | | | | | 0..1 391314 | PartyStandardID 391316 |
| | | | | | FreightRequestPartyInternalID 391318 | | | | | | | 0..1 391320 | PartyInternalID 391322 |

FIG. 39-42

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | FreightRequestTransportationUnitResourceID 391324 | | | | | | | 0..1 391326 | ResourceID 391328 |
| | | | | | FreightRequestTransportationStageID 391330 | | | | | | | 0..1 391332 | TransportationStageID 391334 |
| | | | | | TransportationCharges 391336 | | | | | | | 0..1 391338 | ... |
| | | | | | | ID 391340 | | | | | | 1 391342 | TransportationChargesID 391344 |
| | | | | | | FreightAgreementID 391346 | | | | | | 1 391348 | FreightAgreementID 391350 |
| | | | | | | OriginCode 391352 | | | | | | 0..1 391354 | TransportationChargesOriginCode 391356 |

FIG. 39-43

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TariffID 391358 | | | | | | 0..1 391360 | TransportationChargesTariffID 391362 |
| | | | | | | CalculationSheetID 391364 | | | | | | 1 391366 | TransportationChargesCalculationSheetID 391368 |
| | | | | | | Location 391370 | | | | | | 0..n 391372 | ... |
| | | | | | | | Location 391374 | | | | | 1 391376 | BusinessTransactionDocumentLocation 391378 |
| | | | | | | | RoleCode 391380 | | | | | 1 391382 | LoactionRoleCode 391384 |
| | | | | | | | TypeCode 391386 | | | | | 0..1 391388 | LocationTypeCode 391390 |
| | | | | | | | Name 391392 | | | | | 0..1 391394 | MEDIUM_Name 391396 |

FIG. 39-44

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTimePeriods 391398 | | | | | 0..n 391400 | ... |
| | | | | | | | | RequestedFulfillmentPeriod 391402 | | | | 0..1 391404 | DateTimePeriod 391406 |
| | | | | | | | | AcceptableFulfillmentPeriod 391408 | | | | 0..1 391410 | DateTimePeriod 391412 |
| | | | | | | | | PeriodRoleCode 391414 | | | | 1 391416 | PeriodRoleCode 391418 |
| | | | | | | TextCollection 391420 | | | | | | 0..1 391422 | ... |
| | | | | | | | TextCollection 391424 | | | | | 1..1 391426 | TextCollection 391428 |
| | | | | | | Currency 391430 | | | | | | 0..n 391432 | ... |

FIG. 39-45

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Code 391434 | | | | | 1..1 391436 | CurrencyCode 391438 |
| | | | | | | | RoleCode 391440 | | | | | 1..1 391442 | CurrencyRoleCode 391444 |
| | | | | | | | UsageCode 391446 | | | | | 0..1 391448 | CurrencyUsageCode 391450 |
| | | | | | | ExchangeRate 391452 | | | | | | 0..n 391454 | ... |
| | | | | | | | ExchangeRate 391456 | | | | | 1..1 391458 | ExchangeRate 391460 |
| | | | | | | | TypeCode 391462 | | | | | 0..1 391464 | ExchangeRateTypeCode 391466 |
| | | | | | | PercentElement 391468 | | | | | | 0..n 391470 | ... |
| | | | | | | | PercentRoleCode 391472 | | | | | 1 391474 | PercentRoleCode 391476 |

FIG. 39-46

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Percent 391478 | | | | | 1 391480 | Percent 391482 |
| | | | | | | | TransportationChargesPercentCalculationBaseCode 391484 | | | | | 0..1 391486 | TransportationChargesPercentCalculationBaseCode 391488 |
| | | | | | | | StatusCode 391490 | | | | | 0..1 391492 | TransportationChargesPercentElementStatusCode 391494 |
| | | | | | | DateTimePeriod 391496 | | | | | | 0..n 391498 | ... |
| | | | | | | | DateTimePeriod 391500 | | | | | 1..1 391502 | DateTimePeriod 391504 |
| | | | | | | | PeriodRoleCode 391506 | | | | | 1..1 391508 | PeriodRoleCode 391510 |

FIG. 39-47

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentReference 391512 | | | | | | 0..n 391514 | ... |
| | | | | | | | BusinessTransactionDocumentReference 391516 | | | | | 0..1 391518 | BusinessTransactionDocumentReference 391520 |
| | | | | | | | BusinessTransactionDocumentRelationshipRoleCode 391522 | | | | | 0..1 391524 | BusinessTransactionDocumentRelationshipRoleCode 391526 |
| | | | | | | | BusinessTransactionDocumentRelationshipTypeCode 391528 | | | | | 0..1 391530 | BusinessTransactionDocumentRelationshipTypeCode 391532 |

FIG. 39-48

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 391534 | | | | | 0..1 391536 | TransportationDocumentTypeCode 391538 |
| | | | | | | | TransportationDocumentNote 391540 | | | | | 0..1 391542 | SHORT_Note 391544 |
| | | | | | | | TransportationDocumentID 391546 | | | | | 0..1 391548 | TransportationDocumentID 391550 |
| | | | | | | TaxDetail 391552 | | | | | | 0..n 391554 | ... |
| | | | | | | | ProductTax 391556 | | | | | 1..1 391558 | ProductTax 391560 |
| | | | | | | PaymentInstruction 391562 | | | | | | 0..n 391564 | ... |

FIG. 39-49

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PaymentInstruction 391566 | | | | | 1 391568 | PaymentInstruction 391570 |
| | | | | | | | TransportationChargeElementCategoryCode 391572 | | | | | 0..1 391574 | TransportationChargesElementCategoryCode 391576 |
| | | | | | | | TransportationChargesElementSubCategoryCode 391578 | | | | | 0..1 391580 | TransportationChargesElementSubCategoryCode 391582 |
| | | | | | | | TransportationChargesPaymentArrangementCode 391584 | | | | | 0..1 391586 | TransportationChargesPaymentArrangementCode 391588 |

FIG. 39-50

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | CashDiscountTerms 391590 | | | | | | 0..1 391592 | ... |
| | | | | | | | CashDiscountTerms 391594 | | | | | 1 391596 | CashDiscountTerms 391598 |
| | | | | | | | TransportationChargesElementCategoryCode 391600 | | | | | 0..1 391602 | TransportationChargesElementCategoryCode 391604 |
| | | | | | | | TransportationChargesElementSubCategoryCode 391606 | | | | | 0..1 391608 | TransportationChargesElementSubCategoryCode 391610 |
| | | | | | | Element 391612 | | | | | | 0..n 391614 | ... |

FIG. 39-51

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CategoryCode 391616 | | | | | 1 391618 | TransportationChargesElementCategoryCode 391620 |
| | | | | | | | SubCategoryCode 391622 | | | | | 1 391624 | TransportationChargesElementSubCategoryCode 391626 |
| | | | | | | | TypeCode 391628 | | | | | 1 391630 | TransportationChargesElementTypeCode 391632 |
| | | | | | | | CalculationResolutionCode 391634 | | | | | 1 391636 | TransportationChargesElementCalculationResolutionCode 391638 |
| | | | | | | | TransportationChargesPaymentArrangementCode 391640 | | | | | 0...1 391642 | TransportationChargesPaymentArrangementCode 391644 |
| | | | | | | | Location 391646 | | | | | 0..n 391648 | ... |

FIG. 39-52

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 391650 | | | | 1 391652 | BusinessTransactionDocumentLocation 391654 |
| | | | | | | | | RoleCode 391656 | | | | 1 391658 | LocationRoleCode 391660 |
| | | | | | | | | TypeCode 391662 | | | | 0..1 391664 | LocationTypeCode 391666 |
| | | | | | | | | Name 391668 | | | | 0..1 391670 | MEDIUM_Name 391672 |
| | | | | | | | | DateTimePeriods 391674 | | | | 0..n 391676 | ... |
| | | | | | | | | | RequestedFulfillmentPeriod 391678 | | | 0..1 391680 | DateTimePeriod 391682 |
| | | | | | | | | | AcceptableFulfillmentPeriod 391684 | | | 0..1 391686 | DateTimePeriod 391688 |

FIG. 39-53

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 391690 | | | 1 391692 | PeriodRoleCode 391694 |
| | | | | | | | TextCollection 391696 | | | | | 0..1 391698 | ... |
| | | | | | | | | TextCollection 391700 | | | | 1..1 391702 | TextCollection 391704 |
| | | | | | | | Currency 391706 | | | | | 0..n 391708 | ... |
| | | | | | | | | Code 391710 | | | | 1..1 391712 | CurrencyCode 391714 |
| | | | | | | | | RoleCode 391716 | | | | 1..1 391718 | CurrencyRoleCode 391720 |
| | | | | | | | | UsageCode 391722 | | | | 0..1 391724 | CurrencyUsageCode 391726 |
| | | | | | | | RateElement 391728 | | | | | 0..n 391730 | ... |

FIG. 39-54

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ID 391732 | | | | 1 391734 | TransportationChargesElementRateElementID 391736 |
| | | | | | | | | Amount 391738 | | | | 1 391740 | Amount 391742 |
| | | | | | | | | BaseQuantity 391744 | | | | 1 391746 | Quantity 391748 |
| | | | | | | | | TransportationChargesRateTypeCode 391750 | | | | 0..1 391752 | TransportationChargesRateTypeCode 391754 |
| | | | | | | | | TransportationChargesRateRoleCode 391756 | | | | 1 391758 | TransportationChargesRateRoleCode 391760 |

FIG. 39-55

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesRateElementStatusCode 391762 | | | | 0..1 391764 | TransportationChargesRateElementStatusCode 391766 |
| | | | | | | | Percent Element 391768 | | | | | 0..n 391770 | ... |
| | | | | | | | | PercentRoleCode 391772 | | | | 1 391774 | PercentRoleCode 391776 |
| | | | | | | | | Percent 391778 | | | | 1 391780 | Percent 391782 |
| | | | | | | | | TransportationChargesPercentCalculationBaseCode 391784 | | | | 0..1 391786 | TransportationChargesPercentCalculationBaseCode 391788 |

FIG. 39-56

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | StatusCode 391790 | | | | 0..1 391792 | TransportationChargesPercentElementStatusCode 391794 |
| | | | | | | | AmountElement 391796 | | | | | 0..n 391798 | ... |
| | | | | | | | | Amount 391800 | | | | 1 391802 | Amount 391804 |
| | | | | | | | | AmountRoleCode 391806 | | | | 1 391808 | AmountRoleCode 391810 |
| | | | | | | | | TransportationChargesAmountElementStatusCode 391812 | | | | 0..1 391814 | TransportationChargesAmountElementStatusCode 391816 |
| | | | | | | | | RateDetailAssignment 391818 | | | | 0..n 391820 | ... |

FIG. 39-57

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargeRateDetailID 391822 | | | 1 391824 | TransportationChargesElementRateElementID 391826 |
| | | | | | | | CalculationBase 391828 | | | | | 0..n 391830 | ... |
| | | | | | | | | TransportationChargesElementCalculationBaseCode 391832 | | | | 1 391834 | TransportationChargesElementCalculationBaseCode 391836 |
| | | | | | | | | BaseQuantity 391838 | | | | 0..1 391840 | Quantity 391842 |
| | | | | | | | | BaseQuantityRoleCode 391844 | | | | 0..1 391846 | QuantityRoleCode 391848 |

FIG. 39-58

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BaseQuantityTypeCode 391850 | | | | 0..1 391852 | QuantityTypeCode 391854 |
| | | | | | | | TaxDetail 391856 | | | | | 0..n 391858 | ... |
| | | | | | | | | ProductTax 391860 | | | | 1..1 391862 | ProductTax 391864 |
| | | | | | | | DateTimePeriod 391866 | | | | | 0..n 391868 | ... |
| | | | | | | | | DateTimePeriod 391870 | | | | 1..1 391872 | DateTimePeriod 391874 |
| | | | | | | | | PeriodRoleCode 391876 | | | | 1..1 391878 | PeriodRoleCode 391880 |
| | | | | | | | CostDistribution 391882 | | | | | 0..n 391884 | ... |

FIG. 39-59

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | AccountingCodingBlockAssignment 391886 | | | | 1..1 391888 | AccountingCodingBlockAssignment 391890 |
| ShipmentRequest 391892 | | | | ShipmentRequest 391894 | | | | | | | | 0..n 391896 | ... |
| | | | | | ID 391898 | | | | | | | 1..1 391900 | BusinessTransactionDocumentID 391902 |
| | | | | | TransportationStageAssignment 391904 | | | | | | | 0..n 391906 | ... |
| | | | | | | FreightRequestTransportationStageID 391908 | | | | | | 1..1 391910 | TransportationStageID 391912 |

FIG. 39-60

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationUnitResourceInformationAssignment 391914 | | | | | | | 0..n 391916 | ... |
| | | | | | | FreightRequestTransportationUnitResourceInformationID 391918 | | | | | | 1..1 391920 | TransportationUnitResourceID 391922 |
| Confirmation 391924 | | | | | Confirmation 391926 | | | | | | | 0..1 391928 | ... |
| | | | | | | DeliveryTerms 391930 | | | | | | 0..1 391932 | DeliveryTerms 391934 |
| HeaderInformation 391936 | | | | | | DateTimePeriods 391938 | | | | | | 0..n 391940 | ... |

FIG. 39-61

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RequestedFulfillmentPeriod 391942 | | | | | 0..1 391944 | DateTimePeriod 391946 |
| | | | | | | | AcceptableFulfillmentPeriod 391948 | | | | | 0..1 391950 | DateTimePeriod 391952 |
| | | | | | | | PeriodRoleCode 391954 | | | | | 1 391956 | PeriodRoleCode 391958 |
| | | | | | | NatureOfCargo 391960 | | | | | | 0..n 391962 | ... |
| | | | | | | | ClassificationCode 391964 | | | | | 1 391966 | NatureOfCargoClassificationCode 391968 |
| | | | | | | TotalQuantity 391970 | | | | | | 0..n 391972 | ... |
| | | | | | | | Quantity 391974 | | | | | 1 391976 | Quantity 391978 |

FIG. 39-62

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RoleCode 391980 | | | | | 0..1 391982 | QuantityRoleCode 391984 |
| | | | | | | | TypeCode 391986 | | | | | 0..1 391988 | QuantityTypeCode 391990 |
| | | | | | | TotalAmount 391992 | | | | | | 0..n 391994 | ... |
| | | | | | | | Amount 391996 | | | | | 1 391998 | Amount 392000 |
| | | | | | | | RoleCode 392002 | | | | | 1 392004 | AmountRoleCode 392006 |
| | | | | | | TextCollection 392008 | | | | | | 0..1 392010 | ... |
| | | | | | | | TextCollection 392012 | | | | | 1 392014 | TextCollection 392016 |

FIG. 39-63

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationServiceRequirement 392018 | | | | | | 0..n 392020 | ... |
| | | | | | | | TransportationServiceRequirementCode 392022 | | | | | 0..1 392024 | TransportationServiceRequirementCode 392026 |
| | | | | | | | AdditionalTransportationServiceRequirementCode 392028 | | | | | 0..1 392030 | TransportationServiceRequirementCode 392032 |
| | | | | | | | TransportationContractConditionCode 392034 | | | | | 0..1 392036 | TransportationContractConditionCode 392038 |

FIG. 39-64

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportServiceLevelCode 392040 | | | | | 0..1 392042 | TransportServiceLevelCode 392044 |
| | | | | | | | NatureOfCargoClassificationCode 392046 | | | | | 0..1 392048 | NatureOfCargoClassificationCode 392050 |
| | | | | | | TransportationDocumentInformation 392052 | | | | | | 0..n 392054 | ... |
| | | | | | | | TransportationDocumentTypeCode 392056 | | | | | 0..1 392058 | TransportationDocumentTypeCode 392060 |
| | | | | | | | TransportationDocumentNote 392062 | | | | | 0..1 392064 | SHORT_Note 392066 |

FIG. 39-65

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentID 392068 | | | | | 0..1 392070 | TransportationDocumentID 392072 |
| | | | | | | | TransportationDocumentStatusCode 392074 | | | | | 0..1 392076 | TransportationDocumentStatusCode 392078 |
| | | | | | | | LanguageCode 392080 | | | | | 0..1 392082 | LanguageCode 392084 |
| | | | | | | | CommunicationMediumTypeCode 392086 | | | | | 0..1 392088 | CommunicationMediumTypeCode 392090 |
| | | | | | | | Requiredindicator 392092 | | | | | 1 392094 | Indicator 392096 |

FIG. 39-66

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputCopyNumberValue 392098 | | | | | 0..1 392100 | NumberValue 392102 |
| | | | | | | | OutputOriginalNumberValue 392104 | | | | | 0..1 392106 | NumberValue 392108 |
| | | | | | | | DateTimePeriod 392110 | | | | | 0..n 392112 | ... |
| | | | | | | | | DateTimePeriod 392114 | | | | 1 392116 | DateTimePeriod 392118 |
| | | | | | | | | PeriodRoleCode 392120 | | | | 1 392122 | PeriodRoleCode 392124 |

FIG. 39-67

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentReference 392126 | | | | | | 0..n 392128 | ... |
| | | | | | | | BusinessTransactionDocumentReference 392130 | | | | | 0..1 392132 | BusinessTransactionDocumentReference 392134 |
| | | | | | | | BusinessTransactionDocumentRelationshipRoleCode 392136 | | | | | 0..1 392138 | BusinessTransactionDocumentRelationshipRoleCode 392140 |
| | | | | | | | BusinessTransactionDocumentRelationshipTypeCode 392142 | | | | | 0..1 392144 | BusinessTransactionDocumentRelationshipTypeCode 392146 |

FIG. 39-68

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 392148 | | | | | 0..1 392150 | TransportationDocumentTypeCode 392152 |
| | | | | | | | TransportationDocumentNote 392154 | | | | | 0..1 392156 | SHORT_Note 392158 |
| | | | | | | | TransportationDocumentID 392160 | | | | | 0..1 392162 | TransportationDocumentID 392164 |
| | | | | | | | DateTimePeriod 392166 | | | | | 0..n 392168 | ... |
| | | | | | | | | DateTimePeriod 392170 | | | | 1 392172 | DateTimePeriod 392174 |
| | | | | | | | | PeriodRoleCode 392176 | | | | 1 392178 | PeriodRoleCode 392180 |

FIG. 39-69

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| GovernmentalRequirementInformation 392182 | | | | | | GovernmentalProcedure 392184 | | | | | | 0..n 392186 | ... |
| | | | | | | | TransportationGovernmentAgencyTypeCode 392188 | | | | | 0..1 392190 | TransportationGovernmentAgencyTypeCode 392192 |
| | | | | | | | TransportationMovementTypeCode 392194 | | | | | 0..1 392196 | TransportationMovementTypeCode 392198 |
| | | | | | | | TransportationGovernmentAgencyInvolvementStatusCode 392200 | | | | | 0..1 392202 | TransportationGovernmentAgencyInvolvementStatusCode 392204 |

FIG. 39-70

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGovernmentAgencyActionCode 392206 | | | | | 0..1 392208 | TransportationGovernmentAgencyActionCode 392210 |
| | | | | | | | TransportationGovernmentAgencyProcedureStatusCode 392212 | | | | | 0..1 392214 | TransportationGovernmentAgencyProcedureStatusCode 392216 |
| | | | | | | | Location 392218 | | | | | 0..n 392220 | ... |
| | | | | | | | | Location 392222 | | | | 1 392224 | BusinessTransactionDocumentLocation 392226 |
| | | | | | | | | RoleCode 392228 | | | | 1 392230 | LocationRoleCode 392232 |

FIG. 39-71

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 392234 | | | | 0..1 392236 | LocationTypeCode 392238 |
| | | | | | | | | Name 392240 | | | | 0..1 392242 | MEDIUM_Name 392244 |
| | | | | | | | DateTimePeriod 392246 | | | | | 0..n 392248 | ... |
| | | | | | | | | DateTimePeriod 392250 | | | | 1 392252 | DateTimePeriod 392254 |
| | | | | | | | | PeriodRoleCode 392256 | | | | 1 392258 | PeriodRoleCode 392260 |
| | | | | | | | Seal 392262 | | | | | 0..n 392264 | ... |
| | | | | | | | | ID 392266 | | | | 0..1 392268 | SealID 392270 |

FIG. 39-72

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PartyRoleCode 392272 | | | | 0..1 392274 | PartyRoleCode 392276 |
| | | | | | | | | PartyFormattedName 392278 | | | | 0..1 392280 | LONG_Name 392282 |
| | | | | | | | | StatusCode 392284 | | | | 0..1 392286 | SealStatusCode 392288 |
| | | | | | | | TextCollection 392290 | | | | | 0..1 392292 | ... |
| | | | | | | | | TextCollection 392294 | | | | 1 392296 | TextCollection 392298 |
| | | | | | | | TransportationDocumentInformation 392300 | | | | | 0..n 392302 | ... |

FIG. 39-73

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 392304 | | | | 0..1 392306 | TransportationDocumentTypeCode 392308 |
| | | | | | | | | TransportationDocumentNote 392310 | | | | 0..1 392312 | SHORT_Note 392314 |
| | | | | | | | | TransportationDocumentID 392316 | | | | 0..1 392318 | TransportationDocumentID 392320 |
| | | | | | | | | TransportationDocumentStatusCode 392322 | | | | 0..1 392324 | TransportationDocumentStatusCode 392326 |
| | | | | | | | | LanguageCode 392328 | | | | 0..1 392330 | LanguageCode 392332 |

FIG. 39-74

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | CommunicationMediumTypeCode 392334 | | | | 0..1 392336 | CommunicationMediumTypeCode 392338 |
| | | | | | | | | RequiredIndicator 392340 | | | | 1 392342 | Indicator 392344 |
| | | | | | | | | OutputCopyNumberValue 392346 | | | | 0..1 392348 | NumberValue 392350 |
| | | | | | | | | Output Original Number Value 392352 | | | | 0..1 392354 | NumberValue 392356 |
| | | | | | | | | DateTimePeriod 392358 | | | | 0..n 392360 | ... |
| | | | | | | | | | DateTimePeriod 392362 | | | 1 392364 | DateTimePeriod 392366 |

FIG. 39-75

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 392368 | | | 1 392370 | PeriodRoleCode 392372 |
| PartyInformation 392374 | | | | | | Party 392376 | | | | | | 1..n 392378 | ... |
| | | | | | | | Party 392380 | | | | | 1 392382 | BusinessTransactionDocumentParty 392384 |
| | | | | | | | RoleCode 392386 | | | | | 1 392388 | PartyRoleCode 392390 |
| | | | | | | | FormattedName 392392 | | | | | 0..1 392394 | LONG_Name 392396 |
| | | | | | | | Amount 392398 | | | | | 0..n 392400 | ... |
| | | | | | | | | Amount 392402 | | | | 1 392404 | Amount 392406 |
| | | | | | | | | RoleCode 392408 | | | | 1 392410 | AmountRoleCode 392412 |

FIG. 39-76

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTimePeriods 392414 | | | | | 0..n 392416 | ... |
| | | | | | | | | RequestedFulfillmentPeriod 392418 | | | | 0..1 392420 | DateTimePeriod 392422 |
| | | | | | | | | AcceptableFulfillmentPeriod 392424 | | | | 0..1 392426 | DateTimePeriod 392428 |
| | | | | | | | | PeriodRoleCode 392430 | | | | 1 392432 | PeriodRoleCode 392434 |
| | | | | | | | TransportationDocumentInformation 392436 | | | | | 0..n 392438 | ... |

FIG. 39-77

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 392440 | | | | 0..1 392442 | TransportationDocumentTypeCode 392444 |
| | | | | | | | | TransportationDocumentNote 392446 | | | | 0..1 392448 | SHORT_Note 392450 |
| | | | | | | | | TransportationDocumentID 392452 | | | | 0..1 392454 | TransportationDocumentID 392456 |
| | | | | | | | | TransportationDocumentStatusCode 392458 | | | | 0..1 392460 | TransportationDocumentStatusCode 392462 |
| | | | | | | | | LanguageCode 392464 | | | | 0..1 392466 | LanguageCode 392468 |

FIG. 39-78

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | CommunicationMediumTypeCode 392470 | | | | 0..1 392472 | CommunicationMediumTypeCode 392474 |
| | | | | | | | | RequiredIndicator 392476 | | | | 1 392478 | Indicator 392480 |
| | | | | | | | | OutputCopyNumberValue 392482 | | | | 0..1 392484 | NumberValue 392486 |
| | | | | | | | | Output Original Number Value 392488 | | | | 0..1 392490 | NumberValue 392492 |
| | | | | | | | | DateTimePeriod 392494 | | | | 0..n 392496 | ... |
| | | | | | | | | | DateTimePeriod 392498 | | | 1 392500 | DateTimePeriod 392502 |

FIG. 39-79

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 392504 | | | 1 392506 | PeriodRoleCode 392508 |
| | | | | | | | BusinessTransactionDocumentReference 392510 | | | | | 0..n 392512 | ... |
| | | | | | | | | BusinessTransactionDocumentReference 392514 | | | | 0..1 392516 | BusinessTransactionDocumentReference 392518 |
| | | | | | | | | BusinessTransactionDocumentRelationshipRoleCode 392520 | | | | 0..1 392522 | BusinessTransactionDocumentRelationshipRoleCode 392524 |

FIG. 39-80

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipTypeCode 392526 | | | | 0..1 392528 | BusinessTransactionDocumentRelationshipTypeCode 392530 |
| | | | | | | | | TransportationDocumentTypeCode 392532 | | | | 0..1 392534 | TransportationDocumentTypeCode 392536 |
| | | | | | | | | TransportationDocumentNote 392538 | | | | 0..1 392540 | SHORT_Note 392542 |
| | | | | | | | | TransportationDocumentID 392544 | | | | 0..1 392546 | TransportationDocumentID 392548 |

FIG. 39-81

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTimePeriod 392550 | | | | 0..n 392552 | ... |
| | | | | | | | | | DateTimePeriod 392554 | | | 1 392556 | DateTimePeriod 392558 |
| | | | | | | | | | PeriodRoleCode 392560 | | | 1 392562 | PeriodRoleCode 392564 |
| LocationInformation 392566 | | | | | | Location 392568 | | | | | | 0..n 392570 | |
| | | | | | | | Location 392572 | | | | | 1 392574 | BusinessTransactionDocumentLocation 392576 |
| | | | | | | | RoleCode 392578 | | | | | 1 392580 | LocationRoleCode 392582 |
| | | | | | | | TypeCode 392584 | | | | | 0..1 392586 | LocationTypeCode 392588 |

FIG. 39-82

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Name 392590 | | | | | 0..1 392592 | MEDIUM_Name 392594 |
| | | | | | | | DateTimePeriods 392596 | | | | | 0..n 392598 | ... |
| | | | | | | | | RequestedFulfillmentPeriod 392600 | | | | 0..1 392602 | DateTimePeriod 392604 |
| | | | | | | | | AcceptableFulfillmentPeriod 392606 | | | | 0..1 392608 | DateTimePeriod 392610 |
| | | | | | | | | PeriodRoleCode 392612 | | | | 1 392614 | PeriodRoleCode 392616 |
| TransportationStageInformation 392618 | | | | | | TransportationStage 392620 | | | | | | 0..n 392622 | ... |

FIG. 39-83

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ID 392624 | | | | | 1 392626 | TransportationStageID 392628 |
| | | | | | | | OrdinalNumberValue 392630 | | | | | 0..1 392632 | OrdinalNumberValue 392634 |
| | | | | | | | TypeCode 392636 | | | | | 0..1 392638 | TransportationStageTypeCode 392640 |
| | | | | | | | JourneyID 392642 | | | | | 0..1 392644 | JourneyID 392646 |
| | | | | | | | TransportModeCode 392648 | | | | | 0..1 392650 | TransportModeCode 392652 |
| | | | | | | | TransportMeansDescriptionCode 392654 | | | | | 0..1 392656 | TransportMeansDescriptionCode 392658 |

FIG. 39-84

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportMeansDescription 392660 | | | | | 0..1 392662 | SHORT_Description 392664 |
| | | | | | | | TransportMeansID 392666 | | | | | 0..1 392668 | TransportMeansID 392670 |
| | | | | | | | TransportMeansHomeCountryCode 392672 | | | | | 0..1 392674 | CountryCode 392676 |
| | | | | | | | TransportMeansOwnershipTypeCode 392678 | | | | | 0..1 392680 | TransportMeansOwnershipTypeCode 392682 |
| | | | | | | | CarrierStandardID 392684 | | | | | 0..1 392686 | PartyStandardID 392688 |

FIG. 39-85

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CarrierFormattedName 392690 | | | | | 0..1 392692 | LONG_Name 392694 |
| | | | | | | | TransportationTransitDirectionCode 392696 | | | | | 0..1 392698 | TransportationTransitDirectionCode 392700 |
| | | | | | | | CalculatedDistanceMeasure 392702 | | | | | 0..1 392704 | Measure 392706 |
| | | | | | | | GivenDistanceMeasure 392708 | | | | | 0..1 392710 | Measure 392712 |
| | | | | | | | Location 392714 | | | | | 1..n 392716 | ... |
| | | | | | | | | Location 392718 | | | | 1 392720 | BusinessTransactionDocumentLocation 392722 |

FIG. 39-86

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RoleCode 392724 | | | | 1 392726 | LocationRoleCode 392728 |
| | | | | | | | | TypeCode 392730 | | | | 0..1 392732 | LocationTypeCode 392734 |
| | | | | | | | | Name 392736 | | | | 0..1 392738 | MEDIUM_Name 392740 |
| | | | | | | | | DateTimePeriods 392742 | | | | 0..n 392744 | ... |
| | | | | | | | | | RequestedFulfillmentPeriod 392746 | | | 0..1 392748 | DateTimePeriod 392750 |
| | | | | | | | | | AcceptableFulfillmentPeriod 392752 | | | 0..1 392754 | DateTimePeriod 392756 |
| | | | | | | | | | PeriodRoleCode 392758 | | | 1 392760 | PeriodRoleCode 392762 |

FIG. 39-87

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 392764 | | | | | 0..n 392766 | ... |
| | | | | | | | | BusinessTransactionDocumentReference 392768 | | | | 0..1 392770 | BusinessTransactionDocumentReference 392772 |
| | | | | | | | | BusinessTransactionDocumentRelationshipRoleCode 392774 | | | | 0..1 392776 | BusinessTransactionDocumentRelationshipRoleCode 392778 |

FIG. 39-88

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipTypeCode 392780 | | | | 0..1 392782 | BusinessTransactionDocumentRelationshipTypeCode 392784 |
| | | | | | | | | TransportationDocumentTypeCode 392786 | | | | 0..1 392788 | TransportationDocumentTypeCode 392790 |
| | | | | | | | | TransportationDocumentNote 392792 | | | | 0..1 392794 | SHORT_Note 392796 |
| | | | | | | | | TransportationDocumentID 392798 | | | | 0..1 392800 | TransportationDocumentID 392802 |

FIG. 39-89

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTimePeriod 392804 | | | | 0..n 392806 | ... |
| | | | | | | | | | DateTimePeriod 392808 | | | 1 392810 | DateTimePeriod 392812 |
| | | | | | | | | | PeriodRoleCode 392814 | | | 1 392816 | PeriodRoleCode 392818 |
| | | | | | | | TransportationServiceRequirement 392820 | | | | | 0..n 392822 | ... |
| | | | | | | | | TransportationServiceRequirementCode 392824 | | | | 0..1 392826 | TransportationServiceRequirementCode 392828 |

FIG. 39-90

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | AdditionalTransportationServiceRequirementCode 392830 | | | | 0..1 392832 | TransportationServiceRequirementCode 392834 |
| | | | | | | | | TransportationContractConditionCode 392836 | | | | 0..1 392838 | TransportationContractConditionCode 392840 |
| | | | | | | | | TransportServiceLevelCode 392842 | | | | 0..1 392844 | TransportServiceLevelCode 392846 |
| | | | | | | | | NatureOfCargoClassificationCode 392848 | | | | 0..1 392850 | NatureOfCargoClassificationCode 392852 |

FIG. 39-91

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationUnitResourceInformation 392854 | | | | | | TransportationUnitResourceInformation 392856 | | | | | | 0..n 392858 | … |
| | | | | | | | ID 392860 | | | | | 1 392862 | ResourceInformationID 392864 |
| | | | | | | | ResourceNumberValue 392866 | | | | | 0..1 392868 | NumberValue 392870 |
| | | | | | | | ResourceID 392872 | | | | | 0..1 392874 | ResourceID 392876 |
| | | | | | | | ResourceHomeCountryCode 392878 | | | | | 0..1 392880 | CountryCode 392882 |

FIG. 39-92

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceCategoryCode 392884 | | | | | 0..1 392886 | TransportationUnitResourceCategoryCode 392888 |
| | | | | | | | TransportationUnitResourceTypeCode 392890 | | | | | 0..1 392892 | TransportationUnitResourceTypeCode 392894 |
| | | | | | | | FillLevelCode 392896 | | | | | 0..1 392898 | FillLevelCode 392900 |
| | | | | | | | ShippingTypeCode 392902 | | | | | 0..1 392904 | ShippingTypeCode 392906 |
| | | | | | | | HaulageArrangerCode 392908 | | | | | 0..1 392910 | HaulageArrangerCode 392912 |

FIG. 39-93

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 392914 | | | | | 0..1 392916 | TransportationHandlingInstructionCode 392918 |
| | | | | | | | TransportationHandlingInstructionNote 392920 | | | | | 0..1 392922 | LONG_Note 392924 |
| | | | | | | | TransportationStageAssignment 392926 | | | | | 0..n 392928 | ... |
| | | | | | | | | ShipmentRequestTransportationStageID 392930 | | | | 1 392932 | TransportationStageID 392934 |
| | | | | | | | AttachedEquipment 392936 | | | | | 0..n 392938 | ... |

FIG. 39-94

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentRequestResourceInformationID 392940 | | | | 1 392942 | ResourceID 392944 |
| | | | | | | | Quantity 392946 | | | | | 0..n 392948 | ... |
| | | | | | | | | Quantity 392950 | | | | 1 392952 | Quantity 392954 |
| | | | | | | | | RoleCode 392956 | | | | 0..1 392958 | QuantityRoleCode 392960 |
| | | | | | | | | TypeCode 392962 | | | | 0..1 392964 | QuantityTypeCode 392966 |
| | | | | | | | Seal 392968 | | | | | 0..n 392970 | ... |
| | | | | | | | | ID 392972 | | | | 1 392974 | SealID 392976 |

FIG. 39-95

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PartyRoleCode 392978 | | | | 0..1 392980 | PartyRoleCode 392982 |
| | | | | | | | | PartyFormattedName 392984 | | | | 0..1 392986 | LONG_Name 392988 |
| | | | | | | | | StatusCode 392990 | | | | 0..1 392992 | SealStatusCode 392994 |
| | | | | | | | BusinessTransactionDocumentReference 392996 | | | | | 0..n 392998 | ... |
| | | | | | | | | BusinessTransactionDocumentReference 393000 | | | | 0..1 393002 | BusinessTransactionDocumentReference 393004 |

FIG. 39-96

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 393006 | | | | 0..1 393008 | BusinessTransactionDocumentRelationshipRoleCode 393010 |
| | | | | | | | | BusinessTransactionDocumentRelationshipTypeCode 393012 | | | | 0..1 393014 | BusinessTransactionDocumentRelationshipTypeCode 393016 |
| | | | | | | | | TransportationDocumentTypeCode 393018 | | | | 0..1 393020 | TransportationDocumentTypeCode 393022 |
| | | | | | | | | TransportationDocumentNote 393024 | | | | 0..1 393026 | SHORT_Note 393028 |

FIG. 39-97

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentID 393030 | | | | 0..1 393032 | TransportationDocumentID 393034 |
| | | | | | | | | DateTimePeriod 393036 | | | | 0..n 393038 | |
| | | | | | | | | | DateTimePeriod 393040 | | | 1 393042 | DateTimePeriod 393044 |
| | | | | | | | | | PeriodRoleCode 393046 | | | 1 393048 | PeriodRoleCode 393050 |
| | | | | | | | TextCollection 393052 | | | | | 0..1 393054 | ... |
| | | | | | | | | TextCollection 393056 | | | | 1 393058 | TextCollection 393060 |
| | | | | | | | Location 393062 | | | | | 0..n 393064 | ... |

FIG. 39-98

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 393066 | | | | 1 393068 | BusinessTransactionDocumentLocation 393070 |
| | | | | | | | | RoleCode 393072 | | | | 1 393074 | LocationRoleCode 393076 |
| | | | | | | | | TypeCode 393078 | | | | 0..1 393080 | LocationTypeCode 393082 |
| | | | | | | | | Name 393084 | | | | 0..1 393086 | MEDIUM_Name 393088 |
| | | | | | | | | DateTimePeriods 393090 | | | | 0..n 393092 | ... |
| | | | | | | | | | RequestedFulfillmentPeriod 393094 | | | 0..1 393096 | DateTimePeriod 393098 |
| | | | | | | | | | AcceptableFulfillmentPeriod 393100 | | | 0..1 393102 | DateTimePeriod 393104 |

FIG. 39-99

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 393106 | | | 1 393108 | PeriodRoleCode 393110 |
| | | | | | | | DangerousGoods 393112 | | | | | 0..n 393114 | |
| | | | | | | | | ID 393116 | | | | 0..1 393118 | DangerousGoodsID 393120 |
| | | | | | | | | RegulationsCode 393122 | | | | 0..1 393124 | DangerousGoodsRegulationsCode 393126 |
| | | | | | | | | HazardCode 393128 | | | | 0..1 393130 | DangerousGoodsHazardCode 393132 |
| | | | | | | | | FlashpointMeasureInterval 393134 | | | | 0..1 393136 | MeasureInterval 393138 |
| | | | | | | | | PackagingGroupCode 393140 | | | | 0..1 393142 | DangerousGoodsPackagingGroupCode 393144 |

FIG. 39-100

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | EmergencySchedule 393146 | | | | 0..1 393148 | DangerousGoodsEmergencySchedule 393150 |
| | | | | | | | | TransportEmergencyCardCode 393152 | | | | 0..1 393154 | TransportEmergencyCardCode 393156 |
| | | | | | | | | DangerousGoodsLabelCode 393158 | | | | 0..1 393160 | DangerousGoodsLabelCode 393162 |
| | | | | | | | | DangerousGoodsLabelCode2 393164 | | | | 0..1 393166 | DangerousGoodsLabelCode 393168 |
| | | | | | | | | DangerousGoodsLabelCode3 393170 | | | | 0..1 393172 | DangerousGoodsLabelCode 393174 |

FIG. 39-101

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PackagingInstructionTypeCode 393176 | | | | 0..1 393178 | PackagingInstructionTypeCode 393180 |
| | | | | | | | | TransportMeansDescriptionCode 393182 | | | | 0..1 393184 | TransportMeansDescriptionCode 393186 |
| | | | | | | | | TransportationAuthorisationCode 393188 | | | | 0..1 393190 | DangerousGoodsTransportationAuthorisationCode 393192 |
| | | | | | | | | ContactInformation 393194 | | | | 0..n 393196 | ... |
| | | | | | | | | | ContactPersonFunctionTypeCode 393198 | | | 1 393200 | ContactPersonFunctionTypeCode 393202 |

FIG. 39-102

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | Address 393204 | | | 1 393206 | Address 393208 |
| | | | | | | | | TextCollection 393210 | | | | 0..1 393212 | ... |
| | | | | | | | | | TextCollection 393214 | | | 1 393216 | TextCollection 393218 |
| PackageInformation 393220 | | | | | | PackageInformation 393222 | | | | | | 0..n 393224 | ... |
| | | | | | | | ID 393226 | | | | | 1 393228 | PackageInformationID 393230 |
| | | | | | | | PackageID 393232 | | | | | 0..1 393234 | PackageID 393236 |
| | | | | | | | PackageOrdinalNumberValue 393238 | | | | | 0..1 393240 | OrdinalNumberValue 393242 |

FIG. 39-103

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PackageNumberValue 393244 | | | | | 0..1 393246 | NumberValue 393248 |
| | | | | | | | PackageTypeCode 393250 | | | | | 0..1 393252 | PackageTypeCode 393254 |
| | | | | | | | PackagingLevelCode 393256 | | | | | 0..1 393258 | PackagingLevelCode 393260 |
| | | | | | | | PackageMarkingInstructionCode 393262 | | | | | 0..1 393264 | PackageMarkingInstructionCode 393266 |
| | | | | | | | PredecessorPackageID 393268 | | | | | 0..1 393270 | PackageID 393272 |
| | | | | | | | ItemAssignment 393274 | | | | | 0..n 393276 | … |

FIG. 39-104

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentRequestItemID 393278 | | | | 1 393280 | BusinessTransactionDocumentItemID 393282 |
| | | | | | | | | Quantity 393284 | | | | 0..n 393286 | ... |
| | | | | | | | | | Quantity 393288 | | | 1 393290 | Quantity 393292 |
| | | | | | | | | | RoleCode 393294 | | | 0..1 393296 | QuantityRoleCode 393298 |
| | | | | | | | | | TypeCode 393300 | | | 0..1 393302 | QuantityTypeCode 393304 |
| | | | | | | | | BusinessTransactionDocumentReference 393306 | | | | 0..n 393308 | ... |

FIG. 39-105

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentReference 393310 | | | 0..1 393312 | BusinessTransactionDocumentReference 393314 |
| | | | | | | | | | BusinessTransactionDocumentRelationshipRoleCode 393316 | | | 0..1 393318 | BusinessTransactionDocumentRelationshipRoleCode 393320 |
| | | | | | | | | | BusinessTransactionDocumentRelationshipTypeCode 393322 | | | 0..1 393324 | BusinessTransactionDocumentRelationshipTypeCode 393326 |

FIG. 39-106

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentTypeCode 393328 | | | 0..1 393330 | TransportationDocumentTypeCode 393332 |
| | | | | | | | | | TransportationDocumentNote 393334 | | | 0..1 393336 | SHORT_Note 393338 |
| | | | | | | | | | TransportationDocumentID 393340 | | | 0..1 393342 | TransportationDocumentID 393344 |
| | | | | | | | | | DateTimePeriod 393346 | | | 0..n 393348 | ... |
| | | | | | | | | | | DateTimePeriod 393350 | | 1 393352 | DateTimePeriod 393354 |

FIG. 39-107

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PeriodRoleCode 393356 | | 1 393358 | PeriodRoleCode 393360 |
| | | | | | | | | TransportationGoodsIdentification 393362 | | | | 0..n 393364 | ... |
| | | | | | | | | | TransportationGoodsIdentifierTypeCode 393366 | | | 1 393368 | TransportationGoodsIdentifierTypeCode 393370 |
| | | | | | | | | | LowerBoundaryTransportationGoodsID 393372 | | | 0..1 393374 | TransportationGoodsID 393376 |

FIG. 39-108

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | UpperBoundaryTransportationGoodsID 393378 | | | 0..1 393380 | TransportationGoodsID 393382 |
| | | | | | | | TransportationUnitResourceInformationAssignment 393384 | | | | | 0..n 393386 | ... |
| | | | | | | | | ShipmentRequestResourceInformationID 393388 | | | | 1 393390 | ResourceInformationID 393392 |
| | | | | | | | | Quantity 393394 | | | | 0..n 393396 | ... |
| | | | | | | | | | Quantity 393398 | | | 1 393400 | Quantity 393402 |

FIG. 39-109

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 393404 | | | 0..1 393406 | QuantityRoleCode 393408 |
| | | | | | | | | | TypeCode 393410 | | | 0..1 393412 | QuantityTypeCode 393414 |
| | | | | | | | Quantity 393416 | | | | | 0..n 393418 | ... |
| | | | | | | | | Quantity 393420 | | | | 1 393422 | Quantity 393424 |
| | | | | | | | | RoleCode 393426 | | | | 0..1 393428 | QuantityRoleCode 393430 |
| | | | | | | | | TypeCode 393432 | | | | 0..1 393434 | QuantityTypeCode 393436 |
| | | | | | | | TextCollection 393438 | | | | | 0..1 393440 | ... |
| | | | | | | | | TextCollection 393442 | | | | 1 393444 | TextCollection 393446 |

FIG. 39-110

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| Item 393448 | | | | | | Item 393450 | | | | | | 0..n 393452 | ... |
| | | | | | | | ID 393454 | | | | | 1 393456 | BusinessTransactionDocumentItemID 393458 |
| | | | | | | | OriginCountryCode 393460 | | | | | 0..1 393462 | CountryCode 393464 |
| | | | | | | | DestinationCountryCode 393466 | | | | | 0..1 393468 | CountryCode 393470 |
| | | | | | | | ShippingTypeCode 393472 | | | | | 0..1 393474 | ShippingTypeCode 393476 |
| | | | | | | | HaulageArrangerCode 393478 | | | | | 0..1 393480 | HaulageArrangerCode 393482 |

FIG. 39-111

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TemperatureMeasureInterval 393484 | | | | | 0..1 393486 | MeasureInterval 393488 |
| | | | | | | | TransportationHandlingInstructionCode 393490 | | | | | 0..1 393492 | TransportationHandlingInstructionCode 393494 |
| | | | | | | | TransportationHandlingInstructionNote 393496 | | | | | 0..1 393498 | LONG_Note 393500 |
| ItemInformation 393502 | | | | | | | Amount 393504 | | | | | 0..n 393506 | ... |
| | | | | | | | | Amount 393508 | | | | 1 393510 | Amount 393512 |
| | | | | | | | | RoleCode 393514 | | | | 1 393516 | AmountRoleCode 393518 |

FIG. 39-112

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 393520 | | | | | 0..1 393522 | ... |
| | | | | | | | | TextcCollection 393524 | | | | 1 393526 | TextCollection 393528 |
| | | | | | | | NatureOfCargo 393530 | | | | | 0..n 393532 | ... |
| | | | | | | | | ClassificationCode 393534 | | | | 1 393536 | NatureOfCargoClassificationCode 393538 |
| | | | | | | | Quantity 393540 | | | | | 0..n 393542 | ... |
| | | | | | | | | Quantity 393544 | | | | 1 393546 | Quantity 393548 |
| | | | | | | | | RoleCode 393550 | | | | 0..1 393552 | QuantityRoleCode 393554 |
| | | | | | | | | TypeCode 393556 | | | | 0..1 393558 | QuantityTypeCode 393560 |

FIG. 39-113

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentInformation 393562 | | | | | 0..n 393564 | ... |
| | | | | | | | | TransportationDocumentTypeCode 393566 | | | | 0..1 393568 | TransportationDocumentTypeCode 393570 |
| | | | | | | | | TransportationDocumentNote 393572 | | | | 0..1 393574 | SHORT_Note 393576 |
| | | | | | | | | TransportationDocumentID 393578 | | | | 0..1 393580 | TransportationDocumentID 393582 |
| | | | | | | | | TransportationDocumentStatusCode 393584 | | | | 0..1 393586 | TransportationDocumentStatusCode 393588 |

FIG. 39-114

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | LanguageCode 393590 | | | | 0..1 393592 | LanguageCode 393594 |
| | | | | | | | | CommunicationMediumTypeCode 393596 | | | | 0..1 393598 | CommunicationMediumTypeCode 393600 |
| | | | | | | | | Requiredindicator 393602 | | | | 1 393604 | Indicator 393606 |
| | | | | | | | | OutputCopyNumberValue 393608 | | | | 0..1 393610 | NumberValue 393612 |
| | | | | | | | | Output Original Number Value 393614 | | | | 0..1 393616 | NumberValue 393618 |
| | | | | | | | | DateTimePeriod 393620 | | | | 0..n 393622 | ... |

FIG. 39-115

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTimePeriod 393624 | | | 1 393626 | DateTimePeriod 393628 |
| | | | | | | | | | PeriodRoleCode 393630 | | | 1 393632 | PeriodRoleCode 393634 |
| | | | | | | | BusinessTransactionDocumentReference 393636 | | | | | 0..n 393638 | ... |
| | | | | | | | | BusinessTransactionDocumentReference 393640 | | | | 0..1 393642 | BusinessTransactionDocumentReference 393644 |

FIG. 39-116

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 393646 | | | | 0..1 393648 | BusinessTransactionDocumentRelationshipRoleCode 393650 |
| | | | | | | | | BusinessTransactionDocumentRelationshipTypeCode 393652 | | | | 0..1 393654 | BusinessTransactionDocumentRelationshipTypeCode 393656 |
| | | | | | | | | TransportationDocumentTypeCode 393658 | | | | 0..1 393660 | TransportationDocumentTypeCode 393662 |
| | | | | | | | | TransportationDocumentNote 393664 | | | | 0..1 393666 | SHORT_Note 393668 |

FIG. 39-117

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentID 393670 | | | | 0..1 393672 | TransportationDocumentID 393674 |
| | | | | | | | | DateTimePeriod 393676 | | | | 0..n 393678 | ... |
| | | | | | | | | | RequestDateTimePeriod 393680 | | | 1 393682 | DateTimePeriod 393684 |
| | | | | | | | | | PeriodRoleCode 393686 | | | 1 393688 | PeriodRoleCode 393690 |
| | | | | | | | DangerousGoods 393692 | | | | | 0..n 393694 | ... |
| | | | | | | | | ID 393696 | | | | 0..1 393698 | DangerousGoodsID 393700 |

FIG. 39-118

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RegulationsCode 393702 | | | | 0..1 393704 | DangerousGoodsRegulationsCode 393706 |
| | | | | | | | | HazardCode 393708 | | | | 0..1 393710 | DangerousGoodsHazardCode 393712 |
| | | | | | | | | FlashpointMeasureInterval 393714 | | | | 0..1 393716 | MeasureInterval 393718 |
| | | | | | | | | PackagingGroupCode 393720 | | | | 0..1 393722 | DangerousGoodsPackagingGroupCode 393724 |
| | | | | | | | | EmergencySchedule 393726 | | | | 0..1 393728 | DangerousGoodsEmergencySchedule 393730 |
| | | | | | | | | TransportEmergencyCardCode 393732 | | | | 0..1 393734 | TransportEmergencyCardCode 393736 |

FIG. 39-119

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode 393738 | | | | 0..1 393740 | DangerousGoodsLabelCode 393742 |
| | | | | | | | | DangerousGoodsLabelCode2 393744 | | | | 0..1 393746 | DangerousGoodsLabelCode 393748 |
| | | | | | | | | DangerousGoodsLabelCode3 393750 | | | | 0..1 393752 | DangerousGoodsLabelCode 393754 |
| | | | | | | | | PackingInstructionTypeCode 393756 | | | | 0..1 393758 | PackingInstructionTypeCode 393760 |
| | | | | | | | | TransportMeansDescriptionCode 393762 | | | | 0..1 393764 | TransportMeansDescriptionCode 393766 |

FIG. 39-120

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationAuthorisationCode 393768 | | | | 0..1 393770 | DangerousGoodsTransportationAuthorisationCode 393772 |
| | | | | | | | | ContactInformation 393774 | | | | 0..n 393776 | ... |
| | | | | | | | | | ContactPersonFunctionTypeCode 393778 | | | 1 393780 | ContactPersonFunctionTypeCode 393782 |
| | | | | | | | | | Address 393784 | | | 1 393786 | Address 393788 |
| | | | | | | | | Quantity 393790 | | | | 0..n 393792 | ... |
| | | | | | | | | | Quantity 393794 | | | 1 393796 | Quantity 393798 |

FIG. 39-121

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 393800 | | | 0..1 393802 | QuantityRoleCode 393804 |
| | | | | | | | | | TypeCode 393806 | | | 0..1 393808 | QuantityTypeCode 393810 |
| | | | | | | | | TextCollection 393812 | | | | 0..1 393814 | ... |
| | | | | | | | | | TextCollection 393816 | | | 1 393818 | TextCollection 393820 |
| | | | | | | | | TransportationUnitResourceInformationAssignment 393822 | | | | 0..n 393824 | ... |
| | | | | | | | | | ShipmentRequestResourceInformationID 393826 | | | 1 393828 | ResourceInformationID 393830 |

FIG. 39-122

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | Quantity 393832 | | | 0..n 393834 | ... |
| | | | | | | | | | | Quantity 393836 | | 1 393838 | Quantity 393840 |
| | | | | | | | | | | RoleCode 393842 | | 0..1 393844 | QuantityRoleCode 393846 |
| | | | | | | | | | | TypeCode 393848 | | 0..1 393850 | QuantityTypeCode 393852 |
| | | | | | | | TransportationStageAssignment 393854 | | | | | 0..n 393856 | ... |
| | | | | | | | | ShipmentRequestTransportationStageID 393858 | | | | 1 393860 | TransportationStageID 393862 |

FIG. 39-123

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Quantity 393864 | | | | 0..n 393866 | ... |
| | | | | | | | | | Quantity 393868 | | | 1 393870 | Quantity 393872 |
| | | | | | | | | | RoleCode 393874 | | | 0..1 393876 | QuantityRoleCode 393878 |
| | | | | | | | | | TypeCode 393880 | | | 0..1 393882 | QuantityTypeCode 393884 |
| | | | | | | | TransportationUnitResourceInformationAssignment 393886 | | | | | 0..n 393888 | ... |
| | | | | | | | | ShipmentRequestResourceInformationID 393890 | | | | 1 393892 | ResourceInformationID 393894 |

FIG. 39-124

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Quantity 393896 | | | | 0..n 393898 | … |
| | | | | | | | | | Quantity 393900 | | | 1 393902 | Quantity 393904 |
| | | | | | | | | | RoleCode 393906 | | | 0..1 393908 | QuantityRoleCode 393910 |
| | | | | | | | | | TypeCode 393912 | | | 0..1 393914 | QuantityTypeCode 393916 |
| GovernmentalRequirementInformation 393918 | | | | | | | GovernmentalProcedure 393920 | | | | | 0..n 393922 | … |
| | | | | | | | | TransportationGovernmentAgencyTypeCode 393924 | | | | 0..1 393926 | TransportationGovernmentAgencyTypeCode 393928 |

FIG. 39-125

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationMovementTypeCode 393930 | | | | 0..1 393932 | TransportationMovementTypeCode 393934 |
| | | | | | | | | TransportationGovernmentAgencyInvolvementStatusCode 393936 | | | | 0..1 393938 | TransportationGovernmentAgencyInvolvementStatusCode 393940 |
| | | | | | | | | TransportationGovernmentAgencyActionCode 393942 | | | | 0..1 393944 | TransportationGovernmentAgencyActionCode 393946 |

FIG. 39-126

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationGovernmentAgencyProcedureStatusCode 393948 | | | | 0..1 393950 | TransportationGovernmentAgencyProcedureStatusCode 393952 |
| | | | | | | | | Location 393954 | | | | 0..n 393956 | ... |
| | | | | | | | | | Location 393958 | | | 1 393960 | BusinessTransactionDocumentLocation 393962 |
| | | | | | | | | | RoleCode 393964 | | | 1 393966 | LocationRoleCode 393968 |
| | | | | | | | | | TypeCode 393970 | | | 0..1 393972 | LocationTypeCode 393974 |
| | | | | | | | | | Name 393976 | | | 0..1 393978 | MEDIUM_Name 393980 |

FIG. 39-127

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTimePeriod 393982 | | | | 0..n 393984 | ... |
| | | | | | | | | | DateTimePeriod 393986 | | | 1 393988 | DateTimePeriod 393990 |
| | | | | | | | | | PeriodRoleCode 393992 | | | 1 393994 | PeriodRoleCode 393996 |
| | | | | | | | | Seal 393998 | | | | 0..n 394000 | ... |
| | | | | | | | | | ID 394002 | | | 1 394004 | SealID 394006 |
| | | | | | | | | | PartyRoleCode 394008 | | | 0..1 394010 | PartyRoleCode 394012 |
| | | | | | | | | | PartyFormattedName 394014 | | | 0..1 394016 | LONG_Name 394018 |

FIG. 39-128

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | StatusCode 394020 | | | 0..1 394022 | SealStatusCode 394024 |
| | | | | | | | | TextCollection 394026 | | | | 0..n 394028 | ... |
| | | | | | | | | | TextCollection 394030 | | | 0..1 394032 | TextCollection 394034 |
| | | | | | | | | TransportationDocumentInformation 394036 | | | | 0..n 394038 | ... |
| | | | | | | | | | TransportationDocumentTypeCode 394040 | | | 0..1 394042 | TransportationDocumentTypeCode 394044 |
| | | | | | | | | | TransportationDocumentNote 394046 | | | 0..1 394048 | SHORT_Note 394050 |

FIG. 39-129

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentID 394052 | | | 0..1 394054 | TransportationDocumentID 394056 |
| | | | | | | | | | TransportationDocumentStatusCode 394058 | | | 0..1 394060 | TransportationDocumentStatusCode 394062 |
| | | | | | | | | | LanguageCode 394064 | | | 0..1 394066 | LanguageCode 394068 |
| | | | | | | | | | CommunicationMediumTypeCode 394070 | | | 0..1 394072 | CommunicationMediumTypeCode 394074 |
| | | | | | | | | | RequiredIndicator 394076 | | | 1 394078 | Indicator 394080 |

FIG. 39-130

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | OutputCopyNumberValue 394082 | | | 0..1 394084 | NumberValue 394086 |
| | | | | | | | | | Output Original Number Value 394088 | | | 0..1 394090 | NumberValue 394092 |
| | | | | | | | | | DateTimePeriod 394094 | | | 0..n 394096 | ... |
| | | | | | | | | | | DateTimePeriod 394098 | | 1 394100 | DateTimePeriod 394102 |
| | | | | | | | | | | PeriodRoleCode 394104 | | 1 394106 | PeriodRoleCode 394108 |
| PartyInformation 394110 | | | | | | | Party 394112 | | | | | 0..n 394114 | ... |

FIG. 39-131

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Party 394116 | | | | 1 394118 | BusinessTransactionDocumentParty 394120 |
| | | | | | | | | RoleCode 394122 | | | | 1 394124 | PartyRoleCode 394126 |
| | | | | | | | | FormattedName 394128 | | | | 0..1 394130 | LONG_Name 394132 |
| | | | | | | | | DateTimePeriods 394134 | | | | 0..n 394136 | ... |
| | | | | | | | | | RequestedFulfillmentPeriod 394138 | | | 0..1 394140 | DateTimePeriod 394142 |
| | | | | | | | | | AcceptableFulfillmentPeriod 394144 | | | 0..1 394146 | DateTimePeriod 394148 |

FIG. 39-132

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 394150 | | | 1 394152 | PeriodRoleCode 394154 |
| LocationInformation 394156 | | | | | | | Location 394158 | | | | | 0..n 394160 | ... |
| | | | | | | | | Location 394162 | | | | 1 394164 | BusinessTransactionDocumentLocation 394166 |
| | | | | | | | | RoleCode 394168 | | | | 1 394170 | LocationRoleCode 394172 |
| | | | | | | | | TypeCode 394174 | | | | 0..1 394176 | LocationTypeCode 394178 |
| | | | | | | | | Name 394180 | | | | 0..1 394182 | MEDIUM_Name 394184 |
| | | | | | | | | DateTimePeriods 394186 | | | | 0..n 394188 | ... |

FIG. 39-133

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RequestedFulfillmentPeriod 394190 | | | 0..1 394192 | DateTimePeriod 394194 |
| | | | | | | | | | AcceptableFulfillmentPeriod 394196 | | | 0..1 394198 | DateTimePeriod 394200 |
| | | | | | | | | | PeriodRoleCode 394202 | | | 1 394204 | PeriodRoleCode 394206 |
| TransportationGoodsInformation 394208 | | | | | | | ProductInformation 394210 | | | | | 0..n 394212 | ... |
| | | | | | | | | Product 394214 | | | | 0..1 394216 | BusinessTransactionDocumentProduct 394218 |
| | | | | | | | | ProductDescription 394220 | | | | 0..1 394222 | SHORT_Description 394224 |

FIG. 39-134

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGoodsIdentification 394226 | | | | | 0..n 394228 | ... |
| | | | | | | | | TransportationGoodsIdentifierTypeCode 394230 | | | | 1 394232 | TransportationGoodsIdentifierTypeCode 394234 |
| | | | | | | | | LowerBoundaryTransportationGoodsID 394236 | | | | 1 394238 | TransportationGoodsID 394240 |
| | | | | | | | | UpperBoundaryTransportationGoodsID 394242 | | | | 0..1 394244 | TransportationGoodsID 394246 |

FIG. 39-135

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationChargesInformation 394248 | | | | | | TransportationChargesInformation 394250 | | | | | | 0..n 394252 | ... |
| | | | | | | | TransportationChargesUsageCode 394254 | | | | | 1 394256 | TransportationChargesUsageCode 394258 |
| | | | | | | | ShipmentRequestItemID 394260 | | | | | 0..1 394262 | BusinessTransactionDocumentItemID 394264 |
| | | | | | | | ShipmentRequestPartyStandardID 394266 | | | | | 0..1 394268 | PartyStandardID 394270 |
| | | | | | | | ShipmentRequestPartyInternalID 394272 | | | | | 0,,1 394274 | PartyInternalID 394276 |

FIG. 39-136

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ShipmentRequestResourceInformationID 394278 | | | | | 0..1 394280 | ResourceInformationID 394282 |
| | | | | | | | ShipmentRequestPackageInformationID 394284 | | | | | 0..1 394286 | PackageInformationID 394288 |
| | | | | | | | ShipmentRequestTransportationStageID 394290 | | | | | 0..1 394292 | TransportationStageID 394294 |
| | | | | | | | TransportationCharges 394296 | | | | | 0..1 394298 | ... |
| | | | | | | | | ID 394300 | | | | 1 394302 | TransportationChargesID 394304 |

FIG. 39-137

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | FreightAgreementID 394306 | | | | 1 394308 | FreightAgreementID 394310 |
| | | | | | | | | OriginCode 394312 | | | | 0..1 394314 | TransportationChargesOriginCode 394316 |
| | | | | | | | | TariffID 394318 | | | | 0..1 394320 | TransportationChargesTariffID 394322 |
| | | | | | | | | CalculationSheetID 394324 | | | | 1 394326 | TransportationChargesCalculationSheetID 394328 |
| | | | | | | | | Location 394330 | | | | 0..n 394332 | ... |
| | | | | | | | | | Location 394334 | | | 1 394336 | BusinessTransactionDocumentLocation 394338 |
| | | | | | | | | | RoleCode 394340 | | | 1 394342 | LoactionRoleCode 394344 |

FIG. 39-138

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 394346 | | | 0..1 394348 | LocationTypeCode 394350 |
| | | | | | | | | | Name 394352 | | | 0..1 394354 | MEDIUM_Name 394356 |
| | | | | | | | | | DateTimePeriods 394358 | | | 0..n 394360 | ... |
| | | | | | | | | | | RequestedFulfillmentPeriod 394362 | | 0..1 394364 | DateTimePeriod 394366 |
| | | | | | | | | | | AcceptableFulfillmentPeriod 394368 | | 0..1 394370 | DateTimePeriod 394372 |
| | | | | | | | | | | PeriodRoleCode 394374 | | 1 394376 | PeriodRoleCode 394378 |
| | | | | | | | | TextCollection 394380 | | | | 0..1 394382 | ... |

FIG. 39-139

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TextCollection 394384 | | | 1 394386 | TextCollection 394388 |
| | | | | | | | | Currency 394390 | | | | 0..n 394392 | ... |
| | | | | | | | | | Code 394394 | | | 1 394396 | CurrencyCode 394398 |
| | | | | | | | | | RoleCode 394400 | | | 1 394402 | CurrencyRoleCode 394404 |
| | | | | | | | | | UsageCode 394406 | | | 0..1 394408 | CurrencyUsageCode 394410 |
| | | | | | | | | ExchangeRate 394412 | | | | 0..n 394414 | ... |
| | | | | | | | | | ExchangeRate 394416 | | | 1 394418 | ExchangeRate 394420 |
| | | | | | | | | | TypeCode 394422 | | | 0..1 394424 | ExchangeRateTypeCode 394426 |

FIG. 39-140

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Percent Element 394428 | | | | 0..n 394430 | ... |
| | | | | | | | | | Percent RoleCode 394432 | | | 1 394434 | PercentRoleCode 394436 |
| | | | | | | | | | Percent 394438 | | | 1 394440 | Percent 394442 |
| | | | | | | | | | TransportationChargesPercentCalculationBaseCode 394444 | | | 0..1 394446 | TransportationChargesPercentCalculationBaseCode 394448 |
| | | | | | | | | | StatusCode 394450 | | | 0..1 394452 | TransportationChargesPercentElementStatusCode 394454 |
| | | | | | | | | DateTimePeriod 394456 | | | | 0..n 394458 | ... |

FIG. 39-141

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTimePeriod 394460 | | | 1 394462 | DateTimePeriod 394464 |
| | | | | | | | | | PeriodRoleCode 394466 | | | 1 394468 | PeriodRoleCode 394470 |
| | | | | | | | | BusinessTransactionDocumentReference 394472 | | | | 0..n 394474 | ... |
| | | | | | | | | | BusinessTransactionDocumentReference 394476 | | | 0..1 394478 | BusinessTransactionDocumentReference 394480 |

FIG. 39-142

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipRoleCode 394482 | | | 0..1 394484 | BusinessTransactionDocumentRelationshipRoleCode 394486 |
| | | | | | | | | | BusinessTransactionDocumentRelationshipTypeCode 394488 | | | 0..1 394490 | BusinessTransactionDocumentRelationshipTypeCode 394492 |
| | | | | | | | | | TransportationDocumentTypeCode 394494 | | | 0..1 394496 | TransportationDocumentTypeCode 394498 |
| | | | | | | | | | TransportationDocumentNote 394500 | | | 0..1 394502 | SHORT_Note 394504 |

FIG. 39-143

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentID 394506 | | | 0..1 394508 | TransportationDocumentID 394510 |
| | | | | | | | | TaxDetail 394512 | | | | 0..n 394514 | ... |
| | | | | | | | | | ProductTax 394516 | | | 1 394518 | ProductTax 394520 |
| | | | | | | | | PaymentInstruction 394522 | | | | 0..n 394524 | ... |
| | | | | | | | | | PaymentInstruction 394526 | | | 1 394528 | PaymentInstruction 394530 |
| | | | | | | | | | TransportationChargesElementCategoryCode 394532 | | | 0..1 394534 | TransportationChargesElementCategoryCode 394536 |

FIG. 39-144

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementSubCategoryCode 394538 | | | 0..1 394540 | TransportationChargesElementSubCategoryCode 394542 |
| | | | | | | | | | TransportationChargesPaymentArrangementCode 394544 | | | 0..1 394546 | TransportationChargesPaymentArrangementCode 394548 |
| | | | | | | | | CashDiscountTerms 394550 | | | | 0..1 394552 | ... |
| | | | | | | | | | CashDiscountTerms 394554 | | | 1 394556 | CashDiscountTerms 394558 |

FIG. 39-145

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementCategoryCode 394560 | | | 0..1 394562 | TransportationChargesElementCategoryCode 394564 |
| | | | | | | | | | TransportationChargesElementSubCategoryCode 394566 | | | 0..1 394568 | TransportationChargesElementSubCategoryCode 394570 |
| | | | | | | | | Element 394572 | | | | 0..n 394574 | ... |
| | | | | | | | | | CategoryCode 394576 | | | 1 394578 | TransportationChargesElementCategoryCode 394580 |
| | | | | | | | | | SubCategoryCode 394582 | | | 1 394584 | TransportationChargesElementSubCategoryCode 394586 |

FIG. 39-146

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 394588 | | | 1 394590 | TransportationChargesElementTypeCode 394592 |
| | | | | | | | | | CalculationResolutionCode 394594 | | | 1 394596 | TransportationChargesElementCalculationResolutionCode 394598 |
| | | | | | | | | | TransportationChargesPaymentArrangementCode 394600 | | | 0...1 394602 | TransportationChargesPaymentArrangementCode 394604 |
| | | | | | | | | | Location 394606 | | | 0..n 394608 | ... |
| | | | | | | | | | | Location 394610 | | 1 394612 | BusinessTransactionDocumentLocation 394614 |
| | | | | | | | | | | RoleCode 394616 | | 1 394618 | LocationRoleCode 394620 |

FIG. 39-147

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TypeCode 394622 | | 0..1 394624 | LocationTypeCode 394626 |
| | | | | | | | | | | Name 394628 | | 0..1 394630 | MEDIUM_Name 394632 |
| | | | | | | | | | | DateTimePeriods 394634 | | 0..n 394636 | ... |
| | | | | | | | | | | | RequestedFulfillmentPeriod 394638 | 0..1 394640 | DateTimePeriod 394642 |
| | | | | | | | | | | | AcceptableFulfillmentPeriod 394644 | 0..1 394646 | DateTimePeriod 394648 |
| | | | | | | | | | | | PeriodRoleCode 394650 | 1 394652 | PeriodRoleCode 394654 |
| | | | | | | | | | TextCollection 394656 | | | 0..1 394658 | ... |

FIG. 39-148

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TextCollection 394660 | | 1 394662 | TextCollection 394664 |
| | | | | | | | | | Currency 394666 | | | 0..n 394668 | ... |
| | | | | | | | | | | Code 394670 | | 1 394672 | CurrencyCode 394674 |
| | | | | | | | | | | RoleCode 394676 | | 1 394678 | CurrencyRoleCode 394680 |
| | | | | | | | | | | UsageCode 394682 | | 0..1 394684 | CurrencyUsageCode 394686 |
| | | | | | | | | | RateElement 394688 | | | 0..n 394690 | ... |
| | | | | | | | | | | ID 394692 | | 1 394694 | TransportationChargesElementRateElementID 394696 |
| | | | | | | | | | | Amount 394698 | | 1 394700 | Amount 394702 |

FIG. 39-149

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | BaseQuantity 394704 | | 1 394706 | Quantity 394708 |
| | | | | | | | | | | TransportationChargesRateTypeCode 394710 | | 0..1 394712 | TransportationChargesRateTypeCode 394714 |
| | | | | | | | | | | TransportationChargesRateRoleCode 394716 | | 1 394718 | TransportationChargesRateRoleCode 394720 |
| | | | | | | | | | | TransportationChargesRateElementStatusCode 394722 | | 0..1 394724 | TransportationChargesRateElementStatusCode 394726 |
| | | | | | | | | | PercentElement 394728 | | | 0..n 394730 | ... |

FIG. 39-150

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PercentRoleCode 394732 | | 1 394734 | PercentRoleCode 394736 |
| | | | | | | | | | | Percent 394738 | | 1 394740 | Percent 394742 |
| | | | | | | | | | | TransportationChargesPercentCalculationBaseCode 394744 | | 0..1 394746 | TransportationChargesPercentCalculationBaseCode 394748 |
| | | | | | | | | | | StatusCode 394750 | | 0..1 394752 | TransportationChargesPercentElementStatusCode 394754 |
| | | | | | | | | | AmountElement 394756 | | | 0..n 394758 | ... |
| | | | | | | | | | | Amount 394760 | | 1 394762 | Amount 394764 |

FIG. 39-151

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | AmountRoleCode 394766 | | 1 394768 | AmountRoleCode 394770 |
| | | | | | | | | | | TransportationChargesAmountElementStatusCode 394772 | | 0..1 394774 | TransportationChargesAmountElementStatusCode 394776 |
| | | | | | | | | | | RateElementAssignment 394778 | | 0..n 394780 | ... |
| | | | | | | | | | | | TransportationChargesElementRateElementID 394782 | 1 394784 | TransportationChargesElementRateElementID 394786 |
| | | | | | | | | | CalculationBase 394788 | | | 0..n 394790 | ... |

FIG. 39-152

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesElementCalculationBaseCode 394792 | | 1 394794 | TransportationChargesElementCalculationBaseCode 394796 |
| | | | | | | | | | | BaseQuantity 394798 | | 0..1 394800 | Quantity 394802 |
| | | | | | | | | | | BaseQuantityRoleCode 394804 | | 0..1 394806 | QuantityRoleCode 394808 |
| | | | | | | | | | | BaseQuantityTypeCode 394810 | | 0..1 394812 | QuantityTypeCode 394814 |
| | | | | | | | | | TaxDetail 394816 | | | 0..n 394818 | ... |
| | | | | | | | | | | ProductTax 394820 | | 1 394822 | ProductTax 394824 |

FIG. 39-153

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTimePeriod 394826 | | | 0..n 394828 | ... |
| | | | | | | | | | | DateTimePeriod 394830 | | 1 394832 | DateTimePeriod 394834 |
| | | | | | | | | | | PeriodRoleCode 394836 | | 1 394838 | PeriodRoleCode 394840 |
| | | | | | | | | | CostDistribution 394842 | | | 0..n 394844 | ... |
| | | | | | | | | | | AccountingCodingBlockAssignment 394846 | | 1 394848 | AccountingCodingBlockAssignment 394850 |

FIG. 40-1

| Package | level1 | level2 | level3 | level4 | level5 | level6 | Cardinality | Data Type Name |
|---|---|---|---|---|---|---|---|---|
| FreightRequestConfirmationReceiptNotificationMessage 40000 | FreightRequest-ConfirmationReceiptNotification-Message 40002 | | | | | | | FreightRequestConfirmationReceiptNotificationMessage 40004 |
| MessageHeader 40006 | | Message-Header 40008 | | | | | 1 40010 | BusinessDocument-MessageHeader 40012 |
| FreightRequest 40014 | | FreightRe-quest 40016 | | | | | 1 40018 | ... |
| | | | ID 40020 | | | | 1 40022 | BusinessTransaction-DocumentID 40024 |
| Confirmation 40026 | | | Confirmation 40028 | | | | 1 40030 | ... |

FIG. 40-2

| Package | level1 | level2 | level3 | level4 | level5 | level6 | Cardinality | Data Type Name |
|---|---|---|---|---|---|---|---|---|
| HeaderInformation 40032 | | | | DateTimePeriods 40034 | | | 0..n 40036 | ... |
| | | | | | RequestedFulfill-mentPeriod 40038 | | 0..1 40040 | DateTimePeriod 40042 |
| | | | | | AcceptableFulfill-mentPeriod 40044 | | 0..1 40046 | DateTimePeriod 40048 |
| | | | | | PeriodRoleCode 40050 | | 1 40052 | PeriodRoleCode 40054 |
| | | | | TextCollection 40056 | | | 0..1 40058 | |
| | | | | | TextCollection 40060 | | 1 40062 | TextCollection 40064 |

FIG. 40-3

| Package | level1 | level2 | level3 | level4 | level5 | level6 | Cardinality | Data Type Name |
|---|---|---|---|---|---|---|---|---|
| | | | | BusinessTrans-actionDocumen-tReference 40066 | | | 0..n 40068 | ... |
| | | | | | BusinessTransac-tionDocumentRefer-ence 40070 | | 0..1 40072 | BusinessTransaction-DocumentReference 40074 |
| | | | | | BusinessTransac-tionDocumentRela-tionshipRoleCode 40076 | | 0..1 40078 | BusinessTransaction-DocumentRelationshi-pRoleCode 40080 |
| | | | | | BusinessTransac-tionDocumentRela-tionshipTypeCode 40082 | | 0..1 40084 | BusinessTransaction-DocumentRelation-shipTypeCode 40086 |
| | | | | | TransportationDocu-mentTypeCode 40088 | | 0..1 40090 | TransportationDocu-mentTypeCode 40092 |

FIG. 40-4

| Package | level1 | level2 | level3 | level4 | level5 | level6 | Cardinality | Data Type Name |
|---|---|---|---|---|---|---|---|---|
| | | | | | TransportationDocumentNote 40094 | | 0..1 40096 | SHORT_Note 40098 |
| | | | | | TransportationDocumentID 40100 | | 0..1 40102 | TransportationDocumentID 40104 |
| | | | | | DateTimePeriod 40106 | | 0..n 40108 | ... |
| | | | | | | DateTimePeriod 40110 | 1 40112 | DateTimePeriod 40114 |
| | | | | | | PeriodRoleCode 40116 | 1 40118 | PeriodRoleCode 40120 |
| PartyInformation 40122 | | | | Party 40124 | | | 0..n 40126 | ... |

FIG. 40-5

| Package | level1 | level2 | level3 | level4 | level5 | level6 | Cardinality | Data Type Name |
|---|---|---|---|---|---|---|---|---|
| | | | | | Party 40128 | | 1 40130 | BusinessTransaction-DocumentParty 40132 |
| | | | | | RoleCode 40134 | | 1 40136 | PartyRoleCode 40138 |

FIG. 41-1

| Package | level1 | level2 | level3 | level4 | level5 | level6 | Cardinality | Data Type Name |
|---|---|---|---|---|---|---|---|---|
| FreightRequestReceiptNotificationMessage 41000 | FreightRequestReceiptNotification-Message 41002 | | | | | | | FreightRequestReceiptNotificationMessage 41004 |
| MessageHeader 41006 | | Message-Header 41008 | | | | | 1 41010 | BusinessDocumentMessage-Header 41012 |
| FreightRequest 41014 | | FreightRequest 41016 | | | | | 1 41018 | ... |
| | | | ID 41020 | | | | 1 41022 | BusinessTransactionDocumentID 41024 |
| Request 41026 | | | Request 41028 | | | | 1 41030 | ... |

FIG. 41-2

| Package | level1 | level2 | level3 | level4 | level5 | level6 | Cardinality | Data Type Name |
|---|---|---|---|---|---|---|---|---|
| HeaderInformation 41032 | | | | DateTimePeriods 41034 | | | 0..n 41036 | ... |
| | | | | | PeriodRoleCode 41038 | | 1 41040 | PeriodRoleCode 41042 |
| | | | | | RequestedDateTimePeriod 41044 | | 0..1 41046 | DateTimePeriod 41048 |
| | | | | | AcceptableDateTimePeriod 41050 | | 0..1 41052 | DateTimePeriod 41054 |
| | | | | TextCollection 41056 | | | 0..1 41058 | ... |
| | | | | | TextCollection 41060 | | 1 41062 | TextCollection 41064 |

FIG. 41-3

| Package | level1 | level2 | level3 | level4 | level5 | level6 | Cardinality | Data Type Name |
|---|---|---|---|---|---|---|---|---|
| | | | | BusinessTransactionDocumentReference 41066 | | | 0..n 41068 | ... |
| | | | | | BusinessTransactionDocumentReference 41070 | | 0..1 41072 | BusinessTransactionDocumentReference 41074 |
| | | | | | BusinessTransactionDocumentRelationshipRoleCode 41076 | | 0..1 41078 | BusinessTransactionDocumentRelationshipRoleCode 41080 |
| | | | | | BusinessTransactionDocumentRelationshipTypeCode 41082 | | 0..1 41084 | BusinessTransactionDocumentRelationshipTypeCode 41086 |
| | | | | | TransportationDocumentTypeCode 41088 | | 0..1 41090 | TransportationDocumentTypeCode 41092 |

FIG. 41-4

| Package | level1 | level2 | level3 | level4 | level5 | level6 | Cardinality | Data Type Name |
|---|---|---|---|---|---|---|---|---|
| | | | | | TransportationDocument-Note 41094 | | 0..1 41096 | SHORT_Note 41098 |
| | | | | | TransportationDocumentID 41100 | | 0..1 41102 | TransportationDocumentID 41104 |
| | | | | | DateTimePeriod 41106 | | 0..n 41108 | ... |
| | | | | | | DateTimePeriod 41110 | 1 41112 | DateTimePeriod 41114 |
| | | | | | | PeriodRoleCode 41116 | 1 41118 | PeriodRoleCode 41120 |
| PartyInformation 41122 | | | | Party 41124 | | | 0..n 41126 | ... |

FIG. 41-5

| Package | level1 | level2 | level3 | level4 | level5 | level6 | Cardinality | Data Type Name |
|---|---|---|---|---|---|---|---|---|
| | | | | | Party 41128 | | 1 41130 | BusinessTransactionDocumentParty 41132 |
| | | | | | RoleCode 41134 | | 1 41136 | PartyRoleCode 41138 |

FIG. 42-1

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| FreightRequestRequestMessage 420000 | FreightRequestRequestMessage 420002 | | | | | | | | | | | | FreightRequestRequestMessage 420004 |
| MessageHeader 420006 | | MessageHeader 420008 | | | | | | | | | | 1..1 420010 | BusinessDocumentMessageHeader 420012 |
| FreightRequest 420014 | | FreightRequest 420016 | | | | | | | | | | 1..1 420018 | ... |
| | | | @actioncode 420020 | | | | | | | | | 1..1 420022 | ActionCode 420024 |
| | | | ID 420026 | | | | | | | | | 1..1 420028 | BusinessTransactionDocumentID 420030 |
| Request 420032 | | | Request 420034 | | | | | | | | | 1..1 420036 | ... |

FIG. 42-2

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| HeaderInformation 420038 | | | | | | | | | | | | | |
| | | | | DateTimePeriods 420040 | | | | | | | | 0..n 420042 | ... |
| | | | | | RequestedFulfillmentPeriod 420044 | | | | | | | 0..1 420046 | DateTimePeriod 420048 |
| | | | | | AcceptableFulfillmentPeriod 420050 | | | | | | | 0..1 420052 | DateTimePeriod 420054 |
| | | | | | PeriodRoleCode 420056 | | | | | | | 1..1 420058 | PeriodRoleCode 420060 |
| | | | | NatureOfCargo 420062 | | | | | | | | 0..n 420064 | ... |
| | | | | | ClassificationCode 420066 | | | | | | | 1..1 420068 | NatureOfCargoClassificationCode 420070 |
| | | | | TotalQuantity 420072 | | | | | | | | 0..n 420074 | ... |

FIG. 42-3

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | Quantity 420076 | | | | | | | 1 420078 | Quantity 420080 |
| | | | | | RoleCode 420082 | | | | | | | 0..1 420084 | QuantityRoleCode 420086 |
| | | | | | TypeCode 420088 | | | | | | | 0..1 420090 | QuantityTypeCode 420092 |
| | | | | TotalAmount 420094 | | | | | | | | 0..n 420096 | ... |
| | | | | | Amount 420098 | | | | | | | 1..1 420100 | Amount 420102 |
| | | | | | RoleCode 420104 | | | | | | | 1..1 420106 | AmountRoleCode 420108 |
| | | | | TextCollection 420110 | | | | | | | | 0..1 420112 | ... |
| | | | | | TextCollection 420114 | | | | | | | 1..1 420116 | TextCollection 420118 |

FIG. 42-4

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | BusinessTransactionDocumentReference 420120 | | | | | | | | 0..n 420122 | ... |
| | | | | | BusinessTransactionDocumentReference 420124 | | | | | | | 0..1 420126 | BusinessTransactionDocumentReference 420128 |
| | | | | | BusinessTransactionDocumentRelationshipRoleCode 420130 | | | | | | | 0..1 420132 | BusinessTransactionDocumentRelationshipRoleCode 420134 |
| | | | | | BusinessTransactionDocumentRelationshipTypeCode 420136 | | | | | | | 0..1 420138 | BusinessTransactionDocumentRelationshipTypeCode 420140 |

FIG. 42-5

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationDocumentTypeCode 420142 | | | | | | | 0..1 420144 | TransportationDocumentTypeCode 420146 |
| | | | | | TransportationDocumentNote 420148 | | | | | | | 0..1 420150 | SHORT_Note 420152 |
| | | | | | TransportationDocumentID 420154 | | | | | | | 0..1 420156 | TransportationDocumentID 420158 |
| | | | | | DateTimePeriod 420160 | | | | | | | 0..n 420162 | ... |
| | | | | | | DateTimePeriod 420164 | | | | | | 1..1 420166 | DateTimePeriod 420168 |
| | | | | | | PeriodRoleCode 420170 | | | | | | 1..1 420172 | PeriodRoleCode 420174 |

FIG. 42-6

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| GovernmentalRequirementInformation 420176 | | | | GovernmentalProcedure 420178 | | | | | | | | 0..n 420180 | ... |
| | | | | | TransportationGovernmentAgencyTypeCode 420182 | | | | | | | 0..1 420184 | TransportationGovernmentAgencyTypeCode 420186 |
| | | | | | TransportationMovementTypeCode 420188 | | | | | | | 0..1 420190 | TransportationMovementTypeCode 420192 |
| | | | | | TransportationGovernmentAgencyInvolvementStatusCode 420194 | | | | | | | 0..1 420196 | TransportationGovernmentAgencyInvolvementStatusCode 420198 |

FIG. 42-7

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationGovernmentAgencyActionCode 420200 | | | | | | | 0..1 420202 | TransportationGovernmentAgencyActionCode 420204 |
| | | | | | TransportationGovernmentAgencyProcedureStatusCode 420206 | | | | | | | 0..1 420208 | TransportationGovernmentAgencyProcedureStatusCode 420210 |
| | | | | | Location 420212 | | | | | | | 0..n 420214 | ... |
| | | | | | | Location 420216 | | | | | | 1..1 420218 | BusinessTransactionDocumentLocation 420220 |
| | | | | | | RoleCode 420222 | | | | | | 1..1 420224 | LocationRoleCode 420226 |

FIG. 42-8

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TypeCode 420228 | | | | | | 0..1 420230 | LocationTypeCode 420232 |
| | | | | | | Name 420234 | | | | | | 0..1 420236 | MEDIUM_Name 420238 |
| | | | | | DateTimePeriod 420240 | | | | | | | 0..n 420242 | ... |
| | | | | | | DateTimePeriod 420244 | | | | | | 1..1 420246 | DateTimePeriod 420248 |
| | | | | | | PeriodRoleCode 420250 | | | | | | 1..1 420252 | PeriodRoleCode 420254 |
| | | | | | Seal 420256 | | | | | | | 0..n 420258 | ... |
| | | | | | | ID 420260 | | | | | | 0..1 420262 | SealID 420264 |
| | | | | | | PartyRoleCode 420266 | | | | | | 0..1 420268 | PartyRoleCode 420270 |

FIG. 42-9

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | PartyFormattedName 420272 | | | | | | 0..1 420274 | LONG_Name 420276 |
| | | | | | | StatusCode 420278 | | | | | | 0..1 420280 | SealStatusCode 420282 |
| | | | | | TextCollection 420284 | | | | | | | 0..1 420286 | ... |
| | | | | | | TextCollection 420288 | | | | | | 1..1 420290 | TextCollection 420292 |
| | | | | | TransportationDocumentInformation 420294 | | | | | | | 0..n 420296 | ... |
| | | | | | | TransportationDocumentTypeCode 420298 | | | | | | 0..1 420300 | TransportationDocumentTypeCode 420302 |

FIG. 42-10

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentNote 420304 | | | | | | 0..1 420306 | SHORT_Note 420308 |
| | | | | | | TransportationDocumentID 420310 | | | | | | 0..1 420312 | TransportationDocumentID 420314 |
| | | | | | | TransportationDocumentStatusCode 420316 | | | | | | 0..1 420318 | TransportationDocumentStatusCode 420320 |
| | | | | | | LanguageCode 420322 | | | | | | 0..1 420324 | LanguageCode 420326 |
| | | | | | | CommunicationMediumTypeCode 420328 | | | | | | 0..1 420330 | CommunicationMediumTypeCode 420332 |
| | | | | | | RequiredIndicator 420334 | | | | | | 1 420336 | Indicator 420338 |

FIG. 42-11

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | OutputCopyNumberValue 420340 | | | | | | 0..1 420342 | NumberValue 420344 |
| | | | | | | OutputOriginalNumberValue 420346 | | | | | | 0..1 420348 | NumberValue 420350 |
| | | | | | | DateTime Period 420352 | | | | | | 0..n 420354 | ... |
| | | | | | | | DateTime Period 420356 | | | | | 1..1 420358 | DateTimePeriod 420360 |
| | | | | | | | PeriodRoleCode 420362 | | | | | 1..1 420364 | PeriodRoleCode 420366 |
| PartyInformation 420368 | | | | Party 420370 | | | | | | | | 0..n 420372 | ... |
| | | | | | Party 420374 | | | | | | | 1 420376 | BusinessTransactionDocumentParty 420378 |

FIG. 42-12

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | RoleCode 420380 | | | | | | | 1 420382 | PartyRoleCode 420384 |
| | | | | | FormattedName 420386 | | | | | | | 0..1 420388 | LONG_Name 420390 |
| | | | | | BusinessTransactionDocumentReference 420392 | | | | | | | 0..n 420394 | ... |
| | | | | | | BusinessTransactionDocumentReference 420396 | | | | | | 0..1 420398 | BusinessTransactionDocumentReference 420400 |
| | | | | | | BusinessTransactionDocumentRelationshipRoleCode 420402 | | | | | | 0..1 420404 | BusinessTransactionDocumentRelationshipRoleCode 420406 |

FIG. 42-13

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 420408 | | | | | | 0..1 420410 | BusinessTransactionDocumentRelationshipTypeCode 420412 |
| | | | | | | TransportationDocumentTypeCode 420414 | | | | | | 0..1 420416 | TransportationDocumentTypeCode 420418 |
| | | | | | | TransportationDocumentNote 420420 | | | | | | 0..1 420422 | SHORT_Note 420424 |
| | | | | | | TransportationDocumentID 420426 | | | | | | 0..1 420428 | TransportationDocumentID 420430 |
| | | | | | | DateTimePeriod 420432 | | | | | | 0..n 420434 | ... |
| | | | | | | | DateTimePeriod 420436 | | | | | 1 420438 | DateTimePeriod 420440 |

FIG. 42-14

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PeriodRoleCode 420442 | | | | | 1 420444 | PeriodRoleCode 420446 |
| TransportationStageInformation 420448 | | | | TransportationStage 420450 | | | | | | | | 0..n 420452 | ... |
| | | | | | ID 420454 | | | | | | | 1 420456 | TransportationStageID 420458 |
| | | | | | OrdinalNumberValue 420460 | | | | | | | 0..1 420462 | OrdinalNumberValue 420464 |
| | | | | | TypeCode 420466 | | | | | | | 0..1 420468 | TransportationStageTypeCode 420470 |
| | | | | | JourneyID 420472 | | | | | | | 0..1 420474 | JourneyID 420476 |
| | | | | | TransportModeCode 420478 | | | | | | | 0..1 420480 | TransportModeCode 420482 |

FIG. 42-15

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportMeansDescriptionCode 420484 | | | | | | | 0..1 420486 | TransportMeansDescriptionCode 420488 |
| | | | | | TransportMeansDescription 420490 | | | | | | | 0..1 420492 | SHORT_Description 420494 |
| | | | | | TransportMeansID 420496 | | | | | | | 0..1 420498 | TransportMeansID 420500 |
| | | | | | TransportMeansHomeCountryCode 420502 | | | | | | | 0..1 420504 | CountryCode 420506 |
| | | | | | TransportMeansOwnershipTypeCode 420508 | | | | | | | 0..1 420510 | TransportMeansOwnershipTypeCode 420512 |

FIG. 42-16

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | CarrierStandardID 420514 | | | | | | | 0..1 420516 | PartyStandardID 420518 |
| | | | | | CarrierFormattedName 420520 | | | | | | | 0..1 420522 | LONG_Name 420524 |
| | | | | | TransportationTransitDirectionCode 420526 | | | | | | | 0..1 420528 | TransportationTransitDirectionCode 420530 |
| | | | | | CalculatedDistanceMeasure 420532 | | | | | | | 0..1 420534 | Measure 420536 |
| | | | | | GivenDistanceMeasure 420538 | | | | | | | 0..1 420540 | Measure 420542 |
| | | | | | ContactInformation 420544 | | | | | | | 0..n 420546 | ... |

FIG. 42-17

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ContactPersonFunctionTypeCode 420548 | | | | | | 1..1 420550 | ContactPersonFunctionTypeCode 420552 |
| | | | | | | Address 420554 | | | | | | 1..1 420556 | Address 420558 |
| | | | | | Quantity 420560 | | | | | | | 0..n 420562 | ... |
| | | | | | | Quantity 420564 | | | | | | 1 420566 | Quantity 420568 |
| | | | | | | RoleCode 420570 | | | | | | 0..1 420572 | QuantityRoleCode 420574 |
| | | | | | | TypeCode 420576 | | | | | | 0..1 420578 | QuantityTypeCode 420580 |
| | | | | | Party 420582 | | | | | | | 1..n 420584 | ... |

FIG. 42-18

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Party 420586 | | | | | | 1 420588 | BusinessTransactionDocumentParty 420590 |
| | | | | | | RoleCode 420592 | | | | | | 1 420594 | PartyRoleCode 420596 |
| | | | | | | FormattedName 420598 | | | | | | 0..1 420600 | LONG_Name 420602 |
| | | | | | | TransportationDocumentInformation 420604 | | | | | | 0..n 420606 | ... |
| | | | | | | | TransportationDocumentTypeCode 420608 | | | | | 0..1 420610 | TransportationDocumentTypeCode 420612 |
| | | | | | | | TransportationDocumentNote 420614 | | | | | 0..1 420616 | SHORT_Note 420618 |

FIG. 42-19

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentID 420620 | | | | | 0..1 420622 | TransportationDocumentID 420624 |
| | | | | | | | TransportationDocumentStatusCode 420626 | | | | | 0..1 420628 | TransportationDocumentStatusCode 420630 |
| | | | | | | | LanguageCode 420632 | | | | | 0..1 420634 | LanguageCode 420636 |
| | | | | | | | CommunicationMediumTypeCode 420638 | | | | | 0..1 420640 | CommunicationMediumTypeCode 420642 |
| | | | | | | | RequiredIndicator 420644 | | | | | 1 420646 | Indicator 420648 |
| | | | | | | | OutputCopyNumberValue 420650 | | | | | 0..1 420652 | NumberValue 420654 |

FIG. 42-20

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputOriginalNumberValue 420656 | | | | | 0..1 420658 | NumberValue 420660 |
| | | | | | | | DateTimePeriod 420662 | | | | | 0..n 420664 | ... |
| | | | | | | | | DateTimePeriod 420666 | | | | 1 420668 | DateTimePeriod 420670 |
| | | | | | | | | PeriodRoleCode 420672 | | | | 1 420674 | PeriodRoleCode 420676 |
| | | | | | | BusinessTransactionDocumentReference 420678 | | | | | | 0..n 420680 | ... |
| | | | | | | | BusinessTransactionDocumentReference 420682 | | | | | 0..1 420684 | BusinessTransactionDocumentReference 420686 |

FIG. 42-21

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentRelationshipRoleCode 420688 | | | | | 0..1 420690 | BusinessTransactionDocumentRelationshipRoleCode 420692 |
| | | | | | | | BusinessTransactionDocumentRelationshipTypeCode 420694 | | | | | 0..1 420696 | BusinessTransactionDocumentRelationshipTypeCode 420698 |
| | | | | | | | TransportationDocumentTypeCode 420700 | | | | | 0..1 420702 | TransportationDocumentTypeCode 420704 |
| | | | | | | | TransportationDocumentNote 420706 | | | | | 0..1 420708 | SHORT_Note 420710 |
| | | | | | | | TransportationDocumentID 420712 | | | | | 0..1 420714 | TransportationDocumentID 420716 |

FIG. 42-22

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTime Period 420718 | | | | | 0..n 420720 | ... |
| | | | | | | | | DateTime Period 420722 | | | | 1..1 420724 | DateTimePeriod 420726 |
| | | | | | | | | PeriodRoleCode 420728 | | | | 1..1 420730 | PeriodRoleCode 420732 |
| | | | | | Location 420734 | | | | | | | 1..n 420736 | ... |
| | | | | | | Location 420738 | | | | | | 1 420740 | BusinessTransactionDocumentLocation 420742 |
| | | | | | | RoleCode 420744 | | | | | | 1 420746 | LocationRoleCode 420748 |
| | | | | | | TypeCode 420750 | | | | | | 0..1 420752 | LocationTypeCode 420754 |
| | | | | | | Name 420756 | | | | | | 0..1 420758 | MEDIUM_Name 420760 |

FIG. 42-23

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Periods 420762 | | | | | | 0..n 420764 | ... |
| | | | | | | | RequestDateTimePeriod 420766 | | | | | 0..1 420768 | DateTimePeriod 420770 |
| | | | | | | | AcceptableDateTimePeriod 420772 | | | | | 0..1 420774 | DateTimePeriod 420776 |
| | | | | | | | PeriodRoleCode 420778 | | | | | 1..1 420780 | PeriodRoleCode 420782 |
| | | | | | Seal 420784 | | | | | | | 0..n 420786 | ... |
| | | | | | | ID 420788 | | | | | | 1 420790 | SealID 420792 |
| | | | | | | PartyRole Code 420794 | | | | | | 0..1 420796 | PartyRoleCode 420798 |

FIG. 42-24

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | PartyFormattedName 420800 | | | | | | 0..1 420802 | LONG_Name 420804 |
| | | | | | | StatusCode 420806 | | | | | | 0..1 420808 | SealStatusCode 420810 |
| | | | | | TextCollection 420812 | | | | | | | 0..1 420814 | ... |
| | | | | | | TextCollection 420816 | | | | | | 1..1 420818 | TextCollection 420820 |
| | | | | | BusinessTransactionDocumentReference 420822 | | | | | | | 0..n 420824 | ... |
| | | | | | | BusinessTransactionDocumentReference 420826 | | | | | | 0..1 420828 | BusinessTransactionDocumentReference 420830 |

FIG. 42-25

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipRoleCode 420832 | | | | | | 0..1 420834 | BusinessTransactionDocumentRelationshipRoleCode 420836 |
| | | | | | | BusinessTransactionDocumentRelationshipTypeCode 420838 | | | | | | 0..1 420840 | BusinessTransactionDocumentRelationshipTypeCode 420842 |
| | | | | | | TransportationDocumentTypeCode 420844 | | | | | | 0..1 420846 | TransportationDocumentTypeCode 420848 |
| | | | | | | TransportationDocumentNote 420850 | | | | | | 0..1 420852 | SHORT_Note 420854 |
| | | | | | | TransportationDocumentID 420856 | | | | | | 0..1 420858 | TransportationDocumentID 420860 |

FIG. 42-26

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTimePeriod 420862 | | | | | | 0..n 420864 | ... |
| | | | | | | | DateTimePeriod 420866 | | | | | 1..1 420868 | DateTimePeriod 420870 |
| | | | | | | | PeriodRoleCode 420872 | | | | | 1 420874 | PeriodRoleCode 420876 |
| | | | | | TransportationServiceRequirement 420878 | | | | | | | 1..1 420880 | ... |
| | | | | | | TransportationServiceRequirementCode 420882 | | | | | | 0..1 420884 | TransportationServiceRequirementCode 420886 |
| | | | | | | AdditionalTransportationServiceRequirementCode 420888 | | | | | | 0..1 420890 | TransportationServiceRequirementCode 420892 |

FIG. 42-27

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationContractConditionCode 420894 | | | | | | 0..1 420896 | TransportationContractConditionCode 420898 |
| | | | | | | TransportServiceLevelCode 420900 | | | | | | 0..1 420902 | TransportServiceLevelCode 420904 |
| | | | | | | NatureOfCargoClassificationCode 420906 | | | | | | 0..1 420908 | NatureOfCargoClassificationCode 420910 |
| TransportationUnitResourceInformation 420912 | | | | TransportationUnitResourceInformation 420914 | | | | | | | | 0..n 420916 | ... |
| | | | | | ID 420918 | | | | | | | 1 420920 | ResourceInformationID 420922 |
| | | | | | ResourceNumberValue 420924 | | | | | | | 0..1 420926 | NumberValue 420928 |

FIG. 42-28

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | ResourceID 420930 | | | | | | | 0..1 420932 | ResourceID 420934 |
| | | | | | ResourceHomeCountryCode 420936 | | | | | | | 0..1 420938 | CountryCode 420940 |
| | | | | | TransportationUnitResourceCategoryCode 420942 | | | | | | | 0..1 420944 | TransportationUnitResourceCategoryCode 420946 |
| | | | | | TransportationUnitResourceTypeCode 420948 | | | | | | | 0..1 420950 | TransportationUnitResourceTypeCode 420952 |
| | | | | | FillLevelCode 420954 | | | | | | | 0..1 420956 | FillLevelCode 420958 |
| | | | | | ShippingTypeCode 420960 | | | | | | | 0..1 420962 | ShippingTypeCode 420964 |

FIG. 42-29

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | HaulageArrangerCode 420966 | | | | | | | 0..1 420968 | HaulageArrangerCode 420970 |
| | | | | | TransportationHandlingInstructionCode 420972 | | | | | | | 0..1 420974 | TransportationHandlingInstructionCode 420976 |
| | | | | | TransportationHandlingInstructionNote 420978 | | | | | | | 0..1 420980 | LONG_Note 420982 |
| | | | | | TransportationStageAssignment 420984 | | | | | | | 0..n 420986 | ... |
| | | | | | | FreightRequestTransportationStageID 420988 | | | | | | 1..1 420990 | TransportationStageID 420992 |

FIG. 42-30

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | AttachedEquipment 420994 | | | | | | | 0..n 420996 | ... |
| | | | | | | FreightRequestResourceInformationID 420998 | | | | | | 1..1 421000 | ResourceID 421002 |
| | | | | | Quantity 421004 | | | | | | | 0..n 421006 | ... |
| | | | | | | Quantity 421008 | | | | | | 1 421010 | Quantity 421012 |
| | | | | | | RoleCode 421014 | | | | | | 0..1 421016 | QuantityRoleCode 421018 |
| | | | | | | TypeCode 421020 | | | | | | 0..1 421022 | QuantityTypeCode 421024 |
| | | | | | Seal 421026 | | | | | | | 0..n 421028 | ... |

FIG. 42-31

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ID 421030 | | | | | | 1 421032 | SealID 421034 |
| | | | | | | PartyRoleCode 421036 | | | | | | 0..1 421038 | PartyRoleCode 421040 |
| | | | | | | PartyFormattedName 421042 | | | | | | 0..1 421044 | LONG_Name 421046 |
| | | | | | | StatusCode 421048 | | | | | | 0..1 421050 | SealStatusCode 421052 |
| | | | | | BusinessTransactionDocumentReference 421054 | | | | | | | 0..n 421056 | ... |
| | | | | | | BusinessTransactionDocumentReference 421058 | | | | | | 0..1 421060 | BusinessTransactionDocumentReference 421062 |

FIG. 42-32

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipRoleCode 421064 | | | | | | 0..1 421066 | BusinessTransactionDocumentRelationshipRoleCode 421068 |
| | | | | | | BusinessTransactionDocumentRelationshipTypeCode 421070 | | | | | | 0..1 421072 | BusinessTransactionDocumentRelationshipTypeCode 421074 |
| | | | | | | TransportationDocumentTypeCode 421076 | | | | | | 0..1 421078 | TransportationDocumentTypeCode 421080 |
| | | | | | | TransportationDocumentNote 421082 | | | | | | 0..1 421084 | SHORT_Note 421086 |
| | | | | | | TransportationDocumentID 421088 | | | | | | 0..1 421090 | TransportationDocumentID 421092 |

FIG. 42-33

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Period 421094 | | | | | | 0..n 421096 | ... |
| | | | | | | | DateTime Period 421098 | | | | | 1..1 421100 | DateTimePeriod 421102 |
| | | | | | | | PeriodRoleCode 421104 | | | | | 1..1 421106 | PeriodRoleCode 421108 |
| | | | | | TextCollection 421110 | | | | | | | 0..1 421112 | ... |
| | | | | | | TextCollection 421114 | | | | | | 1..1 421116 | TextCollection 421118 |
| | | | | | Party 421120 | | | | | | | 1..n 421122 | ... |
| | | | | | | Party 421124 | | | | | | 1..1 421126 | BusinessTransactionDocumentParty 421128 |
| | | | | | | RoleCode 421130 | | | | | | 1..1 421132 | PartyRoleCode 421134 |

FIG. 42-34

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | Location 421136 | | | | | | | 0..n 421138 | ... |
| | | | | | | Location 421140 | | | | | | 1 421142 | BusinessTransactionDocumentLocation 421144 |
| | | | | | | RoleCode 421146 | | | | | | 1 421148 | LocationRoleCode 421150 |
| | | | | | | TypeCode 421152 | | | | | | 0..1 421154 | LocationTypeCode 421156 |
| | | | | | | Name 421158 | | | | | | 0..1 421160 | MEDIUM_Name 421162 |
| | | | | | | DateTime Periods 421164 | | | | | | 0..n 421166 | ... |
| | | | | | | | RequestDateTimePeriod 421168 | | | | | 0..1 421170 | DateTimePeriod 421172 |

FIG. 42-35

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AcceptableDateTimePeriod 421174 | | | | | 0..1 421176 | DateTimePeriod 421178 |
| | | | | | | | PeriodRoleCode 421180 | | | | | 1..1 421182 | PeriodRoleCode 421184 |
| | | | | | DangerousGoods 421186 | | | | | | | 0..n 421188 | ... |
| | | | | | | ID 421190 | | | | | | 0..1 421192 | DangerousGoodsID 421194 |
| | | | | | | RegulationsCode 421196 | | | | | | 0..1 421198 | DangerousGoodsRegulationsCode 421200 |
| | | | | | | HazardCode 421202 | | | | | | 0..1 421204 | DangerousGoodsHazardCode 421206 |
| | | | | | | FlashpointMeasureInterval 421208 | | | | | | 0..1 421210 | MeasureInterval 421212 |

FIG. 42-36

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | PackagingGroupCode 421214 | | | | | | 0..1 421216 | DangerousGoodsPackagingGroupCode 421218 |
| | | | | | | EmergencySchedule 421220 | | | | | | 0..1 421222 | DangerousGoodsEmergencySchedule 421224 |
| | | | | | | TransportEmergencyCardCode 421226 | | | | | | 0..1 421228 | TransportEmergencyCardCode 421230 |
| | | | | | | DangerousGoodsLabelCode 421232 | | | | | | 0..1 421234 | DangerousGoodsLabelCode 421236 |
| | | | | | | DangerousGoodsLabelCode2 421238 | | | | | | 0..1 421240 | DangerousGoodsLabelCode 421242 |

FIG. 42-37

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DangerousGoodsLabelCode3 421244 | | | | | | 0..1 421246 | DangerousGoodsLabelCode 421248 |
| | | | | | | PackagingInstructionTypeCode 421250 | | | | | | 0..1 421252 | PackagingInstructionTypeCode 421254 |
| | | | | | | TransportMeansDescriptionCode 421256 | | | | | | 0..1 421258 | TransportMeansDescriptionCode 421260 |
| | | | | | | TransportationAuthorisationCode 421262 | | | | | | 0..1 421264 | DangerousGoodsTransportationAuthorisationCode 421266 |
| | | | | | | ContactInformation 421268 | | | | | | 0..n 421270 | ... |

FIG. 42-38

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ContactPersonFunctionTypeCode 421272 | | | | | 1..1 421274 | ContactPersonFunctionTypeCode 421276 |
| | | | | | | | Address 421278 | | | | | 1..1 421280 | Address 421282 |
| | | | | | | TextCollection 421284 | | | | | | 0..1 421286 | ... |
| | | | | | | | TextCollection 421288 | | | | | 1..1 421290 | TextCollection 421292 |
| TransportationChargesInformation 421294 | | | | TransportationChargesInformation 421296 | | | | | | | | 0..n 421298 | ... |
| | | | | | TransportationChargesUsageCode 421300 | | | | | | | 1..1 421302 | TransportationChargesUsageCode 421304 |

FIG. 42-39

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | FreightRequestPartyStandardID 421306 | | | | | | | 0..1 421308 | PartyStandardID 421310 |
| | | | | | FreightRequestPartyInternalID 421312 | | | | | | | 0..1 421314 | PartyInternalID 421316 |
| | | | | | FreightRequestTransportationUnitResourceID 421318 | | | | | | | 0..1 421320 | ResourceID 421322 |
| | | | | | FreightRequestTransportationStageID 421324 | | | | | | | 0..1 421326 | TransportationStageID 421328 |
| | | | | | TransportationCharges 421330 | | | | | | | 0..1 421332 | ... |

FIG. 42-40

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ID 421334 | | | | | | 1 421336 | TransportationChargesID 421338 |
| | | | | | | FreightAgreementID 421340 | | | | | | 1 421342 | FreightAgreementID 421344 |
| | | | | | | OriginCode 421346 | | | | | | 0..1 421348 | TransportationChargesOriginCode 421350 |
| | | | | | | TariffID 421352 | | | | | | 0..1 421354 | TransportationChargesTariffID 421356 |
| | | | | | | CalculationSheetID 421358 | | | | | | 1 421360 | TransportationChargesCalculationSheetID 421362 |
| | | | | | | Location 421364 | | | | | | 0..n 421366 | ... |

FIG. 42-41

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Location 421368 | | | | | 1 421370 | BusinessTransactionDocumentLocation 421372 |
| | | | | | | | RoleCode 421374 | | | | | 1 421376 | LoactionRoleCode 421378 |
| | | | | | | | TypeCode 421380 | | | | | 0..1 421382 | LocationTypeCode 421384 |
| | | | | | | | Name 421386 | | | | | 0..1 421388 | MEDIUM_Name 421390 |
| | | | | | | | DateTime Periods 421392 | | | | | 0..n 421394 | ... |
| | | | | | | | | RequestedFulfillmentPeriod 421396 | | | | 0..1 421398 | DateTimePeriod 421400 |
| | | | | | | | | AcceptableFulfillmentPeriod 421402 | | | | 0..1 421404 | DateTimePeriod 421406 |

FIG. 42-42

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 421408 | | | | 1 421410 | PeriodRoleCode 421412 |
| | | | | | | TextCollection 421414 | | | | | | 0..1 421416 | ... |
| | | | | | | | TextCollection 421418 | | | | | 1..1 421420 | TextCollection 421422 |
| | | | | | | Currency 421424 | | | | | | 0..n 421426 | ... |
| | | | | | | | Code 421428 | | | | | 1..1 421430 | CurrencyCode 421432 |
| | | | | | | | RoleCode 421434 | | | | | 1..1 421436 | CurrencyRoleCode 421438 |
| | | | | | | | UsageCode 421440 | | | | | 0..1 421442 | CurrencyUsageCode 421444 |
| | | | | | | ExchangeRate 421446 | | | | | | 0..n 421448 | ... |

FIG. 42-43

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ExchangeRate 421450 | | | | | 1..1 421452 | ExchangeRate 421454 |
| | | | | | | | TypeCode 421456 | | | | | 0..1 421458 | ExchangeRateTypeCode 421460 |
| | | | | | | PercentElement 421462 | | | | | | 0..n 421464 | ... |
| | | | | | | | PercentRoleCode 421466 | | | | | 1 421468 | PercentRoleCode 421470 |
| | | | | | | | Percent 421472 | | | | | 1 421474 | Percent 421476 |
| | | | | | | | TransportationChargesPercentCalculationBaseCode 421478 | | | | | 0..1 421480 | TransportationChargesPercentCalculationBaseCode 421482 |

FIG. 42-44

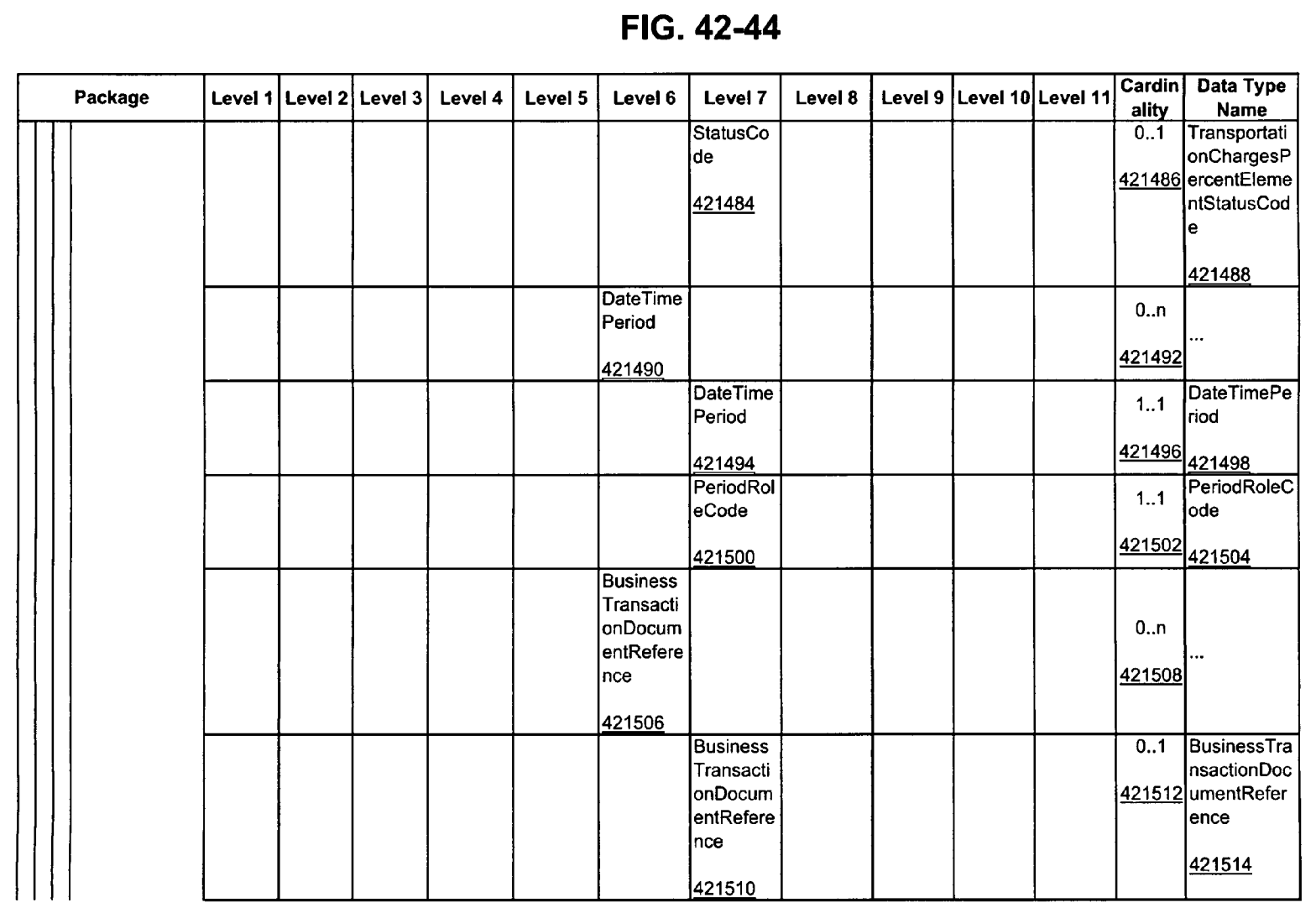

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | StatusCode 421484 | | | | | 0..1 421486 | TransportationChargesPercentElementStatusCode 421488 |
| | | | | | | DateTime Period 421490 | | | | | | 0..n 421492 | ... |
| | | | | | | | DateTime Period 421494 | | | | | 1..1 421496 | DateTimePeriod 421498 |
| | | | | | | | PeriodRoleCode 421500 | | | | | 1..1 421502 | PeriodRoleCode 421504 |
| | | | | | | Business TransactionDocumentReference 421506 | | | | | | 0..n 421508 | ... |
| | | | | | | | Business TransactionDocumentReference 421510 | | | | | 0..1 421512 | BusinessTransactionDocumentReference 421514 |

FIG. 42-45

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentRelationshipRoleCode 421516 | | | | | 0..1 421518 | BusinessTransactionDocumentRelationshipRoleCode 421520 |
| | | | | | | | BusinessTransactionDocumentRelationshipTypeCode 421522 | | | | | 0..1 421524 | BusinessTransactionDocumentRelationshipTypeCode 421526 |
| | | | | | | | TransportationDocumentTypeCode 421528 | | | | | 0..1 421530 | TransportationDocumentTypeCode 421532 |
| | | | | | | | TransportationDocumentNote 421534 | | | | | 0..1 421536 | SHORT_Note 421538 |
| | | | | | | | TransportationDocumentID 421540 | | | | | 0..1 421542 | TransportationDocumentID 421544 |

FIG. 42-46

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TaxDetail 421546 | | | | | | 0..n 421548 | ... |
| | | | | | | | ProductTax 421550 | | | | | 1..1 421552 | ProductTax 421554 |
| | | | | | | PaymentInstruction 421556 | | | | | | 0..n 421558 | ... |
| | | | | | | | PaymentInstruction 421560 | | | | | 1 421562 | PaymentInstruction 421564 |
| | | | | | | | TransportationChargeElementCategoryCode 421566 | | | | | 0..1 421568 | TransportationChargesElementCategoryCode 421570 |
| | | | | | | | TransportationChargesElementSubCategoryCode 421572 | | | | | 0..1 421574 | TransportationChargesElementSubCategoryCode 421576 |

FIG. 42-47

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesPaymentArrangementCode 421578 | | | | | 0..1 421580 | TransportationChargesPaymentArrangementCode 421582 |
| | | | | | | CashDiscountTerms 421584 | | | | | | 0..1 421586 | ... |
| | | | | | | | CashDiscountTerms 421588 | | | | | 1 421590 | CashDiscountTerms 421592 |
| | | | | | | | TransportationChargesElementCategoryCode 421594 | | | | | 0..1 421596 | TransportationChargesElementCategoryCode 421598 |
| | | | | | | | TransportationChargesElementSubCategoryCode 421600 | | | | | 0..1 421602 | TransportationChargesElementSubCategoryCode 421604 |

FIG. 42-48

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Element 421606 | | | | | | 0..n 421608 | ... |
| | | | | | | | CategoryCode 421610 | | | | | 1 421612 | TransportationChargesElementCategoryCode 421614 |
| | | | | | | | SubCategoryCode 421616 | | | | | 1 421618 | TransportationChargesElementSubCategoryCode 421620 |
| | | | | | | | TypeCode 421622 | | | | | 1 421624 | TransportationChargesElementTypeCode 421626 |
| | | | | | | | CalculationResolutionCode 421628 | | | | | 1 421630 | TransportationChargesElementCalculationResolutionCode 421632 |

FIG. 42-49

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesPaymentArrangementCode 421634 | | | | | 0...1 421636 | TransportationChargesPaymentArrangementCode 421638 |
| | | | | | | | Location 421640 | | | | | 0..n 421642 | ... |
| | | | | | | | | Location 421644 | | | | 1 421646 | BusinessTransactionDocumentLocation 421648 |
| | | | | | | | | RoleCode 421650 | | | | 1 421652 | LocationRoleCode 421654 |
| | | | | | | | | TypeCode 421656 | | | | 0..1 421658 | LocationTypeCode 421660 |
| | | | | | | | | Name 421662 | | | | 0..1 421664 | MEDIUM_Name 421666 |
| | | | | | | | | DateTimePeriods 421668 | | | | 0..n 421670 | ... |

FIG. 42-50

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RequestedFulfillmentPeriod 421672 | | | 0..1 421674 | DateTimePeriod 421676 |
| | | | | | | | | | AcceptableFulfillmentPeriod 421678 | | | 0..1 421680 | DateTimePeriod 421682 |
| | | | | | | | | | PeriodRoleCode 421684 | | | 1 421686 | PeriodRoleCode 421688 |
| | | | | | | | TextCollection 421690 | | | | | 0..1 421692 | ... |
| | | | | | | | | TextCollection 421694 | | | | 1..1 421696 | TextCollection 421698 |
| | | | | | | | Currency 421700 | | | | | 0..n 421702 | ... |
| | | | | | | | | Code 421704 | | | | 1..1 421706 | CurrencyCode 421708 |

FIG. 42-51

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RoleCode 421710 | | | | 1..1 421712 | CurrencyRoleCode 421714 |
| | | | | | | | | UsageCode 421716 | | | | 0..1 421718 | CurrencyUsageCode 421720 |
| | | | | | | | RateElement 421722 | | | | | 0..n 421724 | ... |
| | | | | | | | | ID 421726 | | | | 1 421728 | TransportationChargesElementRateElementID 421730 |
| | | | | | | | | Amount 421732 | | | | 1 421734 | Amount 421736 |
| | | | | | | | | BaseQuantity 421738 | | | | 1 421740 | Quantity 421742 |
| | | | | | | | | TransportationChargesRateTypeCode 421744 | | | | 0..1 421746 | TransportationChargesRateTypeCode 421748 |

FIG. 42-52

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesRateRoleCode 421750 | | | | 1 421752 | TransportationChargesRateRoleCode 421754 |
| | | | | | | | | TransportationChargesRateElementStatusCode 421756 | | | | 0..1 421758 | TransportationChargesRateElementStatusCode 421760 |
| | | | | | | | PercentElement 421762 | | | | | 0..n 421764 | ... |
| | | | | | | | | PercentRoleCode 421766 | | | | 1 421768 | PercentRoleCode 421770 |
| | | | | | | | | Percent 421772 | | | | 1 421774 | Percent 421776 |

FIG. 42-53

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesPercentCalculationBaseCode 421778 | | | | 0..1 421780 | TransportationChargesPercentCalculationBaseCode 421782 |
| | | | | | | | | StatusCode 421784 | | | | 0..1 421786 | TransportationChargesPercentElementStatusCode 421788 |
| | | | | | | | AmountElement 421790 | | | | | 0..n 421792 | ... |
| | | | | | | | | Amount 421794 | | | | 1 421796 | Amount 421798 |
| | | | | | | | | AmountRoleCode 421800 | | | | 1 421802 | AmountRoleCode 421804 |

FIG. 42-54

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesAmountElementStatusCode 421806 | | | | 0..1 421808 | TransportationChargesAmountElementStatusCode 421810 |
| | | | | | | | | RateDetailAssignment 421812 | | | | 0..n 421814 | ... |
| | | | | | | | | | TransportationChargeRateDetailID 421816 | | | 1 421818 | TransportationChargesElementRateElementID 421820 |
| | | | | | | | CalculationBase 421822 | | | | | 0..n 421824 | ... |
| | | | | | | | | TransportationChargesElementCalculationBaseCode 421826 | | | | 1 421828 | TransportationChargesElementCalculationBaseCode 421830 |

FIG. 42-55

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BaseQuantity 421832 | | | | 0..1 421834 | Quantity 421836 |
| | | | | | | | | BaseQuantityRoleCode 421838 | | | | 0..1 421840 | QuantityRoleCode 421842 |
| | | | | | | | | BaseQuantityTypeCode 421844 | | | | 0..1 421846 | QuantityTypeCode 421848 |
| | | | | | | | TaxDetail 421850 | | | | | 0..n 421852 | ... |
| | | | | | | | | ProductTax 421854 | | | | 1..1 421856 | ProductTax 421858 |
| | | | | | | | DateTime Period 421860 | | | | | 0..n 421862 | ... |
| | | | | | | | | DateTime Period 421864 | | | | 1..1 421866 | DateTimePeriod 421868 |
| | | | | | | | | PeriodRoleCode 421870 | | | | 1..1 421872 | PeriodRoleCode 421874 |

FIG. 42-56

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CostDistribution 421876 | | | | | 0..n 421878 | ... |
| | | | | | | | | AccountingCodingBlockAssignment 421880 | | | | 1..1 421882 | AccountingCodingBlockAssignment 421884 |
| ShipmentRequest 421886 | | | | ShipmentRequest 421888 | | | | | | | | 0..n 421890 | ... |
| | | | | | ID 421892 | | | | | | | 1..1 421894 | BusinessTransactionDocumentID 421896 |
| | | | | | TransportationStageAssignment 421898 | | | | | | | 0..n 421900 | ... |
| | | | | | | FreightRequestTransportationStageID 421902 | | | | | | 1..1 421904 | TransportationStageID 421906 |

FIG. 42-57

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationUnitResourceInformationAssignment 421908 | | | | | | | 0..n 421910 | ... |
| | | | | | | FreightRequestTransportationUnitResourceInformationID 421912 | | | | | | 1..1 421914 | TransportationUnitResourceID 421916 |
| Request 421918 | | | | | Request 421920 | | | | | | | 0..1 421922 | ... |
| | | | | | | DeliveryTerms 421924 | | | | | | 0..1 421926 | DeliveryTerms 421928 |
| HeaderInformation 421930 | | | | | | DateTimePeriods 421932 | | | | | | 0..n 421934 | ... |
| | | | | | | | RequestedFulfillmentPeriod 421936 | | | | | 0..1 421938 | DateTimePeriod 421940 |

FIG. 42-58

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AcceptableFulfillmentPeriod 421942 | | | | | 0..1 421944 | DateTimePeriod 421946 |
| | | | | | | | PeriodRoleCode 421948 | | | | | 1 421950 | PeriodRoleCode 421952 |
| | | | | | | NatureOfCargo 421954 | | | | | | 0..n 421956 | ... |
| | | | | | | | ClassificationCode 421958 | | | | | 1 421960 | NatureOfCargoClassificationCode 421962 |
| | | | | | | TotalQuantity 421964 | | | | | | 0..n 421966 | ... |
| | | | | | | | Quantity 421968 | | | | | 1 421970 | Quantity 421972 |
| | | | | | | | RoleCode 421974 | | | | | 0..1 421976 | QuantityRoleCode 421978 |
| | | | | | | | TypeCode 421980 | | | | | 0..1 421982 | QuantityTypeCode 421984 |

FIG. 42-59

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TotalAmount 421986 | | | | | | 0..n 421988 | ... |
| | | | | | | | Amount 421990 | | | | | 1 421992 | Amount 421994 |
| | | | | | | | RoleCode 421996 | | | | | 1 421998 | AmountRoleCode 422000 |
| | | | | | | TextCollection 422002 | | | | | | 0..1 422004 | ... |
| | | | | | | | TextCollection 422006 | | | | | 1 422008 | TextCollection 422010 |
| | | | | | | TransportationServiceRequirement 422012 | | | | | | 0..n 422014 | ... |
| | | | | | | | TransportationServiceRequirementCode 422016 | | | | | 0..1 422018 | TransportationServiceRequirementCode 422020 |

FIG. 42-60

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AdditionalTransportationServiceRequirementCode 422022 | | | | | 0..1 422024 | TransportationServiceRequirementCode 422026 |
| | | | | | | | TransportationContractConditionCode 422028 | | | | | 0..1 422030 | TransportationContractConditionCode 422032 |
| | | | | | | | TransportServiceLevelCode 422034 | | | | | 0..1 422036 | TransportServiceLevelCode 422038 |
| | | | | | | | NatureOfCargoClassificationCode 422040 | | | | | 0..1 422042 | NatureOfCargoClassificationCode 422044 |
| | | | | | | TransportationDocumentInformation 422046 | | | | | | 0..n 422048 | ... |

FIG. 42-61

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 422050 | | | | | 0..1 422052 | TransportationDocumentTypeCode 422054 |
| | | | | | | | TransportationDocumentNote 422056 | | | | | 0..1 422058 | SHORT_Note 422060 |
| | | | | | | | TransportationDocumentID 422062 | | | | | 0..1 422064 | TransportationDocumentID 422066 |
| | | | | | | | TransportationDocumentStatusCode 422068 | | | | | 0..1 422070 | TransportationDocumentStatusCode 422072 |
| | | | | | | | LanguageCode 422074 | | | | | 0..1 422076 | LanguageCode 422078 |
| | | | | | | | CommunicationMediumTypeCode 422080 | | | | | 0..1 422082 | CommunicationMediumTypeCode 422084 |

FIG. 42-62

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Requiredindicator 422086 | | | | | 1 422088 | Indicator 422090 |
| | | | | | | | OutputCopyNumberValue 422092 | | | | | 0..1 422094 | NumberValue 422096 |
| | | | | | | | OutputOriginalNumberValue 422098 | | | | | 0..1 422100 | NumberValue 422102 |
| | | | | | | | DateTimePeriod 422104 | | | | | 0..n 422106 | ... |
| | | | | | | | | DateTimePeriod 422108 | | | | 1 422110 | DateTimePeriod 422112 |
| | | | | | | | | PeriodRoleCode 422114 | | | | 1 422116 | PeriodRoleCode 422118 |
| | | | | | | BusinessTransactionDocumentReference 422120 | | | | | | 0..n 422122 | ... |

FIG. 42-63

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 422124 | | | | | 0..1 422126 | BusinessTransactionDocumentReference 422128 |
| | | | | | | | BusinessTransactionDocumentRelationshipRoleCode 422130 | | | | | 0..1 422132 | BusinessTransactionDocumentRelationshipRoleCode 422134 |
| | | | | | | | BusinessTransactionDocumentRelationshipTypeCode 422136 | | | | | 0..1 422138 | BusinessTransactionDocumentRelationshipTypeCode 422140 |
| | | | | | | | TransportationDocumentTypeCode 422142 | | | | | 0..1 422144 | TransportationDocumentTypeCode 422146 |

FIG. 42-64

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentNote 422148 | | | | | 0..1 422150 | SHORT_Note 422152 |
| | | | | | | | TransportationDocumentID 422154 | | | | | 0..1 422156 | TransportationDocumentID 422158 |
| | | | | | | | DateTimePeriod 422160 | | | | | 0..n 422162 | ... |
| | | | | | | | | DateTimePeriod 422164 | | | | 1 422166 | DateTimePeriod 422168 |
| | | | | | | | | PeriodRoleCode 422170 | | | | 1 422172 | PeriodRoleCode 422174 |
| GovernmentalRequirementInformation 422176 | | | | | | GovernmentalProcedure 422178 | | | | | | 0..n 422180 | ... |

FIG. 42-65

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGovernmentAgencyTypeCode 422182 | | | | | 0..1 422184 | TransportationGovernmentAgencyTypeCode 422186 |
| | | | | | | | TransportationMovementTypeCode 422188 | | | | | 0..1 422190 | TransportationMovementTypeCode 422192 |
| | | | | | | | TransportationGovernmentAgencyInvolvementStatusCode 422194 | | | | | 0..1 422196 | TransportationGovernmentAgencyInvolvementStatusCode 422198 |
| | | | | | | | TransportationGovernmentAgencyActionCode 422200 | | | | | 0..1 422202 | TransportationGovernmentAgencyActionCode 422204 |

FIG. 42-66

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGovernmentAgencyProcedureStatusCode 422206 | | | | | 0..1 422208 | TransportationGovernmentAgencyProcedureStatusCode 422210 |
| | | | | | | | Location 422212 | | | | | 0..n 422214 | ... |
| | | | | | | | | Location 422216 | | | | 1 422218 | BusinessTransactionDocumentLocation 422220 |
| | | | | | | | | RoleCode 422222 | | | | 1 422224 | LocationRoleCode 422226 |
| | | | | | | | | TypeCode 422228 | | | | 0..1 422230 | LocationTypeCode 422232 |
| | | | | | | | | Name 422234 | | | | 0..1 422236 | MEDIUM_Name 422238 |

FIG. 42-67

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTime Period 422240 | | | | | 0..n 422242 | ... |
| | | | | | | | | DateTime Period 422244 | | | | 1 422246 | DateTimePeriod 422248 |
| | | | | | | | | PeriodRoleCode 422250 | | | | 1 422252 | PeriodRoleCode 422254 |
| | | | | | | | Seal 422256 | | | | | 0..n 422258 | ... |
| | | | | | | | | ID 422260 | | | | 0..1 422262 | SealID 422264 |
| | | | | | | | | PartyRole Code 422266 | | | | 0..1 422268 | PartyRoleCode 422270 |
| | | | | | | | | PartyFormattedName 422272 | | | | 0..1 422274 | LONG_Name 422276 |
| | | | | | | | | StatusCode 422278 | | | | 0..1 422280 | SealStatusCode 422282 |

FIG. 42-68

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 422284 | | | | | 0..1 422286 | … |
| | | | | | | | | TextCollection 422288 | | | | 1 422290 | TextCollection 422292 |
| | | | | | | | TransportationDocumentInformation 422294 | | | | | 0..n 422296 | … |
| | | | | | | | | TransportationDocumentTypeCode 422298 | | | | 0..1 422300 | TransportationDocumentTypeCode 422302 |
| | | | | | | | | TransportationDocumentNote 422304 | | | | 0..1 422306 | SHORT_Note 422308 |
| | | | | | | | | TransportationDocumentID 422310 | | | | 0..1 422312 | TransportationDocumentID 422314 |

FIG. 42-69

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentStatusCode 422316 | | | | 0..1 422318 | TransportationDocumentStatusCode 422320 |
| | | | | | | | | LanguageCode 422322 | | | | 0..1 422324 | LanguageCode 422326 |
| | | | | | | | | CommunicationMediumTypeCode 422328 | | | | 0..1 422330 | CommunicationMediumTypeCode 422332 |
| | | | | | | | | RequiredIndicator 422334 | | | | 1 422336 | Indicator 422338 |
| | | | | | | | | OutputCopyNumberValue 422340 | | | | 0..1 422342 | NumberValue 422344 |
| | | | | | | | | OutputOriginalNumberValue 422346 | | | | 0..1 422348 | NumberValue 422350 |

FIG. 42-70

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Period 422352 | | | | 0..n 422354 | ... |
| | | | | | | | | | DateTimePeriod 422356 | | | 1 422358 | DateTimePeriod 422360 |
| | | | | | | | | | PeriodRoleCode 422362 | | | 1 422364 | PeriodRoleCode 422366 |
| PartyInformation 422368 | | | | | | Party 422370 | | | | | | 1..n 422372 | ... |
| | | | | | | | Party 422374 | | | | | 1 422376 | BusinessTransactionDocumentParty 422378 |
| | | | | | | | RoleCode 422380 | | | | | 1 422382 | PartyRoleCode 422384 |
| | | | | | | | Formatted Name 422386 | | | | | 0..1 422388 | LONG_Name 422390 |
| | | | | | | | Amount 422392 | | | | | 0..n 422394 | ... |

FIG. 42-71

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Amount 422396 | | | | 1 422398 | Amount 422400 |
| | | | | | | | | RoleCode 422402 | | | | 1 422404 | AmountRoleCode 422406 |
| | | | | | | | DateTimePeriods 422408 | | | | | 0..n 422410 | ... |
| | | | | | | | | RequestedFulfillmentPeriod 422412 | | | | 0..1 422414 | DateTimePeriod 422416 |
| | | | | | | | | AcceptableFulfillmentPeriod 422418 | | | | 0..1 422420 | DateTimePeriod 422422 |
| | | | | | | | | PeriodRoleCode 422424 | | | | 1 422426 | PeriodRoleCode 422428 |
| | | | | | | | TransportationDocumentInformation 422430 | | | | | 0..n 422432 | ... |

FIG. 42-72

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 422434 | | | | 0..1 422436 | TransportationDocumentTypeCode 422438 |
| | | | | | | | | TransportationDocumentNote 422440 | | | | 0..1 422442 | SHORT_Note 422444 |
| | | | | | | | | TransportationDocumentID 422446 | | | | 0..1 422448 | TransportationDocumentID 422450 |
| | | | | | | | | TransportationDocumentStatusCode 422452 | | | | 0..1 422454 | TransportationDocumentStatusCode 422456 |
| | | | | | | | | LanguageCode 422458 | | | | 0..1 422460 | LanguageCode 422462 |
| | | | | | | | | CommunicationMediumTypeCode 422464 | | | | 0..1 422466 | CommunicationMediumTypeCode 422468 |

FIG. 42-73

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RequiredIndicator 422470 | | | | 1 422472 | Indicator 422474 |
| | | | | | | | | OutputCopyNumberValue 422476 | | | | 0..1 422478 | NumberValue 422480 |
| | | | | | | | | OutputOriginalNumberValue 422482 | | | | 0..1 422484 | NumberValue 422486 |
| | | | | | | | | DateTimePeriod 422488 | | | | 0..n 422490 | ... |
| | | | | | | | | | DateTimePeriod 422492 | | | 1 422494 | DateTimePeriod 422496 |
| | | | | | | | | | PeriodRoleCode 422498 | | | 1 422500 | PeriodRoleCode 422502 |
| | | | | | | | BusinessTransactionDocumentReference 422504 | | | | | 0..n 422506 | ... |

FIG. 42-74

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 422508 | | | | 0..1 422510 | BusinessTransactionDocumentReference 422512 |
| | | | | | | | | BusinessTransactionDocumentRelationshipRoleCode 422514 | | | | 0..1 422516 | BusinessTransactionDocumentRelationshipRoleCode 422518 |
| | | | | | | | | BusinessTransactionDocumentRelationshipTypeCode 422520 | | | | 0..1 422522 | BusinessTransactionDocumentRelationshipTypeCode 422524 |
| | | | | | | | | TransportationDocumentTypeCode 422526 | | | | 0..1 422528 | TransportationDocumentTypeCode 422530 |

FIG. 42-75

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentNote 422532 | | | | 0..1 422534 | SHORT_Note 422536 |
| | | | | | | | | TransportationDocumentID 422538 | | | | 0..1 422540 | TransportationDocumentID 422542 |
| | | | | | | | | DateTimePeriod 422544 | | | | 0..n 422546 | ... |
| | | | | | | | | | DateTimePeriod 422548 | | | 1 422550 | DateTimePeriod 422552 |
| | | | | | | | | | PeriodRoleCode 422554 | | | 1 422556 | PeriodRoleCode 422558 |
| LocationInformation 422560 | | | | | | Location 422562 | | | | | | 0..n 422564 | |
| | | | | | | | Location 422566 | | | | | 1 422568 | BusinessTransactionDocumentLocation 422570 |

FIG. 42-76

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RoleCode 422572 | | | | | 1 422574 | LocationRoleCode 422576 |
| | | | | | | | TypeCode 422578 | | | | | 0..1 422580 | LocationTypeCode 422582 |
| | | | | | | | Name 422584 | | | | | 0..1 422586 | MEDIUM_Name 422588 |
| | | | | | | | DateTimePeriods 422590 | | | | | 0..n 422592 | ... |
| | | | | | | | | RequestedFulfillmentPeriod 422594 | | | | 0..1 422596 | DateTimePeriod 422598 |
| | | | | | | | | AcceptableFulfillmentPeriod 422600 | | | | 0..1 422602 | DateTimePeriod 422604 |
| | | | | | | | | PeriodRoleCode 422606 | | | | 1 422608 | PeriodRoleCode 422610 |

FIG. 42-77

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationStageInformation 422612 | | | | | | TransportationStage 422614 | | | | | | 0..n 422616 | ... |
| | | | | | | | ID 422618 | | | | | 1 422620 | TransportationStageID 422622 |
| | | | | | | | OrdinalNumberValue 422624 | | | | | 0..1 422626 | OrdinalNumberValue 422628 |
| | | | | | | | TypeCode 422630 | | | | | 0..1 422632 | TransportationStageTypeCode 422634 |
| | | | | | | | JourneyID 422636 | | | | | 0..1 422638 | JourneyID 422640 |
| | | | | | | | TransportModeCode 422642 | | | | | 0..1 422644 | TransportModeCode 422646 |
| | | | | | | | TransportMeansDescriptionCode 422648 | | | | | 0..1 422650 | TransportMeansDescriptionCode 422652 |

FIG. 42-78

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportMeansDescription 422654 | | | | | 0..1 422656 | SHORT_Description 422658 |
| | | | | | | | TransportMeansID 422660 | | | | | 0..1 422662 | TransportMeansID 422664 |
| | | | | | | | TransportMeansHomeCountryCode 422666 | | | | | 0..1 422668 | CountryCode 422670 |
| | | | | | | | TransportMeansOwnershipTypeCode 422672 | | | | | 0..1 422674 | TransportMeansOwnershipTypeCode 422676 |
| | | | | | | | CarrierStandardID 422678 | | | | | 0..1 422680 | PartyStandardID 422682 |
| | | | | | | | CarrierFormattedName 422684 | | | | | 0..1 422686 | LONG_Name 422688 |

FIG. 42-79

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationTransitDirectionCode 422690 | | | | | 0..1 422692 | TransportationTransitDirectionCode 422694 |
| | | | | | | | CalculatedDistanceMeasure 422696 | | | | | 0..1 422698 | Measure 422700 |
| | | | | | | | GivenDistanceMeasure 422702 | | | | | 0..1 422704 | Measure 422706 |
| | | | | | | | Location 422708 | | | | | 1..n 422710 | ... |
| | | | | | | | | Location 422712 | | | | 1 422714 | BusinessTransactionDocumentLocation 422716 |
| | | | | | | | | RoleCode 422718 | | | | 1 422720 | LocationRoleCode 422722 |

FIG. 42-80

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 422724 | | | | 0..1 422726 | LocationTypeCode 422728 |
| | | | | | | | | Name 422730 | | | | 0..1 422732 | MEDIUM_Name 422734 |
| | | | | | | | | DateTimePeriods 422736 | | | | 0..n 422738 | ... |
| | | | | | | | | | RequestedFulfillmentPeriod 422740 | | | 0..1 422742 | DateTimePeriod 422744 |
| | | | | | | | | | AcceptableFulfillmentPeriod 422746 | | | 0..1 422748 | DateTimePeriod 422750 |
| | | | | | | | | | PeriodRoleCode 422752 | | | 1 422754 | PeriodRoleCode 422756 |

FIG. 42-81

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 422758 | | | | | 0..n 422760 | ... |
| | | | | | | | | BusinessTransactionDocumentReference 422762 | | | | 0..1 422764 | BusinessTransactionDocumentReference 422766 |
| | | | | | | | | BusinessTransactionDocumentRelationshipRoleCode 422768 | | | | 0..1 422770 | BusinessTransactionDocumentRelationshipRoleCode 422772 |
| | | | | | | | | BusinessTransactionDocumentRelationshipTypeCode 422774 | | | | 0..1 422776 | BusinessTransactionDocumentRelationshipTypeCode 422778 |

FIG. 42-82

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 422780 | | | | 0..1 422782 | TransportationDocumentTypeCode 422784 |
| | | | | | | | | TransportationDocumentNote 422786 | | | | 0..1 422788 | SHORT_Note 422790 |
| | | | | | | | | TransportationDocumentID 422792 | | | | 0..1 422794 | TransportationDocumentID 422796 |
| | | | | | | | | DateTimePeriod 422798 | | | | 0..n 422800 | ... |
| | | | | | | | | | DateTimePeriod 422802 | | | 1 422804 | DateTimePeriod 422806 |
| | | | | | | | | | PeriodRoleCode 422808 | | | 1 422810 | PeriodRoleCode 422812 |

FIG. 42-83

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationServiceRequirement 422814 | | | | | 0..n 422816 | ... |
| | | | | | | | | TransportationServiceRequirementCode 422818 | | | | 0..1 422820 | TransportationServiceRequirementCode 422822 |
| | | | | | | | | AdditionalTransportationServiceRequirementCode 422824 | | | | 0..1 422826 | TransportationServiceRequirementCode 422828 |
| | | | | | | | | TransportationContractConditionCode 422830 | | | | 0..1 422832 | TransportationContractConditionCode 422834 |
| | | | | | | | | TransportServiceLevelCode 422836 | | | | 0..1 422838 | TransportServiceLevelCode 422840 |

FIG. 42-84

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | NatureOfCargoClassificationCode 422842 | | | | 0..1 422844 | NatureOfCargoClassificationCode 422846 |
| TransportationUnitResourceInformation 422848 | | | | | | TransportationUnitResourceInformation 422850 | | | | | | 0..n 422852 | ... |
| | | | | | | | ID 422854 | | | | | 1 422856 | ResourceInformationID 422858 |
| | | | | | | | ResourceNumberValue 422860 | | | | | 0..1 422862 | NumberValue 422864 |
| | | | | | | | ResourceID 422866 | | | | | 0..1 422868 | ResourceID 422870 |
| | | | | | | | ResourceHomeCountryCode 422872 | | | | | 0..1 422874 | CountryCode 422876 |

FIG. 42-85

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceCategoryCode 422878 | | | | | 0..1 422880 | TransportationUnitResourceCategoryCode 422882 |
| | | | | | | | TransportationUnitResourceTypeCode 422884 | | | | | 0..1 422886 | TransportationUnitResourceTypeCode 422888 |
| | | | | | | | FillLevelCode 422890 | | | | | 0..1 422892 | FillLevelCode 422894 |
| | | | | | | | ShippingTypeCode 422896 | | | | | 0..1 422898 | ShippingTypeCode 422900 |
| | | | | | | | HaulageArrangerCode 422902 | | | | | 0..1 422904 | HaulageArrangerCode 422906 |

FIG. 42-86

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 422908 | | | | | 0..1 422910 | TransportationHandlingInstructionCode 422912 |
| | | | | | | | TransportationHandlingInstructionNote 422914 | | | | | 0..1 422916 | LONG_Note 422918 |
| | | | | | | | TransportationStageAssignment 422920 | | | | | 0..n 422922 | … |
| | | | | | | | | ShipmentRequestTransportationStageID 422924 | | | | 1 422926 | TransportationStageID 422928 |
| | | | | | | | AttachedEquipment 422930 | | | | | 0..n 422932 | … |

FIG. 42-87

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentRequestResourceInformationID 422934 | | | | 1 422936 | ResourceID 422938 |
| | | | | | | | Quantity 422940 | | | | | 0..n 422942 | ... |
| | | | | | | | | Quantity 422944 | | | | 1 422946 | Quantity 422948 |
| | | | | | | | | RoleCode 422950 | | | | 0..1 422952 | QuantityRoleCode 422954 |
| | | | | | | | | TypeCode 422956 | | | | 0..1 422958 | QuantityTypeCode 422960 |
| | | | | | | | Seal 422962 | | | | | 0..n 422964 | ... |
| | | | | | | | | ID 422966 | | | | 1 422968 | SealID 422970 |

FIG. 42-88

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PartyRoleCode 422972 | | | | 0..1 422974 | PartyRoleCode 422976 |
| | | | | | | | | PartyFormattedName 422978 | | | | 0..1 422980 | LONG_Name 422982 |
| | | | | | | | | StatusCode 422984 | | | | 0..1 422986 | SealStatusCode 422988 |
| | | | | | | | BusinessTransactionDocumentReference 422990 | | | | | 0..n 422992 | ... |
| | | | | | | | | BusinessTransactionDocumentReference 422994 | | | | 0..1 422996 | BusinessTransactionDocumentReference 422998 |

FIG. 42-89

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 423000 | | | | 0..1 423002 | BusinessTransactionDocumentRelationshipRoleCode 423004 |
| | | | | | | | | BusinessTransactionDocumentRelationshipTypeCode 423006 | | | | 0..1 423008 | BusinessTransactionDocumentRelationshipTypeCode 423010 |
| | | | | | | | | TransportationDocumentTypeCode 423012 | | | | 0..1 423014 | TransportationDocumentTypeCode 423016 |
| | | | | | | | | TransportationDocumentNote 423018 | | | | 0..1 423020 | SHORT_Note 423022 |
| | | | | | | | | TransportationDocumentID 423024 | | | | 0..1 423026 | TransportationDocumentID 423028 |

FIG. 42-90

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Period 423030 | | | | 0..n 423032 | |
| | | | | | | | | | DateTimePeriod 423034 | | | 1 423036 | DateTimePeriod 423038 |
| | | | | | | | | | PeriodRoleCode 423040 | | | 1 423042 | PeriodRoleCode 423044 |
| | | | | | | | TextCollection 423046 | | | | | 0..1 423048 | ... |
| | | | | | | | | TextCollection 423050 | | | | 1 423052 | TextCollection 423054 |
| | | | | | | | Location 423056 | | | | | 0..n 423058 | ... |
| | | | | | | | | Location 423060 | | | | 1 423062 | BusinessTransactionDocumentLocation 423064 |
| | | | | | | | | RoleCode 423066 | | | | 1 423068 | LocationRoleCode 423070 |

FIG. 42-91

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 423072 | | | | 0..1 423074 | LocationTypeCode 423076 |
| | | | | | | | | Name 423078 | | | | 0..1 423080 | MEDIUM_Name 423082 |
| | | | | | | | | DateTime Periods 423084 | | | | 0..n 423086 | ... |
| | | | | | | | | | RequestedFulfillmentPeriod 423088 | | | 0..1 423090 | DateTimePeriod 423092 |
| | | | | | | | | | AcceptableFulfillmentPeriod 423094 | | | 0..1 423096 | DateTimePeriod 423098 |
| | | | | | | | | | PeriodRoleCode 423100 | | | 1 423102 | PeriodRoleCode 423104 |
| | | | | | | | DangerousGoods 423106 | | | | | 0..n 423108 | |

FIG. 42-92

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ID 423110 | | | | 0..1 423112 | DangerousGoodsID 423114 |
| | | | | | | | | RegulationsCode 423116 | | | | 0..1 423118 | DangerousGoodsRegulationsCode 423120 |
| | | | | | | | | HazardCode 423122 | | | | 0..1 423124 | DangerousGoodsHazardCode 423126 |
| | | | | | | | | FlashpointMeasureInterval 423128 | | | | 0..1 423130 | MeasureInterval 423132 |
| | | | | | | | | PackagingGroupCode 423134 | | | | 0..1 423136 | DangerousGoodsPackagingGroupCode 423138 |
| | | | | | | | | EmergencySchedule 423140 | | | | 0..1 423142 | DangerousGoodsEmergencySchedule 423144 |

FIG. 42-93

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportEmergencyCardCode 423146 | | | | 0..1 423148 | TransportEmergencyCardCode 423150 |
| | | | | | | | | DangerousGoodsLabelCode 423152 | | | | 0..1 423154 | DangerousGoodsLabelCode 423156 |
| | | | | | | | | DangerousGoodsLabelCode2 423158 | | | | 0..1 423160 | DangerousGoodsLabelCode 423162 |
| | | | | | | | | DangerousGoodsLabelCode3 423164 | | | | 0..1 423166 | DangerousGoodsLabelCode 423168 |
| | | | | | | | | PackagingInstructionTypeCode 423170 | | | | 0..1 423172 | PackagingInstructionTypeCode 423174 |

FIG. 42-94

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportMeansDescriptionCode 423176 | | | | 0..1 423178 | TransportMeansDescriptionCode 423180 |
| | | | | | | | | TransportationAuthorisationCode 423182 | | | | 0..1 423184 | DangerousGoodsTransportationAuthorisationCode 423186 |
| | | | | | | | | ContactInformation 423188 | | | | 0..n 423190 | ... |
| | | | | | | | | | ContactPersonFunctionTypeCode 423192 | | | 1 423194 | ContactPersonFunctionTypeCode 423196 |
| | | | | | | | | | Address 423198 | | | 1 423200 | Address 423202 |
| | | | | | | | | TextCollection 423204 | | | | 0..1 423206 | ... |

FIG. 42-95

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TextCollection 423208 | | | 1 423210 | TextCollection 423212 |
| PackageInformation 423214 | | | | | | PackageInformation 423216 | | | | | | 0..n 423218 | ... |
| | | | | | | | ID 423220 | | | | | 1 423222 | PackageInformationID 423224 |
| | | | | | | | PackageID 423226 | | | | | 0..1 423228 | PackageID 423230 |
| | | | | | | | PackageOrdinalNumberValue 423232 | | | | | 0..1 423234 | OrdinalNumberValue 423236 |
| | | | | | | | PackageNumberValue 423238 | | | | | 0..1 423240 | NumberValue 423242 |
| | | | | | | | PackageTypeCode 423244 | | | | | 0..1 423246 | PackageTypeCode 423248 |

FIG. 42-96

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PackagingLevelCode 423250 | | | | | 0..1 423252 | PackagingLevelCode 423254 |
| | | | | | | | PackageMarkingInstructionCode 423256 | | | | | 0..1 423258 | PackageMarkingInstructionCode 423260 |
| | | | | | | | PredecessorPackageID 423262 | | | | | 0..1 423264 | PackageID 423266 |
| | | | | | | | ItemAssignment 423268 | | | | | 0..n 423270 | ... |
| | | | | | | | | ShipmentRequestItemID 423272 | | | | 1 423274 | BusinessTransactionDocumentItemID 423276 |
| | | | | | | | | Quantity 423278 | | | | 0..n 423280 | ... |
| | | | | | | | | | Quantity 423282 | | | 1 423284 | Quantity 423286 |

FIG. 42-97

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 423288 | | | 0..1 423290 | QuantityRoleCode 423292 |
| | | | | | | | | | TypeCode 423294 | | | 0..1 423296 | QuantityTypeCode 423298 |
| | | | | | | | | BusinessTransactionDocumentReference 423300 | | | | 0..n 423302 | ... |
| | | | | | | | | | BusinessTransactionDocumentReference 423304 | | | 0..1 423306 | BusinessTransactionDocumentReference 423308 |
| | | | | | | | | | BusinessTransactionDocumentRelationshipRoleCode 423310 | | | 0..1 423312 | BusinessTransactionDocumentRelationshipRoleCode 423314 |

FIG. 42-98

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipTypeCode 423316 | | | 0..1 423318 | BusinessTransactionDocumentRelationshipTypeCode 423320 |
| | | | | | | | | | TransportationDocumentTypeCode 423322 | | | 0..1 423324 | TransportationDocumentTypeCode 423326 |
| | | | | | | | | | TransportationDocumentNote 423328 | | | 0..1 423330 | SHORT_Note 423332 |
| | | | | | | | | | TransportationDocumentID 423334 | | | 0..1 423336 | TransportationDocumentID 423338 |
| | | | | | | | | | DateTimePeriod 423340 | | | 0..n 423342 | ... |

FIG. 42-99

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | DateTimePeriod 423344 | | 1 423346 | DateTimePeriod 423348 |
| | | | | | | | | | | PeriodRoleCode 423350 | | 1 423352 | PeriodRoleCode 423354 |
| | | | | | | | | TransportationGoodsIdentification 423356 | | | | 0..n 423358 | ... |
| | | | | | | | | | TransportationGoodsIdentifierTypeCode 423360 | | | 1 423362 | TransportationGoodsIdentifierTypeCode 423364 |
| | | | | | | | | | LowerBoundaryTransportationGoodsID 423366 | | | 0..1 423368 | TransportationGoodsID 423370 |

FIG. 42-100

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | UpperBoundaryTransportationGoodsID 423372 | | | 0..1 423374 | TransportationGoodsID 423376 |
| | | | | | | | TransportationUnitResourceInformationAssignment 423378 | | | | | 0..n 423380 | ... |
| | | | | | | | | ShipmentRequestResourceInformationID 423382 | | | | 1 423384 | ResourceInformationID 423386 |
| | | | | | | | | Quantity 423388 | | | | 0..n 423390 | ... |
| | | | | | | | | | Quantity 423392 | | | 1 423394 | Quantity 423396 |
| | | | | | | | | | RoleCode 423398 | | | 0..1 423400 | QuantityRoleCode 423402 |

FIG. 42-101

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 423404 | | | 0..1 423406 | QuantityTypeCode 423408 |
| | | | | | | | Quantity 423410 | | | | | 0..n 423412 | ... |
| | | | | | | | | Quantity 423414 | | | | 1 423416 | Quantity 423418 |
| | | | | | | | | RoleCode 423420 | | | | 0..1 423422 | QuantityRoleCode 423424 |
| | | | | | | | | TypeCode 423426 | | | | 0..1 423428 | QuantityTypeCode 423430 |
| | | | | | | | TextCollection 423432 | | | | | 0..1 423434 | ... |
| | | | | | | | | TextCollection 423436 | | | | 1 423438 | TextCollection 423440 |
| Item 423442 | | | | | | Item 423444 | | | | | | 0..n 423446 | ... |

FIG. 42-102

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ID 423448 | | | | | 1 423450 | BusinessTransactionDocumentItemID 423452 |
| | | | | | | | OriginCountryCode 423454 | | | | | 0..1 423456 | CountryCode 423458 |
| | | | | | | | DestinationCountryCode 423460 | | | | | 0..1 423462 | CountryCode 423464 |
| | | | | | | | ShippingTypeCode 423466 | | | | | 0..1 423468 | ShippingTypeCode 423470 |
| | | | | | | | HaulageArrangerCode 423472 | | | | | 0..1 423474 | HaulageArrangerCode 423476 |
| | | | | | | | TemperatureMeasureInterval 423478 | | | | | 0..1 423480 | MeasureInterval 423482 |

FIG. 42-103

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 423484 | | | | | 0..1 423486 | TransportationHandlingInstructionCode 423488 |
| | | | | | | | TransportationHandlingInstructionNote 423490 | | | | | 0..1 423492 | LONG_Note 423494 |
| ItemInformation 423496 | | | | | | | Amount 423498 | | | | | 0..n 423500 | ... |
| | | | | | | | | Amount 423502 | | | | 1 423504 | Amount 423506 |
| | | | | | | | | RoleCode 423508 | | | | 1 423510 | AmountRoleCode 423512 |
| | | | | | | | TextCollection 423514 | | | | | 0..1 423516 | ... |
| | | | | | | | | TextcCollection 423518 | | | | 1 423520 | TextCollection 423522 |

FIG. 42-104

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | NatureOfCargo 423524 | | | | | 0..n 423526 | … |
| | | | | | | | | ClassificationCode 423528 | | | | 1 423530 | NatureOfCargoClassificationCode 423532 |
| | | | | | | | Quantity 423534 | | | | | 0..n 423536 | … |
| | | | | | | | | Quantity 423538 | | | | 1 423540 | Quantity 423542 |
| | | | | | | | | RoleCode 423544 | | | | 0..1 423546 | QuantityRoleCode 423548 |
| | | | | | | | | TypeCode 423550 | | | | 0..1 423552 | QuantityTypeCode 423554 |
| | | | | | | | TransportationDocumentInformation 423556 | | | | | 0..n 423558 | … |

FIG. 42-105

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 423560 | | | | 0..1 423562 | TransportationDocumentTypeCode 423564 |
| | | | | | | | | TransportationDocumentNote 423566 | | | | 0..1 423568 | SHORT_Note 423570 |
| | | | | | | | | TransportationDocumentID 423572 | | | | 0..1 423574 | TransportationDocumentID 423576 |
| | | | | | | | | TransportationDocumentStatusCode 423578 | | | | 0..1 423580 | TransportationDocumentStatusCode 423582 |
| | | | | | | | | LanguageCode 423584 | | | | 0..1 423586 | LanguageCode 423588 |
| | | | | | | | | CommunicationMediumTypeCode 423590 | | | | 0..1 423592 | CommunicationMediumTypeCode 423594 |

FIG. 42-106

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RequiredIndicator 423596 | | | | 1 423598 | Indicator 423600 |
| | | | | | | | | OutputCopyNumberValue 423602 | | | | 0..1 423604 | NumberValue 423606 |
| | | | | | | | | OutputOriginalNumberValue 423608 | | | | 0..1 423610 | NumberValue 423612 |
| | | | | | | | | DateTimePeriod 423614 | | | | 0..n 423616 | ... |
| | | | | | | | | | DateTimePeriod 423618 | | | 1 423620 | DateTimePeriod 423622 |
| | | | | | | | | | PeriodRoleCode 423624 | | | 1 423626 | PeriodRoleCode 423628 |
| | | | | | | | BusinessTransactionDocumentReference 423630 | | | | | 0..n 423632 | ... |

FIG. 42-107

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 423634 | | | | 0..1 423636 | BusinessTransactionDocumentReference 423638 |
| | | | | | | | | BusinessTransactionDocumentRelationshipRoleCode 423640 | | | | 0..1 423642 | BusinessTransactionDocumentRelationshipRoleCode 423644 |
| | | | | | | | | BusinessTransactionDocumentRelationshipTypeCode 423646 | | | | 0..1 423648 | BusinessTransactionDocumentRelationshipTypeCode 423650 |
| | | | | | | | | TransportationDocumentTypeCode 423652 | | | | 0..1 423654 | TransportationDocumentTypeCode 423656 |

FIG. 42-108

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentNote 423658 | | | | 0..1 423660 | SHORT_Note 423662 |
| | | | | | | | | TransportationDocumentID 423664 | | | | 0..1 423666 | TransportationDocumentID 423668 |
| | | | | | | | | DateTimePeriod 423670 | | | | 0..n 423672 | ... |
| | | | | | | | | | RequestDateTimePeriod 423674 | | | 1 423676 | DateTimePeriod 423678 |
| | | | | | | | | | PeriodRoleCode 423680 | | | 1 423682 | PeriodRoleCode 423684 |
| | | | | | | | DangerousGoods 423686 | | | | | 0..n 423688 | ... |
| | | | | | | | | ID 423690 | | | | 0..1 423692 | DangerousGoodsID 423694 |

FIG. 42-109

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RegulationsCode 423696 | | | | 0..1 423698 | DangerousGoodsRegulationsCode 423700 |
| | | | | | | | | HazardCode 423702 | | | | 0..1 423704 | DangerousGoodsHazardCode 423706 |
| | | | | | | | | FlashpointMeasureInterval 423708 | | | | 0..1 423710 | MeasureInterval 423712 |
| | | | | | | | | PackagingGroupCode 423714 | | | | 0..1 423716 | DangerousGoodsPackagingGroupCode 423718 |
| | | | | | | | | EmergencySchedule 423720 | | | | 0..1 423722 | DangerousGoodsEmergencySchedule 423724 |
| | | | | | | | | TransportEmergencyCardCode 423726 | | | | 0..1 423728 | TransportEmergencyCardCode 423730 |

FIG. 42-110

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode 423732 | | | | 0..1 423734 | DangerousGoodsLabelCode 423736 |
| | | | | | | | | DangerousGoodsLabelCode2 423738 | | | | 0..1 423740 | DangerousGoodsLabelCode 423742 |
| | | | | | | | | DangerousGoodsLabelCode3 423744 | | | | 0..1 423746 | DangerousGoodsLabelCode 423748 |
| | | | | | | | | PackingInstructionTypeCode 423750 | | | | 0..1 423752 | PackingInstructionTypeCode 423754 |
| | | | | | | | | TransportMeansDescriptionCode 423756 | | | | 0..1 423758 | TransportMeansDescriptionCode 423760 |

FIG. 42-111

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationAuthorisationCode 423762 | | | | 0..1 423764 | DangerousGoodsTransportationAuthorisationCode 423766 |
| | | | | | | | | ContactInformation 423768 | | | | 0..n 423770 | ... |
| | | | | | | | | | ContactPersonFunctionTypeCode 423772 | | | 1 423774 | ContactPersonFunctionTypeCode 423776 |
| | | | | | | | | | Address 423778 | | | 1 423780 | Address 423782 |
| | | | | | | | | Quantity 423784 | | | | 0..n 423786 | ... |
| | | | | | | | | | Quantity 423788 | | | 1 423790 | Quantity 423792 |
| | | | | | | | | | RoleCode 423794 | | | 0..1 423796 | QuantityRoleCode 423798 |

FIG. 42-112

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 423800 | | | 0..1 423802 | QuantityTypeCode 423804 |
| | | | | | | | | TextCollection 423806 | | | | 0..1 423808 | ... |
| | | | | | | | | | TextCollection 423810 | | | 1 423812 | TextCollection 423814 |
| | | | | | | | | TransportationUnitResourceInformationAssignment 423816 | | | | 0..n 423818 | ... |
| | | | | | | | | | ShipmentRequestResourceInformationID 423820 | | | 1 423822 | ResourceInformationID 423824 |
| | | | | | | | | | Quantity 423826 | | | 0..n 423828 | ... |

FIG. 42-113

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | Quantity 423830 | | 1 423832 | Quantity 423834 |
| | | | | | | | | | | RoleCode 423836 | | 0..1 423838 | QuantityRoleCode 423840 |
| | | | | | | | | | | TypeCode 423842 | | 0..1 423844 | QuantityTypeCode 423846 |
| | | | | | | | TransportationStageAssignment 423848 | | | | | 0..n 423850 | ... |
| | | | | | | | | ShipmentRequestTransportationStageID 423852 | | | | 1 423854 | TransportationStageID 423856 |
| | | | | | | | | Quantity 423858 | | | | 0..n 423860 | ... |
| | | | | | | | | | Quantity 423862 | | | 1 423864 | Quantity 423866 |

FIG. 42-114

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 423868 | | | 0..1 423870 | QuantityRoleCode 423872 |
| | | | | | | | | | TypeCode 423874 | | | 0..1 423876 | QuantityTypeCode 423878 |
| | | | | | | | TransportationUnitResourceInformationAssignment 423880 | | | | | 0..n 423882 | ... |
| | | | | | | | | ShipmentRequestResourceInformationID 423884 | | | | 1 423886 | ResourceInformationID 423888 |
| | | | | | | | | Quantity 423890 | | | | 0..n 423892 | ... |
| | | | | | | | | | Quantity 423894 | | | 1 423896 | Quantity 423898 |

FIG. 42-115

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 423900 | | | 0..1 423902 | QuantityRoleCode 423904 |
| | | | | | | | | | TypeCode 423906 | | | 0..1 423908 | QuantityTypeCode 423910 |
| GovernmentalRequirementInformation 423912 | | | | | | | GovernmentalProcedure 423914 | | | | | 0..n 423916 | ... |
| | | | | | | | | TransportationGovernmentAgencyTypeCode 423918 | | | | 0..1 423920 | TransportationGovernmentAgencyTypeCode 423922 |
| | | | | | | | | TransportationMovementTypeCode 423924 | | | | 0..1 423926 | TransportationMovementTypeCode 423928 |

FIG. 42-116

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationGovernmentAgencyInvolvementStatusCode 423930 | | | | 0..1 423932 | TransportationGovernmentAgencyInvolvementStatusCode 423934 |
| | | | | | | | | TransportationGovernmentAgencyActionCode 423936 | | | | 0..1 423938 | TransportationGovernmentAgencyActionCode 423940 |
| | | | | | | | | TransportationGovernmentAgencyProcedureStatusCode 423942 | | | | 0..1 423944 | TransportationGovernmentAgencyProcedureStatusCode 423946 |
| | | | | | | | | Location 423948 | | | | 0..n 423950 | ... |

FIG. 42-117

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | Location 423952 | | | 1 423954 | BusinessTransactionDocumentLocation 423956 |
| | | | | | | | | | RoleCode 423958 | | | 1 423960 | LocationRoleCode 423962 |
| | | | | | | | | | TypeCode 423964 | | | 0..1 423966 | LocationTypeCode 423968 |
| | | | | | | | | | Name 423970 | | | 0..1 423972 | MEDIUM_Name 423974 |
| | | | | | | | | DateTime Period 423976 | | | | 0..n 423978 | ... |
| | | | | | | | | | DateTimePeriod 423980 | | | 1 423982 | DateTimePeriod 423984 |
| | | | | | | | | | PeriodRoleCode 423986 | | | 1 423988 | PeriodRoleCode 423990 |
| | | | | | | | | Seal 423992 | | | | 0..n 423994 | ... |

FIG. 42-118

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | ID 423996 | | | 1 423998 | SealID 424000 |
| | | | | | | | | | PartyRoleCode 424002 | | | 0..1 424004 | PartyRoleCode 424006 |
| | | | | | | | | | PartyFormattedName 424008 | | | 0..1 424010 | LONG_Name 424012 |
| | | | | | | | | | StatusCode 424014 | | | 0..1 424016 | SealStatusCode 424018 |
| | | | | | | | | TextCollection 424020 | | | | 0..n 424022 | ... |
| | | | | | | | | | TextCollection 424024 | | | 0..1 424026 | TextCollection 424028 |
| | | | | | | | | TransportationDocumentInformation 424030 | | | | 0..n 424032 | ... |

FIG. 42-119

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentTypeCode 424034 | | | 0..1 424036 | TransportationDocumentTypeCode 424038 |
| | | | | | | | | | TransportationDocumentNote 424040 | | | 0..1 424042 | SHORT_Note 424044 |
| | | | | | | | | | TransportationDocumentID 424046 | | | 0..1 424048 | TransportationDocumentID 424050 |
| | | | | | | | | | TransportationDocumentStatusCode 424052 | | | 0..1 424054 | TransportationDocumentStatusCode 424056 |
| | | | | | | | | | LanguageCode 424058 | | | 0..1 424060 | LanguageCode 424062 |

FIG. 42-120

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | CommunicationMediumTypeCode 424064 | | | 0..1 424066 | CommunicationMediumTypeCode 424068 |
| | | | | | | | | | RequiredIndicator 424070 | | | 1 424072 | Indicator 424074 |
| | | | | | | | | | OutputCopyNumberValue 424076 | | | 0..1 424078 | NumberValue 424080 |
| | | | | | | | | | OutputOriginalNumberValue 424082 | | | 0..1 424084 | NumberValue 424086 |
| | | | | | | | | | DateTimePeriod 424088 | | | 0..n 424090 | ... |
| | | | | | | | | | | DateTimePeriod 424092 | | 1 424094 | DateTimePeriod 424096 |

FIG. 42-121

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PeriodRoleCode 424098 | | 1 424100 | PeriodRoleCode 424102 |
| PartyInformation 424104 | | | | | | | Party 424106 | | | | | 0..n 424108 | ... |
| | | | | | | | | Party 424110 | | | | 1 424112 | BusinessTransactionDocumentParty 424114 |
| | | | | | | | | RoleCode 424116 | | | | 1 424118 | PartyRoleCode 424120 |
| | | | | | | | | FormattedName 424122 | | | | 0..1 424124 | LONG_Name 424126 |
| | | | | | | | | DateTimePeriods 424128 | | | | 0..n 424130 | ... |
| | | | | | | | | | RequestedFulfillmentPeriod 424132 | | | 0..1 424134 | DateTimePeriod 424136 |

FIG. 42-122

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | AcceptableFulfillmentPeriod 424138 | | | 0..1 424140 | DateTimePeriod 424142 |
| | | | | | | | | | PeriodRoleCode 424144 | | | 1 424146 | PeriodRoleCode 424148 |
| LocationInformation 424150 | | | | | | | Location 424152 | | | | | 0..n 424154 | ... |
| | | | | | | | | Location 424156 | | | | 1 424158 | BusinessTransactionDocumentLocation 424160 |
| | | | | | | | | RoleCode 424162 | | | | 1 424164 | LocationRoleCode 424166 |
| | | | | | | | | TypeCode 424168 | | | | 0..1 424170 | LocationTypeCode 424172 |
| | | | | | | | | Name 424174 | | | | 0..1 424176 | MEDIUM_Name 424178 |

FIG. 42-123

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Periods 424180 | | | | 0..n 424182 | ... |
| | | | | | | | | | RequestedFulfillmentPeriod 424184 | | | 0..1 424186 | DateTimePeriod 424188 |
| | | | | | | | | | AcceptableFulfillmentPeriod 424190 | | | 0..1 424192 | DateTimePeriod 424194 |
| | | | | | | | | | PeriodRoleCode 424196 | | | 1 424198 | PeriodRoleCode 424200 |
| TransportationGoodsInformation 424202 | | | | | | | ProductInformation 424204 | | | | | 0..n 424206 | ... |
| | | | | | | | | Product 424208 | | | | 0..1 424210 | BusinessTransactionDocumentProduct 424212 |

FIG. 42-124

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ProductDescription 424214 | | | | 0..1 424216 | SHORT_Description 424218 |
| | | | | | | | TransportationGoodsIdentification 424220 | | | | | 0..n 424222 | ... |
| | | | | | | | | TransportationGoodsIdentifierTypeCode 424224 | | | | 1 424226 | TransportationGoodsIdentifierTypeCode 424228 |
| | | | | | | | | LowerBoundaryTransportationGoodsID 424230 | | | | 1 424232 | TransportationGoodsID 424234 |
| | | | | | | | | UpperBoundaryTransportationGoodsID 424236 | | | | 0..1 424238 | TransportationGoodsID 424240 |

FIG. 42-125

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationChargesInformation 424242 | | | | | | TransportationChargesInformation 424244 | | | | | | 0..n 424246 | ... |
| | | | | | | | TransportationChargesUsageCode 424248 | | | | | 1 424250 | TransportationChargesUsageCode 424252 |
| | | | | | | | ShipmentRequestItemID 424254 | | | | | 0..1 424256 | BusinessTransactionDocumentItemID 424258 |
| | | | | | | | ShipmentRequestPartyStandardID 424260 | | | | | 0..1 424262 | PartyStandardID 424264 |
| | | | | | | | ShipmentRequestPartyInternalID 424266 | | | | | 0,,1 424268 | PartyInternalID 424270 |

FIG. 42-126

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ShipmentRequestResourceInformationID 424272 | | | | | 0..1 424274 | ResourceInformationID 424276 |
| | | | | | | | ShipmentRequestPackageInformationID 424278 | | | | | 0..1 424280 | PackageInformationID 424282 |
| | | | | | | | ShipmentRequestTransportationStageID 424284 | | | | | 0..1 424286 | TransportationStageID 424288 |
| | | | | | | | TransportationCharges 424290 | | | | | 0..1 424292 | ... |
| | | | | | | | | ID 424294 | | | | 1 424296 | TransportationChargesID 424298 |

FIG. 42-127

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | FreightAgreementID 424300 | | | | 1 424302 | FreightAgreementID 424304 |
| | | | | | | | | OriginCode 424306 | | | | 0..1 424308 | TransportationChargesOriginCode 424310 |
| | | | | | | | | TariffID 424312 | | | | 0..1 424314 | TransportationChargesTariffID 424316 |
| | | | | | | | | CalculationSheetID 424318 | | | | 1 424320 | TransportationChargesCalculationSheetID 424322 |
| | | | | | | | | Location 424324 | | | | 0..n 424326 | ... |
| | | | | | | | | | Location 424328 | | | 1 424330 | BusinessTransactionDocumentLocation 424332 |

FIG. 42-128

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 424334 | | | 1 424336 | LoactionRoleCode 424338 |
| | | | | | | | | | TypeCode 424340 | | | 0..1 424342 | LocationTypeCode 424344 |
| | | | | | | | | | Name 424346 | | | 0..1 424348 | MEDIUM_Name 424350 |
| | | | | | | | | | DateTimePeriods 424352 | | | 0..n 424354 | ... |
| | | | | | | | | | | RequestedFulfillmentPeriod 424356 | | 0..1 424358 | DateTimePeriod 424360 |
| | | | | | | | | | | AcceptableFulfillmentPeriod 424362 | | 0..1 424364 | DateTimePeriod 424366 |
| | | | | | | | | | | PeriodRoleCode 424368 | | 1 424370 | PeriodRoleCode 424372 |

FIG. 42-129

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TextCollection 424374 | | | | 0..1 424376 | ... |
| | | | | | | | | | TextCollection 424378 | | | 1 424380 | TextCollection 424382 |
| | | | | | | | | Currency 424384 | | | | 0..n 424386 | ... |
| | | | | | | | | | Code 424388 | | | 1 424390 | CurrencyCode 424392 |
| | | | | | | | | | RoleCode 424394 | | | 1 424396 | CurrencyRoleCode 424398 |
| | | | | | | | | | UsageCode 424400 | | | 0..1 424402 | CurrencyUsageCode 424404 |
| | | | | | | | | Exchange Rate 424406 | | | | 0..n 424408 | ... |
| | | | | | | | | | ExchangeRate 424410 | | | 1 424412 | ExchangeRate 424414 |

FIG. 42-130

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 424416 | | | 0..1 424418 | ExchangeRateTypeCode 424420 |
| | | | | | | | | PercentElement 424422 | | | | 0..n 424424 | ... |
| | | | | | | | | | PercentRoleCode 424426 | | | 1 424428 | PercentRoleCode 424430 |
| | | | | | | | | | Percent 424432 | | | 1 424434 | Percent 424436 |
| | | | | | | | | | TransportationChargesPercentCalculationBaseCode 424438 | | | 0..1 424440 | TransportationChargesPercentCalculationBaseCode 424442 |
| | | | | | | | | | StatusCode 424444 | | | 0..1 424446 | TransportationChargesPercentElementStatusCode 424448 |

FIG. 42-131

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTimePeriod 424450 | | | | 0..n 424452 | ... |
| | | | | | | | | | DateTimePeriod 424454 | | | 1 424456 | DateTimePeriod 424458 |
| | | | | | | | | | PeriodRoleCode 424460 | | | 1 424462 | PeriodRoleCode 424464 |
| | | | | | | | | BusinessTransactionDocumentReference 424466 | | | | 0..n 424468 | ... |
| | | | | | | | | | BusinessTransactionDocumentReference 424470 | | | 0..1 424472 | BusinessTransactionDocumentReference 424474 |

FIG. 42-132

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipRoleCode 424476 | | | 0..1 424478 | BusinessTransactionDocumentRelationshipRoleCode 424480 |
| | | | | | | | | | BusinessTransactionDocumentRelationshipTypeCode 424482 | | | 0..1 424484 | BusinessTransactionDocumentRelationshipTypeCode 424486 |
| | | | | | | | | | TransportationDocumentTypeCode 424488 | | | 0..1 424490 | TransportationDocumentTypeCode 424492 |
| | | | | | | | | | TransportationDocumentNote 424494 | | | 0..1 424496 | SHORT_Note 424498 |

FIG. 42-133

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentID 424500 | | | 0..1 424502 | TransportationDocumentID 424504 |
| | | | | | | | | TaxDetail 424506 | | | | 0..n 424508 | ... |
| | | | | | | | | | ProductTax 424510 | | | 1 424512 | ProductTax 424514 |
| | | | | | | | | PaymentInstruction 424516 | | | | 0..n 424518 | ... |
| | | | | | | | | | PaymentInstruction 424520 | | | 1 424522 | PaymentInstruction 424524 |
| | | | | | | | | | TransportationChargesElementCategoryCode 424526 | | | 0..1 424528 | TransportationChargesElementCategoryCode 424530 |

FIG. 42-134

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementSubCategoryCode 424532 | | | 0..1 424534 | TransportationChargesElementSubCategoryCode 424536 |
| | | | | | | | | | TransportationChargesPaymentArrangementCode 424538 | | | 0..1 424540 | TransportationChargesPaymentArrangementCode 424542 |
| | | | | | | | | CashDiscountTerms 424544 | | | | 0..1 424546 | ... |
| | | | | | | | | | CashDiscountTerms 424548 | | | 1 424550 | CashDiscountTerms 424552 |

FIG. 42-135

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementCategoryCode 424554 | | | 0..1 424556 | TransportationChargesElementCategoryCode 424558 |
| | | | | | | | | | TransportationChargesElementSubCategoryCode 424560 | | | 0..1 424562 | TransportationChargesElementSubCategoryCode 424564 |
| | | | | | | | | Element 424566 | | | | 0..n 424568 | ... |
| | | | | | | | | | CategoryCode 424570 | | | 1 424572 | TransportationChargesElementCategoryCode 424574 |
| | | | | | | | | | SubCategoryCode 424576 | | | 1 424578 | TransportationChargesElementSubCategoryCode 424580 |

FIG. 42-136

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 424582 | | | 1 424584 | TransportationChargesElementTypeCode 424586 |
| | | | | | | | | | CalculationResolutionCode 424588 | | | 1 424590 | TransportationChargesElementCalculationResolutionCode 424592 |
| | | | | | | | | | TransportationChargesPaymentArrangementCode 424594 | | | 0...1 424596 | TransportationChargesPaymentArrangementCode 424598 |
| | | | | | | | | | Location 424600 | | | 0..n 424602 | ... |
| | | | | | | | | | | Location 424604 | | 1 424606 | BusinessTransactionDocumentLocation 424608 |

FIG. 42-137

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RoleCode 424610 | | 1 424612 | LocationRoleCode 424614 |
| | | | | | | | | | | TypeCode 424616 | | 0..1 424618 | LocationTypeCode 424620 |
| | | | | | | | | | | Name 424622 | | 0..1 424624 | MEDIUM_Name 424626 |
| | | | | | | | | | | DateTimePeriods 424628 | | 0..n 424630 | ... |
| | | | | | | | | | | | RequestedFulfillmentPeriod 424632 | 0..1 424634 | DateTimePeriod 424636 |
| | | | | | | | | | | | AcceptableFulfillmentPeriod 424638 | 0..1 424640 | DateTimePeriod 424642 |
| | | | | | | | | | | | PeriodRoleCode 424644 | 1 424646 | PeriodRoleCode 424648 |

FIG. 42-138

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TextCollection 424650 | | | 0..1 424652 | … |
| | | | | | | | | | | TextCollection 424654 | | 1 424656 | TextCollection 424658 |
| | | | | | | | | | Currency 424660 | | | 0..n 424662 | … |
| | | | | | | | | | | Code 424664 | | 1 424666 | CurrencyCode 424668 |
| | | | | | | | | | | RoleCode 424670 | | 1 424672 | CurrencyRoleCode 424674 |
| | | | | | | | | | | UsageCode 424676 | | 0..1 424678 | CurrencyUsageCode 424680 |
| | | | | | | | | | RateElement 424682 | | | 0..n 424684 | … |
| | | | | | | | | | | ID 424686 | | 1 424688 | TransportationChargesElementRateElementID 424690 |

FIG. 42-139

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | Amount 424692 | | 1 424694 | Amount 424696 |
| | | | | | | | | | | BaseQuantity 424698 | | 1 424700 | Quantity 424702 |
| | | | | | | | | | | TransportationChargesRateTypeCode 424704 | | 0..1 424706 | TransportationChargesRateTypeCode 424708 |
| | | | | | | | | | | TransportationChargesRateRoleCode 424710 | | 1 424712 | TransportationChargesRateRoleCode 424714 |
| | | | | | | | | | | TransportationChargesRateElementStatusCode 424716 | | 0..1 424718 | TransportationChargesRateElementStatusCode 424720 |
| | | | | | | | | | PercentElement 424722 | | | 0..n 424724 | ... |

FIG. 42-140

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PercentRoleCode 424726 | | 1 424728 | PercentRoleCode 424730 |
| | | | | | | | | | | Percent 424732 | | 1 424734 | Percent 424736 |
| | | | | | | | | | | TransportationChargesPercentCalculationBaseCode 424738 | | 0..1 424740 | TransportationChargesPercentCalculationBaseCode 424742 |
| | | | | | | | | | | StatusCode 424744 | | 0..1 424746 | TransportationChargesPercentElementStatusCode 424748 |
| | | | | | | | | | AmountElement 424750 | | | 0..n 424752 | ... |
| | | | | | | | | | | Amount 424754 | | 1 424756 | Amount 424758 |

FIG. 42-141

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | AmountRoleCode 424760 | | 1 424762 | AmountRoleCode 424764 |
| | | | | | | | | | | TransportationChargesAmountElementStatusCode 424766 | | 0..1 424768 | TransportationChargesAmountElementStatusCode 424770 |
| | | | | | | | | | | RateElementAssignment 424772 | | 0..n 424774 | ... |
| | | | | | | | | | | | TransportationChargesElementRateElementID 424776 | 1 424778 | TransportationChargesElementRateElementID 424780 |
| | | | | | | | | | CalculationBase 424782 | | | 0..n 424784 | ... |

FIG. 42-142

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesElementCalculationBaseCode 424786 | | 1 424788 | TransportationChargesElementCalculationBaseCode 424790 |
| | | | | | | | | | | BaseQuantity 424792 | | 0..1 424794 | Quantity 424796 |
| | | | | | | | | | | BaseQuantityRoleCode 424798 | | 0..1 424800 | QuantityRoleCode 424802 |
| | | | | | | | | | | BaseQuantityTypeCode 424804 | | 0..1 424806 | QuantityTypeCode 424808 |
| | | | | | | | | | TaxDetail 424810 | | | 0..n 424812 | ... |
| | | | | | | | | | | Product Tax 424814 | | 1 424816 | ProductTax 424818 |

FIG. 42-143

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTimePeriod 424820 | | | 0..n 424822 | ... |
| | | | | | | | | | | DateTimePeriod 424824 | | 1 424826 | DateTimePeriod 424828 |
| | | | | | | | | | | PeriodRoleCode 424830 | | 1 424832 | PeriodRoleCode 424834 |
| | | | | | | | | | CostDistribution 424836 | | | 0..n 424838 | ... |
| | | | | | | | | | | AccountingCodingBlockAssignment 424840 | | 1 424842 | AccountingCodingBlockAssignment 424844 |

To FIG. 44-14
To FIG. 44-10
To FIG. 44-16
~ Quantity
44148
~ TransportationUnitResourceInformationAssignment
44146
~ Quantity
44150
~ TextCollection
44152
TransportationChargesInformation
44154
TransportationCharges
44156
~ Location
44158
~ TextCollection
44162
~ Currency
44164
~ ExchangeRate
44166
~ PercentElement
44168
~ DateTimePeriod
44170
~ BTDReference
44172

| Package | level 1 | level 2 | level 3 | level 4 | level 5 | level 6 | level 7 | level 8 | Cardinality | Data Type Name |
|---|---|---|---|---|---|---|---|---|---|---|
| WaybillNotification Message 450000 | WaybillNotificationMessage 450002 | | | | | | | | | ShipmentRequestRequestMessage 450004 |
| MessageHeader 450006 | | MessageHeader 450008 | | | | | | | 1 450010 | BusinessDocumentMessageHeader 450012 |
| HouseShipment 450014 | | HouseShipment 450016 | | | | | | | 1 450018 | ... |
| | | | @actioncode 450020 | | | | | | 1 450022 | ActionCode 450024 |
| | | | ID 450026 | | | | | | 1 450028 | BusinessTransactionDocumentID 450030 |
| | | | DeliveryTerms 450032 | | | | | | 0..1 450034 | DeliveryTerms 450036 |
| HeaderInformation 450038 | | | DateTimePeriods 450040 | | | | | | 0..n 450042 | ... |

FIG. 45-2

| Package | level 1 | level 2 | level 3 | level 4 | level 5 | level 6 | level 7 | level 8 | Cardinality | Data Type Name |
|---|---|---|---|---|---|---|---|---|---|---|
| | | | | RequestedFulfillmentPeriod 450044 | | | | | 0..1 450046 | DateTimePeriod 450048 |
| | | | | AcceptableFulfillmentPeriod 450050 | | | | | 0..1 450052 | DateTimePeriod 450054 |
| | | | | PeriodRoleCode 450056 | | | | | 1 450058 | PeriodRoleCode 450060 |
| | | | NatureOfCargo 450062 | | | | | | 0..n 450064 | ... |
| | | | | ClassificationCode 450066 | | | | | 1 450068 | NatureOfCargoClassificationCode 450070 |
| | | | TotalQuantity 450072 | | | | | | 0..n 450074 | ... |
| | | | | Quantity 450076 | | | | | 1 450078 | Quantity 450080 |
| | | | | QuantityRoleCode 450082 | | | | | 0..1 450084 | QuantityRoleCode 450086 |

FIG. 45-3

| Package | level 1 | level 2 | level 3 | level 4 | level 5 | level 6 | level 7 | level 8 | Cardinality | Data Type Name |
|---|---|---|---|---|---|---|---|---|---|---|
| | | | | QuantityTypeCode 450088 | | | | | 0..1 450090 | QuantityTypeCode 450092 |
| | | | TotalAmount 450094 | | | | | | 0..n 450096 | ... |
| | | | | Amount 450098 | | | | | 1 450100 | Amount 450102 |
| | | | | AmountRoleCode 450104 | | | | | 1 450106 | AmountRoleCode 450108 |
| | | | TextCollection 450110 | | | | | | 0..1 450112 | ... |
| | | | | TextCollection 450114 | | | | | 1 450116 | TextCollection 450118 |
| | | | TransportationServiceRequirement 450120 | | | | | | 0..n 450122 | ... |
| | | | | TransportationServiceRequirementCode 450124 | | | | | 0..1 450126 | TransportationServiceRequirementCode 450128 |

FIG. 45-4

| Package | level 1 | level 2 | level 3 | level 4 | level 5 | level 6 | level 7 | level 8 | Cardinality | Data Type Name |
|---|---|---|---|---|---|---|---|---|---|---|
| | | | | AdditionalTransportationServiceRequirementCode 450130 | | | | | 0..1 450132 | TransportationServiceRequirementCode 450134 |
| | | | | TransportationContractConditionCode 450136 | | | | | 0..1 450138 | TransportationContractConditionCode 450140 |
| | | | | TransportServiceLevelCode 450142 | | | | | 0..1 450144 | TransportServiceLevelCode 450146 |
| | | | | NatureOfCargoClassificationCode 450148 | | | | | 0..1 450150 | NatureOfCargoClassificationCode 450152 |
| | | | TransportationDocumentInformation 450154 | | | | | | 0..n 450156 | ... |
| | | | | TransportationDocumentTypeCode 450158 | | | | | 0..1 450160 | TransportationDocumentTypeCode 450162 |

FIG. 45-5

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationDocumentNote 450164 | | | | | 0..1 450166 | SHORT_Note 450168 |
| | | | | TransportationDocumentID 450170 | | | | | 0..1 450172 | TransportationDocumentID 450174 |
| | | | | TransportationDocumentStatusCode 450176 | | | | | 0..1 450178 | TransportationDocumentStatusCode 450180 |
| | | | | LanguageCode 450182 | | | | | 0..1 450184 | LanguageCode 450186 |
| | | | | CommunicationMediumTypeCode 450188 | | | | | 0..1 450190 | CommunicationMediumTypeCode 450192 |
| | | | | Requiredindicator 450194 | | | | | 1 450196 | Indicator 450198 |
| | | | | OutputCopyNumberValue 450200 | | | | | 0..1 450202 | NumberValue 450204 |

FIG. 45-6

| Package | level 1 | level 2 | level 3 | level 4 | level 5 | level 6 | level 7 | level 8 | Cardinality | Data Type Name |
|---|---|---|---|---|---|---|---|---|---|---|
| | | | | OutputOriginalNumberValue 450206 | | | | | 0..1 450208 | NumberValue 450210 |
| | | | | DateTimePeriod 450212 | | | | | 0..n 450214 | ... |
| | | | | | DateTimePeriod 450216 | | | | 1 450218 | DateTimePeriod 450220 |
| | | | | | PeriodRoleCode 450222 | | | | 1 450224 | PeriodRoleCode 450226 |
| | | | BusinessTransactionDocumentReference 450228 | | | | | | 0..n 450230 | ... |
| | | | | BusinessTransactionDocumentReference 450232 | | | | | 0..1 450234 | BusinessTransactionDocumentReference 450236 |
| | | | | BusinessTransactionDocumentRelationshipRoleCode 450238 | | | | | 0..1 450240 | BusinessTransactionDocumentRelationshipRoleCode 450242 |

FIG. 45-7

| Package | level 1 | level 2 | level 3 | level 4 | level 5 | level 6 | level 7 | level 8 | Cardinality | Data Type Name |
|---|---|---|---|---|---|---|---|---|---|---|
| | | | | BusinessTransactionDocumentRelationshipTypeCode 450244 | | | | | 0..1 450246 | BusinessTransactionDocumentRelationshipTypeCode 450248 |
| | | | | TransportationDocumentTypeCode 450250 | | | | | 0..1 450252 | TransportationDocumentTypeCode 450254 |
| | | | | TransportationDocumentNote 450256 | | | | | 0..1 450258 | SHORT_Note 450260 |
| | | | | TransportationDocumentID 450262 | | | | | 0..1 450264 | TransportationDocumentID 450266 |
| | | | | DateTimePeriod 450268 | | | | | 0..n 450270 | ... |
| | | | | | DateTimePeriod 450272 | | | | 1 450274 | DateTimePeriod 450276 |
| | | | | | PeriodRoleCode 450278 | | | | 1 450280 | PeriodRoleCode 450282 |

FIG. 45-8

| Package | level 1 | level 2 | level 3 | level 4 | level 5 | level 6 | level 7 | level 8 | Cardinality | Data Type Name |
|---|---|---|---|---|---|---|---|---|---|---|
| GovernmentalRequirementInformation 450284 | | | GovernmentalProcedure 450286 | | | | | | 0..n 450288 | ... |
| | | | | TransportationGovernmentAgencyTypeCode 450290 | | | | | 0..1 450292 | TransportationGovernmentAgencyTypeCode 450294 |
| | | | | TransportationMovementTypeCode 450296 | | | | | 0..1 450298 | TransportationMovementTypeCode 450300 |
| | | | | TransportationGovernmentAgencyInvolvementStatusCode 450302 | | | | | 0..1 450304 | TransportationGovernmentAgencyInvolvementStatusCode 450306 |
| | | | | TransportationGovernmentAgencyActionCode 450308 | | | | | 0..1 450310 | TransportationGovernmentAgencyActionCode 450312 |

FIG. 45-9

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationGovernmentAgencyProcedureStatusCode 450314 | | | | | 0..1 450316 | TransportationGovernmentAgencyProcedureStatusCode 450318 |
| | | | | Location 450320 | | | | | 0..n 450322 | ... |
| | | | | | Location 450324 | | | | 1 450326 | BusinessTransactionDocumentLocation 450328 |
| | | | | | RoleCode 450330 | | | | 1 450332 | LocationRoleCode 450334 |
| | | | | | TypeCode 450336 | | | | 0..1 450338 | LocationTypeCode 450340 |
| | | | | | Name 450342 | | | | 0..1 450344 | MEDIUM_Name 450346 |
| | | | | DateTimePeriod 450348 | | | | | 0..n 450350 | ... |
| | | | | | DateTimePeriod 450352 | | | | 1 450354 | DateTimePeriod 450356 |

FIG. 45-10

| Package | level 1 | level 2 | level 3 | level 4 | level 5 | level 6 | level 7 | level 8 | Cardinality | Data Type Name |
|---|---|---|---|---|---|---|---|---|---|---|
| | | | | | PeriodRoleCode 450358 | | | | 1 450360 | PeriodRoleCode 450362 |
| | | | | Seal 450364 | | | | | 0..n 450366 | ... |
| | | | | | ID 450368 | | | | 0..1 450370 | SealID 450372 |
| | | | | | PartyRoleCode 450374 | | | | 0..1 450376 | PartyRoleCode 450378 |
| | | | | | PartyFormattedName 450380 | | | | 0..1 450382 | LONG_Name 450384 |
| | | | | | StatusCode 450386 | | | | 0..1 450388 | SealStatusCode 450390 |
| | | | | TextCollection 450392 | | | | | 0..1 450394 | ... |
| | | | | | TextCollection 450396 | | | | 1 450398 | TextCollection 450400 |
| | | | | TransportationDocumentInformation 450402 | | | | | 0..n 450404 | ... |

FIG. 45-11

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentTypeCode 450406 | | | | 0..1 450408 | TransportationDocumentTypeCode 450410 |
| | | | | | TransportationDocumentNote 450412 | | | | 0..1 450414 | SHORT_Note 450416 |
| | | | | | TransportationDocumentID 450418 | | | | 0..1 450420 | TransportationDocumentID 450422 |
| | | | | | TransportationDocumentStatusCode 450424 | | | | 0..1 450426 | TransportationDocumentStatusCode 450428 |
| | | | | | LanguageCode 450430 | | | | 0..1 450432 | LanguageCode 450434 |
| | | | | | CommunicationMediumTypeCode 450436 | | | | 0..1 450438 | CommunicationMediumTypeCode 450440 |
| | | | | | RequiredIndicator 450442 | | | | 1 450444 | Indicator 450446 |

FIG. 45-12

| Package | level 1 | level 2 | level 3 | level 4 | level 5 | level 6 | level 7 | level 8 | Cardinality | Data Type Name |
|---|---|---|---|---|---|---|---|---|---|---|
| | | | | | OutputCopyNumberValue 450448 | | | | 0..1 450450 | NumberValue 450452 |
| | | | | | OutputOriginalNumberValue 450454 | | | | 0..1 450456 | NumberValue 450458 |
| | | | | | DateTimePeriod 450460 | | | | 0..n 450462 | ... |
| | | | | | | DateTimePeriod 450464 | | | 1 450466 | DateTimePeriod 450468 |
| | | | | | | PeriodRoleCode 450470 | | | 1 450472 | PeriodRoleCode 450474 |
| PartyInformation 450476 | | | Party 450478 | | | | | | 1..n 450480 | ... |
| | | | | Party 450482 | | | | | 1 450484 | BusinessTransactionDocumentParty 450486 |
| | | | | RoleCode 450488 | | | | | 1 450490 | PartyRoleCode 450492 |
| | | | | FormattedName 450494 | | | | | 0..1 450496 | LONG_Name 450498 |

FIG. 45-13

| Package | level 1 | level 2 | level 3 | level 4 | level 5 | level 6 | level 7 | level 8 | Cardinality | Data Type Name |
|---|---|---|---|---|---|---|---|---|---|---|
| | | | | Amount 450500 | | | | | 0..n 450502 | ... |
| | | | | | Amount 450504 | | | | 1 450506 | Amount 450508 |
| | | | | | RoleCode 450510 | | | | 1 450512 | AmountRoleCode 450514 |
| | | | | DateTimePeriods 450516 | | | | | 0..n 450518 | ... |
| | | | | | RequestedFulfillmentPeriod 450520 | | | | 0..1 450522 | DateTimePeriod 450524 |
| | | | | | AcceptableFulfillmentPeriod 450526 | | | | 0..1 450528 | DateTimePeriod 450530 |
| | | | | | PeriodRoleCode 450532 | | | | 1 450534 | PeriodRoleCode 450536 |
| | | | | TransportationDocumentInformation 450538 | | | | | 0..n 450540 | ... |

FIG. 45-14

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentTypeCode 450542 | | | | 0..1 450544 | TransportationDocumentTypeCode 450546 |
| | | | | | TransportationDocumentNote 450548 | | | | 0..1 450550 | SHORT_Note 450552 |
| | | | | | TransportationDocumentID 450554 | | | | 0..1 450556 | TransportationDocumentID 450558 |
| | | | | | TransportationDocumentStatusCode 450560 | | | | 0..1 450562 | TransportationDocumentStatusCode 450564 |
| | | | | | LanguageCode 450566 | | | | 0..1 450568 | LanguageCode 450570 |
| | | | | | CommunicationMediumTypeCode 450572 | | | | 0..1 450574 | CommunicationMediumTypeCode 450576 |
| | | | | | RequiredIndicator 450578 | | | | 1 450580 | Indicator 450582 |

FIG. 45-15

| Package | level 1 | level 2 | level 3 | level 4 | level 5 | level 6 | level 7 | level 8 | Cardinality | Data Type Name |
|---|---|---|---|---|---|---|---|---|---|---|
| | | | | | OutputCopyNumberValue 450584 | | | | 0..1 450586 | NumberValue 450588 |
| | | | | | OutputOriginalNumberValue 450590 | | | | 0..1 450592 | NumberValue 450594 |
| | | | | | DateTimePeriod 450596 | | | | 0..n 450598 | ... |
| | | | | | | DateTimePeriod 450600 | | | 1 450602 | DateTimePeriod 450604 |
| | | | | | | PeriodRoleCode 450606 | | | 1 450608 | PeriodRoleCode 450610 |
| | | | | BusinessTransactionDocumentReference 450612 | | | | | 0..n 450614 | ... |
| | | | | | BusinessTransactionDocumentReference 450616 | | | | 0..1 450618 | BusinessTransactionDocumentReference 450620 |

FIG. 45-16

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentRelationshipRoleCode 450622 | | | | 0..1 450624 | BusinessTransactionDocumentRelationshipRoleCode 450626 |
| | | | | | BusinessTransactionDocumentRelationshipTypeCode 450628 | | | | 0..1 450630 | BusinessTransactionDocumentRelationshipTypeCode 450632 |
| | | | | | TransportationDocumentTypeCode 450634 | | | | 0..1 450636 | TransportationDocumentTypeCode 450638 |
| | | | | | TransportationDocumentNote 450640 | | | | 0..1 450642 | SHORT_Note 450644 |
| | | | | | TransportationDocumentID 450646 | | | | 0..1 450648 | TransportationDocumentID 450650 |
| | | | | | DateTimePeriod 450652 | | | | 0..n 450654 | ... |
| | | | | | | DateTimePeriod 450656 | | | 1 450658 | DateTimePeriod 450660 |

FIG. 45-17

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | PeriodRoleCode 450662 | | | 1 450664 | PeriodRoleCode 450666 |
| LocationInformation 450668 | | | Location 450670 | | | | | | 0..n 450672 | |
| | | | | Location 450674 | | | | | 1 450676 | BusinessTransactionDocumentLocation 450678 |
| | | | | RoleCode 450680 | | | | | 1 450682 | LocationRoleCode 450684 |
| | | | | TypeCode 450686 | | | | | 0..1 450688 | LocationTypeCode 450690 |
| | | | | Name 450692 | | | | | 0..1 450694 | MEDIUM_Name 450696 |
| | | | | DateTimePeriods 450698 | | | | | 0..n 450700 | ... |
| | | | | | RequestedFulfillmentPeriod 450702 | | | | 0..1 450704 | DateTimePeriod 450706 |
| | | | | | AcceptableFulfillmentPeriod 450708 | | | | 0..1 450710 | DateTimePeriod 450712 |

FIG. 45-18

| Package | level 1 | level 2 | level 3 | level 4 | level 5 | level 6 | level 7 | level 8 | Cardinality | Data Type Name |
|---|---|---|---|---|---|---|---|---|---|---|
| | | | | | PeriodRoleCode 450714 | | | | 1 450716 | PeriodRoleCode 450718 |
| TransportationStageInformation 450720 | | | TransportationStage 450722 | | | | | | 0..n 450724 | ... |
| | | | | ID 450726 | | | | | 1 450728 | TransportationStageID 450730 |
| | | | | OrdinalNumberValue 450732 | | | | | 0..1 450734 | OrdinalNumberValue 450736 |
| | | | | TypeCode 450738 | | | | | 0..1 450740 | TransportationStageTypeCode 450742 |
| | | | | JourneyID 450744 | | | | | 0..1 450746 | JourneyID 450748 |
| | | | | TransportModeCode 450750 | | | | | 0..1 450752 | TransportModeCode 450754 |
| | | | | TransportMeansDescriptionCode 450756 | | | | | 0..1 450758 | TransportMeansDescriptionCode 450760 |

FIG. 45-19

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportMeansDescription 450762 | | | | | 0..1 450764 | SHORT_Description 450766 |
| | | | | TransportMeansID 450768 | | | | | 0..1 450770 | TransportMeansID 450772 |
| | | | | TransportMeansHomeCountryCode 450774 | | | | | 0..1 450776 | CountryCode 450778 |
| | | | | TransportMeansOwnershipTypeCode 450780 | | | | | 0..1 450782 | TransportMeansOwnershipTypeCode 450784 |
| | | | | CarrierStandardID 450786 | | | | | 0..1 450788 | PartyStandardID 450790 |
| | | | | CarrierFormattedName 450792 | | | | | 0..1 450794 | LONG_Name 450796 |
| | | | | TransportationTransitDirectionCode 450798 | | | | | 0..1 450800 | TransportationTransitDirectionCode 450802 |

FIG. 45-20

| Package | level 1 | level 2 | level 3 | level 4 | level 5 | level 6 | level 7 | level 8 | Cardinality | Data Type Name |
|---|---|---|---|---|---|---|---|---|---|---|
| | | | | CalculatedDistanceMeasure 450804 | | | | | 0..1 450806 | Measure 450808 |
| | | | | GivenDistanceMeasure 450810 | | | | | 0..1 450812 | Measure 450814 |
| | | | | Location 450816 | | | | | 1..n 450818 | ... |
| | | | | | Location 450820 | | | | 1 450822 | BusinessTransactionDocumentLocation 450824 |
| | | | | | RoleCode 450826 | | | | 1 450828 | LocationRoleCode 450830 |
| | | | | | TypeCode 450832 | | | | 0..1 450834 | LocationTypeCode 450836 |
| | | | | | Name 450838 | | | | 0..1 450840 | MEDIUM_Name 450842 |
| | | | | | DateTimePeriods 450844 | | | | 0..n 450846 | ... |
| | | | | | | RequestedFulfillmentPeriod 450848 | | | 0..1 450850 | DateTimePeriod 450852 |

FIG. 45-21

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | AcceptableFulfillmentPeriod 450854 | | | 0..1 450856 | DateTimePeriod 450858 |
| | | | | | | PeriodRoleCode 450860 | | | 1 450862 | PeriodRoleCode 450864 |
| | | | | BusinessTransactionDocumentReference 450866 | | | | | 0..n 450868 | ... |
| | | | | | BusinessTransactionDocumentReference 450870 | | | | 0..1 450872 | BusinessTransactionDocumentReference 450874 |
| | | | | | BusinessTransactionDocumentRelationshipRoleCode 450876 | | | | 0..1 450878 | BusinessTransactionDocumentRelationshipRoleCode 450880 |
| | | | | | BusinessTransactionDocumentRelationshipTypeCode 450882 | | | | 0..1 450884 | BusinessTransactionDocumentRelationshipTypeCode 450886 |

FIG. 45-22

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentTypeCode 450888 | | | | 0..1 450890 | TransportationDocumentTypeCode 450892 |
| | | | | | TransportationDocumentNote 450894 | | | | 0..1 450896 | SHORT_Note 450898 |
| | | | | | TransportationDocumentID 450900 | | | | 0..1 450902 | TransportationDocumentID 450904 |
| | | | | | DateTimePeriod 450906 | | | | 0..n 450908 | ... |
| | | | | | | DateTimePeriod 450910 | | | 1 450912 | DateTimePeriod 450914 |
| | | | | | | PeriodRoleCode 450916 | | | 1 450918 | PeriodRoleCode 450920 |
| | | | | TransportationServiceRequirement 450922 | | | | | 0..n 450924 | ... |

FIG. 45-23

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationServiceRequirementCode 450926 | | | | 0..1 450928 | TransportationServiceRequirementCode 450930 |
| | | | | | AdditionalTransportationServiceRequirementCode 450932 | | | | 0..1 450934 | TransportationServiceRequirementCode 450936 |
| | | | | | TransportationContractConditionCode 450938 | | | | 0..1 450940 | TransportationContractConditionCode 450942 |
| | | | | | TransportServiceLevelCode 450944 | | | | 0..1 450946 | TransportServiceLevelCode 450948 |
| | | | | | NatureOfCargoClassificationCode 450950 | | | | 0..1 450952 | NatureOfCargoClassificationCode 450954 |
| TransportationUnitResourceInformation 450956 | | | TransportationUnitResourceInformation 450958 | | | | | | 0..n 450960 | ... |

FIG. 45-24

| Package | level 1 | level 2 | level 3 | level 4 | level 5 | level 6 | level 7 | level 8 | Cardinality | Data Type Name |
|---|---|---|---|---|---|---|---|---|---|---|
| | | | | ID 450962 | | | | | 1 450964 | ResourceInformationID 450966 |
| | | | | ResourceNumberValue 450968 | | | | | 0..1 450970 | NumberValue 450972 |
| | | | | ResourceID 450974 | | | | | 0..1 450976 | ResourceID 450978 |
| | | | | ResourceHomeCountryCode 450980 | | | | | 0..1 450982 | CountryCode 450984 |
| | | | | TransportationUnitResourceCategoryCode 450986 | | | | | 0..1 450988 | TransportationUnitResourceCategoryCode 450990 |
| | | | | TransportationUnitResourceTypeCode 450992 | | | | | 0..1 450994 | TransportationUnitResourceTypeCode 450996 |
| | | | | FillLevelCode 450998 | | | | | 0..1 451000 | FillLevelCode 451002 |
| | | | | ShippingTypeCode 451004 | | | | | 0..1 451006 | ShippingTypeCode 451008 |

FIG. 45-25

| Package | level 1 | level 2 | level 3 | level 4 | level 5 | level 6 | level 7 | level 8 | Cardinality | Data Type Name |
|---|---|---|---|---|---|---|---|---|---|---|
| | | | | HaulageArrangerCode 451010 | | | | | 0..1 451012 | HaulageArrangerCode 451014 |
| | | | | TransportationHandlingInstructionCode 451016 | | | | | 0..1 451018 | TransportationHandlingInstructionCode 451020 |
| | | | | TransportationHandlingInstructionNote 451022 | | | | | 0..1 451024 | LONG_Note 451026 |
| | | | | TransportationStageAssignment 451028 | | | | | 0..n 451030 | ... |
| | | | | | ShipmentRequestTransportationStageID 451032 | | | | 1 451034 | TransportationStageID 451036 |
| | | | | AttachedEquipment 451038 | | | | | 0..n 451040 | ... |
| | | | | | ShipmentRequestResourceInformationID 451042 | | | | 1 451044 | ResourceID 451046 |

FIG. 45-26

| Package | level 1 | level 2 | level 3 | level 4 | level 5 | level 6 | level 7 | level 8 | Cardinality | Data Type Name |
|---|---|---|---|---|---|---|---|---|---|---|
| | | | | Quantity 451048 | | | | | 0..n 451050 | ... |
| | | | | | Quantity 451052 | | | | 1 451054 | Quantity 451056 |
| | | | | | RoleCode 451058 | | | | 0..1 451060 | QuantityRoleCode 451062 |
| | | | | | TypeCode 451064 | | | | 0..1 451066 | QuantityTypeCode 451068 |
| | | | | Seal 451070 | | | | | 0..n 451072 | ... |
| | | | | | ID 451074 | | | | 1 451076 | SealID 451078 |
| | | | | | PartyRoleCode 451080 | | | | 0..1 451082 | PartyRoleCode 451084 |
| | | | | | PartyFormattedName 451086 | | | | 0..1 451088 | LONG_Name 451090 |
| | | | | | StatusCode 451092 | | | | 0..1 451094 | SealStatusCode 451096 |

FIG. 45-27

| Package | level 1 | level 2 | level 3 | level 4 | level 5 | level 6 | level 7 | level 8 | Cardinality | Data Type Name |
|---|---|---|---|---|---|---|---|---|---|---|
| | | | | BusinessTransactionDocumentReference 451098 | | | | | 0..n 451100 | ... |
| | | | | | BusinessTransactionDocumentReference 451102 | | | | 0..1 451104 | BusinessTransactionDocumentReference 451106 |
| | | | | | BusinessTransactionDocumentRelationshipRoleCode 451108 | | | | 0..1 451110 | BusinessTransactionDocumentRelationshipRoleCode 451112 |
| | | | | | BusinessTransactionDocumentRelationshipTypeCode 451114 | | | | 0..1 451116 | BusinessTransactionDocumentRelationshipTypeCode 451118 |
| | | | | | TransportationDocumentTypeCode 451120 | | | | 0..1 451122 | TransportationDocumentTypeCode 451124 |
| | | | | | TransportationDocumentNote 451126 | | | | 0..1 451128 | SHORT_Note 451130 |

FIG. 45-28

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentID 451132 | | | | 0..1 451134 | TransportationDocumentID 451136 |
| | | | | | DateTimePeriod 451138 | | | | 0..n 451140 | |
| | | | | | | DateTimePeriod 451142 | | | 1 451144 | DateTimePeriod 451146 |
| | | | | | | PeriodRoleCode 451148 | | | 1 451150 | PeriodRoleCode 451152 |
| | | | | TextCollection 451154 | | | | | 0..1 451156 | ... |
| | | | | | TextCollection 451158 | | | | 1 451160 | TextCollection 451162 |
| | | | | Location 451164 | | | | | 0..n 451166 | ... |
| | | | | | Location 451168 | | | | 1 451170 | BusinessTransactionDocumentLocation 451172 |
| | | | | | RoleCode 451174 | | | | 1 451176 | LocationRoleCode 451178 |

FIG. 45-29

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TypeCode 451180 | | | | 0..1 451182 | LocationTypeCode 451184 |
| | | | | | Name 451186 | | | | 0..1 451188 | MEDIUM_Name 451190 |
| | | | | | DateTimePeriods 451192 | | | | 0..n 451194 | ... |
| | | | | | | RequestedFulfillmentPeriod 451196 | | | 0..1 451198 | DateTimePeriod 451200 |
| | | | | | | AcceptableFulfillmentPeriod 451202 | | | 0..1 451204 | DateTimePeriod 451206 |
| | | | | | | PeriodRoleCode 451208 | | | 1 451210 | PeriodRoleCode 451212 |
| | | | | DangerousGoods 451214 | | | | | 0..n 451216 | |
| | | | | | ID 451218 | | | | 0..1 451220 | DangerousGoodsID 451222 |
| | | | | | RegulationsCode 451224 | | | | 0..1 451226 | DangerousGoodsRegulationsCode 451228 |

FIG. 45-30

| Package | level 1 | level 2 | level 3 | level 4 | level 5 | level 6 | level 7 | level 8 | Cardinality | Data Type Name |
|---|---|---|---|---|---|---|---|---|---|---|
| | | | | | HazardCode 451230 | | | | 0..1 451232 | DangerousGoodsHazardCode 451234 |
| | | | | | FlashpointMeasureInterval 451236 | | | | 0..1 451238 | MeasureInterval 451240 |
| | | | | | PackagingGroupCode 451242 | | | | 0..1 451244 | DangerousGoodsPackagingGroupCode 451246 |
| | | | | | EmergencySchedule 451248 | | | | 0..1 451250 | DangerousGoodsEmergencySchedule 451252 |
| | | | | | TransportEmergencyCardCode 451254 | | | | 0..1 451256 | TransportEmergencyCardCode 451258 |
| | | | | | DangerousGoodsLabelCode 451260 | | | | 0..1 451262 | DangerousGoodsLabelCode 451264 |
| | | | | | DangerousGoodsLabelCode2 451266 | | | | 0..1 451268 | DangerousGoodsLabelCode 451270 |

FIG. 45-31

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DangerousGoodsLabelCode3 451272 | | | | 0..1 451274 | DangerousGoodsLabelCode 451276 |
| | | | | | PackagingInstructionTypeCode 451278 | | | | 0..1 451280 | PackagingInstructionTypeCode 451282 |
| | | | | | TransportMeansDescriptionCode 451284 | | | | 0..1 451286 | TransportMeansDescriptionCode 451288 |
| | | | | | TransportationAuthorisationCode 451290 | | | | 0..1 451292 | DangerousGoodsTransportationAuthorisationCode 451294 |
| | | | | | ContactInformation 451296 | | | | 0..n 451298 | ... |
| | | | | | | ContactPersonFunctionTypeCode 451300 | | | 1 451302 | ContactPersonFunctionTypeCode 451304 |
| | | | | | | Address 451306 | | | 1 451308 | Address 451310 |

FIG. 45-32

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TextCollection 451312 | | | | 0..1 451314 | ... |
| | | | | | | TextCollection 451316 | | | 1 451318 | TextCollection 451320 |
| PackageInformation 451322 | | | PackageInformation 451324 | | | | | | 0..n 451326 | ... |
| | | | | ID 451328 | | | | | 1 451330 | PackageInformationID 451332 |
| | | | | PackageID 451334 | | | | | 0..1 451336 | PackageID 451338 |
| | | | | PackageOrdinalNumberValue 451340 | | | | | 0..1 451342 | OrdinalNumberValue 451344 |
| | | | | PackageNumberValue 451346 | | | | | 0..1 451348 | NumberValue 451350 |
| | | | | PackageTypeCode 451352 | | | | | 0..1 451354 | PackageTypeCode 451356 |
| | | | | PackagingLevelCode 451358 | | | | | 0..1 451360 | PackagingLevelCode 451362 |

FIG. 45-33

| Package | level 1 | level 2 | level 3 | level 4 | level 5 | level 6 | level 7 | level 8 | Cardinality | Data Type Name |
|---|---|---|---|---|---|---|---|---|---|---|
| | | | | PackageMarkingInstructionCode 451364 | | | | | 0..1 451366 | PackageMarkingInstructionCode 451368 |
| | | | | PredecessorPackageID 451370 | | | | | 0..1 451372 | PackageID 451374 |
| | | | | ItemAssignment 451376 | | | | | 0..n 451378 | ... |
| | | | | | ShipmentRequestItemID 451380 | | | | 1 451382 | BusinessTransactionDocumentItemID 451384 |
| | | | | | Quantity 451386 | | | | 0..n 451388 | ... |
| | | | | | | Quantity 451390 | | | 1 451392 | Quantity 451394 |
| | | | | | | RoleCode 451396 | | | 0..1 451398 | QuantityRoleCode 451400 |
| | | | | | | TypeCode 451402 | | | 0..1 451404 | QuantityTypeCode 451406 |

FIG. 45-34

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentReference 451408 | | | | 0..n 451410 | ... |
| | | | | | | BusinessTransactionDocumentReference 451412 | | | 0..1 451414 | BusinessTransactionDocumentReference 451416 |
| | | | | | | BusinessTransactionDocumentRelationshipRoleCode 451418 | | | 0..1 451420 | BusinessTransactionDocumentRelationshipRoleCode 451422 |
| | | | | | | BusinessTransactionDocumentRelationshipTypeCode 451424 | | | 0..1 451426 | BusinessTransactionDocumentRelationshipTypeCode 451428 |
| | | | | | | TransportationDocumentTypeCode 451430 | | | 0..1 451432 | TransportationDocumentTypeCode 451434 |
| | | | | | | TransportationDocumentNote 451436 | | | 0..1 451438 | SHORT_Note 451440 |

FIG. 45-35

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentID 451442 | | | 0..1 451444 | TransportationDocumentID 451446 |
| | | | | | | DateTimePeriod 451448 | | | 0..n 451450 | ... |
| | | | | | | | DateTimePeriod 451452 | | 1 451454 | DateTimePeriod 451456 |
| | | | | | | | PeriodRoleCode 451458 | | 1 451460 | PeriodRoleCode 451462 |
| | | | | | TransportationGoodsIdentification 451464 | | | | 0..n 451466 | ... |
| | | | | | | TransportationGoodsIdentifierTypeCode 451468 | | | 1 451470 | TransportationGoodsIdentifierTypeCode 451472 |
| | | | | | | LowerBoundaryTransportationGoodsID 451474 | | | 0..1 451476 | TransportationGoodsID 451478 |

FIG. 45-36

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | UpperBoundaryTransportationGoodsID 451480 | | | 0..1 451482 | TransportationGoodsID 451484 |
| | | | | TransportationUnitResourceInformationAssignment 451486 | | | | | 0..n 451488 | ... |
| | | | | | ShipmentRequestResourceInformationID 451490 | | | | 1 451492 | ResourceInformationID 451494 |
| | | | | | Quantity 451496 | | | | 0..n 451498 | ... |
| | | | | | | Quantity 451500 | | | 1 451502 | Quantity 451504 |
| | | | | | | RoleCode 451506 | | | 0..1 451508 | QuantityRoleCode 451510 |
| | | | | | | TypeCode 451512 | | | 0..1 451514 | QuantityTypeCode 451516 |
| | | | | Quantity 451518 | | | | | 0..n 451520 | ... |
| | | | | | Quantity 451522 | | | | 1 451524 | Quantity 451526 |

FIG. 45-37

| Package | level 1 | level 2 | level 3 | level 4 | level 5 | level 6 | level 7 | level 8 | Cardinality | Data Type Name |
|---|---|---|---|---|---|---|---|---|---|---|
| | | | | | RoleCode 451528 | | | | 0..1 451530 | QuantityRoleCode 451532 |
| | | | | | TypeCode 451534 | | | | 0..1 451536 | QuantityTypeCode 451538 |
| | | | | TextCollection 451540 | | | | | 0..1 451542 | ... |
| | | | | | TextCollection 451544 | | | | 1 451546 | TextCollection 451548 |
| Item 451550 | | | Item 451552 | | | | | | 0..n 451554 | ... |
| | | | | ID 451556 | | | | | 1 451558 | BusinessTransactionDocumentItemID 451560 |
| | | | | OriginCountryCode 451562 | | | | | 0..1 451564 | CountryCode 451566 |
| | | | | DestinationCountryCode 451568 | | | | | 0..1 451570 | CountryCode 451572 |
| | | | | ShippingTypeCode 451574 | | | | | 0..1 451576 | ShippingTypeCode 451578 |

FIG. 45-38

| Package | level 1 | level 2 | level 3 | level 4 | level 5 | level 6 | level 7 | level 8 | Cardinality | Data Type Name |
|---|---|---|---|---|---|---|---|---|---|---|
| | | | | HaulageArrangerCode 451580 | | | | | 0..1 451582 | HaulageArrangerCode 451584 |
| | | | | TemperatureMeasureInterval 451586 | | | | | 0..1 451588 | MeasureInterval 451590 |
| | | | | TransportationHandlingInstructionCode 451592 | | | | | 0..1 451594 | TransportationHandlingInstructionCode 451596 |
| | | | | TransportationHandlingInstructionNote 451598 | | | | | 0..1 451600 | LONG_Note 451602 |
| ItemInformation 451604 | | | | Amount 451606 | | | | | 0..n 451608 | ... |
| | | | | | Amount 451610 | | | | 1 451612 | Amount 451614 |
| | | | | | RoleCode 451616 | | | | 1 451618 | AmountRoleCode 451620 |
| | | | | TextCollection 451622 | | | | | 0..1 451624 | ... |
| | | | | | TextCollection 451626 | | | | 1 451628 | TextCollection 451630 |

FIG. 45-39

| Package | level 1 | level 2 | level 3 | level 4 | level 5 | level 6 | level 7 | level 8 | Cardinality | Data Type Name |
|---|---|---|---|---|---|---|---|---|---|---|
| | | | | NatureOfCargo 451632 | | | | | 0..n 451634 | ... |
| | | | | | ClassificationCode 451636 | | | | 1 451638 | NatureOfCargoClassificationCode 451640 |
| | | | | Quantity 451642 | | | | | 0..n 451644 | ... |
| | | | | | Quantity 451646 | | | | 1 451648 | Quantity 451650 |
| | | | | | RoleCode 451652 | | | | 0..1 451654 | QuantityRoleCode 451656 |
| | | | | | TypeCode 451658 | | | | 0..1 451660 | QuantityTypeCode 451662 |
| | | | | TransportationDocumentInformation 451664 | | | | | 0..n 451666 | ... |
| | | | | | TransportationDocumentTypeCode 451668 | | | | 0..1 451670 | TransportationDocumentTypeCode 451672 |

FIG. 45-40

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentNote 451674 | | | | 0..1 451676 | SHORT_Note 451678 |
| | | | | | TransportationDocumentID 451680 | | | | 0..1 451682 | TransportationDocumentID 451684 |
| | | | | | TransportationDocumentStatusCode 451686 | | | | 0..1 451688 | TransportationDocumentStatusCode 451690 |
| | | | | | LanguageCode 451692 | | | | 0..1 451694 | LanguageCode 451696 |
| | | | | | CommunicationMediumTypeCode 451698 | | | | 0..1 451700 | CommunicationMediumTypeCode 451702 |
| | | | | | Requiredindicator 451704 | | | | 1 451706 | Indicator 451708 |
| | | | | | OutputCopyNumberValue 451710 | | | | 0..1 451712 | NumberValue 451714 |

FIG. 45-41

| Package | level 1 | level 2 | level 3 | level 4 | level 5 | level 6 | level 7 | level 8 | Cardinality | Data Type Name |
|---|---|---|---|---|---|---|---|---|---|---|
| | | | | | OutputOriginalNumberValue 451716 | | | | 0..1 451718 | NumberValue 451720 |
| | | | | | DateTimePeriod 451722 | | | | 0..n 451724 | ... |
| | | | | | | DateTimePeriod 451726 | | | 1 451728 | DateTimePeriod 451730 |
| | | | | | | PeriodRoleCode 451732 | | | 1 451734 | PeriodRoleCode 451736 |
| | | | | BusinessTransactionDocumentReference 451738 | | | | | 0..n 451740 | ... |
| | | | | | BusinessTransactionDocumentReference 451742 | | | | 0..1 451744 | BusinessTransactionDocumentReference 451746 |
| | | | | | BusinessTransactionDocumentRelationshipRoleCode 451748 | | | | 0..1 451750 | BusinessTransactionDocumentRelationshipRoleCode 451752 |

FIG. 45-42

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentRelationshipTypeCode 451754 | | | | 0..1 451756 | BusinessTransactionDocumentRelationshipTypeCode 451758 |
| | | | | | TransportationDocumentTypeCode 451760 | | | | 0..1 451762 | TransportationDocumentTypeCode 451764 |
| | | | | | TransportationDocumentNote 451766 | | | | 0..1 451768 | SHORT_Note 451770 |
| | | | | | TransportationDocumentID 451772 | | | | 0..1 451774 | TransportationDocumentID 451776 |
| | | | | | DateTimePeriod 451778 | | | | 0..n 451780 | ... |
| | | | | | | DateTimePeriod 451782 | | | 1 451784 | DateTimePeriod 451786 |
| | | | | | | PeriodRoleCode 451788 | | | 1 451790 | PeriodRoleCode 451792 |

FIG. 45-43

| Package | level 1 | level 2 | level 3 | level 4 | level 5 | level 6 | level 7 | level 8 | Cardinality | Data Type Name |
|---|---|---|---|---|---|---|---|---|---|---|
| | | | | DangerousGoods 451794 | | | | | 0..n 451796 | ... |
| | | | | | ID 451798 | | | | 0..1 451800 | DangerousGoodsID 451802 |
| | | | | | RegulationsCode 451804 | | | | 0..1 451806 | DangerousGoodsRegulationsCode 451808 |
| | | | | | HazardCode 451810 | | | | 0..1 451812 | DangerousGoodsHazardCode 451814 |
| | | | | | FlashpointMeasureInterval 451816 | | | | 0..1 451818 | MeasureInterval 451820 |
| | | | | | PackagingGroupCode 451822 | | | | 0..1 451824 | DangerousGoodsPackagingGroupCode 451826 |
| | | | | | EmergencySchedule 451828 | | | | 0..1 451830 | DangerousGoodsEmergencySchedule 451832 |
| | | | | | TransportEmergencyCardCode 451834 | | | | 0..1 451836 | TransportEmergencyCardCode 451838 |

FIG. 45-44

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DangerousGoodsLabelCode 451840 | | | | 0..1 451842 | DangerousGoodsLabelCode 451844 |
| | | | | | DangerousGoodsLabelCode 2 451846 | | | | 0..1 451848 | DangerousGoodsLabelCode 451850 |
| | | | | | DangerousGoodsLabelCode 3 451852 | | | | 0..1 451854 | DangerousGoodsLabelCode 451856 |
| | | | | | PackingInstructionTypeCode 451858 | | | | 0..1 451860 | PackingInstructionTypeCode 451862 |
| | | | | | TransportMeansDescription Code 451864 | | | | 0..1 451866 | TransportMeansDescriptionCode 451868 |
| | | | | | TransportationAuthorisationCode 451870 | | | | 0..1 451872 | DangerousGoodsTransportationAuthorisationCode 451874 |
| | | | | | ContactInformation 451876 | | | | 0..n 451878 | ... |

FIG. 45-45

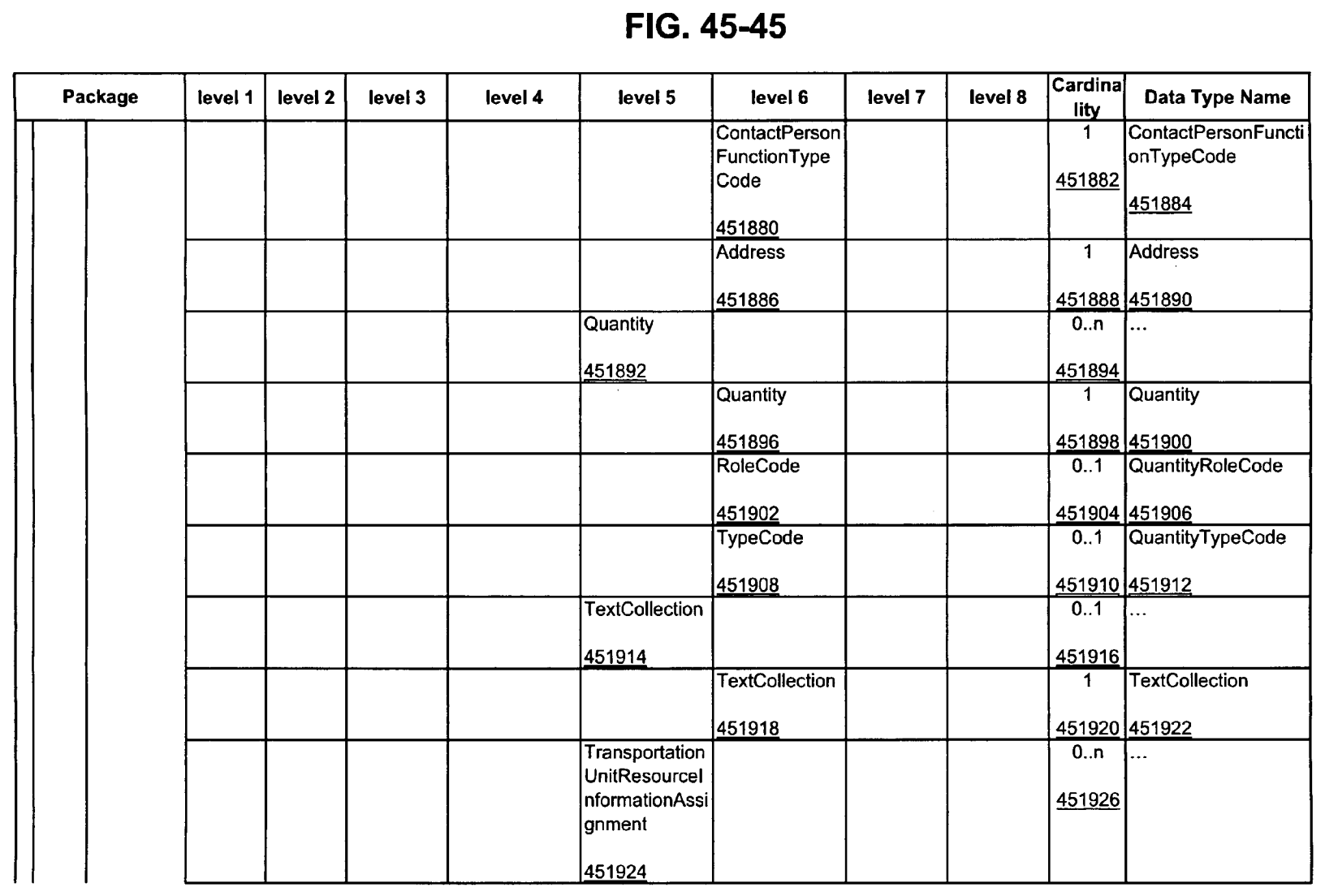

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | ContactPersonFunctionTypeCode 451880 | | | 1 451882 | ContactPersonFunctionTypeCode 451884 |
| | | | | | | Address 451886 | | | 1 451888 | Address 451890 |
| | | | | | Quantity 451892 | | | | 0..n 451894 | ... |
| | | | | | | Quantity 451896 | | | 1 451898 | Quantity 451900 |
| | | | | | | RoleCode 451902 | | | 0..1 451904 | QuantityRoleCode 451906 |
| | | | | | | TypeCode 451908 | | | 0..1 451910 | QuantityTypeCode 451912 |
| | | | | | TextCollection 451914 | | | | 0..1 451916 | ... |
| | | | | | | TextCollection 451918 | | | 1 451920 | TextCollection 451922 |
| | | | | | TransportationUnitResourceInformationAssignment 451924 | | | | 0..n 451926 | ... |

FIG. 45-46

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | ShipmentRequestResourceInformationID 451928 | | | 1 451930 | ResourceInformationID 451932 |
| | | | | | | Quantity 451934 | | | 0..n 451936 | ... |
| | | | | | | | Quantity 451938 | | 1 451940 | Quantity 451942 |
| | | | | | | | RoleCode 451944 | | 0..1 451946 | QuantityRoleCode 451948 |
| | | | | | | | TypeCode 451950 | | 0..1 451952 | QuantityTypeCode 451954 |
| | | | | TransportationStageAssignment 451956 | | | | | 0..n 451958 | ... |
| | | | | | ShipmentRequestTransportationStageID 451960 | | | | 1 451962 | TransportationStageID 451964 |
| | | | | | Quantity 451966 | | | | 0..n 451968 | ... |
| | | | | | | Quantity 451970 | | | 1 451972 | Quantity 451974 |

FIG. 45-47

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RoleCode 451976 | | | 0..1 451978 | QuantityRoleCode 451980 |
| | | | | | | TypeCode 451982 | | | 0..1 451984 | QuantityTypeCode 451986 |
| | | | | TransportationUnitResourceInformationAssignment 451988 | | | | | 0..n 451990 | ... |
| | | | | | ShipmentRequestResourceInformationID 451992 | | | | 1 451994 | ResourceInformationID 451996 |
| | | | | | Quantity 451998 | | | | 0..n 452000 | ... |
| | | | | | | Quantity 452002 | | | 1 452004 | Quantity 452006 |
| | | | | | | RoleCode 452008 | | | 0..1 452010 | QuantityRoleCode 452012 |
| | | | | | | TypeCode 452014 | | | 0..1 452016 | QuantityTypeCode 452018 |

FIG. 45-48

| Package | level 1 | level 2 | level 3 | level 4 | level 5 | level 6 | level 7 | level 8 | Cardinality | Data Type Name |
|---|---|---|---|---|---|---|---|---|---|---|
| GovernmentalRequirementInformation 452020 | | | | GovernmentalProcedure 452022 | | | | | 0..n 452024 | ... |
| | | | | | TransportationGovernmentAgencyTypeCode 452026 | | | | 0..1 452028 | TransportationGovernmentAgencyTypeCode 452030 |
| | | | | | TransportationMovementTypeCode 452032 | | | | 0..1 452034 | TransportationMovementTypeCode 452036 |
| | | | | | TransportationGovernmentAgencyInvolvementStatusCode 452038 | | | | 0..1 452040 | TransportationGovernmentAgencyInvolvementStatusCode 452042 |
| | | | | | TransportationGovernmentAgencyActionCode 452044 | | | | 0..1 452046 | TransportationGovernmentAgencyActionCode 452048 |

FIG. 45-49

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGovernmentAgencyProcedureStatusCode 452050 | | | | 0..1 452052 | TransportationGovernmentAgencyProcedureStatusCode 452054 |
| | | | | | Location 452056 | | | | 0..n 452058 | ... |
| | | | | | | Location 452060 | | | 1 452062 | BusinessTransactionDocumentLocation 452064 |
| | | | | | | RoleCode 452066 | | | 1 452068 | LocationRoleCode 452070 |
| | | | | | | TypeCode 452072 | | | 0..1 452074 | LocationTypeCode 452076 |
| | | | | | | Name 452078 | | | 0..1 452080 | MEDIUM_Name 452082 |
| | | | | | DateTimePeriod 452084 | | | | 0..n 452086 | ... |
| | | | | | | DateTimePeriod 452088 | | | 1 452090 | DateTimePeriod 452092 |

FIG. 45-50

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | PeriodRoleCode 452094 | | | 1 452096 | PeriodRoleCode 452098 |
| | | | | | Seal 452100 | | | | 0..n 452102 | ... |
| | | | | | | ID 452104 | | | 1 452106 | SealID 452108 |
| | | | | | | PartyRoleCode 452110 | | | 0..1 452112 | PartyRoleCode 452114 |
| | | | | | | PartyFormattedName 452116 | | | 0..1 452118 | LONG_Name 452120 |
| | | | | | | StatusCode 452122 | | | 0..1 452124 | SealStatusCode 452126 |
| | | | | | TextCollection 452128 | | | | 0..n 452130 | ... |
| | | | | | | TextCollection 452132 | | | 0..1 452134 | TextCollection 452136 |
| | | | | | TransportationDocumentInformation 452138 | | | | 0..n 452140 | ... |

FIG. 45-51

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentTypeCode 452142 | | | 0..1 452144 | TransportationDocumentTypeCode 452146 |
| | | | | | | TransportationDocumentNote 452148 | | | 0..1 452150 | SHORT_Note 452152 |
| | | | | | | TransportationDocumentID 452154 | | | 0..1 452156 | TransportationDocumentID 452158 |
| | | | | | | TransportationDocumentStatusCode 452160 | | | 0..1 452162 | TransportationDocumentStatusCode 452164 |
| | | | | | | LanguageCode 452166 | | | 0..1 452168 | LanguageCode 452170 |
| | | | | | | CommunicationMediumTypeCode 452172 | | | 0..1 452174 | CommunicationMediumTypeCode 452176 |
| | | | | | | RequiredIndicator 452178 | | | 1 452180 | Indicator 452182 |

FIG. 45-52

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | OutputCopyNumberValue 452184 | | | 0..1 452186 | NumberValue 452188 |
| | | | | | | OutputOriginalNumberValue 452190 | | | 0..1 452192 | NumberValue 452194 |
| | | | | | | DateTimePeriod 452196 | | | 0..n 452198 | ... |
| | | | | | | | DateTimePeriod 452200 | | 1 452202 | DateTimePeriod 452204 |
| | | | | | | | PeriodRoleCode 452206 | | 1 452208 | PeriodRoleCode 452210 |
| PartyInformation 452212 | | | | Party 452214 | | | | | 0..n 452216 | ... |
| | | | | | Party 452218 | | | | 1 452220 | BusinessTransactionDocumentParty 452222 |
| | | | | | RoleCode 452224 | | | | 1 452226 | PartyRoleCode 452228 |
| | | | | | FormattedName 452230 | | | | 0..1 452232 | LONG_Name 452234 |

FIG. 45-53

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DateTimePeriods 452236 | | | | 0..n 452238 | ... |
| | | | | | | RequestedFulfillmentPeriod 452240 | | | 0..1 452242 | DateTimePeriod 452244 |
| | | | | | | AcceptableFulfillmentPeriod 452246 | | | 0..1 452248 | DateTimePeriod 452250 |
| | | | | | | PeriodRoleCode 452252 | | | 1 452254 | PeriodRoleCode 452256 |
| LocationInformation 452258 | | | | Location 452260 | | | | | 0..n 452262 | ... |
| | | | | | Location 452264 | | | | 1 452266 | BusinessTransactionDocumentLocation 452268 |
| | | | | | RoleCode 452270 | | | | 1 452272 | LocationRoleCode 452274 |
| | | | | | TypeCode 452276 | | | | 0..1 452278 | LocationTypeCode 452280 |
| | | | | | Name 452282 | | | | 0..1 452284 | MEDIUM_Name 452286 |

FIG. 45-54

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DateTimePeriods 452288 | | | | 0..n 452290 | ... |
| | | | | | | RequestedFulfillmentPeriod 452292 | | | 0..1 452294 | DateTimePeriod 452296 |
| | | | | | | AcceptableFulfillmentPeriod 452298 | | | 0..1 452300 | DateTimePeriod 452302 |
| | | | | | | PeriodRoleCode 452304 | | | 1 452306 | PeriodRoleCode 452308 |
| TransportationGoodsInformation 452310 | | | | ProductInformation 452312 | | | | | 0..n 452314 | ... |
| | | | | | Product 452316 | | | | 0..1 452318 | BusinessTransactionDocumentProduct 452320 |
| | | | | | ProductDescription 452322 | | | | 0..1 452324 | SHORT_Description 452326 |
| | | | | TransportationGoodsIdentification 452328 | | | | | 0..n 452330 | ... |

FIG. 45-55

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGoodsIdentifierTypeCode 452332 | | | | 1 452334 | TransportationGoodsIdentifierTypeCode 452336 |
| | | | | | LowerBoundaryTransportationGoodsID 452338 | | | | 1 452340 | TransportationGoodsID 452342 |
| | | | | | UpperBoundaryTransportationGoodsID 452344 | | | | 0..1 452346 | TransportationGoodsID 452348 |
| TransportationChargesInformation 452350 | | | TransportationChargesInformation 452352 | | | | | | 0..n 452354 | ... |
| | | | | TransportationChargesUsageCode 452356 | | | | | 1 452358 | TransportationChargesUsageCode 452360 |
| | | | | ShipmentRequestItemID 452362 | | | | | 0..1 452364 | BusinessTransactionDocumentItemID 452366 |

FIG. 45-56

| Package | level 1 | level 2 | level 3 | level 4 | level 5 | level 6 | level 7 | level 8 | Cardinality | Data Type Name |
|---|---|---|---|---|---|---|---|---|---|---|
| | | | | ShipmentRequestPartyStandardID 452368 | | | | | 0..1 452370 | PartyStandardID 452372 |
| | | | | ShipmentRequestPartyInternalID 452374 | | | | | 0,,1 452376 | PartyInternalID 452378 |
| | | | | ShipmentRequestResourceInformationID 452380 | | | | | 0..1 452382 | ResourceInformationID 452384 |
| | | | | ShipmentRequestPackageInformationID 452386 | | | | | 0..1 452388 | PackageInformationID 452390 |
| | | | | ShipmentRequestTransportationStageID 452392 | | | | | 0..1 452394 | TransportationStageID 452396 |
| | | | | TransportationCharges 452398 | | | | | 0..1 452400 | ... |
| | | | | | ID 452402 | | | | 1 452404 | TransportationChargesID 452406 |

FIG. 45-57

| Package | level 1 | level 2 | level 3 | level 4 | level 5 | level 6 | level 7 | level 8 | Cardinality | Data Type Name |
|---|---|---|---|---|---|---|---|---|---|---|
| | | | | | FreightAgreementID 452408 | | | | 1 452410 | FreightAgreementID 452412 |
| | | | | | OriginCode 452414 | | | | 0..1 452416 | TransportationChargesOriginCode 452418 |
| | | | | | TariffID 452420 | | | | 0..1 452422 | TransportationChargesTariffID 452424 |
| | | | | | CalculationSheetID 452426 | | | | 1 452428 | TransportationChargesCalculationSheetID 452430 |
| | | | | | Location 452432 | | | | 0..n 452434 | ... |
| | | | | | | Location 452436 | | | 1 452438 | BusinessTransactionDocumentLocation 452440 |
| | | | | | | RoleCode 452442 | | | 1 452444 | LoactionRoleCode 452446 |
| | | | | | | TypeCode 452448 | | | 0..1 452450 | LocationTypeCode 452452 |
| | | | | | | Name 452454 | | | 0..1 452456 | MEDIUM_Name 452458 |

FIG. 45-58

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DateTimePeriods 452460 | | | 0..n 452462 | ... |
| | | | | | | | Requested Fulfillment Period 452464 | | 0..1 452466 | DateTimePeriod 452468 |
| | | | | | | | Acceptable Fulfillment Period 452470 | | 0..1 452472 | DateTimePeriod 452474 |
| | | | | | | | PeriodRole Code 452476 | | 1 452478 | PeriodRoleCode 452480 |
| | | | | | TextCollection 452482 | | | | 0..1 452484 | ... |
| | | | | | | TextCollection 452486 | | | 1 452488 | TextCollection 452490 |
| | | | | | Currency 452492 | | | | 0..n 452494 | ... |
| | | | | | | Code 452496 | | | 1 452498 | CurrencyCode 452500 |
| | | | | | | RoleCode 452502 | | | 1 452504 | CurrencyRoleCode 452506 |

FIG. 45-59

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | UsageCode 452508 | | | 0..1 452510 | CurrencyUsageCode 452512 |
| | | | | | ExchangeRate 452514 | | | | 0..n 452516 | ... |
| | | | | | | ExchangeRate 452518 | | | 1 452520 | ExchangeRate 452522 |
| | | | | | | TypeCode 452524 | | | 0..1 452526 | ExchangeRateTypeCode 452528 |
| | | | | | PercentElement 452530 | | | | 0..n 452532 | ... |
| | | | | | | PercentRoleCode 452534 | | | 1 452536 | PercentRoleCode 452538 |
| | | | | | | Percent 452540 | | | 1 452542 | Percent 452544 |
| | | | | | | TransportationChargesPercentCalculationBaseCode 452546 | | | 0..1 452548 | TransportationChargesPercentCalculationBaseCode 452550 |

FIG. 45-60

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | StatusCode 452552 | | | 0..1 452554 | TransportationChargesPercentElementStatusCode 452556 |
| | | | | | DateTimePeriod 452558 | | | | 0..n 452560 | ... |
| | | | | | | DateTimePeriod 452562 | | | 1 452564 | DateTimePeriod 452566 |
| | | | | | | PeriodRoleCode 452568 | | | 1 452570 | PeriodRoleCode 452572 |
| | | | | | BusinessTransactionDocumentReference 452574 | | | | 0..n 452576 | ... |
| | | | | | | BusinessTransactionDocumentReference 452578 | | | 0..1 452580 | BusinessTransactionDocumentReference 452582 |

FIG. 45-61

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | BusinessTransactionDocumentRelationshipRoleCode 452584 | | | 0..1 452586 | BusinessTransactionDocumentRelationshipRoleCode 452588 |
| | | | | | | BusinessTransactionDocumentRelationshipTypeCode 452590 | | | 0..1 452592 | BusinessTransactionDocumentRelationshipTypeCode 452594 |
| | | | | | | TransportationDocumentTypeCode 452596 | | | 0..1 452598 | TransportationDocumentTypeCode 452600 |
| | | | | | | TransportationDocumentNote 452602 | | | 0..1 452604 | SHORT_Note 452606 |
| | | | | | | TransportationDocumentID 452608 | | | 0..1 452610 | TransportationDocumentID 452612 |
| | | | | | TaxDetail 452614 | | | | 0..n 452616 | ... |
| | | | | | | ProductTax 452618 | | | 1 452620 | ProductTax 452622 |

FIG. 45-62

| Package | level 1 | level 2 | level 3 | level 4 | level 5 | level 6 | level 7 | level 8 | Cardinality | Data Type Name |
|---|---|---|---|---|---|---|---|---|---|---|
| | | | | | PaymentInstruction 452624 | | | | 0..n 452626 | ... |
| | | | | | | PaymentInstruction 452628 | | | 1 452630 | PaymentInstruction 452632 |
| | | | | | | TransportationChargesElementCategoryCode 452634 | | | 0..1 452636 | TransportationChargesElementCategoryCode 452638 |
| | | | | | | TransportationChargesElementSubCategoryCode 452640 | | | 0..1 452642 | TransportationChargesElementSubCategoryCode 452644 |
| | | | | | | TransportationChargesPaymentArrangementCode 452646 | | | 0..1 452648 | TransportationChargesPaymentArrangementCode 452650 |
| | | | | | CashDiscountTerms 452652 | | | | 0..1 452654 | ... |
| | | | | | | CashDiscountTerms 452656 | | | 1 452658 | CashDiscountTerms 452660 |

FIG. 45-63

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationChargesElementCategoryCode 452662 | | | 0..1 452664 | TransportationChargesElementCategoryCode 452666 |
| | | | | | | TransportationChargesElementSubCategoryCode 452668 | | | 0..1 452670 | TransportationChargesElementSubCategoryCode 452672 |
| | | | | | Element 452674 | | | | 0..n 452676 | ... |
| | | | | | | CategoryCode 452678 | | | 1 452680 | TransportationChargesElementCategoryCode 452682 |
| | | | | | | SubCategoryCode 452684 | | | 1 452686 | TransportationChargesElementSubCategoryCode 452688 |
| | | | | | | TypeCode 452690 | | | 1 452692 | TransportationChargesElementTypeCode 452694 |

FIG. 45-64

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | CalculationResolutionCode 452696 | | | 1 452698 | TransportationChargesElementCalculationResolutionCode 452700 |
| | | | | | | TransportationChargesPaymentArrangementCode 452702 | | | 0…1 452704 | TransportationChargesPaymentArrangementCode 452706 |
| | | | | | | Location 452708 | | | 0..n 452710 | … |
| | | | | | | | Location 452712 | | 1 452714 | BusinessTransactionDocumentLocation 452716 |
| | | | | | | | RoleCode 452718 | | 1 452720 | LocationRoleCode 452722 |
| | | | | | | | TypeCode 452724 | | 0..1 452726 | LocationTypeCode 452728 |
| | | | | | | | Name 452730 | | 0..1 452732 | MEDIUM_Name 452734 |
| | | | | | | | DateTimePeriods 452736 | | 0..n 452738 | … |

FIG. 45-65

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | | Requested Fulfillment Period 452740 | 0..1 452742 | DateTimePeriod 452744 |
| | | | | | | | | Acceptable Fulfillment Period 452746 | 0..1 452748 | DateTimePeriod 452750 |
| | | | | | | | | PeriodRole Code 452752 | 1 452754 | PeriodRoleCode 452756 |
| | | | | | | TextCollection 452758 | | | 0..1 452760 | ... |
| | | | | | | | TextCollect ion 452762 | | 1 452764 | TextCollection 452766 |
| | | | | | | Currency 452768 | | | 0..n 452770 | ... |
| | | | | | | | Code 452772 | | 1 452774 | CurrencyCode 452776 |
| | | | | | | | RoleCode 452778 | | 1 452780 | CurrencyRoleCode 452782 |
| | | | | | | | UsageCod e 452784 | | 0..1 452786 | CurrencyUsageCode 452788 |

FIG. 45-66

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RateElement 452790 | | | 0..n 452792 | ... |
| | | | | | | | ID 452794 | | 1 452796 | TransportationChargesElementRateElementID 452798 |
| | | | | | | | Amount 452800 | | 1 452802 | Amount 452804 |
| | | | | | | | BaseQuantity 452806 | | 1 452808 | Quantity 452810 |
| | | | | | | | TransportationChargesRateTypeCode 452812 | | 0..1 452814 | TransportationChargesRateTypeCode 452816 |
| | | | | | | | TransportationChargesRateRoleCode 452818 | | 1 452820 | TransportationChargesRateRoleCode 452822 |
| | | | | | | | TransportationChargesRateElementStatusCode 452824 | | 0..1 452826 | TransportationChargesRateElementStatusCode 452828 |

FIG. 45-67

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | PercentElement 452830 | | | 0..n 452832 | ... |
| | | | | | | | PercentRoleCode 452834 | | 1 452836 | PercentRoleCode 452838 |
| | | | | | | | Percent 452840 | | 1 452842 | Percent 452844 |
| | | | | | | | TransportationChargesPercentCalculationBaseCode 452846 | | 0..1 452848 | TransportationChargesPercentCalculationBaseCode 452850 |
| | | | | | | | StatusCode 452852 | | 0..1 452854 | TransportationChargesPercentElementStatusCode 452856 |
| | | | | | | AmountElement 452858 | | | 0..n 452860 | ... |
| | | | | | | | Amount 452862 | | 1 452864 | Amount 452866 |
| | | | | | | | RoleCode 452868 | | 1 452870 | AmountRoleCode 452872 |

FIG. 45-68

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TransportationChargesAmountElementStatusCode 452874 | | 0..1 452876 | TransportationChargesAmountElementStatusCode 452878 |
| | | | | | | | RateElementAssignment 452880 | | 0..n 452882 | ... |
| | | | | | | | | TransportationChargesElementRateElementID 452884 | 1 452886 | TransportationChargesElementRateElementID 452888 |
| | | | | | | CalculationBase 452890 | | | 0..n 452892 | ... |
| | | | | | | | TransportationChargesElementCalculationBaseCode 452894 | | 1 452896 | TransportationChargesElementCalculationBaseCode 452898 |

FIG. 45-69

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | BaseQuantity 452900 | | 0..1 452902 | Quantity 452904 |
| | | | | | | | BaseQuantityRoleCode 452906 | | 0..1 452908 | QuantityRoleCode 452910 |
| | | | | | | | BaseQuantityTypeCode 452912 | | 0..1 452914 | QuantityTypeCode 452916 |
| | | | | | | TaxDetail 452918 | | | 0..n 452920 | ... |
| | | | | | | | ProductTax 452922 | | 1 452924 | ProductTax 452926 |
| | | | | | | DateTimePeriod 452928 | | | 0..n 452930 | ... |
| | | | | | | | DateTimePeriod 452932 | | 1 452934 | DateTimePeriod 452936 |
| | | | | | | | PeriodRoleCode 452938 | | 1 452940 | PeriodRoleCode 452942 |

FIG. 45-70

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | CostDistribution 452944 | | | 0..n 452946 | ... |
| | | | | | | | AccountingCodingBlockAssignment 452948 | | 1 452950 | AccountingCodingBlockAssignment 452952 |

To FIG. 49-5
To FIG. 49-1
To FIG. 49-7
TotalAmount
49054
TextCollection
49056
TransportationServiceRequirement
49058
TransportationDocumentInformation
49060
~ DateTimePeriod
49062
BTDReference
49064
~ DateTimePeriod
49066
GovernmentalProcedure
49068
~ Location
49070
~ DateTimePeriod
49072
~ Seal
49074
~ TextCollection
49076
~TransportationDocumentInformation
49078
~ DateTimePeriod
49080

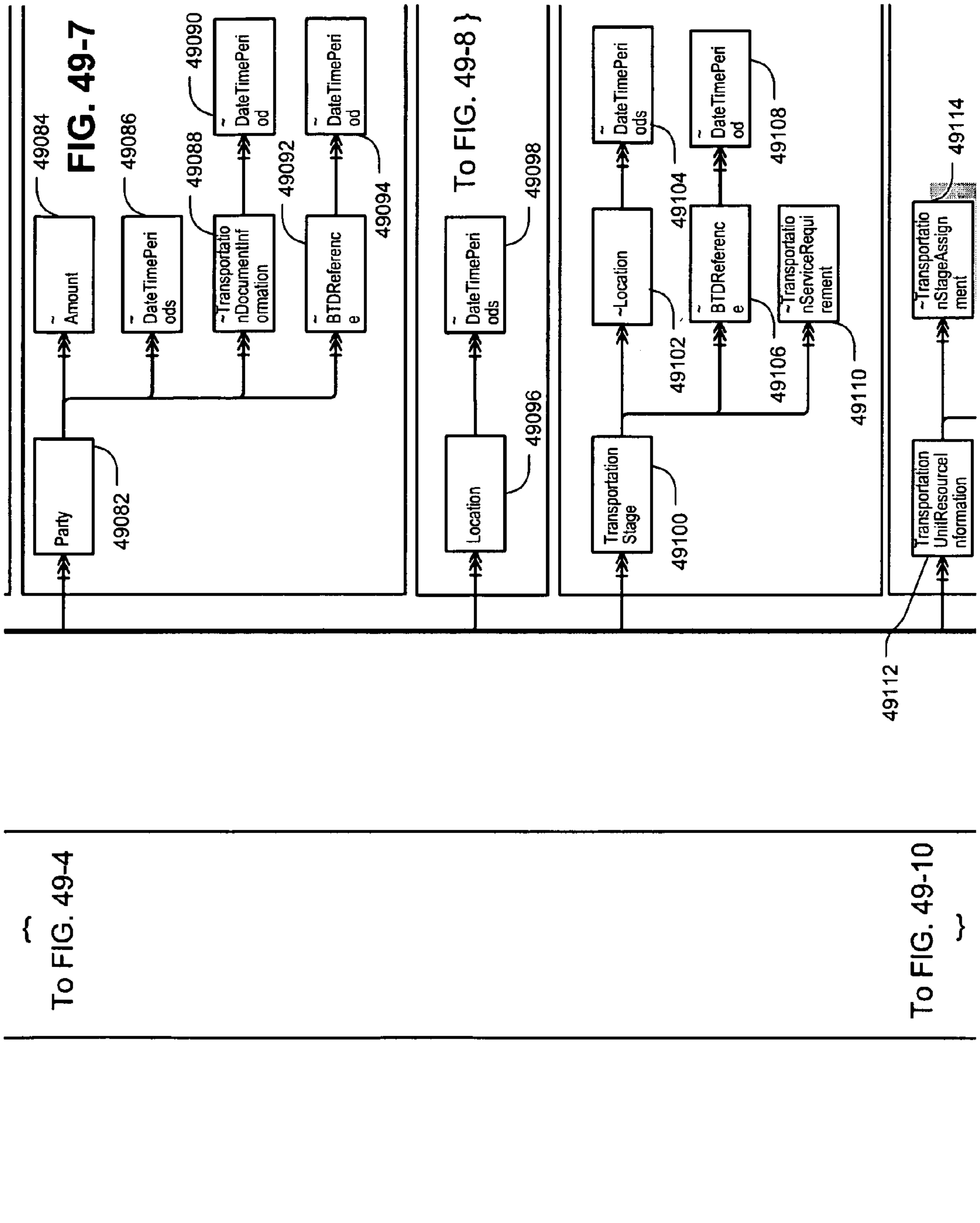
FIG. 49-7
Party
49082
~ Amount
49084
~ DateTimePeriods
49086
~TransportationDocumentInformation
49088
~ DateTimePeriod
49090
~ BTDReference
49092
~ DateTimePeriod
49094
To FIG. 49-8
Location
49096
~ DateTimePeriods
49098
TransportationStage
49100
~Location
49102
~ DateTimePeriods
49104
~ BTDReference
49106
~ DateTimePeriod
49108
~TransportationServiceRequirement
49110
TransportationUnitResourceInformation
49112
~TransportationStageAssignment
49114
To FIG. 49-4
To FIG. 49-10

| Package | level1 | level2 | level3 | level4 | level5 | level6 | Cardinality | Data Type Name |
|---|---|---|---|---|---|---|---|---|
| ShipmentRequest-CancelRequest-Message 51000 | Shipmen-tRequest-Cancel-Request-Message 51002 | | | | | | | ShipmentRequestCancel-RequestMessage 51004 |
| MessageHeader 51006 | | MessageHeader 51008 | | | | | 1 51010 | BusinessDocumentMes-sageHeader 51012 |
| ShipmentRequest 51014 | | ShipmentRequest 51016 | | | | | 1 51018 | ... |
| | | | ID 51020 | | | | 1 51022 | BusinessTransactionDocu-mentID 51024 |
| Request 51026 | | | Request 51028 | | | | 1 51030 | ... |

FIG. 51-2

| Package | level1 | level2 | level3 | level4 | level5 | level6 | Cardinality | Data Type Name |
|---|---|---|---|---|---|---|---|---|
| BusinessTransactionDocumentReference 51032 | | | | Business-Transaction-DocumentReference 51034 | | | 0..n 51036 | ... |
| | | | | | BusinessTransactionDocumentReference 51038 | | 0..1 51040 | BusinessTransactionDocumentReference 51042 |
| | | | | | BusinessTransactionDocumentRelationshipRoleCode 51044 | | 0..1 51046 | BusinessTransactionDocumentRelationshipRoleCode 51048 |
| | | | | | BusinessTransactionDocumentRelationshipTypeCode 51050 | | 0..1 51052 | BusinessTransactionDocumentRelationshipTypeCode 51054 |
| | | | | | TransportationDocumentTypeCode 51056 | | 0..1 51058 | TransportationDocumentTypeCode 51060 |

FIG. 51-3

| Package | level1 | level2 | level3 | level4 | level5 | level6 | Cardinality | Data Type Name |
|---|---|---|---|---|---|---|---|---|
| | | | | | TransportationDocument-Note 51062 | | 0..1 51064 | SHORT_Note 51066 |
| | | | | | TransportationDocumentID 51068 | | 0..1 51070 | TransportationDocumentID 51072 |
| | | | | | DateTimePeriod 51074 | | 0..n 51076 | ... |
| | | | | | | DateTimePeriod 51078 | 1 51080 | DateTimePeriod 51082 |
| | | | | | | PeriodRoleCode 51084 | 1 51086 | PeriodRoleCode 51088 |

FIG. 52-1

| Package | level 1 | level 2 | level 3 | level 4 | level 5 | level 6 | level 7 | level 8 | Cardinality | Data Type Name |
|---|---|---|---|---|---|---|---|---|---|---|
| ShipmentRequestConfirmationMessage 520000 | ShipmentRequestConfirmationMessage 520002 | | | | | | | | | ShipmentRequestRequestMessage 520004 |
| MessageHeader 520006 | | MessageHeader 520008 | | | | | | | 1 520010 | BusinessDocumentMessageHeader 520012 |
| ShipmentRequest 520014 | | ShipmentRequest 520016 | | | | | | | 1 520018 | … |
| | | | @actioncode 520020 | | | | | | 1 520022 | ActionCode 520024 |
| | | | ID 520026 | | | | | | 1 520028 | BusinessTransactionDocumentID 520030 |
| Confirmation 520032 | | | Confirmation 520034 | | | | | | 1 520036 | |
| | | | | DeliveryTerms 520038 | | | | | 0..1 520040 | DeliveryTerms 520042 |

FIG. 52-2

| Package | level 1 | level 2 | level 3 | level 4 | level 5 | level 6 | level 7 | level 8 | Cardinality | Data Type Name |
|---|---|---|---|---|---|---|---|---|---|---|
| | | | | AcceptanceStatusCode 520044 | | | | | 0..1 520046 | AcceptanceStatusCode 520048 |
| HeaderInformation 520050 | | | | DateTimePeriods 520052 | | | | | 0..n 520054 | ... |
| | | | | | RequestedFulfillmentPeriod 520056 | | | | 0..1 520058 | DateTimePeriod 520060 |
| | | | | | AcceptableFulfillmentPeriod 520062 | | | | 0..1 520064 | DateTimePeriod 520066 |
| | | | | | PeriodRoleCode 520068 | | | | 1 520070 | PeriodRoleCode 520072 |
| | | | | NatureOfCargo 520074 | | | | | 0..n 520076 | ... |
| | | | | | ClassificationCode 520078 | | | | 1 520080 | NatureOfCargoClassificationCode 520082 |
| | | | | TotalQuantity 520084 | | | | | 0..n 520086 | ... |

FIG. 52-3

| Package | level 1 | level 2 | level 3 | level 4 | level 5 | level 6 | level 7 | level 8 | Cardinality | Data Type Name |
|---|---|---|---|---|---|---|---|---|---|---|
| | | | | | Quantity 520088 | | | | 1 520090 | Quantity 520092 |
| | | | | | RoleCode 520094 | | | | 0..1 520096 | QuantityRoleCode 520098 |
| | | | | | TypeCode 520100 | | | | 0..1 520102 | QuantityTypeCode 520104 |
| | | | | TotalAmount 520106 | | | | | 0..n 520108 | ... |
| | | | | | Amount 520110 | | | | 1 520112 | Amount 520114 |
| | | | | | RoleCode 520116 | | | | 1 520118 | AmountRoleCode 520120 |
| | | | | TextCollection 520122 | | | | | 0..1 520124 | ... |
| | | | | | TextCollection 520126 | | | | 1 520128 | TextCollection 520130 |

FIG. 52-4

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationServiceRequirement 520132 | | | | | 0..n 520134 | ... |
| | | | | | TransportationServiceRequirementCode 520136 | | | | 0..1 520138 | TransportationServiceRequirementCode 520140 |
| | | | | | AdditionalTransportationServiceRequirementCode 520142 | | | | 0..1 520144 | TransportationServiceRequirementCode 520146 |
| | | | | | TransportationContractConditionCode 520148 | | | | 0..1 520150 | TransportationContractConditionCode 520152 |
| | | | | | TransportServiceLevelCode 520154 | | | | 0..1 520156 | TransportServiceLevelCode 520158 |
| | | | | | NatureOfCargoClassificationCode 520160 | | | | 0..1 520162 | NatureOfCargoClassificationCode 520164 |

FIG. 52-5

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationDocumentInformation 520166 | | | | | 0..n 520168 | ... |
| | | | | | TransportationDocumentTypeCode 520170 | | | | 0..1 520172 | TransportationDocumentTypeCode 520174 |
| | | | | | TransportationDocumentNote 520176 | | | | 0..1 520178 | SHORT_Note 520180 |
| | | | | | TransportationDocumentID 520182 | | | | 0..1 520184 | TransportationDocumentID 520186 |
| | | | | | TransportationDocumentStatusCode 520188 | | | | 0..1 520190 | TransportationDocumentStatusCode 520192 |
| | | | | | LanguageCode 520194 | | | | 0..1 520196 | LanguageCode 520198 |
| | | | | | CommunicationMediumTypeCode 520200 | | | | 0..1 520202 | CommunicationMediumTypeCode 520204 |

FIG. 52-6

| Package | level 1 | level 2 | level 3 | level 4 | level 5 | level 6 | level 7 | level 8 | Cardinality | Data Type Name |
|---|---|---|---|---|---|---|---|---|---|---|
| | | | | | RequiredIndicator 520206 | | | | 1 520208 | Indicator 520210 |
| | | | | | OutputCopyNumberValue 520212 | | | | 0..1 520214 | NumberValue 520216 |
| | | | | | OutputOriginalNumberValue 520218 | | | | 0..1 520220 | NumberValue 520222 |
| | | | | | DateTimePeriod 520224 | | | | 0..n 520226 | ... |
| | | | | | | DateTimePeriod 520228 | | | 1 520230 | DateTimePeriod 520232 |
| | | | | | | PeriodRoleCode 520234 | | | 1 520236 | PeriodRoleCode 520238 |
| | | | | BusinessTransactionDocumentReference 520240 | | | | | 0..n 520242 | ... |

FIG. 52-7

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentReference 520244 | | | | 0..1 520246 | BusinessTransactionDocumentReference 520248 |
| | | | | | BusinessTransactionDocumentRelationshipRoleCode 520250 | | | | 0..1 520252 | BusinessTransactionDocumentRelationshipRoleCode 520254 |
| | | | | | BusinessTransactionDocumentRelationshipTypeCode 520256 | | | | 0..1 520258 | BusinessTransactionDocumentRelationshipTypeCode 520260 |
| | | | | | TransportationDocumentTypeCode 520262 | | | | 0..1 520264 | TransportationDocumentTypeCode 520266 |
| | | | | | TransportationDocumentNote 520268 | | | | 0..1 520270 | SHORT_Note 520272 |

FIG. 52-8

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentID 520274 | | | | 0..1 520276 | TransportationDocumentID 520278 |
| | | | | | DateTimePeriod 520280 | | | | 0..n 520282 | ... |
| | | | | | | DateTimePeriod 520284 | | | 1 520286 | DateTimePeriod 520288 |
| | | | | | | PeriodRoleCode 520290 | | | 1 520292 | PeriodRoleCode 520294 |
| GovernmentalRequirementInformation 520296 | | | | GovernmentalProcedure 520298 | | | | | 0..n 520300 | ... |
| | | | | | TransportationGovernmentAgencyTypeCode 520302 | | | | 0..1 520304 | TransportationGovernmentAgencyTypeCode 520306 |
| | | | | | TransportationMovementTypeCode 520308 | | | | 0..1 520310 | TransportationMovementTypeCode 520312 |

FIG. 52-9

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGovernmentAgencyInvolvementStatusCode 520314 | | | | 0..1 520316 | TransportationGovernmentAgencyInvolvementStatusCode 520318 |
| | | | | | TransportationGovernmentAgencyActionCode 520320 | | | | 0..1 520322 | TransportationGovernmentAgencyActionCode 520324 |
| | | | | | TransportationGovernmentAgencyProcedureStatusCode 520326 | | | | 0..1 520328 | TransportationGovernmentAgencyProcedureStatusCode 520330 |
| | | | | | Location 520332 | | | | 0..n 520334 | ... |
| | | | | | | Location 520336 | | | 1 520338 | BusinessTransactionDocumentLocation 520340 |
| | | | | | | RoleCode 520342 | | | 1 520344 | LocationRoleCode 520346 |

FIG. 52-10

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TypeCode 520348 | | | 0..1 520350 | LocationTypeCode 520352 |
| | | | | | | Name 520354 | | | 0..1 520356 | MEDIUM_Name 520358 |
| | | | | | DateTimePeriod 520360 | | | | 0..n 520362 | ... |
| | | | | | | DateTimePeriod 520364 | | | 1 520366 | DateTimePeriod 520368 |
| | | | | | | PeriodRoleCode 520370 | | | 1 520372 | PeriodRoleCode 520374 |
| | | | | | Seal 520376 | | | | 0..n 520378 | ... |
| | | | | | | ID 520380 | | | 0..1 520382 | SealID 520384 |
| | | | | | | PartyRoleCode 520386 | | | 0..1 520388 | PartyRoleCode 520390 |

FIG. 52-11

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | PartyFormattedName 520392 | | | 0..1 520394 | LONG_Name 520396 |
| | | | | | | StatusCode 520398 | | | 0..1 520400 | SealStatusCode 520402 |
| | | | | | TextCollection 520404 | | | | 0..1 520406 | ... |
| | | | | | | TextCollection 520408 | | | 1 520410 | TextCollection 520412 |
| | | | | | TransportationDocumentInformation 520414 | | | | 0..n 520416 | ... |
| | | | | | | TransportationDocumentTypeCode 520418 | | | 0..1 520420 | TransportationDocumentTypeCode 520422 |
| | | | | | | TransportationDocumentNote 520424 | | | 0..1 520426 | SHORT_Note 520428 |

FIG. 52-12

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentID 520430 | | | 0..1 520432 | TransportationDocumentID 520434 |
| | | | | | | TransportationDocumentStatusCode 520436 | | | 0..1 520438 | TransportationDocumentStatusCode 520440 |
| | | | | | | LanguageCode 520442 | | | 0..1 520444 | LanguageCode 520446 |
| | | | | | | CommunicationMediumTypeCode 520448 | | | 0..1 520450 | CommunicationMediumTypeCode 520452 |
| | | | | | | RequiredIndicator 520454 | | | 1 520456 | Indicator 520458 |
| | | | | | | OutputCopyNumberValue 520460 | | | 0..1 520462 | NumberValue 520464 |

FIG. 52-13

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | OutputOriginalNumberValue 520466 | | | 0..1 520468 | NumberValue 520470 |
| | | | | | | DateTimePeriod 520472 | | | 0..n 520474 | ... |
| | | | | | | | DateTimePeriod 520476 | | 1 520478 | DateTimePeriod 520480 |
| | | | | | | | PeriodRoleCode 520482 | | 1 520484 | PeriodRoleCode 520486 |
| PartyInformation 520488 | | | | Party 520490 | | | | | 1..n 520492 | ... |
| | | | | | Party 520494 | | | | 1 520496 | BusinessTransactionDocumentParty 520498 |
| | | | | | RoleCode 520500 | | | | 1 520502 | PartyRoleCode 520504 |
| | | | | | FormattedName 520506 | | | | 0..1 520508 | LONG_Name 520510 |

FIG. 52-14

| Package | level 1 | level 2 | level 3 | level 4 | level 5 | level 6 | level 7 | level 8 | Cardinality | Data Type Name |
|---|---|---|---|---|---|---|---|---|---|---|
| | | | | | Amount 520512 | | | | 0..n 520514 | ... |
| | | | | | | Amount 520516 | | | 1 520518 | Amount 520520 |
| | | | | | | RoleCode 520522 | | | 1 520524 | AmountRoleCode 520526 |
| | | | | | DateTimePeriods 520528 | | | | 0..n 520530 | ... |
| | | | | | | RequestedFulfillmentPeriod 520532 | | | 0..1 520534 | DateTimePeriod 520536 |
| | | | | | | AcceptableFulfillmentPeriod 520538 | | | 0..1 520540 | DateTimePeriod 520542 |
| | | | | | | PeriodRoleCode 520544 | | | 1 520546 | PeriodRoleCode 520548 |

FIG. 52-15

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentInformation 520550 | | | | 0..n 520552 | ... |
| | | | | | | TransportationDocumentTypeCode 520554 | | | 0..1 520556 | TransportationDocumentTypeCode 520558 |
| | | | | | | TransportationDocumentNote 520560 | | | 0..1 520562 | SHORT_Note 520564 |
| | | | | | | TransportationDocumentID 520566 | | | 0..1 520568 | TransportationDocumentID 520570 |
| | | | | | | TransportationDocumentStatusCode 520572 | | | 0..1 520574 | TransportationDocumentStatusCode 520576 |
| | | | | | | LanguageCode 520578 | | | 0..1 520580 | LanguageCode 520582 |

FIG. 52-16

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | CommunicationMediumTypeCode 520584 | | | 0..1 520586 | CommunicationMediumTypeCode 520588 |
| | | | | | | RequiredIndicator 520590 | | | 1 520592 | Indicator 520594 |
| | | | | | | OutputCopyNumberValue 520596 | | | 0..1 520598 | NumberValue 520600 |
| | | | | | | OutputOriginalNumberValue 520602 | | | 0..1 520604 | NumberValue 520606 |
| | | | | | | DateTimePeriod 520608 | | | 0..n 520610 | ... |
| | | | | | | | DateTimePeriod 520612 | | 1 520614 | DateTimePeriod 520616 |
| | | | | | | | PeriodRoleCode 520618 | | 1 520620 | PeriodRoleCode 520622 |

FIG. 52-17

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentReference 520624 | | | | 0..n 520626 | ... |
| | | | | | | BusinessTransactionDocumentReference 520628 | | | 0..1 520630 | BusinessTransactionDocumentReference 520632 |
| | | | | | | BusinessTransactionDocumentRelationshipRoleCode 520634 | | | 0..1 520636 | BusinessTransactionDocumentRelationshipRoleCode 520638 |
| | | | | | | BusinessTransactionDocumentRelationshipTypeCode 520640 | | | 0..1 520642 | BusinessTransactionDocumentRelationshipTypeCode 520644 |
| | | | | | | TransportationDocumentTypeCode 520646 | | | 0..1 520648 | TransportationDocumentTypeCode 520650 |

FIG. 52-18

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentNote 520652 | | | 0..1 520654 | SHORT_Note 520656 |
| | | | | | | TransportationDocumentID 520658 | | | 0..1 520660 | TransportationDocumentID 520662 |
| | | | | | | DateTimePeriod 520664 | | | 0..n 520666 | ... |
| | | | | | | | DateTimePeriod 520668 | | 1 520670 | DateTimePeriod 520672 |
| | | | | | | | PeriodRoleCode 520674 | | 1 520676 | PeriodRoleCode 520678 |
| LocationInformation 520680 | | | | Location 520682 | | | | | 0..n 520684 | |
| | | | | | Location 520686 | | | | 1 520688 | BusinessTransactionDocumentLocation 520690 |

FIG. 52-19

| Package | level 1 | level 2 | level 3 | level 4 | level 5 | level 6 | level 7 | level 8 | Cardinality | Data Type Name |
|---|---|---|---|---|---|---|---|---|---|---|
| | | | | | RoleCode 520692 | | | | 1 520694 | LocationRoleCode 520696 |
| | | | | | TypeCode 520698 | | | | 0..1 520700 | LocationTypeCode 520702 |
| | | | | | Name 520704 | | | | 0..1 520706 | MEDIUM_Name 520708 |
| | | | | | DateTimePeriods 520710 | | | | 0..n 520712 | ... |
| | | | | | | RequestedFulfillmentPeriod 520714 | | | 0..1 520716 | DateTimePeriod 520718 |
| | | | | | | AcceptableFulfillmentPeriod 520720 | | | 0..1 520722 | DateTimePeriod 520724 |
| | | | | | | PeriodRoleCode 520726 | | | 1 520728 | PeriodRoleCode 520730 |

FIG. 52-20

| Package | level 1 | level 2 | level 3 | level 4 | level 5 | level 6 | level 7 | level 8 | Cardinality | Data Type Name |
|---|---|---|---|---|---|---|---|---|---|---|
| TransportationStageInformation 520732 | | | | TransportationStage 520734 | | | | | 0..n 520736 | ... |
| | | | | | ID 520738 | | | | 1 520740 | TransportationStageID 520742 |
| | | | | | OrdinalNumberValue 520744 | | | | 0..1 520746 | OrdinalNumberValue 520748 |
| | | | | | TypeCode 520750 | | | | 0..1 520752 | TransportationStageTypeCode 520754 |
| | | | | | JourneyID 520756 | | | | 0..1 520758 | JourneyID 520760 |
| | | | | | TransportModeCode 520762 | | | | 0..1 520764 | TransportModeCode 520766 |
| | | | | | TransportMeansDescriptionCode 520768 | | | | 0..1 520770 | TransportMeansDescriptionCode 520772 |

FIG. 52-21

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportMeansDescription 520774 | | | | 0..1 520776 | SHORT_Description 520778 |
| | | | | | TransportMeansID 520780 | | | | 0..1 520782 | TransportMeansID 520784 |
| | | | | | TransportMeansHomeCountryCode 520786 | | | | 0..1 520788 | CountryCode 520790 |
| | | | | | TransportMeansOwnershipTypeCode 520792 | | | | 0..1 520794 | TransportMeansOwnershipTypeCode 520796 |
| | | | | | CarrierStandardID 520798 | | | | 0..1 520800 | PartyStandardID 520802 |
| | | | | | CarrierFormattedName 520804 | | | | 0..1 520806 | LONG_Name 520808 |
| | | | | | TransportationTransitDirectionCode 520810 | | | | 0..1 520812 | TransportationTransitDirectionCode 520814 |

FIG. 52-22

| Package | level 1 | level 2 | level 3 | level 4 | level 5 | level 6 | level 7 | level 8 | Cardinality | Data Type Name |
|---|---|---|---|---|---|---|---|---|---|---|
| | | | | | CalculatedDistanceMeasure 520816 | | | | 0..1 520818 | Measure 520820 |
| | | | | | GivenDistanceMeasure 520822 | | | | 0..1 520824 | Measure 520826 |
| | | | | | Location 520828 | | | | 1..n 520830 | ... |
| | | | | | | Location 520832 | | | 1 520834 | BusinessTransactionDocumentLocation 520836 |
| | | | | | | RoleCode 520838 | | | 1 520840 | LocationRoleCode 520842 |
| | | | | | | TypeCode 520844 | | | 0..1 520846 | LocationTypeCode 520848 |
| | | | | | | Name 520850 | | | 0..1 520852 | MEDIUM_Name 520854 |
| | | | | | | DateTimePeriods 520856 | | | 0..n 520858 | ... |

FIG. 52-23

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | RequestedFulfillmentPeriod 520860 | | 0..1 520862 | DateTimePeriod 520864 |
| | | | | | | | AcceptableFulfillmentPeriod 520866 | | 0..1 520868 | DateTimePeriod 520870 |
| | | | | | | | PeriodRoleCode 520872 | | 1 520874 | PeriodRoleCode 520876 |
| | | | | | BusinessTransactionDocumentReference 520878 | | | | 0..n 520880 | ... |
| | | | | | | BusinessTransactionDocumentReference 520882 | | | 0..1 520884 | BusinessTransactionDocumentReference 520886 |
| | | | | | | BusinessTransactionDocumentRelationshipRoleCode 520888 | | | 0..1 520890 | BusinessTransactionDocumentRelationshipRoleCode 520892 |

FIG. 52-24

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | BusinessTransactionDocumentRelationshipTypeCode 520894 | | | 0..1 520896 | BusinessTransactionDocumentRelationshipTypeCode 520898 |
| | | | | | | TransportationDocumentTypeCode 520900 | | | 0..1 520902 | TransportationDocumentTypeCode 520904 |
| | | | | | | TransportationDocumentNote 520906 | | | 0..1 520908 | SHORT_Note 520910 |
| | | | | | | TransportationDocumentID 520912 | | | 0..1 520914 | TransportationDocumentID 520916 |
| | | | | | | DateTimePeriod 520918 | | | 0..n 520920 | ... |
| | | | | | | | DateTimePeriod 520922 | | 1 520924 | DateTimePeriod 520926 |

FIG. 52-25

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | PeriodRoleCode 520928 | | 1 520930 | PeriodRoleCode 520932 |
| | | | | | TransportationServiceRequirement 520934 | | | | 0..n 520936 | ... |
| | | | | | | TransportationServiceRequirementCode 520938 | | | 0..1 520940 | TransportationServiceRequirementCode 520942 |
| | | | | | | AdditionalTransportationServiceRequirementCode 520944 | | | 0..1 520946 | TransportationServiceRequirementCode 520948 |
| | | | | | | TransportationContractConditionCode 520950 | | | 0..1 520952 | TransportationContractConditionCode 520954 |
| | | | | | | TransportServiceLevelCode 520956 | | | 0..1 520958 | TransportServiceLevelCode 520960 |

FIG. 52-26

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | NatureOfCargoClassificationCode 520962 | | | 0..1 520964 | NatureOfCargoClassificationCode 520966 |
| TransportationUnitResourceInformation 520968 | | | | TransportationUnitResourceInformation 520970 | | | | | 0..n 520972 | ... |
| | | | | | ID 520974 | | | | 1 520976 | ResourceInformationID 520978 |
| | | | | | ResourceNumberValue 520980 | | | | 0..1 520982 | NumberValue 520984 |
| | | | | | ResourceID 520986 | | | | 0..1 520988 | ResourceID 520990 |
| | | | | | ResourceHomeCountryCode 520992 | | | | 0..1 520994 | CountryCode 520996 |
| | | | | | TransportationUnitResourceCategoryCode 520998 | | | | 0..1 521000 | TransportationUnitResourceCategoryCode 521002 |

FIG. 52-27

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationUnitResourceTypeCode 521004 | | | | 0..1 521006 | TransportationUnitResourceTypeCode 521008 |
| | | | | | FillLevelCode 521010 | | | | 0..1 521012 | FillLevelCode 521014 |
| | | | | | ShippingTypeCode 521016 | | | | 0..1 521018 | ShippingTypeCode 521020 |
| | | | | | HaulageArrangerCode 521022 | | | | 0..1 521024 | HaulageArrangerCode 521026 |
| | | | | | TransportationHandlingInstructionCode 521028 | | | | 0..1 521030 | TransportationHandlingInstructionCode 521032 |
| | | | | | TransportationHandlingInstructionNote 521034 | | | | 0..1 521036 | LONG_Note 521038 |
| | | | | | TransportationStageAssignment 521040 | | | | 0..n 521042 | ... |

FIG. 52-28

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | ShipmentRequestTransportationStageID 521044 | | | 1 521046 | TransportationStageID 521048 |
| | | | | | AttachedEquipment 521050 | | | | 0..n 521052 | ... |
| | | | | | | ShipmentRequestResourceInformationID 521054 | | | 1 521056 | ResourceID 521058 |
| | | | | | Quantity 521060 | | | | 0..n 521062 | ... |
| | | | | | | Quantity 521064 | | | 1 521066 | Quantity 521068 |
| | | | | | | RoleCode 521070 | | | 0..1 521072 | QuantityRoleCode 521074 |
| | | | | | | TypeCode 521076 | | | 0..1 521078 | QuantityTypeCode 521080 |

FIG. 52-29

| Package | level 1 | level 2 | level 3 | level 4 | level 5 | level 6 | level 7 | level 8 | Cardinality | Data Type Name |
|---|---|---|---|---|---|---|---|---|---|---|
| | | | | | Seal 521082 | | | | 0..n 521084 | ... |
| | | | | | | ID 521086 | | | 1 521088 | SealID 521090 |
| | | | | | | PartyRoleCode 521092 | | | 0..1 521094 | PartyRoleCode 521096 |
| | | | | | | PartyFormattedName 521098 | | | 0..1 521100 | LONG_Name 521102 |
| | | | | | | StatusCode 521104 | | | 0..1 521106 | SealStatusCode 521108 |
| | | | | | BusinessTransactionDocumentReference 521110 | | | | 0..n 521112 | ... |
| | | | | | | BusinessTransactionDocumentReference 521114 | | | 0..1 521116 | BusinessTransactionDocumentReference 521118 |

FIG. 52-30

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | BusinessTransactionDocumentRelationshipRoleCode 521120 | | | 0..1 521122 | BusinessTransactionDocumentRelationshipRoleCode 521124 |
| | | | | | | BusinessTransactionDocumentRelationshipTypeCode 521126 | | | 0..1 521128 | BusinessTransactionDocumentRelationshipTypeCode 521130 |
| | | | | | | TransportationDocumentTypeCode 521132 | | | 0..1 521134 | TransportationDocumentTypeCode 521136 |
| | | | | | | TransportationDocumentNote 521138 | | | 0..1 521140 | SHORT_Note 521142 |
| | | | | | | TransportationDocumentID 521144 | | | 0..1 521146 | TransportationDocumentID 521148 |
| | | | | | | DateTimePeriod 521150 | | | 0..n 521152 | |

FIG. 52-31

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | DateTimePeriod 521154 | | 1 521156 | DateTimePeriod 521158 |
| | | | | | | | PeriodRoleCode 521160 | | 1 521162 | PeriodRoleCode 521164 |
| | | | | | TextCollection 521166 | | | | 0..1 521168 | ... |
| | | | | | | TextCollection 521170 | | | 1 521172 | TextCollection 521174 |
| | | | | | Location 521176 | | | | 0..n 521178 | ... |
| | | | | | | Location 521180 | | | 1 521182 | BusinessTransactionDocumentLocation 521184 |
| | | | | | | RoleCode 521186 | | | 1 521188 | LocationRoleCode 521190 |
| | | | | | | TypeCode 521192 | | | 0..1 521194 | LocationTypeCode 521196 |

FIG. 52-32

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | Name 521198 | | | 0..1 521200 | MEDIUM_Name 521202 |
| | | | | | | DateTimePeriods 521204 | | | 0..n 521206 | ... |
| | | | | | | | RequestedFulfillmentPeriod 521208 | | 0..1 521210 | DateTimePeriod 521212 |
| | | | | | | | AcceptableFulfillmentPeriod 521214 | | 0..1 521216 | DateTimePeriod 521218 |
| | | | | | | | PeriodRoleCode 521220 | | 1 521222 | PeriodRoleCode 521224 |
| | | | | | DangerousGoods 521226 | | | | 0..n 521228 | |
| | | | | | | ID 521230 | | | 0..1 521232 | DangerousGoodsID 521234 |
| | | | | | | RegulationsCode 521236 | | | 0..1 521238 | DangerousGoodsRegulationsCode 521240 |

FIG. 52-33

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | HazardCode 521242 | | | 0..1 521244 | DangerousGoodsHazardCode 521246 |
| | | | | | | FlashpointMeasureInterval 521248 | | | 0..1 521250 | MeasureInterval 521252 |
| | | | | | | PackagingGroupCode 521254 | | | 0..1 521256 | DangerousGoodsPackagingGroupCode 521258 |
| | | | | | | EmergencySchedule 521260 | | | 0..1 521262 | DangerousGoodsEmergencySchedule 521264 |
| | | | | | | TransportEmergencyCardCode 521266 | | | 0..1 521268 | TransportEmergencyCardCode 521270 |
| | | | | | | DangerousGoodsLabelCode 521272 | | | 0..1 521274 | DangerousGoodsLabelCode 521276 |
| | | | | | | DangerousGoodsLabelCode2 521278 | | | 0..1 521280 | DangerousGoodsLabelCode 521282 |

FIG. 52-34

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DangerousGoodsLabelCode3 521284 | | | 0..1 521286 | DangerousGoodsLabelCode 521288 |
| | | | | | | PackagingInstructionTypeCode 521290 | | | 0..1 521292 | PackagingInstructionTypeCode 521294 |
| | | | | | | TransportMeansDescriptionCode 521296 | | | 0..1 521298 | TransportMeansDescriptionCode 521300 |
| | | | | | | TransportationAuthorisationCode 521302 | | | 0..1 521304 | DangerousGoodsTransportationAuthorisationCode 521306 |
| | | | | | | ContactInformation 521308 | | | 0..n 521310 | ... |
| | | | | | | | ContactPersonFunctionTypeCode 521312 | | 1 521314 | ContactPersonFunctionTypeCode 521316 |
| | | | | | | | Address 521318 | | 1 521320 | Address 521322 |

FIG. 52-35

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TextCollection 521324 | | | 0..1 521326 | ... |
| | | | | | | | TextCollection 521328 | | 1 521330 | TextCollection 521332 |
| PackageInformation 521334 | | | | PackageInformation 521336 | | | | | 0..n 521338 | ... |
| | | | | | ID 521340 | | | | 1 521342 | PackageInformationID 521344 |
| | | | | | PackageID 521346 | | | | 0..1 521348 | PackageID 521350 |
| | | | | | PackageOrdinalNumberValue 521352 | | | | 0..1 521354 | OrdinalNumberValue 521356 |
| | | | | | PackageNumberValue 521358 | | | | 0..1 521360 | NumberValue 521362 |
| | | | | | PackageTypeCode 521364 | | | | 0..1 521366 | PackageTypeCode 521368 |

FIG. 52-36

| Package | level 1 | level 2 | level 3 | level 4 | level 5 | level 6 | level 7 | level 8 | Cardinality | Data Type Name |
|---|---|---|---|---|---|---|---|---|---|---|
| | | | | | PackagingLevelCode 521370 | | | | 0..1 521372 | PackagingLevelCode 521374 |
| | | | | | PackageMarkingInstructionCode 521376 | | | | 0..1 521378 | PackageMarkingInstructionCode 521380 |
| | | | | | PredecessorPackageID 521382 | | | | 0..1 521384 | PackageID 521386 |
| | | | | | ItemAssignment 521388 | | | | 0..n 521390 | ... |
| | | | | | | ShipmentRequestItemID 521392 | | | 1 521394 | BusinessTransactionDocumentItemID 521396 |
| | | | | | | Quantity 521398 | | | 0..n 521400 | ... |
| | | | | | | | Quantity 521402 | | 1 521404 | Quantity 521406 |
| | | | | | | | RoleCode 521408 | | 0..1 521410 | QuantityRoleCode 521412 |

FIG. 52-37

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TypeCode 521414 | | 0..1 521416 | QuantityTypeCode 521418 |
| | | | | | | BusinessTransactionDocumentReference 521420 | | | 0..n 521422 | ... |
| | | | | | | | BusinessTransactionDocumentReference 521424 | | 0..1 521426 | BusinessTransactionDocumentReference 521428 |
| | | | | | | | BusinessTransactionDocumentRelationshipRoleCode 521430 | | 0..1 521432 | BusinessTransactionDocumentRelationshipRoleCode 521434 |
| | | | | | | | BusinessTransactionDocumentRelationshipTypeCode 521436 | | 0..1 521438 | BusinessTransactionDocumentRelationshipTypeCode 521440 |

FIG. 52-38

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TransportationDocumentTypeCode 521442 | | 0..1 521444 | TransportationDocumentTypeCode 521446 |
| | | | | | | | TransportationDocumentNote 521448 | | 0..1 521450 | SHORT_Note 521452 |
| | | | | | | | TransportationDocumentID 521454 | | 0..1 521456 | TransportationDocumentID 521458 |
| | | | | | | | DateTimePeriod 521460 | | 0..n 521462 | ... |
| | | | | | | | | DateTimePeriod 521464 | 1 521466 | DateTimePeriod 521468 |
| | | | | | | | | PeriodRoleCode 521470 | 1 521472 | PeriodRoleCode 521474 |
| | | | | | | TransportationGoodsIdentification 521476 | | | 0..n 521478 | ... |

FIG. 52-39

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TransportationGoodsIdentifierTypeCode 521480 | | 1 521482 | TransportationGoodsIdentifierTypeCode 521484 |
| | | | | | | | LowerBoundaryTransportationGoodsID 521486 | | 0..1 521488 | TransportationGoodsID 521490 |
| | | | | | | | UpperBoundaryTransportationGoodsID 521492 | | 0..1 521494 | TransportationGoodsID 521496 |
| | | | | | TransportationUnitResourceInformationAssignment 521498 | | | | 0..n 521500 | ... |
| | | | | | | ShipmentRequestResourceInformationID 521502 | | | 1 521504 | ResourceInformationID 521506 |
| | | | | | | Quantity 521508 | | | 0..n 521510 | ... |

FIG. 52-40

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | Quantity 521512 | | 1 521514 | Quantity 521516 |
| | | | | | | | RoleCode 521518 | | 0..1 521520 | QuantityRoleCode 521522 |
| | | | | | | | TypeCode 521524 | | 0..1 521526 | QuantityTypeCode 521528 |
| | | | | | Quantity 521530 | | | | 0..n 521532 | ... |
| | | | | | | Quantity 521534 | | | 1 521536 | Quantity 521538 |
| | | | | | | RoleCode 521540 | | | 0..1 521542 | QuantityRoleCode 521544 |
| | | | | | | TypeCode 521546 | | | 0..1 521548 | QuantityTypeCode 521550 |
| | | | | | TextCollection 521552 | | | | 0..1 521554 | ... |

FIG. 52-41

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TextCollection 521556 | | | 1 521558 | TextCollection 521560 |
| Item 521562 | | | Item 521564 | | | | | | 0..n 521566 | ... |
| | | | | ID 521568 | | | | | 1 521570 | BusinessTransactionDocumentItemID 521572 |
| | | | | OriginCountryCode 521574 | | | | | 0..1 521576 | CountryCode 521578 |
| | | | | DestinationCountryCode 521580 | | | | | 0..1 521582 | CountryCode 521584 |
| | | | | ShippingTypeCode 521586 | | | | | 0..1 521588 | ShippingTypeCode 521590 |
| | | | | HaulageArrangerCode 521592 | | | | | 0..1 521594 | HaulageArrangerCode 521596 |
| | | | | TemperatureMeasureInterval 521598 | | | | | 0..1 521600 | MeasureInterval 521602 |

FIG. 52-42

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationHandlingInstructionCode 521604 | | | | | 0..1 521606 | TransportationHandlingInstructionCode 521608 |
| | | | | TransportationHandlingInstructionNote 521610 | | | | | 0..1 521612 | LONG_Note 521614 |
| ItemInformation 521616 | | | | Amount 521618 | | | | | 0..n 521620 | ... |
| | | | | | Amount 521622 | | | | 1 521624 | Amount 521626 |
| | | | | | RoleCode 521628 | | | | 1 521630 | AmountRoleCode 521632 |
| | | | | TextCollection 521634 | | | | | 0..1 521636 | ... |
| | | | | | TextCollection 521638 | | | | 1 521640 | TextCollection 521642 |
| | | | | NatureOfCargo 521644 | | | | | 0..n 521646 | ... |

FIG. 52-43

| Package | level 1 | level 2 | level 3 | level 4 | level 5 | level 6 | level 7 | level 8 | Cardinality | Data Type Name |
|---|---|---|---|---|---|---|---|---|---|---|
| | | | | | Classification Code 521648 | | | | 1 521650 | NatureOfCargoClassificationCode 521652 |
| | | | | Quantity 521654 | | | | | 0..n 521656 | ... |
| | | | | | Quantity 521658 | | | | 1 521660 | Quantity 521662 |
| | | | | | RoleCode 521664 | | | | 0..1 521666 | QuantityRoleCode 521668 |
| | | | | | TypeCode 521670 | | | | 0..1 521672 | QuantityTypeCode 521674 |
| | | | | TransportationDocumentInformation 521676 | | | | | 0..n 521678 | ... |
| | | | | | TransportationDocumentTypeCode 521680 | | | | 0..1 521682 | TransportationDocumentTypeCode 521684 |

FIG. 52-44

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentNote 521686 | | | | 0..1 521688 | SHORT_Note 521690 |
| | | | | | TransportationDocumentID 521692 | | | | 0..1 521694 | TransportationDocumentID 521696 |
| | | | | | TransportationDocumentStatusCode 521698 | | | | 0..1 521700 | TransportationDocumentStatusCode 521702 |
| | | | | | LanguageCode 521704 | | | | 0..1 521706 | LanguageCode 521708 |
| | | | | | CommunicationMediumTypeCode 521710 | | | | 0..1 521712 | CommunicationMediumTypeCode 521714 |
| | | | | | Requiredindicator 521716 | | | | 1 521718 | Indicator 521720 |
| | | | | | OutputCopyNumberValue 521722 | | | | 0..1 521724 | NumberValue 521726 |

FIG. 52-45

| Package | level 1 | level 2 | level 3 | level 4 | level 5 | level 6 | level 7 | level 8 | Cardinality | Data Type Name |
|---|---|---|---|---|---|---|---|---|---|---|
| | | | | | OutputOriginalNumberValue 521728 | | | | 0..1 521730 | NumberValue 521732 |
| | | | | | DateTimePeriod 521734 | | | | 0..n 521736 | ... |
| | | | | | | DateTimePeriod 521738 | | | 1 521740 | DateTimePeriod 521742 |
| | | | | | | PeriodRoleCode 521744 | | | 1 521746 | PeriodRoleCode 521748 |
| | | | | BusinessTransactionDocumentReference 521750 | | | | | 0..n 521752 | ... |
| | | | | | BusinessTransactionDocumentReference 521754 | | | | 0..1 521756 | BusinessTransactionDocumentReference 521758 |

FIG. 52-46

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentRelationshipRoleCode 521760 | | | | 0..1 521762 | BusinessTransactionDocumentRelationshipRoleCode 521764 |
| | | | | | BusinessTransactionDocumentRelationshipTypeCode 521766 | | | | 0..1 521768 | BusinessTransactionDocumentRelationshipTypeCode 521770 |
| | | | | | TransportationDocumentTypeCode 521772 | | | | 0..1 521774 | TransportationDocumentTypeCode 521776 |
| | | | | | TransportationDocumentNote 521778 | | | | 0..1 521780 | SHORT_Note 521782 |
| | | | | | TransportationDocumentID 521784 | | | | 0..1 521786 | TransportationDocumentID 521788 |
| | | | | | DateTimePeriod 521790 | | | | 0..n 521792 | ... |

FIG. 52-47

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DateTimePeriod 521794 | | | 1 521796 | DateTimePeriod 521798 |
| | | | | | | PeriodRoleCode 521800 | | | 1 521802 | PeriodRoleCode 521804 |
| | | | | DangerousGoods 521806 | | | | | 0..n 521808 | ... |
| | | | | | ID 521810 | | | | 0..1 521812 | DangerousGoodsID 521814 |
| | | | | | RegulationsCode 521816 | | | | 0..1 521818 | DangerousGoodsRegulationsCode 521820 |
| | | | | | HazardCode 521822 | | | | 0..1 521824 | DangerousGoodsHazardCode 521826 |
| | | | | | FlashpointMeasureInterval 521828 | | | | 0..1 521830 | MeasureInterval 521832 |
| | | | | | PackagingGroupCode 521834 | | | | 0..1 521836 | DangerousGoodsPackagingGroupCode 521838 |

FIG. 52-48

| Package | level 1 | level 2 | level 3 | level 4 | level 5 | level 6 | level 7 | level 8 | Cardinality | Data Type Name |
|---|---|---|---|---|---|---|---|---|---|---|
| | | | | | EmergencySchedule 521840 | | | | 0..1 521842 | DangerousGoodsEmergencySchedule 521844 |
| | | | | | TransportEmergencyCardCode 521846 | | | | 0..1 521848 | TransportEmergencyCardCode 521850 |
| | | | | | DangerousGoodsLabelCode 521852 | | | | 0..1 521854 | DangerousGoodsLabelCode 521856 |
| | | | | | DangerousGoodsLabelCode2 521858 | | | | 0..1 521860 | DangerousGoodsLabelCode 521862 |
| | | | | | DangerousGoodsLabelCode3 521864 | | | | 0..1 521866 | DangerousGoodsLabelCode 521868 |
| | | | | | PackingInstructionTypeCode 521870 | | | | 0..1 521872 | PackingInstructionTypeCode 521874 |

FIG. 52-49

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportMeansDescriptionCode 521876 | | | | 0..1 521878 | TransportMeansDescriptionCode 521880 |
| | | | | | TransportationAuthorisationCode 521882 | | | | 0..1 521884 | DangerousGoodsTransportationAuthorisationCode 521886 |
| | | | | | ContactInformation 521888 | | | | 0..n 521890 | ... |
| | | | | | | ContactPersonFunctionTypeCode 521892 | | | 1 521894 | ContactPersonFunctionTypeCode 521896 |
| | | | | | | Address 521898 | | | 1 521900 | Address 521902 |
| | | | | | Quantity 521904 | | | | 0..n 521906 | ... |
| | | | | | | Quantity 521908 | | | 1 521910 | Quantity 521912 |

FIG. 52-50

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RoleCode 521914 | | | 0..1 521916 | QuantityRoleCode 521918 |
| | | | | | | TypeCode 521920 | | | 0..1 521922 | QuantityTypeCode 521924 |
| | | | | | TextCollection 521926 | | | | 0..1 521928 | ... |
| | | | | | | TextCollection 521930 | | | 1 521932 | TextCollection 521934 |
| | | | | | TransportationUnitResourceInformationAssignment 521936 | | | | 0..n 521938 | ... |
| | | | | | | ShipmentRequestResourceInformationID 521940 | | | 1 521942 | ResourceInformationID 521944 |
| | | | | | | Quantity 521946 | | | 0..n 521948 | ... |

FIG. 52-51

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | Quantity 521950 | | 1 521952 | Quantity 521954 |
| | | | | | | | RoleCode 521956 | | 0..1 521958 | QuantityRoleCode 521960 |
| | | | | | | | TypeCode 521962 | | 0..1 521964 | QuantityTypeCode 521966 |
| | | | | TransportationStageAssignment 521968 | | | | | 0..n 521970 | ... |
| | | | | | ShipmentRequestTransportationStageID 521972 | | | | 1 521974 | TransportationStageID 521976 |
| | | | | | Quantity 521978 | | | | 0..n 521980 | ... |
| | | | | | | Quantity 521982 | | | 1 521984 | Quantity 521986 |

FIG. 52-52

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RoleCode 521988 | | | 0..1 521990 | QuantityRoleCode 521992 |
| | | | | | | TypeCode 521994 | | | 0..1 521996 | QuantityTypeCode 521998 |
| | | | | TransportationUnitResourceInformationAssignment 522000 | | | | | 0..n 522002 | ... |
| | | | | | ShipmentRequestResourceInformationID 522004 | | | | 1 522006 | ResourceInformationID 522008 |
| | | | | | Quantity 522010 | | | | 0..n 522012 | ... |
| | | | | | | Quantity 522014 | | | 1 522016 | Quantity 522018 |
| | | | | | | RoleCode 522020 | | | 0..1 522022 | QuantityRoleCode 522024 |

FIG. 52-53

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TypeCode 522026 | | | 0..1 522028 | QuantityTypeCode 522030 |
| GovernmentalProcedureInformation 522032 | | | | GovernmentalProcedure 522034 | | | | | 0..n 522036 | ... |
| | | | | | TransportationGovernmentAgencyTypeCode 522038 | | | | 0..1 522040 | TransportationGovernmentAgencyTypeCode 522042 |
| | | | | | TransportationMovementTypeCode 522044 | | | | 0..1 522046 | TransportationMovementTypeCode 522048 |
| | | | | | TransportationGovernmentAgencyInvolvementStatusCode 522050 | | | | 0..1 522052 | TransportationGovernmentAgencyInvolvementStatusCode 522054 |
| | | | | | TransportationGovernmentAgencyActionCode 522056 | | | | 0..1 522058 | TransportationGovernmentAgencyActionCode 522060 |

FIG. 52-54

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGovernmentAgencyProcedureStatusCode 522062 | | | | 0..1 522064 | TransportationGovernmentAgencyProcedureStatusCode 522066 |
| | | | | | Location 522068 | | | | 0..n 522070 | ... |
| | | | | | | Location 522072 | | | 1 522074 | BusinessTransactionDocumentLocation 522076 |
| | | | | | | RoleCode 522078 | | | 1 522080 | LocationRoleCode 522082 |
| | | | | | | TypeCode 522084 | | | 0..1 522086 | LocationTypeCode 522088 |
| | | | | | | Name 522090 | | | 0..1 522092 | MEDIUM_Name 522094 |
| | | | | | DateTimePeriod 522096 | | | | 0..n 522098 | ... |

FIG. 52-55

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DateTimePeriod 522100 | | | 1 522102 | DateTimePeriod 522104 |
| | | | | | | PeriodRoleCode 522106 | | | 1 522108 | PeriodRoleCode 522110 |
| | | | | | Seal 522112 | | | | 0..n 522114 | ... |
| | | | | | | ID 522116 | | | 1 522118 | SealID 522120 |
| | | | | | | PartyRoleCode 522122 | | | 0..1 522124 | PartyRoleCode 522126 |
| | | | | | | PartyFormattedName 522128 | | | 0..1 522130 | LONG_Name 522132 |
| | | | | | | StatusCode 522134 | | | 0..1 522136 | SealStatusCode 522138 |
| | | | | | TextCollection 522140 | | | | 0..n 522142 | ... |

FIG. 52-56

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TextCollection 522144 | | | 0..1 522146 | TextCollection 522148 |
| | | | | | TransportationDocumentInformation 522150 | | | | 0..n 522152 | ... |
| | | | | | | TransportationDocumentTypeCode 522154 | | | 0..1 522156 | TransportationDocumentTypeCode 522158 |
| | | | | | | TransportationDocumentNote 522160 | | | 0..1 522162 | SHORT_Note 522164 |
| | | | | | | TransportationDocumentID 522166 | | | 0..1 522168 | TransportationDocumentID 522170 |
| | | | | | | TransportationDocumentStatusCode 522172 | | | 0..1 522174 | TransportationDocumentStatusCode 522176 |

FIG. 52-57

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | LanguageCode 522178 | | | 0..1 522180 | LanguageCode 522182 |
| | | | | | | CommunicationMediumTypeCode 522184 | | | 0..1 522186 | CommunicationMediumTypeCode 522188 |
| | | | | | | RequiredIndicator 522190 | | | 1 522192 | Indicator 522194 |
| | | | | | | OutputCopyNumberValue 522196 | | | 0..1 522198 | NumberValue 522200 |
| | | | | | | OutputOriginalNumberValue 522202 | | | 0..1 522204 | NumberValue 522206 |
| | | | | | | DateTimePeriod 522208 | | | 0..n 522210 | ... |
| | | | | | | | DateTimePeriod 522212 | | 1 522214 | DateTimePeriod 522216 |

FIG. 52-58

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | PeriodRoleCode 522218 | | 1 522220 | PeriodRoleCode 522222 |
| PartyInformation 522224 | | | | Party 522226 | | | | | 0..n 522228 | ... |
| | | | | | Party 522230 | | | | 1 522232 | BusinessTransactionDocumentParty 522234 |
| | | | | | RoleCode 522236 | | | | 1 522238 | PartyRoleCode 522240 |
| | | | | | FormattedName 522242 | | | | 0..1 522244 | LONG_Name 522246 |
| | | | | | DateTimePeriods 522248 | | | | 0..n 522250 | ... |
| | | | | | | RequestedFulfillmentPeriod 522252 | | | 0..1 522254 | DateTimePeriod 522256 |

FIG. 52-59

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | AcceptableFulfillmentPeriod 522258 | | | 0..1 522260 | DateTimePeriod 522262 |
| | | | | | | PeriodRoleCode 522264 | | | 1 522266 | PeriodRoleCode 522268 |
| LocationInformation 522270 | | | | Location 522272 | | | | | 0..n 522274 | ... |
| | | | | | Location 522276 | | | | 1 522278 | BusinessTransactionDocumentLocation 522280 |
| | | | | | RoleCode 522282 | | | | 1 522284 | LocationRoleCode 522286 |
| | | | | | TypeCode 522288 | | | | 0..1 522290 | LocationTypeCode 522292 |
| | | | | | Name 522294 | | | | 0..1 522296 | MEDIUM_Name 522298 |
| | | | | | DateTimePeriods 522300 | | | | 0..n 522302 | ... |

FIG. 52-60

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RequestedFulfillmentPeriod 522304 | | | 0..1 522306 | DateTimePeriod 522308 |
| | | | | | | AcceptableFulfillmentPeriod 522310 | | | 0..1 522312 | DateTimePeriod 522314 |
| | | | | | | PeriodRoleCode 522316 | | | 1 522318 | PeriodRoleCode 522320 |
| TransportationGoodsInformation 522322 | | | | ProductInformation 522324 | | | | | 0..n 522326 | ... |
| | | | | | Product 522328 | | | | 0..1 522330 | BusinessTransactionDocumentProduct 522332 |
| | | | | | ProductDescription 522334 | | | | 0..1 522336 | SHORT_Description 522338 |
| | | | | TransportationGoodsIdentification 522340 | | | | | 0..n 522342 | ... |

FIG. 52-61

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGoodsIdentifierTypeCode 522344 | | | | 1 522346 | TransportationGoodsIdentifierTypeCode 522348 |
| | | | | | LowerBoundaryTransportationGoodsID 522350 | | | | 1 522352 | TransportationGoodsID 522354 |
| | | | | | UpperBoundaryTransportationGoodsID 522356 | | | | 0..1 522358 | TransportationGoodsID 522360 |
| TransportationChargesInformation 522362 | | | TransportationChargesInformation 522364 | | | | | | 0..n 522366 | ... |
| | | | | TransportationChargesUsageCode 522368 | | | | | 1 522370 | TransportationChargesUsageCode 522372 |
| | | | | ShipmentRequestItemID 522374 | | | | | 0..1 522376 | BusinessTransactionDocumentItemID 522378 |

FIG. 52-62

| Package | level 1 | level 2 | level 3 | level 4 | level 5 | level 6 | level 7 | level 8 | Cardinality | Data Type Name |
|---|---|---|---|---|---|---|---|---|---|---|
| | | | | ShipmentRequestPartyStandardID 522380 | | | | | 0..1 522382 | PartyStandardID 522384 |
| | | | | ShipmentRequestPartyInternalID 522386 | | | | | 0,,1 522388 | PartyInternalID 522390 |
| | | | | ShipmentRequestResourceInformationID 522392 | | | | | 0..1 522394 | ResourceInformationID 522396 |
| | | | | ShipmentRequestPackageInformationID 522398 | | | | | 0..1 522400 | PackageInformationID 522402 |
| | | | | ShipmentRequestTransportationStageID 522404 | | | | | 0..1 522406 | TransportationStageID 522408 |
| | | | | TransportationCharges 522410 | | | | | 0..1 522412 | ... |

FIG. 52-63

| Package | level 1 | level 2 | level 3 | level 4 | level 5 | level 6 | level 7 | level 8 | Cardinality | Data Type Name |
|---|---|---|---|---|---|---|---|---|---|---|
| | | | | | ID 522414 | | | | 1 522416 | TransportationChargesID 522418 |
| | | | | | FreightAgreementID 522420 | | | | 1 522422 | FreightAgreementID 522424 |
| | | | | | OriginCode 522426 | | | | 0..1 522428 | TransportationChargesOriginCode 522430 |
| | | | | | TariffID 522432 | | | | 0..1 522434 | TransportationChargesTariffID 522436 |
| | | | | | CalculationSheetID 522438 | | | | 1 522440 | TransportationChargesCalculationSheetID 522442 |
| | | | | | Location 522444 | | | | 0..n 522446 | ... |
| | | | | | | Location 522448 | | | 1 522450 | BusinessTransactionDocumentLocation 522452 |
| | | | | | | RoleCode 522454 | | | 1 522456 | LoactionRoleCode 522458 |

FIG. 52-64

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TypeCode 522460 | | | 0..1 522462 | LocationTypeCode 522464 |
| | | | | | | Name 522466 | | | 0..1 522468 | MEDIUM_Name 522470 |
| | | | | | | DateTimePeriods 522472 | | | 0..n 522474 | ... |
| | | | | | | | RequestedFulfillmentPeriod 522476 | | 0..1 522478 | DateTimePeriod 522480 |
| | | | | | | | AcceptableFulfillmentPeriod 522482 | | 0..1 522484 | DateTimePeriod 522486 |
| | | | | | | | PeriodRoleCode 522488 | | 1 522490 | PeriodRoleCode 522492 |
| | | | | | TextCollection 522494 | | | | 0..1 522496 | ... |
| | | | | | | TextCollection 522498 | | | 1 522500 | TextCollection 522502 |

FIG. 52-65

| Package | level 1 | level 2 | level 3 | level 4 | level 5 | level 6 | level 7 | level 8 | Cardinality | Data Type Name |
|---|---|---|---|---|---|---|---|---|---|---|
| | | | | | Currency 522504 | | | | 0..n 522506 | ... |
| | | | | | | Code 522508 | | | 1 522510 | CurrencyCode 522512 |
| | | | | | | RoleCode 522514 | | | 1 522516 | CurrencyRoleCode 522518 |
| | | | | | | UsageCode 522520 | | | 0..1 522522 | CurrencyUsageCode 522524 |
| | | | | | ExchangeRate 522526 | | | | 0..n 522528 | ... |
| | | | | | | ExchangeRate 522530 | | | 1 522532 | ExchangeRate 522534 |
| | | | | | | TypeCode 522536 | | | 0..1 522538 | ExchangeRateTypeCode 522540 |
| | | | | | PercentElement 522542 | | | | 0..n 522544 | ... |

FIG. 52-66

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | PercentRoleCode 522546 | | | 1 522548 | PercentRoleCode 522550 |
| | | | | | | Percent 522552 | | | 1 522554 | Percent 522556 |
| | | | | | | TransportationChargesPercentCalculationBaseCode 522558 | | | 0..1 522560 | TransportationChargesPercentCalculationBaseCode 522562 |
| | | | | | | StatusCode 522564 | | | 0..1 522566 | TransportationChargesPercentElementStatusCode 522568 |
| | | | | | DateTimePeriod 522570 | | | | 0..n 522572 | ... |
| | | | | | | DateTimePeriod 522574 | | | 1 522576 | DateTimePeriod 522578 |
| | | | | | | PeriodRoleCode 522580 | | | 1 522582 | PeriodRoleCode 522584 |

FIG. 52-67

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentReference 522586 | | | | 0..n 522588 | ... |
| | | | | | | BusinessTransactionDocumentReference 522590 | | | 0..1 522592 | BusinessTransactionDocumentReference 522594 |
| | | | | | | BusinessTransactionDocumentRelationshipRoleCode 522596 | | | 0..1 522598 | BusinessTransactionDocumentRelationshipRoleCode 522600 |
| | | | | | | BusinessTransactionDocumentRelationshipTypeCode 522602 | | | 0..1 522604 | BusinessTransactionDocumentRelationshipTypeCode 522606 |
| | | | | | | TransportationDocumentTypeCode 522608 | | | 0..1 522610 | TransportationDocumentTypeCode 522612 |

FIG. 52-68

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentNote 522614 | | | 0..1 522616 | SHORT_Note 522618 |
| | | | | | | TransportationDocumentID 522620 | | | 0..1 522622 | TransportationDocumentID 522624 |
| | | | | | TaxDetail 522626 | | | | 0..n 522628 | ... |
| | | | | | | ProductTax 522630 | | | 1 522632 | ProductTax 522634 |
| | | | | | PaymentInstruction 522636 | | | | 0..n 522638 | ... |
| | | | | | | PaymentInstruction 522640 | | | 1 522642 | PaymentInstruction 522644 |
| | | | | | | TransportationChargesElementCategoryCode 522646 | | | 0..1 522648 | TransportationChargesElementCategoryCode 522650 |

FIG. 52-69

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationChargesElementSubCategoryCode 522652 | | | 0..1 522654 | TransportationChargesElementSubCategoryCode 522656 |
| | | | | | | TransportationChargesPaymentArrangementCode 522658 | | | 0..1 522660 | TransportationChargesPaymentArrangementCode 522662 |
| | | | | | CashDiscountTerms 522664 | | | | 0..1 522666 | ... |
| | | | | | | CashDiscountTerms 522668 | | | 1 522670 | CashDiscountTerms 522672 |
| | | | | | | TransportationChargesElementCategoryCode 522674 | | | 0..1 522676 | TransportationChargesElementCategoryCode 522678 |

FIG. 52-70

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationChargesElementSubCategoryCode 522680 | | | 0..1 522682 | TransportationChargesElementSubCategoryCode 522684 |
| | | | | | Element 522686 | | | | 0..n 522688 | ... |
| | | | | | | CategoryCode 522690 | | | 1 522692 | TransportationChargesElementCategoryCode 522694 |
| | | | | | | SubCategoryCode 522696 | | | 1 522698 | TransportationChargesElementSubCategoryCode 522700 |
| | | | | | | TypeCode 522702 | | | 1 522704 | TransportationChargesElementTypeCode 522706 |
| | | | | | | CalculationResolutionCode 522708 | | | 1 522710 | TransportationChargesElementCalculationResolutionCode 522712 |

FIG. 52-71

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationChargesPaymentArrangementCode 522714 | | | 0...1 522716 | TransportationChargesPaymentArrangementCode 522718 |
| | | | | | | Location 522720 | | | 0..n 522722 | ... |
| | | | | | | | Location 522724 | | 1 522726 | BusinessTransactionDocumentLocation 522728 |
| | | | | | | | RoleCode 522730 | | 1 522732 | LocationRoleCode 522734 |
| | | | | | | | TypeCode 522736 | | 0..1 522738 | LocationTypeCode 522740 |
| | | | | | | | Name 522742 | | 0..1 522744 | MEDIUM_Name 522746 |
| | | | | | | | DateTimePeriods 522748 | | 0..n 522750 | ... |

FIG. 52-72

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | | RequestedFulfillmentPeriod 522752 | 0..1 522754 | DateTimePeriod 522756 |
| | | | | | | | | AcceptableFulfillmentPeriod 522758 | 0..1 522760 | DateTimePeriod 522762 |
| | | | | | | | | PeriodRoleCode 522764 | 1 522766 | PeriodRoleCode 522768 |
| | | | | | | TextCollection 522770 | | | 0..1 522772 | … |
| | | | | | | | TextCollection 522774 | | 1 522776 | TextCollection 522778 |
| | | | | | | Currency 522780 | | | 0..n 522782 | … |
| | | | | | | | Code 522784 | | 1 522786 | CurrencyCode 522788 |

FIG. 52-73

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | RoleCode 522790 | | 1 522792 | CurrencyRoleCode 522794 |
| | | | | | | | UsageCode 522796 | | 0..1 522798 | CurrencyUsageCode 522800 |
| | | | | | | RateElement 522802 | | | 0..n 522804 | ... |
| | | | | | | | ID 522806 | | 1 522808 | TransportationChargesElementRateElementID 522810 |
| | | | | | | | Amount 522812 | | 1 522814 | Amount 522816 |
| | | | | | | | BaseQuantity 522818 | | 1 522820 | Quantity 522822 |
| | | | | | | | TransportationChargesRateTypeCode 522824 | | 0..1 522826 | TransportationChargesRateTypeCode 522828 |

FIG. 52-74

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TransportationChargesRateRoleCode 522830 | | 1 522832 | TransportationChargesRateRoleCode 522834 |
| | | | | | | | TransportationChargesRateElementStatusCode 522836 | | 0..1 522838 | TransportationChargesRateElementStatusCode 522840 |
| | | | | | | PercentElement 522842 | | | 0..n 522844 | ... |
| | | | | | | | PercentRoleCode 522846 | | 1 522848 | PercentRoleCode 522850 |
| | | | | | | | Percent 522852 | | 1 522854 | Percent 522856 |
| | | | | | | | TransportationChargesPercentCalculationBaseCode 522858 | | 0..1 522860 | TransportationChargesPercentCalculationBaseCode 522862 |

FIG. 52-75

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | StatusCode 522864 | | 0..1 522866 | TransportationChargesPercentElementStatusCode 522868 |
| | | | | | | AmountElement 522870 | | | 0..n 522872 | ... |
| | | | | | | | Amount 522874 | | 1 522876 | Amount 522878 |
| | | | | | | | AmountRoleCode 522880 | | 1 522882 | AmountRoleCode 522884 |
| | | | | | | | TransportationChargesAmountElementStatusCode 522886 | | 0..1 522888 | TransportationChargesAmountElementStatusCode 522890 |
| | | | | | | | RateElementlAssignment 522892 | | 0..n 522894 | ... |

FIG. 52-76

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | | TransportationChargesElementRateElementID 522896 | 1 522898 | TransportationChargesElementRateElementID 522900 |
| | | | | | | CalculationBase 522902 | | | 0..n 522904 | ... |
| | | | | | | | TransportationChargesElementCalculationBaseCode 522906 | | 1 522908 | TransportationChargesElementCalculationBaseCode 522910 |
| | | | | | | | BaseQuantity 522912 | | 0..1 522914 | Quantity 522916 |
| | | | | | | | BaseQuantityRoleCode 522918 | | 0..1 522920 | QuantityRoleCode 522922 |
| | | | | | | | BaseQuantityTypeCode 522924 | | 0..1 522926 | QuantityTypeCode 522928 |

FIG. 52-77

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TaxDetail 522930 | | | 0..n 522932 | ... |
| | | | | | | | ProductTax 522934 | | 1 522936 | ProductTax 522938 |
| | | | | | | DateTimePeriod 522940 | | | 0..n 522942 | ... |
| | | | | | | | DateTimePeriod 522944 | | 1 522946 | DateTimePeriod 522948 |
| | | | | | | | PeriodRoleCode 522950 | | 1 522952 | PeriodRoleCode 522954 |
| | | | | | | CostDistribution 522956 | | | 0..n 522958 | ... |
| | | | | | | | AccountingCodingBlockAssignment 522960 | | 1 522962 | AccountingCodingBlockAssignment 522964 |

FIG. 53-1

| Package | level1 | level2 | level3 | level4 | level5 | level6 | Cardinality | Data Type Name |
|---|---|---|---|---|---|---|---|---|
| ShipmentRequestConfirmationReceiptNotificationMessage 53000 | ShipmentRequestConfirmationReceiptNotificationMessage 53002 | | | | | | | ShipmentRequestReceiptNotificationMessage 53004 |
| MessageHeader 53006 | | MessageHeader 53008 | | | | | 1 53010 | BusinessDocumentMessageHeader 53012 |
| ShipmentRequest 53014 | | ShipmentRequest 53016 | | | | | 1 53018 | ... |
| | | | ID 53020 | | | | 1 53022 | BusinessTransactionDocumentID 53024 |
| Confirmation 53026 | | | Confirmation 53028 | | | | 1 53030 | ... |

FIG. 53-2

| Package | level1 | level2 | level3 | level4 | level5 | level6 | Cardinality | Data Type Name |
|---|---|---|---|---|---|---|---|---|
| HeaderInformation 53032 | | | | DateTimePeriods 53034 | | | 0..n 53036 | ... |
| | | | | | RequestedFulfill-mentPeriod 53038 | | 0..1 53040 | DateTimePeriod 53042 |
| | | | | | AcceptableFulfill-mentPeriod 53044 | | 0..1 53046 | DateTimePeriod 53048 |
| | | | | | PeriodRoleCode 53050 | | 1 53052 | PeriodRoleCode 53054 |
| | | | | TextCollection 53056 | | | 0..n 53058 | ... |
| | | | | | TextCollection 53060 | | 1 53062 | TextCollection 53064 |

FIG. 53-3

| Package | level1 | level2 | level3 | level4 | level5 | level6 | Cardinality | Data Type Name |
|---|---|---|---|---|---|---|---|---|
| | | | | BusinessTransactionDocumentReference 53066 | | | 0..n 53068 | ... |
| | | | | | BusinessTransactionDocumentReference 53070 | | 0..1 53072 | BusinessTransactionDocumentReference 53074 |
| | | | | | BusinessTransactionDocumentRelationshipRoleCode 53076 | | 0..1 53078 | BusinessTransactionDocumentRelationshipRoleCode 53080 |
| | | | | | BusinessTransactionDocumentRelationshipTypeCode 53082 | | 0..1 53084 | BusinessTransactionDocumentRelationshipTypeCode 53086 |
| | | | | | TransportationDocumentTypeCode 53088 | | 0..1 53090 | TransportationDocumentTypeCode 53092 |

FIG. 53-4

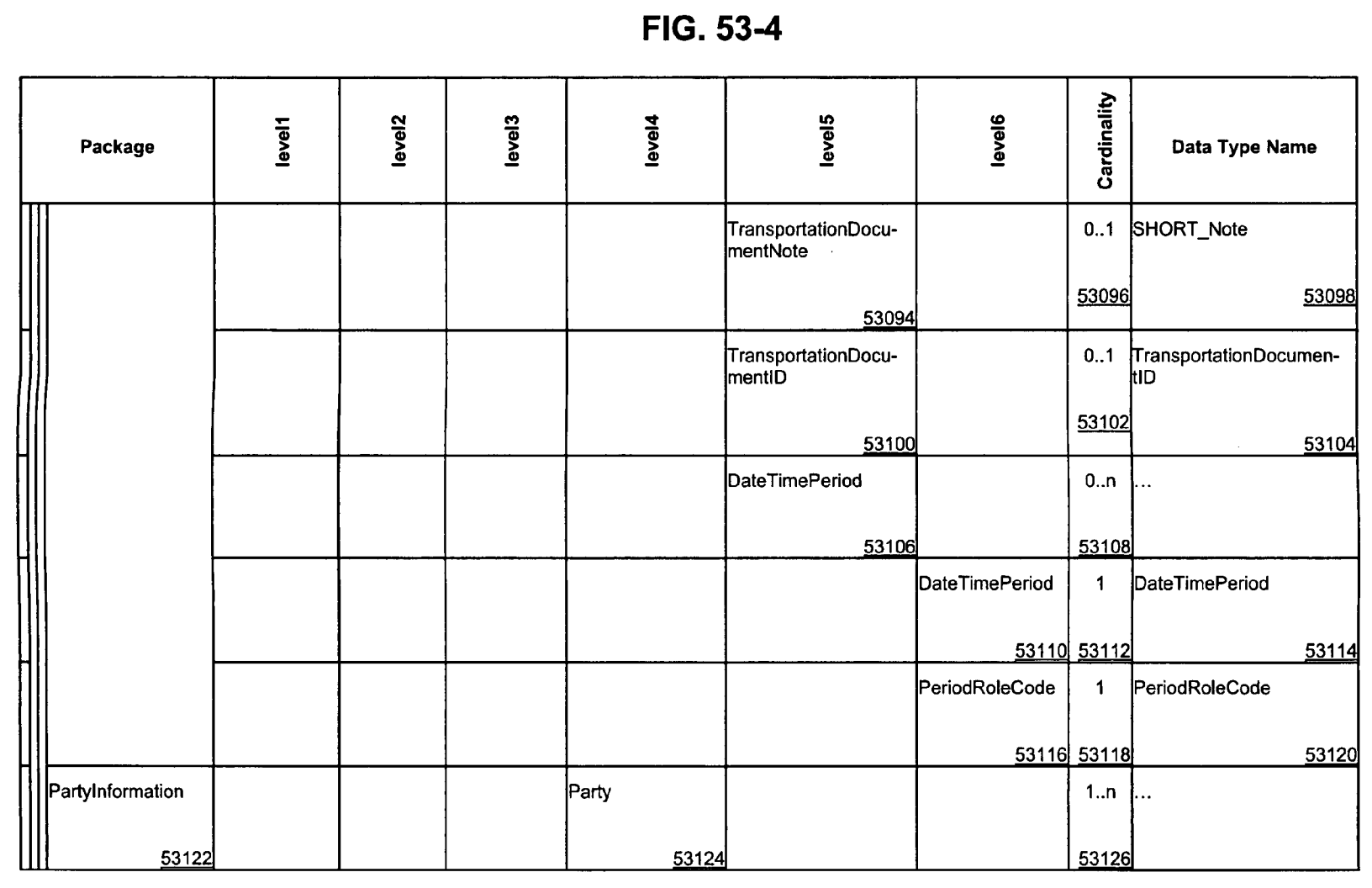

| Package | level1 | level2 | level3 | level4 | level5 | level6 | Cardinality | Data Type Name |
|---|---|---|---|---|---|---|---|---|
| | | | | | TransportationDocumentNote 53094 | | 0..1 53096 | SHORT_Note 53098 |
| | | | | | TransportationDocumentID 53100 | | 0..1 53102 | TransportationDocumentID 53104 |
| | | | | | DateTimePeriod 53106 | | 0..n 53108 | ... |
| | | | | | | DateTimePeriod 53110 | 1 53112 | DateTimePeriod 53114 |
| | | | | | | PeriodRoleCode 53116 | 1 53118 | PeriodRoleCode 53120 |
| PartyInformation 53122 | | | | Party 53124 | | | 1..n 53126 | ... |

FIG. 53-5

| Package | level1 | level2 | level3 | level4 | level5 | level6 | Cardinality | Data Type Name |
|---|---|---|---|---|---|---|---|---|
| | | | | | Party 53128 | | 1 53130 | BusinessTransaction-DocumentParty 53132 |
| | | | | | RoleCode 53134 | | 1 53136 | PartyRoleCode 53138 |

FIG. 54-1

| Package | level1 | level2 | level3 | level4 | level5 | level6 | Cardinality | Data Type Name |
|---|---|---|---|---|---|---|---|---|
| ShipmentRequestReceiptNotificationMessage 54000 | ShipmentRequestReceiptNotificationMessage 54002 | | | | | | | ShipmentRequestReceiptNotificationMessage 54004 |
| MessageHeader 54006 | | MessageHeader 54008 | | | | | 1 54010 | BusinessDocumentMessageHeader 54012 |
| ShipmentRequest 54014 | | ShipmentRequest 54016 | | | | | 1 54018 | ... |
| | | | ID 54020 | | | | 1 54022 | BusinessTransactionDocumentID 54024 |
| Request 54026 | | | Request 54028 | | | | 1 54030 | ... |

FIG. 54-2

| Package | level1 | level2 | level3 | level4 | level5 | level6 | Cardinality | Data Type Name |
|---|---|---|---|---|---|---|---|---|
| HeaderInformation 54032 | | | | DateTimePeriods 54034 | | | 0..n 54036 | ... |
| | | | | | RequestedFulfillmentPeriod 54038 | | 0..1 54040 | DateTimePeriod 54042 |
| | | | | | AcceptableFulfillmentPeriod 54044 | | 0..1 54046 | DateTimePeriod 54048 |
| | | | | | PeriodRoleCode 54050 | | 1 54052 | PeriodRoleCode 54054 |
| | | | | TextCollection 54056 | | | 0..n 54058 | ... |
| | | | | | TextCollection 54060 | | 1 54062 | TextCollection 54064 |

FIG. 54-3

| Package | level1 | level2 | level3 | level4 | level5 | level6 | Cardinality | Data Type Name |
|---|---|---|---|---|---|---|---|---|
| | | | | BusinessTransactionDocumentReference 54066 | | | 0..n 54068 | … |
| | | | | | BusinessTransactionDocumentReference 54070 | | 0..1 54072 | BusinessTransactionDocumentReference 54074 |
| | | | | | BusinessTransactionDocumentRelationshipRoleCode 54076 | | 0..1 54078 | BusinessTransactionDocumentRelationshipRoleCode 54080 |
| | | | | | BusinessTransactionDocumentRelationshipTypeCode 54082 | | 0..1 54084 | BusinessTransactionDocumentRelationshipTypeCode 54086 |
| | | | | | TransportationDocumentTypeCode 54088 | | 0..1 54090 | TransportationDocumentTypeCode 54092 |

FIG. 54-4

| Package | level1 | level2 | level3 | level4 | level5 | level6 | Cardinality | Data Type Name |
|---|---|---|---|---|---|---|---|---|
| | | | | | TransportationDocument-Note 54094 | | 0..1 54096 | SHORT_Note 54098 |
| | | | | | TransportationDocumentID 54100 | | 0..1 54102 | TransportationDocumentID 54104 |
| | | | | | DateTimePeriod 54106 | | 0..n 54108 | ... |
| | | | | | | DateTimePeriod 54110 | 1 54112 | DateTimePeriod 54114 |
| | | | | | | PeriodRoleCode 54116 | 1 54118 | PeriodRoleCode 54120 |
| PartyInformation 54122 | | | | Party 54124 | | | 1..n 54126 | ... |

FIG. 54-5

| Package | level1 | level2 | level3 | level4 | level5 | level6 | Cardinality | Data Type Name |
|---|---|---|---|---|---|---|---|---|
| | | | | | Party 54128 | | 1 54130 | BusinessTransactionDocumentParty 54132 |
| | | | | | RoleCode 54134 | | 1 54136 | PartyRoleCode 54138 |

FIG. 55-1

| Package | level 1 | level 2 | level 3 | level 4 | level 5 | level 6 | level 7 | level 8 | Cardinality | Data Type Name |
|---|---|---|---|---|---|---|---|---|---|---|
| ShipmentRequestRequestMessage 550000 | ShipmentRequestRequestMessage 550002 | | | | | | | | | ShipmentRequestRequestMessage 550004 |
| MessageHeader 550006 | | MessageHeader 550008 | | | | | | | 1 550010 | BusinessDocumentMessageHeader 550012 |
| ShipmentRequest 550014 | | ShipmentRequest 550016 | | | | | | | 1 550018 | … |
| | | | @actioncode 550020 | | | | | | 1 550022 | ActionCode 550024 |
| | | | ID 550026 | | | | | | 1 550028 | BusinessTransactionDocumentID 550030 |
| Request 550032 | | | Request 550034 | | | | | | 1 550036 | … |
| | | | | DeliveryTerms 550038 | | | | | 0..1 550040 | DeliveryTerms 550042 |

FIG. 55-2

| Package | level 1 | level 2 | level 3 | level 4 | level 5 | level 6 | level 7 | level 8 | Cardinality | Data Type Name |
|---|---|---|---|---|---|---|---|---|---|---|
| HeaderInformation 550044 | | | | DateTimePeriods 550046 | | | | | 0..n 550048 | ... |
| | | | | | RequestedFulfillmentPeriod 550050 | | | | 0..1 550052 | DateTimePeriod 550054 |
| | | | | | AcceptableFulfillmentPeriod 550056 | | | | 0..1 550058 | DateTimePeriod 550060 |
| | | | | | PeriodRoleCode 550062 | | | | 1 550064 | PeriodRoleCode 550066 |
| | | | | NatureOfCargo 550068 | | | | | 0..n 550070 | ... |
| | | | | | ClassificationCode 550072 | | | | 1 550074 | NatureOfCargoClassificationCode 550076 |
| | | | | TotalQuantity 550078 | | | | | 0..n 550080 | ... |
| | | | | | Quantity 550082 | | | | 1 550084 | Quantity 550086 |

FIG. 55-3

| Package | level 1 | level 2 | level 3 | level 4 | level 5 | level 6 | level 7 | level 8 | Cardinality | Data Type Name |
|---|---|---|---|---|---|---|---|---|---|---|
| | | | | | RoleCode 550088 | | | | 0..1 550090 | QuantityRoleCode 550092 |
| | | | | | TypeCode 550094 | | | | 0..1 550096 | QuantityTypeCode 550098 |
| | | | | TotalAmount 550100 | | | | | 0..n 550102 | ... |
| | | | | | Amount 550104 | | | | 1 550106 | Amount 550108 |
| | | | | | RoleCode 550110 | | | | 1 550112 | AmountRoleCode 550114 |
| | | | | TextCollection 550116 | | | | | 0..1 550118 | ... |
| | | | | | TextCollection 550120 | | | | 1 550122 | TextCollection 550124 |
| | | | | TransportationServiceRequirement 550126 | | | | | 0..n 550128 | ... |

FIG. 55-4

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationServiceRequirementCode 550130 | | | | 0..1 550132 | TransportationServiceRequirementCode 550134 |
| | | | | | AdditionalTransportationServiceRequirementCode 550136 | | | | 0..1 550138 | TransportationServiceRequirementCode 550140 |
| | | | | | TransportationContractConditionCode 550142 | | | | 0..1 550144 | TransportationContractConditionCode 550146 |
| | | | | | TransportServiceLevelCode 550148 | | | | 0..1 550150 | TransportServiceLevelCode 550152 |
| | | | | | NatureOfCargoClassificationCode 550154 | | | | 0..1 550156 | NatureOfCargoClassificationCode 550158 |
| | | | | TransportationDocumentInformation 550160 | | | | | 0..n 550162 | ... |

FIG. 55-5

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentTypeCode 550164 | | | | 0..1 550166 | TransportationDocumentTypeCode 550168 |
| | | | | | TransportationDocumentNote 550170 | | | | 0..1 550172 | SHORT_Note 550174 |
| | | | | | TransportationDocumentID 550176 | | | | 0..1 550178 | TransportationDocumentID 550180 |
| | | | | | TransportationDocumentStatusCode 550182 | | | | 0..1 550184 | TransportationDocumentStatusCode 550186 |
| | | | | | LanguageCode 550188 | | | | 0..1 550190 | LanguageCode 550192 |
| | | | | | CommunicationMediumTypeCode 550194 | | | | 0..1 550196 | CommunicationMediumTypeCode 550198 |
| | | | | | RequiredIndicator 550200 | | | | 1 550202 | Indicator 550204 |

FIG. 55-6

| Package | level 1 | level 2 | level 3 | level 4 | level 5 | level 6 | level 7 | level 8 | Cardinality | Data Type Name |
|---|---|---|---|---|---|---|---|---|---|---|
| | | | | | OutputCopyNumberValue 550206 | | | | 0..1 550208 | NumberValue 550210 |
| | | | | | OutputOriginalNumberValue 550212 | | | | 0..1 550214 | NumberValue 550216 |
| | | | | | DateTimePeriod 550218 | | | | 0..n 550220 | ... |
| | | | | | | DateTimePeriod 550222 | | | 1 550224 | DateTimePeriod 550226 |
| | | | | | | PeriodRoleCode 550228 | | | 1 550230 | PeriodRoleCode 550232 |
| | | | | BusinessTransactionDocumentReference 550234 | | | | | 0..n 550236 | ... |
| | | | | | BusinessTransactionDocumentReference 550238 | | | | 0..1 550240 | BusinessTransactionDocumentReference 550242 |

FIG. 55-7

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentRelationshipRoleCode 550244 | | | | 0..1 550246 | BusinessTransactionDocumentRelationshipRoleCode 550248 |
| | | | | | BusinessTransactionDocumentRelationshipTypeCode 550250 | | | | 0..1 550252 | BusinessTransactionDocumentRelationshipTypeCode 550254 |
| | | | | | TransportationDocumentTypeCode 550256 | | | | 0..1 550258 | TransportationDocumentTypeCode 550260 |
| | | | | | TransportationDocumentNote 550262 | | | | 0..1 550264 | SHORT_Note 550266 |
| | | | | | TransportationDocumentID 550268 | | | | 0..1 550270 | TransportationDocumentID 550272 |
| | | | | | DateTimePeriod 550274 | | | | 0..n 550276 | ... |

FIG. 55-8

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DateTimePeriod 550278 | | | 1 550280 | DateTimePeriod 550282 |
| | | | | | | PeriodRoleCode 550284 | | | 1 550286 | PeriodRoleCode 550288 |
| GovernmentalRequirementInformation 550290 | | | | GovernmentalProcedure 550292 | | | | | 0..n 550294 | ... |
| | | | | | TransportationGovernmentAgencyTypeCode 550296 | | | | 0..1 550298 | TransportationGovernmentAgencyTypeCode 550300 |
| | | | | | TransportationMovementTypeCode 550302 | | | | 0..1 550304 | TransportationMovementTypeCode 550306 |
| | | | | | TransportationGovernmentAgencyInvolvementStatusCode 550308 | | | | 0..1 550310 | TransportationGovernmentAgencyInvolvementStatusCode 550312 |

FIG. 55-9

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGovernmentAgencyActionCode 550314 | | | | 0..1 550316 | TransportationGovernmentAgencyActionCode 550318 |
| | | | | | TransportationGovernmentAgencyProcedureStatusCode 550320 | | | | 0..1 550322 | TransportationGovernmentAgencyProcedureStatusCode 550324 |
| | | | | | Location 550326 | | | | 0..n 550328 | ... |
| | | | | | | Location 550330 | | | 1 550332 | BusinessTransactionDocumentLocation 550334 |
| | | | | | | RoleCode 550336 | | | 1 550338 | LocationRoleCode 550340 |
| | | | | | | TypeCode 550342 | | | 0..1 550344 | LocationTypeCode 550346 |
| | | | | | | Name 550348 | | | 0..1 550350 | MEDIUM_Name 550352 |
| | | | | | DateTimePeriod 550354 | | | | 0..n 550356 | ... |

FIG. 55-10

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DateTimePeriod 550358 | | | 1 550360 | DateTimePeriod 550362 |
| | | | | | | PeriodRoleCode 550364 | | | 1 550366 | PeriodRoleCode 550368 |
| | | | | | Seal 550370 | | | | 0..n 550372 | ... |
| | | | | | | ID 550374 | | | 0..1 550376 | SealID 550378 |
| | | | | | | PartyRoleCode 550380 | | | 0..1 550382 | PartyRoleCode 550384 |
| | | | | | | PartyFormattedName 550386 | | | 0..1 550388 | LONG_Name 550390 |
| | | | | | | StatusCode 550392 | | | 0..1 550394 | SealStatusCode 550396 |
| | | | | | TextCollection 550398 | | | | 0..1 550400 | ... |
| | | | | | | TextCollection 550402 | | | 1 550404 | TextCollection 550406 |

FIG. 55-11

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentInformation 550408 | | | | 0..n 550410 | … |
| | | | | | | TransportationDocumentTypeCode 550412 | | | 0..1 550414 | TransportationDocumentTypeCode 550416 |
| | | | | | | TransportationDocumentNote 550418 | | | 0..1 550420 | SHORT_Note 550422 |
| | | | | | | TransportationDocumentID 550424 | | | 0..1 550426 | TransportationDocumentID 550428 |
| | | | | | | TransportationDocumentStatusCode 550430 | | | 0..1 550432 | TransportationDocumentStatusCode 550434 |
| | | | | | | LanguageCode 550436 | | | 0..1 550438 | LanguageCode 550440 |
| | | | | | | CommunicationMediumTypeCode 550442 | | | 0..1 550444 | CommunicationMediumTypeCode 550446 |

FIG. 55-12

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RequiredIndicator 550448 | | | 1 550450 | Indicator 550452 |
| | | | | | | OutputCopyNumberValue 550454 | | | 0..1 550456 | NumberValue 550458 |
| | | | | | | OutputOriginalNumberValue 550460 | | | 0..1 550462 | NumberValue 550464 |
| | | | | | | DateTimePeriod 550466 | | | 0..n 550468 | ... |
| | | | | | | | DateTimePeriod 550470 | | 1 550472 | DateTimePeriod 550474 |
| | | | | | | | PeriodRoleCode 550476 | | 1 550478 | PeriodRoleCode 550480 |
| PartyInformation 550482 | | | | Party 550484 | | | | | 1..n 550486 | ... |
| | | | | | Party 550488 | | | | 1 550490 | BusinessTransactionDocumentParty 550492 |

FIG. 55-13

| Package | level 1 | level 2 | level 3 | level 4 | level 5 | level 6 | level 7 | level 8 | Cardinality | Data Type Name |
|---|---|---|---|---|---|---|---|---|---|---|
| | | | | | RoleCode 550494 | | | | 1 550496 | PartyRoleCode 550498 |
| | | | | | FormattedName 550500 | | | | 0..1 550502 | LONG_Name 550504 |
| | | | | | Amount 550506 | | | | 0..n 550508 | ... |
| | | | | | | Amount 550510 | | | 1 550512 | Amount 550514 |
| | | | | | | RoleCode 550516 | | | 1 550518 | AmountRoleCode 550520 |
| | | | | | DateTimePeriods 550522 | | | | 0..n 550524 | ... |
| | | | | | | RequestedFulfillmentPeriod 550526 | | | 0..1 550528 | DateTimePeriod 550530 |
| | | | | | | AcceptableFulfillmentPeriod 550532 | | | 0..1 550534 | DateTimePeriod 550536 |
| | | | | | | PeriodRoleCode 550538 | | | 1 550540 | PeriodRoleCode 550542 |

FIG. 55-14

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentInformation 550544 | | | | 0..n 550546 | ... |
| | | | | | | TransportationDocumentTypeCode 550548 | | | 0..1 550550 | TransportationDocumentTypeCode 550552 |
| | | | | | | TransportationDocumentNote 550554 | | | 0..1 550556 | SHORT_Note 550558 |
| | | | | | | TransportationDocumentID 550560 | | | 0..1 550562 | TransportationDocumentID 550564 |
| | | | | | | TransportationDocumentStatusCode 550566 | | | 0..1 550568 | TransportationDocumentStatusCode 550570 |
| | | | | | | LanguageCode 550572 | | | 0..1 550574 | LanguageCode 550576 |
| | | | | | | CommunicationMediumTypeCode 550578 | | | 0..1 550580 | CommunicationMediumTypeCode 550582 |

FIG. 55-15

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RequiredIndicator 550584 | | | 1 550586 | Indicator 550588 |
| | | | | | | OutputCopyNumberValue 550590 | | | 0..1 550592 | NumberValue 550594 |
| | | | | | | OutputOriginalNumberValue 550596 | | | 0..1 550598 | NumberValue 550600 |
| | | | | | | DateTimePeriod 550602 | | | 0..n 550604 | ... |
| | | | | | | | DateTimePeriod 550606 | | 1 550608 | DateTimePeriod 550610 |
| | | | | | | | PeriodRoleCode 550612 | | 1 550614 | PeriodRoleCode 550616 |
| | | | | | BusinessTransactionDocumentReference 550618 | | | | 0..n 550620 | ... |

FIG. 55-16

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | BusinessTransactionDocumentReference 550622 | | | 0..1 550624 | BusinessTransactionDocumentReference 550626 |
| | | | | | | BusinessTransactionDocumentRelationshipRoleCode 550628 | | | 0..1 550630 | BusinessTransactionDocumentRelationshipRoleCode 550632 |
| | | | | | | BusinessTransactionDocumentRelationshipTypeCode 550634 | | | 0..1 550636 | BusinessTransactionDocumentRelationshipTypeCode 550638 |
| | | | | | | TransportationDocumentTypeCode 550640 | | | 0..1 550642 | TransportationDocumentTypeCode 550644 |
| | | | | | | TransportationDocumentNote 550646 | | | 0..1 550648 | SHORT_Note 550650 |

FIG. 55-17

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentID 550652 | | | 0..1 550654 | TransportationDocumentID 550656 |
| | | | | | | DateTimePeriod 550658 | | | 0..n 550660 | ... |
| | | | | | | | DateTimePeriod 550662 | | 1 550664 | DateTimePeriod 550666 |
| | | | | | | | PeriodRoleCode 550668 | | 1 550670 | PeriodRoleCode 550672 |
| LocationInformation 550674 | | | | Location 550676 | | | | | 0..n 550678 | |
| | | | | | Location 550680 | | | | 1 550682 | BusinessTransactionDocumentLocation 550684 |
| | | | | | RoleCode 550686 | | | | 1 550688 | LocationRoleCode 550690 |
| | | | | | TypeCode 550692 | | | | 0..1 550694 | LocationTypeCode 550696 |
| | | | | | Name 550698 | | | | 0..1 550700 | MEDIUM_Name 550702 |

FIG. 55-18

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DateTimePeriods 550704 | | | | 0..n 550706 | ... |
| | | | | | | RequestedFulfillmentPeriod 550708 | | | 0..1 550710 | DateTimePeriod 550712 |
| | | | | | | AcceptableFulfillmentPeriod 550714 | | | 0..1 550716 | DateTimePeriod 550718 |
| | | | | | | PeriodRoleCode 550720 | | | 1 550722 | PeriodRoleCode 550724 |
| TransportationStageInformation 550726 | | | | TransportationStage 550728 | | | | | 0..n 550730 | ... |
| | | | | | ID 550732 | | | | 1 550734 | TransportationStageID 550736 |
| | | | | | OrdinalNumberValue 550738 | | | | 0..1 550740 | OrdinalNumberValue 550742 |
| | | | | | TypeCode 550744 | | | | 0..1 550746 | TransportationStageTypeCode 550748 |

FIG. 55-19

| Package | level 1 | level 2 | level 3 | level 4 | level 5 | level 6 | level 7 | level 8 | Cardinality | Data Type Name |
|---|---|---|---|---|---|---|---|---|---|---|
| | | | | | JourneyID 550750 | | | | 0..1 550752 | JourneyID 550754 |
| | | | | | TransportModeCode 550756 | | | | 0..1 550758 | TransportModeCode 550760 |
| | | | | | TransportMeansDescriptionCode 550762 | | | | 0..1 550764 | TransportMeansDescriptionCode 550766 |
| | | | | | TransportMeansDescription 550768 | | | | 0..1 550770 | SHORT_Description 550772 |
| | | | | | TransportMeansID 550774 | | | | 0..1 550776 | TransportMeansID 550778 |
| | | | | | TransportMeansHomeCountryCode 550780 | | | | 0..1 550782 | CountryCode 550784 |
| | | | | | TransportMeansOwnershipTypeCode 550786 | | | | 0..1 550788 | TransportMeansOwnershipTypeCode 550790 |

FIG. 55-20

| Package | level 1 | level 2 | level 3 | level 4 | level 5 | level 6 | level 7 | level 8 | Cardinality | Data Type Name |
|---|---|---|---|---|---|---|---|---|---|---|
| | | | | | CarrierStandardID 550792 | | | | 0..1 550794 | PartyStandardID 550796 |
| | | | | | CarrierFormattedName 550798 | | | | 0..1 550800 | LONG_Name 550802 |
| | | | | | TransportationTransitDirectionCode 550804 | | | | 0..1 550806 | TransportationTransitDirectionCode 550808 |
| | | | | | CalculatedDistanceMeasure 550810 | | | | 0..1 550812 | Measure 550814 |
| | | | | | GivenDistanceMeasure 550816 | | | | 0..1 550818 | Measure 550820 |
| | | | | | Location 550822 | | | | 1..n 550824 | ... |
| | | | | | | Location 550826 | | | 1 550828 | BusinessTransactionDocumentLocation 550830 |
| | | | | | | RoleCode 550832 | | | 1 550834 | LocationRoleCode 550836 |

FIG. 55-21

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TypeCode 550838 | | | 0..1 550840 | LocationTypeCode 550842 |
| | | | | | | Name 550844 | | | 0..1 550846 | MEDIUM_Name 550848 |
| | | | | | | DateTimePeriods 550850 | | | 0..n 550852 | ... |
| | | | | | | | Requested Fulfillment Period 550854 | | 0..1 550856 | DateTimePeriod 550858 |
| | | | | | | | Acceptable Fulfillment Period 550860 | | 0..1 550862 | DateTimePeriod 550864 |
| | | | | | | | PeriodRole Code 550866 | | 1 550868 | PeriodRoleCode 550870 |
| | | | | | BusinessTransactionDocumentReference 550872 | | | | 0..n 550874 | ... |

FIG. 55-22

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | BusinessTransactionDocumentReference 550876 | | | 0..1 550878 | BusinessTransactionDocumentReference 550880 |
| | | | | | | BusinessTransactionDocumentRelationshipRoleCode 550882 | | | 0..1 550884 | BusinessTransactionDocumentRelationshipRoleCode 550886 |
| | | | | | | BusinessTransactionDocumentRelationshipTypeCode 550888 | | | 0..1 550890 | BusinessTransactionDocumentRelationshipTypeCode 550892 |
| | | | | | | TransportationDocumentTypeCode 550894 | | | 0..1 550896 | TransportationDocumentTypeCode 550898 |
| | | | | | | TransportationDocumentNote 550900 | | | 0..1 550902 | SHORT_Note 550904 |

FIG. 55-23

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentID 550906 | | | 0..1 550908 | TransportationDocumentID 550910 |
| | | | | | | DateTimePeriod 550912 | | | 0..n 550914 | ... |
| | | | | | | | DateTimePeriod 550916 | | 1 550918 | DateTimePeriod 550920 |
| | | | | | | | PeriodRoleCode 550922 | | 1 550924 | PeriodRoleCode 550926 |
| | | | | | TransportationServiceRequirement 550928 | | | | 0..n 550930 | ... |
| | | | | | | TransportationServiceRequirementCode 550932 | | | 0..1 550934 | TransportationServiceRequirementCode 550936 |
| | | | | | | AdditionalTransportationServiceRequirementCode 550938 | | | 0..1 550940 | TransportationServiceRequirementCode 550942 |

FIG. 55-24

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationContractConditionCode 550944 | | | 0..1 550946 | TransportationContractConditionCode 550948 |
| | | | | | | TransportServiceLevelCode 550950 | | | 0..1 550952 | TransportServiceLevelCode 550954 |
| | | | | | | NatureOfCargoClassificationCode 550956 | | | 0..1 550958 | NatureOfCargoClassificationCode 550960 |
| TransportationUnitResourceInformation 550962 | | | | TransportationUnitResourceInformation 550964 | | | | | 0..n 550966 | ... |
| | | | | | ID 550968 | | | | 1 550970 | ResourceInformationID 550972 |
| | | | | | ResourceNumberValue 550974 | | | | 0..1 550976 | NumberValue 550978 |
| | | | | | ResourceID 550980 | | | | 0..1 550982 | ResourceID 550984 |

FIG. 55-25

| Package | level 1 | level 2 | level 3 | level 4 | level 5 | level 6 | level 7 | level 8 | Cardinality | Data Type Name |
|---|---|---|---|---|---|---|---|---|---|---|
| | | | | | ResourceHomeCountryCode 550986 | | | | 0..1 550988 | CountryCode 550990 |
| | | | | | TransportationUnitResourceCategoryCode 550992 | | | | 0..1 550994 | TransportationUnitResourceCategoryCode 550996 |
| | | | | | TransportationUnitResourceTypeCode 550998 | | | | 0..1 551000 | TransportationUnitResourceTypeCode 551002 |
| | | | | | FillLevelCode 551004 | | | | 0..1 551006 | FillLevelCode 551008 |
| | | | | | ShippingTypeCode 551010 | | | | 0..1 551012 | ShippingTypeCode 551014 |
| | | | | | HaulageArrangerCode 551016 | | | | 0..1 551018 | HaulageArrangerCode 551020 |
| | | | | | TransportationHandlingInstructionCode 551022 | | | | 0..1 551024 | TransportationHandlingInstructionCode 551026 |

FIG. 55-26

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationHandlingInstructionNote 551028 | | | | 0..1 551030 | LONG_Note 551032 |
| | | | | | TransportationStageAssignment 551034 | | | | 0..n 551036 | ... |
| | | | | | | ShipmentRequestTransportationStageID 551038 | | | 1 551040 | TransportationStageID 551042 |
| | | | | | AttachedEquipment 551044 | | | | 0..n 551046 | ... |
| | | | | | | ShipmentRequestResourceInformationID 551048 | | | 1 551050 | ResourceID 551052 |
| | | | | | Quantity 551054 | | | | 0..n 551056 | ... |
| | | | | | | Quantity 551058 | | | 1 551060 | Quantity 551062 |

FIG. 55-27

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RoleCode 551064 | | | 0..1 551066 | QuantityRoleCode 551068 |
| | | | | | | TypeCode 551070 | | | 0..1 551072 | QuantityTypeCode 551074 |
| | | | | | Seal 551076 | | | | 0..n 551078 | ... |
| | | | | | | ID 551080 | | | 1 551082 | SealID 551084 |
| | | | | | | PartyRoleCode 551086 | | | 0..1 551088 | PartyRoleCode 551090 |
| | | | | | | PartyFormattedName 551092 | | | 0..1 551094 | LONG_Name 551096 |
| | | | | | | StatusCode 551098 | | | 0..1 551100 | SealStatusCode 551102 |
| | | | | | BusinessTransactionDocumentReference 551104 | | | | 0..n 551106 | ... |

FIG. 55-28

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | BusinessTransactionDocumentReference 551108 | | | 0..1 551110 | BusinessTransactionDocumentReference 551112 |
| | | | | | | BusinessTransactionDocumentRelationshipRoleCode 551114 | | | 0..1 551116 | BusinessTransactionDocumentRelationshipRoleCode 551118 |
| | | | | | | BusinessTransactionDocumentRelationshipTypeCode 551120 | | | 0..1 551122 | BusinessTransactionDocumentRelationshipTypeCode 551124 |
| | | | | | | TransportationDocumentTypeCode 551126 | | | 0..1 551128 | TransportationDocumentTypeCode 551130 |
| | | | | | | TransportationDocumentNote 551132 | | | 0..1 551134 | SHORT_Note 551136 |

FIG. 55-29

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentID 551138 | | | 0..1 551140 | TransportationDocumentID 551142 |
| | | | | | | DateTimePeriod 551144 | | | 0..n 551146 | |
| | | | | | | | DateTimePeriod 551148 | | 1 551150 | DateTimePeriod 551152 |
| | | | | | | | PeriodRoleCode 551154 | | 1 551156 | PeriodRoleCode 551158 |
| | | | | | TextCollection 551160 | | | | 0..1 551162 | ... |
| | | | | | | TextCollection 551164 | | | 1 551166 | TextCollection 551168 |
| | | | | | Location 551170 | | | | 0..n 551172 | ... |
| | | | | | | Location 551174 | | | 1 551176 | BusinessTransactionDocumentLocation 551178 |

FIG. 55-30

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RoleCode 551180 | | | 1 551182 | LocationRoleCode 551184 |
| | | | | | | TypeCode 551186 | | | 0..1 551188 | LocationTypeCode 551190 |
| | | | | | | Name 551192 | | | 0..1 551194 | MEDIUM_Name 551196 |
| | | | | | | DateTimePeriods 551198 | | | 0..n 551200 | ... |
| | | | | | | | Requested Fulfillment Period 551202 | | 0..1 551204 | DateTimePeriod 551206 |
| | | | | | | | Acceptable Fulfillment Period 551208 | | 0..1 551210 | DateTimePeriod 551212 |
| | | | | | | | PeriodRoleCode 551214 | | 1 551216 | PeriodRoleCode 551218 |
| | | | | | DangerousGoods 551220 | | | | 0..n 551222 | |
| | | | | | | ID 551224 | | | 0..1 551226 | DangerousGoodsID 551228 |

FIG. 55-31

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | RegulationsCode 551230 | | | 0..1 551232 | DangerousGoodsRegulationsCode 551234 |
| | | | | | | HazardCode 551236 | | | 0..1 551238 | DangerousGoodsHazardCode 551240 |
| | | | | | | FlashpointMeasureInterval 551242 | | | 0..1 551244 | MeasureInterval 551246 |
| | | | | | | PackagingGroupCode 551248 | | | 0..1 551250 | DangerousGoodsPackagingGroupCode 551252 |
| | | | | | | EmergencySchedule 551254 | | | 0..1 551256 | DangerousGoodsEmergencySchedule 551258 |
| | | | | | | TransportEmergencyCardCode 551260 | | | 0..1 551262 | TransportEmergencyCardCode 551264 |
| | | | | | | DangerousGoodsLabelCode 551266 | | | 0..1 551268 | DangerousGoodsLabelCode 551270 |

FIG. 55-32

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | DangerousGoodsLabelCode2 551272 | | | 0..1 551274 | DangerousGoodsLabelCode 551276 |
| | | | | | | DangerousGoodsLabelCode3 551278 | | | 0..1 551280 | DangerousGoodsLabelCode 551282 |
| | | | | | | PackagingInstructionTypeCode 551284 | | | 0..1 551286 | PackagingInstructionTypeCode 551288 |
| | | | | | | TransportMeansDescriptionCode 551290 | | | 0..1 551292 | TransportMeansDescriptionCode 551294 |
| | | | | | | TransportationAuthorisationCode 551296 | | | 0..1 551298 | DangerousGoodsTransportationAuthorisationCode 551300 |
| | | | | | | ContactInformation 551302 | | | 0..n 551304 | … |

FIG. 55-33

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | ContactPersonFunctionTypeCode 551306 | | 1 551308 | ContactPersonFunctionTypeCode 551310 |
| | | | | | | | Address 551312 | | 1 551314 | Address 551316 |
| | | | | | | TextCollection 551318 | | | 0..1 551320 | ... |
| | | | | | | | TextCollection 551322 | | 1 551324 | TextCollection 551326 |
| PackageInformation 551328 | | | | PackageInformation 551330 | | | | | 0..n 551332 | ... |
| | | | | | ID 551334 | | | | 1 551336 | PackageInformationID 551338 |
| | | | | | PackageID 551340 | | | | 0..1 551342 | PackageID 551344 |
| | | | | | PackageOrdinalNumberValue 551346 | | | | 0..1 551348 | OrdinalNumberValue 551350 |

FIG. 55-34

| Package | level 1 | level 2 | level 3 | level 4 | level 5 | level 6 | level 7 | level 8 | Cardinality | Data Type Name |
|---|---|---|---|---|---|---|---|---|---|---|
| | | | | | PackageNumberValue 551352 | | | | 0..1 551354 | NumberValue 551356 |
| | | | | | PackageTypeCode 551358 | | | | 0..1 551360 | PackageTypeCode 551362 |
| | | | | | PackagingLevelCode 551364 | | | | 0..1 551366 | PackagingLevelCode 551368 |
| | | | | | PackageMarkingInstructionCode 551370 | | | | 0..1 551372 | PackageMarkingInstructionCode 551374 |
| | | | | | PredecessorPackageID 551376 | | | | 0..1 551378 | PackageID 551380 |
| | | | | | ItemAssignment 551382 | | | | 0..n 551384 | ... |
| | | | | | | ShipmentRequestItemID 551386 | | | 1 551388 | BusinessTransactionDocumentItemID 551390 |
| | | | | | | Quantity 551392 | | | 0..n 551394 | ... |

FIG. 55-35

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | Quantity 551396 | | 1 551398 | Quantity 551400 |
| | | | | | | | RoleCode 551402 | | 0..1 551404 | QuantityRoleCode 551406 |
| | | | | | | | TypeCode 551408 | | 0..1 551410 | QuantityTypeCode 551412 |
| | | | | | | BusinessTransactionDocumentReference 551414 | | | 0..n 551416 | ... |
| | | | | | | | BusinessTransactionDocumentReference 551418 | | 0..1 551420 | BusinessTransactionDocumentReference 551422 |
| | | | | | | | BusinessTransactionDocumentRelationshipRoleCode 551424 | | 0..1 551426 | BusinessTransactionDocumentRelationshipRoleCode 551428 |

FIG. 55-36

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | BusinessTransactionDocumentRelationshipTypeCode 551430 | | 0..1 551432 | BusinessTransactionDocumentRelationshipTypeCode 551434 |
| | | | | | | | TransportationDocumentTypeCode 551436 | | 0..1 551438 | TransportationDocumentTypeCode 551440 |
| | | | | | | | TransportationDocumentNote 551442 | | 0..1 551444 | SHORT_Note 551446 |
| | | | | | | | TransportationDocumentID 551448 | | 0..1 551450 | TransportationDocumentID 551452 |
| | | | | | | | DateTimePeriod 551454 | | 0..n 551456 | ... |
| | | | | | | | | DateTimePeriod 551458 | 1 551460 | DateTimePeriod 551462 |

FIG. 55-37

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | | PeriodRoleCode 551464 | 1 551466 | PeriodRoleCode 551468 |
| | | | | | | TransportationGoodsIdentification 551470 | | | 0..n 551472 | ... |
| | | | | | | | TransportationGoodsIdentifierTypeCode 551474 | | 1 551476 | TransportationGoodsIdentifierTypeCode 551478 |
| | | | | | | | LowerBoundaryTransportationGoodsID 551480 | | 0..1 551482 | TransportationGoodsID 551484 |
| | | | | | | | UpperBoundaryTransportationGoodsID 551486 | | 0..1 551488 | TransportationGoodsID 551490 |
| | | | | | TransportationUnitResourceInformationAssignment 551492 | | | | 0..n 551494 | ... |

FIG. 55-38

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | ShipmentRequestResourceInformationID 551496 | | | 1 551498 | ResourceInformationID 551500 |
| | | | | | | Quantity 551502 | | | 0..n 551504 | ... |
| | | | | | | | Quantity 551506 | | 1 551508 | Quantity 551510 |
| | | | | | | | RoleCode 551512 | | 0..1 551514 | QuantityRoleCode 551516 |
| | | | | | | | TypeCode 551518 | | 0..1 551520 | QuantityTypeCode 551522 |
| | | | | | Quantity 551524 | | | | 0..n 551526 | ... |
| | | | | | | Quantity 551528 | | | 1 551530 | Quantity 551532 |
| | | | | | | RoleCode 551534 | | | 0..1 551536 | QuantityRoleCode 551538 |
| | | | | | | TypeCode 551540 | | | 0..1 551542 | QuantityTypeCode 551544 |
| | | | | | TextCollection 551546 | | | | 0..1 551548 | ... |

FIG. 55-39

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TextCollection 551550 | | | 1 551552 | TextCollection 551554 |
| Item 551556 | | | Item 551558 | | | | | | 0..n 551560 | ... |
| | | | | ID 551562 | | | | | 1 551564 | BusinessTransactionDocumentItemID 551566 |
| | | | | OriginCountryCode 551568 | | | | | 0..1 551570 | CountryCode 551572 |
| | | | | DestinationCountryCode 551574 | | | | | 0..1 551576 | CountryCode 551578 |
| | | | | ShippingTypeCode 551580 | | | | | 0..1 551582 | ShippingTypeCode 551584 |
| | | | | HaulageArrangerCode 551586 | | | | | 0..1 551588 | HaulageArrangerCode 551590 |
| | | | | TemperatureMeasureInterval 551592 | | | | | 0..1 551594 | MeasureInterval 551596 |

FIG. 55-40

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationHandlingInstructionCode 551598 | | | | | 0..1 551600 | TransportationHandlingInstructionCode 551602 |
| | | | | TransportationHandlingInstructionNote 551604 | | | | | 0..1 551606 | LONG_Note 551608 |
| ItemInformation 551610 | | | | Amount 551612 | | | | | 0..n 551614 | ... |
| | | | | | Amount 551616 | | | | 1 551618 | Amount 551620 |
| | | | | | RoleCode 551622 | | | | 1 551624 | AmountRoleCode 551626 |
| | | | | TextCollection 551628 | | | | | 0..1 551630 | ... |
| | | | | | TextCollection 551632 | | | | 1 551634 | TextCollection 551636 |
| | | | | NatureOfCargo 551638 | | | | | 0..n 551640 | ... |

FIG. 55-41

| Package | level 1 | level 2 | level 3 | level 4 | level 5 | level 6 | level 7 | level 8 | Cardinality | Data Type Name |
|---|---|---|---|---|---|---|---|---|---|---|
| | | | | | ClassificationCode 551642 | | | | 1 551644 | NatureOfCargoClassificationCode 551646 |
| | | | | Quantity 551648 | | | | | 0..n 551650 | ... |
| | | | | | Quantity 551652 | | | | 1 551654 | Quantity 551656 |
| | | | | | RoleCode 551658 | | | | 0..1 551660 | QuantityRoleCode 551662 |
| | | | | | TypeCode 551664 | | | | 0..1 551666 | QuantityTypeCode 551668 |
| | | | | TransportationDocumentInformation 551670 | | | | | 0..n 551672 | ... |
| | | | | | TransportationDocumentTypeCode 551674 | | | | 0..1 551676 | TransportationDocumentTypeCode 551678 |
| | | | | | TransportationDocumentNote 551680 | | | | 0..1 551682 | SHORT_Note 551684 |

FIG. 55-42

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationDocumentID 551686 | | | | 0..1 551688 | TransportationDocumentID 551690 |
| | | | | | TransportationDocumentStatusCode 551692 | | | | 0..1 551694 | TransportationDocumentStatusCode 551696 |
| | | | | | LanguageCode 551698 | | | | 0..1 551700 | LanguageCode 551702 |
| | | | | | CommunicationMediumTypeCode 551704 | | | | 0..1 551706 | CommunicationMediumTypeCode 551708 |
| | | | | | Requiredindicator 551710 | | | | 1 551712 | Indicator 551714 |
| | | | | | OutputCopyNumberValue 551716 | | | | 0..1 551718 | NumberValue 551720 |
| | | | | | OutputOriginalNumberValue 551722 | | | | 0..1 551724 | NumberValue 551726 |

FIG. 55-43

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DateTimePeriod 551728 | | | | 0..n 551730 | ... |
| | | | | | | DateTimePeriod 551732 | | | 1 551734 | DateTimePeriod 551736 |
| | | | | | | PeriodRoleCode 551738 | | | 1 551740 | PeriodRoleCode 551742 |
| | | | | BusinessTransactionDocumentReference 551744 | | | | | 0..n 551746 | ... |
| | | | | | BusinessTransactionDocumentReference 551748 | | | | 0..1 551750 | BusinessTransactionDocumentReference 551752 |
| | | | | | BusinessTransactionDocumentRelationshipRoleCode 551754 | | | | 0..1 551756 | BusinessTransactionDocumentRelationshipRoleCode 551758 |

FIG. 55-44

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentRelationshipTypeCode 551760 | | | | 0..1 551762 | BusinessTransactionDocumentRelationshipTypeCode 551764 |
| | | | | | TransportationDocumentTypeCode 551766 | | | | 0..1 551768 | TransportationDocumentTypeCode 551770 |
| | | | | | TransportationDocumentNote 551772 | | | | 0..1 551774 | SHORT_Note 551776 |
| | | | | | TransportationDocumentID 551778 | | | | 0..1 551780 | TransportationDocumentID 551782 |
| | | | | | DateTimePeriod 551784 | | | | 0..n 551786 | ... |
| | | | | | | DateTimePeriod 551788 | | | 1 551790 | DateTimePeriod 551792 |
| | | | | | | PeriodRoleCode 551794 | | | 1 551796 | PeriodRoleCode 551798 |

FIG. 55-45

| Package | level 1 | level 2 | level 3 | level 4 | level 5 | level 6 | level 7 | level 8 | Cardinality | Data Type Name |
|---|---|---|---|---|---|---|---|---|---|---|
| | | | | Dangerous Goods 551800 | | | | | 0..n 551802 | ... |
| | | | | | ID 551804 | | | | 0..1 551806 | DangerousGoodsID 551808 |
| | | | | | RegulationsCode 551810 | | | | 0..1 551812 | DangerousGoodsRegulationsCode 551814 |
| | | | | | HazardCode 551816 | | | | 0..1 551818 | DangerousGoodsHazardCode 551820 |
| | | | | | FlashpointMeasureInterval 551822 | | | | 0..1 551824 | MeasureInterval 551826 |
| | | | | | PackagingGroupCode 551828 | | | | 0..1 551830 | DangerousGoodsPackagingGroupCode 551832 |
| | | | | | EmergencySchedule 551834 | | | | 0..1 551836 | DangerousGoodsEmergencySchedule 551838 |
| | | | | | TransportEmergencyCardCode 551840 | | | | 0..1 551842 | TransportEmergencyCardCode 551844 |

FIG. 55-46

| Package | level 1 | level 2 | level 3 | level 4 | level 5 | level 6 | level 7 | level 8 | Cardinality | Data Type Name |
|---|---|---|---|---|---|---|---|---|---|---|
| | | | | | DangerousGoodsLabelCode 551846 | | | | 0..1 551848 | DangerousGoodsLabelCode 551850 |
| | | | | | DangerousGoodsLabelCode2 551852 | | | | 0..1 551854 | DangerousGoodsLabelCode 551856 |
| | | | | | DangerousGoodsLabelCode3 551858 | | | | 0..1 551860 | DangerousGoodsLabelCode 551862 |
| | | | | | PackingInstructionTypeCode 551864 | | | | 0..1 551866 | PackingInstructionTypeCode 551868 |
| | | | | | TransportMeansDescriptionCode 551870 | | | | 0..1 551872 | TransportMeansDescriptionCode 551874 |
| | | | | | TransportationAuthorisationCode 551876 | | | | 0..1 551878 | DangerousGoodsTransportationAuthorisationCode 551880 |
| | | | | | ContactInformation 551882 | | | | 0..n 551884 | ... |

FIG. 55-47

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | ContactPersonFunctionTypeCode 551886 | | | 1 551888 | ContactPersonFunctionTypeCode 551890 |
| | | | | | | Address 551892 | | | 1 551894 | Address 551896 |
| | | | | | Quantity 551898 | | | | 0..n 551900 | … |
| | | | | | | Quantity 551902 | | | 1 551904 | Quantity 551906 |
| | | | | | | RoleCode 551908 | | | 0..1 551910 | QuantityRoleCode 551912 |
| | | | | | | TypeCode 551914 | | | 0..1 551916 | QuantityTypeCode 551918 |
| | | | | | TextCollection 551920 | | | | 0..1 551922 | … |
| | | | | | | TextCollection 551924 | | | 1 551926 | TextCollection 551928 |
| | | | | | TransportationUnitResourceInformationAssignment 551930 | | | | 0..n 551932 | … |

FIG. 55-48

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | ShipmentRequestResourceInformationID 551934 | | | 1 551936 | ResourceInformationID 551938 |
| | | | | | | Quantity 551940 | | | 0..n 551942 | ... |
| | | | | | | | Quantity 551944 | | 1 551946 | Quantity 551948 |
| | | | | | | | RoleCode 551950 | | 0..1 551952 | QuantityRoleCode 551954 |
| | | | | | | | TypeCode 551956 | | 0..1 551958 | QuantityTypeCode 551960 |
| | | | | TransportationStageAssignment 551962 | | | | | 0..n 551964 | ... |
| | | | | | ShipmentRequestTransportationStageID 551966 | | | | 1 551968 | TransportationStageID 551970 |
| | | | | | Quantity 551972 | | | | 0..n 551974 | ... |

FIG. 55-49

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | Quantity 551976 | | | 1 551978 | Quantity 551980 |
| | | | | | | RoleCode 551982 | | | 0..1 551984 | QuantityRoleCode 551986 |
| | | | | | | TypeCode 551988 | | | 0..1 551990 | QuantityTypeCode 551992 |
| | | | | TransportationUnitResourceInformationAssignment 551994 | | | | | 0..n 551996 | ... |
| | | | | | ShipmentRequestResourceInformationID 551998 | | | | 1 552000 | ResourceInformationID 552002 |
| | | | | | Quantity 552004 | | | | 0..n 552006 | ... |
| | | | | | | Quantity 552008 | | | 1 552010 | Quantity 552012 |
| | | | | | | RoleCode 552014 | | | 0..1 552016 | QuantityRoleCode 552018 |
| | | | | | | TypeCode 552020 | | | 0..1 552022 | QuantityTypeCode 552024 |

FIG. 55-50

| Package | level 1 | level 2 | level 3 | level 4 | level 5 | level 6 | level 7 | level 8 | Cardinality | Data Type Name |
|---|---|---|---|---|---|---|---|---|---|---|
| GovernmentalRequirementInformation 552026 | | | | GovernmentalProcedure 552028 | | | | | 0..n 552030 | ... |
| | | | | | TransportationGovernmentAgencyTypeCode 552032 | | | | 0..1 552034 | TransportationGovernmentAgencyTypeCode 552036 |
| | | | | | TransportationMovementTypeCode 552038 | | | | 0..1 552040 | TransportationMovementTypeCode 552042 |
| | | | | | TransportationGovernmentAgencyInvolvementStatusCode 552044 | | | | 0..1 552046 | TransportationGovernmentAgencyInvolvementStatusCode 552048 |
| | | | | | TransportationGovernmentAgencyActionCode 552050 | | | | 0..1 552052 | TransportationGovernmentAgencyActionCode 552054 |

FIG. 55-51

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TransportationGovernmentAgencyProcedureStatusCode 552056 | | | | 0..1 552058 | TransportationGovernmentAgencyProcedureStatusCode 552060 |
| | | | | | Location 552062 | | | | 0..n 552064 | ... |
| | | | | | | Location 552066 | | | 1 552068 | BusinessTransactionDocumentLocation 552070 |
| | | | | | | RoleCode 552072 | | | 1 552074 | LocationRoleCode 552076 |
| | | | | | | TypeCode 552078 | | | 0..1 552080 | LocationTypeCode 552082 |
| | | | | | | Name 552084 | | | 0..1 552086 | MEDIUM_Name 552088 |
| | | | | | DateTimePeriod 552090 | | | | 0..n 552092 | ... |
| | | | | | | DateTimePeriod 552094 | | | 1 552096 | DateTimePeriod 552098 |

FIG. 55-52

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | PeriodRoleCode 552100 | | | 1 552102 | PeriodRoleCode 552104 |
| | | | | | Seal 552106 | | | | 0..n 552108 | ... |
| | | | | | | ID 552110 | | | 1 552112 | SealID 552114 |
| | | | | | | PartyRoleCode 552116 | | | 0..1 552118 | PartyRoleCode 552120 |
| | | | | | | PartyFormattedName 552122 | | | 0..1 552124 | LONG_Name 552126 |
| | | | | | | StatusCode 552128 | | | 0..1 552130 | SealStatusCode 552132 |
| | | | | | TextCollection 552134 | | | | 0..n 552136 | ... |
| | | | | | | TextCollection 552138 | | | 0..1 552140 | TextCollection 552142 |
| | | | | | TransportationDocumentInformation 552144 | | | | 0..n 552146 | ... |

FIG. 55-53

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentTypeCode 552148 | | | 0..1 552150 | TransportationDocumentTypeCode 552152 |
| | | | | | | TransportationDocumentNote 552154 | | | 0..1 552156 | SHORT_Note 552158 |
| | | | | | | TransportationDocumentID 552160 | | | 0..1 552162 | TransportationDocumentID 552164 |
| | | | | | | TransportationDocumentStatusCode 552166 | | | 0..1 552168 | TransportationDocumentStatusCode 552170 |
| | | | | | | LanguageCode 552172 | | | 0..1 552174 | LanguageCode 552176 |
| | | | | | | CommunicationMediumTypeCode 552178 | | | 0..1 552180 | CommunicationMediumTypeCode 552182 |
| | | | | | | RequiredIndicator 552184 | | | 1 552186 | Indicator 552188 |

FIG. 55-54

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | OutputCopyNumberValue 552190 | | | 0..1 552192 | NumberValue 552194 |
| | | | | | | OutputOriginalNumberValue 552196 | | | 0..1 552198 | NumberValue 552200 |
| | | | | | | DateTimePeriod 552202 | | | 0..n 552204 | ... |
| | | | | | | | DateTimePeriod 552206 | | 1 552208 | DateTimePeriod 552210 |
| | | | | | | | PeriodRoleCode 552212 | | 1 552214 | PeriodRoleCode 552216 |
| PartyInformation 552218 | | | | Party 552220 | | | | | 0..n 552222 | ... |
| | | | | | Party 552224 | | | | 1 552226 | BusinessTransactionDocumentParty 552228 |
| | | | | | RoleCode 552230 | | | | 1 552232 | PartyRoleCode 552234 |

FIG. 55-55

| Package | level 1 | level 2 | level 3 | level 4 | level 5 | level 6 | level 7 | level 8 | Cardinality | Data Type Name |
|---|---|---|---|---|---|---|---|---|---|---|
| | | | | | FormattedName 552236 | | | | 0..1 552238 | LONG_Name 552240 |
| | | | | | DateTimePeriods 552242 | | | | 0..n 552244 | ... |
| | | | | | | RequestedFulfillmentPeriod 552246 | | | 0..1 552248 | DateTimePeriod 552250 |
| | | | | | | AcceptableFulfillmentPeriod 552252 | | | 0..1 552254 | DateTimePeriod 552256 |
| | | | | | | PeriodRoleCode 552258 | | | 1 552260 | PeriodRoleCode 552262 |
| LocationInformation 552264 | | | | Location 552266 | | | | | 0..n 552268 | ... |
| | | | | | Location 552270 | | | | 1 552272 | BusinessTransactionDocumentLocation 552274 |
| | | | | | RoleCode 552276 | | | | 1 552278 | LocationRoleCode 552280 |

FIG. 55-56

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TypeCode 552282 | | | | 0..1 552284 | LocationTypeCode 552286 |
| | | | | | Name 552288 | | | | 0..1 552290 | MEDIUM_Name 552292 |
| | | | | | DateTimePeriods 552294 | | | | 0..n 552296 | ... |
| | | | | | | RequestedFulfillmentPeriod 552298 | | | 0..1 552300 | DateTimePeriod 552302 |
| | | | | | | AcceptableFulfillmentPeriod 552304 | | | 0..1 552306 | DateTimePeriod 552308 |
| | | | | | | PeriodRoleCode 552310 | | | 1 552312 | PeriodRoleCode 552314 |
| TransportationGoodsInformation 552316 | | | | ProductInformation 552318 | | | | | 0..n 552320 | ... |
| | | | | | Product 552322 | | | | 0..1 552324 | BusinessTransactionDocumentProduct 552326 |

FIG. 55-57

| Package | level 1 | level 2 | level 3 | level 4 | level 5 | level 6 | level 7 | level 8 | Cardinality | Data Type Name |
|---|---|---|---|---|---|---|---|---|---|---|
| | | | | | ProductDescription 552328 | | | | 0..1 552330 | SHORT_Description 552332 |
| | | | | TransportationGoodsIdentification 552334 | | | | | 0..n 552336 | ... |
| | | | | | TransportationGoodsIdentifierTypeCode 552338 | | | | 1 552340 | TransportationGoodsIdentifierTypeCode 552342 |
| | | | | | LowerBoundaryTransportationGoodsID 552344 | | | | 1 552346 | TransportationGoodsID 552348 |
| | | | | | UpperBoundaryTransportationGoodsID 552350 | | | | 0..1 552352 | TransportationGoodsID 552354 |
| TransportationChargesInformation 552356 | | | TransportationChargesInformation 552358 | | | | | | 0..n 552360 | ... |

FIG. 55-58

| Package | level 1 | level 2 | level 3 | level 4 | level 5 | level 6 | level 7 | level 8 | Cardinality | Data Type Name |
|---|---|---|---|---|---|---|---|---|---|---|
| | | | | TransportationChargesUsageCode 552362 | | | | | 1 552364 | TransportationChargesUsageCode 552366 |
| | | | | ShipmentRequestItemID 552368 | | | | | 0..1 552370 | BusinessTransactionDocumentItemID 552372 |
| | | | | ShipmentRequestPartyStandardID 552374 | | | | | 0..1 552376 | PartyStandardID 552378 |
| | | | | ShipmentRequestPartyInternalID 552380 | | | | | 0,,1 552382 | PartyInternalID 552384 |
| | | | | ShipmentRequestResourceInformationID 552386 | | | | | 0..1 552388 | ResourceInformationID 552390 |
| | | | | ShipmentRequestPackageInformationID 552392 | | | | | 0..1 552394 | PackageInformationID 552396 |

FIG. 55-59

| Package | level 1 | level 2 | level 3 | level 4 | level 5 | level 6 | level 7 | level 8 | Cardinality | Data Type Name |
|---|---|---|---|---|---|---|---|---|---|---|
| | | | | ShipmentRequestTransportationStageID 552398 | | | | | 0..1 552400 | TransportationStageID 552402 |
| | | | | TransportationCharges 552404 | | | | | 0..1 552406 | ... |
| | | | | | ID 552408 | | | | 1 552410 | TransportationChargesID 552412 |
| | | | | | FreightAgreementID 552414 | | | | 1 552416 | FreightAgreementID 552418 |
| | | | | | OriginCode 552420 | | | | 0..1 552422 | TransportationChargesOriginCode 552424 |
| | | | | | TariffID 552426 | | | | 0..1 552428 | TransportationChargesTariffID 552430 |
| | | | | | CalculationSheetID 552432 | | | | 1 552434 | TransportationChargesCalculationSheetID 552436 |
| | | | | | Location 552438 | | | | 0..n 552440 | ... |

FIG. 55-60

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | Location 552442 | | | 1 552444 | BusinessTransactionDocumentLocation 552446 |
| | | | | | | RoleCode 552448 | | | 1 552450 | LoactionRoleCode 552452 |
| | | | | | | TypeCode 552454 | | | 0..1 552456 | LocationTypeCode 552458 |
| | | | | | | Name 552460 | | | 0..1 552462 | MEDIUM_Name 552464 |
| | | | | | | DateTimePeriods 552466 | | | 0..n 552468 | ... |
| | | | | | | | Requested Fulfillment Period 552470 | | 0..1 552472 | DateTimePeriod 552474 |
| | | | | | | | Acceptable Fulfillment Period 552476 | | 0..1 552478 | DateTimePeriod 552480 |
| | | | | | | | PeriodRoleCode 552482 | | 1 552484 | PeriodRoleCode 552486 |

FIG. 55-61

| Package | level 1 | level 2 | level 3 | level 4 | level 5 | level 6 | level 7 | level 8 | Cardinality | Data Type Name |
|---|---|---|---|---|---|---|---|---|---|---|
| | | | | | TextCollection 552488 | | | | 0..1 552490 | ... |
| | | | | | | TextCollection 552492 | | | 1 552494 | TextCollection 552496 |
| | | | | | Currency 552498 | | | | 0..n 552500 | ... |
| | | | | | | Code 552502 | | | 1 552504 | CurrencyCode 552506 |
| | | | | | | RoleCode 552508 | | | 1 552510 | CurrencyRoleCode 552512 |
| | | | | | | UsageCode 552514 | | | 0..1 552516 | CurrencyUsageCode 552518 |
| | | | | | ExchangeRate 552520 | | | | 0..n 552522 | ... |
| | | | | | | ExchangeRate 552524 | | | 1 552526 | ExchangeRate 552528 |
| | | | | | | TypeCode 552530 | | | 0..1 552532 | ExchangeRateTypeCode 552534 |

FIG. 55-62

| Package | level 1 | level 2 | level 3 | level 4 | level 5 | level 6 | level 7 | level 8 | Cardinality | Data Type Name |
|---|---|---|---|---|---|---|---|---|---|---|
| | | | | | PercentElement 552536 | | | | 0..n 552538 | ... |
| | | | | | | PercentRoleCode 552540 | | | 1 552542 | PercentRoleCode 552544 |
| | | | | | | Percent 552546 | | | 1 552548 | Percent 552550 |
| | | | | | | TransportationChargesPercentCalculationBaseCode 552552 | | | 0..1 552554 | TransportationChargesPercentCalculationBaseCode 552556 |
| | | | | | | StatusCode 552558 | | | 0..1 552560 | TransportationChargesPercentElementStatusCode 552562 |
| | | | | | DateTimePeriod 552564 | | | | 0..n 552566 | ... |
| | | | | | | DateTimePeriod 552568 | | | 1 552570 | DateTimePeriod 552572 |
| | | | | | | PeriodRoleCode 552574 | | | 1 552576 | PeriodRoleCode 552578 |

FIG. 55-63

| Package | level 1 | level 2 | level 3 | level 4 | level 5 | level 6 | level 7 | level 8 | Cardinality | Data Type Name |
|---|---|---|---|---|---|---|---|---|---|---|
| | | | | | BusinessTransactionDocumentReference 552580 | | | | 0..n 552582 | ... |
| | | | | | | BusinessTransactionDocumentReference 552584 | | | 0..1 552586 | BusinessTransactionDocumentReference 552588 |
| | | | | | | BusinessTransactionDocumentRelationshipRoleCode 552590 | | | 0..1 552592 | BusinessTransactionDocumentRelationshipRoleCode 552594 |
| | | | | | | BusinessTransactionDocumentRelationshipTypeCode 552596 | | | 0..1 552598 | BusinessTransactionDocumentRelationshipTypeCode 552600 |
| | | | | | | TransportationDocumentTypeCode 552602 | | | 0..1 552604 | TransportationDocumentTypeCode 552606 |

FIG. 55-64

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationDocumentNote 552608 | | | 0..1 552610 | SHORT_Note 552612 |
| | | | | | | TransportationDocumentID 552614 | | | 0..1 552616 | TransportationDocumentID 552618 |
| | | | | | TaxDetail 552620 | | | | 0..n 552622 | ... |
| | | | | | | ProductTax 552624 | | | 1 552626 | ProductTax 552628 |
| | | | | | PaymentInstruction 552630 | | | | 0..n 552632 | ... |
| | | | | | | PaymentInstruction 552634 | | | 1 552636 | PaymentInstruction 552638 |
| | | | | | | TransportationChargesElementCategoryCode 552640 | | | 0..1 552642 | TransportationChargesElementCategoryCode 552644 |

FIG. 55-65

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | TransportationChargesElementSubCategoryCode 552646 | | | 0..1 552648 | TransportationChargesElementSubCategoryCode 552650 |
| | | | | | | TransportationChargesPaymentArrangementCode 552652 | | | 0..1 552654 | TransportationChargesPaymentArrangementCode 552656 |
| | | | | | CashDiscountTerms 552658 | | | | 0..1 552660 | ... |
| | | | | | | CashDiscountTerms 552662 | | | 1 552664 | CashDiscountTerms 552666 |
| | | | | | | TransportationChargesElementCategoryCode 552668 | | | 0..1 552670 | TransportationChargesElementCategoryCode 552672 |
| | | | | | | TransportationChargesElementSubCategoryCode 552674 | | | 0..1 552676 | TransportationChargesElementSubCategoryCode 552678 |

FIG. 55-66

| Package | level 1 | level 2 | level 3 | level 4 | level 5 | level 6 | level 7 | level 8 | Cardinality | Data Type Name |
|---|---|---|---|---|---|---|---|---|---|---|
| | | | | | Element 552680 | | | | 0..n 552682 | ... |
| | | | | | | CategoryCode 552684 | | | 1 552686 | TransportationChargesElementCategoryCode 552688 |
| | | | | | | SubCategory Code 552690 | | | 1 552692 | TransportationChargesElementSubCategoryCode 552694 |
| | | | | | | TypeCode 552696 | | | 1 552698 | TransportationChargesElementTypeCode 552700 |
| | | | | | | CalculationResolutionCode 552702 | | | 1 552704 | TransportationChargesElementCalculationResolutionCode 552706 |
| | | | | | | TransportationChargesPaymentArrangementCode 552708 | | | 0...1 552710 | TransportationChargesPaymentArrangementCode 552712 |
| | | | | | | Location 552714 | | | 0..n 552716 | ... |
| | | | | | | | Location 552718 | | 1 552720 | BusinessTransactionDocumentLocation 552722 |

FIG. 55-67

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | RoleCode 552724 | | 1 552726 | LocationRoleCode 552728 |
| | | | | | | | TypeCode 552730 | | 0..1 552732 | LocationTypeCode 552734 |
| | | | | | | | Name 552736 | | 0..1 552738 | MEDIUM_Name 552740 |
| | | | | | | | DateTimePeriods 552742 | | 0..n 552744 | ... |
| | | | | | | | | Requested Fulfillment Period 552746 | 0..1 552748 | DateTimePeriod 552750 |
| | | | | | | | | Acceptable Fulfillment Period 552752 | 0..1 552754 | DateTimePeriod 552756 |
| | | | | | | | | PeriodRoleCode 552758 | 1 552760 | PeriodRoleCode 552762 |
| | | | | | | TextCollection 552764 | | | 0..1 552766 | ... |

FIG. 55-68

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TextCollection 552768 | | 1 552770 | TextCollection 552772 |
| | | | | | | Currency 552774 | | | 0..n 552776 | ... |
| | | | | | | | Code 552778 | | 1 552780 | CurrencyCode 552782 |
| | | | | | | | RoleCode 552784 | | 1 552786 | CurrencyRoleCode 552788 |
| | | | | | | | UsageCode 552790 | | 0..1 552792 | CurrencyUsageCode 552794 |
| | | | | | | RateElement 552796 | | | 0..n 552798 | ... |
| | | | | | | | ID 552800 | | 1 552802 | TransportationChargesElementRateElementID 552804 |
| | | | | | | | Amount 552806 | | 1 552808 | Amount 552810 |
| | | | | | | | BaseQuantity 552812 | | 1 552814 | Quantity 552816 |

FIG. 55-69

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TransportationChargesRateTypeCode 552818 | | 0..1 552820 | TransportationChargesRateTypeCode 552822 |
| | | | | | | | TransportationChargesRateRoleCode 552824 | | 1 552826 | TransportationChargesRateRoleCode 552828 |
| | | | | | | | TransportationChargesRateElementStatusCode 552830 | | 0..1 552832 | TransportationChargesRateElementStatusCode 552834 |
| | | | | | | PercentElement 552836 | | | 0..n 552838 | ... |
| | | | | | | | PercentRoleCode 552840 | | 1 552842 | PercentRoleCode 552844 |
| | | | | | | | Percent 552846 | | 1 552848 | Percent 552850 |

FIG. 55-70

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | TransportationChargesPercentCalculationBaseCode 552852 | | 0..1 552854 | TransportationChargesPercentCalculationBaseCode 552856 |
| | | | | | | | StatusCode 552858 | | 0..1 552860 | TransportationChargesPercentElementStatusCode 552862 |
| | | | | | | AmountElement 552864 | | | 0..n 552866 | ... |
| | | | | | | | Amount 552868 | | 1 552870 | Amount 552872 |
| | | | | | | | AmountRoleCode 552874 | | 1 552876 | AmountRoleCode 552878 |
| | | | | | | | TransportationChargesAmountElementStatusCode 552880 | | 0..1 552882 | TransportationChargesAmountElementStatusCode 552884 |

FIG. 55-71

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | RateElementAssignment 552886 | | 0..n 552888 | ... |
| | | | | | | | | TransportationChargesElementRateElementID 552890 | 1 552892 | TransportationChargesElementRateElementID 552894 |
| | | | | | | CalculationBase 552896 | | | 0..n 552898 | ... |
| | | | | | | | TransportationChargesElementCalculationBaseCode 552900 | | 1 552902 | TransportationChargesElementCalculationBaseCode 552904 |
| | | | | | | | BaseQuantity 552906 | | 0..1 552908 | Quantity 552910 |
| | | | | | | | BaseQuantityRoleCode 552912 | | 0..1 552914 | QuantityRoleCode 552916 |

FIG. 55-72

| Package | level 1 | level 2 | level 3 | level 4 | level 5 | level 6 | level 7 | level 8 | Cardinality | Data Type Name |
|---|---|---|---|---|---|---|---|---|---|---|
| | | | | | | | BaseQuantityTypeCode 552918 | | 0..1 552920 | QuantityTypeCode 552922 |
| | | | | | | TaxDetail 552924 | | | 0..n 552926 | ... |
| | | | | | | | ProductTax 552928 | | 1 552930 | ProductTax 552932 |
| | | | | | | DateTimePeriod 552934 | | | 0..n 552936 | ... |
| | | | | | | | DateTimePeriod 552938 | | 1 552940 | DateTimePeriod 552942 |
| | | | | | | | PeriodRoleCode 552944 | | 1 552946 | PeriodRoleCode 552948 |
| | | | | | | CostDistribution 552950 | | | 0..n 552952 | ... |
| | | | | | | | AccountingCodingBlockAssignment 552954 | | 1 552956 | AccountingCodingBlockAssignment 552958 |

To FIG. 57-5
To FIG. 57-1
To FIG. 57-7
TextCollection
57060
BTDReference
57062
DateTimePeriod
57064
Party
57066
BTDReference
57068
DateTimePeriod
57070
Location
57072
DateTimePeriods
57074
TransportationChargesInformation
57076
TransportationCharges
57078
Location
57080
57082
TextCollection
57084
Currency
57086
ExchangeRate
57090
PercentElement
57092

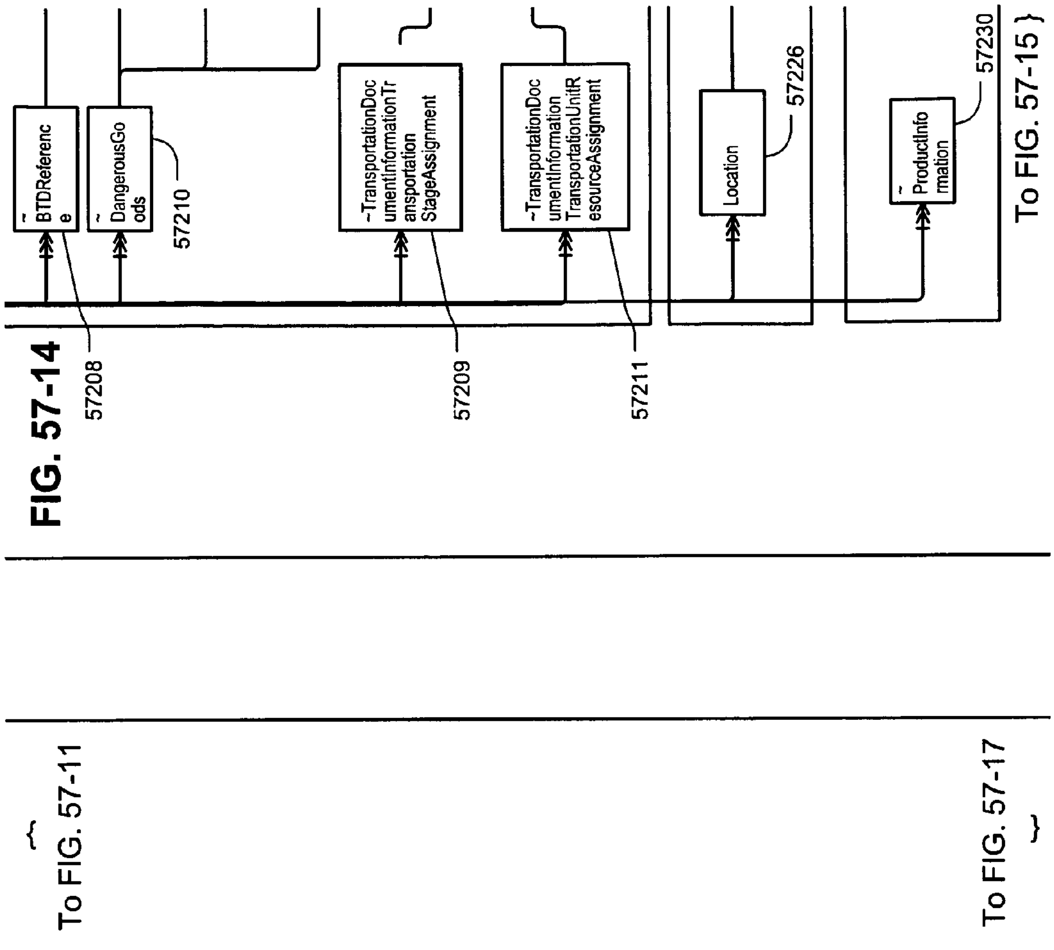
To FIG. 57-13

To FIG. 57-12
To FIG. 57-18
~DateTimePeriod
57212
~Quantity
57214
~TextCollection
57216
~TransportationDocumentInformation TransportationUnitResourceInformationAssignment
57218
~Quanitity
57220
~Quantity
57222
~Quantity
57224
57028
LocationInformation
~DateTimePeriods
57228
57030
TransportationGoodsInformation
To FIG. 57-14

FIG. 60-1

| Package | level1 | level2 | level3 | level4 | level5 | Cardinality | Data Type Name |
|---|---|---|---|---|---|---|---|
| SupplierFreightInvoiceRequestCancelRequestMessage 60000 | SupplierFreightInvoiceRequestCancelRequestMessage 60002 | | | | | | SupplierFreightInvoiceRequestCancelRequestMessage 60004 |
| MessageHeader 60006 | | MessageHeader 60008 | | | | 1 60010 | BusinessDocumentMessageHeader 60012 |
| SupplierFreightInvoiceRequest 60014 | | SupplierFreightInvoiceRequest 60016 | | | | 1 60018 | ... |
| | | | ID 60020 | | | 1 60022 | BusinessTransactionDocumentID 60024 |
| | | | Request 60026 | | | 1 60028 | ... |

FIG. 60-2

| Package | level1 | level2 | level3 | level4 | level5 | Cardinality | Data Type Name |
|---|---|---|---|---|---|---|---|
| Request 60030 | | | | RequestedCancellationDate 60032 | | 0..1 60034 | Date 60036 |
| BusinessTransaction-DocumentReference 60038 | | | Business-Transaction-Documen-tReference 60040 | | | 0..n 60042 | ... |
| | | | | BusinessTransactionDocu-mentReference 60044 | | 0..1 60046 | BusinessTransactionDocu-mentReference 60048 |
| | | | | BusinessTransactionDocu-mentRelationshipRoleCode 60050 | | 0..1 60052 | BusinessTransactionDocu-mentRelationshipRoleCode 60054 |
| | | | | BusinessTransactionDocu-mentRelationshipTypeCode 60056 | | 0..1 60058 | BusinessTransactionDocu-mentRelationshipTypeCode 60060 |

FIG. 60-3

| Package | level1 | level2 | level3 | level4 | level5 | Cardinality | Data Type Name |
|---|---|---|---|---|---|---|---|
| | | | | TransportationDocument-TypeCode 60062 | | 0..1 60064 | TransportationDocument-TypeCode 60066 |
| | | | | TransportationDocument-Note 60068 | | 0..1 60070 | SHORT_Note 60072 |
| | | | | TransportationDocumentID 60074 | | 0..1 60076 | TransportationDocumentID 60078 |
| | | | | DateTimePeriod 60080 | | 0..n 60082 | ... |
| | | | | | DateTimePeriod 60084 | 1 60086 | DateTimePeriod 60088 |
| | | | | | PeriodRoleCode 60090 | 1 60092 | PeriodRoleCode 60094 |

FIG. 61-1

| Package | level1 | level2 | level3 | level4 | level5 | level6 | Cardinality | Data Type Name |
|---|---|---|---|---|---|---|---|---|
| SupplierFreightIn-voiceRequestCon-firmationMessage 61000 | Supplier-FreightIn-voiceRe-questCon-firmation-Message 61002 | | | | | | | SupplierFreightInvoiceRe-questConfirmationMessage 61004 |
| MessageHeader 61006 | | MessageHeader 61008 | | | | | 1 61010 | BusinessDocumentMes-sageHeader 61012 |
| SupplierFreightIn-voiceRequest 61014 | | SupplierFreightIn voiceRequest 61016 | | | | | 1 61018 | ... |
| | | | ID 61020 | | | | 1 61022 | BusinessTransactionDocu-mentID 61024 |
| Confirmation 61026 | | | Confirmation 61028 | | | | 1 61030 | ... |

FIG. 61-2

| Package | level1 | level2 | level3 | level4 | level5 | level6 | Cardinality | Data Type Name |
|---|---|---|---|---|---|---|---|---|
| | | | | AcceptanceS-tatusCode 61032 | | | 1 61034 | AcceptanceStatusCode 61036 |
| InvoiceDocu-mentReference 61038 | | | | InvoiceDocumen-tReference 61040 | | | 0..n 61042 | ... |
| | | | | | BusinessTransaction-DocumentReference 61044 | | 0..1 61046 | BusinessTransactionDocu-mentReference 61048 |
| | | | | | BusinessTransaction-DocumentRelationshi-pRoleCode 61050 | | 0..1 61052 | BusinessTransactionDocu-mentRelationshipRoleCode 61054 |
| | | | | | BusinessTransaction-DocumentRelation-shipTypeCode 61056 | | 0..1 61058 | BusinessTransactionDocu-mentRelationshipTypeCode 61060 |

FIG. 61-3

| Package | level1 | level2 | level3 | level4 | level5 | level6 | Cardinality | Data Type Name |
|---|---|---|---|---|---|---|---|---|
| | | | | | TransportationDocumentTypeCode 61062 | | 0..1 61064 | TransportationDocument-TypeCode 61066 |
| | | | | | TransportationDocumentNote 61068 | | 0..1 61070 | SHORT_Note 61072 |
| | | | | | TransportationDocumentID 61074 | | 0..1 61076 | TransportationDocumentID 61078 |
| | | | | | DateTimePeriod 61080 | | 0..n 61082 | ... |
| | | | | | | DateTimePeriod 61084 | 1 61086 | DateTimePeriod 61088 |
| | | | | | | PeriodRoleCode 61090 | 1 61092 | PeriodRoleCode 61094 |

FIG. 62-1

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| SupplierFreightInvoiceRequestRequestMessage 620000 | SupplierFreightInvoiceRequestRequestMessage 620002 | | | | | | | | | | | SuppierFreightInvoiceRequestRequestMessage 620004 |
| MessageHeader 620006 | | MessageHeader 620008 | | | | | | | | | 1 620010 | BusinessDocumentMessageHeader 620012 |
| SupplierFreightInvoiceRequest 620014 | | SupplierFreightInvoiceRequest 620016 | | | | | | | | | 1 620018 | ... |
| | | | @actioncode 620020 | | | | | | | | 1 620022 | ActionCode 620024 |
| | | | ID 620026 | | | | | | | | 1 620028 | BusinessTransactionDocumentID 620030 |
| Request 620032 | | | Request 620034 | | | | | | | | 1 620036 | ... |

FIG. 62-2

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | TypeCode 620038 | | | | | | | 1 620040 | BusinesstransactionDocumentTypeCode 620042 |
| | | | | DeliveryTerms 620044 | | | | | | | 0..1 620046 | DeliveryTerms 620048 |
| HeaderInformation 620050 | | | | Purchase Business Area 620052 | | | | | | | 0..1 620054 | ... |
| | | | | | PurchasingOrganisationID 620056 | | | | | | 1 620058 | OrganisationalCentreID 620060 |
| | | | | | PurchasingGroupID 620062 | | | | | | 0..1 620064 | OrganisationalCentreID 620066 |
| | | | | DateTime Period 620068 | | | | | | | 0..n 620070 | ... |
| | | | | | DateTime Period 620072 | | | | | | 1 620074 | DateTimePeriod 620076 |

FIG. 62-3

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | PeriodRoleCode 620078 | | | | | | 1 620080 | PeriodRoleCode 620082 |
| | | | | TotalQuantity 620084 | | | | | | | 0..n 620086 | ... |
| | | | | | Quantity 620088 | | | | | | 1 620090 | Quantity 620092 |
| | | | | | RoleCode 620094 | | | | | | 0..1 620096 | QuantityRoleCode 620098 |
| | | | | | TypeCode 620100 | | | | | | 0..1 620102 | QuantityTypeCode 620104 |
| | | | | TotalAmount 620106 | | | | | | | 0..n 620108 | ... |
| | | | | | Amount 620110 | | | | | | 1 620112 | Amount 620114 |
| | | | | | RoleCode 620116 | | | | | | 1 620118 | AmountRoleCode 620120 |

FIG. 62-4

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | TextCollection 620122 | | | | | | | 0..1 620124 | ... |
| | | | | | TextCollection 620126 | | | | | | 1 620128 | TextCollection 620130 |
| | | | | BusinessTransactionDocumentReference 620132 | | | | | | | 0..n 620134 | ... |
| | | | | | BusinessTransactionDocumentReference 620136 | | | | | | 0..1 620138 | BusinessTransactionDocumentReference 620140 |
| | | | | | BusinessTransactionDocumentRelationshipRoleCode 620142 | | | | | | 0..1 620144 | BusinessTransactionDocumentRelationshipRoleCode 620146 |

FIG. 62-5

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | BusinessTransactionDocumentRelationshipTypeCode 620148 | | | | | | 0..1 620150 | BusinessTransactionDocumentRelationshipTypeCode 620152 |
| | | | | | TransportationDocumentTypeCode 620154 | | | | | | 0..1 620156 | TransportationDocumentTypeCode 620158 |
| | | | | | TransportationDocumentNote 620160 | | | | | | 0..1 620162 | SHORT_Note 620164 |
| | | | | | TransportationDocumentID 620166 | | | | | | 0..1 620168 | TransportationDocumentID 620170 |
| | | | | | DateTimePeriod 620172 | | | | | | 0..n 620174 | ... |
| | | | | | | DateTimePeriod 620176 | | | | | 1 620178 | DateTimePeriod 620180 |

FIG. 62-6

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | PeriodRoleCode 620182 | | | | | 1 620184 | PeriodRoleCode 620186 |
| PartyInformation 620188 | | | | Party 620190 | | | | | | | 1..n 620192 | ... |
| | | | | | Party 620194 | | | | | | 1 620196 | BusinessTransactionDocumentParty 620198 |
| | | | | | RoleCode 620200 | | | | | | 1 620202 | PartyRoleCode 620204 |
| | | | | | FormattedName 620206 | | | | | | 0..1 620208 | LONG_Name 620210 |
| | | | | | BusinessTransactionDocumentReference 620212 | | | | | | 0..n 620214 | ... |

FIG. 62-7

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | BusinessTransactionDocumentReference 620216 | | | | | 0..1 620218 | BusinessTransactionDocumentReference 620220 |
| | | | | | | BusinessTransactionDocumentRelationshipRoleCode 620222 | | | | | 0..1 620224 | BusinessTransactionDocumentRelationshipRoleCode 620226 |
| | | | | | | BusinessTransactionDocumentRelationshipTypeCode 620228 | | | | | 0..1 620230 | BusinessTransactionDocumentRelationshipTypeCode 620232 |
| | | | | | | TransportationDocumentTypeCode 620234 | | | | | 0..1 620236 | TransportationDocumentTypeCode 620238 |

FIG. 62-8

| Package | | | | | | | | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|---|---|---|---|---|---|---|
| | | | | | | | | | | | | | TransportationDocumentNote 620240 | | | | | 0..1 620242 | SHORT_Note 620244 |
| | | | | | | | | | | | | | TransportationDocumentID 620246 | | | | | 0..1 620248 | TransportationDocumentID 620250 |
| | | | | | | | | | | | | | DateTimePeriod 620252 | | | | | 0..n 620254 | ... |
| | | | | | | | | | | | | | | DateTimePeriod 620256 | | | | 1 620258 | DateTimePeriod 620260 |
| | | | | | | | | | | | | | | PeriodRoleCode 620262 | | | | 1 620264 | PeriodRoleCode 620266 |
| | | | LocationInformation 620268 | | | | | | | | Location 620270 | | | | | | | 0..n 620272 | ... |

FIG. 62-9

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | Location 620274 | | | | | | 1 620276 | BusinessTransactionDocumentLocation 620278 |
| | | | | | RoleCode 620280 | | | | | | 1 620282 | LocationRoleCode 620284 |
| | | | | | TypeCode 620286 | | | | | | 0..1 620288 | LocationTypeCode 620290 |
| | | | | | Name 620292 | | | | | | 0..1 620294 | MEDIUM_Name 620296 |
| | | | | | DateTimePeriods 620298 | | | | | | 0..n 620300 | ... |
| | | | | | | RequestedFulfillmentPeriod 620302 | | | | | 0..1 620304 | DateTimePeriod 620306 |
| | | | | | | AcceptableFulfillmentPeriod 620308 | | | | | 0..1 620310 | DateTimePeriod 620312 |

FIG. 62-10

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | PeriodRoleCode 620314 | | | | | 1 620316 | PeriodRoleCode 620318 |
| SupplierFreightInvoiceRequestItem 620320 | | | | Item 620322 | | | | | | | 0..n 620324 | ... |
| | | | | | ID 620326 | | | | | | 1 620328 | BusinessTransactionDocumentItemID 620330 |
| | | | | | TypeCode 620332 | | | | | | 1 620334 | BusinessTransactionDocumentItemTypeCode 620336 |
| TranaportationDocumentInformation 620338 | | | | | TransportationDocumentInformation 620340 | | | | | | 0..n 620342 | ... |
| | | | | | | ID 620344 | | | | | 1 620346 | TransportationDocumentInformationID 620348 |

FIG. 62-11

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | BusinessTransactionDocumentID 620350 | | | | | 0..1 620352 | BusinessTransactionDocumentID 620354 |
| | | | | | | BusinessTransactionDocumentTypeCode 620356 | | | | | 0..1 620358 | BusinessTransactionDocumentTypeCode 620360 |
| | | | | | | DeliveryTerms 620362 | | | | | 0..1 620364 | DeliveryTerms 620366 |
| HeaderInformation 620368 | | | | | | DateTimePeriods 620370 | | | | | 0..n 620372 | ... |
| | | | | | | | RequestedFulfillmentPeriod 620374 | | | | 0..1 620376 | DateTimePeriod 620378 |
| | | | | | | | AcceptableFulfillmentPeriod 620380 | | | | 0..1 620382 | DateTimePeriod 620384 |

FIG. 62-12

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | PeriodRoleCode 620386 | | | | 1 620388 | PeriodRoleCode 620390 |
| | | | | | | TotalQuantity 620392 | | | | | 0..n 620394 | ... |
| | | | | | | | Quantity 620396 | | | | 1 620398 | Quantity 620400 |
| | | | | | | | RoleCode 620402 | | | | 0..1 620404 | QuantityRoleCode 620406 |
| | | | | | | | TypeCode 620408 | | | | 0..1 620410 | QuantityTypeCode 620412 |
| | | | | | | TotalAmount 620414 | | | | | 0..n 620416 | ... |
| | | | | | | | Amount 620418 | | | | 1 620420 | Amount 620422 |
| | | | | | | | RoleCode 620424 | | | | 1 620426 | AmountRoleCode 620428 |

FIG. 62-13

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | TextCollection 620430 | | | | | 0..1 620432 | ... |
| | | | | | | | TextCollection 620434 | | | | 1 620436 | TextCollection 620438 |
| | | | | | | TransportationServiceRequirement 620440 | | | | | 0..n 620442 | ... |
| | | | | | | | TransportationServiceRequirementCode 620444 | | | | 0..1 620446 | TransportationServiceRequirementCode 620448 |
| | | | | | | | AdditionalTransportationServiceRequirementCode 620450 | | | | 0..1 620452 | TransportationServiceRequirementCode 620454 |

FIG. 62-14

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationContractConditionCode 620456 | | | | 0..1 620458 | TransportationContractConditionCode 620460 |
| | | | | | | | TransportServiceLevelCode 620462 | | | | 0..1 620464 | TransportServiceLevelCode 620466 |
| | | | | | | | NatureOfCargoClassificationCode 620468 | | | | 0..1 620470 | NatureOfCargoClassificationCode 620472 |
| | | | | | | BusinessTransactionDocumentReference 620474 | | | | | 0..n 620476 | ... |
| | | | | | | | BusinessTransactionDocumentReference 620478 | | | | 0..1 620480 | BusinessTransactionDocumentReference 620482 |

FIG. 62-15

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | BusinessTransactionDocumentRelationshipRoleCode 620484 | | | | 0..1 620486 | BusinessTransactionDocumentRelationshipRoleCode 620488 |
| | | | | | | | BusinessTransactionDocumentRelationshipTypeCode 620490 | | | | 0..1 620492 | BusinessTransactionDocumentRelationshipTypeCode 620494 |
| | | | | | | | TransportationDocumentTypeCode 620496 | | | | 0..1 620498 | TransportationDocumentTypeCode 620500 |
| | | | | | | | TransportationDocumentNote 620502 | | | | 0..1 620504 | SHORT_Note 620506 |

FIG. 62-16

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationDocumentID 620508 | | | | 0..1 620510 | TransportationDocumentID 620512 |
| | | | | | | | DateTimePeriod 620514 | | | | 0..n 620516 | ... |
| | | | | | | | | DateTimePeriod 620518 | | | 1 620520 | DateTimePeriod 620522 |
| | | | | | | | | PeriodRoleCode 620524 | | | 1 620526 | PeriodRoleCode 620528 |
| | | | | | | NatureOfCargo 620530 | | | | | 0..n 620532 | ... |
| | | | | | | | ClassificationCode 620534 | | | | 1 620536 | NatureOfCargoClassificationCode 620538 |
| LocationInformation 620540 | | | | | | Location 620542 | | | | | 0..n 620544 | ... |

FIG. 62-17

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | Location 620546 | | | | 1 620548 | BusinessTransactionDocumentLocation 620550 |
| | | | | | | | RoleCode 620552 | | | | 1 620554 | LocationRoleCode 620556 |
| | | | | | | | TypeCpde 620558 | | | | 0..1 620560 | LocationTypeCode 620562 |
| | | | | | | | Name 620564 | | | | 0..1 620566 | MEDIUM_Name 620568 |
| | | | | | | | DateTimePeriods 620570 | | | | 0..n 620572 | ... |
| | | | | | | | | RequestedFulfillmentPeriod 620574 | | | 0..1 620576 | DateTimePeriod 620578 |
| | | | | | | | | AcceptableFulfillmentPeriod 620580 | | | 0..1 620582 | DateTimePeriod 620584 |

FIG. 62-18

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | PeriodRoleCode 620586 | | | 1 620588 | PeriodRoleCode 620590 |
| PartyInformation 620592 | | | | | | Party 620594 | | | | | 0..n 620596 | ... |
| | | | | | | | Party 620598 | | | | 1 620600 | BusinessTransactionDocumentParty 620602 |
| | | | | | | | RoleCode 620604 | | | | 1 620606 | PartyRoleCode 620608 |
| | | | | | | | FormattedName 620610 | | | | 0..1 620612 | LONG_Name 620614 |
| | | | | | | | BusinessTransactionDocumentReference 620616 | | | | 0..n 620618 | ... |

FIG. 62-19

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | BusinessTransactionDocumentReference 620620 | | | 0..1 620622 | BusinessTransactionDocumentReference 620624 |
| | | | | | | | | BusinessTransactionDocumentRelationshipRoleCode 620626 | | | 0..1 620628 | BusinessTransactionDocumentRelationshipRoleCode 620630 |
| | | | | | | | | BusinessTransactionDocumentRelationshipTypeCode 620632 | | | 0..1 620634 | BusinessTransactionDocumentRelationshipTypeCode 620636 |
| | | | | | | | | TransportationDocumentTypeCode 620638 | | | 0..1 620640 | TransportationDocumentTypeCode 620642 |

FIG. 62-20

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationDocumentNote 620644 | | | 0..1 620646 | SHORT_Note 620648 |
| | | | | | | | | TransportationDocumentID 620650 | | | 0..1 620652 | TransportationDocumentID 620654 |
| | | | | | | | | DateTimePeriod 620656 | | | 0..n 620658 | ... |
| | | | | | | | | | DateTimePeriod 620660 | | 1 620662 | DateTimePeriod 620664 |
| | | | | | | | | | PeriodRoleCode 620666 | | 1 620668 | PeriodRoleCode 620670 |
| Transportation Stage Information 620672 | | | | | | TransportationStage 620674 | | | | | 0..n 620676 | ... |
| | | | | | | | ID 620678 | | | | 1 620680 | TransportationStageID 620682 |

FIG. 62-21

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | OrdinalNumberValue 620684 | | | | 0..1 620686 | OrdinalNumberValue 620688 |
| | | | | | | | TypeCode 620690 | | | | 0..1 620692 | TransportationStageTypeCode 620694 |
| | | | | | | | JourneyID 620696 | | | | 0..1 620698 | JourneyID 620700 |
| | | | | | | | TransportModeCode 620702 | | | | 0..1 620704 | TransportModeCode 620706 |
| | | | | | | | TransportMeansDescriptionCode 620708 | | | | 0..1 620710 | TransportMeansDescriptionCode 620712 |
| | | | | | | | TransportMeansDescription 620714 | | | | 0..1 620716 | SHORT_Description 620718 |

FIG. 62-22

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportMeansID 620720 | | | | 0..1 620722 | TransportMeansID 620724 |
| | | | | | | | TransportMeansHomeCountryCode 620726 | | | | 0..1 620728 | CountryCode 620730 |
| | | | | | | | TransportMeansOwnershipTypeCode 620732 | | | | 0..1 620734 | TransportMeansOwnershipTypeCode 620736 |
| | | | | | | | CarrierStandardID 620738 | | | | 0..1 620740 | PartyStandardID 620742 |
| | | | | | | | CarrierFormattedName 620744 | | | | 0..1 620746 | LONG_Name 620748 |
| | | | | | | | TransportationTransitDirectionCode 620750 | | | | 0..1 620752 | TransportationTransitDirectionCode 620754 |

FIG. 62-23

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | CalculatedDistanceMeasure 620756 | | | | 0..1 620758 | Measure 620760 |
| | | | | | | | GivenDistanceMeasure 620762 | | | | 0..1 620764 | Measure 620766 |
| | | | | | | | Location 620768 | | | | 0..n 620770 | ... |
| | | | | | | | | Location 620772 | | | 1 620774 | BusinessTransactionDocumentLocation 620776 |
| | | | | | | | | RoleCode 620778 | | | 1 620780 | LocationRoleCode 620782 |
| | | | | | | | | TypeCode 620784 | | | 0..1 620786 | LocationTypeCode 620788 |
| | | | | | | | | Name 620790 | | | 0..1 620792 | MEDIUM_Name 620794 |

FIG. 62-24

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | DateTimePeriods 620796 | | | 0..n 620798 | … |
| | | | | | | | | | RequestedFulfillmentPeriod 620800 | | 0..1 620802 | DateTimePeriod 620804 |
| | | | | | | | | | AcceptableFulfillmentPeriod 620806 | | 0..1 620808 | DateTimePeriod 620810 |
| | | | | | | | | | PeriodRoleCode 620812 | | 1 620814 | PeriodRoleCode 620816 |
| | | | | | | | BusinessTransactionDocumentReference 620818 | | | | 0..n 620820 | … |

FIG. 62-25

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | BusinessTransactionDocumentReference 620822 | | | 0..1 620824 | BusinessTransactionDocumentReference 620826 |
| | | | | | | | | BusinessTransactionDocumentRelationshipRoleCode 620828 | | | 0..1 620830 | BusinessTransactionDocumentRelationshipRoleCode 620832 |
| | | | | | | | | BusinessTransactionDocumentRelationshipTypeCode 620834 | | | 0..1 620836 | BusinessTransactionDocumentRelationshipTypeCode 620838 |
| | | | | | | | | TransportationDocumentTypeCode 620840 | | | 0..1 620842 | TransportationDocumentTypeCode 620844 |

FIG. 62-26

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationDocumentNote 620846 | | | 0..1 620848 | SHORT_Note 620850 |
| | | | | | | | | TransportationDocumentID 620852 | | | 0..1 620854 | TransportationDocumentID 620856 |
| | | | | | | | | DateTimePeriod 620858 | | | 0..n 620860 | ... |
| | | | | | | | | | DateTimePeriod 620862 | | 1 620864 | DateTimePeriod 620866 |
| | | | | | | | | | PeriodRoleCode 620868 | | 1 620870 | PeriodRoleCode 620872 |
| | | | | | | | TransportationServiceRequirement 620874 | | | | 0..n 620876 | ... |

FIG. 62-27

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationServiceRequirementCode 620878 | | | 0..1 620880 | TransportationServiceRequirementCode 620882 |
| | | | | | | | | AdditionalTransportationServiceRequirementCode 620884 | | | 0..1 620886 | TransportationServiceRequirementCode 620888 |
| | | | | | | | | TransportationContractConditionCode 620890 | | | 0..1 620892 | TransportationContractConditionCode 620894 |
| | | | | | | | | TransportServiceLevelCode 620896 | | | 0..1 620898 | TransportServiceLevelCode 620900 |

FIG. 62-28

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | NatureOfCargoClassificationCode 620902 | | | 0..1 620904 | NatureOfCargoClassificationCode 620906 |
| TransportationUnitResourceInformation 620908 | | | | | | TransportationUnitResourceInformation 620910 | | | | | 0..n 620912 | ... |
| | | | | | | | ID 620914 | | | | 1 620916 | ResourceInformationID 620918 |
| | | | | | | | ResourceNumberValue 620920 | | | | 0..1 620922 | NumberValue 620924 |
| | | | | | | | ResourceID 620926 | | | | 0..1 620928 | ResourceID 620930 |
| | | | | | | | ResourceHomeCountryCode 620932 | | | | 0..1 620934 | CountryCode 620936 |

FIG. 62-29

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationUnitResourceCategoryCode 620938 | | | | 0..1 620940 | TransportationUnitResourceCategoryCode 620942 |
| | | | | | | | TransportationUnitResourceTypeCode 620944 | | | | 0..1 620946 | TransportationUnitResourceTypeCode 620948 |
| | | | | | | | FillLevelCode 620950 | | | | 0..1 620952 | FillLevelCode 620954 |
| | | | | | | | ShippingTypeCode 620956 | | | | 0..1 620958 | ShippingTypeCode 620960 |
| | | | | | | | HaulageArrangerCode 620962 | | | | 0..1 620964 | HaulageArrangerCode 620966 |

FIG. 62-30

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationHandlingInstructionCode 620968 | | | | 0..1 620970 | TransportationHandlingInstructionCode 620972 |
| | | | | | | | TransportationHandlingInstructionNote 620974 | | | | 0..1 620976 | LONG_Note 620978 |
| | | | | | | | TransportationDocumentInformationTransportationStageAssignment 620980 | | | | 0..n 620982 | ... |
| | | | | | | | | TransportationDocumentInformationTransportationStageID 620984 | | | 1 620986 | TransportationStageID 620988 |

FIG. 62-31

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | AttachedEquipment 620990 | | | | 0..n 620992 | ... |
| | | | | | | | | TransportationDocumentInformationResourceInformationID 620994 | | | 1 620996 | ResourceInformationID 620998 |
| | | | | | | | Quantity 621000 | | | | 0..n 621002 | ... |
| | | | | | | | | Quantity 621004 | | | 1 621006 | Quantity 621008 |
| | | | | | | | | RoleCode 621010 | | | 0..1 621012 | QuantityRoleCode 621014 |
| | | | | | | | | TypeCode 621016 | | | 0..1 621018 | QuantityTypeCode 621020 |

FIG. 62-32

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | Seal 621022 | | | | 0..n 621024 | ... |
| | | | | | | | | ID 621026 | | | 1 621028 | SealID 621030 |
| | | | | | | | | PartyRoleCode 621032 | | | 0..1 621034 | PartyRoleCode 621036 |
| | | | | | | | | PartyFormattedName 621038 | | | 0..1 621040 | LONG_Name 621042 |
| | | | | | | | | StatusCode 621044 | | | 0..1 621046 | SealStatusCode 621048 |
| | | | | | | | BusinessTransactionDocumentReference 621050 | | | | 0..n 621052 | ... |

FIG. 62-33

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | BusinessTransactionDocumentReference 621054 | | | 0..1 621056 | BusinessTransactionDocumentReference 621058 |
| | | | | | | | | BusinessTransactionDocumentRelationshipRoleCode 621060 | | | 0..1 621062 | BusinessTransactionDocumentRelationshipRoleCode 621064 |
| | | | | | | | | BusinessTransactionDocumentRelationshipTypeCode 621066 | | | 0..1 621068 | BusinessTransactionDocumentRelationshipTypeCode 621070 |
| | | | | | | | | TransportationDocumentTypeCode 621072 | | | 0..1 621074 | TransportationDocumentTypeCode 621076 |

FIG. 62-34

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationDocumentNote 621078 | | | 0..1 621080 | SHORT_Note 621082 |
| | | | | | | | | TransportationDocumentID 621084 | | | 0..1 621086 | TransportationDocumentID 621088 |
| | | | | | | | | DateTimePeriod 621090 | | | 0..n 621092 | ... |
| | | | | | | | | | DateTimePeriod 621094 | | 1 621096 | DateTimePeriod 621098 |
| | | | | | | | | | PeriodRoleCode 621100 | | 1 621102 | PeriodRoleCode 621104 |
| | | | | | | | DangerousGoods 621106 | | | | 0..n 621108 | ... |
| | | | | | | | | ID 621110 | | | 0..1 621112 | DangerousGoodsID 621114 |

FIG. 62-35

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | RegulationsCode 621116 | | | 0..1 621118 | DangerousGoodsRegulationsCode 621120 |
| | | | | | | | | HazardCode 621122 | | | 0..1 621124 | DangerousGoodsHazardCode 621126 |
| | | | | | | | | FlashpointMeasureInterval 621128 | | | 0..1 621130 | MeasureInterval 621132 |
| | | | | | | | | PackagingGroupCode 621134 | | | 0..1 621136 | DangerousGoodsPackagingGroupCode 621138 |
| | | | | | | | | EmergencySchedule 621140 | | | 0..1 621142 | DangerousGoodsEmergencySchedule 621144 |
| | | | | | | | | TransportEmergencyCardCode 621146 | | | 0..1 621148 | TransportEmergencyCardCode 621150 |

FIG. 62-36

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | DangerousGoodsLabelCode 621152 | | | 0..1 621154 | DangerousGoodsLabelCode 621156 |
| | | | | | | | | DangerousGoodsLabelCode2 621158 | | | 0..1 621160 | DangerousGoodsLabelCode 621162 |
| | | | | | | | | DangerousGoodsLabelCode3 621164 | | | 0..1 621166 | DangerousGoodsLabelCode 621168 |
| | | | | | | | | PackagingInstructionTypeCode 621170 | | | 0..1 621172 | PackagingInstructionTypeCode 621174 |
| | | | | | | | | TransportMeansDescriptionCode 621176 | | | 0..1 621178 | TransportMeansDescriptionCode 621180 |

FIG. 62-37

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationAuthorisationCode 621182 | | | 0..1 621184 | DangerousGoodsTransportationAuthorisationCode 621186 |
| PackageInformation 621188 | | | | | | PackageInformation 621190 | | | | | 0..n 621192 | ... |
| | | | | | | | ID 621194 | | | | 1 621196 | PackageInformationID 621198 |
| | | | | | | | PackageID 621200 | | | | 0..1 621202 | PackageID 621204 |
| | | | | | | | PackageOrdinalNumberValue 621206 | | | | 0..1 621208 | OrdinalNumberValue 621210 |
| | | | | | | | PackageNumberValue 621212 | | | | 0..1 621214 | NumberValue 621216 |

FIG. 62-38

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | PackageTypeCode 621218 | | | | 0..1 621220 | PackageTypeCode 621222 |
| | | | | | | | PackagingLevelCode 621224 | | | | 0..1 621226 | PackagingLevelCode 621228 |
| | | | | | | | PackageMarkingInstructionCode 621230 | | | | 0..1 621232 | PackageMarkingInstructionCode 621234 |
| | | | | | | | PredecessorPackageID 621236 | | | | 0..1 621238 | PackageID 621240 |
| | | | | | | | TransportationDocumentInformationItemAssignment 621242 | | | | 0..n 621244 | ... |

FIG. 62-39

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationDocumentInformationItemID 621246 | | | 1 621248 | TransportationDocumentInformationItemID 621250 |
| | | | | | | | | Quantity 621252 | | | 0..n 621254 | ... |
| | | | | | | | | | Quantity 621256 | | 1 621258 | Quantity 621260 |
| | | | | | | | | | RoleCode 621262 | | 0..1 621264 | QuantityRoleCode 621266 |
| | | | | | | | | | TypeCode 621268 | | 0..1 621270 | QuantityTypeCode 621272 |

FIG. 62-40

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationDocumentInformationTransportationUnitResourceInformationAssignment 621274 | | | | 0..n 621276 | ... |
| | | | | | | | | TransportationDocumentInformationResourceInformationID 621278 | | | 1 621280 | ResourceInformationID 621282 |
| | | | | | | | | Quantity 621284 | | | 0..n 621286 | ... |
| | | | | | | | | | Quantity 621288 | | 1 621290 | Quantity 621292 |
| | | | | | | | | | RoleCode 621294 | | 0..1 621296 | QuantityRoleCode 621298 |

FIG. 62-41

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | | TypeCode 621300 | | 0..1 621302 | QuantityTypeCode 621304 |
| | | | | | | | Quantity 621306 | | | | 0..n 621308 | ... |
| | | | | | | | | Quantity 621310 | | | 1 621312 | Quantity 621314 |
| | | | | | | | | RoleCode 621316 | | | 0..1 621318 | QuantityRoleCode 621320 |
| | | | | | | | | TypeCode 621322 | | | 0..1 621324 | QuantityTypeCode 621326 |
| TransportationDocumentInformationItem 621328 | | | | | | TransportationDocumentInformationItem 621330 | | | | | 0..n 621332 | ... |
| | | | | | | | ID 621334 | | | | 1 621336 | TransportationDocumentInformationItemID 621338 |

FIG. 62-42

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | BusinessTransactionDocumentItemID 621340 | | | | 0..1 621342 | BusinessTransactionDocumentItemID 621344 |
| | | | | | | | OriginCountryCode 621346 | | | | 0..1 621348 | CountryCode 621350 |
| | | | | | | | DestinationCountryCode 621352 | | | | 0..1 621354 | CountryCode 621356 |
| | | | | | | | ShippingTypeCode 621358 | | | | 0..1 621360 | ShippingTypeCode 621362 |
| | | | | | | | HaulageArrangerCode 621364 | | | | 0..1 621366 | HaulageArrangerCode 621368 |
| | | | | | | | TemperatureMeasureInterval 621370 | | | | 0..1 621372 | MeasureInterval 621374 |

FIG. 62-43

| Package | | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|---|
| | | | | | | | | TransportationHandlingInstructionCode 621376 | | | | 0..1 621378 | TransportationHandlingInstructionCode 621380 |
| | | | | | | | | TransportationHandlingInstructionNote 621382 | | | | 0..1 621384 | LONG_Note 621386 |
| ItemInformation 621388 | ItemInformation 621390 | | | | | | | Amount 621392 | | | | 0..n 621394 | ... |
| | | | | | | | | | Amount 621396 | | | 1 621398 | Amount 621400 |
| | | | | | | | | | RoleCode 621402 | | | 1 621404 | AmountRoleCode 621406 |
| | | | | | | | | TextCollection 621408 | | | | 0..1 621410 | ... |

FIG. 62-44

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TextcCollection 621412 | | | 1 621414 | TextCollection 621416 |
| | | | | | | | NatureOfCargo 621418 | | | | 0..n 621420 | ... |
| | | | | | | | | ClassificationCode 621422 | | | 1 621424 | NatureOfCargoClassificationCode 621426 |
| | | | | | | | Quantity 621428 | | | | 0..n 621430 | ... |
| | | | | | | | | Quantity 621432 | | | 1 621434 | Quantity 621436 |
| | | | | | | | | RoleCode 621438 | | | 0..1 621440 | QuantityRoleCode 621442 |
| | | | | | | | | TypeCode 621444 | | | 0..1 621446 | QuantityTypeCode 621448 |

FIG. 62-45

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | BusinessTransactionDocumentReference 621450 | | | | 0..n 621452 | ... |
| | | | | | | | | BusinessTransactionDocumentReference 621454 | | | 0..1 621456 | BusinessTransactionDocumentReference 621458 |
| | | | | | | | | BusinessTransactionDocumentRelationshipRoleCode 621460 | | | 0..1 621462 | BusinessTransactionDocumentRelationshipRoleCode 621464 |
| | | | | | | | | BusinessTransactionDocumentRelationshipTypeCode 621466 | | | 0..1 621468 | BusinessTransactionDocumentRelationshipTypeCode 621470 |

FIG. 62-46

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationDocumentTypeCode 621472 | | | 0..1 621474 | TransportationDocumentTypeCode 621476 |
| | | | | | | | | TransportationDocumentNote 621478 | | | 0..1 621480 | SHORT_Note 621482 |
| | | | | | | | | TransportationDocumentID 621484 | | | 0..1 621486 | TransportationDocumentID 621488 |
| | | | | | | | | DateTimePeriod 621490 | | | 0..n 621492 | ... |
| | | | | | | | | | DateTimePeriod 621494 | | 1 621496 | DateTimePeriod 621498 |
| | | | | | | | | | PeriodRoleCode 621500 | | 1 621502 | PeriodRoleCode 621504 |

FIG. 62-47

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | DangerousGoods 621506 | | | | 0..n 621508 | ... |
| | | | | | | | | ID 621510 | | | 0..1 621512 | DangerousGoodsID 621514 |
| | | | | | | | | RegulationsCode 621516 | | | 0..1 621518 | DangerousGoodsRegulationsCode 621520 |
| | | | | | | | | HazardCode 621522 | | | 0..1 621524 | DangerousGoodsHazardCode 621526 |
| | | | | | | | | FlashpointMeasureInterval 621528 | | | 0..1 621530 | MeasureInterval 621532 |
| | | | | | | | | PackagingGroupCode 621534 | | | 0..1 621536 | DangerousGoodsPackagingGroupCode 621538 |

FIG. 62-48

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | EmergencySchedule 621540 | | | 0..1 621542 | DangerousGoodsEmergencySchedule 621544 |
| | | | | | | | | TransportEmergencyCardCode 621546 | | | 0..1 621548 | TransportEmergencyCardCode 621550 |
| | | | | | | | | DangerousGoodsLabelCode 621552 | | | 0..1 621554 | DangerousGoodsLabelCode 621556 |
| | | | | | | | | DangerousGoodsLabelCode2 621558 | | | 0..1 621560 | DangerousGoodsLabelCode 621562 |
| | | | | | | | | DangerousGoodsLabelCode3 621564 | | | 0..1 621566 | DangerousGoodsLabelCode 621568 |

FIG. 62-49

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | PackagingInstructionTypeCode 621570 | | | 0..1 621572 | PackagingInstructionTypeCode 621574 |
| | | | | | | | | TransportMeansDescriptionCode 621576 | | | 0..1 621578 | TransportMeansDescriptionCode 621580 |
| | | | | | | | | TransportationAuthorisationCode 621582 | | | 0..1 621584 | DangerousGoodsTransportationAuthorisationCode 621586 |
| | | | | | | | | Quantity 621588 | | | 0..n 621590 | ... |
| | | | | | | | | | Quantity 621592 | | 1 621594 | Quantity 621596 |
| | | | | | | | | | RoleCode 621598 | | 0..1 621600 | QuantityRoleCode 621602 |

FIG. 62-50

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | | TypeCode 621604 | | 0..1 621606 | QuantityTypeCode 621608 |
| | | | | | | | | TextCollection 621610 | | | 0..1 621612 | ... |
| | | | | | | | | | TextCollection 621614 | | 1 621616 | TextCollection 621618 |
| | | | | | | | | TransportationDocumentInformationTransportationUnitResourceInformationAssignment 621620 | | | 0..n 621622 | ... |

FIG. 62-51

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | | TransportationDocumentInformationTransportationUnitResourceInformationID 621624 | | 1 621626 | ResourceInformationID 621628 |
| | | | | | | | | | Quantity 621630 | | 0..n 621632 | ... |
| | | | | | | | | | | Quantity 621634 | 1 621636 | Quantity 621638 |
| | | | | | | | | | | RoleCode 621640 | 0..1 621642 | QuantityRoleCode 621644 |
| | | | | | | | | | | TypeCode 621646 | 0..1 621648 | QuantityTypeCode 621650 |

FIG. 62-52

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationDocumentInformationTransportationStageAssignment 621652 | | | | 0..n 621654 | ... |
| | | | | | | | | TransportationDocumentInformationTransportationStageID 621656 | | | 1 621658 | TransportationStageID 621660 |
| | | | | | | | | Quantity 621662 | | | 0..n 621664 | ... |
| | | | | | | | | | Quantity 621666 | | 1 621668 | Quantity 621670 |
| | | | | | | | | | RoleCode 621672 | | 0..1 621674 | QuantityRoleCode 621676 |

FIG. 62-53

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | | TypeCode 621678 | | 0..1 621680 | QuantityTypeCode 621682 |
| | | | | | | | TransportationDocumentInformationTransportationUnitResourceInformationAssignment 621684 | | | | 0..n 621686 | ... |
| | | | | | | | | TransportationDocumentInformationResourceInformationID 621688 | | | 1 621690 | ResourceInformationID 621692 |
| | | | | | | | | Quantity 621694 | | | 0..n 621696 | ... |
| | | | | | | | | | Quantity 621698 | | 1 621700 | Quantity 621702 |

FIG. 62-54

| Package | | | | | | | | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|---|---|---|---|---|---|---|
| | | | | | | | | | | | | | | | | RoleCode 621704 | | 0..1 621706 | QuantityRoleCode 621708 |
| | | | | | | | | | | | | | | | | TypeCode 621710 | | 0..1 621712 | QuantityTypeCode 621714 |
| | | | | | | LocationInformation 621716 | LocationInformation 621718 | | | | | | | Location 621720 | | | | 0..n 621722 | ... |
| | | | | | | | | | | | | | | | Location 621724 | | | 1 621726 | BusinessTransactionDocumentLocation 621728 |
| | | | | | | | | | | | | | | | RoleCode 621730 | | | 1 621732 | LocationRoleCode 621734 |
| | | | | | | | | | | | | | | | TypeCode 621736 | | | 0..1 621738 | LocationTypeCode 621740 |
| | | | | | | | | | | | | | | | Name 621742 | | | 0..1 621744 | MEDIUM_Name 621746 |

FIG. 62-55

| Package | | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|---|
| | | | | | | | | | DateTimePeriods 621748 | | | 0..n 621750 | ... |
| | | | | | | | | | | RequestedFulfillmentPeriod 621752 | | 0..1 621754 | DateTimePeriod 621756 |
| | | | | | | | | | | AcceptableFulfillmentPeriod 621758 | | 0..1 621760 | DateTimePeriod 621762 |
| | | | | | | | | | | PeriodRoleCode 621764 | | 1 621766 | PeriodRoleCode 621768 |
| TransportationGoodsInformation 621770 | ProductInformation 621772 | | | | | | | ProductInformation 621774 | | | | 0..n 621776 | ... |
| | | | | | | | | | Product 621778 | | | 1 621780 | BusinessTransactionDocumentProduct 621782 |

FIG. 62-56

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | ProductDescription 621784 | | | 0..1 621786 | SHORT_Description 621788 |
| TransportationChargesInformation 621790 | | | | TransportationChargesInformation 621792 | | | | | | | 0..n 621794 | ... |
| | | | | | TransportationChargesUsageCode 621796 | | | | | | 1 621798 | TransportationChargesUsageCode 621800 |
| | | | | | SupplierFreightInvoiceRequestItemID 621802 | | | | | | 0..1 621804 | BusinessTransactionDocumentItemID 621806 |
| | | | | | TransportationDocumentInformationID 621808 | | | | | | 0..1 621810 | TransportationDocumentInformationID 621812 |

FIG. 62-57

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | TransportationDocumentInformationTransportationUnitResourceInformationID 621814 | | | | | | 0..1 621816 | ResourceInformationID 621818 |
| | | | | | TransportationDocumentInformationPackageInformationID 621820 | | | | | | 0..1 621822 | PackageInformationID 621824 |
| | | | | | TransportationDocumentInformationTransportationStageID 621826 | | | | | | 0..1 621828 | TransportationStageID 621830 |
| | | | | | TransportationCharges 621832 | | | | | | 0..1 621834 | ... |

FIG. 62-58

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | ID 621836 | | | | | 1 621838 | TransportationChargesID 621840 |
| | | | | | | FreightAgreementID 621842 | | | | | 1 621844 | FreightAgreementID 621846 |
| | | | | | | OriginCode 621848 | | | | | 0..1 621850 | TransportationChargesOriginCode 621852 |
| | | | | | | TariffID 621854 | | | | | 0..1 621856 | TransportationChargesTariffID 621858 |
| | | | | | | CalculationSheetID 621860 | | | | | 0..1 621862 | TransportationChargesCalculationSheetID 621864 |
| | | | | | | Location 621866 | | | | | 0..n 621868 | ... |

FIG. 62-59

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | Location 621870 | | | | 1 621872 | BusinessTransactionDocumentLocation 621874 |
| | | | | | | | RoleCode 621876 | | | | 1 621878 | LoactionRoleCode 621880 |
| | | | | | | | TypeCode 621882 | | | | 0..1 621884 | LocationTypeCode 621886 |
| | | | | | | | Name 621888 | | | | 0..1 621890 | MEDIUM_Name 621892 |
| | | | | | | | DateTimePeriods 621894 | | | | 0..n 621896 | ... |
| | | | | | | | | RequestedFulfillmentPeriod 621898 | | | 0..1 621900 | DateTimePeriod 621902 |
| | | | | | | | | AcceptableFulfillmentPeriod 621904 | | | 0..1 621906 | DateTimePeriod 621908 |

FIG. 62-60

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | PeriodRoleCode 621910 | | | 1 621912 | PeriodRoleCode 621914 |
| | | | | | | TextCollection 621916 | | | | | 0..1 621918 | ... |
| | | | | | | | TextCollection 621920 | | | | 1 621922 | TextCollection 621924 |
| | | | | | | Currency 621926 | | | | | 0..n 621928 | ... |
| | | | | | | | Code 621930 | | | | 1 621932 | CurrencyCode 621934 |
| | | | | | | | RoleCode 621936 | | | | 1 621938 | CurrencyRoleCode 621940 |
| | | | | | | | UsageCode 621942 | | | | 0..1 621944 | CurrencyUsageCode 621946 |
| | | | | | | ExchangeRate 621948 | | | | | 0..n 621950 | ... |

FIG. 62-61

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | ExchangeRate 621952 | | | | 1 621954 | ExchangeRate 621956 |
| | | | | | | | TypeCode 621958 | | | | 0..1 621960 | ExchangeRateTypeCode 621962 |
| | | | | | | PercentElement 621964 | | | | | 0..n 621966 | ... |
| | | | | | | | PercentRoleCode 621968 | | | | 1 621970 | PercentRoleCode 621972 |
| | | | | | | | Percent 621974 | | | | 1 621976 | Percent 621978 |
| | | | | | | | TransportationChargesPercentCalculationBaseCode 621980 | | | | 0..1 621982 | TransportationChargesPercentCalculationBaseCode 621984 |

FIG. 62-62

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | StatusCode 621986 | | | | 0..1 621988 | TransportationChargesPercentElementStatusCode 621990 |
| | | | | | | DateTimePeriod 621992 | | | | | 0..n 621994 | ... |
| | | | | | | | DateTimePeriod 621996 | | | | 1 621998 | DateTimePeriod 622000 |
| | | | | | | | PeriodRoleCode 622002 | | | | 1 622004 | PeriodRoleCode 622006 |
| | | | | | | BusinessTransactionDocumentReference 622008 | | | | | 0..n 622010 | ... |
| | | | | | | | BusinessTransactionDocumentReference 622012 | | | | 0..1 622014 | BusinessTransactionDocumentReference 622016 |

FIG. 62-63

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | BusinessTransactionDocumentRelationshipRoleCode 622018 | | | | 0..1 622020 | BusinessTransactionDocumentRelationshipRoleCode 622022 |
| | | | | | | | BusinessTransactionDocumentRelationshipTypeCode 622024 | | | | 0..1 622026 | BusinessTransactionDocumentRelationshipTypeCode 622028 |
| | | | | | | | TransportationDocumentTypeCode 622030 | | | | 0..1 622032 | TransportationDocumentTypeCode 622034 |
| | | | | | | | TransportationDocumentNote 622036 | | | | 0..1 622038 | SHORT_Note 622040 |

FIG. 62-64

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationDocumentID 622042 | | | | 0..1 622044 | TransportationDocumentID 622046 |
| | | | | | | TaxDetail 622048 | | | | | 0..n 622050 | ... |
| | | | | | | | ProductTax 622052 | | | | 1 622054 | ProductTax 622056 |
| | | | | | | PaymentInstruction 622058 | | | | | 0..n 622060 | ... |
| | | | | | | | PaymentInstruction 622062 | | | | 1 622064 | PaymentInstruction 622066 |
| | | | | | | | TransportationChargesElementCategoryCode 622068 | | | | 0..1 622070 | TransportationChargesElementCategoryCode 622072 |

FIG. 62-65

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationChargesElementSubCategoryCode 622074 | | | | 0..1 622076 | TransportationChargesElementSubCategoryCode 622078 |
| | | | | | | | TransportationChargesPaymentArrangementCode 622080 | | | | 0..1 622082 | TransportationChargesPaymentArrangementCode 622084 |
| | | | | | | CashDiscountTerms 622086 | | | | | 0..n 622088 | ... |
| | | | | | | | CashDiscountTerms 622090 | | | | 1 622092 | CashDiscountTerms 622094 |
| | | | | | | | TransportationChargesElementCategoryCode 622096 | | | | 0..1 622098 | TransportationChargesElementCategoryCode 622100 |

FIG. 62-66

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | TransportationChargesElementSubCategoryCode 622102 | | | | 0..1 622104 | TransportationChargesElementSubCategoryCode 622106 |
| | | | | | | Element 622108 | | | | | 0..n 622110 | ... |
| | | | | | | | CategoryCode 622112 | | | | 1 622114 | TransportationChargesElementCategoryCode 622116 |
| | | | | | | | SubCategoryCode 622118 | | | | 1 622120 | TransportationChargesElementSubCategoryCode 622122 |
| | | | | | | | TypeCode 622124 | | | | 1 622126 | TransportationChargesElementTypeCode 622128 |

FIG. 62-67

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | CalculationResolutionCode 622130 | | | | 1 622132 | TransportationChargesElementCalculationResolutionCode 622134 |
| | | | | | | | TransportationChargesPaymentArrangementCode 622136 | | | | 0...1 622138 | TransportationChargesPaymentArrangementCode 622140 |
| | | | | | | | Location 622142 | | | | 0..n 622144 | ... |
| | | | | | | | | Location 622146 | | | 1 622148 | BusinessTransactionDocumentLocation 622150 |
| | | | | | | | | RoleCode 622152 | | | 1 622154 | LocationRoleCode 622156 |
| | | | | | | | | TypeCode 622158 | | | 0..1 622160 | LocationTypeCode 622162 |

FIG. 62-68

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | Name 622164 | | | 0..1 622166 | MEDIUM_Name 622168 |
| | | | | | | | | DateTimePeriods 622170 | | | 0..n 622172 | ... |
| | | | | | | | | | RequestedFulfillmentPeriod 622174 | | 0..1 622176 | DateTimePeriod 622178 |
| | | | | | | | | | AcceptableFulfillmentPeriod 622180 | | 0..1 622182 | DateTimePeriod 622184 |
| | | | | | | | | | PeriodRoleCode 622186 | | 1 622188 | PeriodRoleCode 622190 |
| | | | | | | | TextCollection 622192 | | | | 0..1 622194 | ... |
| | | | | | | | | TextCollection 622196 | | | 1 622198 | TextCollection 622200 |

FIG. 62-69

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | Currency 622202 | | | | 0..n 622204 | ... |
| | | | | | | | | Code 622206 | | | 1 622208 | CurrencyCode 622210 |
| | | | | | | | | RoleCode 622212 | | | 1 622214 | CurrencyRoleCode 622216 |
| | | | | | | | | UsageCode 622218 | | | 0..1 622220 | CurrencyUsageCode 622222 |
| | | | | | | | RateElement 622224 | | | | 0..n 622226 | ... |
| | | | | | | | | ID 622228 | | | 1 622230 | TransportationChargesElementRateElementID 622232 |
| | | | | | | | | Amount 622234 | | | 1 622236 | Amount 622238 |
| | | | | | | | | BaseQuantity 622240 | | | 1 622242 | Quantity 622244 |

FIG. 62-70

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationChargesRateTypeCode 622246 | | | 0..1 622248 | TransportationChargesRateTypeCode 622250 |
| | | | | | | | | TransportationChargesRateRoleCode 622252 | | | 1 622254 | TransportationChargesRateRoleCode 622256 |
| | | | | | | | | TransportationChargesRateElementStatusCode 622258 | | | 0..1 622260 | TransportationChargesRateElementStatusCode 622262 |
| | | | | | | | PercentElement 622264 | | | | 0..n 622266 | ... |
| | | | | | | | | PercentRoleCode 622268 | | | 1 622270 | PercentRoleCode 622272 |

FIG. 62-71

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | Percent 622274 | | | 1 622276 | Percent 622278 |
| | | | | | | | | TransportationChargesPercentCalculationBaseCode 622280 | | | 0..1 622282 | TransportationChargesPercentCalculationBaseCode 622284 |
| | | | | | | | | StatusCode 622286 | | | 0..1 622288 | TransportationChargesPercentElementStatusCode 622290 |
| | | | | | | | AmountElement 622292 | | | | 0..n 622294 | ... |
| | | | | | | | | Amount 622296 | | | 1 622298 | Amount 622300 |
| | | | | | | | | AmountRoleCode 622302 | | | 1 622304 | AmountRoleCode 622306 |

FIG. 62-72

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationChargesAmountElementStatusCode 622308 | | | 0..1 622310 | TransportationChargesAmountElementStatusCode 622312 |
| | | | | | | | | RateElementAssignment 622314 | | | 0..n 622316 | ... |
| | | | | | | | | | TransportationChargesElementRateElementID 622318 | | 1 622320 | TransportationChargesElementRateElementID 622322 |
| | | | | | | | CalculationBase 622324 | | | | 0..n 622326 | ... |

FIG. 62-73

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | | TransportationChargesElementCalculationBaseCode 622328 | | | 1 622330 | TransportationChargesElementCalculationBaseCode 622332 |
| | | | | | | | | BaseQuantity 622334 | | | 0..1 622336 | Quantity 622338 |
| | | | | | | | | BaseQuantityRoleCode 622340 | | | 0..1 622342 | QuantityRoleCode 622344 |
| | | | | | | | | BaseQuantityTypeCode 622346 | | | 0..1 622348 | QuantityTypeCode 622350 |
| | | | | | | | TaxDetail 622352 | | | | 0..n 622354 | ... |
| | | | | | | | | ProductTax 622356 | | | 1 622358 | ProductTax 622360 |

FIG. 62-74

| Package | level 1 | level 2 | level 3 | level 4 | level 5 | level 6 | level 7 | level 8 | level9 | level10 | Cardinality | Data Type Name |
|---|---|---|---|---|---|---|---|---|---|---|---|---|
| | | | | | | | DateTime Period 622362 | | | | 0..n 622364 | ... |
| | | | | | | | | DateTimePeriod 622366 | | | 1 622368 | DateTimePeriod 622370 |
| | | | | | | | | PeriodRoleCode 622372 | | | 1 622374 | PeriodRoleCode 622376 |
| | | | | | | | CostDistribution 622378 | | | | 0..n 622380 | ... |
| | | | | | | | | AccountingCodingBlockAssignment 622382 | | | 1 622384 | AccountingCodingBlockAssignment 622386 |

To FIG. 66-8
To FIG. 66-4
To FIG. 66-10
66084
Location
66086
~ DateTimePeriods
66088
Transportation Stage
66090
~Location
66092
~ DateTimePeriods
66094
~ BTDReference
66098
~ DateTimePeriod
66096
~TransportationServiceRequirement
66100
TransportationUnitResourceInformation
66102
~TransportationStageAssignment
66104
~ Quantity
66106
~ BTDReference
66108
~ DateTimePeriod
66110
~ TextCollection
66112
~ Location
66114
~ DateTimePeriods

| Package | level1 | level2 | level3 | level4 | level5 | level6 | Cardinality | Data Type Name |
|---|---|---|---|---|---|---|---|---|
| TransportationBookingRequestCancelRequestMessage 69000 | TransportationBookingRequestCancelRequestMessage 69002 | | | | | | | ShipmentRequestCancelRequestMessage 69004 |
| MessageHeader 69006 | | MessageHeader 69008 | | | | | 1 69010 | BusinessDocumentMessageHeader 69012 |
| TransportationBookingRequest 69014 | | TransportationBookingRequest 69016 | | | | | 1 69018 | ... |
| | | | ID 69020 | | | | 1 69022 | BusinessTransactionDocumentID 69024 |
| Request 69026 | | | Request 69028 | | | | 1 69030 | ... |

FIG. 69-2

| Package | level1 | level2 | level3 | level4 | level5 | level6 | Cardinality | Data Type Name |
|---|---|---|---|---|---|---|---|---|
| Business-Transaction-Documen-tReference 69032 | | | | Business-Transaction-Documen-tReference 69034 | | | 0..n 69036 | ... |
| | | | | | BusinessTransaction-DocumentReference 69038 | | 0..1 69040 | BusinessTransactionDocumen-tReference 69042 |
| | | | | | BusinessTransaction-DocumentRelationshi-pRoleCode 69044 | | 0..1 69046 | BusinessTransactionDocumentRela-tionshipRoleCode 69048 |
| | | | | | BusinessTransaction-DocumentRelationship-TypeCode 69050 | | 0..1 69052 | BusinessTransactionDocumentRela-tionshipTypeCode 69054 |
| | | | | | TransportationDocu-mentTypeCode 69056 | | 0..1 69058 | TransportationDocumentTypeCode 69060 |

FIG. 69-3

| Package | level1 | level2 | level3 | level4 | level5 | level6 | Cardinality | Data Type Name |
|---|---|---|---|---|---|---|---|---|
| | | | | | TransportationDocumentNote 69062 | | 0..1 69064 | SHORT_Note 69066 |
| | | | | | TransportationDocumentID 69068 | | 0..1 69070 | TransportationDocumentID 69072 |
| | | | | | DateTimePeriod 69074 | | 0..n 69076 | ... |
| | | | | | | DateTimePeriod 69078 | 1 69080 | DateTimePeriod 69082 |
| | | | | | | PeriodRoleCode 69084 | 1 69086 | PeriodRoleCode 69088 |

FIG. 70-1

| Package | level1 | level2 | level3 | level4 | level5 | level6 | level7 | level8 | Cardinality | Data Type Name |
|---|---|---|---|---|---|---|---|---|---|---|
| TransportationBookingRequestConfirmationMessage 700000 | Transportation-BookingRequest-Confirmation-Message 700002 | | | | | | | | | Transportation-BookingRequestRequestMessage 700004 |
| MessageHeader 700006 | | MessageHeader 700008 | | | | | | | 1 700010 | BusinessDocumentMessageHeader 700012 |
| TransportationBookingRequest 700014 | | Transportation-BookingRequest 700016 | | | | | | | 1 700018 | ... |
| | | | @actioncode 700020 | | | | | | 1 700022 | ActionCode 700024 |

FIG. 70-2

| Package | level1 | level2 | level3 | level4 | level5 | level6 | level7 | level8 | Cardinality | Data Type Name |
|---|---|---|---|---|---|---|---|---|---|---|
| | | | ID 700026 | | | | | | 1 700028 | BusinessTransactionDocumentID 700030 |
| Confirmation 700032 | | | Confirmation 700034 | | | | | | 1 700036 | ... |
| | | | | DeliveryTerms 700038 | | | | | 0..1 700040 | DeliveryTerms 700042 |
| | | | | AcceptanceStatusCode 700044 | | | | | 0..1 700046 | AcceptanceStatusCode 700048 |
| HeaderInformation 700050 | | | | DateTimePeriods 700052 | | | | | 0..n 700054 | ... |
| | | | | | RequestedFulfillmentPeriod 700056 | | | | 0..1 700058 | DateTimePeriod 700060 |
| | | | | | AcceptableFulfillmentPeriod 700062 | | | | 0..1 700064 | DateTimePeriod 700066 |

FIG. 70-3

| Package | level1 | level2 | level3 | level4 | level5 | level6 | level7 | level8 | Cardinality | Data Type Name |
|---|---|---|---|---|---|---|---|---|---|---|
| | | | | | PeriodRole Code 700068 | | | | 1 700070 | PeriodRoleCode 700072 |
| | | | | NatureOf Cargo 700074 | | | | | 0..n 700076 | ... |
| | | | | | Classifica-tionCode 700078 | | | | 1 700080 | NatureOfCargo-ClassificationCode 700082 |
| | | | | Total-Quantity 700084 | | | | | 0..n 700086 | ... |
| | | | | | Quantity 700088 | | | | 1 700090 | Quantity 700092 |
| | | | | | RoleCode 700094 | | | | 0..1 700096 | QuantityRoleCode 700098 |
| | | | | | TypeCode 700100 | | | | 0..1 700102 | QuantityTypeCode 700104 |
| | | | | Tota-lAmount 700106 | | | | | 0..n 700108 | ... |

FIG. 70-4

| Package | level1 | level2 | level3 | level4 | level5 | level6 | level7 | level8 | Cardinality | Data Type Name |
|---|---|---|---|---|---|---|---|---|---|---|
| | | | | | Amount 700110 | | | | 1 700112 | Amount 700114 |
| | | | | | RoleCode 700116 | | | | 1 700118 | AmountRoleCode 700120 |
| | | | | TextCollection 700122 | | | | | 0..1 700124 | … |
| | | | | | TextCollection 700126 | | | | 1 700128 | TextCollection 700130 |
| | | | | TransportationServiceRequirement 700132 | | | | | 0..n 700134 | … |
| | | | | | TransportationServiceRequirementCode 700136 | | | | 0..1 700138 | TransportationServiceRequirementCode 700140 |

FIG. 70-5

| Package | level1 | level2 | level3 | level4 | level5 | level6 | level7 | level8 | Cardinality | Data Type Name |
|---|---|---|---|---|---|---|---|---|---|---|
| | | | | | AdditionalTransportationServiceRequirementCode 700142 | | | | 0..1 700144 | TransportationServiceRequirementCode 700146 |
| | | | | | TransportationContractConditionCode 700148 | | | | 0..1 700150 | TransportationContractConditionCode 700152 |
| | | | | | TransportServiceLevelCode 700154 | | | | 0..1 700156 | TransportServiceLevelCode 700158 |
| | | | | | NatureOfCargoClassificationCode 700160 | | | | 0..1 700162 | NatureOfCargoClassificationCode 700164 |

FIG. 70-6

| Package | level1 | level2 | level3 | level4 | level5 | level6 | level7 | level8 | Cardinality | Data Type Name |
|---|---|---|---|---|---|---|---|---|---|---|
| | | | | Trans-portation-DocumentInforma-tion 700166 | | | | | 0..n 700168 | ... |
| | | | | | Transporta-tionDocu-mentType-Code 700170 | | | | 0..1 700172 | Transportation-DocumentType-Code 700174 |
| | | | | | Transporta-tionDocu-mentNote 700176 | | | | 0..1 700178 | SHORT_Note 700180 |
| | | | | | Transporta-tionDocu-mentID 700182 | | | | 0..1 700184 | Transportation-DocumentID 700186 |
| | | | | | Transporta-tionDocu-mentStatus Code 700188 | | | | 0..1 700190 | Transportation-DocumentStatus-Code 700192 |

FIG. 70-7

| Package | level1 | level2 | level3 | level4 | level5 | level6 | level7 | level8 | Cardinality | Data Type Name |
|---|---|---|---|---|---|---|---|---|---|---|
| | | | | | Language-Code 700194 | | | | 0..1 700196 | LanguageCode 700198 |
| | | | | | Communi-cationMe-diumType-Code 700200 | | | | 0..1 700202 | Communication-MediumTypeCode 700204 |
| | | | | | Required-indicator 700206 | | | | 1 700208 | Indicator 700210 |
| | | | | | Output-CopyNum-berValue 700212 | | | | 0..1 700214 | NumberValue 700216 |
| | | | | | OutputOrigi nalNum-berValue 700218 | | | | 0..1 700220 | NumberValue 700222 |
| | | | | | DateTimeP eriod 700224 | | | | 0..n 700226 | ... |

FIG. 70-8

| Package | level1 | level2 | level3 | level4 | level5 | level6 | level7 | level8 | Cardinality | Data Type Name |
|---|---|---|---|---|---|---|---|---|---|---|
| | | | | | | DateTimePeriod 700228 | | | 1 700230 | DateTimePeriod 700232 |
| | | | | | | PeriodRoleCode 700234 | | | 1 700236 | PeriodRoleCode 700238 |
| | | | | BusinessTransactionDocumentReference 700240 | | | | | 0..n 700242 | ... |
| | | | | | BusinessTransactionDocumentReference 700244 | | | | 0..1 700246 | BusinessTransactionDocumentReference 700248 |

FIG. 70-9

| Package | level1 | level2 | level3 | level4 | level5 | level6 | level7 | level8 | Cardinality | Data Type Name |
|---|---|---|---|---|---|---|---|---|---|---|
| | | | | | Business-Transac-tionDocu-mentRela-tionshi-pRoleCode 700250 | | | | 0..1 700252 | BusinessTransac-tionDocumentRela-tionshipRoleCode 700254 |
| | | | | | Business-Transac-tionDocu-mentRela-tionship-TypeCode 700256 | | | | 0..1 700258 | BusinessTransac-tionDocumentRela-tionshipTypeCode 700260 |
| | | | | | Transporta-tionDocu-mentType-Code 700262 | | | | 0..1 700264 | Transportation-DocumentType-Code 700266 |
| | | | | | Transporta-tionDocu-mentNote 700268 | | | | 0..1 700270 | SHORT_Note 700272 |
| | | | | | Transporta-tionDocu-mentID 700274 | | | | 0..1 700276 | Transportation-DocumentID 700278 |

FIG. 70-10

| Package | level1 | level2 | level3 | level4 | level5 | level6 | level7 | level8 | Cardinality | Data Type Name |
|---|---|---|---|---|---|---|---|---|---|---|
| | | | | | DateTimePeriod 700280 | | | | 0..n 700282 | ... |
| | | | | | | DateTimePeriod 700284 | | | 1 700286 | DateTimePeriod 700288 |
| | | | | | | PeriodRoleCode 700290 | | | 1 700292 | PeriodRoleCode 700294 |
| GovernmentalRequirementInformation 700296 | | | | Governmental-Procedure 700298 | | | | | 0..n 700300 | ... |
| | | | | | Transporta-tionGovernmentAgencyTypeCode 700302 | | | | 0..1 700304 | TransportationGovern-mentAgencyType-Code 700306 |
| | | | | | Transporta-tionMove-mentType-Code 700308 | | | | 0..1 700310 | Transportation-MovementType-Code 700312 |

FIG. 70-11

| Package | level1 | level2 | level3 | level4 | level5 | level6 | level7 | level8 | Cardinality | Data Type Name |
|---|---|---|---|---|---|---|---|---|---|---|
| | | | | | Transporta-tionGovernmentAgencyInvolve-mentStatusCode 700314 | | | | 0..1 700316 | TransportationGov-ernmentAgencyIn-volvementStatus-Code 700318 |
| | | | | | Transporta-tionGovernmentAgencyAction-Code 700320 | | | | 0..1 700322 | TransportationGov-ernmentAgencyAc-tionCode 700324 |
| | | | | | Transporta-tionGovernmentAgencyProcedur-eStatus-Code 700326 | | | | 0..1 700328 | TransportationGov-ern-mentAgencyProce-dureStatusCode 700330 |
| | | | | | TextCollec-tion 700332 | | | | 0..1 700334 | ... |

FIG. 70-12

| Package | level1 | level2 | level3 | level4 | level5 | level6 | level7 | level8 | Cardinality | Data Type Name |
|---|---|---|---|---|---|---|---|---|---|---|
| | | | | | | TextCollection 700336 | | | 1 700338 | TextCollection 700340 |
| | | | | | TransportationDocumentInformation 700342 | | | | 0..n 700344 | ... |
| | | | | | | TransportationDocumentTypeCode 700346 | | | 0..1 700348 | TransportationDocumentTypeCode 700350 |
| | | | | | | TransportationDocumentNote 700352 | | | 0..1 700354 | SHORT_Note 700356 |
| | | | | | | TransportationDocumentID 700358 | | | 0..1 700360 | TransportationDocumentID 700362 |

FIG. 70-13

| Package | level1 | level2 | level3 | level4 | level5 | level6 | level7 | level8 | Cardinality | Data Type Name |
|---|---|---|---|---|---|---|---|---|---|---|
| | | | | | | TransportationDocumentStatusCode 700364 | | | 0..1 700366 | Transportation-DocumentStatus-Code 700368 |
| | | | | | | LanguageCode 700370 | | | 0..1 700372 | LanguageCode 700374 |
| | | | | | | CommunicationMediumTypeCode 700376 | | | 0..1 700378 | Communication-MediumTypeCode 700380 |
| | | | | | | RequiredIndicator 700382 | | | 1 700384 | Indicator 700386 |
| | | | | | | OutputCopyNumberValue 700388 | | | 0..1 700390 | NumberValue 700392 |
| | | | | | | OutputOriginalNumberValue 700394 | | | 0..1 700396 | NumberValue 700398 |

FIG. 70-14

| Package | level1 | level2 | level3 | level4 | level5 | level6 | level7 | level8 | Cardinality | Data Type Name |
|---|---|---|---|---|---|---|---|---|---|---|
| | | | | | | DateTimePeriod 700400 | | | 0..n 700402 | ... |
| | | | | | | | DateTimePeriod 700404 | | 1 700406 | DateTimePeriod 700408 |
| | | | | | | | PeriodRoleCode 700410 | | 1 700412 | PeriodRoleCode 700414 |
| PartyInformation 700416 | | | | Party 700418 | | | | | 1..n 700420 | ... |
| | | | | | Party 700422 | | | | 1 700424 | BusinessTransactionDocumentParty 700426 |
| | | | | | RoleCode 700428 | | | | 1 700430 | PartyRoleCode 700432 |
| | | | | | FormattedName 700434 | | | | 0..1 700436 | LONG_Name 700438 |
| | | | | | DateTimePeriods 700440 | | | | 0..n 700442 | ... |

FIG. 70-15

| Package | level1 | level2 | level3 | level4 | level5 | level6 | level7 | level8 | Cardinality | Data Type Name |
|---|---|---|---|---|---|---|---|---|---|---|
| | | | | | | RequestedFulfillmentPeriod 700444 | | | 0..1 700446 | DateTimePeriod 700448 |
| | | | | | | AcceptableFulfillmentPeriod 700450 | | | 0..1 700452 | DateTimePeriod 700454 |
| | | | | | | PeriodRoleCode 700456 | | | 1 700458 | PeriodRoleCode 700460 |
| | | | | | TransportationDocumentInformation 700462 | | | | 0..n 700464 | ... |
| | | | | | | TransportationDocumentTypeCode 700466 | | | 0..1 700468 | TransportationDocumentTypeCode 700470 |
| | | | | | | TransportationDocumentNote 700472 | | | 0..1 700474 | SHORT_Note 700476 |

FIG. 70-16

| Package | level1 | level2 | level3 | level4 | level5 | level6 | level7 | level8 | Cardinality | Data Type Name |
|---|---|---|---|---|---|---|---|---|---|---|
| | | | | | | TransportationDocumentID 700478 | | | 0..1 700480 | TransportationDocumentID 700482 |
| | | | | | | TransportationDocumentStatus Code 700484 | | | 0..1 700486 | TransportationDocumentStatusCode 700488 |
| | | | | | | LanguageCode 700490 | | | 0..1 700492 | LanguageCode 700494 |
| | | | | | | CommunicationMediumTypeCode 700496 | | | 0..1 700498 | CommunicationMediumTypeCode 700500 |
| | | | | | | RequiredIndicator 700502 | | | 1 700504 | Indicator 700506 |
| | | | | | | OutputCopyNumberValue 700508 | | | 0..1 700510 | NumberValue 700512 |

FIG. 70-17

| Package | level1 | level2 | level3 | level4 | level5 | level6 | level7 | level8 | Cardinality | Data Type Name |
|---|---|---|---|---|---|---|---|---|---|---|
| | | | | | | OutputOriginalNum-berValue 700514 | | | 0..1 700516 | NumberValue 700518 |
| | | | | | | DateTimePeriod 700520 | | | 0..n 700522 | … |
| | | | | | | | DateTimePeriod 700524 | | 1 700526 | DateTimePeriod 700528 |
| | | | | | | | Pe-riodRole-Code 700530 | | 1 700532 | PeriodRoleCode 700534 |
| | | | | | Business-Transac-tionDocu-men-tReference 700536 | | | | 0..n 700538 | … |

FIG. 70-18

| Package | level1 | level2 | level3 | level4 | level5 | level6 | level7 | level8 | Cardinality | Data Type Name |
|---|---|---|---|---|---|---|---|---|---|---|
| | | | | | | BusinessTransactionDocumentReference 700540 | | | 0..1 700542 | BusinessTransactionDocumentReference 700544 |
| | | | | | | BusinessTransactionDocumentRelationshipRoleCode 700546 | | | 0..1 700548 | BusinessTransactionDocumentRelationshipRoleCode 700550 |
| | | | | | | BusinessTransactionDocumentRelationshipTypeCode 700552 | | | 0..1 700554 | BusinessTransactionDocumentRelationshipTypeCode 700556 |
| | | | | | | TransportationDocumentTypeCode 700558 | | | 0..1 700560 | TransportationDocumentTypeCode 700562 |

FIG. 70-19

| Package | level1 | level2 | level3 | level4 | level5 | level6 | level7 | level8 | Cardinality | Data Type Name |
|---|---|---|---|---|---|---|---|---|---|---|
| | | | | | | TransportationDocumentNote 700564 | | | 0..1 700566 | SHORT_Note 700568 |
| | | | | | | TransportationDocumentID 700570 | | | 0..1 700572 | Transportation-DocumentID 700574 |
| | | | | | | DateTimePeriod 700576 | | | 0..n 700578 | ... |
| | | | | | | | DateTimePeriod 700580 | | 1 700582 | DateTimePeriod 700584 |
| | | | | | | | PeriodRoleCode 700586 | | 1 700588 | PeriodRoleCode 700590 |
| LocationInformation 700592 | | | | Location 700594 | | | | | 0..n 700596 | |
| | | | | | Location 700598 | | | | 1 700600 | BusinessTransactionDocumentLocation 700602 |

FIG. 70-20

| Package | level1 | level2 | level3 | level4 | level5 | level6 | level7 | level8 | Cardinality | Data Type Name |
|---|---|---|---|---|---|---|---|---|---|---|
| | | | | | RoleCode 700604 | | | | 1 700606 | LocationRoleCode 700608 |
| | | | | | TypeCode 700610 | | | | 0..1 700612 | LocationTypeCode 700614 |
| | | | | | Name 700616 | | | | 0..1 700618 | MEDIUM_Name 700620 |
| | | | | | DateTimePeriods 700622 | | | | 0..n 700624 | ... |
| | | | | | | Request-edFulfill-mentPeriod 700626 | | | 0..1 700628 | DateTimePeriod 700630 |
| | | | | | | Accept-ableFulfill-mentPeriod 700632 | | | 0..1 700634 | DateTimePeriod 700636 |
| | | | | | | PeriodRole Code 700638 | | | 1 700640 | PeriodRoleCode 700642 |

FIG. 70-21

| Package | level1 | level2 | level3 | level4 | level5 | level6 | level7 | level8 | Cardinality | Data Type Name |
|---|---|---|---|---|---|---|---|---|---|---|
| TransportationStage-Information 700644 | | | | Trans-porta-tionStage 700646 | | | | | 0..n 700648 | ... |
| | | | | | ID 700650 | | | | 1 700652 | Transportation-StageID 700654 |
| | | | | | Ordinal-Number-Value 700656 | | | | 0..1 700658 | OrdinalNumber-Value 700660 |
| | | | | | TypeCode 700662 | | | | 0..1 700664 | Transportation-StageTypeCode 700666 |
| | | | | | JourneyID 700668 | | | | 0..1 700670 | JourneyID 700672 |
| | | | | | Transport-ModeCode 700674 | | | | 0..1 700676 | TransportMode-Code 700678 |
| | | | | | Transport-MeansDe-scription-Code 700680 | | | | 0..1 700682 | TransportMeans-DescriptionCode 700684 |

FIG. 70-22

| Package | level1 | level2 | level3 | level4 | level5 | level6 | level7 | level8 | Cardinality | Data Type Name |
|---|---|---|---|---|---|---|---|---|---|---|
| | | | | | TransportMeansDescription 700686 | | | | 0..1 700688 | SHORT_Description 700690 |
| | | | | | TransportMeansID 700692 | | | | 0..1 700694 | TransportMeansID 700696 |
| | | | | | TransportMeansHomeCountryCode 700698 | | | | 0..1 700700 | CountryCode 700702 |
| | | | | | TransportMeansOwnershipTypeCode 700704 | | | | 0..1 700706 | TransportMeansOwnershipTypeCode 700708 |
| | | | | | CarrierStandardID 700710 | | | | 0..1 700712 | PartyStandardID 700714 |
| | | | | | CarrierFormattedName 700716 | | | | 0..1 700718 | LONG_Name 700720 |

FIG. 70-23

| Package | level1 | level2 | level3 | level4 | level5 | level6 | level7 | level8 | Cardinality | Data Type Name |
|---|---|---|---|---|---|---|---|---|---|---|
| | | | | | TransportationTransitDirectionCode 700722 | | | | 0..1 700724 | Transportation-TransitDirection-Code 700726 |
| | | | | | CalculatedDistanceMeasure 700728 | | | | 0..1 700730 | Measure 700732 |
| | | | | | GivenDistance-Measure 700734 | | | | 0..1 700736 | Measure 700738 |
| | | | | | Location 700740 | | | | 1..n 700742 | ... |
| | | | | | | Location 700744 | | | 1 700746 | BusinessTransactionDocumentLocation 700748 |
| | | | | | | RoleCode 700750 | | | 1 700752 | LocationRoleCode 700754 |
| | | | | | | TypeCode 700756 | | | 0..1 700758 | LocationTypeCode 700760 |

FIG. 70-24

| Package | level1 | level2 | level3 | level4 | level5 | level6 | level7 | level8 | Cardinality | Data Type Name |
|---|---|---|---|---|---|---|---|---|---|---|
| | | | | | | Name 700762 | | | 0..1 700764 | MEDIUM_Name 700766 |
| | | | | | | DateTimePeriods 700768 | | | 0..n 700770 | ... |
| | | | | | | | Request-edFulfill-mentPe-riod 700772 | | 0..1 700774 | DateTimePeriod 700776 |
| | | | | | | | Accept-ableFul-fillment-Period 700778 | | 0..1 700780 | DateTimePeriod 700782 |
| | | | | | | | Pe-riodRole-Code 700784 | | 1 700786 | PeriodRoleCode 700788 |
| | | | | | Business-Transac-tionDocu-men-tReference 700790 | | | | 0..n 700792 | ... |

FIG. 70-25

| Package | level1 | level2 | level3 | level4 | level5 | level6 | level7 | level8 | Cardinality | Data Type Name |
|---|---|---|---|---|---|---|---|---|---|---|
| | | | | | | Business-Transac-tionDocu-men-tReference 700794 | | | 0..1 700796 | BusinessTransac-tionDocumen-tReference 700798 |
| | | | | | | Business-Transac-tionDocu-mentRela-tionshi-pRoleCode 700800 | | | 0..1 700802 | BusinessTransac-tionDocumentRela-tionshipRoleCode 700804 |
| | | | | | | Business-Transac-tionDocu-mentRela-tionship-TypeCode 700806 | | | 0..1 700808 | BusinessTransac-tionDocumentRela-tionshipTypeCode 700810 |
| | | | | | | Transporta-tionDocu-mentType-Code 700812 | | | 0..1 700814 | Transportation-DocumentType-Code 700816 |

FIG. 70-26

| Package | level1 | level2 | level3 | level4 | level5 | level6 | level7 | level8 | Cardinality | Data Type Name |
|---|---|---|---|---|---|---|---|---|---|---|
| | | | | | | TransportationDocumentNote 700818 | | | 0..1 700820 | SHORT_Note 700822 |
| | | | | | | TransportationDocumentID 700824 | | | 0..1 700826 | Transportation-DocumentID 700828 |
| | | | | | | DateTimePeriod 700830 | | | 0..n 700832 | ... |
| | | | | | | | DateTimePeriod 700834 | | 1 700836 | DateTimePeriod 700838 |
| | | | | | | | PeriodRoleCode 700840 | | 1 700842 | PeriodRoleCode 700844 |
| | | | | | TransportationServiceRequirement 700846 | | | | 0..n 700848 | ... |

FIG. 70-27

| Package | level1 | level2 | level3 | level4 | level5 | level6 | level7 | level8 | Cardinality | Data Type Name |
|---|---|---|---|---|---|---|---|---|---|---|
| | | | | | | Transporta-tionSer-viceRe-quirement-Code 700850 | | | 0..1 700852 | TransportationSer-viceRequirement-Code 700854 |
| | | | | | | Additional-Transporta-tionSer-viceRe-quirement-Code 700856 | | | 0..1 700858 | TransportationSer-viceRequirement-Code 700860 |
| | | | | | | Transporta-tionCon-tractCondi-tionCode 700862 | | | 0..1 700864 | TransportationCon-tractConditionCode 700866 |
| | | | | | | Transport-Ser-viceLevel-Code 700868 | | | 0..1 700870 | TransportSer-viceLevelCode 700872 |

FIG. 70-28

| Package | level1 | level2 | level3 | level4 | level5 | level6 | level7 | level8 | Cardinality | Data Type Name |
|---|---|---|---|---|---|---|---|---|---|---|
| | | | | | | NatureOf-Cargo-Classifica-tionCode 700874 | | | 0..1 700876 | NatureOfCargo-ClassificationCode 700878 |
| TransportationUnitRe-sourceInformation 700880 | | | | Trans-porta-tionUni-tResour-ceInfor-mation 700882 | | | | | 0..n 700884 | ... |
| | | | | | ID 700886 | | | | 1 700888 | ResourceInforma-tionID 700890 |
| | | | | | Resour-ceNum-berValue 700892 | | | | 0..1 700894 | NumberValue 700896 |
| | | | | | Resour-ceID 700898 | | | | 0..1 700900 | ResourceID 702902 |

FIG. 70-29

| Package | level1 | level2 | level3 | level4 | level5 | level6 | level7 | level8 | Cardinality | Data Type Name |
|---|---|---|---|---|---|---|---|---|---|---|
| | | | | | Resource-Home-Country-Code 700904 | | | | 0..1 700906 | CountryCode 700908 |
| | | | | | Transporta-tionUnitRe-source-Category-Code 700910 | | | | 0..1 700912 | TransportationUni-tResourceCate-goryCode 700914 |
| | | | | | Transporta-tionUnitRe-sour-ceType-Code 700916 | | | | 0..1 700918 | TransportationUni-tResourceType-Code 700920 |
| | | | | | FillLevel-Code 700922 | | | | 0..1 700924 | FillLevelCode 700926 |
| | | | | | Shipping-TypeCode 700928 | | | | 0..1 700930 | ShippingTypeCode 700932 |

FIG. 70-30

| Package | level1 | level2 | level3 | level4 | level5 | level6 | level7 | level8 | Cardinality | Data Type Name |
|---|---|---|---|---|---|---|---|---|---|---|
| | | | | | HaulageArranger-Code 700934 | | | | 0..1 700936 | HaulageArranger-Code 700938 |
| | | | | | TransportationHandlingInstruction-Code 700940 | | | | 0..1 700942 | Transportation-HandlingInstructionCode 700944 |
| | | | | | TransportationHandlingInstruction-Note 700946 | | | | 0..1 700948 | LONG_Note 700950 |
| | | | | | Transportation-StageAssignment 700952 | | | | 0..n 700954 | ... |

FIG. 70-31

| Package | level1 | level2 | level3 | level4 | level5 | level6 | level7 | level8 | Cardinality | Data Type Name |
|---|---|---|---|---|---|---|---|---|---|---|
| | | | | | | TransportationBookingRequestTransportationStageID 700956 | | | 1 700958 | TransportationStageID 700960 |
| | | | | | Quantity 700962 | | | | 0..n 700964 | ... |
| | | | | | | Quantity 700966 | | | 1 700968 | Quantity 700970 |
| | | | | | | RoleCode 700972 | | | 0..1 700974 | QuantityRoleCode 700976 |
| | | | | | | TypeCode 700978 | | | 0..1 700980 | QuantityTypeCode 700982 |
| | | | | | BusinessTransactionDocumentReference 700984 | | | | 0..n 700986 | ... |

FIG. 70-32

| Package | level1 | level2 | level3 | level4 | level5 | level6 | level7 | level8 | Cardinality | Data Type Name |
|---|---|---|---|---|---|---|---|---|---|---|
| | | | | | | Business-Transac-tionDocu-men-tReference 700988 | | | 0..1 700990 | BusinessTransac-tionDocumen-tReference 700992 |
| | | | | | | Business-Transac-tionDocu-mentRela-tionshi-pRoleCode 700994 | | | 0..1 700996 | BusinessTransac-tionDocumentRela-tionshipRoleCode 700998 |
| | | | | | | Business-Transac-tionDocu-mentRela-tionship-TypeCode 701000 | | | 0..1 701002 | BusinessTransac-tionDocumentRela-tionshipTypeCode 701004 |
| | | | | | | Transporta-tionDocu-mentType-Code 701006 | | | 0..1 701008 | Transportation-DocumentType-Code 701010 |

FIG. 70-33

| Package | level1 | level2 | level3 | level4 | level5 | level6 | level7 | level8 | Cardinality | Data Type Name |
|---|---|---|---|---|---|---|---|---|---|---|
| | | | | | | Transporta-tionDocu-mentNote 701012 | | | 0..1 701014 | SHORT_Note 701016 |
| | | | | | | Transporta-tionDocu-mentID 701018 | | | 0..1 701020 | Transportation-DocumentID 701022 |
| | | | | | | DateTimeP eriod 701024 | | | 0..n 701026 | |
| | | | | | | | DateTim ePeriod 701028 | | 1 701030 | DateTimePeriod 701032 |
| | | | | | | | Pe-riodRole-Code 701034 | | 1 701036 | PeriodRoleCode 701038 |
| | | | | | TextCollec-tion 701040 | | | | 0..1 701042 | ... |
| | | | | | | TextCollec-tion 701044 | | | 1 701046 | TextCollection 701048 |

FIG. 70-34

| Package | level1 | level2 | level3 | level4 | level5 | level6 | level7 | level8 | Cardinality | Data Type Name |
|---|---|---|---|---|---|---|---|---|---|---|
| | | | | | Location 701050 | | | | 0..n 701052 | ... |
| | | | | | | Location 701054 | | | 1 701056 | BusinessTransactionDocumentLocation 701058 |
| | | | | | | RoleCode 701060 | | | 1 701062 | LocationRoleCode 701064 |
| | | | | | | TypeCode 701066 | | | 0..1 701068 | LocationTypeCode 701070 |
| | | | | | | Name 701072 | | | 0..1 701074 | MEDIUM_Name 701076 |
| | | | | | | DateTimePeriods 701078 | | | 0..n 701080 | ... |
| | | | | | | | RequestedFulfillmentPeriod 701082 | | 0..1 701084 | DateTimePeriod 701086 |

FIG. 70-35

| Package | level1 | level2 | level3 | level4 | level5 | level6 | level7 | level8 | Cardinality | Data Type Name |
|---|---|---|---|---|---|---|---|---|---|---|
| | | | | | | | AcceptableFulfillmentPeriod 701088 | | 0..1 701090 | DateTimePeriod 701092 |
| | | | | | | | PeriodRoleCode 701094 | | 1 701096 | PeriodRoleCode 701098 |
| | | | | | DangerousGoods 701100 | | | | 0..n 701102 | |
| | | | | | | ID 701104 | | | 0..1 701106 | DangerousGoodsID 701108 |
| | | | | | | RegulationsCode 701110 | | | 0..1 701112 | DangerousGoodsRegulationsCode 701114 |
| | | | | | | HazardCode 701116 | | | 0..1 701118 | DangerousGoodsHazardCode 701120 |
| | | | | | | FlashpointMeasureInterval 701122 | | | 0..1 701124 | MeasureInterval 701126 |

FIG. 70-36

| Package | level1 | level2 | level3 | level4 | level5 | level6 | level7 | level8 | Cardinality | Data Type Name |
|---|---|---|---|---|---|---|---|---|---|---|
| | | | | | | Packag-ingGroup-Code 701128 | | | 0..1 701130 | Dangerous-GoodsPackaging-GroupCode 701132 |
| | | | | | | Emergen-cySchedule 701134 | | | 0..1 701136 | DangerousGood-sEmergency-Schedule 701138 |
| | | | | | | Transpor-tEmer-gency-CardCode 701140 | | | 0..1 701142 | TransportEmer-gencyCardCode 701144 |
| | | | | | | Danger-ousGood-sLabel-Code 701146 | | | 0..1 701148 | DangerousGood-sLabelCode 701150 |
| | | | | | | Danger-ousGood-sLabel-Code2 701152 | | | 0..1 701154 | DangerousGood-sLabelCode 701156 |

FIG. 70-37

| Package | level1 | level2 | level3 | level4 | level5 | level6 | level7 | level8 | Cardinality | Data Type Name |
|---|---|---|---|---|---|---|---|---|---|---|
| | | | | | | DangerousGoodsLabelCode3 701158 | | | 0..1 701160 | DangerousGoodsLabelCode 701162 |
| | | | | | | PackagingInstructionTypeCode 701164 | | | 0..1 701166 | PackagingInstructionTypeCode 701168 |
| | | | | | | TransportMeansDescriptionCode 701170 | | | 0..1 701172 | TransportMeansDescriptionCode 701174 |
| | | | | | | TransportationAuthorisationCode 701176 | | | 0..1 701178 | DangerousGoodsTransportationAuthorisationCode 701180 |
| | | | | | | ContactInformation 701182 | | | 0..n 701184 | ... |

FIG. 70-38

| Package | level1 | level2 | level3 | level4 | level5 | level6 | level7 | level8 | Cardinality | Data Type Name |
|---|---|---|---|---|---|---|---|---|---|---|
| | | | | | | | Contact-Person-Function-TypeCode 701186 | | 1 701188 | ContactPerson-FunctionTypeCode 701190 |
| | | | | | | | Address 701192 | | 1 701194 | Address 701196 |
| | | | | | | TextCollection 701198 | | | 0..1 701200 | ... |
| | | | | | | | TextCollection 701202 | | 1 701204 | TextCollection 701206 |
| PackageInformation 701208 | | | | Package-Information 701210 | | | | | 0..n 701212 | ... |
| | | | | | ID 701214 | | | | 1 701216 | PackageInformationID 701218 |
| | | | | | PackageID 701220 | | | | 0..1 701222 | PackageID 701224 |

FIG. 70-39

| Package | level1 | level2 | level3 | level4 | level5 | level6 | level7 | level8 | Cardinality | Data Type Name |
|---|---|---|---|---|---|---|---|---|---|---|
| | | | | | PackageOrdinalNumberValue 701226 | | | | 0..1 701228 | OrdinalNumberValue 701230 |
| | | | | | PackageNumberValue 701232 | | | | 0..1 701234 | NumberValue 701236 |
| | | | | | PackageTypeCode 701238 | | | | 0..1 701240 | PackageTypeCode 701242 |
| | | | | | PackagingLevelCode 701244 | | | | 0..1 701246 | PackagingLevelCode 701248 |
| | | | | | PackageMarkingInstructionCode 701250 | | | | 0..1 701252 | PackageMarkingInstructionCode 701254 |
| | | | | | PredecessorPackageID 701256 | | | | 0..1 701258 | PackageID 701260 |

FIG. 70-40

| Package | level1 | level2 | level3 | level4 | level5 | level6 | level7 | level8 | Cardinality | Data Type Name |
|---|---|---|---|---|---|---|---|---|---|---|
| | | | | | ItemAssignment 701262 | | | | 0..n 701264 | … |
| | | | | | | TransportationBookingRequestItemID 701266 | | | 1 701268 | BusinessTransactionDocumentItemID 701270 |
| | | | | | | Quantity 701272 | | | 0..n 701274 | … |
| | | | | | | | Quantity 701276 | | 1 701278 | Quantity 701280 |
| | | | | | | | RoleCode 701282 | | 0..1 701284 | QuantityRoleCode 701286 |
| | | | | | | | TypeCode 701288 | | 0..1 701290 | QuantityTypeCode 701292 |
| | | | | | | BusinessTransactionDocumentReference 701294 | | | 0..n 701296 | … |

FIG. 70-41

| Package | level1 | level2 | level3 | level4 | level5 | level6 | level7 | level8 | Cardinality | Data Type Name |
|---|---|---|---|---|---|---|---|---|---|---|
| | | | | | | | BusinessTransaction-DocumentReference 701298 | | 0..1 701300 | BusinessTransactionDocumentReference 701302 |
| | | | | | | | BusinessTransaction-DocumentRelationshipRoleCode 701304 | | 0..1 701306 | BusinessTransactionDocumentRelationshipRoleCode 701308 |
| | | | | | | | BusinessTransaction-DocumentRelationshipType Code 701310 | | 0..1 701312 | BusinessTransactionDocumentRelationshipTypeCode 701314 |

FIG. 70-42

| Package | level1 | level2 | level3 | level4 | level5 | level6 | level7 | level8 | Cardinality | Data Type Name |
|---|---|---|---|---|---|---|---|---|---|---|
| | | | | | | | Trans-portation-DocumentType-Code 701316 | | 0..1 701318 | Transportation-DocumentType-Code 701320 |
| | | | | | | | Trans-portation-DocumentNote 701322 | | 0..1 701324 | SHORT_Note 701326 |
| | | | | | | | Trans-portation-DocumentID 701328 | | 0..1 701330 | Transportation-DocumentID 701332 |
| | | | | | | | DateTimePeriod 701334 | | 0..n 701336 | ... |
| | | | | | | | | DateTimePeriod 701338 | 1 701340 | DateTimePeriod 701342 |

FIG. 70-43

| Package | level1 | level2 | level3 | level4 | level5 | level6 | level7 | level8 | Cardinality | Data Type Name |
|---|---|---|---|---|---|---|---|---|---|---|
| | | | | | | | | PeriodRoleCode 701344 | 1 701346 | PeriodRoleCode 701348 |
| | | | | | | TransportationGoodsIdentification 701350 | | | 0..n 701352 | ... |
| | | | | | | | TransportationGoodsIdentifierTypeCode 701354 | | 1 701356 | TransportationGoodsIdentifierTypeCode 701358 |
| | | | | | | | LowerBoundaryTransportationGoodsID 701360 | | 0..1 701362 | TransportationGoodsID 701364 |

FIG. 70-44

| Package | level1 | level2 | level3 | level4 | level5 | level6 | level7 | level8 | Cardinality | Data Type Name |
|---|---|---|---|---|---|---|---|---|---|---|
| | | | | | | | Upper-Boundary Transportation-GoodsID 701366 | | 0..1 701368 | Transportation-GoodsID 701370 |
| | | | | | TransportationUnitResourceInformationAssignment 701372 | | | | 0..n 701374 | ... |
| | | | | | | TransportationBookingRequestResourceInformationID 701376 | | | 1 701378 | ResourceInformationID 701380 |
| | | | | | | Quantity 701382 | | | 0..n 701384 | ... |
| | | | | | | | Quantity 701386 | | 1 701388 | Quantity 701390 |

FIG. 70-45

| Package | level1 | level2 | level3 | level4 | level5 | level6 | level7 | level8 | Cardinality | Data Type Name |
|---|---|---|---|---|---|---|---|---|---|---|
| | | | | | | | Role-Code 701392 | | 0..1 701394 | QuantityRoleCode 701396 |
| | | | | | | | Type-Code 701398 | | 0..1 701400 | QuantityTypeCode 701402 |
| | | | | | Quantity 701404 | | | | 0..n 701406 | ... |
| | | | | | | Quantity 701408 | | | 1 701410 | Quantity 701412 |
| | | | | | | RoleCode 701414 | | | 0..1 701416 | QuantityRoleCode 701418 |
| | | | | | | TypeCode 701420 | | | 0..1 701422 | QuantityTypeCode 701424 |
| | | | | | TextCollec-tion 701426 | | | | 0..1 701428 | ... |
| | | | | | | TextCollec-tion 701430 | | | 1 701432 | TextCollection 701434 |

FIG. 70-46

| Package | level1 | level2 | level3 | level4 | level5 | level6 | level7 | level8 | Cardinality | Data Type Name |
|---|---|---|---|---|---|---|---|---|---|---|
| Item 701436 | | | Item 701438 | | | | | | 0..n 701440 | ... |
| | | | | ID 701442 | | | | | 1 701444 | BusinessTransactionDocumentItemID 701446 |
| | | | | OriginCountryCode 701448 | | | | | 0..1 701450 | CountryCode 701452 |
| | | | | DestinationCountryCode 701454 | | | | | 0..1 701456 | CountryCode 701458 |
| | | | | ShippingTypeCode 701460 | | | | | 0..1 701462 | ShippingTypeCode 701464 |
| | | | | HaulageArrangerCode 701466 | | | | | 0..1 701468 | HaulageArrangerCode 701470 |

FIG. 70-47

| Package | level1 | level2 | level3 | level4 | level5 | level6 | level7 | level8 | Cardinality | Data Type Name |
|---|---|---|---|---|---|---|---|---|---|---|
| | | | | Temperature-Measure-Interval 701472 | | | | | 0..1 701474 | MeasureInterval 701476 |
| | | | | Transporta-tionHan-dlingIn-struc-tionCode 701478 | | | | | 0..1 701480 | Transportation-HandlingInstruc-tionCode 701482 |
| | | | | Transporta-tionHan-dlingIn-struc-tionNote 701484 | | | | | 0..1 701486 | LONG_Note 701488 |
| ItemInformation 701490 | | | | Amount 701492 | | | | | 0..n 701494 | ... |
| | | | | | Amount 701496 | | | | 1 701498 | Amount 701500 |
| | | | | | RoleCode 701502 | | | | 1 701504 | AmountRoleCode 701506 |

FIG. 70-48

| Package | level1 | level2 | level3 | level4 | level5 | level6 | level7 | level8 | Cardinality | Data Type Name |
|---|---|---|---|---|---|---|---|---|---|---|
| | | | | TextCol-lection 701508 | | | | | 0..1 701510 | ... |
| | | | | | TextCollec-tion 701512 | | | | 1 701514 | TextCollection 701516 |
| | | | | NatureOf Cargo 701518 | | | | | 0..n 701520 | ... |
| | | | | | Classifica-tionCode 701522 | | | | 1 701524 | NatureOfCargo-ClassificationCode 701526 |
| | | | | Quantity 701528 | | | | | 0..n 701530 | ... |
| | | | | | Quantity 701532 | | | | 1 701534 | Quantity 701536 |
| | | | | | RoleCode 701538 | | | | 0..1 701540 | QuantityRoleCode 701542 |
| | | | | | TypeCode 701544 | | | | 0..1 701546 | QuantityTypeCode 701548 |

FIG. 70-49

| Package | level1 | level2 | level3 | level4 | level5 | level6 | level7 | level8 | Cardinality | Data Type Name |
|---|---|---|---|---|---|---|---|---|---|---|
| | | | | Trans-porta-tionDocu-mentIn-formation 701550 | | | | | 0..n 701552 | ... |
| | | | | | Transporta-tionDocu-mentType-Code 701554 | | | | 0..1 701556 | Transportation-DocumentType-Code 701558 |
| | | | | | Transporta-tionDocu-mentNote 701560 | | | | 0..1 701562 | SHORT_Note 701564 |
| | | | | | Transporta-tionDocu-mentID 701566 | | | | 0..1 701568 | Transportation-DocumentID 701570 |
| | | | | | Transporta-tionDocu-mentStatus Code 701572 | | | | 0..1 701574 | Transportation-DocumentStatus-Code 701576 |

FIG. 70-50

| Package | level1 | level2 | level3 | level4 | level5 | level6 | level7 | level8 | Cardinality | Data Type Name |
|---|---|---|---|---|---|---|---|---|---|---|
| | | | | | Language-Code 701578 | | | | 0..1 701580 | LanguageCode 701582 |
| | | | | | Communi-cationMe-diumType-Code 701584 | | | | 0..1 701586 | Communication-MediumTypeCode 701588 |
| | | | | | Required-indicator 701590 | | | | 1 701592 | Indicator 701594 |
| | | | | | Output-CopyNum-berValue 701596 | | | | 0..1 701598 | NumberValue 701600 |
| | | | | | OutputOrigi nalNum-berValue 701602 | | | | 0..1 701604 | NumberValue 701606 |
| | | | | | DateTimeP eriod 701608 | | | | 0..n 701610 | ... |

FIG. 70-51

| Package | level1 | level2 | level3 | level4 | level5 | level6 | level7 | level8 | Cardinality | Data Type Name |
|---|---|---|---|---|---|---|---|---|---|---|
| | | | | | | DateTimePeriod 701612 | | | 1 701614 | DateTimePeriod 701616 |
| | | | | | | PeriodRoleCode 701618 | | | 1 701620 | PeriodRoleCode 701622 |
| | | | | BusinessTransactionDocumentReference 701624 | | | | | 0..n 701626 | ... |
| | | | | | BusinessTransactionDocumentReference 701628 | | | | 0..1 701630 | BusinessTransactionDocumentReference 701632 |

FIG. 70-52

| Package | level1 | level2 | level3 | level4 | level5 | level6 | level7 | level8 | Cardinality | Data Type Name |
|---|---|---|---|---|---|---|---|---|---|---|
| | | | | | Business-Transac-tionDocu-mentRela-tionshi-pRoleCode 701634 | | | | 0..1 701636 | BusinessTransac-tionDocumentRela-tionshipRoleCode 701638 |
| | | | | | Business-Transac-tionDocu-mentRela-tionship-TypeCode 701640 | | | | 0..1 701642 | BusinessTransac-tionDocumentRela-tionshipTypeCode 701644 |
| | | | | | Transporta-tionDocu-mentType-Code 701646 | | | | 0..1 701648 | Transportation-DocumentType-Code 701650 |
| | | | | | Transporta-tionDocu-mentNote 701652 | | | | 0..1 701654 | SHORT_Note 701656 |
| | | | | | Transporta-tionDocu-mentID 701658 | | | | 0..1 701660 | Transportation-DocumentID 701662 |

FIG. 70-53

| Package | level1 | level2 | level3 | level4 | level5 | level6 | level7 | level8 | Cardinality | Data Type Name |
|---|---|---|---|---|---|---|---|---|---|---|
| | | | | | DateTimePeriod 701664 | | | | 0..n 701666 | ... |
| | | | | | | DateTimePeriod 701668 | | | 1 701670 | DateTimePeriod 701672 |
| | | | | | | PeriodRoleCode 701674 | | | 1 701676 | PeriodRoleCode 701678 |
| | | | | Dangerous-Goods 701680 | | | | | 0..n 701682 | ... |
| | | | | | ID 701684 | | | | 0..1 701686 | DangerousGoodsID 701688 |
| | | | | | RegulationsCode 701690 | | | | 0..1 701692 | DangerousGoods-RegulationsCode 701694 |
| | | | | | Hazard-Code 701696 | | | | 0..1 701698 | DangerousGoodsHazardCode 701700 |

FIG. 70-54

| Package | level1 | level2 | level3 | level4 | level5 | level6 | level7 | level8 | Cardinality | Data Type Name |
|---|---|---|---|---|---|---|---|---|---|---|
| | | | | | Flash-pointMeas-ureInterval 701702 | | | | 0..1 701704 | MeasureInterval 701706 |
| | | | | | Packag-ingGroup-Code 701708 | | | | 0..1 701710 | Dangerous-GoodsPackaging-GroupCode 701712 |
| | | | | | Emergen-cySchedule 701714 | | | | 0..1 701716 | DangerousGood-sEmergency-Schedule 701718 |
| | | | | | Transpor-tEmer-gency-CardCode 701720 | | | | 0..1 701722 | TransportEmer-gencyCardCode 701724 |
| | | | | | Danger-ousGood-sLabel-Code 701726 | | | | 0..1 701728 | DangerousGood-sLabelCode 701730 |

FIG. 70-55

| Package | level1 | level2 | level3 | level4 | level5 | level6 | level7 | level8 | Cardinality | Data Type Name |
|---|---|---|---|---|---|---|---|---|---|---|
| | | | | | Danger-ousGood-sLabel-Code2 701732 | | | | 0..1 701734 | DangerousGood-sLabelCode 701736 |
| | | | | | Danger-ousGood-sLabel-Code3 701738 | | | | 0..1 701740 | DangerousGood-sLabelCode 701742 |
| | | | | | PackingIn-struction-TypeCode 701744 | | | | 0..1 701746 | PackingInstruction-TypeCode 701748 |
| | | | | | Transport-MeansDe-scription-Code 701750 | | | | 0..1 701752 | TransportMeans-DescriptionCode 701754 |
| | | | | | Transporta-tionAu-thorisa-tionCode 701756 | | | | 0..1 701758 | DangerousGood-sTransportationAu-thorisationCode 701760 |

FIG. 70-56

| Package | level1 | level2 | level3 | level4 | level5 | level6 | level7 | level8 | Cardinality | Data Type Name |
|---|---|---|---|---|---|---|---|---|---|---|
| | | | | | ContactIn-formation 701762 | | | | 0..n 701764 | ... |
| | | | | | | Contact-Person-Function-TypeCode 701766 | | | 1 701768 | ContactPerson-FunctionTypeCode 701770 |
| | | | | | | Address 701772 | | | 1 701774 | Address 701776 |
| | | | | | Quantity 701778 | | | | 0..n 701780 | ... |
| | | | | | | Quantity 701782 | | | 1 701784 | Quantity 701786 |
| | | | | | | RoleCode 701788 | | | 0..1 701790 | QuantityRoleCode 701792 |
| | | | | | | TypeCode 701794 | | | 0..1 701796 | QuantityTypeCode 701798 |
| | | | | | TextCollec-tion 701800 | | | | 0..1 701802 | ... |

FIG. 70-57

| Package | level1 | level2 | level3 | level4 | level5 | level6 | level7 | level8 | Cardinality | Data Type Name |
|---|---|---|---|---|---|---|---|---|---|---|
| | | | | | | TextCollection 701804 | | | 1 701806 | TextCollection 701808 |
| | | | | | TransportationUnitResourceInformationAssignment 701810 | | | | 0..n 701812 | ... |
| | | | | | | TransportationBookingRequestResourceInformationID 701814 | | | 1 701816 | ResourceInformationID 701818 |
| | | | | | | Quantity 701820 | | | 0..n 701822 | ... |
| | | | | | | | Quantity 701824 | | 1 701826 | Quantity 701828 |
| | | | | | | | RoleCode 701830 | | 0..1 701832 | QuantityRoleCode 701834 |

FIG. 70-58

| Package | level1 | level2 | level3 | level4 | level5 | level6 | level7 | level8 | Cardinality | Data Type Name |
|---|---|---|---|---|---|---|---|---|---|---|
| | | | | | | | Type-Code 701836 | | 0..1 701838 | QuantityTypeCode 701840 |
| | | | | Trans-porta-tionStage As-signment 701842 | | | | | 0..n 701844 | ... |
| | | | | | Transporta-tionBook-ingRequest Transporta-tion-StageID 701846 | | | | 1 701848 | Transportation-StageID 701850 |
| | | | | | Quantity 701852 | | | | 0..n 701854 | ... |
| | | | | | | Quantity 701856 | | | 1 701858 | Quantity 701860 |
| | | | | | | RoleCode 701862 | | | 0..1 701864 | QuantityRoleCode 701866 |
| | | | | | | TypeCode 701868 | | | 0..1 701870 | QuantityTypeCode 701872 |

FIG. 70-59

| Package | level1 | level2 | level3 | level4 | level5 | level6 | level7 | level8 | Cardinality | Data Type Name |
|---|---|---|---|---|---|---|---|---|---|---|
| | | | | Trans-porta-tionUni-tResour-ceInfor-mationAs signment 701874 | | | | | 0..n 701876 | ... |
| | | | | | Transporta-tionBook-ingRe-questRe-sourceIn-formationID 701878 | | | | 1 701880 | ResourceInforma-tionID 701882 |
| | | | | | Quantity 701884 | | | | 0..n 701886 | ... |
| | | | | | | Quantity 701888 | | | 1 701890 | Quantity 701892 |
| | | | | | | RoleCode 701894 | | | 0..1 701896 | QuantityRoleCode 701898 |
| | | | | | | TypeCode 701900 | | | 0..1 701902 | QuantityTypeCode 701904 |

FIG. 70-60

| Package | level1 | level2 | level3 | level4 | level5 | level6 | level7 | level8 | Cardinality | Data Type Name |
|---|---|---|---|---|---|---|---|---|---|---|
| PartyInformation 701906 | | | | Party 701908 | | | | | 0..n 701910 | ... |
| | | | | | Party 701912 | | | | 1 701914 | BusinessTransactionDocumentParty 701916 |
| | | | | | RoleCode 701918 | | | | 1 701920 | PartyRoleCode 701922 |
| | | | | | FormattedName 701924 | | | | 0..1 701926 | LONG_Name 701928 |
| | | | | | DateTimePeriods 701930 | | | | 0..n 701932 | ... |
| | | | | | | RequestedFulfillmentPeriod 701934 | | | 0..1 701936 | DateTimePeriod 701938 |
| | | | | | | AcceptableFulfillmentPeriod 701940 | | | 0..1 701942 | DateTimePeriod 701944 |

FIG. 70-61

| Package | level1 | level2 | level3 | level4 | level5 | level6 | level7 | level8 | Cardinality | Data Type Name |
|---|---|---|---|---|---|---|---|---|---|---|
| | | | | | | PeriodRole Code 701946 | | | 1 701948 | PeriodRoleCode 701950 |
| LocationInformation 701952 | | | | Location 701954 | | | | | 0..n 701956 | ... |
| | | | | | Location 701958 | | | | 1 701960 | BusinessTransac-tionDocumentLoca-tion 701962 |
| | | | | | RoleCode 701964 | | | | 1 701966 | LocationRoleCode 701968 |
| | | | | | TypeCode 701970 | | | | 0..1 701972 | LocationTypeCode 701974 |
| | | | | | Name 701976 | | | | 0..1 701978 | MEDIUM_Name 701980 |
| | | | | | DateTimeP eriods 701982 | | | | 0..n 701984 | ... |
| | | | | | | Request-edFulfill-mentPeriod 701986 | | | 0..1 701988 | DateTimePeriod 701990 |

FIG. 70-62

| Package | level1 | level2 | level3 | level4 | level5 | level6 | level7 | level8 | Cardinality | Data Type Name |
|---|---|---|---|---|---|---|---|---|---|---|
| | | | | | | Accept-ableFulfill-mentPeriod 701992 | | | 0..1 701994 | DateTimePeriod 701996 |
| | | | | | | PeriodRole Code 701998 | | | 1 702000 | PeriodRoleCode 702002 |
| Transportation-GoodsInformation 702004 | | | | Product-Informa-tion 702006 | | | | | 0..n 702008 | ... |
| | | | | | Product 702010 | | | | 0..1 702012 | BusinessTransac-tionDocumentPro-duct 702014 |
| | | | | | Product-Description 702016 | | | | 0..1 702018 | SHORT_Descrip-tion 702020 |
| | | | | Trans-porta-tionGood sI-dentifica-tion 702022 | | | | | 0..n 702024 | ... |

FIG. 70-63

| Package | level1 | level2 | level3 | level4 | level5 | level6 | level7 | level8 | Cardinality | Data Type Name |
|---|---|---|---|---|---|---|---|---|---|---|
| | | | | | Transporta-tionGood-sIdentifier-TypeCode 702026 | | | | 1 702028 | Transportation-GoodsIdentifier-TypeCode 702030 |
| | | | | | Lower-Boundary-Transporta-tionGood-sID 702032 | | | | 1 702034 | Transportation-GoodsID 702036 |
| | | | | | Upper-Boundary-Transporta-tionGood-sID 702038 | | | | 0..1 702040 | Transportation-GoodsID 702042 |

FIG. 70-64

| Package | level1 | level2 | level3 | level4 | level5 | level6 | level7 | level8 | Cardinality | Data Type Name |
|---|---|---|---|---|---|---|---|---|---|---|
| Transportation-ChargesInformation 702044 | | | Trans-portation-ChargesInforma-tion 702046 | | | | | | 0..n 702048 | ... |
| | | | | Trans-portation-Charge-sUsage-Code 702050 | | | | | 1 702052 | Transportation-ChargesUsage-Code 702054 |
| | | | | Trans-porta-tionBook-ingRe-ques-tItemID 702056 | | | | | 0..1 702058 | BusinessTransac-tionDocumen-tItemID 702060 |

FIG. 70-65

| Package | level1 | level2 | level3 | level4 | level5 | level6 | level7 | level8 | Cardinality | Data Type Name |
|---|---|---|---|---|---|---|---|---|---|---|
| | | | | Trans-porta-tionBook-ingRe-questPartyStan-dardID 702062 | | | | | 0..1 702064 | PartyStandardID 702066 |
| | | | | Trans-porta-tionBook-ingRe-quest-Party-Inter-nalID 702068 | | | | | 0,,1 702070 | PartyInternalID 702072 |
| | | | | Trans-porta-tionBook-ingRe-questRe-sourceIn-forma-tionID 702074 | | | | | 0..1 702076 | ResourceInforma-tionID 702078 |

FIG. 70-66

| Package | level1 | level2 | level3 | level4 | level5 | level6 | level7 | level8 | Cardinality | Data Type Name |
|---|---|---|---|---|---|---|---|---|---|---|
| | | | | TransportationBookingRequest-Package-InformationID 702080 | | | | | 0..1 702082 | PackageInformationID 702084 |
| | | | | TransportationBookingRequest-Transportation-StageID 702086 | | | | | 0..1 702088 | Transportation-StageID 702090 |
| | | | | Transportation-Charges 702092 | | | | | 0..1 702094 | ... |
| | | | | | ID 702096 | | | | 1 702098 | Transportation-ChargesID 702100 |

FIG. 70-67

| Package | level1 | level2 | level3 | level4 | level5 | level6 | level7 | level8 | Cardinality | Data Type Name |
|---|---|---|---|---|---|---|---|---|---|---|
| | | | | | FreightA-greemen-tID 702102 | | | | 1 702104 | FreightAgreemen-tID 702106 |
| | | | | | OriginCode 702108 | | | | 0..1 702110 | Transportation-ChargesOrigin-Code 702112 |
| | | | | | TariffID 702114 | | | | 0..1 702116 | Transportation-ChargesTariffID 702118 |
| | | | | | Calculation SheetID 702120 | | | | 1 702122 | Transportation-ChargesCalcula-tionSheetID 702124 |
| | | | | | Location 702126 | | | | 0..n 702128 | ... |
| | | | | | | Location 702130 | | | 1 702132 | BusinessTransac-tionDocumentLoca-tion 702134 |
| | | | | | | RoleCode 702136 | | | 1 702138 | LoactionRoleCode 702140 |

FIG. 70-68

| Package | level1 | level2 | level3 | level4 | level5 | level6 | level7 | level8 | Cardinality | Data Type Name |
|---|---|---|---|---|---|---|---|---|---|---|
| | | | | | | TypeCode 702142 | | | 0..1 702144 | LocationTypeCode 702146 |
| | | | | | | Name 702148 | | | 0..1 702150 | MEDIUM_Name 702152 |
| | | | | | | DateTimePeriods 702154 | | | 0..n 702156 | ... |
| | | | | | | | RequestedFulfillmentPeriod 702158 | | 0..1 702160 | DateTimePeriod 702162 |
| | | | | | | | AcceptableFulfillmentPeriod 702164 | | 0..1 702166 | DateTimePeriod 702168 |
| | | | | | | | PeriodRoleCode 702170 | | 1 702172 | PeriodRoleCode 702174 |
| | | | | | TextCollection 702176 | | | | 0..1 702178 | ... |

FIG. 70-69

| Package | level1 | level2 | level3 | level4 | level5 | level6 | level7 | level8 | Cardinality | Data Type Name |
|---|---|---|---|---|---|---|---|---|---|---|
| | | | | | | TextCollec-tion 702180 | | | 1 702182 | TextCollection 702184 |
| | | | | | Currency 702186 | | | | 0..n 702188 | ... |
| | | | | | | Code 702190 | | | 1 702192 | CurrencyCode 702194 |
| | | | | | | RoleCode 702196 | | | 1 702198 | CurrencyRoleCode 702200 |
| | | | | | | Usage-Code 702202 | | | 0..1 702204 | CurrencyUsage-Code 702206 |
| | | | | | ExchangeR ate 702208 | | | | 0..n 702210 | ... |
| | | | | | | ExchangeR ate 702212 | | | 1 702214 | ExchangeRate 702216 |
| | | | | | | TypeCode 702218 | | | 0..1 702220 | ExchangeR-ateTypeCode 702222 |

FIG. 70-70

| Package | level1 | level2 | level3 | level4 | level5 | level6 | level7 | level8 | Cardinality | Data Type Name |
|---|---|---|---|---|---|---|---|---|---|---|
| | | | | | Percen-tElement 702224 | | | | 0..n 702226 | ... |
| | | | | | | Percen-tRoleCode 702228 | | | 1 702230 | PercentRoleCode 702232 |
| | | | | | | Percent 702234 | | | 1 702236 | Percent 702238 |
| | | | | | | Transporta-tion-Charges-Percent-Calcula-tionBase-Code 702240 | | | 0..1 702242 | Transportation-ChargesPercent-CalculationBase-Code 702244 |
| | | | | | | Status-Code 702246 | | | 0..1 702248 | Transportation-ChargesPercen-tElementStatus-Code 702250 |
| | | | | | DateTimeP eriod 702252 | | | | 0..n 702254 | ... |

FIG. 70-71

| Package | level1 | level2 | level3 | level4 | level5 | level6 | level7 | level8 | Cardinality | Data Type Name |
|---|---|---|---|---|---|---|---|---|---|---|
| | | | | | | DateTimePeriod 702256 | | | 1 702258 | DateTimePeriod 702260 |
| | | | | | | PeriodRoleCode 702262 | | | 1 702264 | PeriodRoleCode 702266 |
| | | | | | BusinessTransactionDocumentReference 702268 | | | | 0..n 702270 | ... |
| | | | | | | BusinessTransactionDocumentReference 702272 | | | 0..1 702274 | BusinessTransactionDocumentReference 702276 |
| | | | | | | BusinessTransactionDocumentRelationshipRoleCode 702278 | | | 0..1 702280 | BusinessTransactionDocumentRelationshipRoleCode 702282 |

FIG. 70-72

| Package | level1 | level2 | level3 | level4 | level5 | level6 | level7 | level8 | Cardinality | Data Type Name |
|---|---|---|---|---|---|---|---|---|---|---|
| | | | | | | Business-Transac-tionDocu-mentRela-tionship-TypeCode 702284 | | | 0..1 702286 | BusinessTransac-tionDocumentRela-tionshipTypeCode 702288 |
| | | | | | | Transporta-tionDocu-mentType-Code 702290 | | | 0..1 702292 | Transportation-DocumentType-Code 702294 |
| | | | | | | Transporta-tionDocu-mentNote 702296 | | | 0..1 702298 | SHORT_Note 702300 |
| | | | | | | Transporta-tionDocu-mentID 702302 | | | 0..1 702304 | Transportation-DocumentID 702306 |
| | | | | | TaxDetail 702308 | | | | 0..n 702310 | ... |
| | | | | | | ProductTax 702312 | | | 1 702314 | ProductTax 702316 |

FIG. 70-73

| Package | level1 | level2 | level3 | level4 | level5 | level6 | level7 | level8 | Cardinality | Data Type Name |
|---|---|---|---|---|---|---|---|---|---|---|
| | | | | | Pay-mentInstru ction 702318 | | | | 0..n 702320 | ... |
| | | | | | | Pay-mentInstru ction 702322 | | | 1 702324 | PaymentInstruction 702326 |
| | | | | | | Transporta-tion-ChargesE-lement-Category-Code 702328 | | | 0..1 702330 | Transportation-ChargesElement-CategoryCode 702332 |
| | | | | | | Transporta-tion-ChargesE-lementSub-Category-Code 702334 | | | 0..1 702336 | Transportation-ChargesEle-mentSubCategory-Code 702338 |

FIG. 70-74

| Package | level1 | level2 | level3 | level4 | level5 | level6 | level7 | level8 | Cardinality | Data Type Name |
|---|---|---|---|---|---|---|---|---|---|---|
| | | | | | | Transportation-ChargesPaymentArrangementCode 702340 | | | 0..1 702342 | Transportation-ChargesPaymentArrangementCode 702344 |
| | | | | | CashDiscount-Terms 702346 | | | | 0..1 702348 | ... |
| | | | | | | CashDiscount-Terms 702350 | | | 1 702352 | CashDiscount-Terms 702354 |
| | | | | | | Transportation-ChargesElement-Category-Code 702356 | | | 0..1 702358 | Transportation-ChargesElement-CategoryCode 702360 |

FIG. 70-75

| Package | level1 | level2 | level3 | level4 | level5 | level6 | level7 | level8 | Cardinality | Data Type Name |
|---|---|---|---|---|---|---|---|---|---|---|
| | | | | | | Transportation-ChargesElementSub-Category-Code 702362 | | | 0..1 702364 | Transportation-ChargesElementSubCategory-Code 702366 |
| | | | | | Element 702368 | | | | 0..n 702370 | ... |
| | | | | | | Category-Code 702372 | | | 1 702374 | Transportation-ChargesElement-CategoryCode 702376 |
| | | | | | | SubCate-goryCode 702378 | | | 1 702380 | Transportation-ChargesElementSubCategory-Code 702382 |
| | | | | | | TypeCode 702384 | | | 1 702386 | Transportation-ChargesElement-TypeCode 702388 |

FIG. 70-76

| Package | level1 | level2 | level3 | level4 | level5 | level6 | level7 | level8 | Cardinality | Data Type Name |
|---|---|---|---|---|---|---|---|---|---|---|
| | | | | | | CalculationResolutionCode 702390 | | | 1 702392 | TransportationChargesElementCalculationResolutionCode 702394 |
| | | | | | | TransportationChargesPaymentArrangementCode 702396 | | | 0...1 702398 | TransportationChargesPaymentArrangementCode 702400 |
| | | | | | | Location 702402 | | | 0..n 702404 | ... |
| | | | | | | | Location 702406 | | 1 702408 | BusinessTransactionDocumentLocation 702410 |
| | | | | | | | RoleCode 702412 | | 1 702414 | LocationRoleCode 702416 |
| | | | | | | | TypeCode 702418 | | 0..1 702420 | LocationTypeCode 702422 |

FIG. 70-77

| Package | level1 | level2 | level3 | level4 | level5 | level6 | level7 | level8 | Cardinality | Data Type Name |
|---|---|---|---|---|---|---|---|---|---|---|
| | | | | | | | Name 702424 | | 0..1 702426 | MEDIUM_Name 702428 |
| | | | | | | | DateTimePeriods 702430 | | 0..n 702432 | ... |
| | | | | | | | | RequestedFulfillmentPeriod 702434 | 0..1 702436 | DateTimePeriod 702438 |
| | | | | | | | | AcceptableFulfillmentPeriod 702440 | 0..1 702442 | DateTimePeriod 702444 |
| | | | | | | | | PeriodRoleCode 702446 | 1 702448 | PeriodRoleCode 702450 |
| | | | | | | TextCollection 702452 | | | 0..1 702454 | ... |
| | | | | | | | TextCollection 702456 | | 1 702458 | TextCollection 702460 |

FIG. 70-78

| Package | level1 | level2 | level3 | level4 | level5 | level6 | level7 | level8 | Cardinality | Data Type Name |
|---|---|---|---|---|---|---|---|---|---|---|
| | | | | | | Currency 702462 | | | 0..n 702464 | ... |
| | | | | | | | Code 702466 | | 1 702468 | CurrencyCode 702470 |
| | | | | | | | Role-Code 702472 | | 1 702474 | CurrencyRoleCode 702476 |
| | | | | | | | Usage-Code 702478 | | 0..1 702480 | CurrencyUsage-Code 702482 |
| | | | | | | RateEle-ment 702484 | | | 0..n 702486 | ... |
| | | | | | | | ID 702488 | | 1 702490 | Transportation-ChargesElemen-tRateElementID 702492 |
| | | | | | | | Amount 702494 | | 1 702496 | Amount 702498 |
| | | | | | | | Base-Quantity 702500 | | 1 702502 | Quantity 702504 |

FIG. 70-79

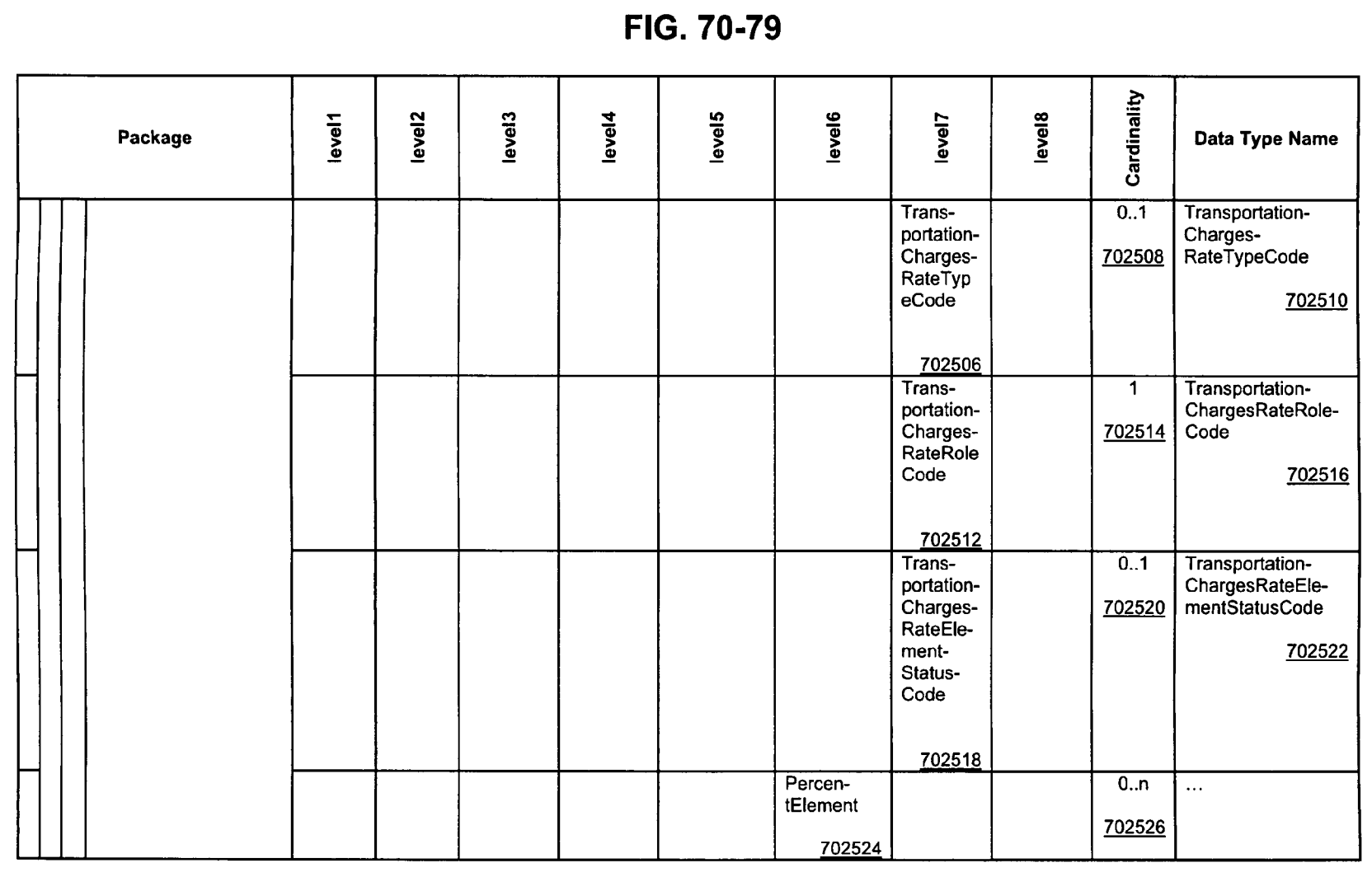

| Package | level1 | level2 | level3 | level4 | level5 | level6 | level7 | level8 | Cardinality | Data Type Name |
|---|---|---|---|---|---|---|---|---|---|---|
| | | | | | | | Trans-portation-Charges-RateTypeCode 702506 | | 0..1 702508 | Transportation-Charges-RateTypeCode 702510 |
| | | | | | | | Trans-portation-Charges-RateRole Code 702512 | | 1 702514 | Transportation-ChargesRateRole-Code 702516 |
| | | | | | | | Trans-portation-Charges-RateEle-ment-Status-Code 702518 | | 0..1 702520 | Transportation-ChargesRateEle-mentStatusCode 702522 |
| | | | | | | Percen-tElement 702524 | | | 0..n 702526 | ... |

FIG. 70-80

| Package | level1 | level2 | level3 | level4 | level5 | level6 | level7 | level8 | Cardinality | Data Type Name |
|---|---|---|---|---|---|---|---|---|---|---|
| | | | | | | | PercentRoleCode 702528 | | 1 702530 | PercentRoleCode 702532 |
| | | | | | | | Percent 702534 | | 1 702536 | Percent 702538 |
| | | | | | | | TransportationChargesPercentCalculationBaseCode 702540 | | 0..1 702542 | TransportationChargesPercentCalculationBaseCode 702544 |
| | | | | | | | StatusCode 702546 | | 0..1 702548 | TransportationChargesPercentElementStatusCode 702550 |
| | | | | | | AmountElement 702552 | | | 0..n 702554 | ... |
| | | | | | | | Amount 702556 | | 1 702558 | Amount 702560 |

FIG. 70-81

| Package | level1 | level2 | level3 | level4 | level5 | level6 | level7 | level8 | Cardinality | Data Type Name |
|---|---|---|---|---|---|---|---|---|---|---|
| | | | | | | | Amoun-tRole-Code 702562 | | 1 702564 | AmountRoleCode 702566 |
| | | | | | | | Trans-portation-Charge-sAmoun-tEle-mentStat usCode 702568 | | 0..1 702570 | Transportation-ChargesAmoun-tElementStatus-Code 702572 |
| | | | | | | | RateEle-mentIAs-signment 702574 | | 0..n 702576 | ... |
| | | | | | | | | Trans-portation-Charge-sElemen-tRateEle-mentID 702578 | 1 702580 | Transportation-ChargesElemen-tRateElementID 702582 |

FIG. 70-82

| Package | level1 | level2 | level3 | level4 | level5 | level6 | level7 | level8 | Cardinality | Data Type Name |
|---|---|---|---|---|---|---|---|---|---|---|
| | | | | | | Calcula-tionBase 702584 | | | 0..n 702586 | ... |
| | | | | | | | Trans-portation-Charge-sEle-mentCal-culation-Base-Code 702588 | | 1 702590 | Transportation-ChargesElement-CalculationBase-Code 702592 |
| | | | | | | | Base-Quantity 702594 | | 0..1 702596 | Quantity 702598 |
| | | | | | | | Base-Quanti-tyRole-Code 702600 | | 0..1 702602 | QuantityRoleCode 702604 |
| | | | | | | | Base-Quanti-tyType-Code 702606 | | 0..1 702608 | QuantityTypeCode 702610 |

FIG. 70-83

| Package | level1 | level2 | level3 | level4 | level5 | level6 | level7 | level8 | Cardinality | Data Type Name |
|---|---|---|---|---|---|---|---|---|---|---|
| | | | | | | TaxDetail 702612 | | | 0..n 702614 | ... |
| | | | | | | | Pro-ductTax 702616 | | 1 702618 | ProductTax 702620 |
| | | | | | | DateTimeP eriod 702622 | | | 0..n 702624 | ... |
| | | | | | | | DateTim ePeriod 702626 | | 1 702628 | DateTimePeriod 702630 |
| | | | | | | | Pe-riodRole-Code 702632 | | 1 702634 | PeriodRoleCode 702636 |
| | | | | | | CostDis-tribution 702638 | | | 0..n 702640 | ... |
| | | | | | | | Account-ingCod-ingBlock-Assign-ment 702642 | | 1 702644 | AccountingCod-ingBlockAssign-ment 702646 |

FIG. 71-1

| Package | level1 | level2 | level3 | level4 | level5 | level6 | Cardinality | Data Type Name |
|---|---|---|---|---|---|---|---|---|
| TransportationBookingRequestConfirmationReceiptNotificationMessage 71000 | TransportationBookingRequestConfirmationReceiptNotificationMessage 71002 | | | | | | | TransportationBookingRequestReceiptNotificationMessage 71004 |
| MessageHeader 71006 | | MessageHeader 71008 | | | | | 1 71010 | BusinessDocumentMessageHeader 71012 |
| TransportationBookingRequest 71014 | | TransportationBookingRequest 71016 | | | | | 1 71018 | ... |
| | | | ID 71020 | | | | 1 71022 | BusinessTransactionDocumentID 71024 |
| Confirmation 71026 | | | Confirmation 71028 | | | | 1 71030 | ... |

FIG. 71-2

| Package | level1 | level2 | level3 | level4 | level5 | level6 | Cardinality | Data Type Name |
|---|---|---|---|---|---|---|---|---|
| HeaderInformation 71032 | | | | DateTimePeriods 71034 | | | 0..n 71036 | ... |
| | | | | | RequestDateTimePe-riod 71038 | | 0..1 71040 | DateTimePeriod 71042 |
| | | | | | Acceptable-DateTimePeriod 71044 | | 0..1 71046 | DateTimePeriod 71048 |
| | | | | | PeriodRoleCode 71050 | | 1 71052 | PeriodRoleCode 71054 |
| | | | | TextCollection 71056 | | | 0..n 71058 | ... |
| | | | | | TextCollection 71060 | | 1 71062 | TextCollection 71064 |

FIG. 71-3

| Package | level1 | level2 | level3 | level4 | level5 | level6 | Cardinality | Data Type Name |
|---|---|---|---|---|---|---|---|---|
| | | | | BusinessTransactionDocumentReference 71066 | | | 0..n 71068 | ... |
| | | | | | BusinessTransaction-DocumentReference 71070 | | 0..1 71072 | BusinessTransaction-DocumentReference 71074 |
| | | | | | BusinessTransaction-DocumentRelationshipRoleCode 71076 | | 0..1 71078 | BusinessTransaction-DocumentRelationshipRoleCode 71080 |
| | | | | | BusinessTransaction-DocumentRelationshipTypeCode 71082 | | 0..1 71084 | BusinessTransaction-DocumentRelationshipTypeCode 71086 |
| | | | | | TransportationDocumentTypeCode 71088 | | 0..1 71090 | TransportationDocumentTypeCode 71092 |

FIG. 71-4

| Package | level1 | level2 | level3 | level4 | level5 | level6 | Cardinality | Data Type Name |
|---|---|---|---|---|---|---|---|---|
| | | | | | TransportationDocumentNote 71094 | | 0..1 71096 | SHORT_Note 71098 |
| | | | | | TransportationDocumentID 71100 | | 0..1 71102 | TransportationDocumentID 71104 |
| | | | | | DateTimePeriod 71106 | | 0..n 71108 | ... |
| | | | | | | DateTimePeriod 71110 | 1 71112 | DateTimePeriod 71114 |
| | | | | | | PeriodRoleCode 71116 | 1 71118 | PeriodRoleCode 71120 |
| PartyInformation 71122 | | | | Party 71124 | | | 1..n 71126 | ... |

FIG. 71-5

| Package | level1 | level2 | level3 | level4 | level5 | level6 | Cardinality | Data Type Name |
|---|---|---|---|---|---|---|---|---|
| | | | | | Party 71128 | | 1 71130 | BusinessTransaction-DocumentParty 71132 |
| | | | | | RoleCode 71134 | | 1 71136 | PartyRoleCode 71138 |

FIG. 72-1

| Package | level1 | level2 | level3 | level4 | level5 | level6 | Cardinality | Data Type Name |
|---|---|---|---|---|---|---|---|---|
| TransportationBookingRequestReceiptNotificationMessage 72000 | TransportationBookingRequestReceiptNotificationMessage 72002 | | | | | | | TransportationBookingRequestReceiptNotificationMessage 72004 |
| MessageHeader 72006 | | MessageHeader 72008 | | | | | 1 72010 | BusinessDocumentMessageHeader 72012 |
| TransportationBookingRequest 72014 | | TransportationBookingRequest 72016 | | | | | 1 72018 | … |
| | | | ID 72020 | | | | 1 72022 | BusinessTransactionDocumentID 72024 |

FIG. 72-2

| Package | level1 | level2 | level3 | level4 | level5 | level6 | Cardinality | Data Type Name |
|---|---|---|---|---|---|---|---|---|
| Request 72026 | | | Request 72028 | | | | 1 72030 | ... |
| HeaderInforma-tion 72032 | | | | DateTimePe-riods 72034 | | | 0..n 72036 | ... |
| | | | | | RequestedFulfillmentPeriod 72038 | | 0..1 72040 | DateTimePeriod 72042 |
| | | | | | AcceptableFulfillmentPeriod 72044 | | 0..1 72046 | DateTimePeriod 72048 |
| | | | | | PeriodRoleCode 72050 | | 1 72052 | PeriodRoleCode 72054 |
| | | | | TextCollection 72056 | | | 0..n 72058 | ... |

FIG. 72-3

| Package | level1 | level2 | level3 | level4 | level5 | level6 | Cardinality | Data Type Name |
|---|---|---|---|---|---|---|---|---|
| | | | | | TextCollection 72060 | | 1 72062 | TextCollection 72064 |
| | | | | BusinessTransactionDocumentReference 72066 | | | 0..n 72068 | ... |
| | | | | | BusinessTransactionDocumentReference 72070 | | 0..1 72072 | BusinessTransactionDocumentReference 72074 |
| | | | | | BusinessTransactionDocumentRelationshipRoleCode 72076 | | 0..1 72078 | BusinessTransactionDocumentRelationshipRoleCode 72080 |
| | | | | | BusinessTransactionDocumentRelationshipTypeCode 72082 | | 0..1 72084 | BusinessTransactionDocumentRelationshipTypeCode 72086 |

FIG. 72-4

| Package | level1 | level2 | level3 | level4 | level5 | level6 | Cardinality | Data Type Name |
|---|---|---|---|---|---|---|---|---|
| | | | | | TransportationDocument-TypeCode 72088 | | 0..1 72090 | TransportationDocument-TypeCode 72092 |
| | | | | | TransportationDocument-Note 72094 | | 0..1 72096 | SHORT_Note 72098 |
| | | | | | TransportationDocumentID 72100 | | 0..1 72102 | TransportationDocumentID 72104 |
| | | | | | DateTimePeriod 72106 | | 0..n 72108 | ... |
| | | | | | | DateTimePeriod 72110 | 1 72112 | DateTimePeriod 72114 |
| | | | | | | PeriodRoleCode 72116 | 1 72118 | PeriodRoleCode 72120 |

FIG. 72-5

| Package | level1 | level2 | level3 | level4 | level5 | level6 | Cardinality | Data Type Name |
|---|---|---|---|---|---|---|---|---|
| PartyInformation 72122 | | | | Party 72124 | | | 1..n 72126 | ... |
| | | | | | Party 72128 | | 1 72130 | BusinessTransactionDocumentParty 72132 |
| | | | | | RoleCode 72134 | | 1 72136 | PartyRoleCode 72138 |

FIG. 73-1

| Package | level1 | level2 | level3 | level4 | level5 | level6 | level7 | level8 | Cardinality | Data Type Name |
|---|---|---|---|---|---|---|---|---|---|---|
| TransportationBookingRequestRequestMessage 730000 | TransportationBookingRequestRequestMessage 730002 | | | | | | | | | TransportationBookingRequestRequestMessage 730004 |
| MessageHeader 730006 | | MessageHeader 730008 | | | | | | | 1 730010 | BusinessDocumentMessageHeader 730012 |
| TransportationBookingRequest 730014 | | TransportationBookingRequest 730016 | | | | | | | 1 730018 | ... |
| | | | @actioncode 730020 | | | | | | 1 730022 | ActionCode 730024 |
| | | | ID 730026 | | | | | | 1 730028 | BusinessTransactionDocumentID 730030 |

FIG. 73-2

| Package | level1 | level2 | level3 | level4 | level5 | level6 | level7 | level8 | Cardinality | Data Type Name |
|---|---|---|---|---|---|---|---|---|---|---|
| Request 730032 | | | Request 730034 | | | | | | 1 730036 | ... |
| | | | | Delivery-Terms 730038 | | | | | 0..1 730040 | DeliveryTerms 730042 |
| HeaderInformation 730044 | | | | DateTimePeriods 730046 | | | | | 0..n 730048 | ... |
| | | | | | Request-edFulfill-mentPeriod 730050 | | | | 0..1 730052 | DateTimePeriod 730054 |
| | | | | | Accept-ableFulfill-mentPeriod 730056 | | | | 0..1 730058 | DateTimePeriod 730060 |
| | | | | | PeriodRole Code 730062 | | | | 1 730064 | PeriodRoleCode 730066 |
| | | | | NatureOf Cargo 730068 | | | | | 0..n 730070 | ... |

FIG. 73-3

| Package | level1 | level2 | level3 | level4 | level5 | level6 | level7 | level8 | Cardinality | Data Type Name |
|---|---|---|---|---|---|---|---|---|---|---|
| | | | | | Classifica-tionCode 730072 | | | | 1 730074 | NatureOfCargo-ClassificationCode 730076 |
| | | | | Total-Quantity 730078 | | | | | 0..n 730080 | ... |
| | | | | | Quantity 730082 | | | | 1 730084 | Quantity 730086 |
| | | | | | RoleCode 730088 | | | | 0..1 730090 | QuantityRoleCode 730092 |
| | | | | | TypeCode 730094 | | | | 0..1 730096 | QuantityTypeCode 730098 |
| | | | | Tota-lAmount 730100 | | | | | 0..n 730102 | ... |
| | | | | | Amount 730104 | | | | 1 730106 | Amount 730108 |
| | | | | | RoleCode 730110 | | | | 1 730112 | AmountRoleCode 730114 |
| | | | | TextCol-lection 730116 | | | | | 0..1 730118 | ... |

FIG. 73-4

| Package | level1 | level2 | level3 | level4 | level5 | level6 | level7 | level8 | Cardinality | Data Type Name |
|---|---|---|---|---|---|---|---|---|---|---|
| | | | | | TextCollection 730120 | | | | 1 730122 | TextCollection 730124 |
| | | | | TransportationServiceRequirement 730126 | | | | | 0..n 730128 | ... |
| | | | | | TransportationServiceRequirementCode 730130 | | | | 0..1 730132 | TransportationServiceRequirementCode 730134 |
| | | | | | AdditionalTransportationServiceRequirementCode 730136 | | | | 0..1 730138 | TransportationServiceRequirementCode 730140 |

FIG. 73-5

| Package | level1 | level2 | level3 | level4 | level5 | level6 | level7 | level8 | Cardinality | Data Type Name |
|---|---|---|---|---|---|---|---|---|---|---|
| | | | | | Transporta-tionCon-tractCondi-tionCode 730142 | | | | 0..1 730144 | TransportationCon-tractConditionCode 730146 |
| | | | | | Transport-Ser-viceLevel-Code 730148 | | | | 0..1 730150 | TransportSer-viceLevelCode 730152 |
| | | | | | NatureOf-Cargo-Classifica-tionCode 730154 | | | | 0..1 730156 | NatureOfCargo-ClassificationCode 730158 |
| | | | | Trans-porta-tionDocu-mentIn-formation 730160 | | | | | 0..n 730162 | ... |
| | | | | | Transporta-tionDocu-mentType-Code 730164 | | | | 0..1 730166 | Transportation-DocumentType-Code 730168 |

FIG. 73-6

| Package | level1 | level2 | level3 | level4 | level5 | level6 | level7 | level8 | Cardinality | Data Type Name |
|---|---|---|---|---|---|---|---|---|---|---|
| | | | | | TransportationDocumentNote 730170 | | | | 0..1 730172 | SHORT_Note 730174 |
| | | | | | TransportationDocumentID 730176 | | | | 0..1 730178 | Transportation-DocumentID 730180 |
| | | | | | TransportationDocumentStatus Code 730182 | | | | 0..1 730184 | Transportation-DocumentStatus-Code 730186 |
| | | | | | Language-Code 730188 | | | | 0..1 730190 | LanguageCode 730192 |
| | | | | | CommunicationMediumType-Code 730194 | | | | 0..1 730196 | Communication-MediumTypeCode 730198 |
| | | | | | Required-indicator 730200 | | | | 1 730202 | Indicator 730204 |

FIG. 73-7

| Package | level1 | level2 | level3 | level4 | level5 | level6 | level7 | level8 | Cardinality | Data Type Name |
|---|---|---|---|---|---|---|---|---|---|---|
| | | | | | Output-CopyNum-berValue 730206 | | | | 0..1 730208 | NumberValue 730210 |
| | | | | | OutputOriginalNum-berValue 730212 | | | | 0..1 730214 | NumberValue 730216 |
| | | | | | DateTimePeriod 730218 | | | | 0..n 730220 | ... |
| | | | | | | DateTimePeriod 730222 | | | 1 730224 | DateTimePeriod 730226 |
| | | | | | | PeriodRoleCode 730228 | | | 1 730230 | PeriodRoleCode 730232 |

FIG. 73-8

| Package | level1 | level2 | level3 | level4 | level5 | level6 | level7 | level8 | Cardinality | Data Type Name |
|---|---|---|---|---|---|---|---|---|---|---|
| | | | | BusinessTransaction-DocumentReference 730234 | | | | | 0..n 730236 | ... |
| | | | | | Business-TransactionDocumentReference 730238 | | | | 0..1 730240 | BusinessTransactionDocumentReference 730242 |
| | | | | | Business-TransactionDocumentRelationshipRoleCode 730244 | | | | 0..1 730246 | BusinessTransactionDocumentRelationshipRoleCode 730248 |
| | | | | | Business-TransactionDocumentRelationship-TypeCode 730250 | | | | 0..1 730252 | BusinessTransactionDocumentRelationshipTypeCode 730254 |

FIG. 73-9

| Package | level1 | level2 | level3 | level4 | level5 | level6 | level7 | level8 | Cardinality | Data Type Name |
|---|---|---|---|---|---|---|---|---|---|---|
| | | | | | Transportation-DocumentType-Code 730256 | | | | 0..1 730258 | Transportation-DocumentType-Code 730260 |
| | | | | | Transportation-DocumentNote 730262 | | | | 0..1 730264 | SHORT_Note 730266 |
| | | | | | Transportation-DocumentID 730268 | | | | 0..1 730270 | Transportation-DocumentID 730272 |
| | | | | | DateTimePeriod 730274 | | | | 0..n 730276 | ... |
| | | | | | | DateTimePeriod 730278 | | | 1 730280 | DateTimePeriod 730282 |
| | | | | | | PeriodRoleCode 730284 | | | 1 730286 | PeriodRoleCode 730288 |

FIG. 73-10

| Package | level1 | level2 | level3 | level4 | level5 | level6 | level7 | level8 | Cardinality | Data Type Name |
|---|---|---|---|---|---|---|---|---|---|---|
| GovernmentalRequirementInformation 730290 | | | | Governmental-Procedure 730292 | | | | | 0..n 730294 | ... |
| | | | | | TransportationGovernmentAgencyTypeCode 730296 | | | | 0..1 730298 | Transportation-GovernmentAgencyType-Code 730300 |
| | | | | | TransportationMovementType-Code 730302 | | | | 0..1 730304 | Transportation-MovementType-Code 730306 |
| | | | | | TransportationGovernmentAgencyInvolvementStatusCode 730308 | | | | 0..1 730310 | Transportation-GovernmentAgencyInvolvementStatus-Code 730312 |

FIG. 73-11

| Package | level1 | level2 | level3 | level4 | level5 | level6 | level7 | level8 | Cardinality | Data Type Name |
|---|---|---|---|---|---|---|---|---|---|---|
| | | | | | TransportationGovernmentAgencyAction-Code 730314 | | | | 0..1 730316 | Transportation-Government-AgencyActionCode 730318 |
| | | | | | TransportationGovernmentAgencyProcedur-eStatus-Code 730320 | | | | 0..1 730322 | Transportation-Government-AgencyProcedureStatusCode 730324 |
| | | | | | TextCollection 730326 | | | | 0..1 730328 | ... |
| | | | | | | TextCollection 730330 | | | 1 730332 | TextCollection 730334 |
| | | | | | TransportationDocumentInformation 730336 | | | | 0..n 730338 | ... |

FIG. 73-12

| Package | level1 | level2 | level3 | level4 | level5 | level6 | level7 | level8 | Cardinality | Data Type Name |
|---|---|---|---|---|---|---|---|---|---|---|
| | | | | | | TransportationDocumentTypeCode 730340 | | | 0..1 730342 | Transportation-DocumentType-Code 730344 |
| | | | | | | TransportationDocumentNote 730346 | | | 0..1 730348 | SHORT_Note 730350 |
| | | | | | | TransportationDocumentID 730352 | | | 0..1 730354 | Transportation-DocumentID 730356 |
| | | | | | | TransportationDocumentStatus Code 730358 | | | 0..1 730360 | Transportation-DocumentStatus-Code 730362 |
| | | | | | | Language-Code 730364 | | | 0..1 730366 | LanguageCode 730368 |

FIG. 73-13

| Package | level1 | level2 | level3 | level4 | level5 | level6 | level7 | level8 | Cardinality | Data Type Name |
|---|---|---|---|---|---|---|---|---|---|---|
| | | | | | | CommunicationMediumTypeCode 730370 | | | 0..1 730372 | Communication-MediumTypeCode 730374 |
| | | | | | | Required-Indicator 730376 | | | 1 730378 | Indicator 730380 |
| | | | | | | Output-CopyNumberValue 730382 | | | 0..1 730384 | NumberValue 730386 |
| | | | | | | OutputOriginalNumberValue 730388 | | | 0..1 730390 | NumberValue 730392 |
| | | | | | | DateTimePeriod 730394 | | | 0..n 730396 | ... |
| | | | | | | | DateTimePeriod 730398 | | 1 730400 | DateTimePeriod 730402 |

FIG. 73-14

| Package | level1 | level2 | level3 | level4 | level5 | level6 | level7 | level8 | Cardinality | Data Type Name |
|---|---|---|---|---|---|---|---|---|---|---|
| | | | | | | | Pe-riodRole-Code 730404 | | 1 730406 | PeriodRoleCode 730408 |
| PartyInformation 730410 | | | | Party 730412 | | | | | 1..n 730414 | ... |
| | | | | | Party 730416 | | | | 1 730418 | BusinessTransac-tionDocumentParty 730420 |
| | | | | | RoleCode 730422 | | | | 1 730424 | PartyRoleCode 730426 |
| | | | | | Format-tedName 730428 | | | | 0..1 730430 | LONG_Name 730432 |
| | | | | | DateTimeP eriods 730434 | | | | 0..n 730436 | ... |
| | | | | | | Request-edFulfill-mentPeriod 730438 | | | 0..1 730440 | DateTimePeriod 730442 |

FIG. 73-15

| Package | level1 | level2 | level3 | level4 | level5 | level6 | level7 | level8 | Cardinality | Data Type Name |
|---|---|---|---|---|---|---|---|---|---|---|
| | | | | | | AcceptableFulfillmentPeriod 730444 | | | 0..1 730446 | DateTimePeriod 730448 |
| | | | | | | PeriodRoleCode 730450 | | | 1 730452 | PeriodRoleCode 730454 |
| | | | | | TransportationDocumentInformation 730456 | | | | 0..n 730458 | ... |
| | | | | | | TransportationDocumentTypeCode 730460 | | | 0..1 730462 | Transportation-DocumentTypeCode 730464 |
| | | | | | | TransportationDocumentNote 730466 | | | 0..1 730468 | SHORT_Note 730470 |
| | | | | | | TransportationDocumentID 730472 | | | 0..1 730474 | Transportation-DocumentID 730476 |

FIG. 73-16

| Package | level1 | level2 | level3 | level4 | level5 | level6 | level7 | level8 | Cardinality | Data Type Name |
|---|---|---|---|---|---|---|---|---|---|---|
| | | | | | | Transporta-tionDocu-mentStatus Code 730478 | | | 0..1 730480 | Transportation-DocumentStatus-Code 730482 |
| | | | | | | Language-Code 730484 | | | 0..1 730486 | LanguageCode 730488 |
| | | | | | | Communi-cationMe-diumType-Code 730490 | | | 0..1 730492 | Communication-MediumTypeCode 730494 |
| | | | | | | Required-Indicator 730496 | | | 1 730498 | Indicator 730500 |
| | | | | | | Output-CopyNum-berValue 730502 | | | 0..1 730504 | NumberValue 730506 |
| | | | | | | OutputOrigi nalNum-berValue 730508 | | | 0..1 730510 | NumberValue 730512 |

FIG. 73-17

| Package | level1 | level2 | level3 | level4 | level5 | level6 | level7 | level8 | Cardinality | Data Type Name |
|---|---|---|---|---|---|---|---|---|---|---|
| | | | | | | DateTimePeriod 730514 | | | 0..n 730516 | … |
| | | | | | | | DateTimePeriod 730518 | | 1 730520 | DateTimePeriod 730522 |
| | | | | | | | PeriodRoleCode 730524 | | 1 730526 | PeriodRoleCode 730528 |
| | | | | | BusinessTransactionDocumentReference 730530 | | | | 0..n 730532 | … |
| | | | | | | BusinessTransactionDocumentReference 730534 | | | 0..1 730536 | BusinessTransactionDocumentReference 730538 |

FIG. 73-18

| Package | level1 | level2 | level3 | level4 | level5 | level6 | level7 | level8 | Cardinality | Data Type Name |
|---|---|---|---|---|---|---|---|---|---|---|
| | | | | | | BusinessTransactionDocumentRelationshipRoleCode 730540 | | | 0..1 730542 | BusinessTransactionDocumentRelationshipRoleCode 730544 |
| | | | | | | BusinessTransactionDocumentRelationshipTypeCode 730546 | | | 0..1 730548 | BusinessTransactionDocumentRelationshipTypeCode 730550 |
| | | | | | | TransportationDocumentTypeCode 730552 | | | 0..1 730554 | TransportationDocumentTypeCode 730556 |
| | | | | | | TransportationDocumentNote 730558 | | | 0..1 730560 | SHORT_Note 730562 |
| | | | | | | TransportationDocumentID 730564 | | | 0..1 730566 | TransportationDocumentID 730568 |

FIG. 73-19

| Package | level1 | level2 | level3 | level4 | level5 | level6 | level7 | level8 | Cardinality | Data Type Name |
|---|---|---|---|---|---|---|---|---|---|---|
| | | | | | | DateTimePeriod 730570 | | | 0..n 730572 | ... |
| | | | | | | | DateTimePeriod 730574 | | 1 730576 | DateTimePeriod 730578 |
| | | | | | | | Pe-riodRole-Code 730580 | | 1 730582 | PeriodRoleCode 730584 |

FIG. 73-20

| Package | level1 | level2 | level3 | level4 | level5 | level6 | level7 | level8 | Cardinality | Data Type Name |
|---|---|---|---|---|---|---|---|---|---|---|
| LocationInformation 730586 | | | | Location 730588 | | | | | 0..n 730590 | |
| | | | | | Location 730592 | | | | 1 730594 | BusinessTransactionDocumentLocation 730596 |
| | | | | | RoleCode 730598 | | | | 1 730600 | LocationRoleCode 730602 |
| | | | | | TypeCode 730604 | | | | 0..1 730606 | LocationTypeCode 730608 |
| | | | | | Name 730610 | | | | 0..1 730612 | MEDIUM_Name 730614 |
| | | | | | DateTimePeriods 730616 | | | | 0..n 730618 | ... |
| | | | | | | RequestedFulfillmentPeriod 730620 | | | 0..1 730622 | DateTimePeriod 730624 |
| | | | | | | AcceptableFulfillmentPeriod 730626 | | | 0..1 730628 | DateTimePeriod 730630 |

FIG. 73-21

| Package | level1 | level2 | level3 | level4 | level5 | level6 | level7 | level8 | Cardinality | Data Type Name |
|---|---|---|---|---|---|---|---|---|---|---|
| | | | | | | PeriodRole Code 730632 | | | 1 730634 | PeriodRoleCode 730636 |
| TransportationStage-Information 730638 | | | | Trans-porta-tionStage 730640 | | | | | 0..n 730642 | ... |
| | | | | | ID 730644 | | | | 1 730646 | Transportation-StageID 730648 |
| | | | | | Ordinal-Number-Value 730650 | | | | 0..1 730652 | OrdinalNumber-Value 730654 |
| | | | | | TypeCode 730656 | | | | 0..1 730658 | Transportation-StageTypeCode 730660 |
| | | | | | JourneyID 730662 | | | | 0..1 730664 | JourneyID 730666 |
| | | | | | Transport-ModeCode 730668 | | | | 0..1 730670 | TransportMode-Code 730672 |

FIG. 73-22

| Package | level1 | level2 | level3 | level4 | level5 | level6 | level7 | level8 | Cardinality | Data Type Name |
|---|---|---|---|---|---|---|---|---|---|---|
| | | | | | Transport-MeansDe-scription-Code 730674 | | | | 0..1 730676 | TransportMeans-DescriptionCode 730678 |
| | | | | | Transport-MeansDe-scription 730680 | | | | 0..1 730682 | SHORT_Descrip-tion 730684 |
| | | | | | Transport-MeansID 730686 | | | | 0..1 730688 | TransportMeansID 730690 |
| | | | | | Transport-Mean-sHome-Country-Code 730692 | | | | 0..1 730694 | CountryCode 730696 |
| | | | | | Transport-Mean-sOwner-shipType-Code 730698 | | | | 0..1 730700 | TransportMean-sOwnershipType-Code 730702 |

FIG. 73-23

| Package | level1 | level2 | level3 | level4 | level5 | level6 | level7 | level8 | Cardinality | Data Type Name |
|---|---|---|---|---|---|---|---|---|---|---|
| | | | | | Carrier-StandardID 730704 | | | | 0..1 730706 | PartyStandardID 730708 |
| | | | | | Carrier-Format-tedName 730710 | | | | 0..1 730712 | LONG_Name 730714 |
| | | | | | Transporta-tionTran-sitDirec-tionCode 730716 | | | | 0..1 730718 | Transportation-TransitDirection-Code 730720 |
| | | | | | Calculat-edDistance Measure 730722 | | | | 0..1 730724 | Measure 730726 |
| | | | | | GivenDis-tance-Measure 730728 | | | | 0..1 730730 | Measure 730732 |
| | | | | | Location 730734 | | | | 1..n 730736 | ... |

FIG. 73-24

| Package | level1 | level2 | level3 | level4 | level5 | level6 | level7 | level8 | Cardinality | Data Type Name |
|---|---|---|---|---|---|---|---|---|---|---|
| | | | | | | Location 730738 | | | 1 730740 | BusinessTransactionDocumentLocation 730742 |
| | | | | | | RoleCode 730744 | | | 1 730746 | LocationRoleCode 730748 |
| | | | | | | TypeCode 730750 | | | 0..1 730752 | LocationTypeCode 730754 |
| | | | | | | Name 730756 | | | 0..1 730758 | MEDIUM_Name 730760 |
| | | | | | | DateTimePeriods 730762 | | | 0..n 730764 | ... |
| | | | | | | | RequestedFulfillmentPeriod 730766 | | 0..1 730768 | DateTimePeriod 730770 |
| | | | | | | | AcceptableFulfillmentPeriod 730772 | | 0..1 730774 | DateTimePeriod 730776 |

FIG. 73-25

| Package | level1 | level2 | level3 | level4 | level5 | level6 | level7 | level8 | Cardinality | Data Type Name |
|---|---|---|---|---|---|---|---|---|---|---|
| | | | | | | | Pe-riodRole-Code 730778 | | 1 730780 | PeriodRoleCode 730782 |
| | | | | | Business-Transac-tionDocu-men-tReference 730784 | | | | 0..n 730786 | ... |
| | | | | | | Business-Transac-tionDocu-men-tReference 730788 | | | 0..1 730790 | BusinessTransac-tionDocumen-tReference 730792 |
| | | | | | | Business-Transac-tionDocu-mentRela-tionshi-pRoleCode 730794 | | | 0..1 730796 | BusinessTransac-tionDocumentRela-tionshipRoleCode 730798 |

FIG. 73-26

| Package | level1 | level2 | level3 | level4 | level5 | level6 | level7 | level8 | Cardinality | Data Type Name |
|---|---|---|---|---|---|---|---|---|---|---|
| | | | | | | Business-Transac-tionDocu-mentRela-tionship-TypeCode 730800 | | | 0..1 730802 | BusinessTransac-tionDocumentRela-tionshipTypeCode 730804 |
| | | | | | | Transporta-tionDocu-mentType-Code 730806 | | | 0..1 730808 | Transportation-DocumentType-Code 730810 |
| | | | | | | Transporta-tionDocu-mentNote 730812 | | | 0..1 730814 | SHORT_Note 730816 |
| | | | | | | Transporta-tionDocu-mentID 730818 | | | 0..1 730820 | Transportation-DocumentID 730822 |
| | | | | | | DateTimeP eriod 730824 | | | 0..n 730826 | ... |
| | | | | | | | DateTim ePeriod 730828 | | 1 730830 | DateTimePeriod 730832 |

FIG. 73-27

| Package | level1 | level2 | level3 | level4 | level5 | level6 | level7 | level8 | Cardinality | Data Type Name |
|---|---|---|---|---|---|---|---|---|---|---|
| | | | | | | | Pe-riodRole-Code 730834 | | 1 730836 | PeriodRoleCode 730838 |
| | | | | | Transporta-tionSer-viceRe-quirement 730840 | | | | 0..n 730842 | ... |
| | | | | | | Transporta-tionSer-viceRe-quirement-Code 730844 | | | 0..1 730846 | TransportationSer-viceRequirement-Code 730848 |
| | | | | | | Additional-Transporta-tionSer-viceRe-quirement-Code 730850 | | | 0..1 730852 | TransportationSer-viceRequirement-Code 730854 |
| | | | | | | Transporta-tionCon-tractCondi-tionCode 730856 | | | 0..1 730858 | TransportationCon-tractConditionCode 730860 |

FIG. 73-28

| Package | level1 | level2 | level3 | level4 | level5 | level6 | level7 | level8 | Cardinality | Data Type Name |
|---|---|---|---|---|---|---|---|---|---|---|
| | | | | | | Transport-Ser-viceLevel-Code 730862 | | | 0..1 730864 | TransportSer-viceLevelCode 730866 |
| | | | | | | NatureOf-Cargo-Classifica-tionCode 730868 | | | 0..1 730870 | NatureOfCargo-ClassificationCode 730872 |
| TransportationUnitRe-sourceInformation 730874 | | | | Trans-porta-tionUni-tResour-ceInfor-mation 730876 | | | | | 0..n 730878 | ... |
| | | | | | ID 730880 | | | | 1 730882 | ResourceInforma-tionID 730884 |
| | | | | | Resour-ceNum-berValue 730886 | | | | 0..1 730888 | NumberValue 730890 |

FIG. 73-29

| Package | level1 | level2 | level3 | level4 | level5 | level6 | level7 | level8 | Cardinality | Data Type Name |
|---|---|---|---|---|---|---|---|---|---|---|
| | | | | | Resour-ceID 730892 | | | | 0..1 730894 | ResourceID 730896 |
| | | | | | Resource-Home-Country-Code 730898 | | | | 0..1 730900 | CountryCode 730902 |
| | | | | | Transporta-tionUnitRe-source-Category-Code 730904 | | | | 0..1 730906 | TransportationUni-tResourceCate-goryCode 730908 |
| | | | | | Transporta-tionUnitRe-sour-ceType-Code 730910 | | | | 0..1 730912 | TransportationUni-tResourceType-Code 730914 |
| | | | | | FillLevel-Code 730916 | | | | 0..1 730918 | FillLevelCode 730920 |
| | | | | | Shipping-TypeCode 730922 | | | | 0..1 730924 | ShippingTypeCode 730926 |

FIG. 73-30

| Package | level1 | level2 | level3 | level4 | level5 | level6 | level7 | level8 | Cardinality | Data Type Name |
|---|---|---|---|---|---|---|---|---|---|---|
| | | | | | HaulageArranger-Code 730928 | | | | 0..1 730930 | HaulageArranger-Code 730932 |
| | | | | | Transportation-HandlingInstruction-Code 730934 | | | | 0..1 730936 | Transportation-HandlingInstructionCode 730938 |
| | | | | | Transportation-HandlingInstruction-Note 730940 | | | | 0..1 730942 | LONG_Note 730944 |
| | | | | | Transportation-StageAssignment 730946 | | | | 0..n 730948 | ... |

FIG. 73-31

| Package | level1 | level2 | level3 | level4 | level5 | level6 | level7 | level8 | Cardinality | Data Type Name |
|---|---|---|---|---|---|---|---|---|---|---|
| | | | | | | TransportationBookingRequestTransportationStageID 730950 | | | 1 730952 | TransportationStageID 730954 |
| | | | | | Quantity 730956 | | | | 0..n 730958 | ... |
| | | | | | | Quantity 730960 | | | 1 730962 | Quantity 730964 |
| | | | | | | RoleCode 730966 | | | 0..1 730968 | QuantityRoleCode 730970 |
| | | | | | | TypeCode 730972 | | | 0..1 730974 | QuantityTypeCode 730976 |
| | | | | | BusinessTransactionDocumentReference 730978 | | | | 0..n 730980 | ... |

FIG. 73-32

| Package | level1 | level2 | level3 | level4 | level5 | level6 | level7 | level8 | Cardinality | Data Type Name |
|---|---|---|---|---|---|---|---|---|---|---|
| | | | | | | Business-TransactionDocumentReference 730982 | | | 0..1 730984 | BusinessTransactionDocumentReference 730986 |
| | | | | | | Business-TransactionDocumentRelationshipRoleCode 730988 | | | 0..1 730990 | BusinessTransactionDocumentRelationshipRoleCode 730992 |
| | | | | | | Business-TransactionDocumentRelationship-TypeCode 730994 | | | 0..1 730996 | BusinessTransactionDocumentRelationshipTypeCode 730998 |
| | | | | | | TransportationDocumentTypeCode 731000 | | | 0..1 731002 | Transportation-DocumentType-Code 731004 |

FIG. 73-33

| Package | level1 | level2 | level3 | level4 | level5 | level6 | level7 | level8 | Cardinality | Data Type Name |
|---|---|---|---|---|---|---|---|---|---|---|
| | | | | | | Transporta-tionDocu-mentNote 731006 | | | 0..1 731008 | SHORT_Note 731010 |
| | | | | | | Transporta-tionDocu-mentID 731012 | | | 0..1 731014 | Transportation-DocumentID 731016 |
| | | | | | | DateTimeP eriod 731018 | | | 0..n 731020 | |
| | | | | | | | DateTim ePeriod 731022 | | 1 731024 | DateTimePeriod 731026 |
| | | | | | | | Pe-riodRole-Code 731028 | | 1 731030 | PeriodRoleCode 731032 |
| | | | | | TextCollec-tion 731034 | | | | 0..1 731036 | ... |
| | | | | | | TextCollec-tion 731038 | | | 1 731040 | TextCollection 731042 |

FIG. 73-34

| Package | level1 | level2 | level3 | level4 | level5 | level6 | level7 | level8 | Cardinality | Data Type Name |
|---|---|---|---|---|---|---|---|---|---|---|
| | | | | | Location 731044 | | | | 0..n 731046 | ... |
| | | | | | | Location 731048 | | | 1 731050 | BusinessTransactionDocumentLocation 731052 |
| | | | | | | RoleCode 731054 | | | 1 731056 | LocationRoleCode 731058 |
| | | | | | | TypeCode 731060 | | | 0..1 731062 | LocationTypeCode 731064 |
| | | | | | | Name 731066 | | | 0..1 731068 | MEDIUM_Name 731070 |
| | | | | | | DateTimePeriods 731072 | | | 0..n 731074 | ... |
| | | | | | | | RequestedFulfillmentPeriod 731076 | | 0..1 731078 | DateTimePeriod 731080 |

FIG. 73-35

| Package | level1 | level2 | level3 | level4 | level5 | level6 | level7 | level8 | Cardinality | Data Type Name |
|---|---|---|---|---|---|---|---|---|---|---|
| | | | | | | | AcceptableFulfillmentPeriod 731082 | | 0..1 731084 | DateTimePeriod 731086 |
| | | | | | | | PeriodRoleCode 731088 | | 1 731090 | PeriodRoleCode 731092 |
| | | | | | DangerousGoods 731094 | | | | 0..n 731096 | |
| | | | | | | ID 731098 | | | 0..1 731100 | DangerousGoodsID 731102 |
| | | | | | | RegulationsCode 731104 | | | 0..1 731106 | DangerousGoodsRegulationsCode 731108 |
| | | | | | | HazardCode 731110 | | | 0..1 731112 | DangerousGoodsHazardCode 731114 |
| | | | | | | FlashpointMeasureInterval 731116 | | | 0..1 731118 | MeasureInterval 731120 |

FIG. 73-36

| Package | level1 | level2 | level3 | level4 | level5 | level6 | level7 | level8 | Cardinality | Data Type Name |
|---|---|---|---|---|---|---|---|---|---|---|
| | | | | | | Packag-ingGroup-Code 731122 | | | 0..1 731124 | Dangerous-GoodsPackaging-GroupCode 731126 |
| | | | | | | Emergen-cySchedule 731128 | | | 0..1 731130 | DangerousGood-sEmergency-Schedule 731132 |
| | | | | | | Transpor-tEmer-gency-CardCode 731134 | | | 0..1 731136 | TransportEmer-gencyCardCode 731138 |
| | | | | | | Danger-ousGood-sLabel-Code 731140 | | | 0..1 731142 | DangerousGood-sLabelCode 731144 |
| | | | | | | Danger-ousGood-sLabel-Code2 731146 | | | 0..1 731148 | DangerousGood-sLabelCode 731150 |

FIG. 73-37

| Package | level1 | level2 | level3 | level4 | level5 | level6 | level7 | level8 | Cardinality | Data Type Name |
|---|---|---|---|---|---|---|---|---|---|---|
| | | | | | | Danger-ousGood-sLabel-Code3 731152 | | | 0..1 731154 | DangerousGood-sLabelCode 731156 |
| | | | | | | Packag-ingInstruc-tionType-Code 731158 | | | 0..1 731160 | PackagingInstruc-tionTypeCode 731162 |
| | | | | | | Transport-MeansDe-scription-Code 731164 | | | 0..1 731166 | TransportMeans-DescriptionCode 731168 |
| | | | | | | Transporta-tionAu-thorisa-tionCode 731170 | | | 0..1 731172 | DangerousGood-sTransportationAu-thorisationCode 731174 |
| | | | | | | ContactIn-formation 731176 | | | 0..n 731178 | ... |

FIG. 73-38

| Package | level1 | level2 | level3 | level4 | level5 | level6 | level7 | level8 | Cardinality | Data Type Name |
|---|---|---|---|---|---|---|---|---|---|---|
| | | | | | | | Contact-Person-Func-tionType-Code 731180 | | 1 731182 | ContactPerson-FunctionTypeCode 731184 |
| | | | | | | | Address 731186 | | 1 731188 | Address 731190 |
| | | | | | | TextCollec-tion 731192 | | | 0..1 731194 | … |
| | | | | | | | TextCol-lection 731196 | | 1 731198 | TextCollection 731200 |

FIG. 73-39

| Package | level1 | level2 | level3 | level4 | level5 | level6 | level7 | level8 | Cardinality | Data Type Name |
|---|---|---|---|---|---|---|---|---|---|---|
| PackageInformation 731202 | | | | Package-Information 731204 | | | | | 0..n 731206 | ... |
| | | | | | ID 731208 | | | | 1 731210 | PackageInformationID 731212 |
| | | | | | PackageID 731214 | | | | 0..1 731216 | PackageID 731218 |
| | | | | | PackageOrdinalNumberValue 731220 | | | | 0..1 731222 | OrdinalNumberValue 731224 |
| | | | | | PackageNumberValue 731226 | | | | 0..1 731228 | NumberValue 731230 |
| | | | | | PackageTypeCode 731232 | | | | 0..1 731234 | PackageTypeCode 731236 |

FIG. 73-40

| Package | level1 | level2 | level3 | level4 | level5 | level6 | level7 | level8 | Cardinality | Data Type Name |
|---|---|---|---|---|---|---|---|---|---|---|
| | | | | | Packag-ingLevel-Code 731238 | | | | 0..1 731240 | PackagingLevel-Code 731242 |
| | | | | | Package-MarkingIn-struction-Code 731244 | | | | 0..1 731246 | PackageMarkingIn-structionCode 731248 |
| | | | | | Predeces-sorPack-ageID 731250 | | | | 0..1 731252 | PackageID 731254 |
| | | | | | ItemAs-signment 731256 | | | | 0..n 731258 | ... |
| | | | | | | Transporta-tionBook-ingReques-tItemID 731260 | | | 1 731262 | BusinessTransac-tionDocumen-tItemID 731264 |
| | | | | | | Quantity 731266 | | | 0..n 731268 | ... |
| | | | | | | | Quantity 731270 | | 1 731272 | Quantity 731274 |

FIG. 73-41

| Package | level1 | level2 | level3 | level4 | level5 | level6 | level7 | level8 | Cardinality | Data Type Name |
|---|---|---|---|---|---|---|---|---|---|---|
| | | | | | | | Role-Code 731276 | | 0..1 731278 | QuantityRoleCode 731280 |
| | | | | | | | Type-Code 731282 | | 0..1 731284 | QuantityTypeCode 731286 |
| | | | | | | Business-Transac-tionDocu-men-tReference 731288 | | | 0..n 731290 | ... |
| | | | | | | | Business Transac-tionDocu-men-tRefer-ence 731292 | | 0..1 731294 | BusinessTransac-tionDocumen-tReference 731296 |

FIG. 73-42

| Package | level1 | level2 | level3 | level4 | level5 | level6 | level7 | level8 | Cardinality | Data Type Name |
|---|---|---|---|---|---|---|---|---|---|---|
| | | | | | | | BusinessTransactionDocumentRelationshipRoleCode 731298 | | 0..1 731300 | BusinessTransactionDocumentRelationshipRoleCode 731302 |
| | | | | | | | BusinessTransactionDocumentRelationshipTypeCode 731304 | | 0..1 731306 | BusinessTransactionDocumentRelationshipTypeCode 731308 |
| | | | | | | | TransportationDocumentTypeCode 731310 | | 0..1 731312 | TransportationDocumentTypeCode 731314 |

FIG. 73-43

| Package | level1 | level2 | level3 | level4 | level5 | level6 | level7 | level8 | Cardinality | Data Type Name |
|---|---|---|---|---|---|---|---|---|---|---|
| | | | | | | | Trans-porta-tionDocu-ment-Note 731316 | | 0..1 731318 | SHORT_Note 731320 |
| | | | | | | | Trans-porta-tionDocu-mentID 731322 | | 0..1 731324 | Transportation-DocumentID 731326 |
| | | | | | | | DateTim ePeriod 731328 | | 0..n 731330 | ... |
| | | | | | | | | DateTim ePeriod 731332 | 1 731334 | DateTimePeriod 731336 |
| | | | | | | | | Pe-riodRole-Code 731338 | 1 731340 | PeriodRoleCode 731342 |
| | | | | | | Transporta-tionGood-sIdentifica-tion 731344 | | | 0..n 731346 | ... |

FIG. 73-44

| Package | level1 | level2 | level3 | level4 | level5 | level6 | level7 | level8 | Cardinality | Data Type Name |
|---|---|---|---|---|---|---|---|---|---|---|
| | | | | | | | Trans-porta-tionGoodsI-dentifier-Type-Code 731348 | | 1 731350 | Transportation-GoodsIdentifier-TypeCode 731352 |
| | | | | | | | Lower-Boundary Trans-porta-tionGoodsID 731354 | | 0..1 731356 | Transportation-GoodsID 731358 |
| | | | | | | | Upper-Boundary Trans-porta-tionGoodsID 731360 | | 0..1 731362 | Transportation-GoodsID 731364 |
| | | | | | Transporta-tionUnitRe-sourceIn-forma-tionAs-signment 731366 | | | | 0..n 731368 | ... |

FIG. 73-45

| Package | level1 | level2 | level3 | level4 | level5 | level6 | level7 | level8 | Cardinality | Data Type Name |
|---|---|---|---|---|---|---|---|---|---|---|
| | | | | | | TransportationBookingRequestResourceInformationID 731370 | | | 1 731372 | ResourceInformationID 731374 |
| | | | | | | Quantity 731376 | | | 0..n 731378 | ... |
| | | | | | | | Quantity 731380 | | 1 731382 | Quantity 731384 |
| | | | | | | | RoleCode 731386 | | 0..1 731388 | QuantityRoleCode 731390 |
| | | | | | | | TypeCode 731392 | | 0..1 731394 | QuantityTypeCode 731396 |
| | | | | | Quantity 731398 | | | | 0..n 731400 | ... |
| | | | | | | Quantity 731402 | | | 1 731404 | Quantity 731406 |
| | | | | | | RoleCode 731408 | | | 0..1 731410 | QuantityRoleCode 731412 |

FIG. 73-46

| Package | level1 | level2 | level3 | level4 | level5 | level6 | level7 | level8 | Cardinality | Data Type Name |
|---|---|---|---|---|---|---|---|---|---|---|
| | | | | | | TypeCode 731414 | | | 0..1 731416 | QuantityTypeCode 731418 |
| | | | | | TextCollection 731420 | | | | 0..1 731422 | ... |
| | | | | | | TextCollection 731424 | | | 1 731426 | TextCollection 731428 |
| Item 731430 | | | Item 731432 | | | | | | 0..n 731434 | ... |
| | | | | ID 731436 | | | | | 1 731438 | BusinessTransactionDocumentItemID 731440 |
| | | | | OriginCountryCode 731442 | | | | | 0..1 731444 | CountryCode 731446 |
| | | | | DestinationCountryCode 731448 | | | | | 0..1 731450 | CountryCode 731452 |

FIG. 73-47

| Package | level1 | level2 | level3 | level4 | level5 | level6 | level7 | level8 | Cardinality | Data Type Name |
|---|---|---|---|---|---|---|---|---|---|---|
| | | | | Ship-pingType Code 731454 | | | | | 0..1 731456 | ShippingTypeCode 731458 |
| | | | | Haul-ageAr-ranger-Code 731460 | | | | | 0..1 731462 | HaulageArranger-Code 731464 |
| | | | | Temperat ure-Measure-Interval 731466 | | | | | 0..1 731468 | MeasureInterval 731470 |
| | | | | Trans-porta-tionHan-dlingIn-struc-tionCode 731472 | | | | | 0..1 731474 | Transportation-HandlingInstruc-tionCode 731476 |

FIG. 73-48

| Package | level1 | level2 | level3 | level4 | level5 | level6 | level7 | level8 | Cardinality | Data Type Name |
|---|---|---|---|---|---|---|---|---|---|---|
| | | | | Trans-porta-tionHan-dlingIn-struc-tionNote 731478 | | | | | 0..1 731480 | LONG_Note 731482 |
| ItemInformation 731484 | | | | Amount 731486 | | | | | 0..n 731488 | ... |
| | | | | | Amount 731490 | | | | 1 731492 | Amount 731494 |
| | | | | | RoleCode 731496 | | | | 1 731498 | AmountRoleCode 731500 |
| | | | | TextCol-lection 731502 | | | | | 0..1 731504 | ... |
| | | | | | TextCollec-tion 731506 | | | | 1 731508 | TextCollection 731510 |
| | | | | NatureOf Cargo 731512 | | | | | 0..n 731514 | ... |

FIG. 73-49

| Package | level1 | level2 | level3 | level4 | level5 | level6 | level7 | level8 | Cardinality | Data Type Name |
|---|---|---|---|---|---|---|---|---|---|---|
| | | | | | ClassificationCode 731516 | | | | 1 731518 | NatureOfCargoClassificationCode 731520 |
| | | | | Quantity 731522 | | | | | 0..n 731524 | ... |
| | | | | | Quantity 731526 | | | | 1 731528 | Quantity 731530 |
| | | | | | RoleCode 731532 | | | | 0..1 731534 | QuantityRoleCode 731536 |
| | | | | | TypeCode 731538 | | | | 0..1 731540 | QuantityTypeCode 731542 |
| | | | | TransportationDocumentInformation 731544 | | | | | 0..n 731546 | ... |
| | | | | | TransportationDocumentTypeCode 731548 | | | | 0..1 731550 | TransportationDocumentTypeCode 731552 |

FIG. 73-50

| Package | level1 | level2 | level3 | level4 | level5 | level6 | level7 | level8 | Cardinality | Data Type Name |
|---|---|---|---|---|---|---|---|---|---|---|
| | | | | | Transporta-tionDocu-mentNote 731554 | | | | 0..1 731556 | SHORT_Note 731558 |
| | | | | | Transporta-tionDocu-mentID 731560 | | | | 0..1 731562 | Transportation-DocumentID 731564 |
| | | | | | Transporta-tionDocu-mentStatus Code 731566 | | | | 0..1 731568 | Transportation-DocumentStatus-Code 731570 |
| | | | | | Language-Code 731572 | | | | 0..1 731574 | LanguageCode 731576 |
| | | | | | Communi-cationMe-diumType-Code 731578 | | | | 0..1 731580 | Communication-MediumTypeCode 731582 |
| | | | | | Required-indicator 731584 | | | | 1 731586 | Indicator 731588 |

FIG. 73-51

| Package | level1 | level2 | level3 | level4 | level5 | level6 | level7 | level8 | Cardinality | Data Type Name |
|---|---|---|---|---|---|---|---|---|---|---|
| | | | | | Output-CopyNum-berValue 731590 | | | | 0..1 731592 | NumberValue 731594 |
| | | | | | OutputOriginalNum-berValue 731596 | | | | 0..1 731598 | NumberValue 731600 |
| | | | | | DateTimePeriod 731602 | | | | 0..n 731604 | ... |
| | | | | | | DateTimePeriod 731606 | | | 1 731608 | DateTimePeriod 731610 |
| | | | | | | PeriodRoleCode 731612 | | | 1 731614 | PeriodRoleCode 731616 |

FIG. 73-52

| Package | level1 | level2 | level3 | level4 | level5 | level6 | level7 | level8 | Cardinality | Data Type Name |
|---|---|---|---|---|---|---|---|---|---|---|
| | | | | BusinessTransactionDocumentReference 731618 | | | | | 0..n 731620 | ... |
| | | | | | BusinessTransactionDocumentReference 731622 | | | | 0..1 731624 | BusinessTransactionDocumentReference 731626 |
| | | | | | BusinessTransactionDocumentRelationshipRoleCode 731628 | | | | 0..1 731630 | BusinessTransactionDocumentRelationshipRoleCode 731632 |

FIG. 73-53

| Package | level1 | level2 | level3 | level4 | level5 | level6 | level7 | level8 | Cardinality | Data Type Name |
|---|---|---|---|---|---|---|---|---|---|---|
| | | | | | Business-Transac-tionDocu-mentRela-tionship-TypeCode 731634 | | | | 0..1 731636 | BusinessTransac-tionDocumentRela-tionshipTypeCode 731638 |
| | | | | | Transporta-tionDocu-mentType-Code 731640 | | | | 0..1 731642 | Transportation-DocumentType-Code 731644 |
| | | | | | Transporta-tionDocu-mentNote 731646 | | | | 0..1 731648 | SHORT_Note 731650 |
| | | | | | Transporta-tionDocu-mentID 731652 | | | | 0..1 731654 | Transportation-DocumentID 731656 |
| | | | | | DateTimeP eriod 731658 | | | | 0..n 731660 | ... |
| | | | | | | DateTimeP eriod 731662 | | | 1 731664 | DateTimePeriod 731666 |

FIG. 73-54

| Package | level1 | level2 | level3 | level4 | level5 | level6 | level7 | level8 | Cardinality | Data Type Name |
|---|---|---|---|---|---|---|---|---|---|---|
| | | | | | | PeriodRole Code 731668 | | | 1 731670 | PeriodRoleCode 731672 |
| | | | | Danger-ous-Goods 731674 | | | | | 0..n 731676 | ... |
| | | | | | ID 731678 | | | | 0..1 731680 | DangerousGood-sID 731682 |
| | | | | | Regula-tionsCode 731684 | | | | 0..1 731686 | DangerousGoods-RegulationsCode 731688 |
| | | | | | Hazard-Code 731690 | | | | 0..1 731692 | DangerousGood-sHazardCode 731694 |
| | | | | | Flash-pointMeas-ureInterval 731696 | | | | 0..1 731698 | MeasureInterval 731700 |
| | | | | | Packag-ingGroup-Code 731702 | | | | 0..1 731704 | Dangerous-GoodsPackaging-GroupCode 731706 |

FIG. 73-55

| Package | level1 | level2 | level3 | level4 | level5 | level6 | level7 | level8 | Cardinality | Data Type Name |
|---|---|---|---|---|---|---|---|---|---|---|
| | | | | | Emergen-cySchedule 731708 | | | | 0..1 731710 | DangerousGood-sEmergency-Schedule 731712 |
| | | | | | Transpor-tEmer-gency-CardCode 731714 | | | | 0..1 731716 | TransportEmer-gencyCardCode 731718 |
| | | | | | Danger-ousGood-sLabel-Code 731720 | | | | 0..1 731722 | DangerousGood-sLabelCode 731724 |
| | | | | | Danger-ousGood-sLabel-Code2 731726 | | | | 0..1 731728 | DangerousGood-sLabelCode 731730 |
| | | | | | Danger-ousGood-sLabel-Code3 731732 | | | | 0..1 731734 | DangerousGood-sLabelCode 731736 |

FIG. 73-56

| Package | level1 | level2 | level3 | level4 | level5 | level6 | level7 | level8 | Cardinality | Data Type Name |
|---|---|---|---|---|---|---|---|---|---|---|
| | | | | | PackingIn-struction-TypeCode 731738 | | | | 0..1 731740 | PackingInstruction-TypeCode 731742 |
| | | | | | Transport-MeansDe-scription-Code 731744 | | | | 0..1 731746 | TransportMeans-DescriptionCode 731748 |
| | | | | | Transporta-tionAu-thorisa-tionCode 731750 | | | | 0..1 731752 | DangerousGood-sTransportationAu-thorisationCode 731754 |
| | | | | | ContactIn-formation 731756 | | | | 0..n 731758 | ... |
| | | | | | | Contact-Person-Function-TypeCode 731760 | | | 1 731762 | ContactPerson-FunctionTypeCode 731764 |
| | | | | | | Address 731766 | | | 1 731768 | Address 731770 |

FIG. 73-57

| Package | level1 | level2 | level3 | level4 | level5 | level6 | level7 | level8 | Cardinality | Data Type Name |
|---|---|---|---|---|---|---|---|---|---|---|
| | | | | | Quantity 731772 | | | | 0..n 731774 | ... |
| | | | | | | Quantity 731776 | | | 1 731778 | Quantity 731780 |
| | | | | | | RoleCode 731782 | | | 0..1 731784 | QuantityRoleCode 731786 |
| | | | | | | TypeCode 731788 | | | 0..1 731790 | QuantityTypeCode 731792 |
| | | | | | TextCollection 731794 | | | | 0..1 731796 | ... |
| | | | | | | TextCollection 731798 | | | 1 731800 | TextCollection 731802 |
| | | | | | TransportationUnitResourceInformationAssignment 731804 | | | | 0..n 731806 | ... |

FIG. 73-58

| Package | level1 | level2 | level3 | level4 | level5 | level6 | level7 | level8 | Cardinality | Data Type Name |
|---|---|---|---|---|---|---|---|---|---|---|
| | | | | | | TransportationBookingRequestResourceInformationID 731808 | | | 1 731810 | ResourceInformationID 731812 |
| | | | | | | Quantity 731814 | | | 0..n 731816 | … |
| | | | | | | | Quantity 731818 | | 1 731820 | Quantity 731822 |
| | | | | | | | RoleCode 731824 | | 0..1 731826 | QuantityRoleCode 731828 |
| | | | | | | | TypeCode 731830 | | 0..1 731832 | QuantityTypeCode 731834 |
| | | | | TransportationStage Assignment 731836 | | | | | 0..n 731838 | … |

FIG. 73-59

| Package | level1 | level2 | level3 | level4 | level5 | level6 | level7 | level8 | Cardinality | Data Type Name |
|---|---|---|---|---|---|---|---|---|---|---|
| | | | | | TransportationBookingRequestTransportationStageID 731840 | | | | 1 731842 | TransportationStageID 731844 |
| | | | | | Quantity 731846 | | | | 0..n 731848 | ... |
| | | | | | | Quantity 731850 | | | 1 731852 | Quantity 731854 |
| | | | | | | RoleCode 731856 | | | 0..1 731858 | QuantityRoleCode 731860 |
| | | | | | | TypeCode 731862 | | | 0..1 731864 | QuantityTypeCode 731866 |
| | | | | TransportationUnitResourceInformationAssignment 731868 | | | | | 0..n 731870 | ... |

FIG. 73-60

| Package | level1 | level2 | level3 | level4 | level5 | level6 | level7 | level8 | Cardinality | Data Type Name |
|---|---|---|---|---|---|---|---|---|---|---|
| | | | | | TransportationBookingRequestResourceInformationID 731872 | | | | 1 731874 | ResourceInformationID 731876 |
| | | | | | Quantity 731878 | | | | 0..n 731880 | ... |
| | | | | | | Quantity 731882 | | | 1 731884 | Quantity 731886 |
| | | | | | | RoleCode 731888 | | | 0..1 731890 | QuantityRoleCode 731892 |
| | | | | | | TypeCode 731894 | | | 0..1 731896 | QuantityTypeCode 731898 |

FIG. 73-61

| Package | level1 | level2 | level3 | level4 | level5 | level6 | level7 | level8 | Cardinality | Data Type Name |
|---|---|---|---|---|---|---|---|---|---|---|
| PartyInformation 731900 | | | | Party 731902 | | | | | 0..n 731904 | ... |
| | | | | | Party 731906 | | | | 1 731908 | BusinessTransactionDocumentParty 731910 |
| | | | | | RoleCode 731912 | | | | 1 731914 | PartyRoleCode 731916 |
| | | | | | FormattedName 731918 | | | | 0..1 731920 | LONG_Name 731922 |
| | | | | | DateTimePeriods 731924 | | | | 0..n 731926 | ... |
| | | | | | | RequestedFulfillmentPeriod 731928 | | | 0..1 731930 | DateTimePeriod 731932 |
| | | | | | | AcceptableFulfillmentPeriod 731934 | | | 0..1 731936 | DateTimePeriod 731938 |

FIG. 73-62

| Package | level1 | level2 | level3 | level4 | level5 | level6 | level7 | level8 | Cardinality | Data Type Name |
|---|---|---|---|---|---|---|---|---|---|---|
| | | | | | | PeriodRole Code 731940 | | | 1 731942 | PeriodRoleCode 731944 |
| LocationInformation 731946 | | | | Location 731948 | | | | | 0..n 731950 | ... |
| | | | | | Location 731952 | | | | 1 731954 | BusinessTransactionDocumentLocation 731956 |
| | | | | | RoleCode 731958 | | | | 1 731960 | LocationRoleCode 731962 |
| | | | | | TypeCode 731964 | | | | 0..1 731966 | LocationTypeCode 731968 |
| | | | | | Name 731970 | | | | 0..1 731972 | MEDIUM_Name 731974 |
| | | | | | DateTimePeriods 731976 | | | | 0..n 731978 | ... |
| | | | | | | RequestedFulfillmentPeriod 731980 | | | 0..1 731982 | DateTimePeriod 731984 |

FIG. 73-63

| Package | level1 | level2 | level3 | level4 | level5 | level6 | level7 | level8 | Cardinality | Data Type Name |
|---|---|---|---|---|---|---|---|---|---|---|
| | | | | | | Accept-ableFulfill-mentPeriod 731986 | | | 0..1 731988 | DateTimePeriod 731990 |
| | | | | | | PeriodRole Code 731992 | | | 1 731994 | PeriodRoleCode 731996 |
| Transportation-GoodsInformation 731998 | | | | Product-Informa-tion 732000 | | | | | 0..n 732002 | ... |
| | | | | | Product 732004 | | | | 0..1 732006 | BusinessTransac-tionDocumentPro-duct 732008 |
| | | | | | Product-Description 732010 | | | | 0..1 732012 | SHORT_Descrip-tion 732014 |
| | | | | Trans-porta-tionGood sI-dentifica-tion 732016 | | | | | 0..n 732018 | ... |

FIG. 73-64

| Package | level1 | level2 | level3 | level4 | level5 | level6 | level7 | level8 | Cardinality | Data Type Name |
|---|---|---|---|---|---|---|---|---|---|---|
| | | | | | Transporta-tionGood-sIdentifier-TypeCode 732020 | | | | 1 732022 | Transportation-GoodsIdentifier-TypeCode 732024 |
| | | | | | Lower-Boundary-Transporta-tionGood-sID 732026 | | | | 1 732028 | Transportation-GoodsID 732030 |
| | | | | | Upper-Boundary-Transporta-tionGood-sID 732032 | | | | 0..1 732034 | Transportation-GoodsID 732036 |
| Transportation-ChargesInformation 732038 | | | Trans-porta-tionChar gesInfor mation 732040 | | | | | | 0..n 732042 | ... |

FIG. 73-65

| Package | level1 | level2 | level3 | level4 | level5 | level6 | level7 | level8 | Cardinality | Data Type Name |
|---|---|---|---|---|---|---|---|---|---|---|
| | | | | Trans-porta-tionChar ge-sUsage-Code 732044 | | | | | 1 732046 | Transportation-ChargesUsage-Code 732048 |
| | | | | Trans-porta-tionBook-ingRe-ques-tItemID 732050 | | | | | 0..1 732052 | BusinessTransac-tionDocumen-tItemID 732054 |
| | | | | Trans-porta-tionBook-ingRe-questPart yStan-dardID 732056 | | | | | 0..1 732058 | PartyStandardID 732060 |

FIG. 73-66

| Package | level1 | level2 | level3 | level4 | level5 | level6 | level7 | level8 | Cardinality | Data Type Name |
|---|---|---|---|---|---|---|---|---|---|---|
| | | | | Trans-porta-tionBook-ingRe-quest-Party-Inter-nalID 732062 | | | | | 0,,1 732064 | PartyInternalID 732066 |
| | | | | Trans-porta-tionBook-ingRe-questRe-sourceIn-forma-tionID 732068 | | | | | 0..1 732070 | ResourceInforma-tionID 732072 |
| | | | | Trans-porta-tionBook-ingRe-quest-Package-Informa-tionID 732074 | | | | | 0..1 732076 | PackageInforma-tionID 732078 |

FIG. 73-67

| Package | level1 | level2 | level3 | level4 | level5 | level6 | level7 | level8 | Cardinality | Data Type Name |
|---|---|---|---|---|---|---|---|---|---|---|
| | | | | Trans-porta-tionBook-ingRe-quest-Trans-porta-tionStage ID 732080 | | | | | 0..1 732082 | Transportation-StageID 732084 |
| | | | | Trans-porta-tionChar ges 732086 | | | | | 0..1 732088 | ... |
| | | | | | ID 732090 | | | | 1 732092 | Transportation-ChargesID 732094 |
| | | | | | FreightA-greemen-tID 732096 | | | | 1 732098 | FreightAgreemen-tID 732100 |
| | | | | | OriginCode 732102 | | | | 0..1 732104 | Transportation-ChargesOrigin-Code 732106 |

FIG. 73-68

| Package | level1 | level2 | level3 | level4 | level5 | level6 | level7 | level8 | Cardinality | Data Type Name |
|---|---|---|---|---|---|---|---|---|---|---|
| | | | | | TariffID 732108 | | | | 0..1 732110 | Transportation-ChargesTariffID 732112 |
| | | | | | Calculation SheetID 732114 | | | | 1 732116 | Transportation-ChargesCalcula-tionSheetID 732118 |
| | | | | | Location 732120 | | | | 0..n 732122 | ... |
| | | | | | | Location 732124 | | | 1 732126 | BusinessTransac-tionDocumentLoca-tion 732128 |
| | | | | | | RoleCode 732130 | | | 1 732132 | LoactionRoleCode 732134 |
| | | | | | | TypeCode 732136 | | | 0..1 732138 | LocationTypeCode 732140 |
| | | | | | | Name 732142 | | | 0..1 732144 | MEDIUM_Name 732146 |
| | | | | | | DateTimeP eriods 732148 | | | 0..n 732150 | ... |

FIG. 73-69

| Package | level1 | level2 | level3 | level4 | level5 | level6 | level7 | level8 | Cardinality | Data Type Name |
|---|---|---|---|---|---|---|---|---|---|---|
| | | | | | | | Request-edFulfill-mentPe-riod 732152 | | 0..1 732154 | DateTimePeriod 732156 |
| | | | | | | | Accept-ableFul-fillment-Period 732158 | | 0..1 732160 | DateTimePeriod 732162 |
| | | | | | | | Pe-riodRole-Code 732164 | | 1 732166 | PeriodRoleCode 732168 |
| | | | | | TextCollec-tion 732170 | | | | 0..1 732172 | ... |
| | | | | | | TextCollec-tion 732174 | | | 1 732176 | TextCollection 732178 |
| | | | | | Currency 732180 | | | | 0..n 732182 | ... |
| | | | | | | Code 732184 | | | 1 732186 | CurrencyCode 732188 |

FIG. 73-70

| Package | level1 | level2 | level3 | level4 | level5 | level6 | level7 | level8 | Cardinality | Data Type Name |
|---|---|---|---|---|---|---|---|---|---|---|
| | | | | | | RoleCode 732190 | | | 1 732192 | CurrencyRoleCode 732194 |
| | | | | | | Usage-Code 732196 | | | 0..1 732198 | CurrencyUsage-Code 732200 |
| | | | | | ExchangeRate 732202 | | | | 0..n 732204 | ... |
| | | | | | | ExchangeRate 732206 | | | 1 732208 | ExchangeRate 732210 |
| | | | | | | TypeCode 732212 | | | 0..1 732214 | ExchangeR-ateTypeCode 732216 |
| | | | | | Percen-tElement 732218 | | | | 0..n 732220 | ... |
| | | | | | | Percen-tRoleCode 732222 | | | 1 732224 | PercentRoleCode 732226 |
| | | | | | | Percent 732228 | | | 1 732230 | Percent 732232 |

FIG. 73-71

| Package | level1 | level2 | level3 | level4 | level5 | level6 | level7 | level8 | Cardinality | Data Type Name |
|---|---|---|---|---|---|---|---|---|---|---|
| | | | | | | Transporta-tion-Charges-Percent-Calcula-tionBase-Code 732234 | | | 0..1 732236 | Transportation-ChargesPercent-CalculationBase-Code 732238 |
| | | | | | | Status-Code 732240 | | | 0..1 732242 | Transportation-ChargesPercen-tElementStatus-Code 732244 |
| | | | | | DateTimeP eriod 732246 | | | | 0..n 732248 | ... |
| | | | | | | DateTimeP eriod 732250 | | | 1 732252 | DateTimePeriod 732254 |
| | | | | | | PeriodRole Code 732256 | | | 1 732258 | PeriodRoleCode 732260 |

FIG. 73-72

| Package | level1 | level2 | level3 | level4 | level5 | level6 | level7 | level8 | Cardinality | Data Type Name |
|---|---|---|---|---|---|---|---|---|---|---|
| | | | | | Business-Transac-tionDocu-men-tReference 732262 | | | | 0..n 732264 | ... |
| | | | | | | Business-Transac-tionDocu-men-tReference 732266 | | | 0..1 732268 | BusinessTransac-tionDocumen-tReference 732270 |
| | | | | | | Business-Transac-tionDocu-mentRela-tionshi-pRoleCode 732272 | | | 0..1 732274 | BusinessTransac-tionDocumentRela-tionshipRoleCode 732276 |
| | | | | | | Business-Transac-tionDocu-mentRela-tionship-TypeCode 732278 | | | 0..1 732280 | BusinessTransac-tionDocumentRela-tionshipTypeCode 732282 |

FIG. 73-73

| Package | level1 | level2 | level3 | level4 | level5 | level6 | level7 | level8 | Cardinality | Data Type Name |
|---|---|---|---|---|---|---|---|---|---|---|
| | | | | | | Transporta-tionDocu-mentType-Code 732284 | | | 0..1 732286 | Transportation-DocumentType-Code 732288 |
| | | | | | | Transporta-tionDocu-mentNote 732290 | | | 0..1 732292 | SHORT_Note 732294 |
| | | | | | | Transporta-tionDocu-mentID 732296 | | | 0..1 732298 | Transportation-DocumentID 732300 |
| | | | | | TaxDetail 732302 | | | | 0..n 732304 | ... |
| | | | | | | ProductTax 732306 | | | 1 732308 | ProductTax 732310 |
| | | | | | PaymentIn-struction 732312 | | | | 0..n 732314 | ... |
| | | | | | | PaymentIn-struction 732316 | | | 1 732318 | PaymentInstruction 732320 |

FIG. 73-74

| Package | level1 | level2 | level3 | level4 | level5 | level6 | level7 | level8 | Cardinality | Data Type Name |
|---|---|---|---|---|---|---|---|---|---|---|
| | | | | | | Transporta-tion-ChargesE-lement-Category-Code 732322 | | | 0..1 732324 | Transportation-ChargesElement-CategoryCode 732326 |
| | | | | | | Transporta-tion-ChargesE-le-mentSubC ategory-Code 732328 | | | 0..1 732330 | Transportation-ChargesEle-mentSubCategory-Code 732332 |
| | | | | | | Transporta-tion-ChargesPa ymentAr-range-mentCode 732334 | | | 0..1 732336 | Transportation-ChargesPaymen-tArrangementCode 732338 |
| | | | | | CashDis-count-Terms 732340 | | | | 0..1 732342 | ... |

FIG. 73-75

| Package | level1 | level2 | level3 | level4 | level5 | level6 | level7 | level8 | Cardinality | Data Type Name |
|---|---|---|---|---|---|---|---|---|---|---|
| | | | | | | CashDiscount-Terms 732344 | | | 1 732346 | CashDiscount-Terms 732348 |
| | | | | | | Transportation-ChargesElement-Category-Code 732350 | | | 0..1 732352 | Transportation-ChargesElement-CategoryCode 732354 |
| | | | | | | Transportation-ChargesElementSubCategory-Code 732356 | | | 0..1 732358 | Transportation-ChargesElementSubCategory-Code 732360 |
| | | | | | Element 732362 | | | | 0..n 732364 | ... |
| | | | | | | Category-Code 732366 | | | 1 732368 | Transportation-ChargesElement-CategoryCode 732370 |

FIG. 73-76

| Package | level1 | level2 | level3 | level4 | level5 | level6 | level7 | level8 | Cardinality | Data Type Name |
|---|---|---|---|---|---|---|---|---|---|---|
| | | | | | | SubCategoryCode 732372 | | | 1 732374 | TransportationChargesElementSubCategoryCode 732376 |
| | | | | | | TypeCode 732378 | | | 1 732380 | TransportationChargesElementTypeCode 732382 |
| | | | | | | CalculationResolutionCode 732384 | | | 1 732386 | TransportationChargesElementCalculationResolutionCode 732388 |
| | | | | | | TransportationChargesPaymentArrangementCode 732390 | | | 0...1 732392 | TransportationChargesPaymentArrangementCode 732394 |
| | ... | | | | | Location 732396 | | | 0..n 732398 | ... |

FIG. 73-77

| Package | level1 | level2 | level3 | level4 | level5 | level6 | level7 | level8 | Cardinality | Data Type Name |
|---|---|---|---|---|---|---|---|---|---|---|
| | | | | | | | Location 732400 | | 1 732402 | BusinessTransactionDocumentLocation 732404 |
| | | | | | | | RoleCode 732406 | | 1 732408 | LocationRoleCode 732410 |
| | | | | | | | TypeCode 732412 | | 0..1 732414 | LocationTypeCode 732416 |
| | | | | | | | Name 732418 | | 0..1 732420 | MEDIUM_Name 732422 |
| | | | | | | | DateTimePeriods 732424 | | 0..n 732426 | ... |
| | | | | | | | | RequestedFulfillmentPeriod 732428 | 0..1 732430 | DateTimePeriod 732432 |
| | | | | | | | | AcceptableFulfillmentPeriod 732434 | 0..1 732436 | DateTimePeriod 732438 |

FIG. 73-78

| Package | level1 | level2 | level3 | level4 | level5 | level6 | level7 | level8 | Cardinality | Data Type Name |
|---|---|---|---|---|---|---|---|---|---|---|
| | | | | | | | | PeriodRoleCode 732440 | 1 732442 | PeriodRoleCode 732444 |
| | | | | | | TextCollection 732446 | | | 0..1 732448 | ... |
| | | | | | | | TextCollection 732450 | | 1 732452 | TextCollection 732454 |
| | | | | | | Currency 732456 | | | 0..n 732458 | ... |
| | | | | | | | Code 732460 | | 1 732462 | CurrencyCode 732464 |
| | | | | | | | RoleCode 732466 | | 1 732468 | CurrencyRoleCode 732470 |
| | | | | | | | UsageCode 732472 | | 0..1 732474 | CurrencyUsageCode 732476 |
| | | | | | | RateElement 732478 | | | 0..n 732480 | ... |

FIG. 73-79

| Package | level1 | level2 | level3 | level4 | level5 | level6 | level7 | level8 | Cardinality | Data Type Name |
|---|---|---|---|---|---|---|---|---|---|---|
| | | | | | | | ID 732482 | | 1 732484 | Transportation-ChargesElemen-tRateElementID 732486 |
| | | | | | | | Amount 732488 | | 1 732490 | Amount 732492 |
| | | | | | | | Base-Quantity 732494 | | 1 732496 | Quantity 732498 |
| | | | | | | | Trans-porta-tionChar ges-RateTyp eCode 732500 | | 0..1 732502 | Transportation-Charges-RateTypeCode 732504 |
| | | | | | | | Trans-porta-tionChar ges-RateRole Code 732506 | | 1 732508 | Transportation-ChargesRateRole-Code 732510 |

FIG. 73-80

| Package | level1 | level2 | level3 | level4 | level5 | level6 | level7 | level8 | Cardinality | Data Type Name |
|---|---|---|---|---|---|---|---|---|---|---|
| | | | | | | | Trans-porta-tionCharges-RateEle-ment-Status-Code 732512 | | 0..1 732514 | Transportation-ChargesRateEle-mentStatusCode 732516 |
| | | | | | | Percen-tElement 732518 | | | 0..n 732520 | ... |
| | | | | | | | Percen-tRole-Code 732522 | | 1 732524 | PercentRoleCode 732526 |
| | | | | | | | Percent 732528 | | 1 732530 | Percent 732532 |
| | | | | | | | Trans-porta-tionCharges-Percent-Calcula-tionBase-Code 732534 | | 0..1 732536 | Transportation-ChargesPercent-CalculationBase-Code 732538 |

FIG. 73-81

| Package | level1 | level2 | level3 | level4 | level5 | level6 | level7 | level8 | Cardinality | Data Type Name |
|---|---|---|---|---|---|---|---|---|---|---|
| | | | | | | | Status-Code 732540 | | 0..1 732542 | Transportation-ChargesPercen-tElementStatus-Code 732544 |
| | | | | | | Amoun-tElement 732546 | | | 0..n 732548 | ... |
| | | | | | | | Amount 732550 | | 1 732552 | Amount 732554 |
| | | | | | | | Amoun-tRole-Code 732556 | | 1 732558 | AmountRoleCode 732560 |
| | | | | | | | Trans-porta-tionChar ge-sAmoun-tElement-Status-Code 732562 | | 0..1 732564 | Transportation-ChargesAmoun-tElementStatus-Code 732566 |

FIG. 73-82

| Package | level1 | level2 | level3 | level4 | level5 | level6 | level7 | level8 | Cardinality | Data Type Name |
|---|---|---|---|---|---|---|---|---|---|---|
| | | | | | | | RateElementAssignment 732568 | | 0..n 732570 | ... |
| | | | | | | | | TransportationChargesElementRateElementID 732572 | 1 732574 | TransportationChargesElementRateElementID 732576 |
| | | | | | | CalculationBase 732578 | | | 0..n 732580 | ... |
| | | | | | | | TransportationChargesElementCalculationBaseCode 732582 | | 1 732584 | TransportationChargesElementCalculationBaseCode 732586 |
| | | | | | | | BaseQuantity 732588 | | 0..1 732590 | Quantity 732592 |

FIG. 73-83

| Package | level1 | level2 | level3 | level4 | level5 | level6 | level7 | level8 | Cardinality | Data Type Name |
|---|---|---|---|---|---|---|---|---|---|---|
| | | | | | | | Base-Quanti-tyRole-Code 732594 | | 0..1 732596 | QuantityRoleCode 732598 |
| | | | | | | | Base-Quanti-tyType-Code 732600 | | 0..1 732602 | QuantityTypeCode 732604 |
| | | | | | | TaxDetail 732606 | | | 0..n 732608 | ... |
| | | | | | | | Pro-ductTax 732610 | | 1 732612 | ProductTax 732614 |
| | | | | | | DateTimeP eriod 732616 | | | 0..n 732618 | ... |
| | | | | | | | DateTim ePeriod 732620 | | 1 732622 | DateTimePeriod 732624 |
| | | | | | | | Pe-riodRole-Code 732626 | | 1 732628 | PeriodRoleCode 732630 |

FIG. 73-84

| Package | level1 | level2 | level3 | level4 | level5 | level6 | level7 | level8 | Cardinality | Data Type Name |
|---|---|---|---|---|---|---|---|---|---|---|
| | | | | | | CostDistribution 732632 | | | 0..n 732634 | … |
| | | | | | | | AccountingCodingBlockAssignment 732636 | | 1 732638 | AccountingCodingBlockAssignment 732640 |

MANAGING CONSISTENT INTERFACES FOR SUPPLY CHAIN MANAGEMENT BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a computer readable medium includes program code for providing a message-based interface for performing a freight request service. The interface exposes at least one service as defined in a service registry, wherein upon execution the program code executes in an environment of computer systems providing message-based services and comprises. The program code receives, from a service consumer, a first message for processing freight requests from an ordering party to a transportation service provider to ship goods from shippers to consignees. The program code invokes a freight request business object. The business object is a logically centralized, semantically disjointed object for representing a request from an ordering party to a transportation service provider to ship goods from shippers to consignees. The business object comprises data logically organized as a freight request root node and at least one subordinate node, including a confirmation subordinate node, each subordinate node having zero or more hierarchically more structured subordinate nodes. Program code initiates transmission of a message to a heterogeneous second application, executing in the environment of computer systems providing message-based services, based on the data in the freight request business object. The message comprises a freight request request message entity, a message header package, and a freight request package.

In a second aspect, a computer readable medium includes program code for providing a message-based interface for performing a freight request service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a freight request business object invoked by the second application. The business object is a logically centralized, semantically disjointed object for representing a request from an ordering party to a transportation service provider to ship goods from shippers to consignees. The business object comprises data logically organized as a freight request root node and at least one subordinate node, including a confirmation subordinate node, each subordinate node having zero or more hierarchically more structured subordinate nodes. The message comprises a freight request request message entity, a message header package, and a freight request package. Program code receives a second message from the second application, the second message associated with the invoked freight request business object and in response to the first message.

In a third aspect, a distributed system operates in a landscape of computer systems provides message-based services. The system processes business objects involving processing freight requests from an ordering party to a transportation service provider to ship goods from shippers to consignees. The system comprises memory and a graphical user interface remote from the memory. The memory stores a business object repository storing a plurality of business objects. Each business object is a logically centralized, semantically disjointed object of a particular business object type. At least one of the business objects is for representing a request from an ordering party to a transportation service provider to ship goods from shippers to consignees. The business object comprises data logically organized as a freight request root node and at least one subordinate node, including a confirmation subordinate node, each subordinate node having zero or more hierarchically more structured subordinate nodes. Program code initiates transmission of a message to a heterogeneous second application, executing in the environment of computer systems providing message-based services, based on the data in the house shipment business object, the message comprising a waybill notification message entity, a message header package, and a house shipment package. The graphical user interface presents data associated with an invoked instance of the house shipment business object, the interface comprising computer readable instructions embodied on tangible media.

In a fourth aspect, a computer readable medium includes program code for providing a message-based interface for performing a house shipment service. The interface exposes at least one service as defined in a service registry, wherein upon execution the program code executes in an environment of computer systems providing message-based services. The program code receives, from a service consumer, a first message for processing information for transportation services tendered between transportation service providers. The program code invokes a house shipment business object. The business object is a logically centralized, semantically disjointed object for representing information for transportation services tendered between transportation service providers. The business object comprises data logically organized as a house shipment root node and at least one subordinate node, including a nature of cargo subordinate node, each subordinate node having zero or more hierarchically more structured subordinate nodes. Program code initiates transmission of a message to a heterogeneous second application, executing in the environment of computer systems providing message-based services, based on the data in the house shipment business object. The message comprises a waybill notification message entity, a message header package, and a house shipment package.

In a fifth aspect, a computer readable medium includes program code for providing a message-based interface for performing a house shipment service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a house shipment business object invoked by the second application. The business object is a logically centralized, semantically disjointed object for representing transportation services tendered between transportation service providers. The business object comprises data logically organized as a house shipment root node and at least one subordinate node, including a nature of cargo subordinate node, each subordinate node having zero or more hierarchically more structured subordinate nodes. The message comprises a waybill notification message entity, a message header package, and a house shipment package. Program code receives a second message from the second application, the second message associated with the invoked house shipment business object and in response to the first message.

In a sixth aspect, a distributed system operates in a landscape of computer systems provides message-based services. The system processes business objects involving processing information for transportation services tendered between transportation service providers. The system comprises memory and a graphical user interface remote from the memory. The memory stores a business object repository storing a plurality of business objects. Each business object is a logically centralized, semantically disjointed object of a particular business object type. At least one of the business objects is for representing transportation services tendered between transportation service providers. The business object comprises data logically organized as a house shipment root node and at least one subordinate node, including a nature of cargo subordinate node, each subordinate node having zero or more hierarchically more structured subordinate nodes. The graphical user interface presents data associated with an invoked instance of the house shipment business object, the interface comprising computer readable instructions embodied on tangible media.

In a seventh aspect, a computer readable medium includes program code for providing a message-based interface for performing a shipment request service. The interface exposes at least one service as defined in a service registry, wherein upon execution the program code executes in an environment of computer systems providing message-based services. The program code receives, from a service consumer, a first message for processing information used for exchange agreements and corresponding confirmations and receipt notifications on the transportation of goods from a single ship-from party to a single ship-to party between an ordering party and a transportation service provider. The program code invokes a shipment request business object. The business object is a logically centralized, semantically disjointed object for representing exchange agreements and corresponding confirmations and receipt notifications on the transportation of goods from a single ship-from party to a single ship-to party between an ordering party and a transportation service provider. The business object comprises data logically organized as a shipment request root node and at least one subordinate node, including a request subordinate node, each subordinate node having zero or more hierarchically more structured subordinate nodes. Program code initiates transmission of a message to a heterogeneous second application, executing in the environment of computer systems providing message-based services, based on the data in the shipment request business object. The message comprises a shipment request request message entity, a message header package, and a shipment request package.

In an eighth aspect, a computer readable medium includes program code for providing a message-based interface for performing a shipment request service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a shipment request business object invoked by the second application. The business object is a logically centralized, semantically disjointed object for representing exchange agreements and corresponding confirmations and receipt notifications on the transportation of goods from a single ship-from party to a single ship-to party between an ordering party and a transportation service provider. The business object comprises data logically organized as a shipment request root node and at least one subordinate node, including a request subordinate node, each subordinate node having zero or more hierarchically more structured subordinate nodes. The message comprises a shipment request request message entity, a message header package, and a shipment request package. Program code receives a second message from the second application, the second message associated with the invoked shipment request business object and in response to the first message.

In a ninth aspect, a distributed system operates in a landscape of computer systems provides message-based services. The system processes business objects involving processing information used for exchange agreements and corresponding confirmations and receipt notifications on the transportation of goods from a single ship-from party to a single ship-to party between an ordering party and a transportation service provider. The system comprises memory and a graphical user interface remote from the memory. The memory stores a business object repository storing a plurality of business objects. Each business object is a logically centralized, semantically disjointed object of a particular business object type. At least one of the business objects is for exchange agreements and corresponding confirmations and receipt notifications on the transportation of goods from a single ship-from party to a single ship-to party between an ordering party and a transportation service provider. The business object comprises data logically organized as a shipment request root node and at least one subordinate node, including a request subordinate node, each subordinate node having zero or more hierarchically more structured subordinate nodes. The graphical user interface presents data associated with an invoked instance of the shipment request business object, the interface comprising computer readable instructions embodied on tangible media.

In a tenth aspect, a computer readable medium includes program code for providing a message-based interface for performing a supplier freight invoice request service. The interface exposes at least one service as defined in a service registry, wherein upon execution the program code executes in an environment of computer systems providing message-based services. The program code receives, from a service consumer, a first message for processing information for supplier invoice processing, including calculated transportation charges and transportation data. The program code invokes a supplier freight invoice request business object. The business object is a logically centralized, semantically disjointed object for representing supplier invoice processing, including calculated transportation charges and transportation data. The business object comprises data logically organized as a supplier freight invoice request root node and at least one subordinate node, including a request subordinate node, each subordinate node having zero or more hierarchically more structured subordinate nodes. Program code initiates transmission of a message to a heterogeneous second application, executing in the environment of computer systems providing message-based services, based on the data in the supplier freight invoice request business object. The message comprises a supplier freight invoice request request message entity, a message header package, and a supplier freight invoice request package.

In an eleventh aspect, a computer readable medium includes program code for providing a message-based interface for performing a supplier freight invoice request service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a supplier freight invoice request business object invoked by the second application. The business object is a logically centralized, semantically disjointed object for representing supplier invoice processing, including calculated transportation charges and transportation data. The business object comprises data logically organized as a supplier freight invoice request root node and at least one subordinate node, including a request subordinate node, each subordinate node having zero or more hierarchically more structured subordinate nodes. The message comprises a supplier freight invoice request request message entity, a message header package, and a supplier freight invoice request package. Program code receives a second message from the second application, the second message associated with the invoked supplier freight invoice request business object and in response to the first message.

In a twelfth aspect, a distributed system operates in a landscape of computer systems provides message-based services. The system processes business objects involving processing information for supplier invoice processing, including calculated transportation charges and transportation data. The system comprises memory and a graphical user interface remote from the memory. The memory stores a business object repository storing a plurality of business objects. Each business object is a logically centralized, semantically disjointed object of a particular business object type. At least one of the business objects is for representing supplier invoice processing, including calculated transportation charges and transportation data. The business object comprises data logically organized as a supplier freight invoice request root node and at least one subordinate node, including a request subordinate node, each subordinate node having zero or more hierarchically more structured subordinate nodes. The graphical user interface presents data associated with an invoked instance of the supplier freight invoice request business object, the interface comprising computer readable instructions embodied on tangible media.

In a thirteenth aspect, a computer readable medium includes program code for providing a message-based interface for performing a transportation booking request service. The interface exposes at least one service as defined in a service registry, wherein upon execution the program code executes in an environment of computer systems providing message-based services. The program code receives, from a service consumer, a first message for processing information used to exchange agreements and the corresponding confirmations and receipt notifications to provide transportation services from an ordering party to another party. The program code invokes a transportation booking request business object. The business object is a logically centralized, semantically disjointed object for representing information used to exchange agreements and the corresponding confirmations and receipt notifications to provide transportation services from an ordering party to another party. The business object comprises data logically organized as a transportation booking request root node and at least one subordinate node, including a request subordinate node, each subordinate node having zero or more hierarchically more structured subordinate nodes. Program code initiates transmission of a message to a heterogeneous second application, executing in the environment of computer systems providing message-based services, based on the data in the transportation booking request business object. The message comprises a transportation booking request request message entity, a message header package, and a transportation booking request package.

In a fourteenth aspect, a computer readable medium includes program code for providing a message-based interface for performing a transportation booking request service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a transportation booking request business object invoked by the second application. The business object is a logically centralized, semantically disjointed object for representing information used to exchange agreements and the corresponding confirmations and receipt notifications to provide transportation services from an ordering party to another party. The business object comprises data logically organized as a transportation booking request root node and at least one subordinate node, including a request subordinate node, each subordinate node having zero or more hierarchically more structured subordinate nodes. The message comprises a transportation booking request request message entity, a message header package, and a transportation booking request package. Program code receives a second message from the second application, the second message associated with the invoked transportation booking request business object and in response to the first message.

In a fifteenth aspect, a distributed system operates in a landscape of computer systems provides message-based services. The system processes business objects involving processing information used to exchange agreements and the corresponding confirmations and receipt notifications to provide transportation services from an ordering party to another party. The system comprises memory and a graphical user interface remote from the memory. The memory stores a business object repository storing a plurality of business objects. Each business object is a logically centralized, semantically disjointed object of a particular business object type. At least one of the business objects is for representing information used to exchange agreements and the corresponding confirmations and receipt notifications to provide transportation services from an ordering party to another party. The business object comprises data logically organized as a transportation booking request root node and at least one subordinate node, including a request subordinate node, each subordinate node having zero or more hierarchically more structured subordinate nodes. The graphical user interface presents data associated with an invoked instance of the transportation booking request business object, the interface comprising computer readable instructions embodied on tangible media.

In some implementations, processing business objects includes creating, updating and/or retrieving information associated with the business objects.

BRIEF DESCRIPTION OF THE DRAWINGS

FIGS. 33-1 through 33-28 show an exemplary FreightRequestRequestMessage Message Data Type.

FIGS. 35-1 through 35-28 show an exemplary FreightRequestConfirmationMessage Message Data Type.

FIGS. 38-1 through 38-3 show an exemplary FreightRequestCancelRequestMessage Element Structure.

FIGS. 39-1 through 39-153 show an exemplary FreightRequestConfirmationMessage Element Structure.

FIGS. 40-1 through 40-5 show an exemplary FreightRequestConfirmationReceiptNotificationMessage Element Structure.

FIGS. 41-1 through 41-5 show an exemplary FreightRequestReceiptNotificationMessage Element Structure.

FIGS. 42-1 through 42-143 show an exemplary FreightRequestRequestMessage Element Structure.

FIGS. 44-1 through 44-21 show an exemplary WaybillNotificationMessage Message Data Type.

FIGS. 45-1 through 45-70 show an exemplary WaybillNotificationMessage Element Structure.

FIG. 46 shows an exemplary ShipmentRequest Message Choreography.

FIGS. 47-1 through 47-21 show an exemplary ShipmentRequestRequestMessage Message Data Type.

FIG. 48 shows an exemplary ShipmentRequestCancelRequestMessage Message Data Type.

FIGS. 49-1 through 49-21 show an exemplary ShipmentRequestConfirmationMessage Message Data Type.

FIG. 50 shows an exemplary ShipmentRequestReceiptNotificationMessage Message Data Type.

FIGS. 51-1 through 51-3 show an exemplary ShipmentRequestCancelRequestMessage Element Structure.

FIGS. 52-1 through 52-77 show an exemplary ShipmentRequestConfirmationMessage Element Structure.

FIGS. 53-1 through 53-5 show an exemplary ShipmentRequestConfirmationReceiptNotificationMessage Element Structure.

FIGS. 54-1 through 54-5 show an exemplary ShipmentRequestReceiptNotificationMessage Element Structure.

FIGS. 55-1 through 55-72 show an exemplary ShipmentRequestRequestMessage Element Structure.

FIG. 56 shows an exemplary Freight Invoice Request Message Choreography.

FIGS. 57-1 through 57-18 show an exemplary SupplierFreightInvoiceRequestRequestMessage Message Data Type.

FIG. 58 shows an exemplary SupplierFreightInvoiceRequestCancelRequestMessage Message Data Type.

FIG. 59 shows an exemplary SupplierFreightInvoiceRequestConfirmationMessage Message Data Type.

FIGS. 60-1 through 60-3 show an exemplary SupplierFreightInvoiceRequestCancelRequestMessage Element Structure.

FIGS. 61-1 through 61-3 show an exemplary SupplierFreightInvoiceRequestConfirmationMessage Element Structure.

FIGS. 62-1 through 62-74 show an exemplary SupplierFreightInvoiceRequestRequestMessage Element Structure.

FIG. 63 shows an exemplary TransportationBookingRequest Message Choreography.

FIGS. 64-1 through 64-18 show an exemplary TransportationBookingRequestRequestMessage Message Data Type.

FIG. 65 shows an exemplary TransportationBookingRequestCancelRequestMessage Message Data Type.

FIGS. 66-1 through 66-18 show an exemplary TransportationBookingRequestConfirmationMessage Message Data Type.

FIG. 67 shows an exemplary TransportationBookingRequestReceiptNotificationMessage Message Data Type.

FIG. 68 shows an exemplary TransportationBookingRequestConfirmationReceiptNotificationMessage Message Data Type.

FIGS. 69-1 through 69-3 show an exemplary TransportationBookingRequestCancelRequestMessage Element Structure.

FIGS. 70-1 through 70-83 show an exemplary TransportationBookingRequestConfirmationMessage Element Structure.

FIGS. 71-1 through 71-5 show an exemplary TransportationBookingRequestConfirmationReceiptNotificationMessage Element Structure.

FIGS. 72-1 through 72-5 show an exemplary TransportationBookingRequestReceiptNotificationMessage Element Structure.

FIGS. 73-1 through 73-84 show an exemplary TransportationBookingRequestRequestMessage Element Structure.

DETAILED DESCRIPTION

A. Overview

Figure 1:
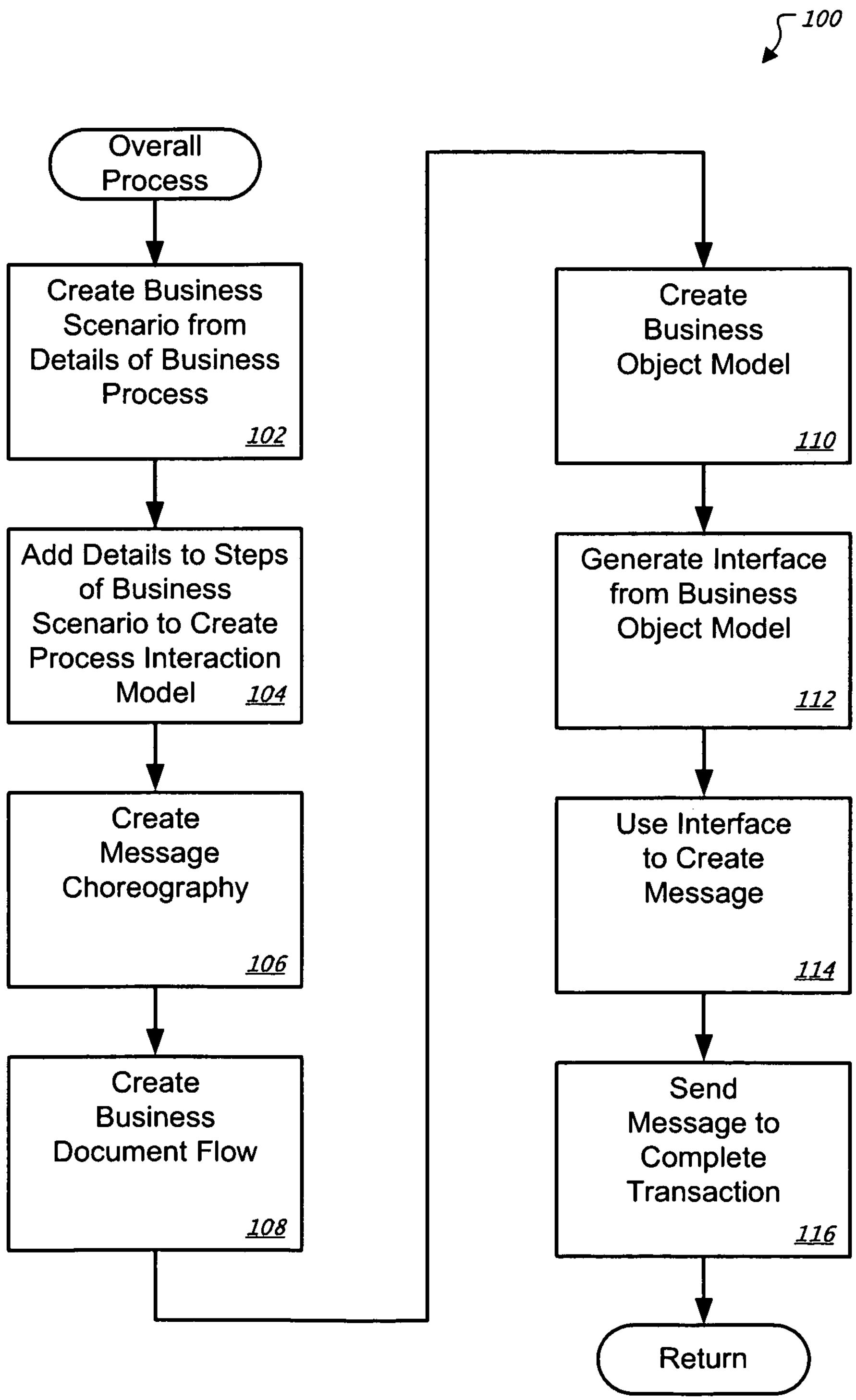
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. For example, the methods and systems consistent with the subject matter described herein can be used in Supply Chain Management (SCM). To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
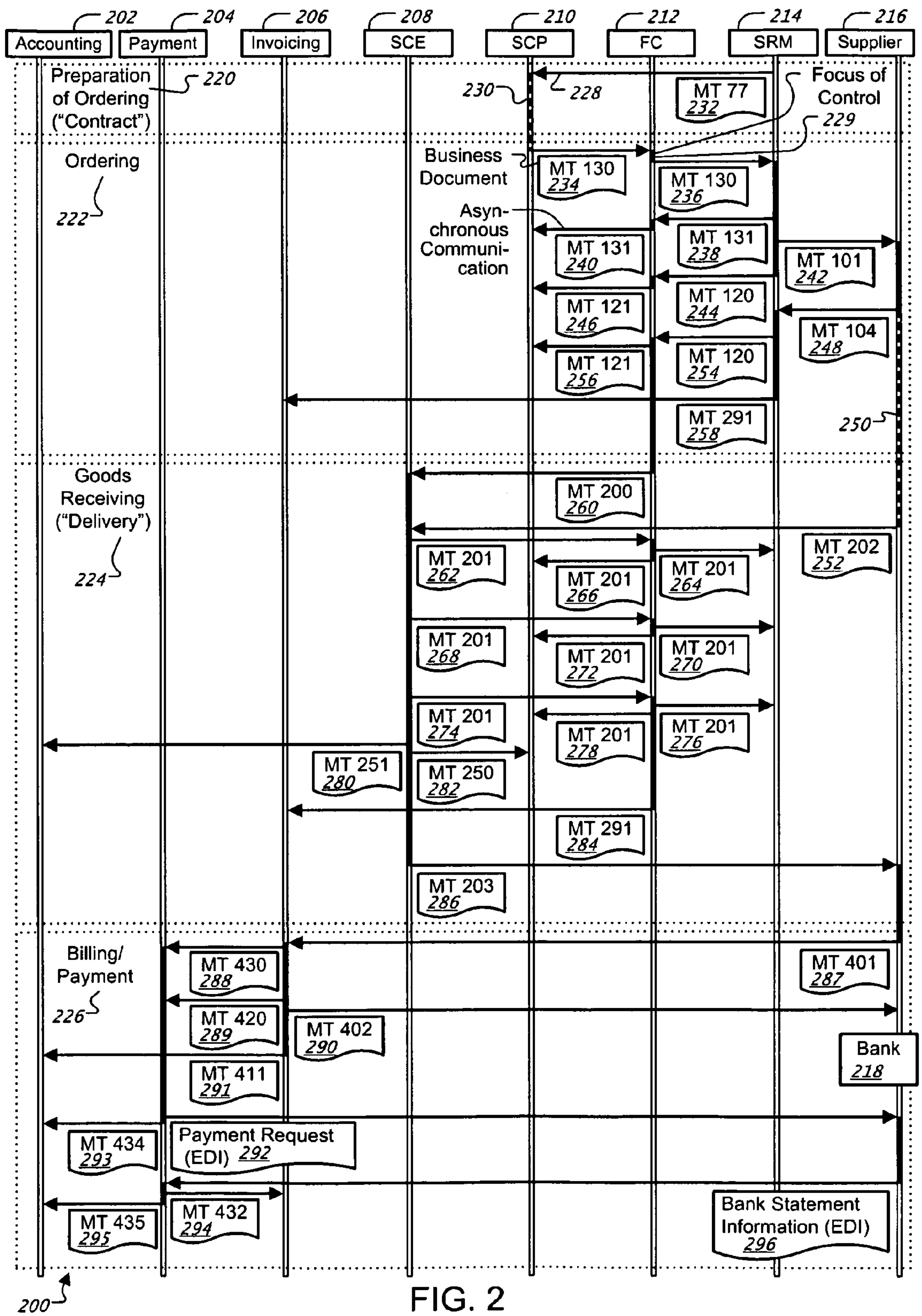
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
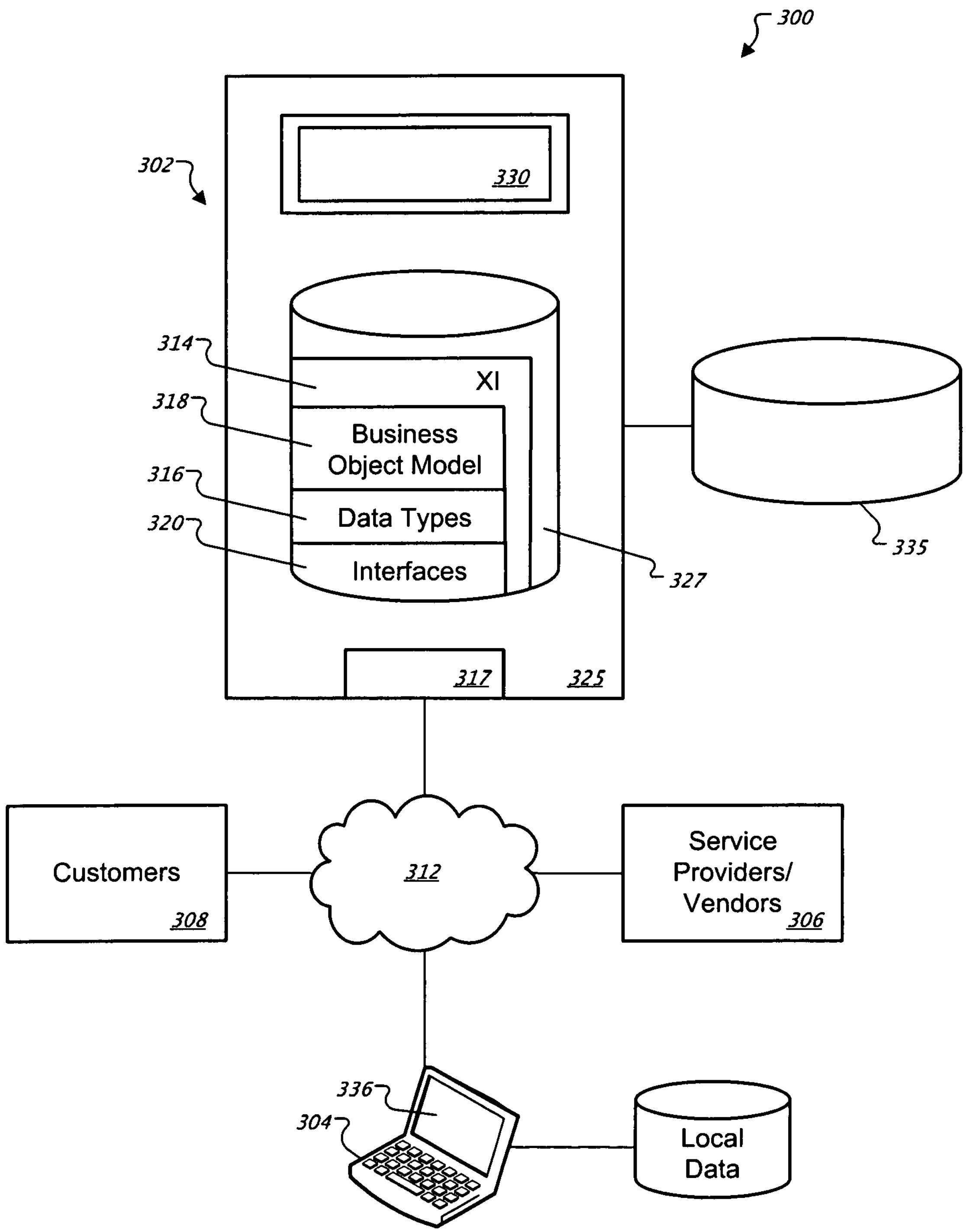
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)TM and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
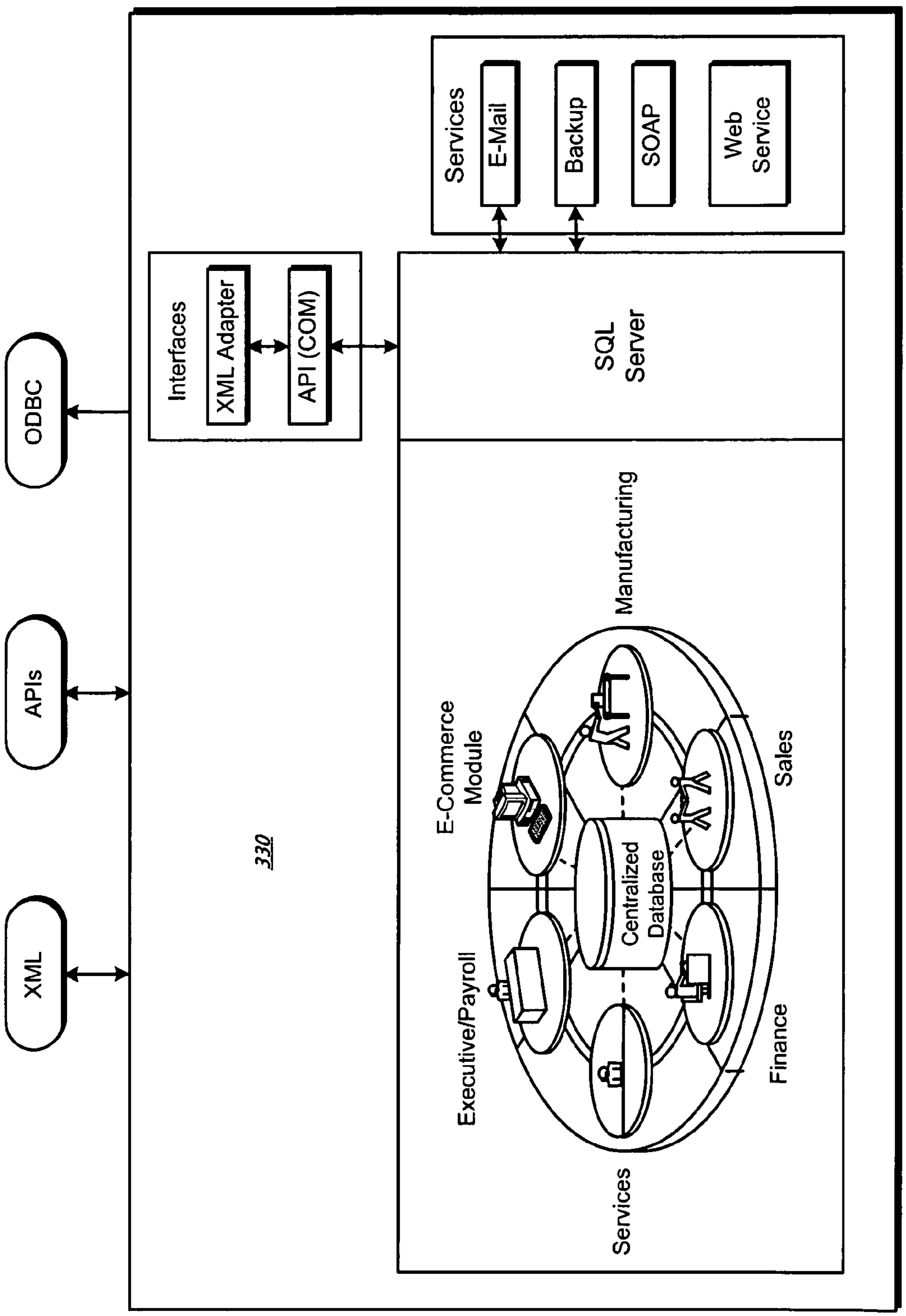
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4 GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more “local” repositories through one sub-net while communicably coupled to a particular client 304 or “remote” repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, “client 304,” “business,” “business analyst,” “end user,” and “user” may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
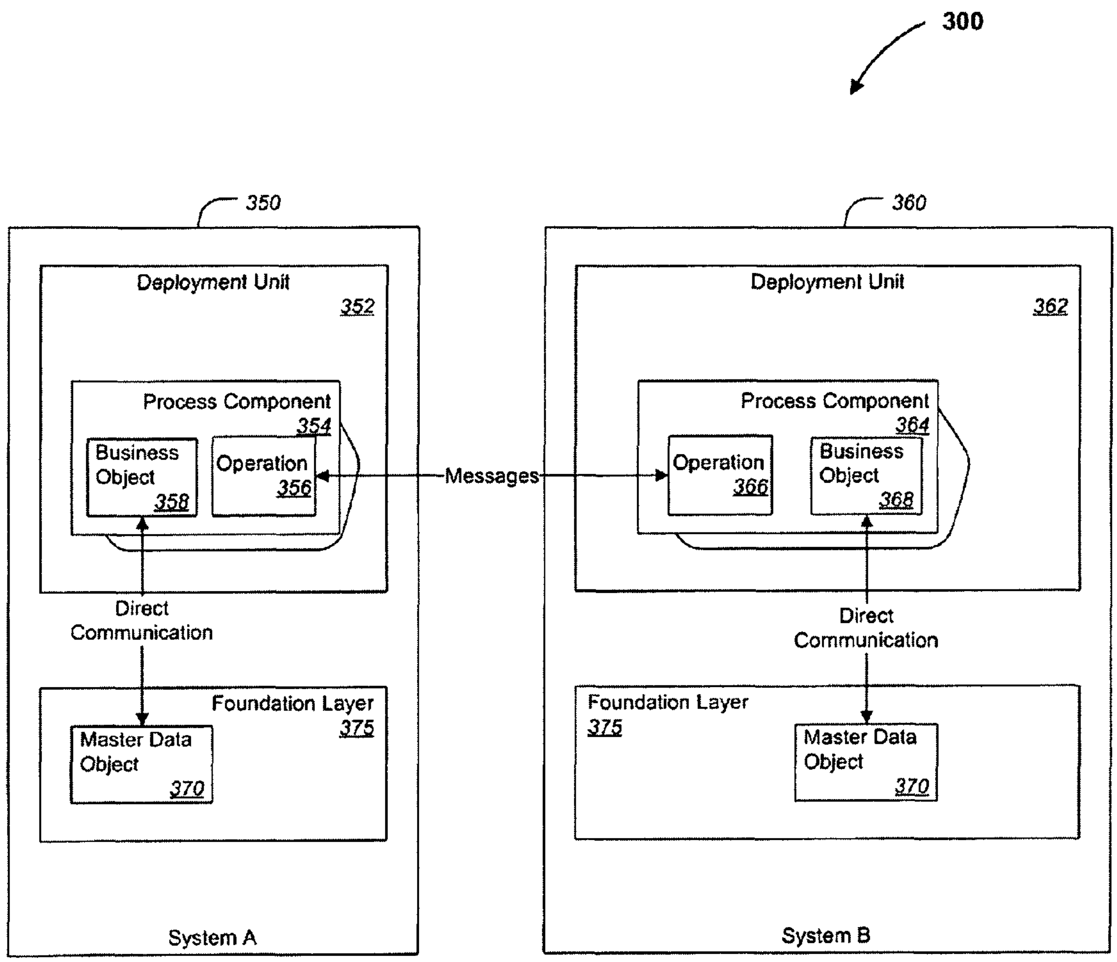

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
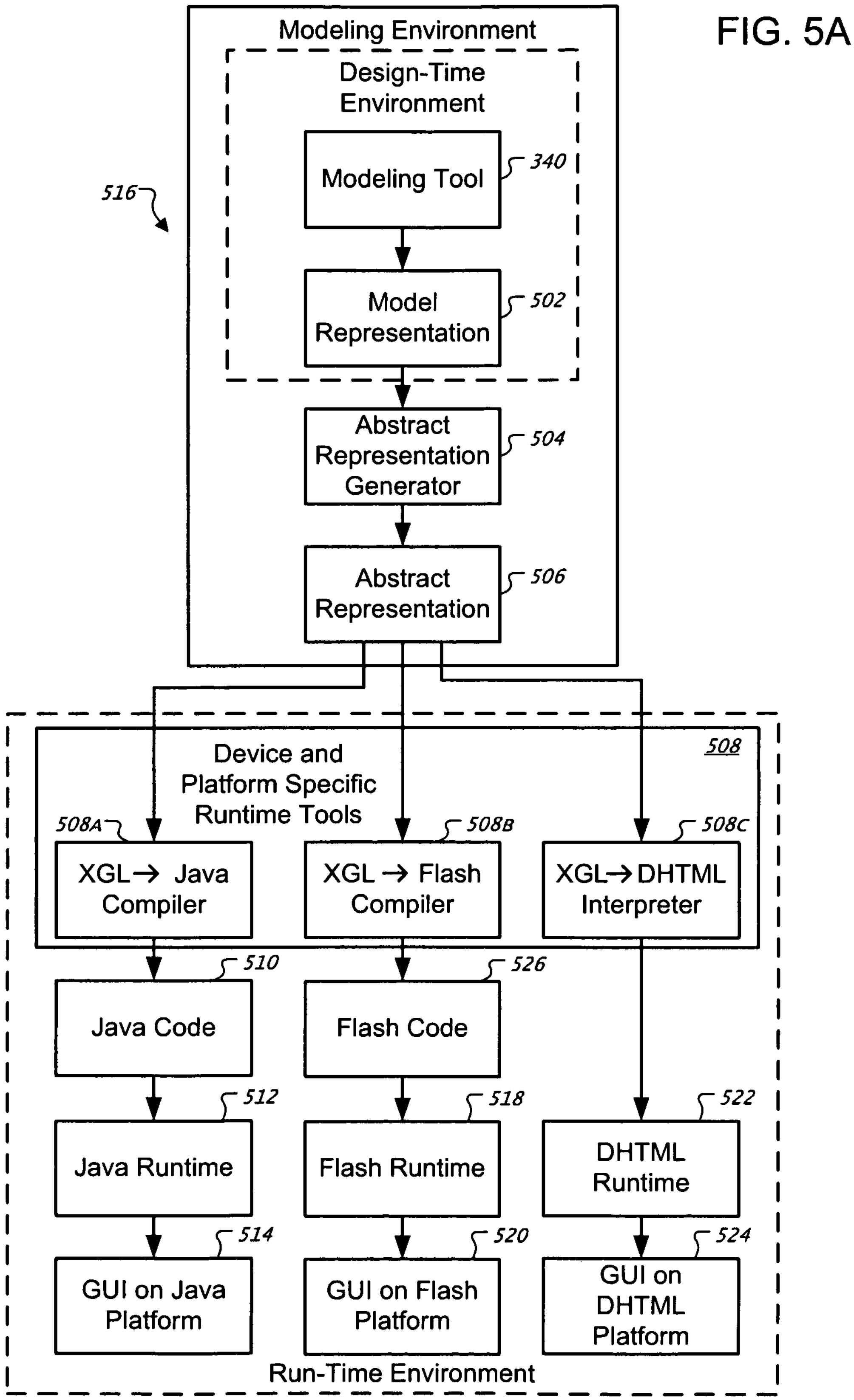
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
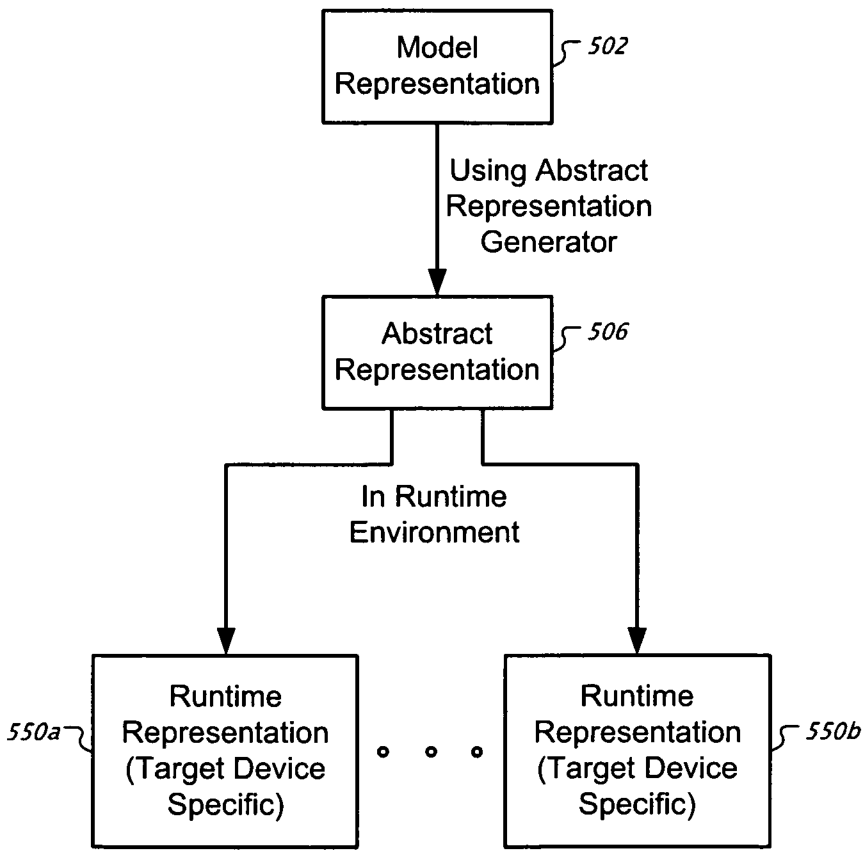
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550a, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
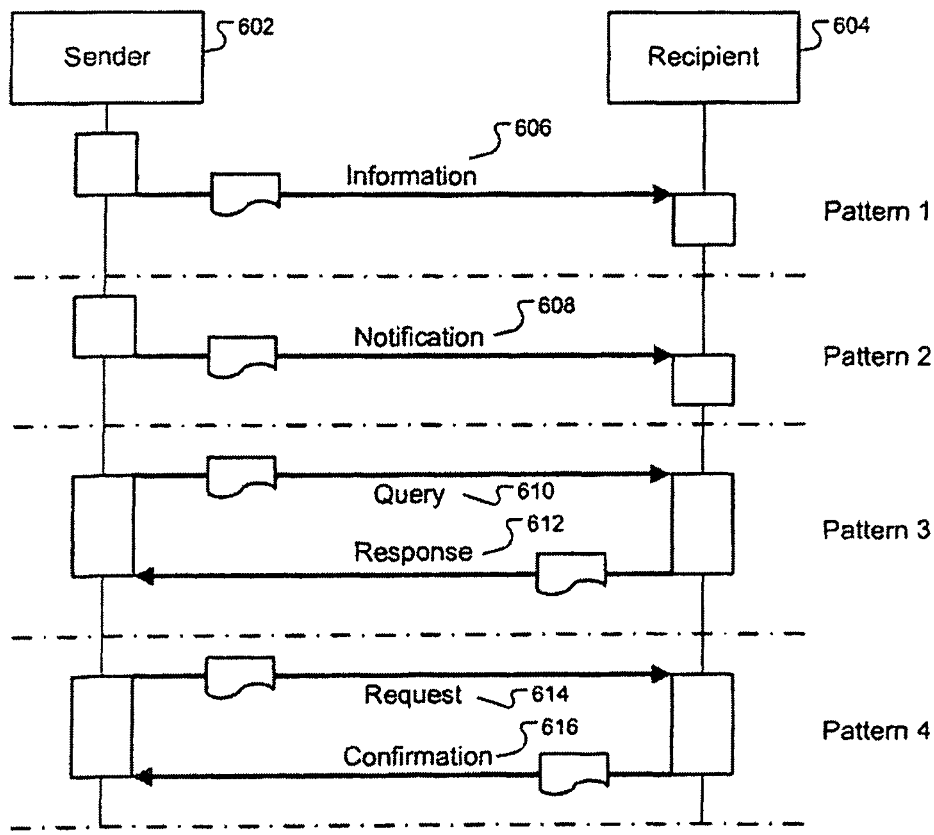
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
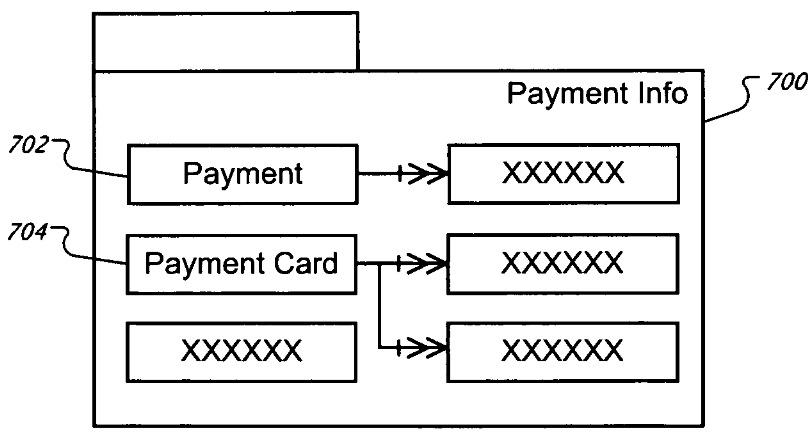
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
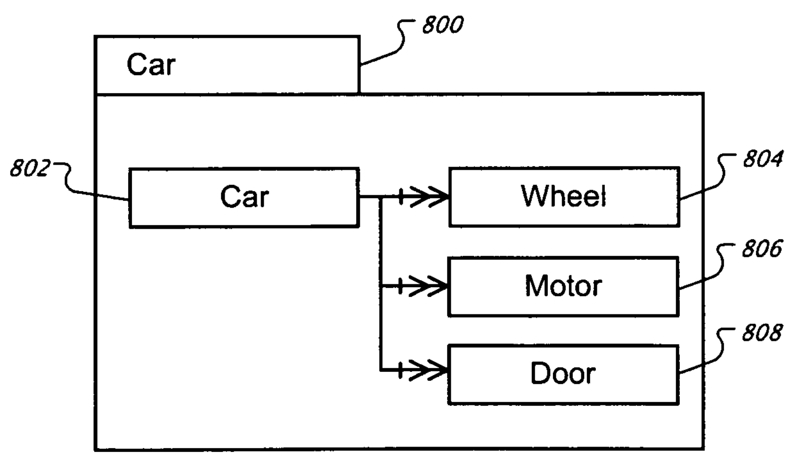
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
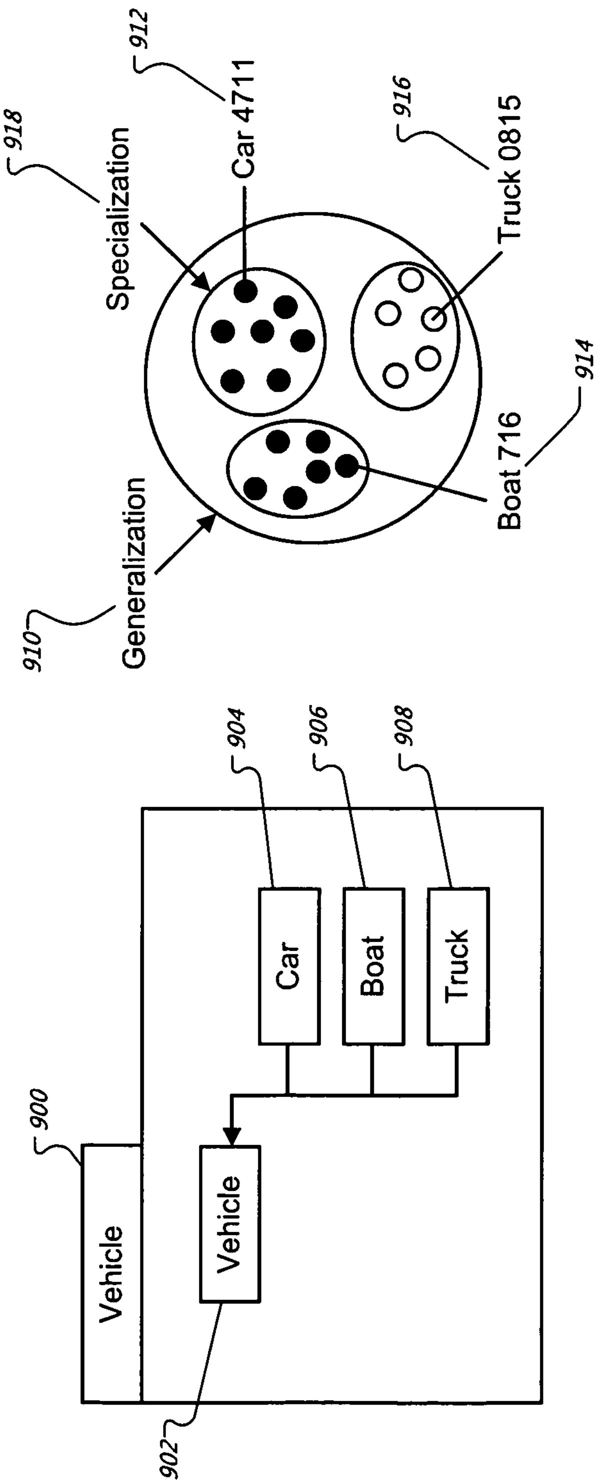
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
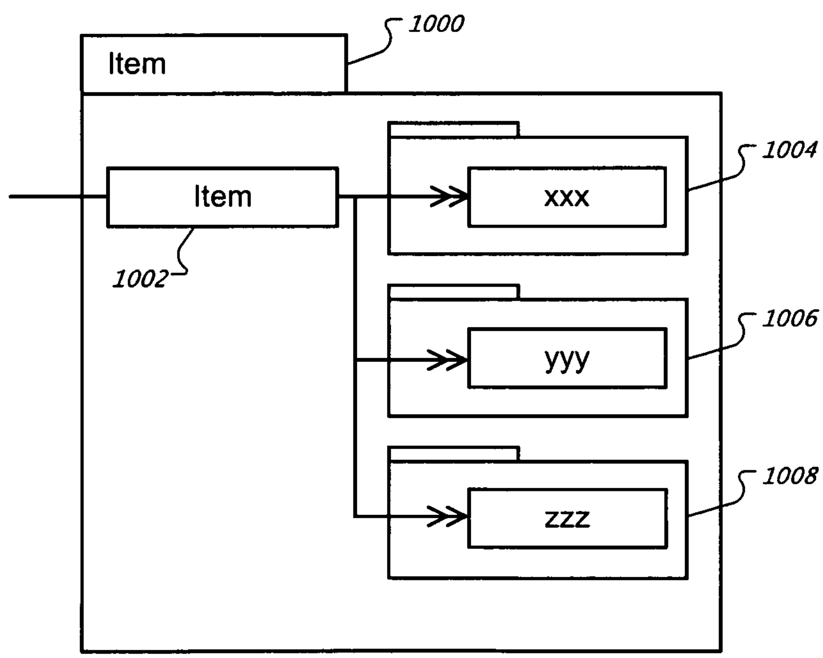
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
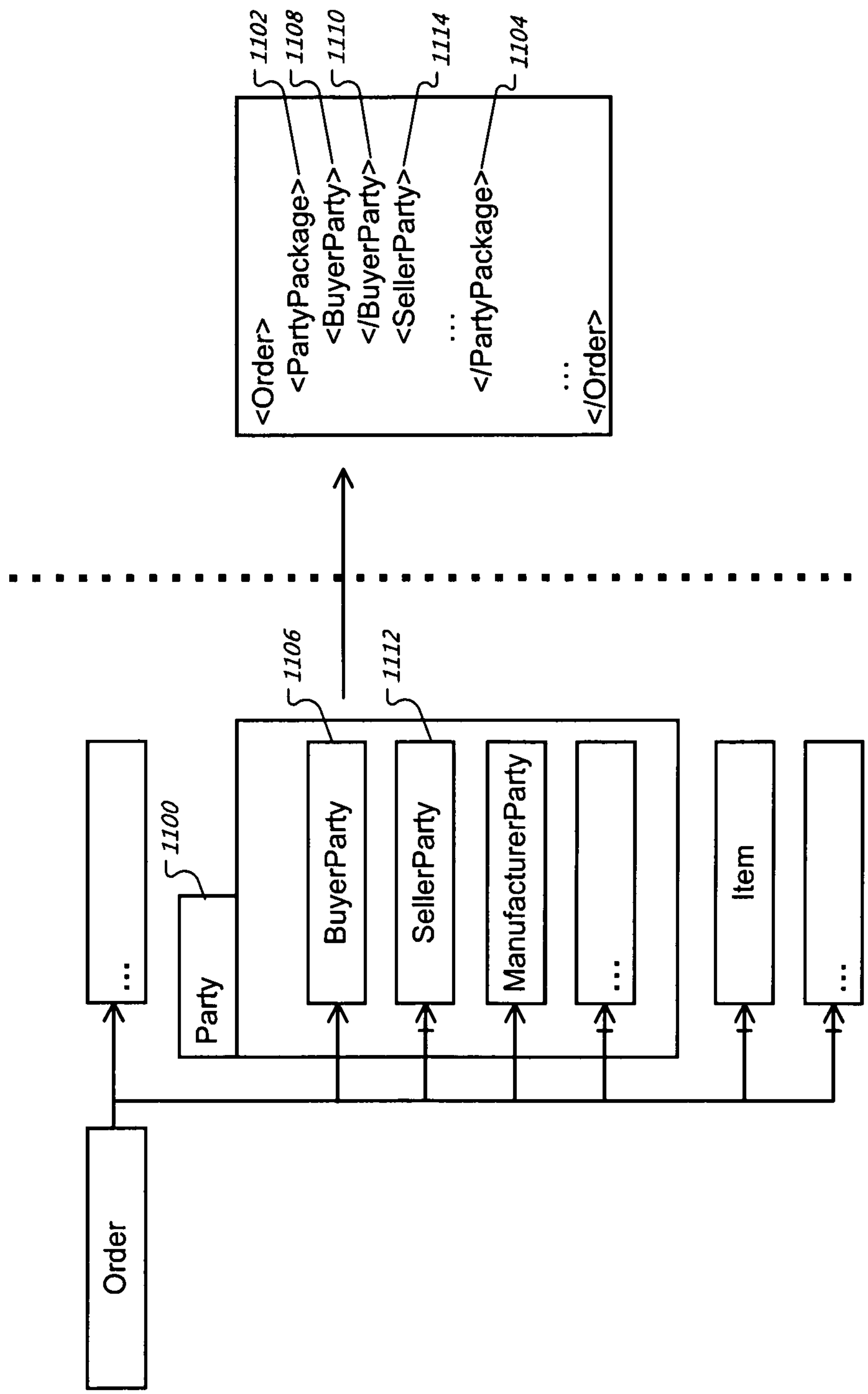
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
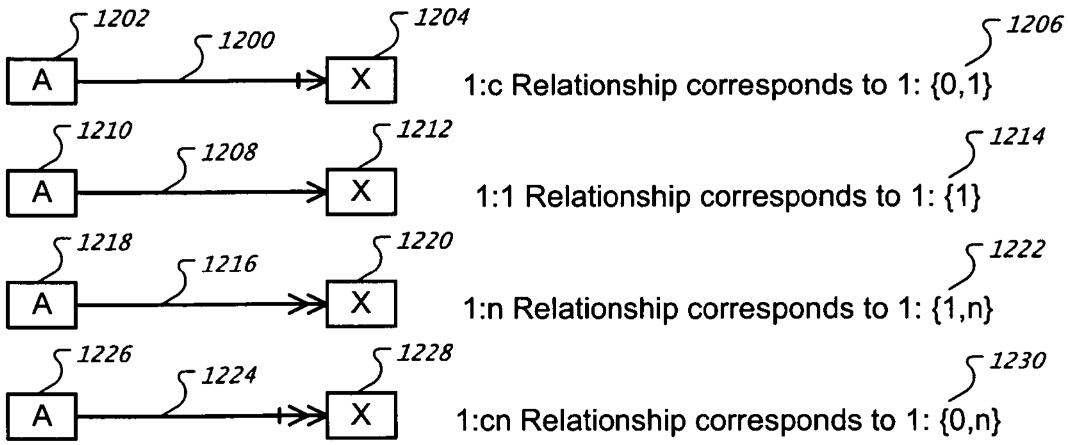
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
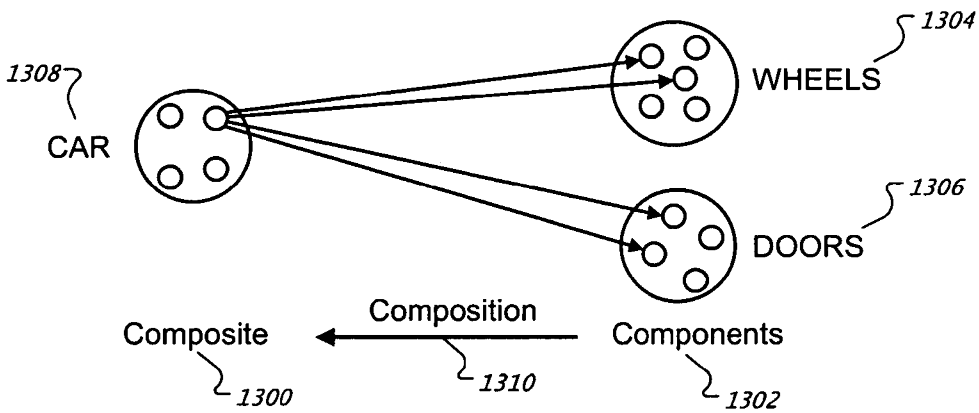
FIG. 13 depicts an example of a composition in accordance with methods and systems consistent with the subject matter described herein.
Figure 14:
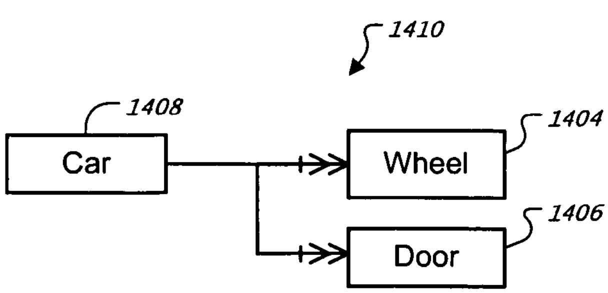
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
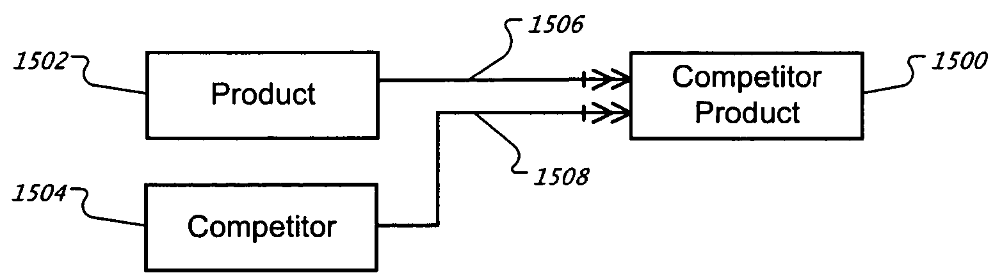
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
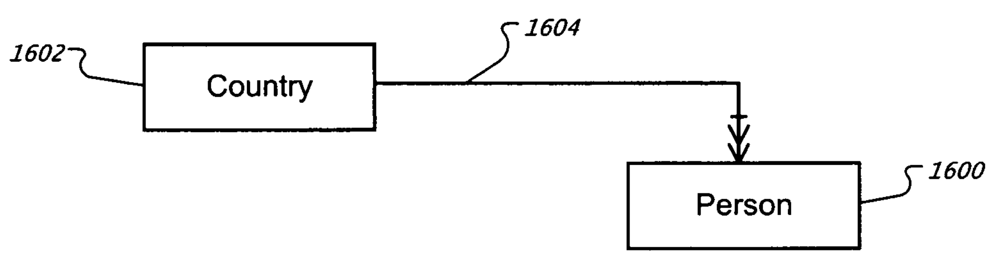
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
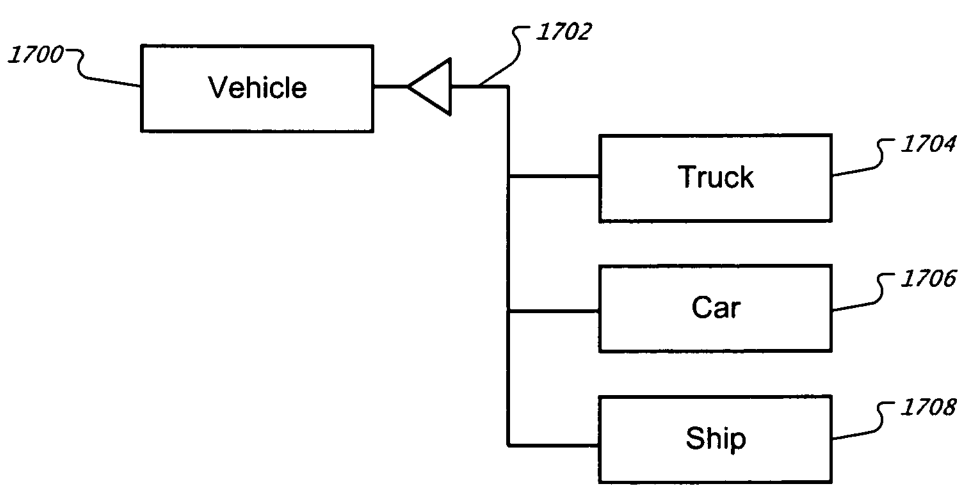
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
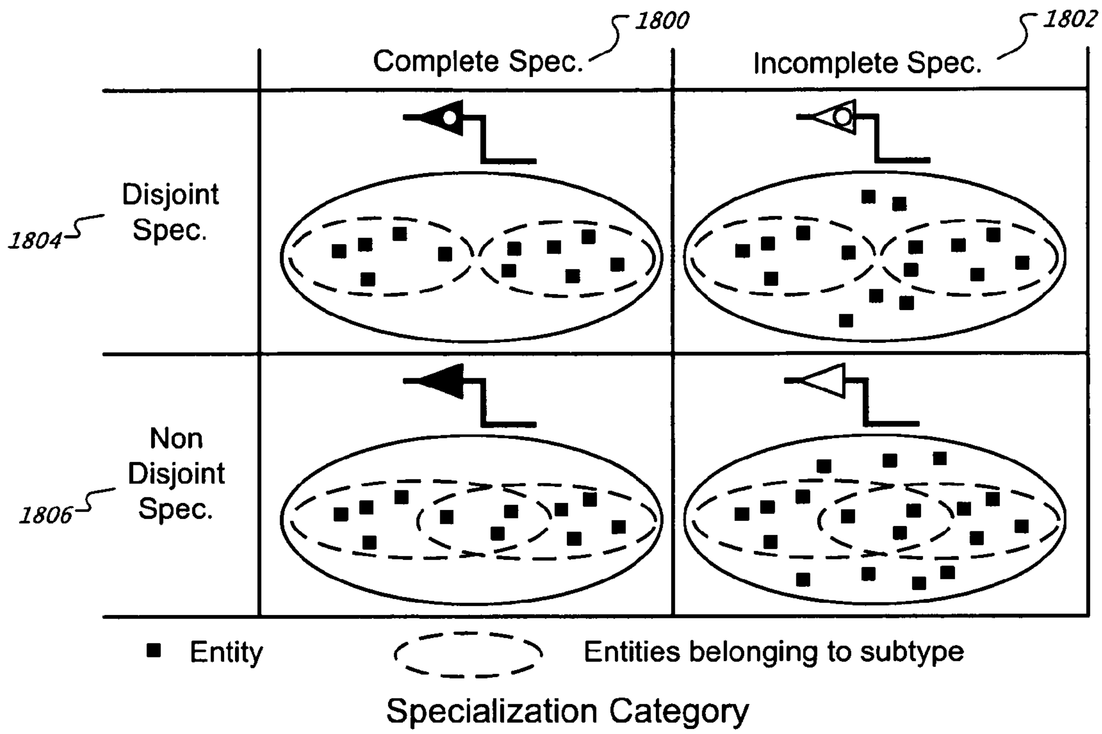
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1 :n with the entity type chart of accounts item since a chart of accounts has at least one item in all cases.

(2) Hierarchy

Figure 19:
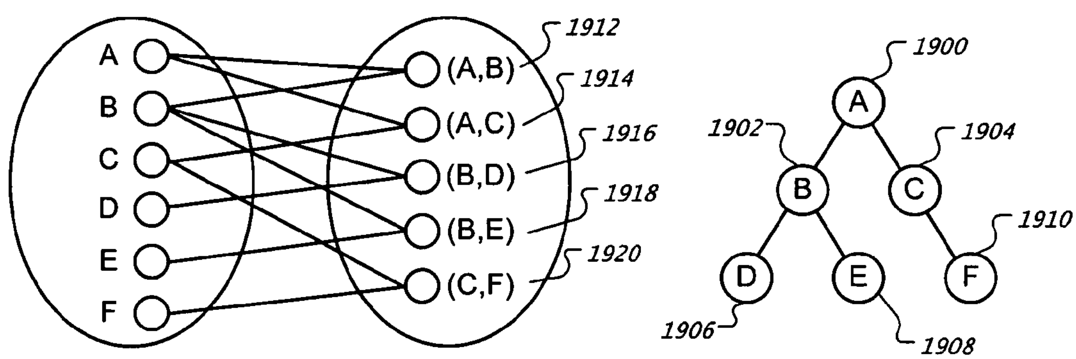
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
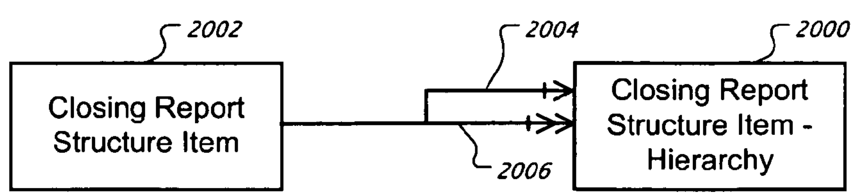
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
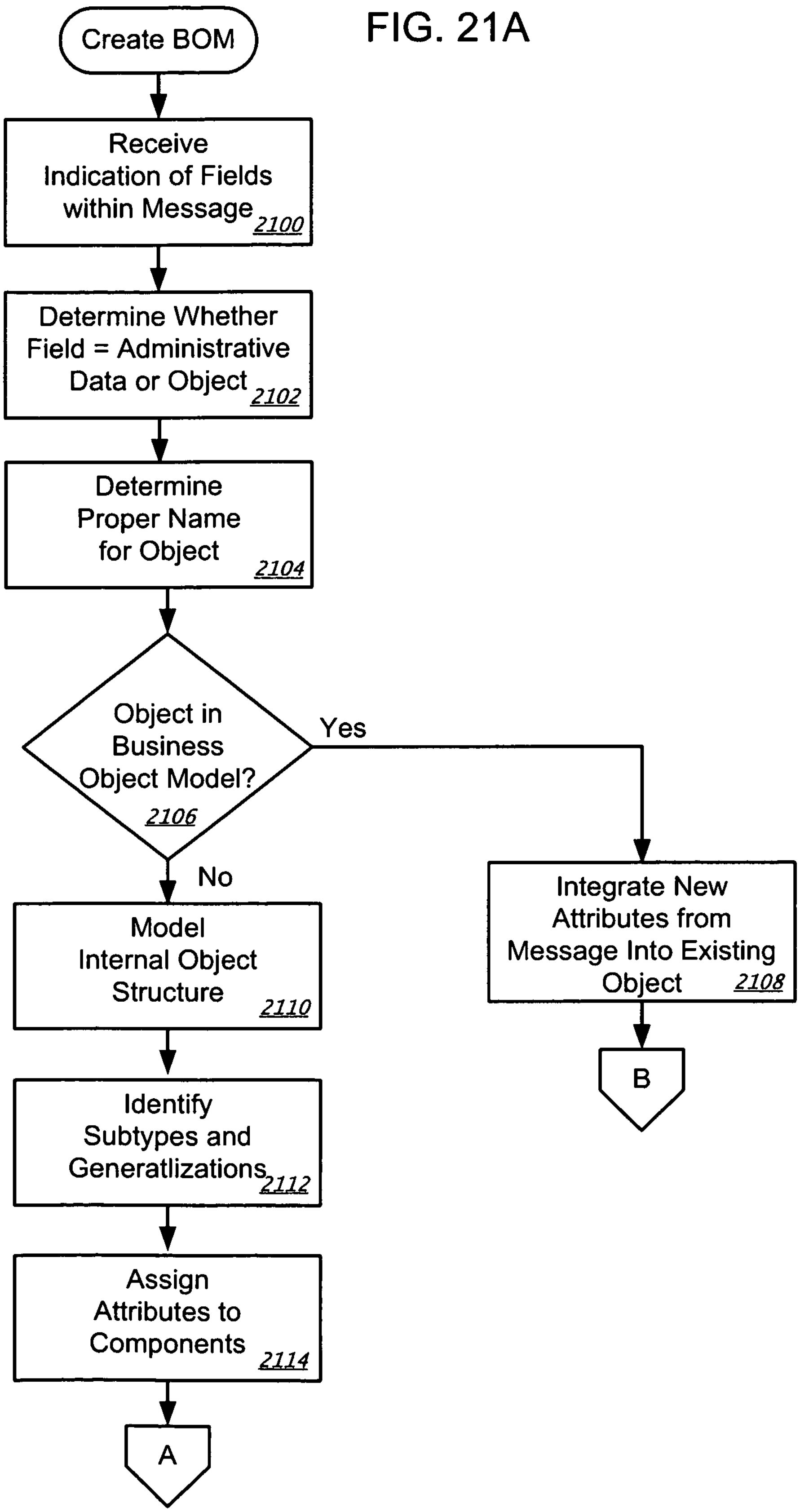
FIGS. 21A-B depict a flow diagram of the steps performed to create a business object model in accordance with methods and systems consistent with the subject matter described herein.
Figure 21B:
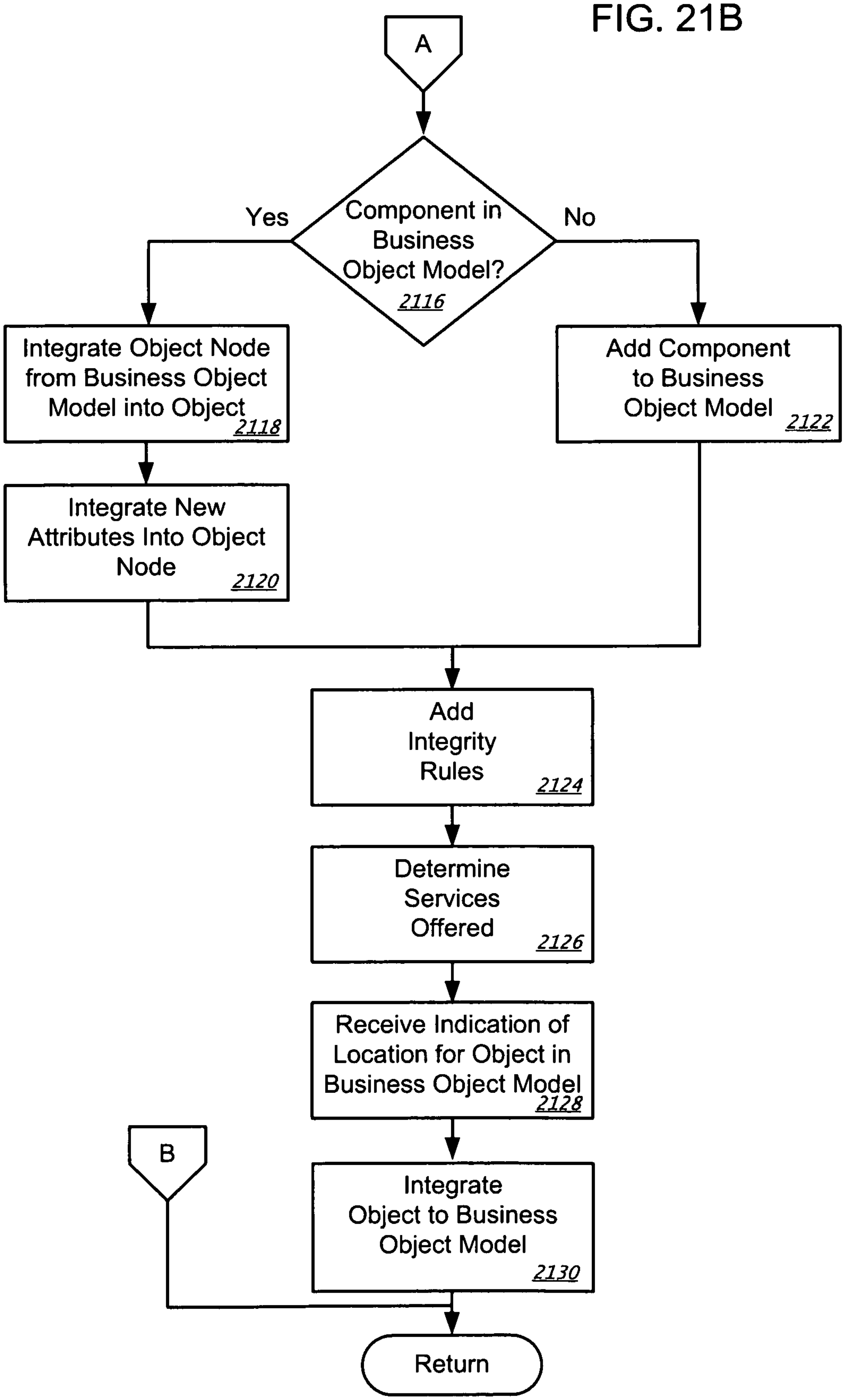

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |

-continued

| |
|---|
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobileNumber |
| Facsimile |
| Email |
| Seller |
| SellerAddress |
| Location |
| LocationType |
| DeliveryItemGroupID |
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |

-continued

| |
|---|
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |

-continued

| | | |
|---|---|---|
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |

-continued

| | |
|---|---|
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |

-continued

| | |
|---|---|
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | |
|---|---|---|---|---|
| Purchase Order | | | | 1 |
| | PurchaseOrder Update | | | |
| | | PurchaseOrder Request | | |
| | | PurchaseOrder Change | | |
| | | PurchaseOrder Confirmation | | |
| | PurchaseOrder Cancellation | | | |
| | PurchaseOrder Information | | | |
| | Party | | | |
| | | BuyerParty | | 0 . . . 1 |
| | | | Address | 0 . . . 1 |
| | | | ContactPerson | 0 . . . 1 |
| | | | Address | 0 . . . 1 |
| | | SellerParty | | 0 . . . 1 |
| | Location | | | |
| | | ShipToLocation | | 0 . . . 1 |
| | | | Address | 0 . . . 1 |
| | | ShipFromLocation | | 0 . . . 1 |
| | | | Address | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCash Discount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Party | | |
| | | | BuyerParty | 0 . . . 1 |
| | | | SellerParty | 0 . . . 1 |
| | | Location | | |
| | | | ShipTo Location | 0 . . . 1 |
| | | | ShipFrom Location | 0 . . . 1 |
| | | DeliveryTerms | | 0 . . . 1 |
| | | Attachment | | 0 . . . n |
| | | Description | | 0 . . . 1 |
| | | Confirmation Description | | 0 . . . 1 |
| | | ScheduleLine | | 0 . . . n |
| | | | Delivery Period | 1 |
| | | ConfirmedScheduleLine | | 0 . . . n |

After identifying the subtypes and generalizations, the developers assign the attributes to these components (step 2114). The attributes for a portion of the components are shown below.

| | | |
|---|---|---|
| Purchase Order | | 1 |
| | ID | 1 |
| | SellerID | 0 . . . 1 |
| | BuyerPosting DateTime | 0 . . . 1 |

-continued

| | | |
|---|---|---|
| | BuyerLast ChangeDate Time | 0 . . . 1 |
| | SellerPosting DateTime | 0 . . . 1 |
| | SellerLast ChangeDate Time | 0 . . . 1 |
| | Acceptance StatusCode | 0 . . . 1 |
| | Note | 0 . . . 1 |

-continued

| | | | |
|---|---|---|---|
| ItemList Complete Transmission Indicator | | | 0 . . . 1 |
| BuyerParty | | | 0 . . . 1 |
| | StandardID | | 0 . . . n |
| | BuyerID | | 0 . . . 1 |
| | SellerID | | 0 . . . 1 |
| | Address | | 0 . . . 1 |
| | ContactPerson | | 0 . . . 1 |
| | | BuyerID | 0 . . . 1 |
| | | SellerID | 0 . . . 1 |
| | | Address | 0 . . . 1 |
| SellerParty | | | 0 . . . 1 |
| Product RecipientParty | | | 0 . . . 1 |
| VendorParty | | | 0 . . . 1 |
| Manufacturer Party | | | 0 . . . 1 |
| BillToParty | | | 0 . . . 1 |
| PayerParty | | | 0 . . . 1 |
| CarrierParty | | | 0 . . . 1 |
| ShipTo Location | | | 0 . . . 1 |
| | StandardID | | 0 . . . n |
| | BuyerID | | 0 . . . 1 |
| | SellerID | | 0 . . . 1 |
| | Address | | 0 . . . 1 |
| ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
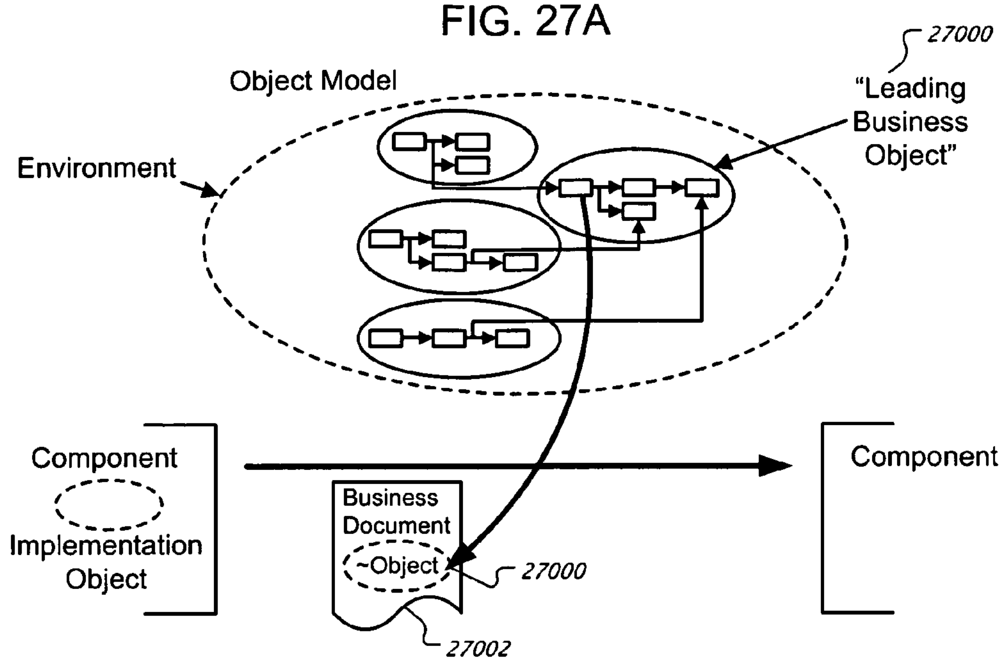
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
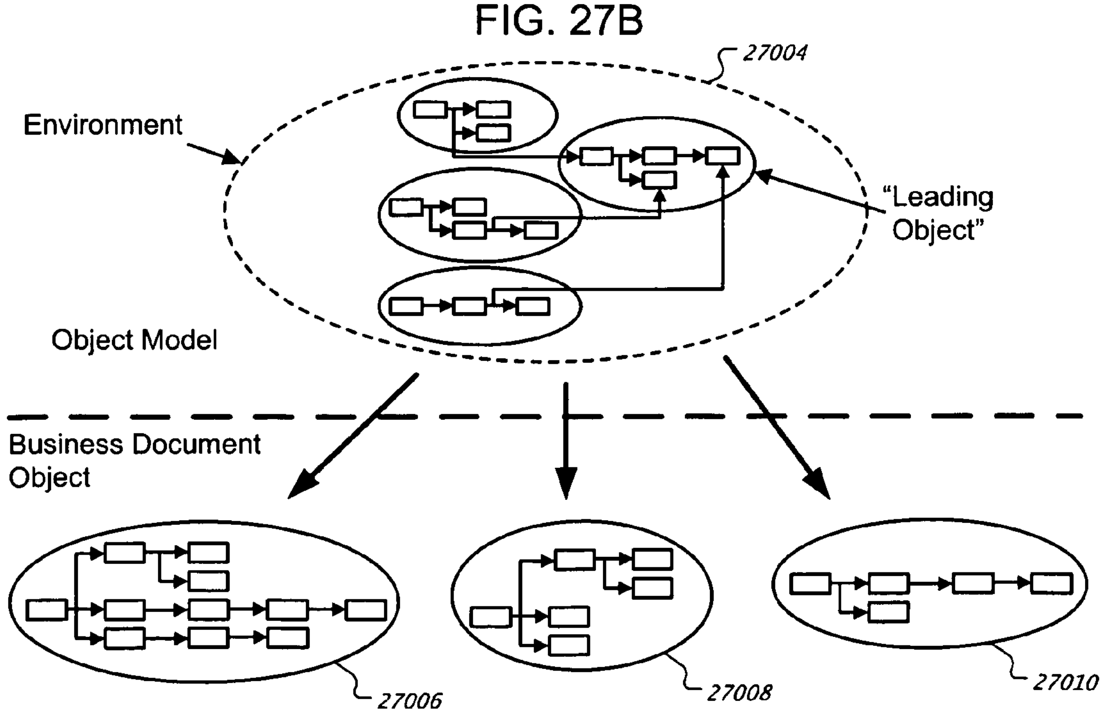

As illustrated in FIG. 27B, several business document objects 27006, 27008, and 27010 as overlapping views may be derived for a given leading object 27004. Each business document object results from the object model by hierarchization.

Figure 27C:
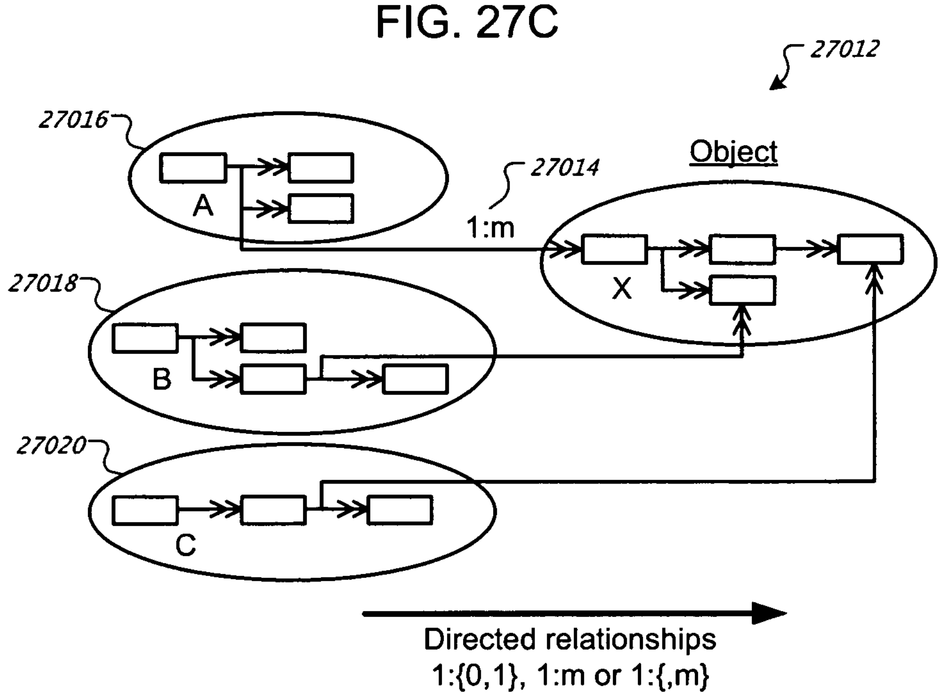

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
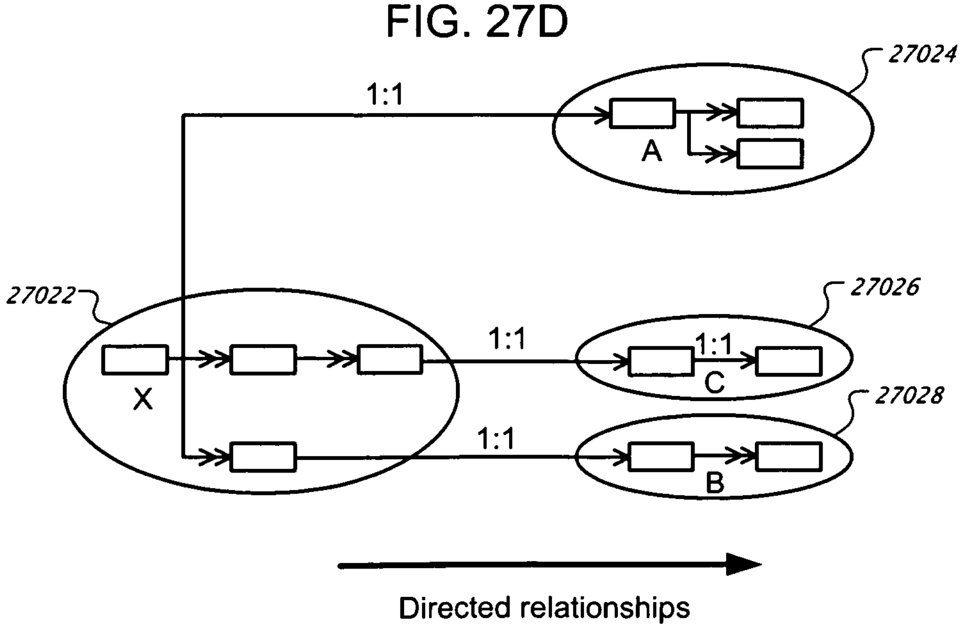

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
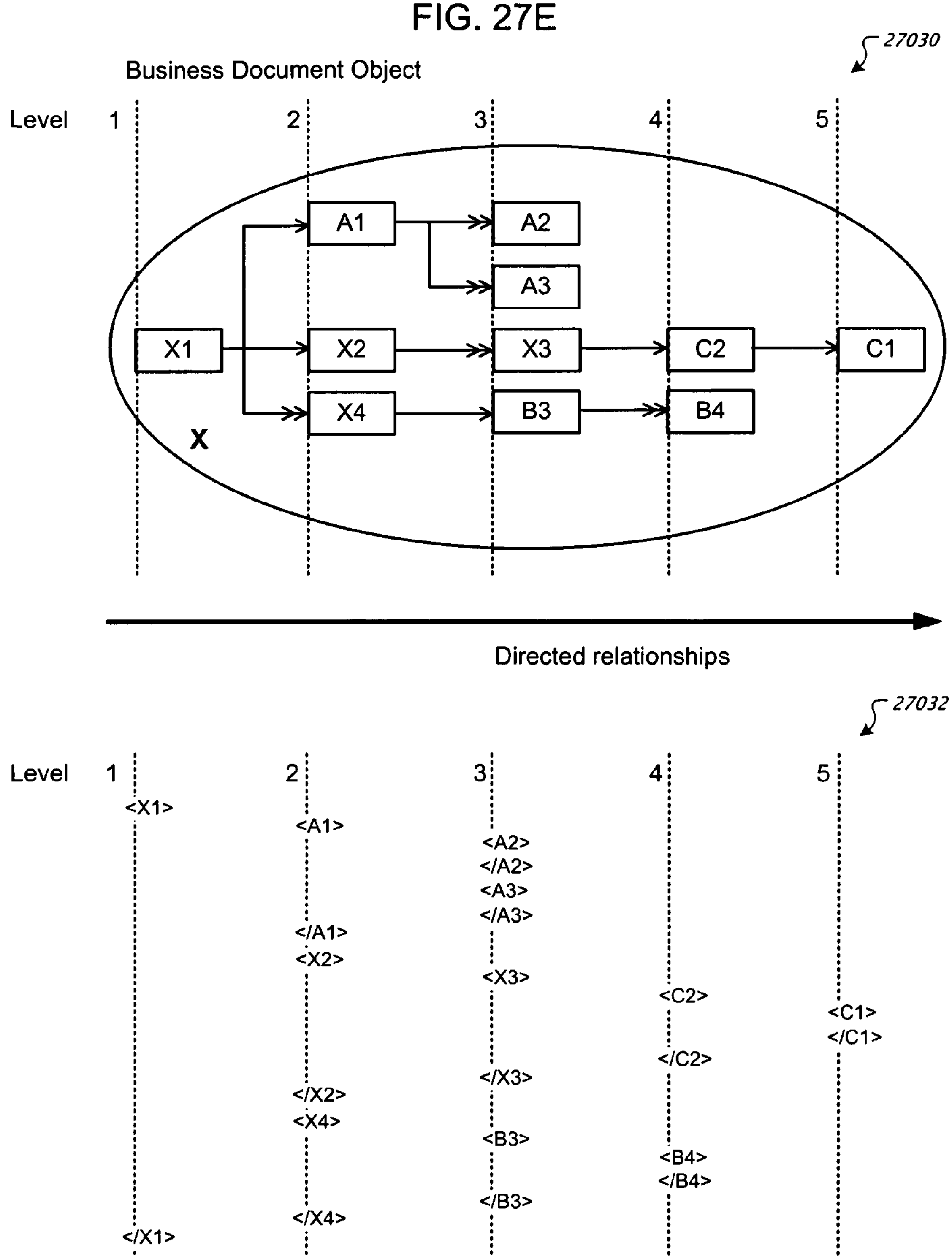

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.
  - The whole message type structured is typed by a message data type with its name being built according to the root entity with the suffix "Message".
- For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status “pending.”

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status “pending.” The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status “pending.” The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
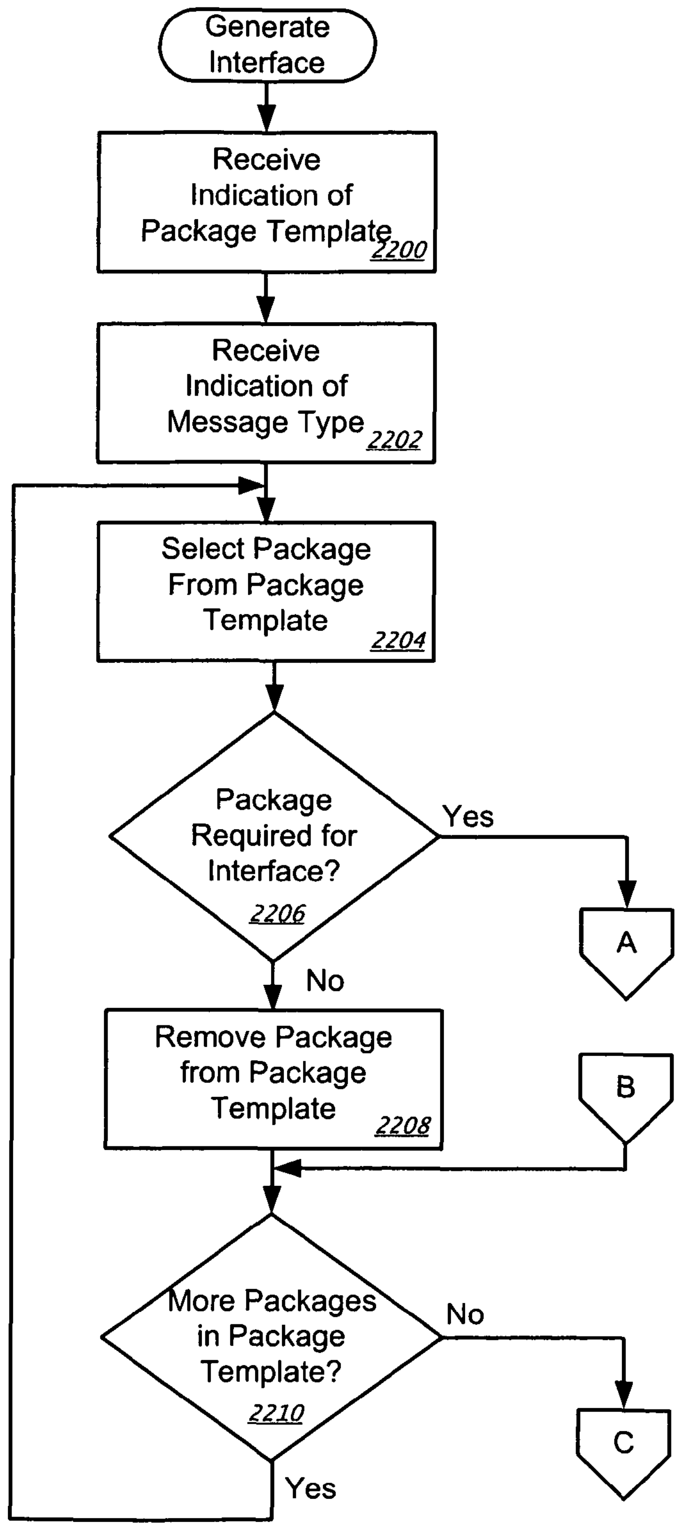
FIGS. 22A-F depict a flow diagram of the steps performed to generate an interface from the business object model in accordance with methods and systems consistent with the subject matter described herein.
Figure 22B:
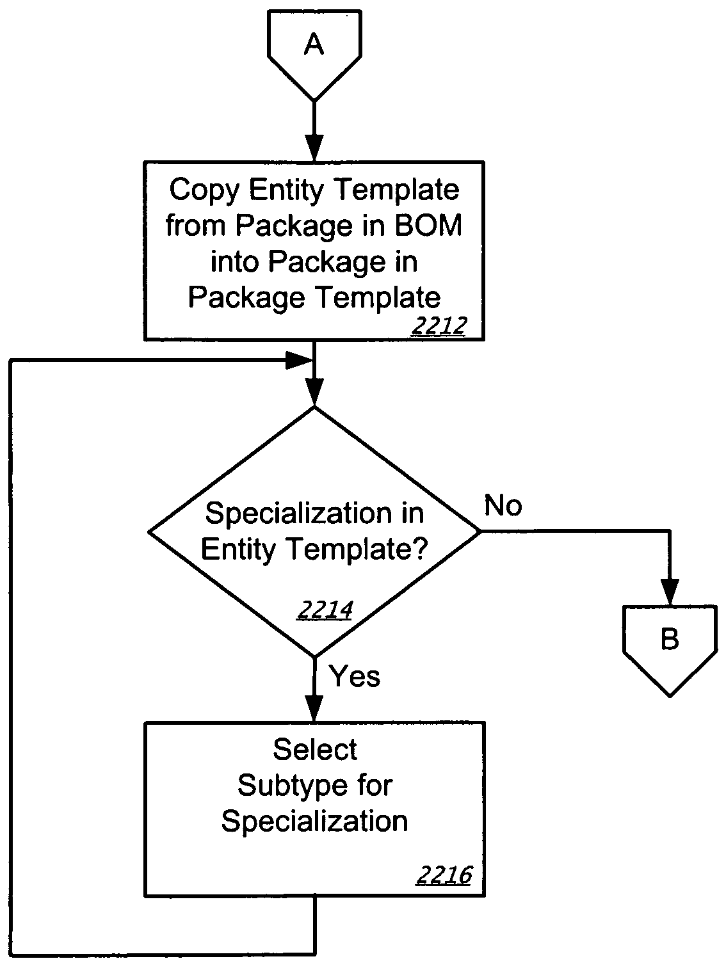
Figure 22C:
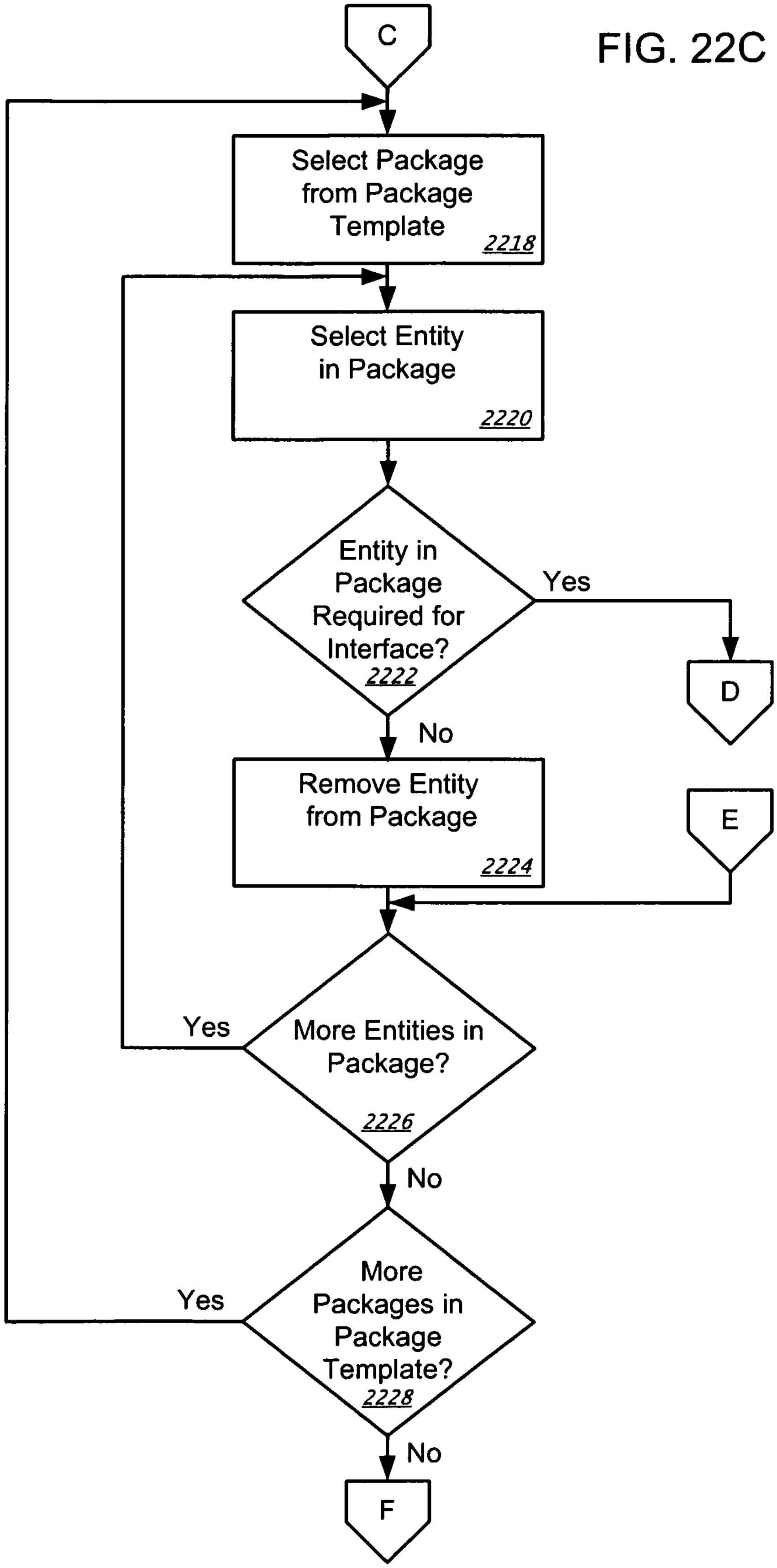

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
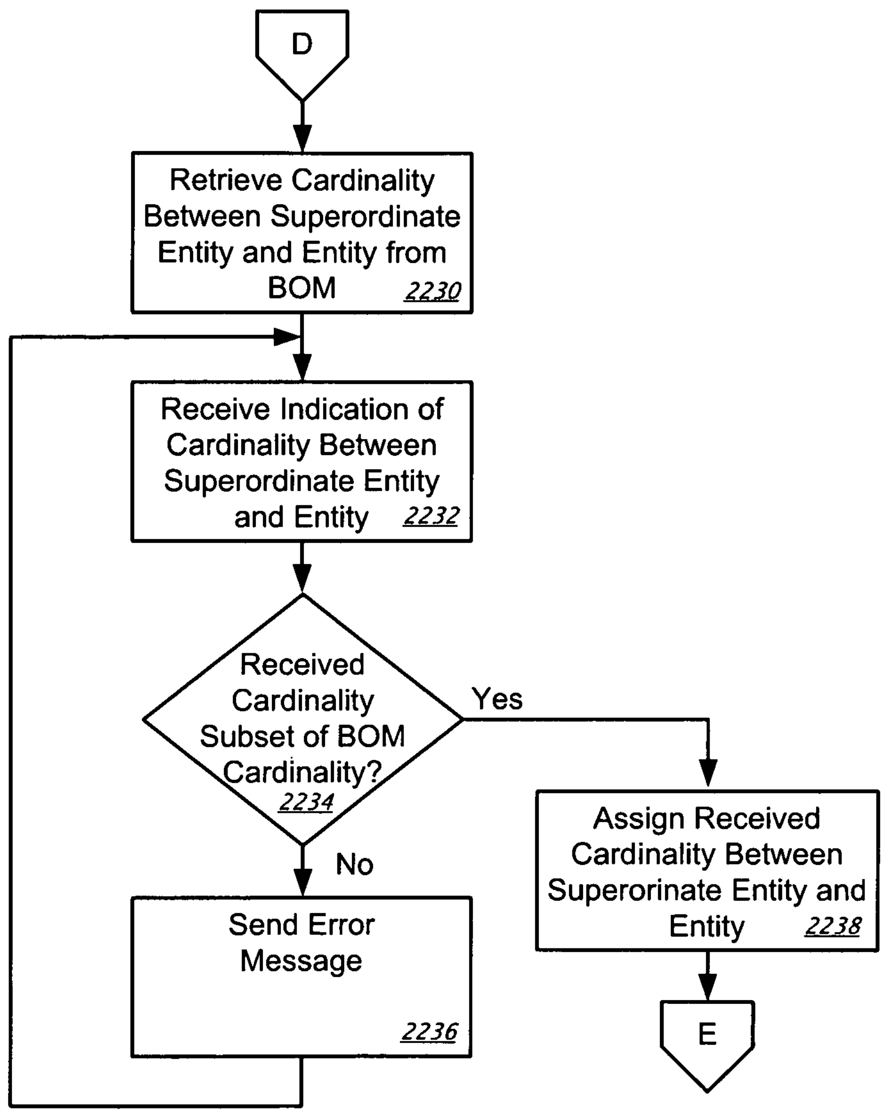

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
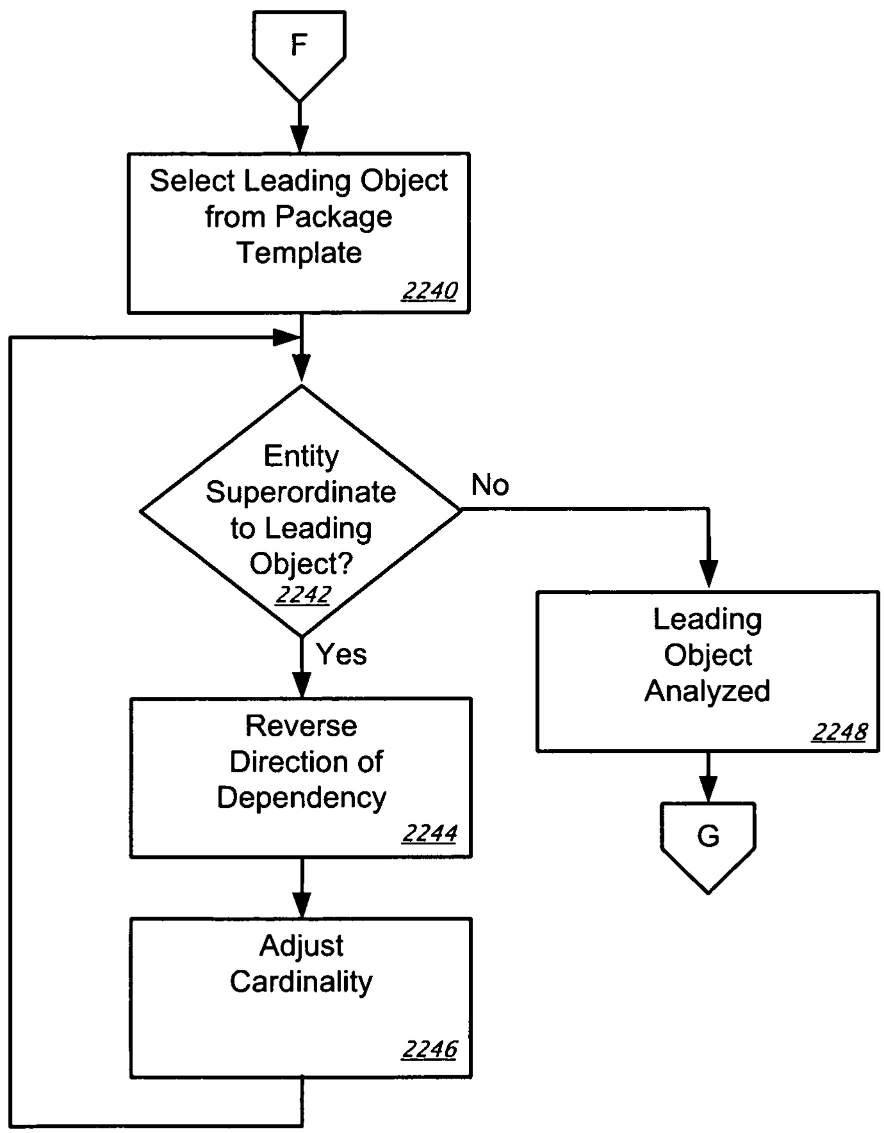

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
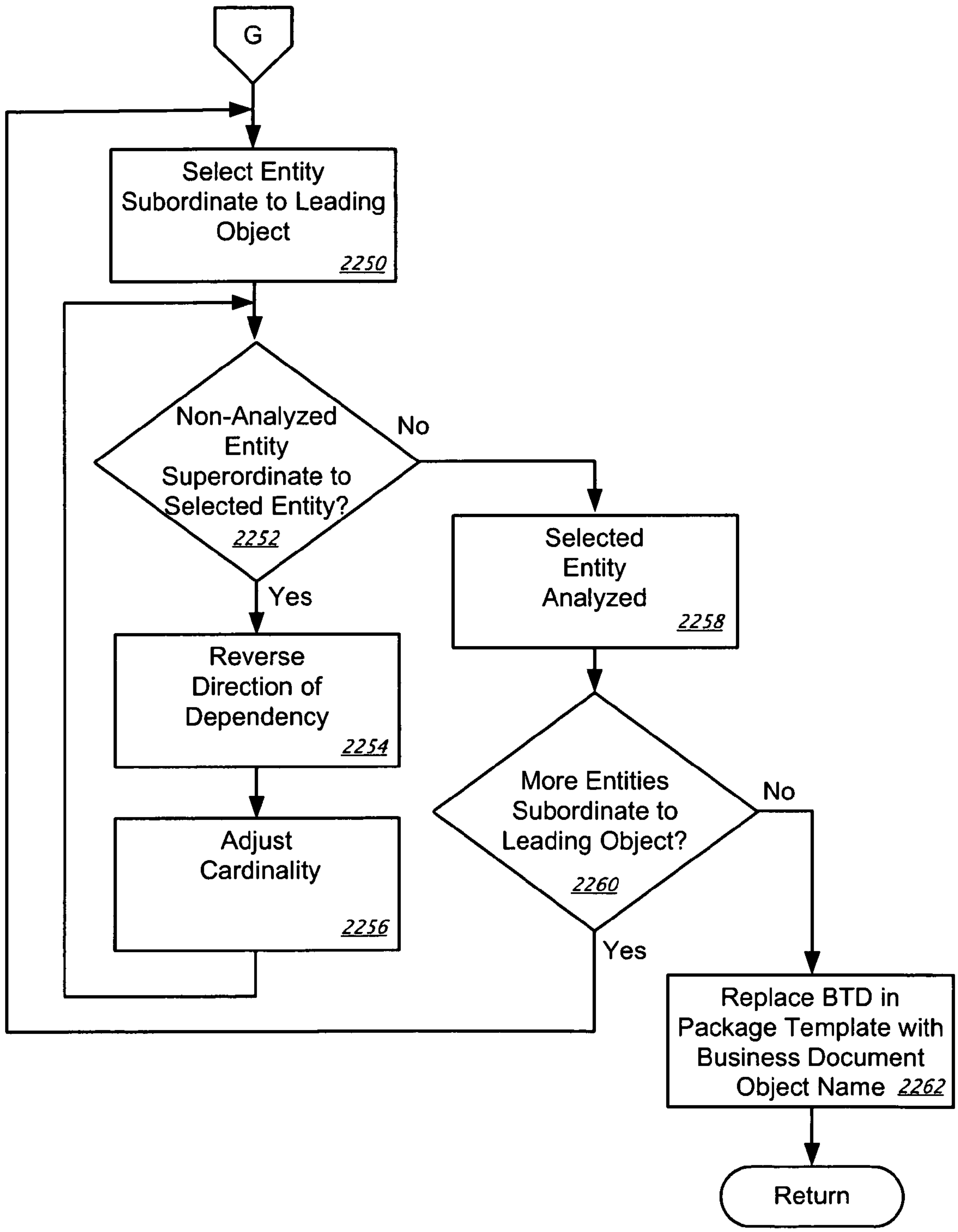

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
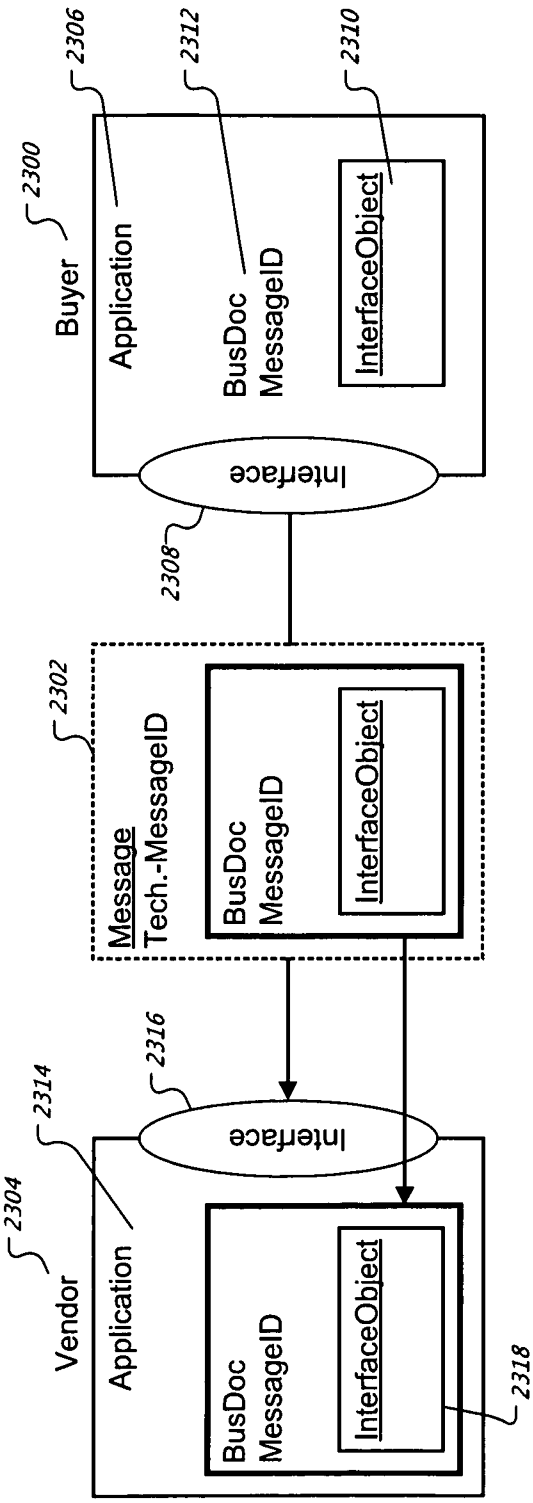
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
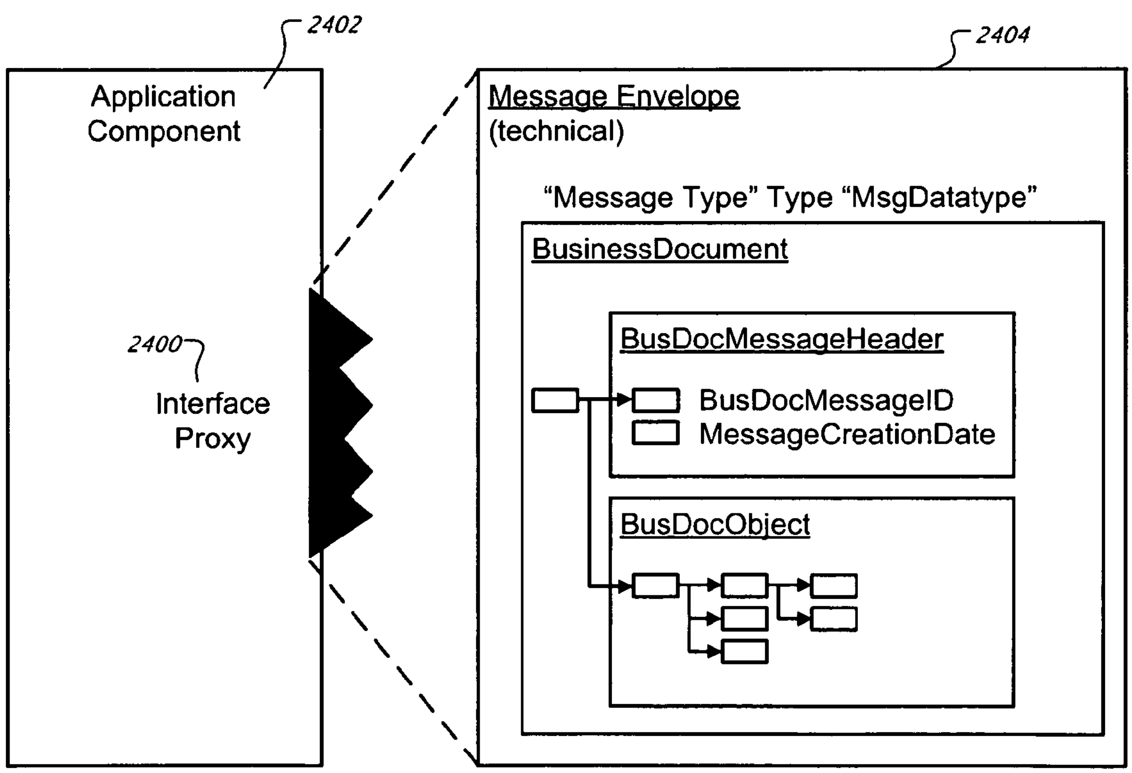
FIG. 24 depicts an interface proxy in accordance with methods and systems consistent with the subject matter described herein.
Figure 25:
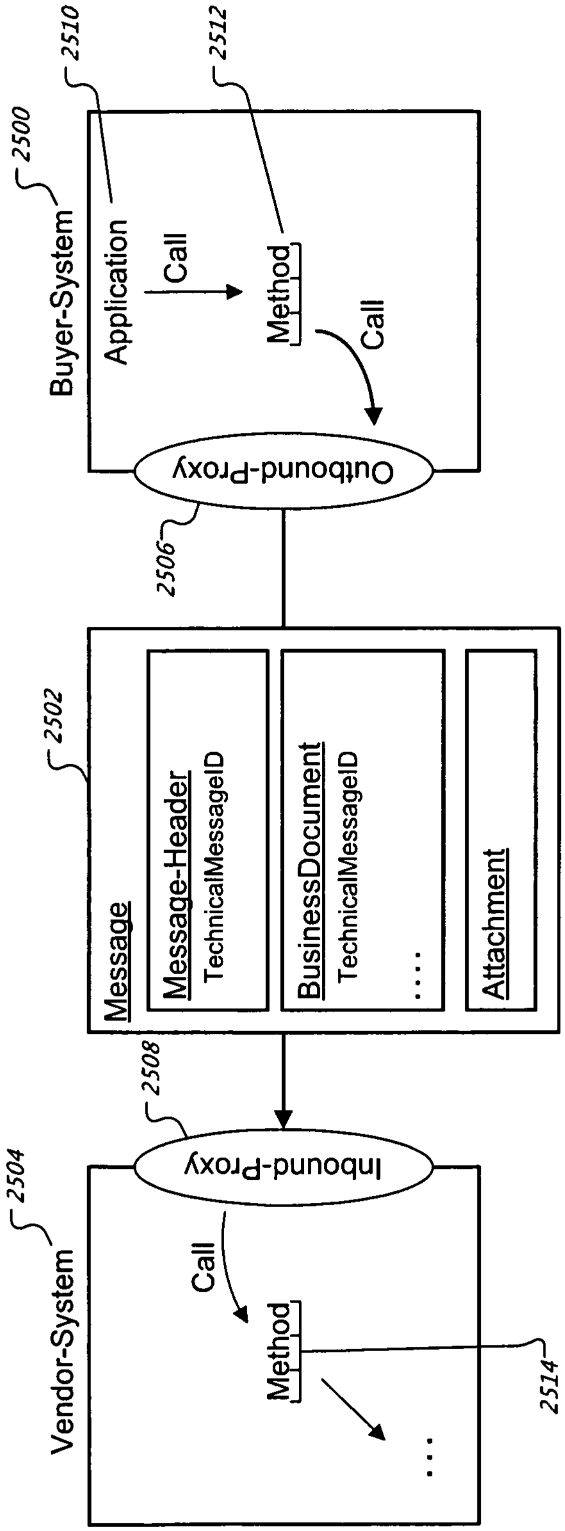
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
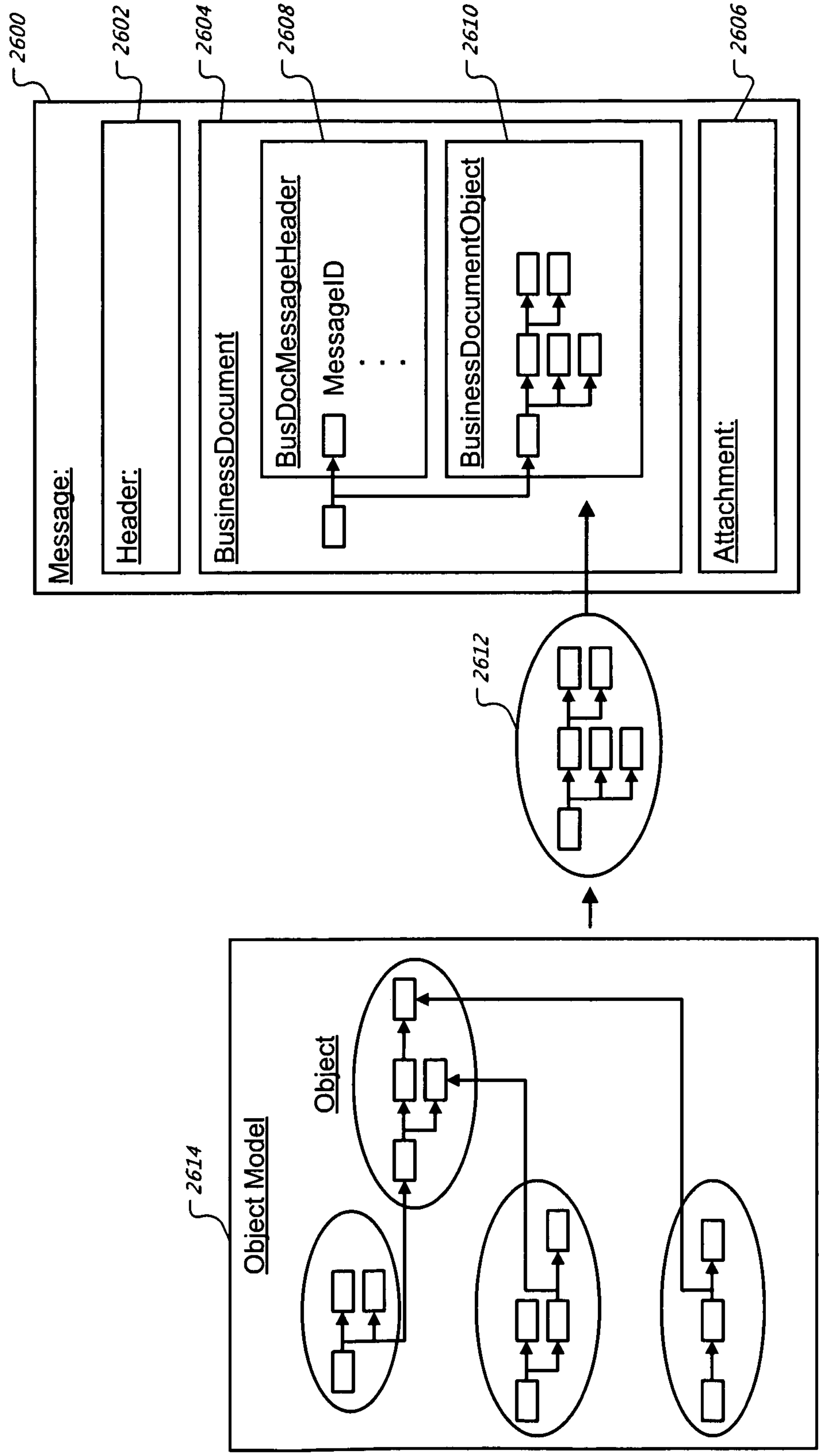
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
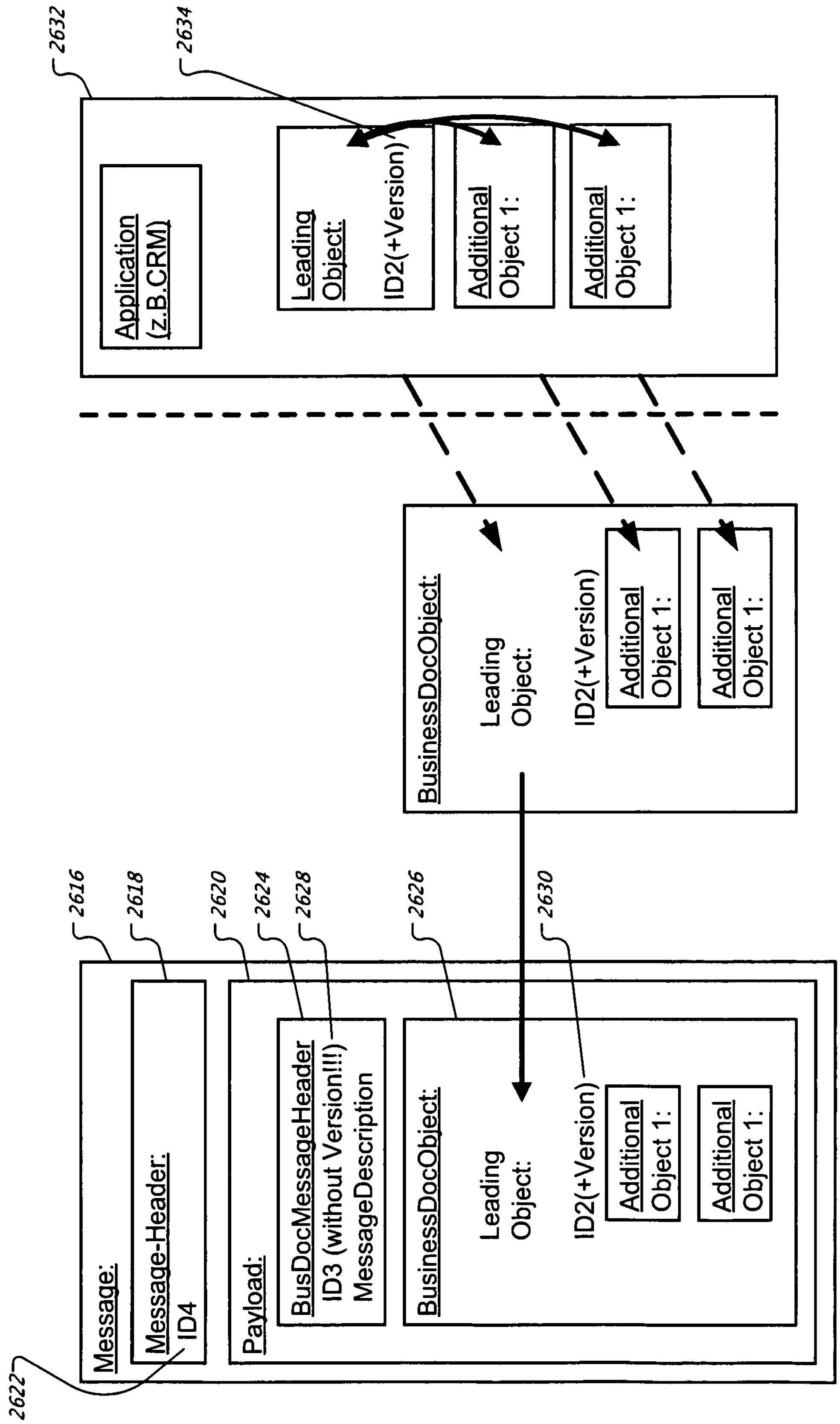
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
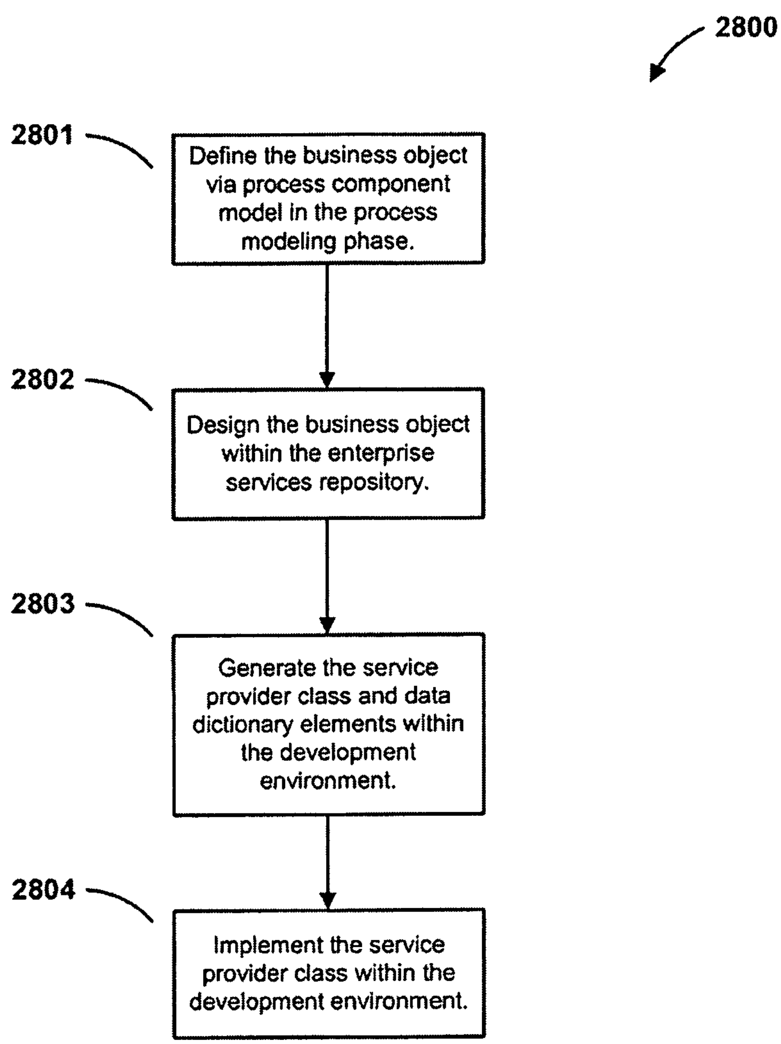
FIG. 28 illustrates an example method for service enabling in accordance with one embodiment of the present disclosure.
Figure 29:
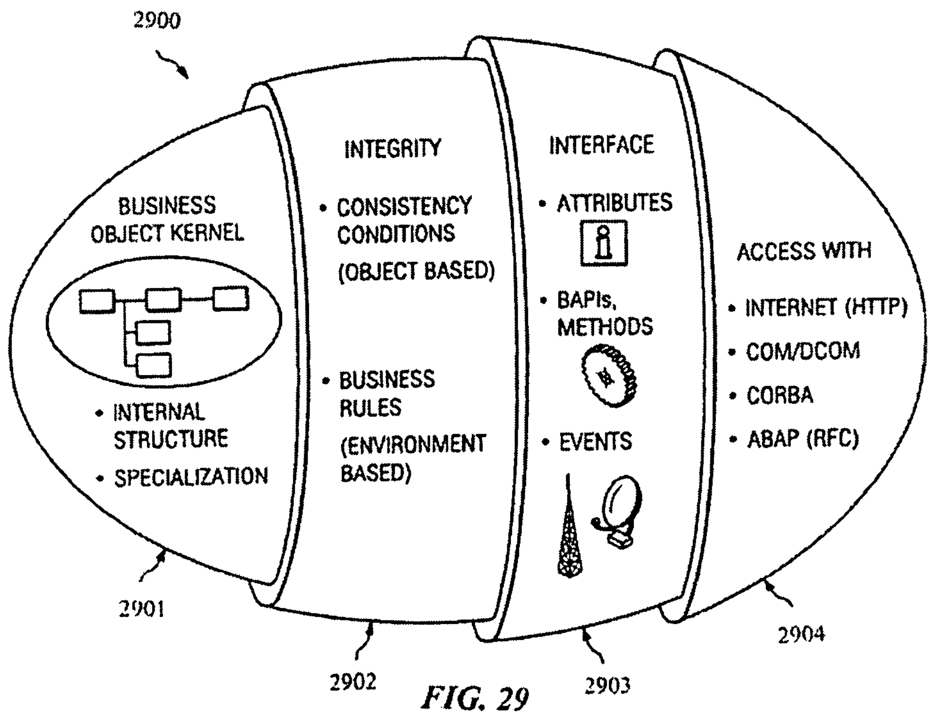
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
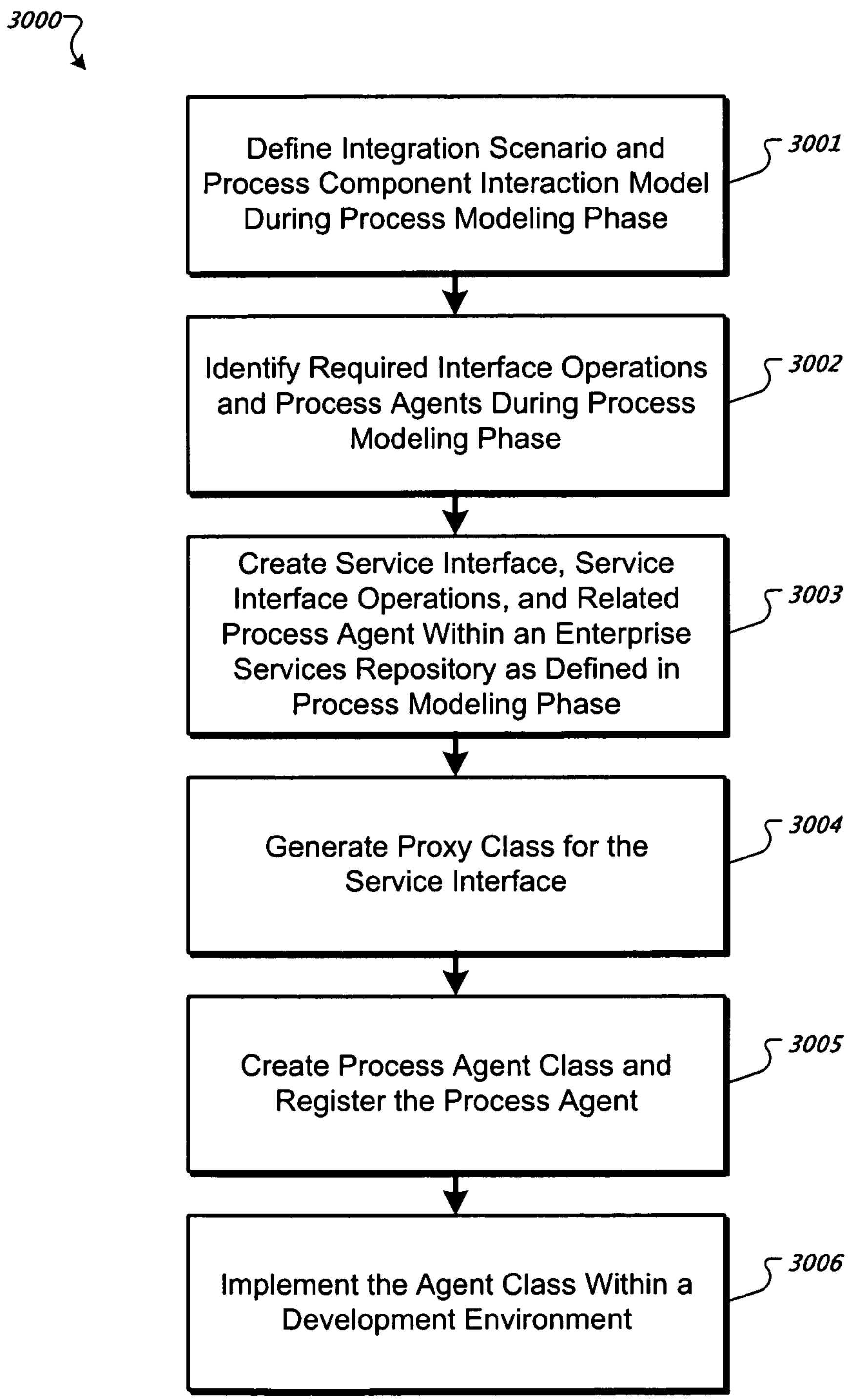
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
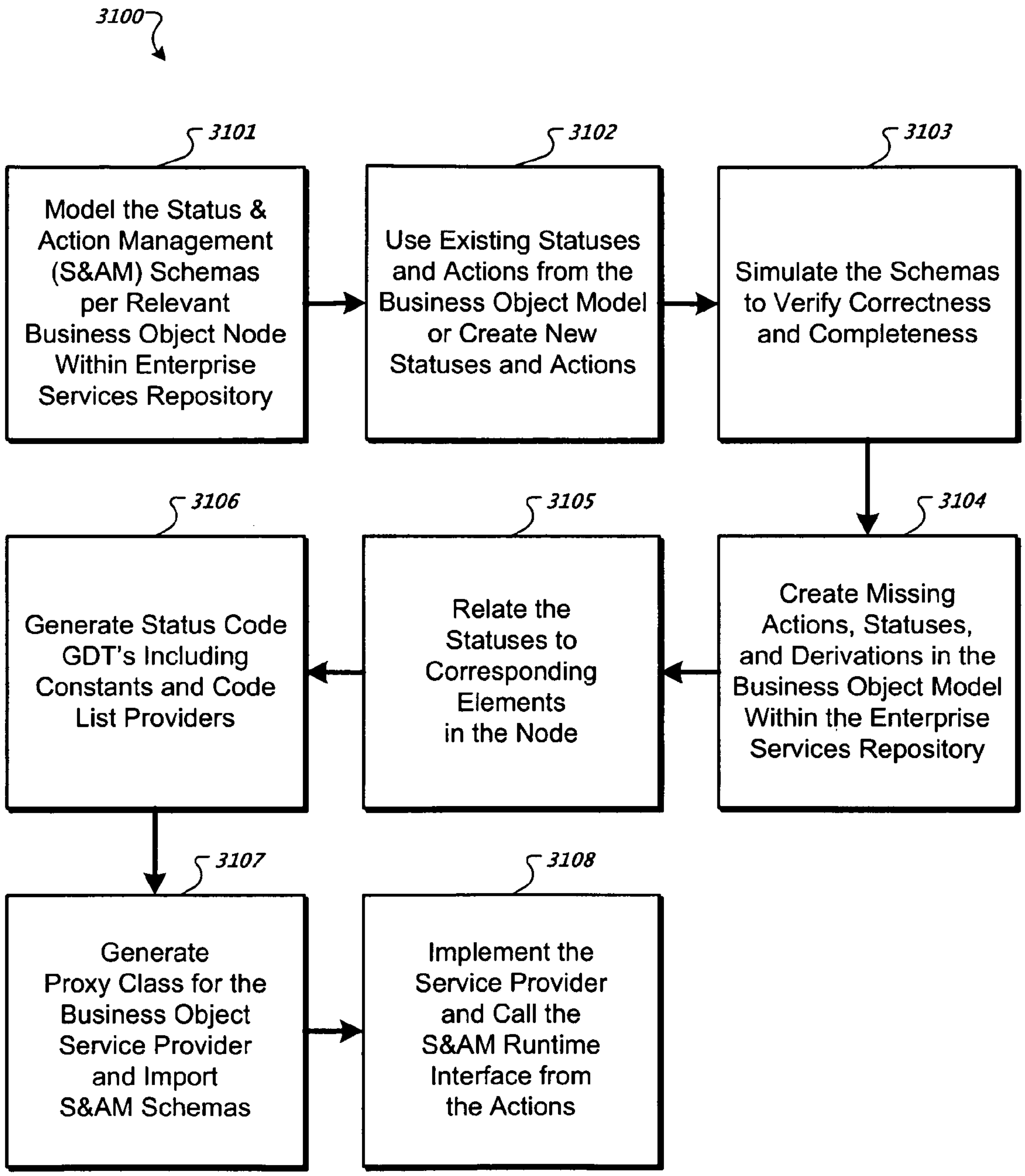
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Freight Request Interfaces

A FreightRequest can be a request from an ordering party to a transportation service provider to ship goods from shippers to consignees. It can be a combination of shipment requests, which can be assigned to stages and resources. The combination can be based on transportation planning or transportation charges calculation. The FreightRequest interfaces can be part of Shipper and Transportation Service Provision scenarios. In some implementations, FreightRequest interfaces are used to exchange FreightRequest requests and corresponding confirmations and receipt notifications between an ordering party and a transportation service provider. An ordering party can request a receipt notification about a FreightRequest request from a transportation service provider to assure that the transportation service provider has received the FreightRequest request and that it did not include any errors. At a later time, the transportation service provider can send a confirmation to the ordering party to confirm the FreightRequest. The confirmation can be an acceptance of the FreightRequest with its transport and carriage conditions, a rejection if the transportation service provider cannot ensure the transport service, a conditional acceptance in case the transportation service provider generally accepts the FreightRequest, but can send more information about the way they intend to fulfill the requested transportation service, i.e., the transportation details later on. The transportation service provider may request a receipt notification about the FreightRequest confirmation from the ordering party.

A FreightRequestRequest Message Type can be a request for a FreightRequest from an ordering party to a transportation provider. It can also be an update to a previous FreightRequestRequest. The structure of the FreightRequestRequest can be specified by the message data type FreightRequestRequestMessage. A FreightRequestCancelRequest can be a cancellation of a FreightRequest. The structure of the FreightRequestCancelRequest can be specified by the message data type FreightRequestCancelRequestMessage. A FreightRequestConfirmation can be a confirmation of a FreightRequest from a transportation service provider to an ordering party. Through a confirmation, a FreightRequest can be accepted, rejected, or conditionally accepted. A confirmation can include information on transport and carriage conditions such as carrier, mode of transport, or stages. A confirmation can also be related to a part of the FreightRequest, in case of a split scenario. The structure of the FreightRequestConfirmation can be specified by the message data type FreightRequestConfirmationMessage.

A FreightRequestReceiptNotification can be a message from a transportation service provider to an ordering party, confirming receipt of a FreightRequestRequest message or of a FreightRequestCancelRequest message, and reporting administrative errors included in a received message. The structure of the FreightRequestReceiptNotification can be specified by the message data type FreightRequestReceiptNotificationMessage. A FreightRequestConfirmationReceiptNotification can be a message from an ordering party to a transportation service provider confirming receipt of a FreightRequestConfirmation message, and reporting administrative errors included in the received message. The structure of the FreightRequestConfirmationReceiptNotification can be specified by the message data type FreightRequestConfirmationReceiptNotificationMessage. The FreightRequest messages can be implemented by the following message interfaces that are equally distributed on the ordering party side and on the transportation service provider side. All the message interfaces of both sides can be implemented in transportation management. On the ordering party side, the message interfaces include: FreightRequestRequest_Out, FreightRequestCancelRequest_Out, FreightRequestConfirmation_In, FreightRequestReceiptNotification_In, and FreightRequestConfirmationReceiptNotification_Out. On the Transportation service provider side, the message interfaces include: FreightRequestRequest_In, FreightRequestCancelRequest_In, FreightRequestConfirmation_Out, FreightRequestReceiptNotification_Out, and FreightRequestConfirmationReceiptNotification_In.

Figure 32:
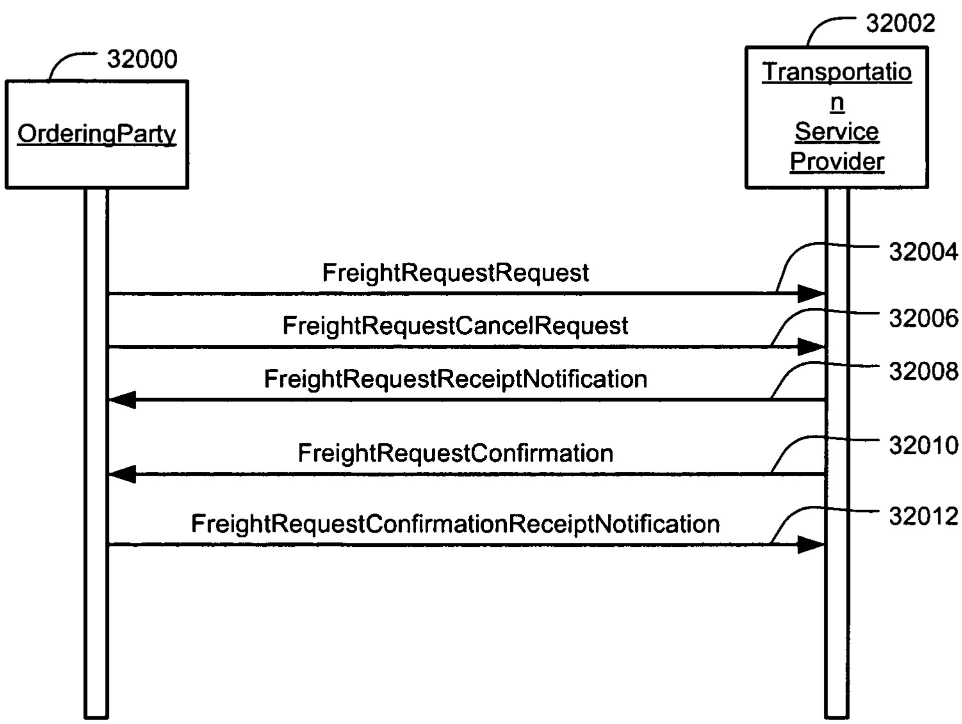
FIG. 32 shows an exemplary FreightRequest Message Choreography.

The message choreography of FIG. 32 describes a possible logical sequence of messages that can be used to realize a Freight Request business scenario. An "Ordering Party" system 32000 can request a freight request, or update a previous request, using a FreightRequestRequest message 32004 as shown, for example in FIG. 32. A "Transportation Service Provider" system 32002 can confirm the request, and report any administrative errors, using a FreightRequestReceiptNotification message 32008 as shown, for example, in FIG. 32. The "Ordering Party" system 32000 can request the cancellation of a freight request using a FreightRequestCancelRequest message 32006 as shown, for example, in FIG. 32. The "Transportation Service Provider" system 32002 can confirm the request, and report any administrative errors, using the FreightRequestReceiptNotification message 32008 as shown, for example, in FIG. 32.

The "Transportation Service Provider" system 32002 can confirm the freight request using a FreightRequestConfirmation message 32010 as shown, for example, in FIG. 32. The "Ordering Party" system 32000 can confirm the receipt of the FreightRequestConfirmation message 32010, and report any administrative errors, using a FreightRequestConfirmationReceiptNotification message 32012 as shown, for example, in FIG. 32.

Figures 1, 33:
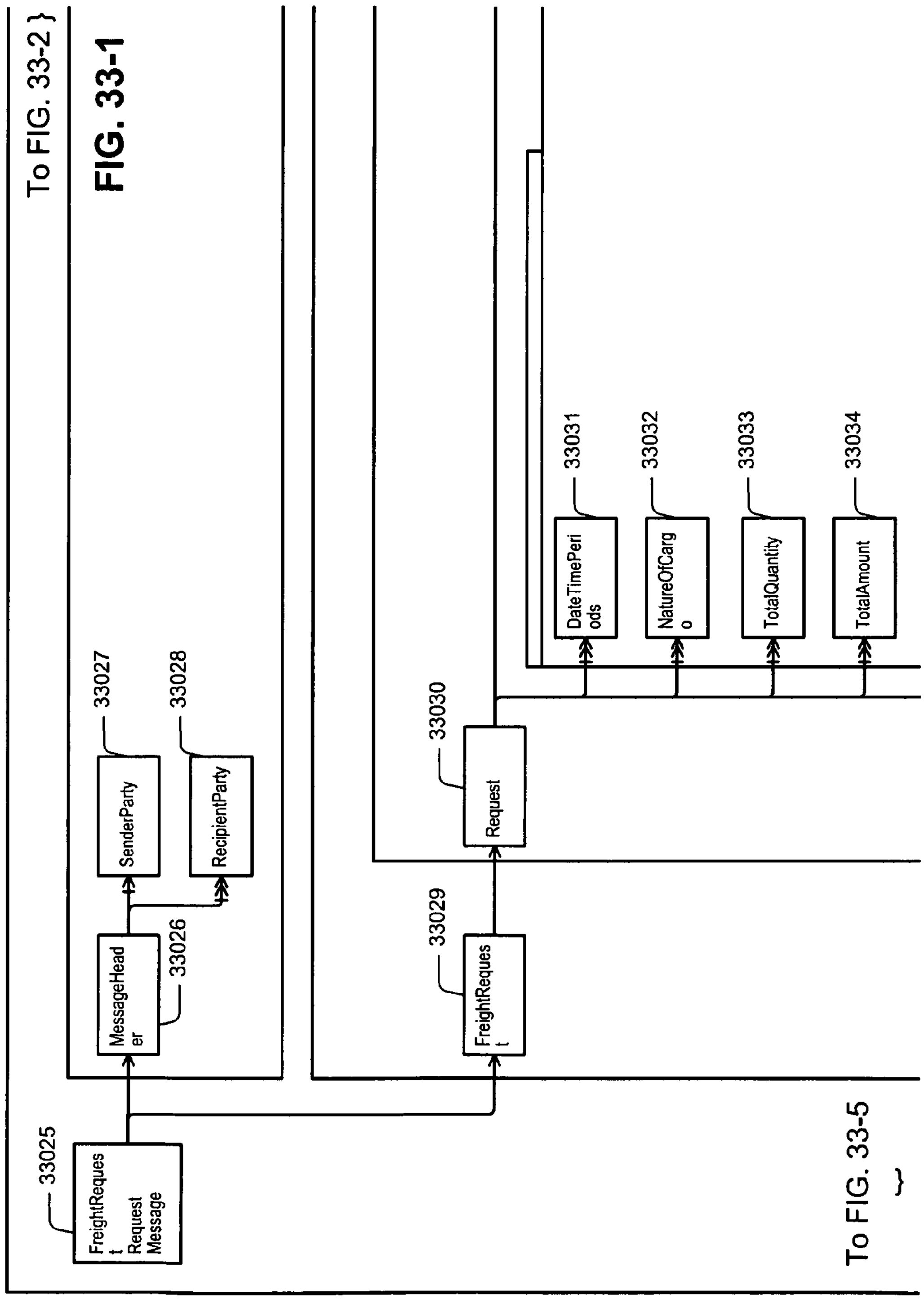
Figures 2, 33:
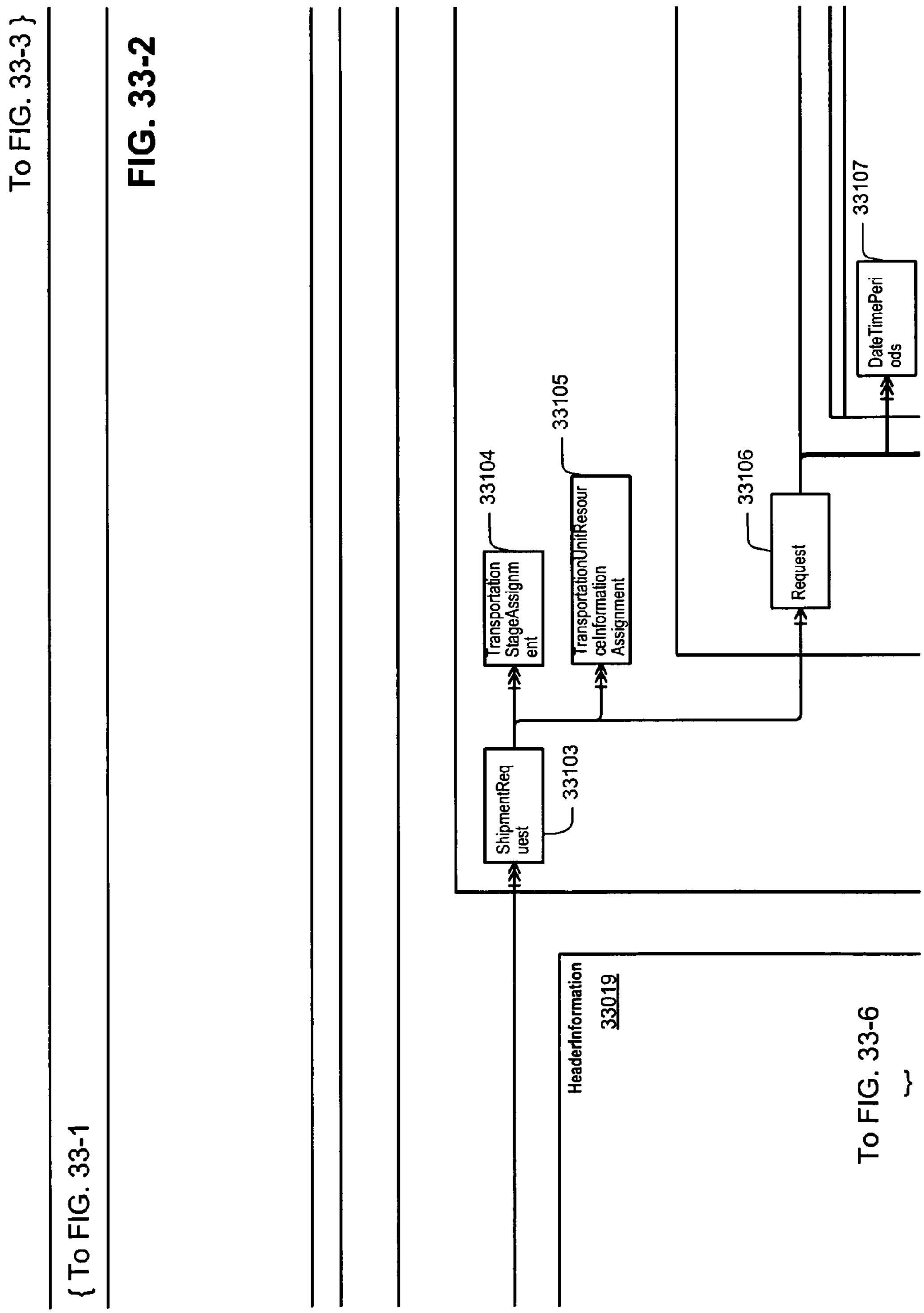

FIGS. 33-1 through 33-28 illustrate one example logical configuration of FreightRequestRequestMessage message 33000. Specifically, this figure depicts the arrangement and hierarchy of various components such as one or more levels of packages, entities, and datatypes, shown here as 33002 through 33219. As described above, packages may be used to represent hierarchy levels. Entities are discrete business elements that are used during a business transaction. Data types are used to type object entities and interfaces with a structure. For example, FreightRequestRequestMessage message 33000 includes, among other things, FreightRequest 33029. Accordingly, heterogeneous applications may communicate using this consistent message configured as such.

Figure 34:
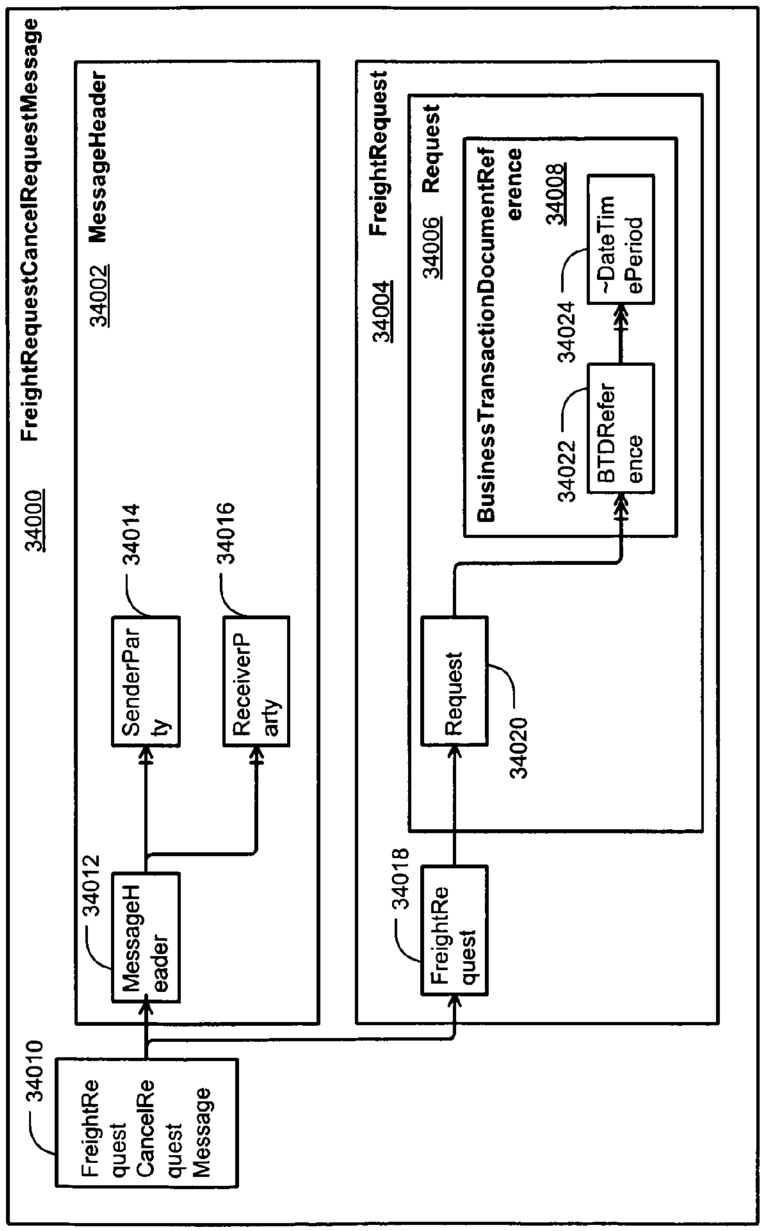
FIG. 34 shows an exemplary FreightRequestCancelRequestMessage Message Data Type.

FIG. 34 illustrates one example logical configuration of FreightRequestCancelRequestMessage message 34000. Specifically, this figure depicts the arrangement and hierarchy of various components such as one or more levels of packages, entities, and datatypes, shown here as 34002 through 34024. As described above, packages may be used to represent hierarchy levels. Entities are discrete business elements that are used during a business transaction. Data types are used to type object entities and interfaces with a structure. For example, FreightRequestCancelRequestMessage message 34000 includes, among other things, FreightRequest 34018.

Accordingly, heterogeneous applications may communicate using this consistent message configured as such.

Figures 1, 35:
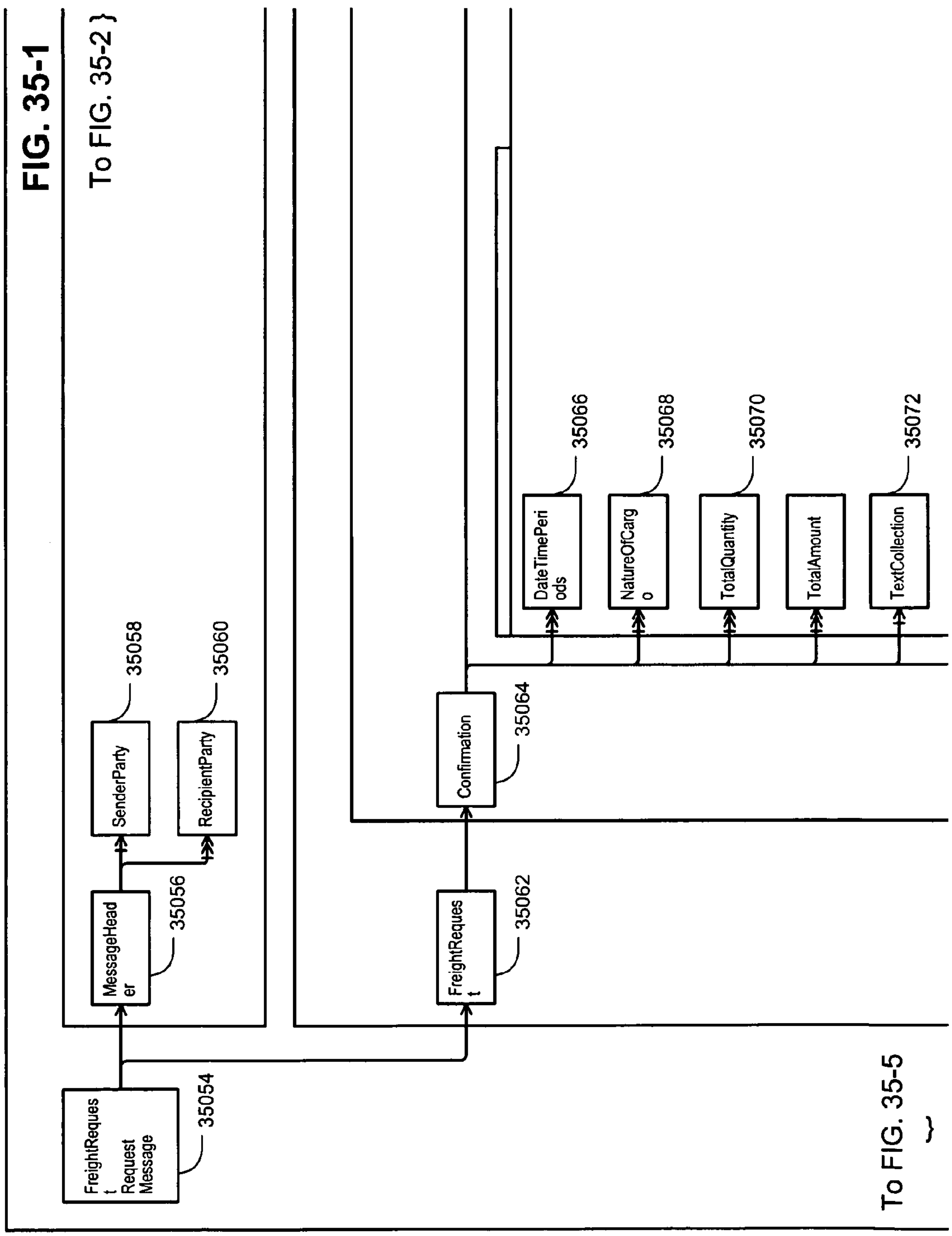
Figures 2, 35:
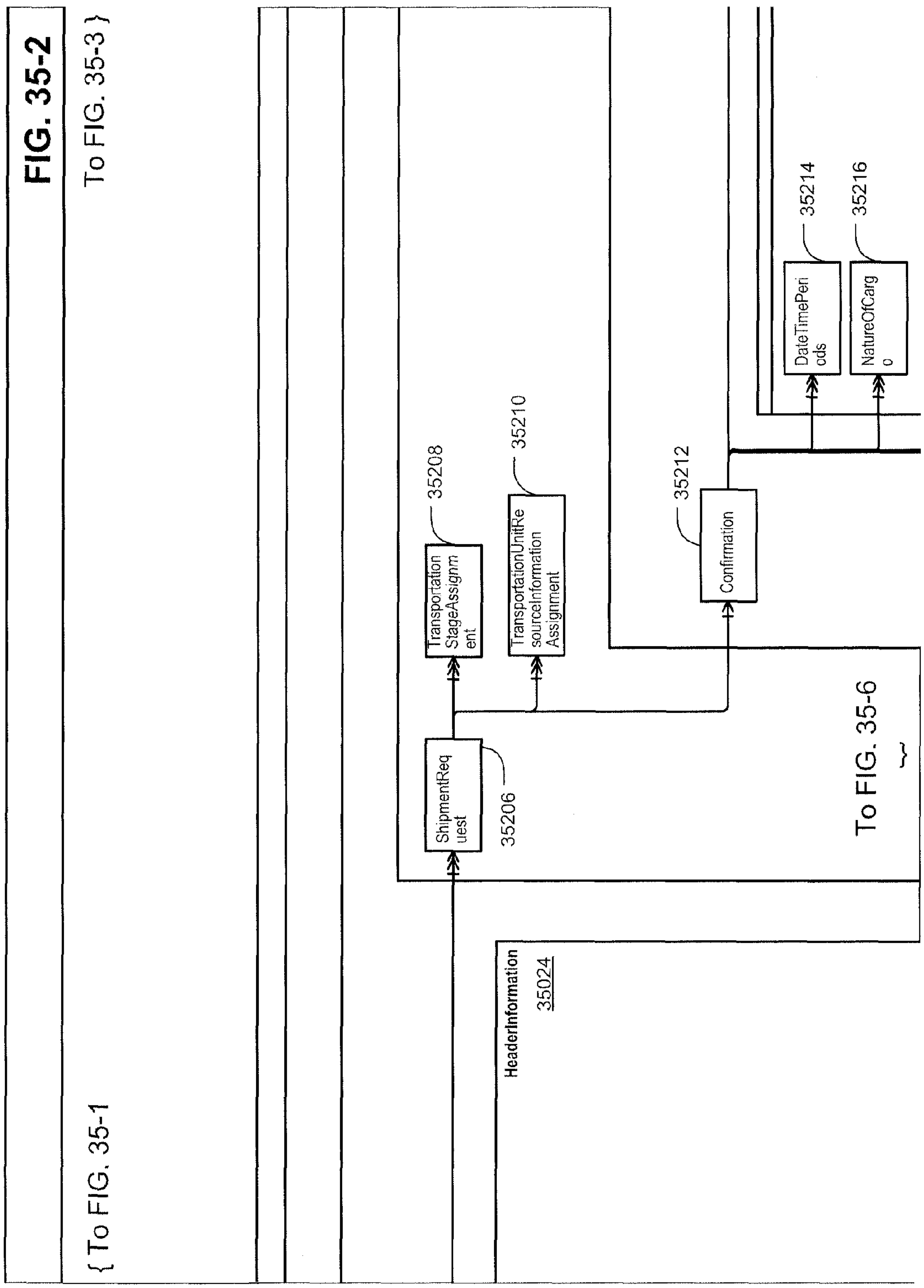
Figures 3, 35:
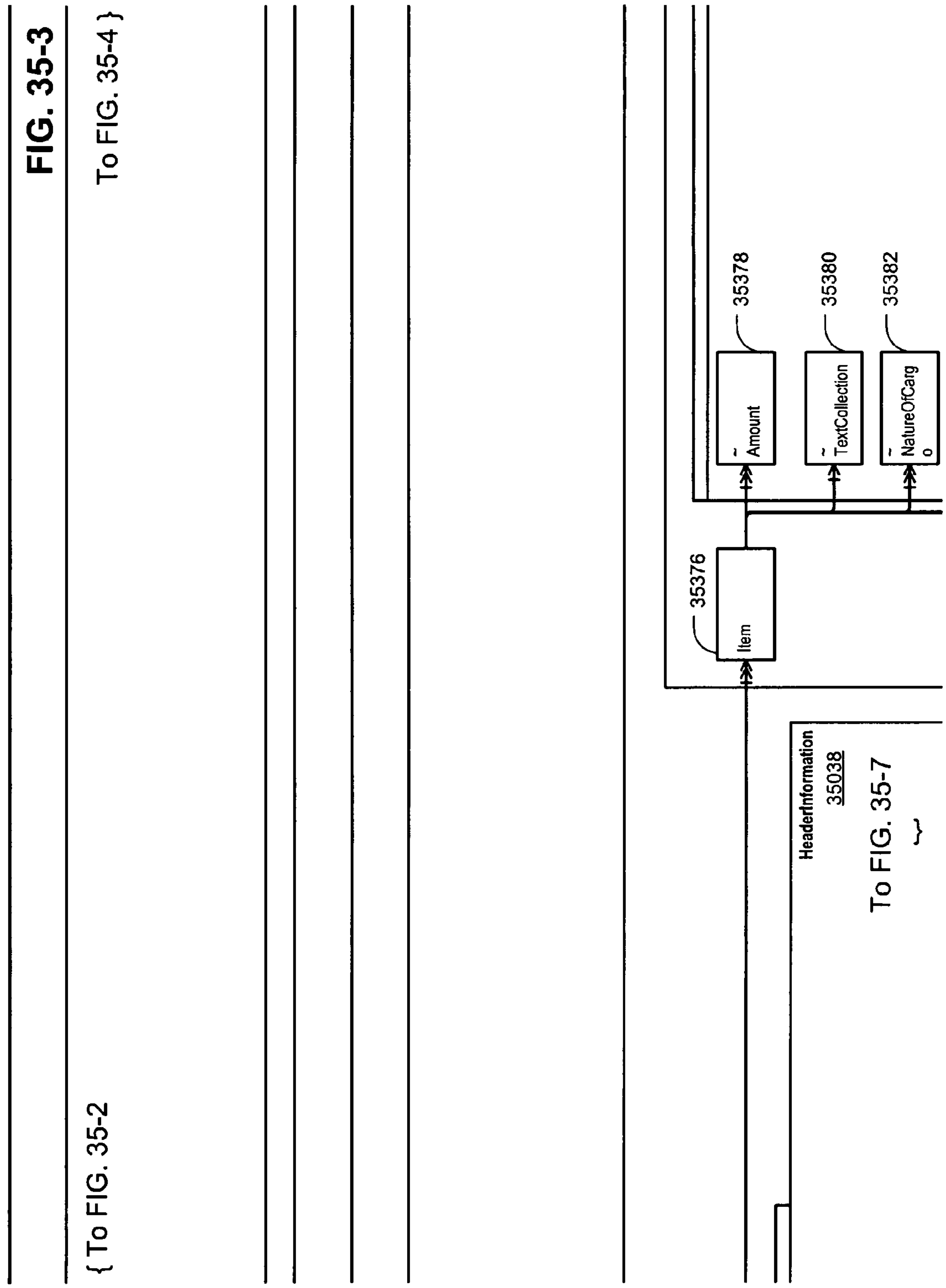
Figures 4, 35:
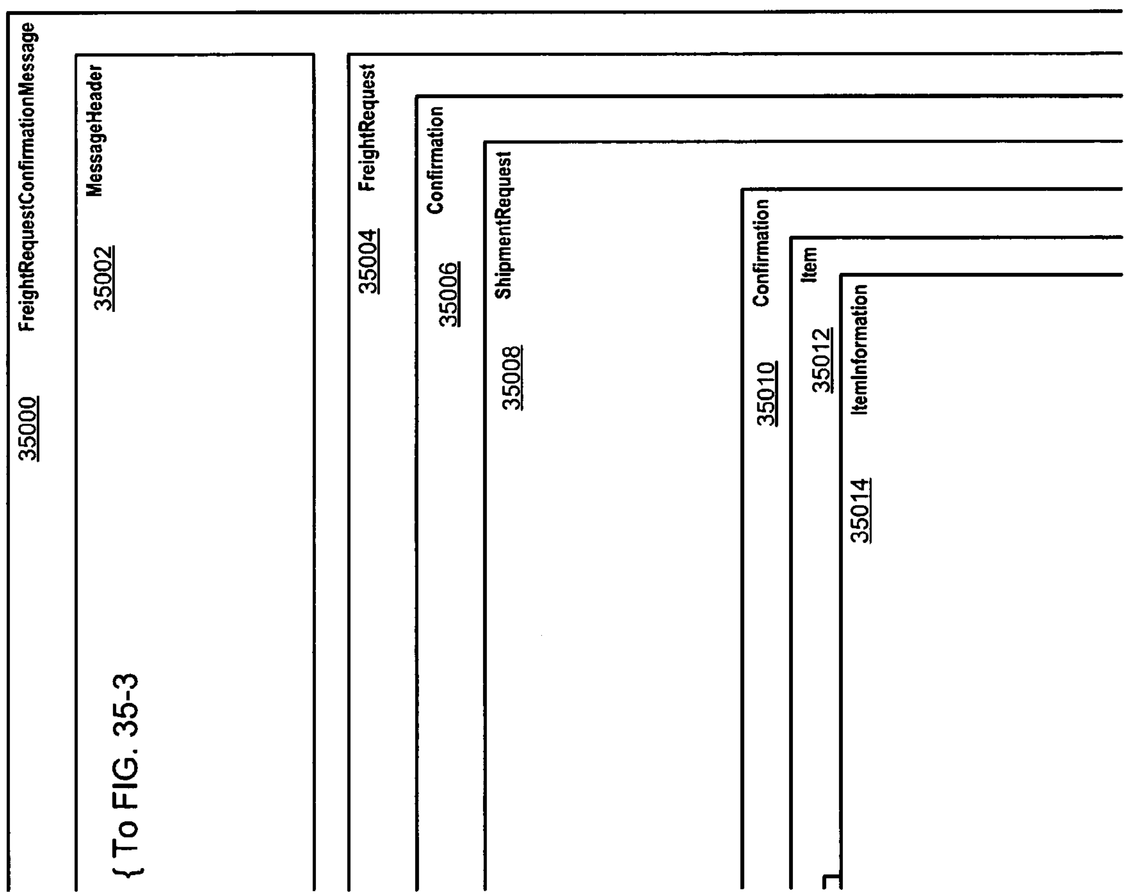
Figures 5, 35:
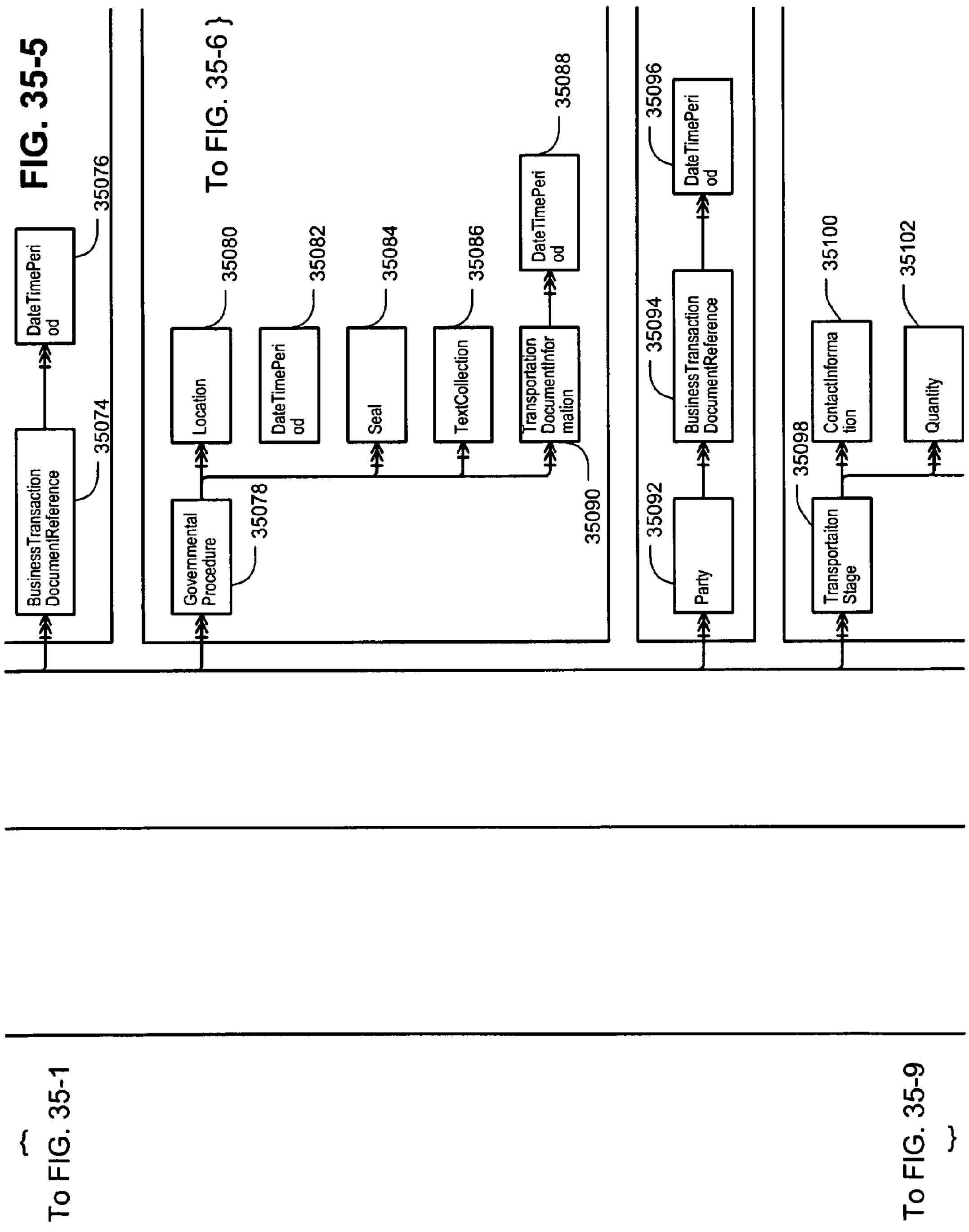
Figures 6, 35:
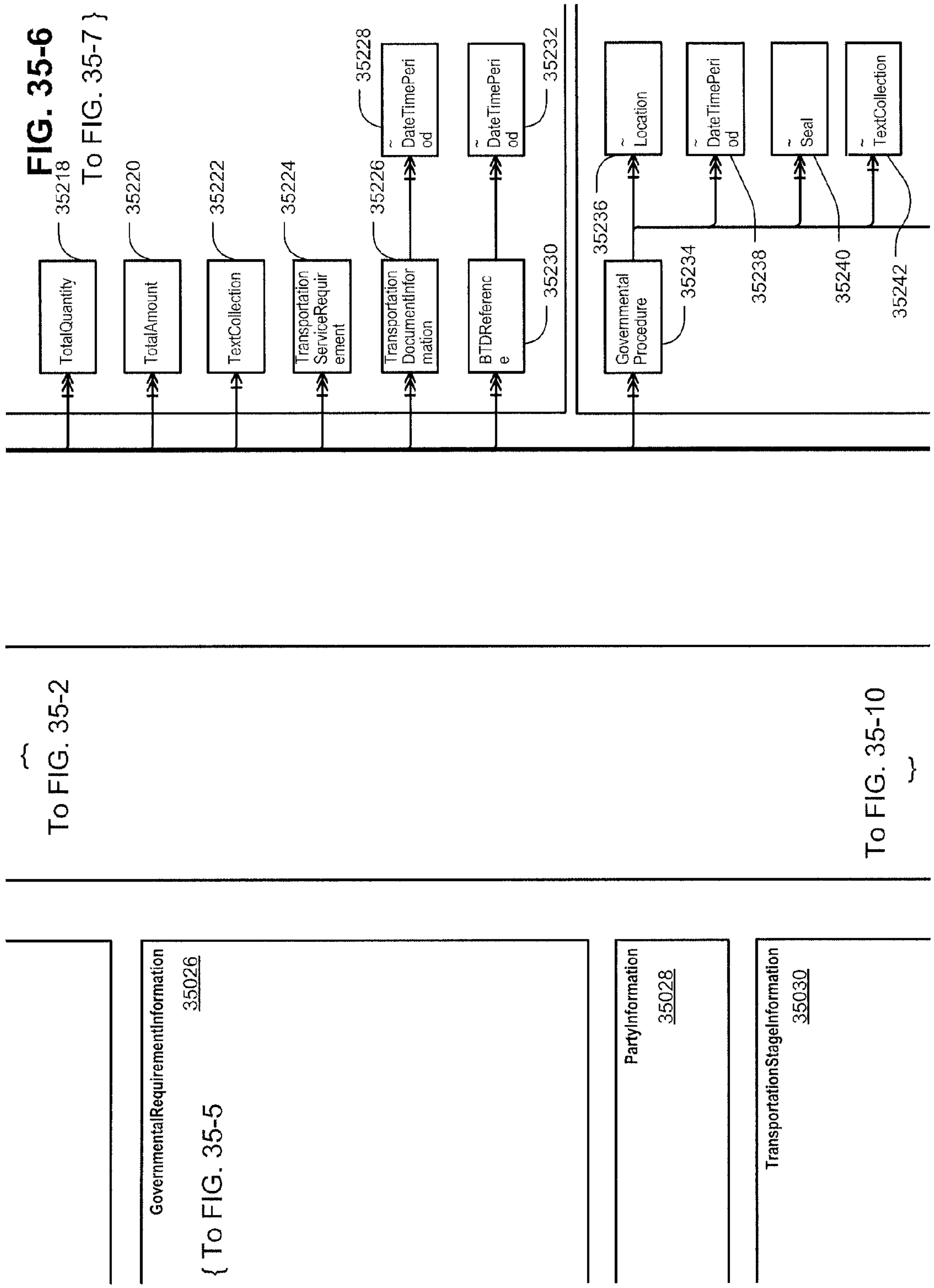
Figures 7, 35:
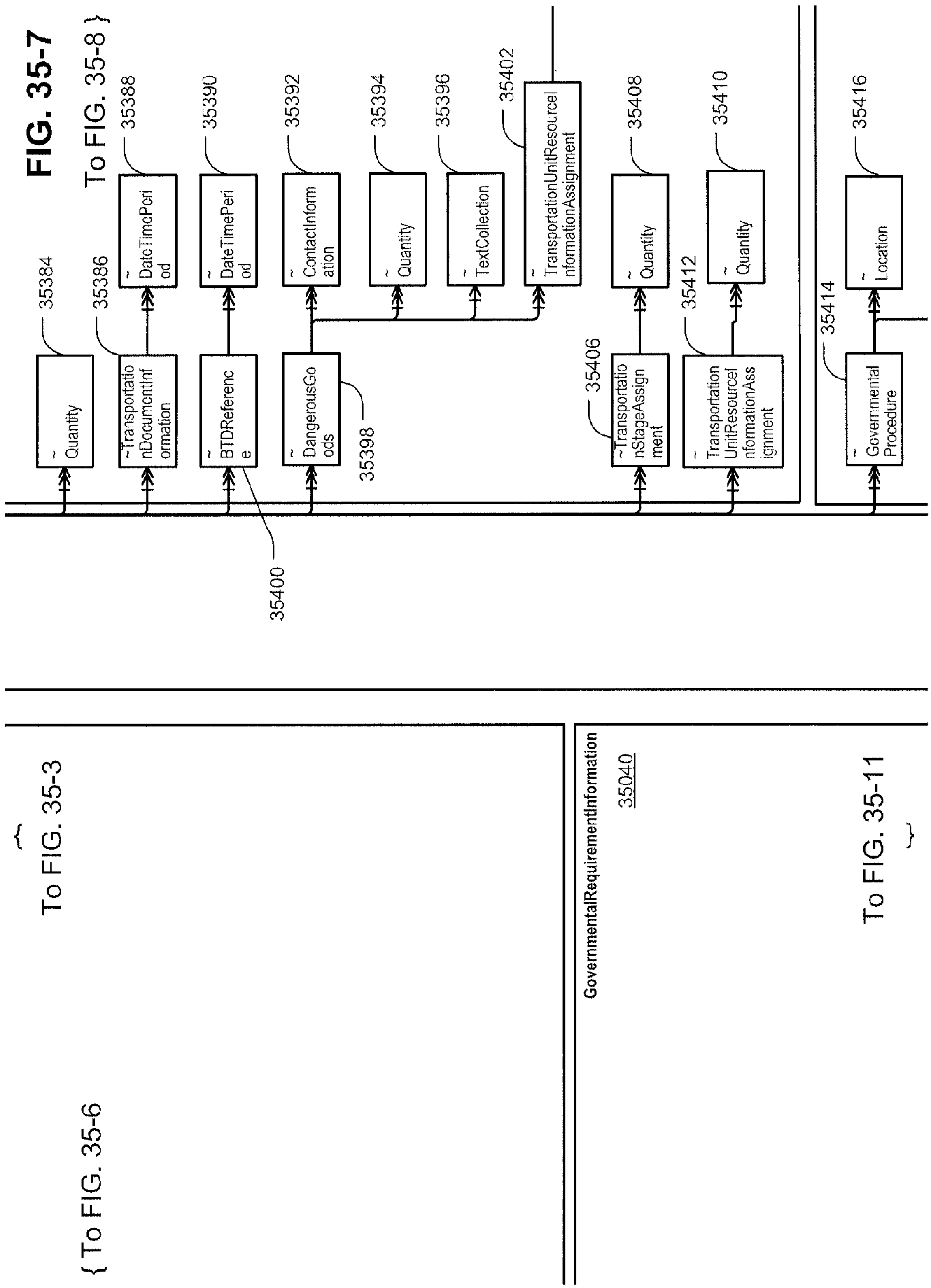
Figures 8, 35:
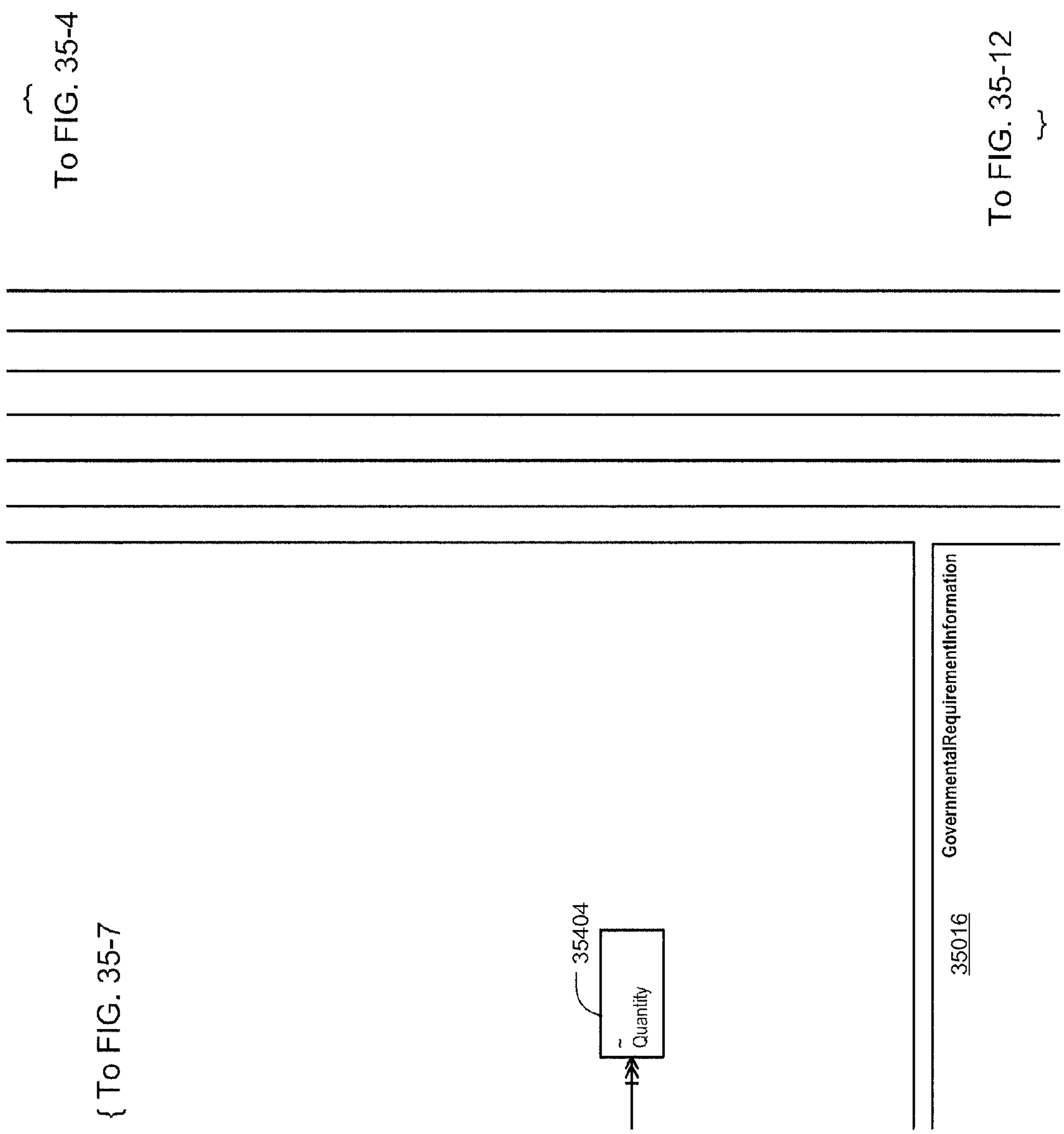
Figures 9, 35:
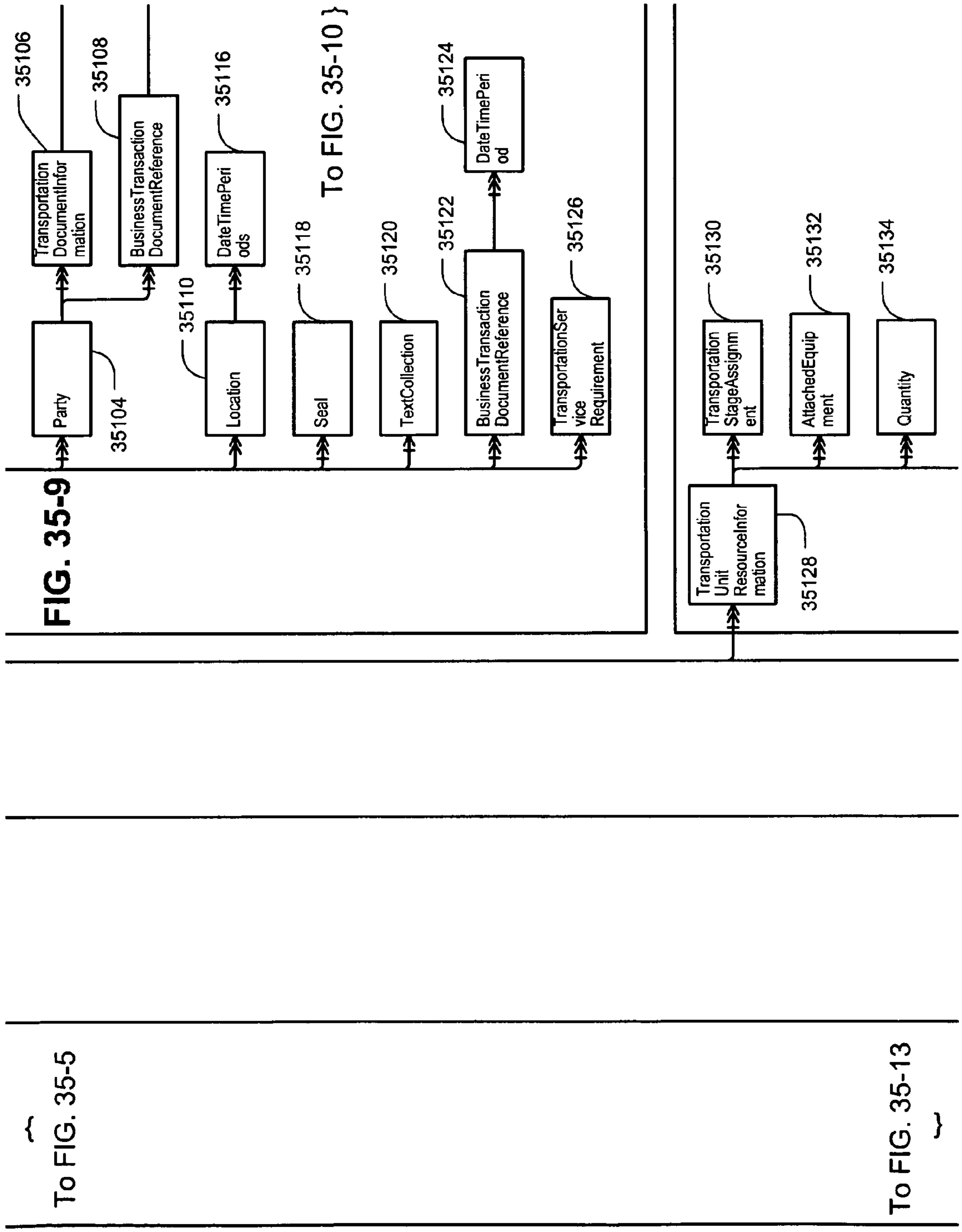
Figures 10, 35:
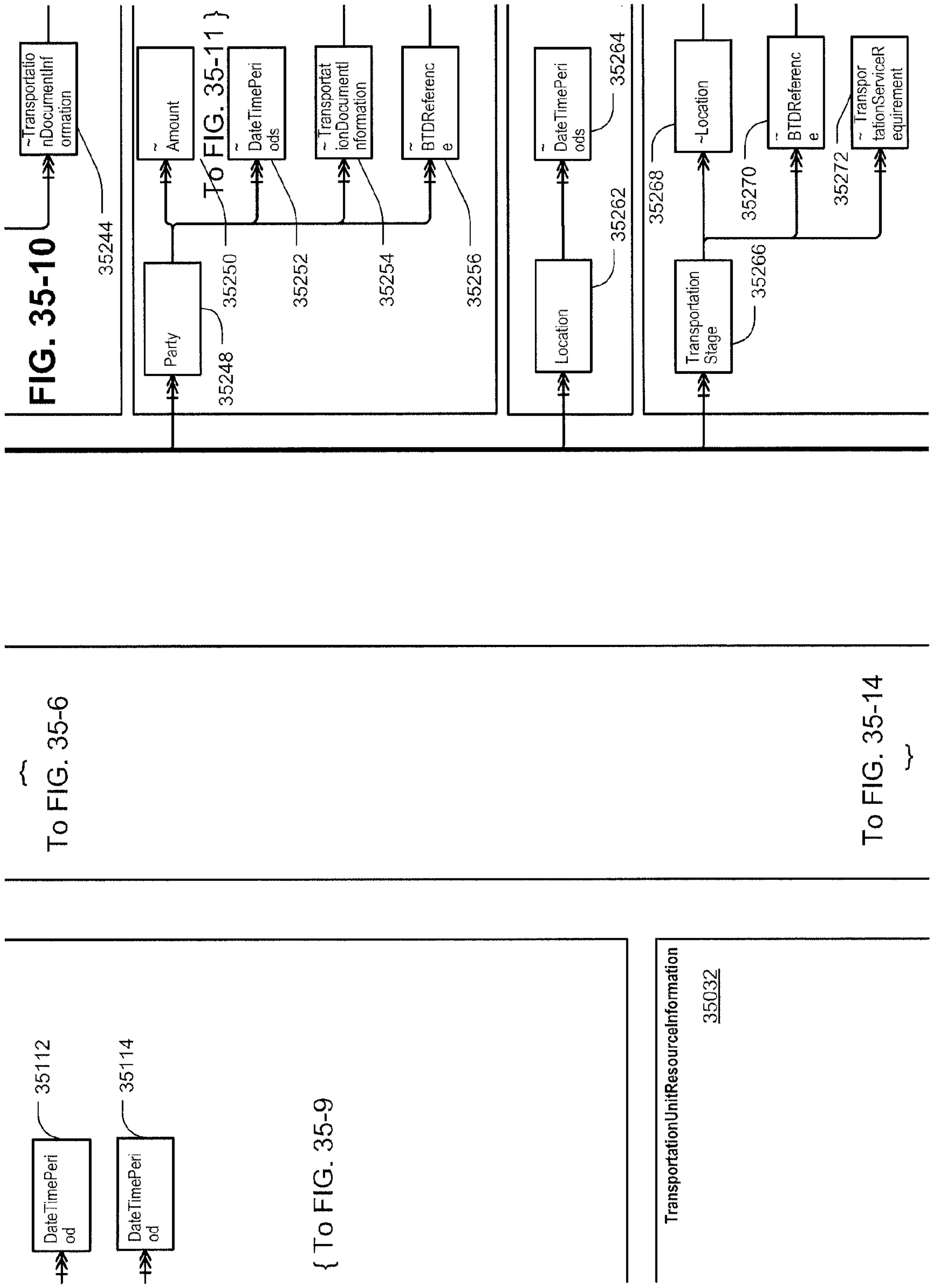
Figures 11, 35:
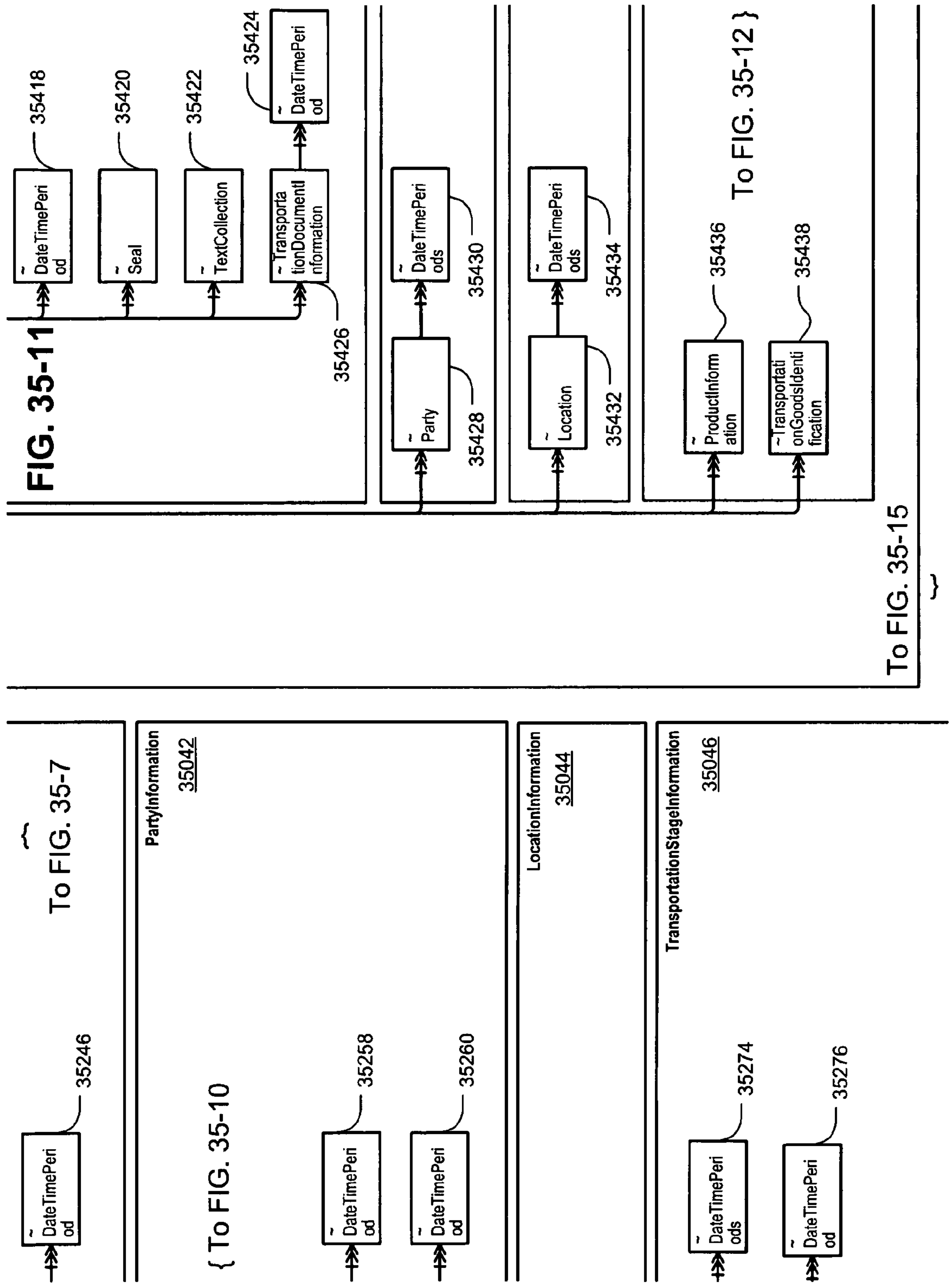
Figures 12, 35:
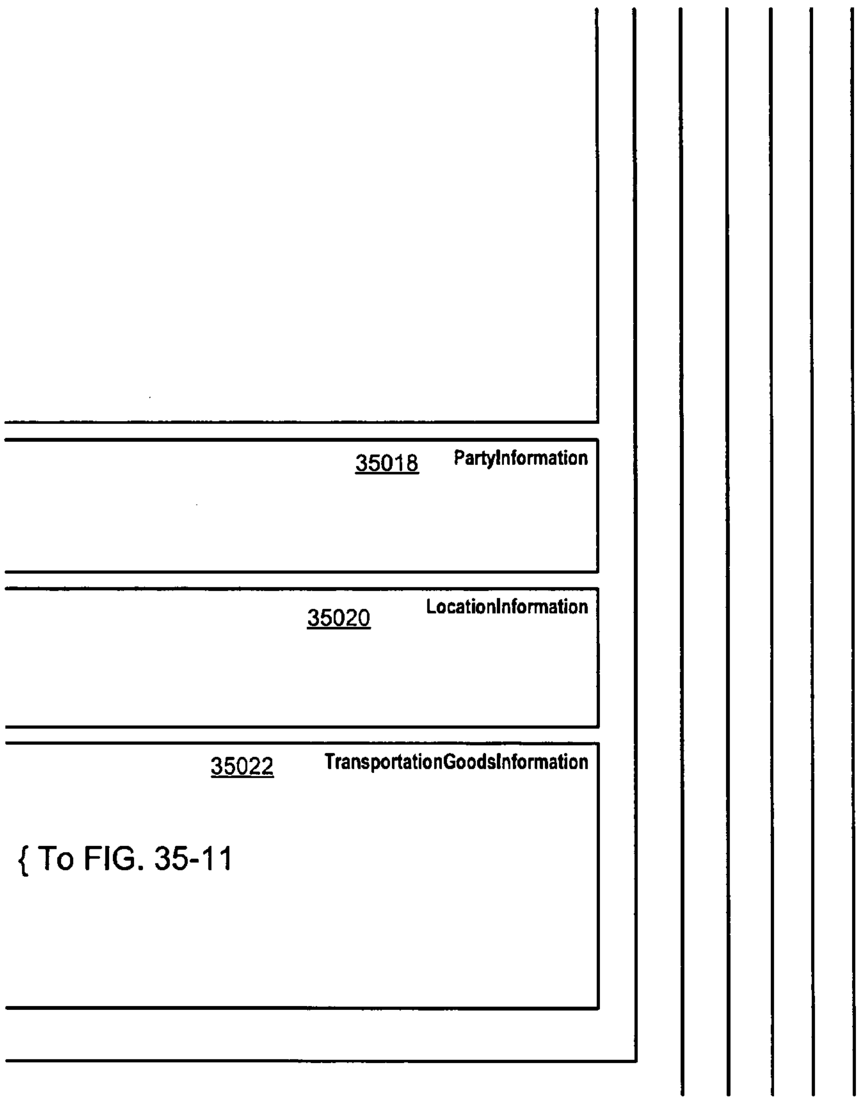
Figures 13, 35:
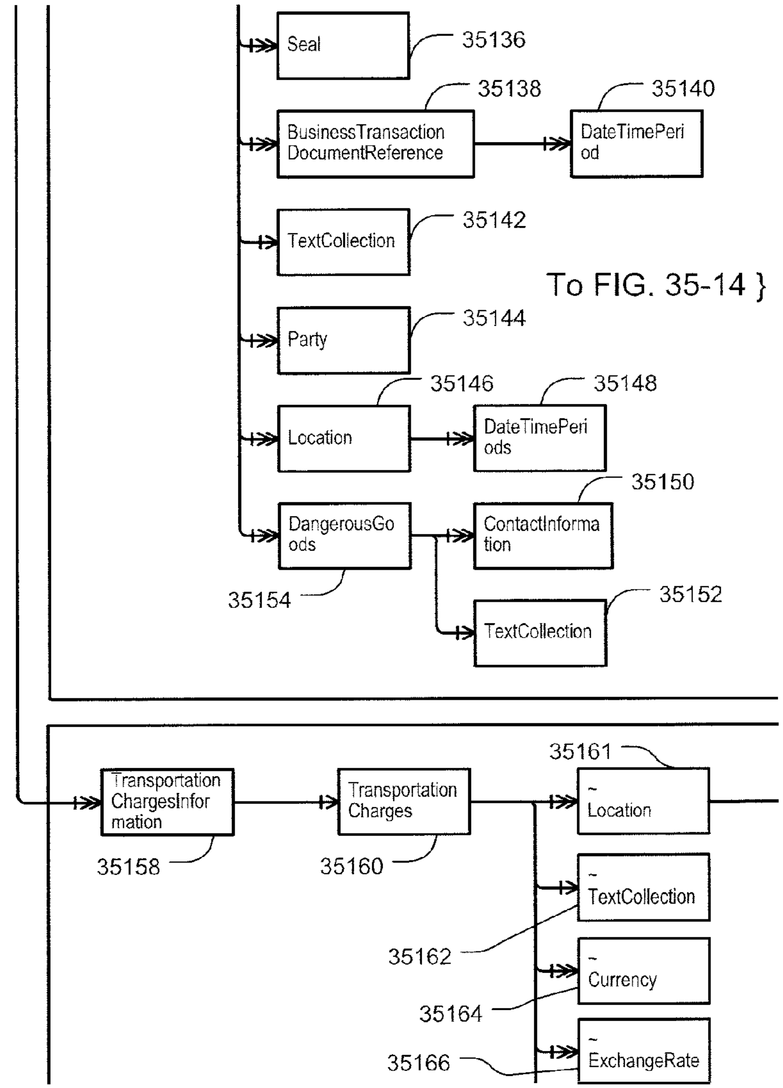
Figures 14, 35:
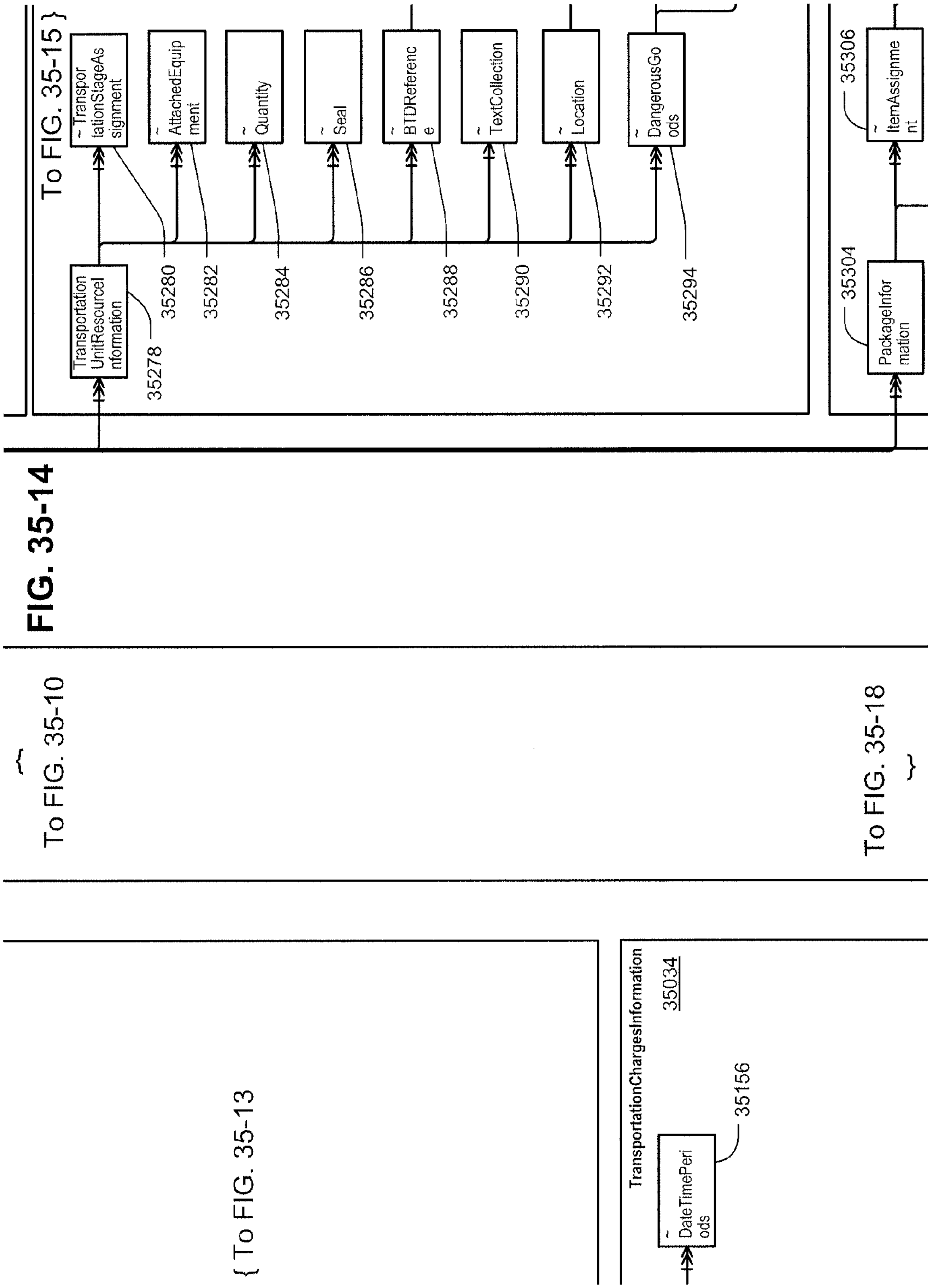
Figures 15, 35:
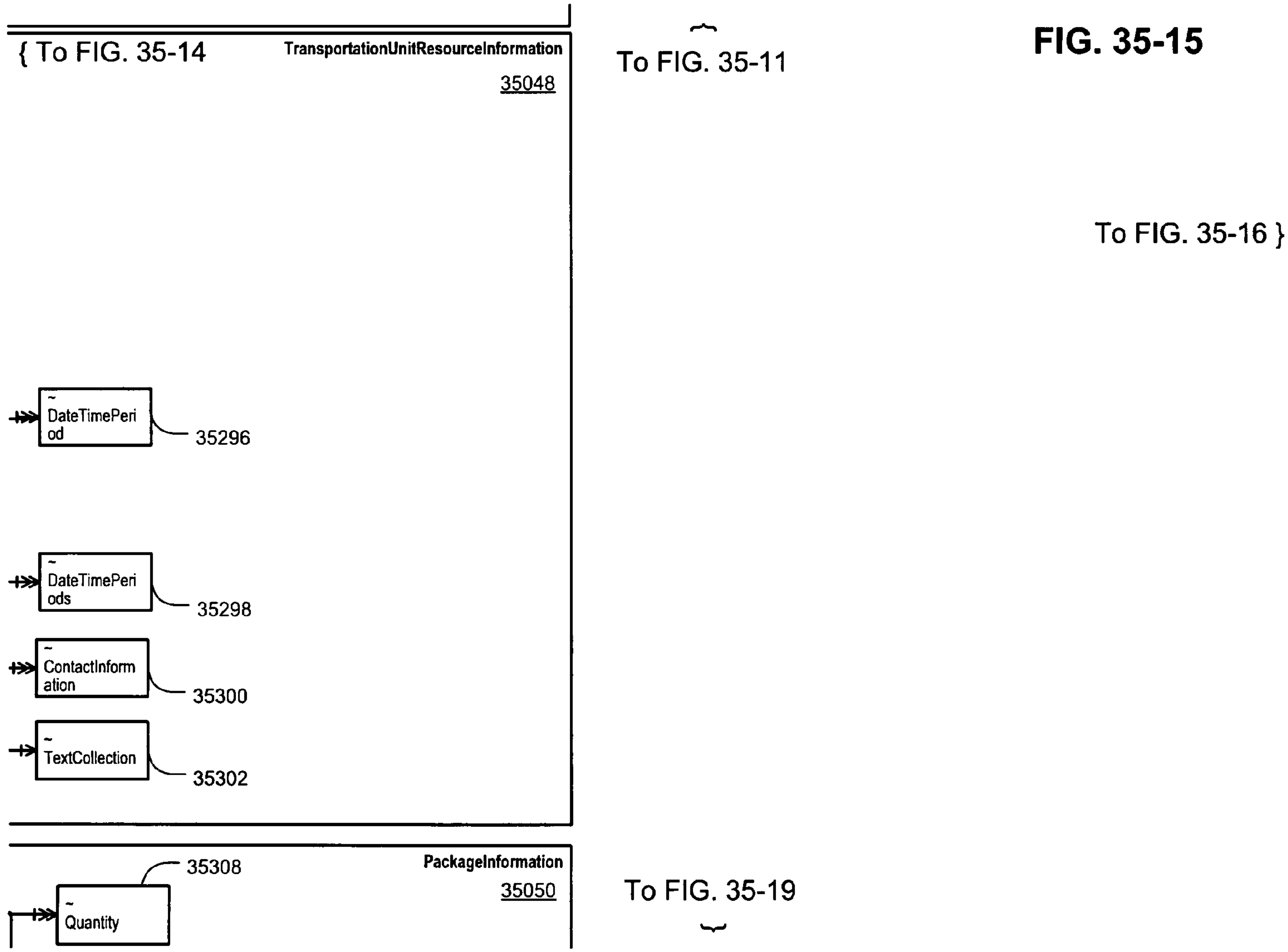
Figures 16, 35:
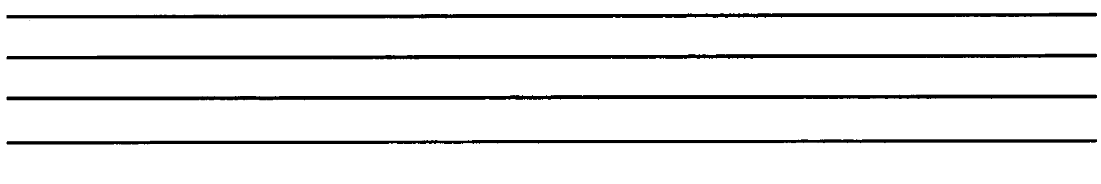
Figures 17, 35:
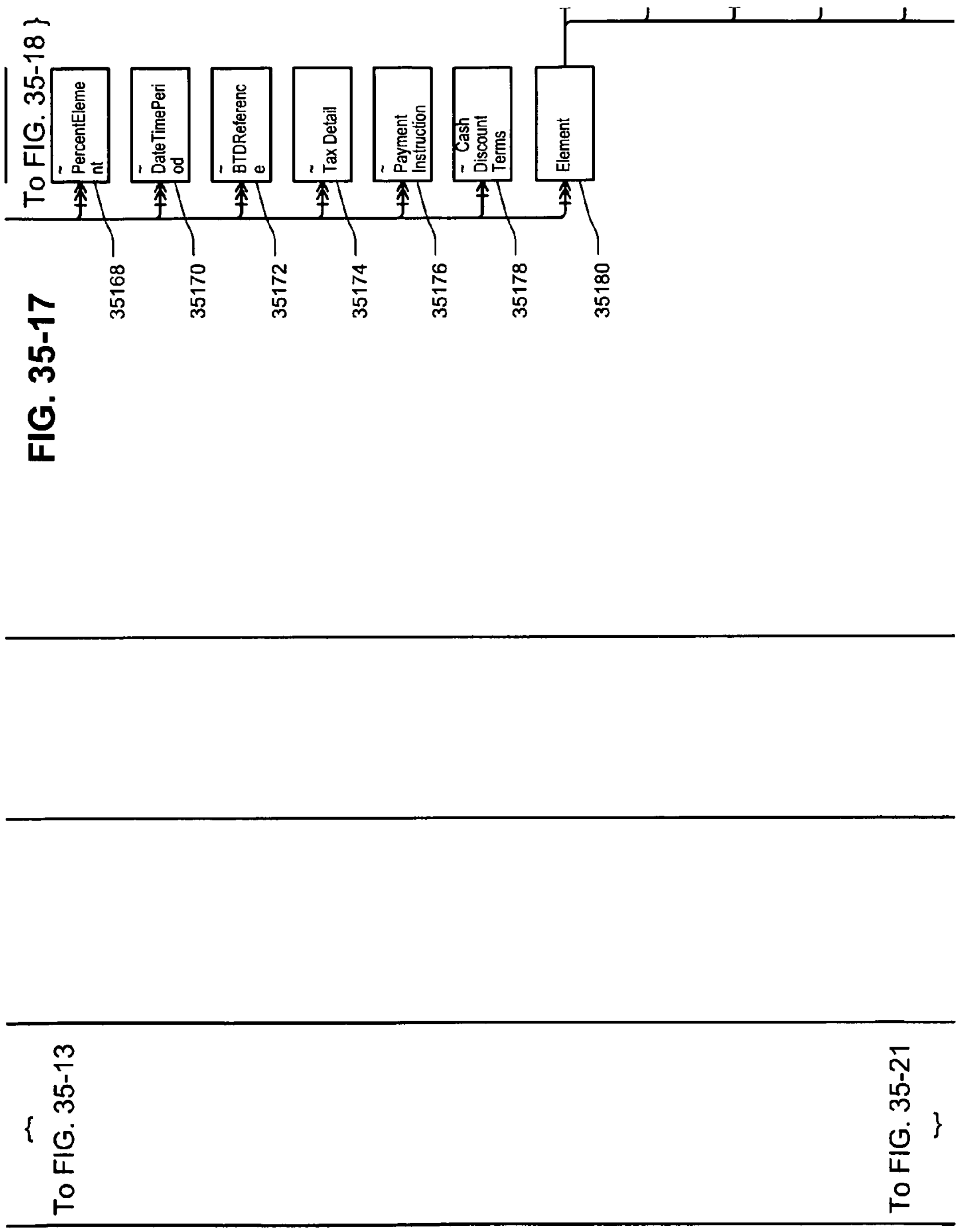
Figures 18, 35:
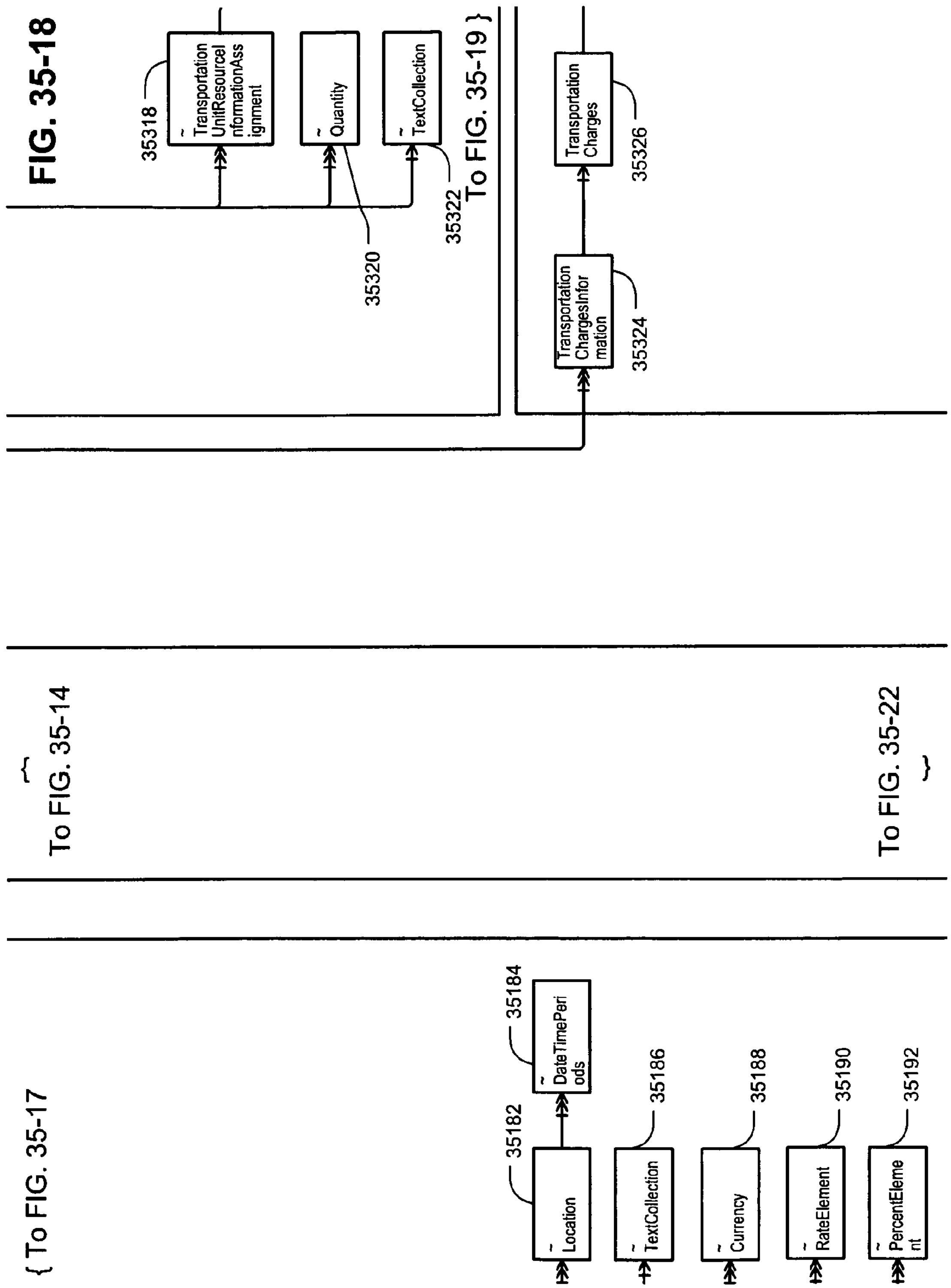
Figures 19, 35:
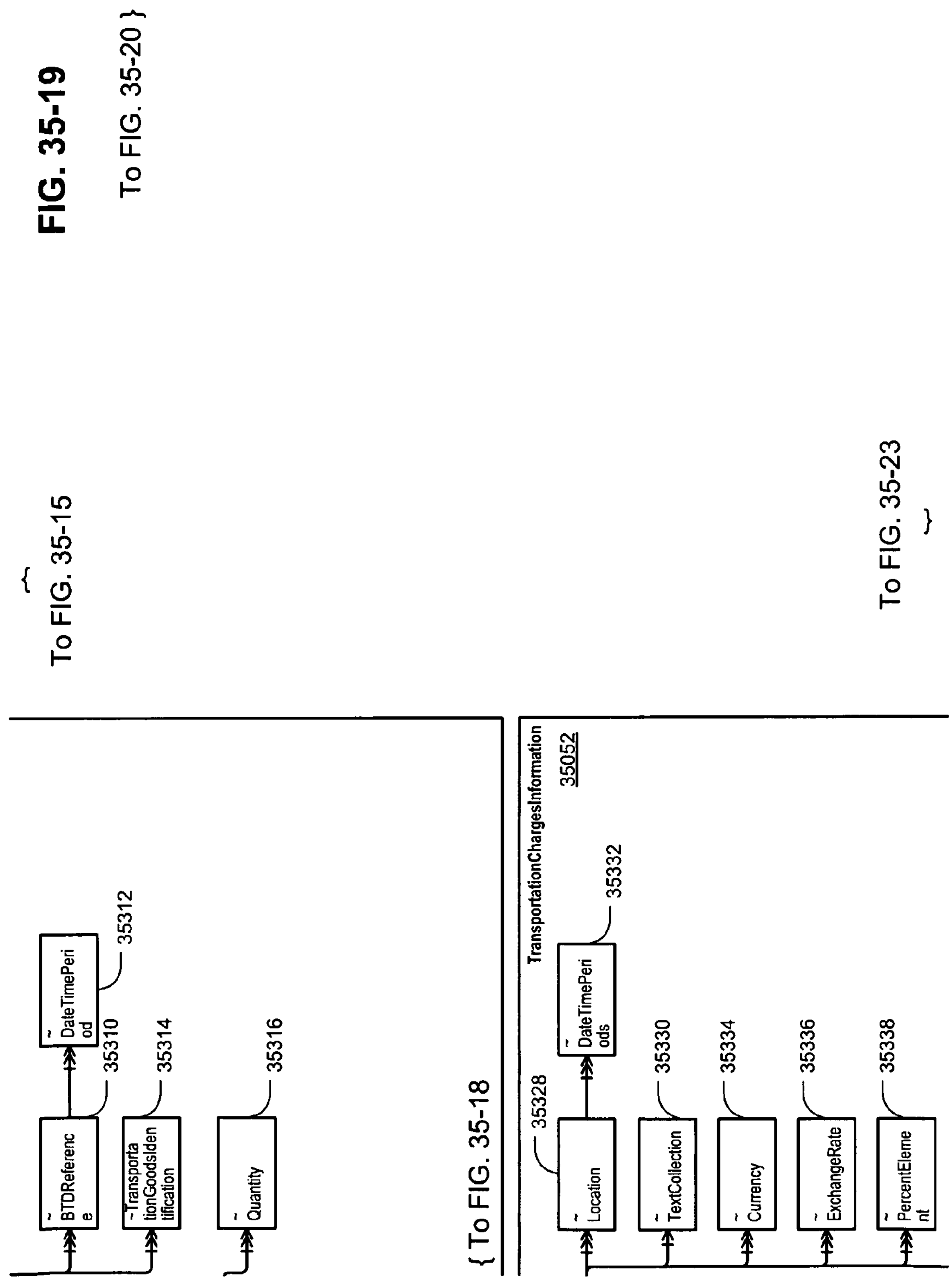
Figures 22, 35:
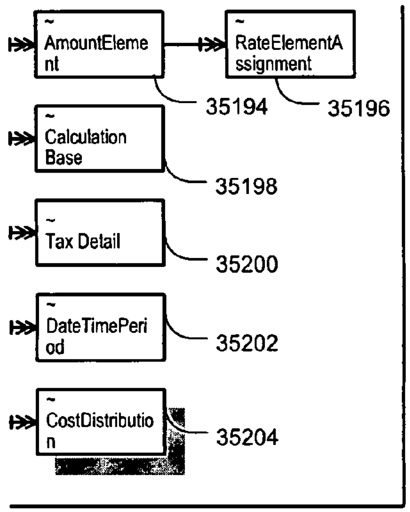
Figures 23, 35:
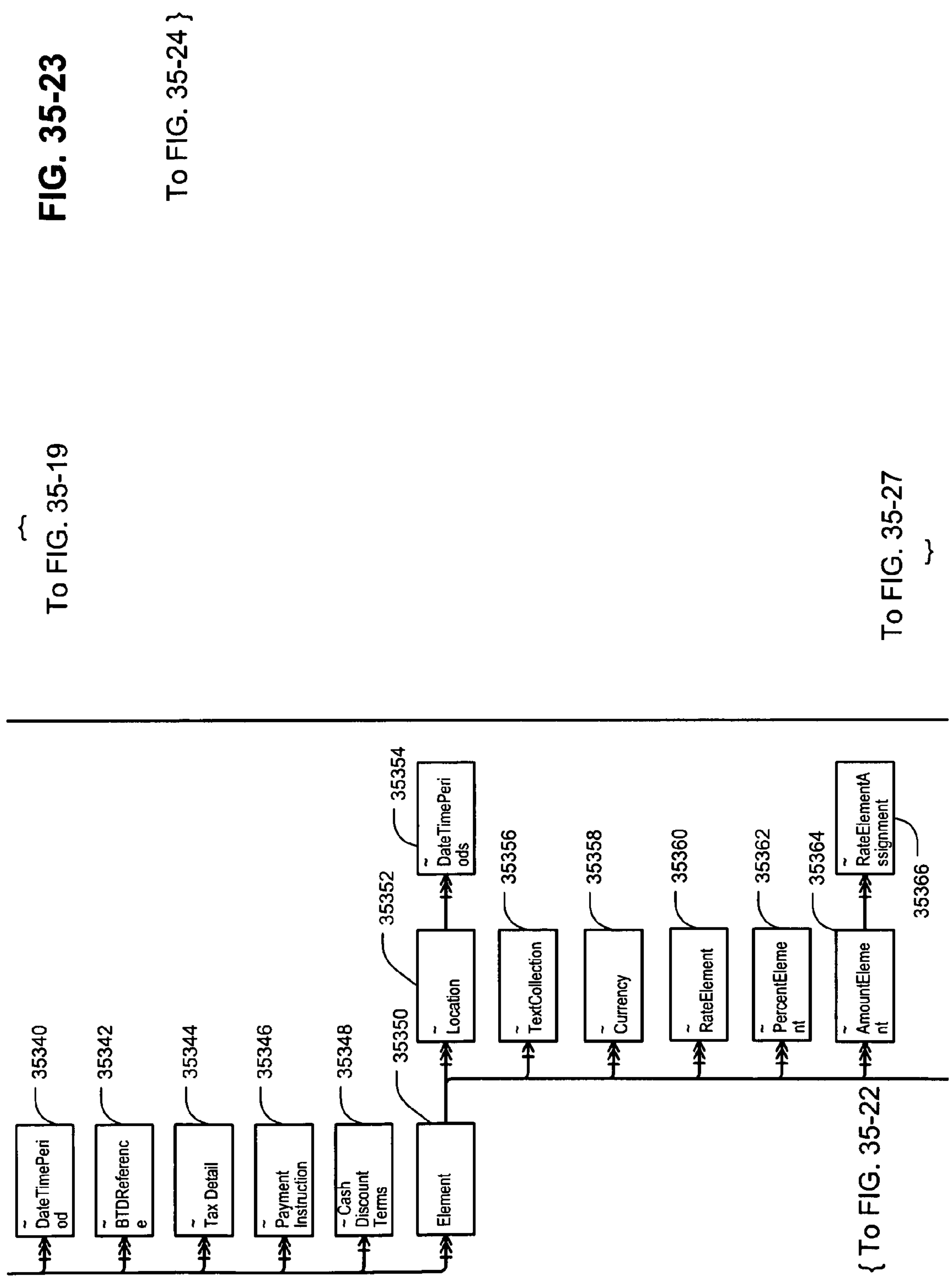
Figures 25, 35:
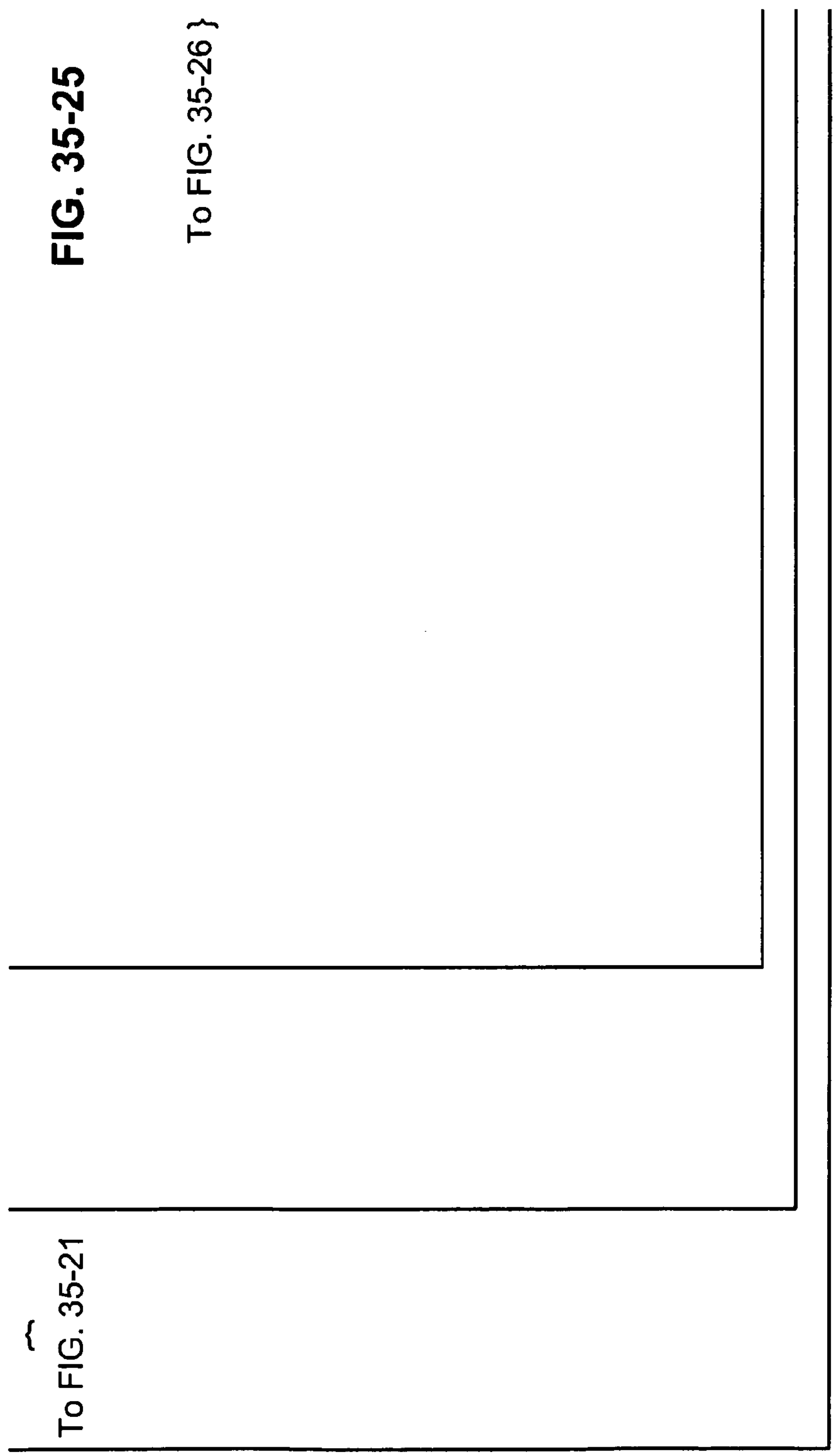
Figures 26, 35:
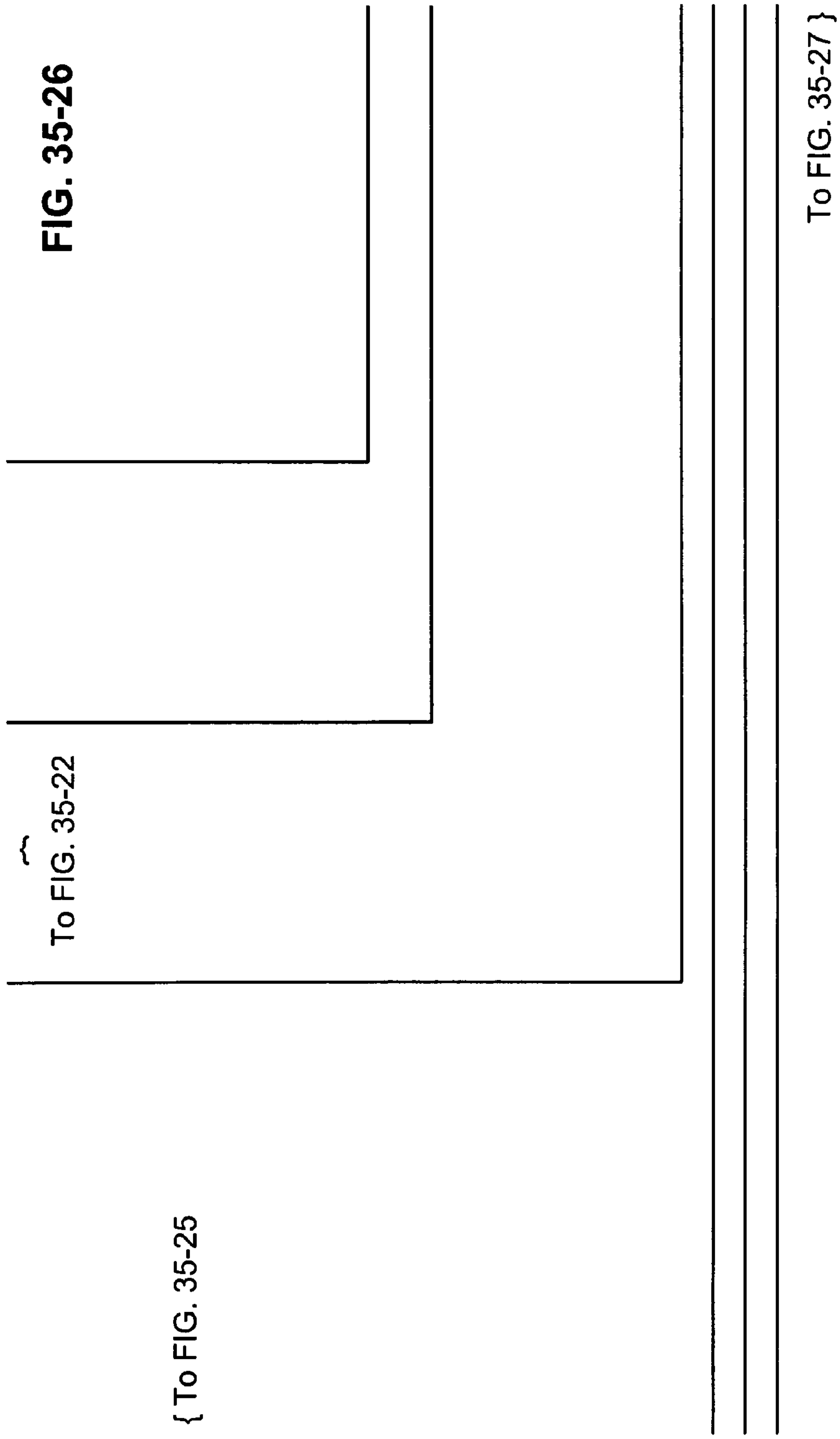
Figures 27, 35:
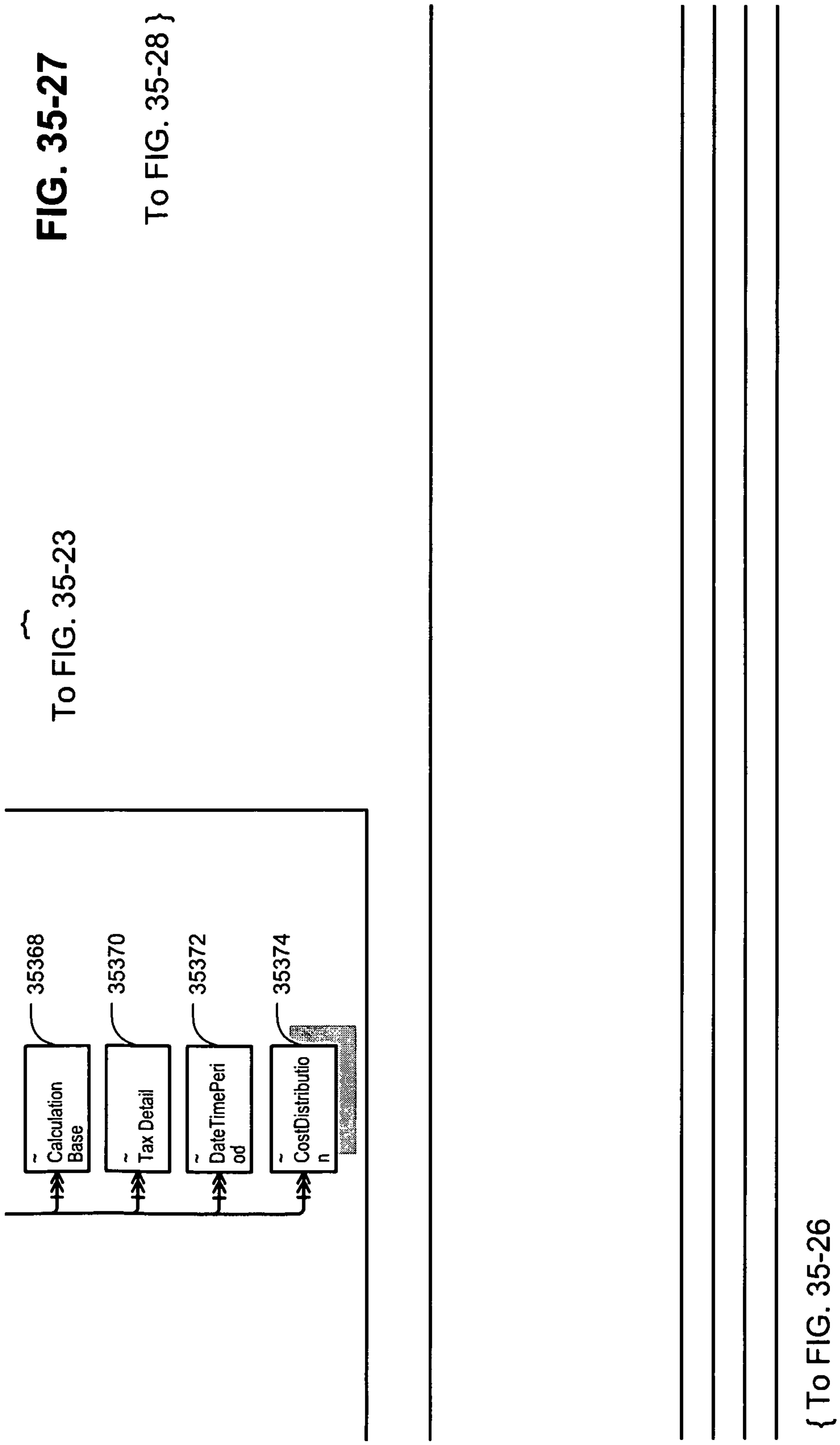
Figures 28, 35:
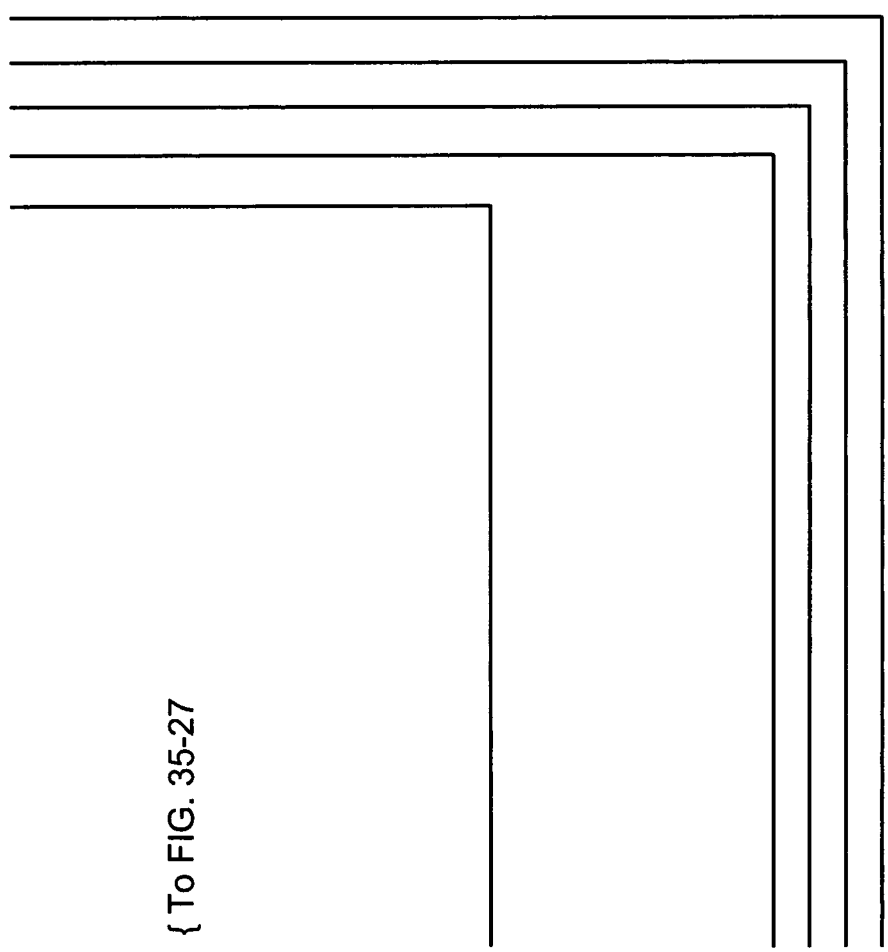

Additionally, FIGS. 35-1 through 35-28 illustrate one example logical configuration of FreightRequestConfirmationMessage message 35000. Specifically, this figure depicts the arrangement and hierarchy of various components such as one or more levels of packages, entities, and datatypes, shown here as 35002 through 35438. As described above, packages may be used to represent hierarchy levels. Entities are discrete business elements that are used during a business transaction. Data types are used to type object entities and interfaces with a structure. For example, FreightRequestConfirmationMessage message 35000 includes, among other things, FreightRequest 35062. Accordingly, heterogeneous applications may communicate using this consistent message configured as such.

Figure 36:
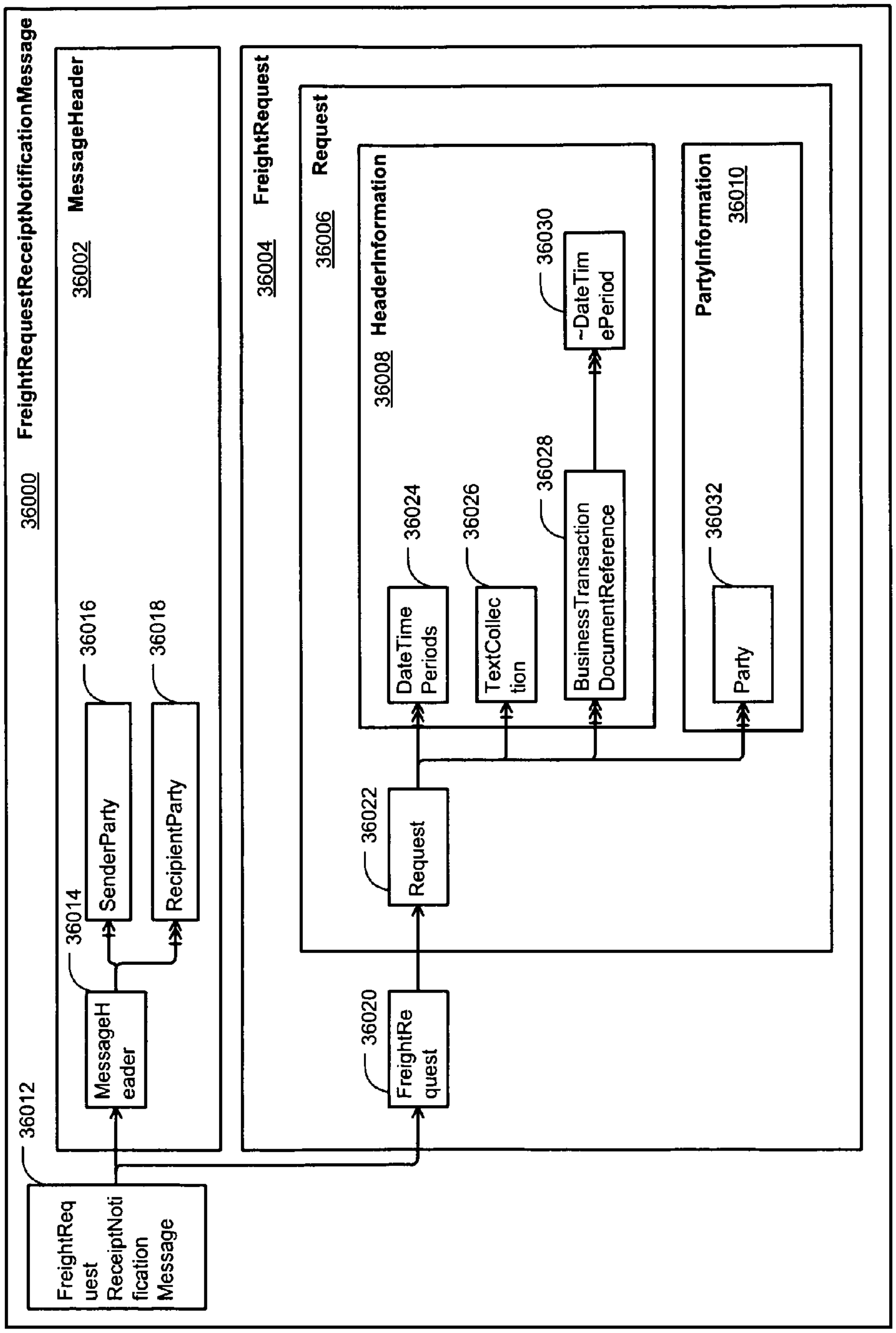
FIG. 36 shows an exemplary FreightRequestReceiptNotificationMessage Message Data Type.

Additionally, FIG. 36 illustrates one example logical configuration of FreightRequestReceiptNotificationMessage message 36000. Specifically, this figure depicts the arrangement and hierarchy of various components such as one or more levels of packages, entities, and datatypes, shown here as 36002 through 36032. As described above, packages may be used to represent hierarchy levels. Entities are discrete business elements that are used during a business transaction. Data types are used to type object entities and interfaces with a structure. For example, FreightRequestReceiptNotificationMessage message 36000 includes, among other things, FreightRequest 36020. Accordingly, heterogeneous applications may communicate using this consistent message configured as such.

Figure 37:
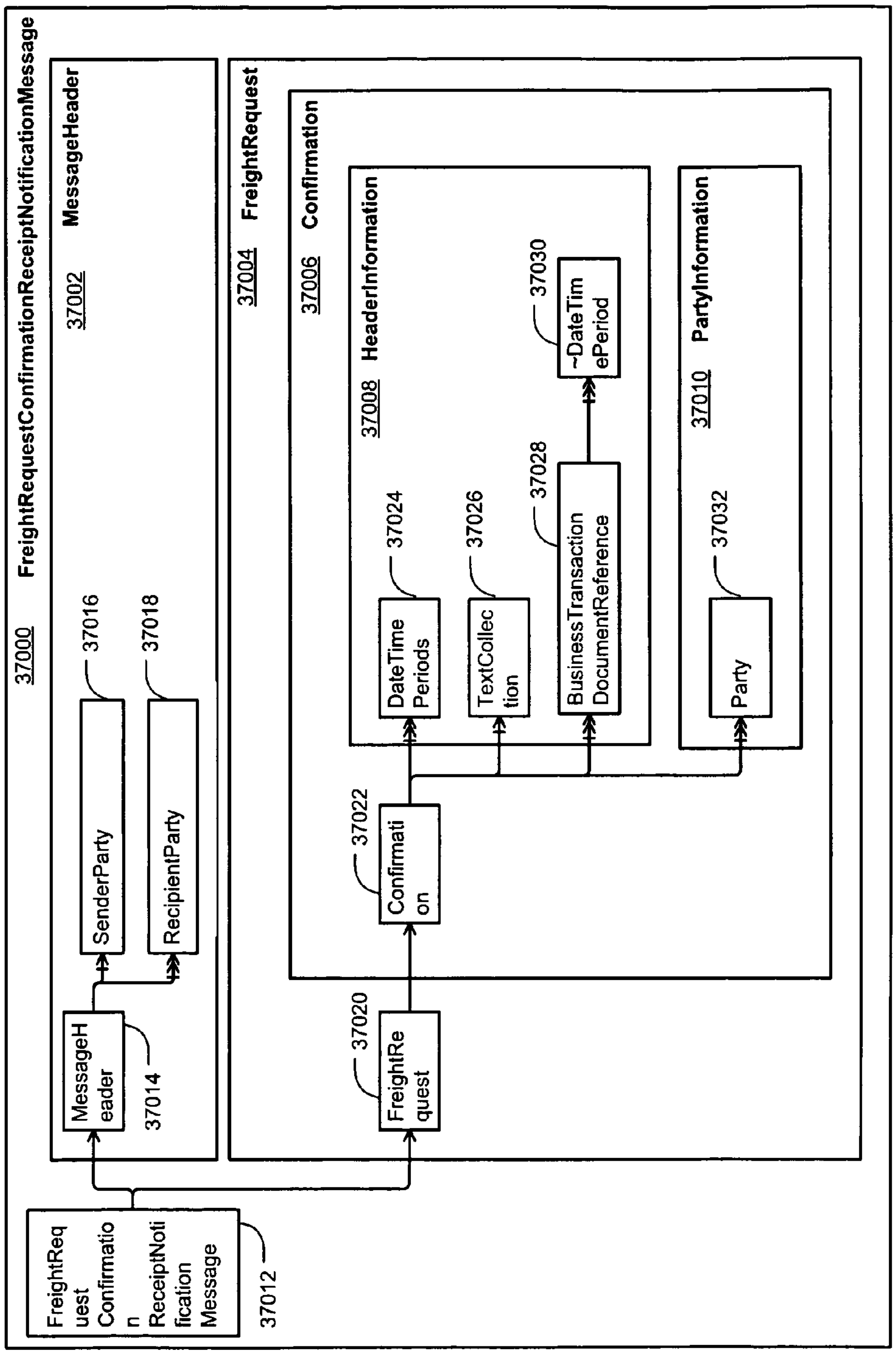
FIG. 37 shows an exemplary FreightRequestConfirmationReceiptNotificationMessage Message Data Type.

Additionally, FIG. 37 illustrates one example logical configuration of FreightRequestConfirmationReceiptNotificationMessage message 37000. Specifically, this figure depicts the arrangement and hierarchy of various components such as one or more levels of packages, entities, and datatypes, shown here as 37002 through 37032. As described above, packages may be used to represent hierarchy levels. Entities are discrete business elements that are used during a business transaction. Data types are used to type object entities and interfaces with a structure. For example, FreightRequestConfirmationReceiptNotificationMessage message 37000 includes, among other things, Freight Request 37020. Accordingly, heterogeneous applications may communicate using this consistent message configured as such.

Figures 3, 33:
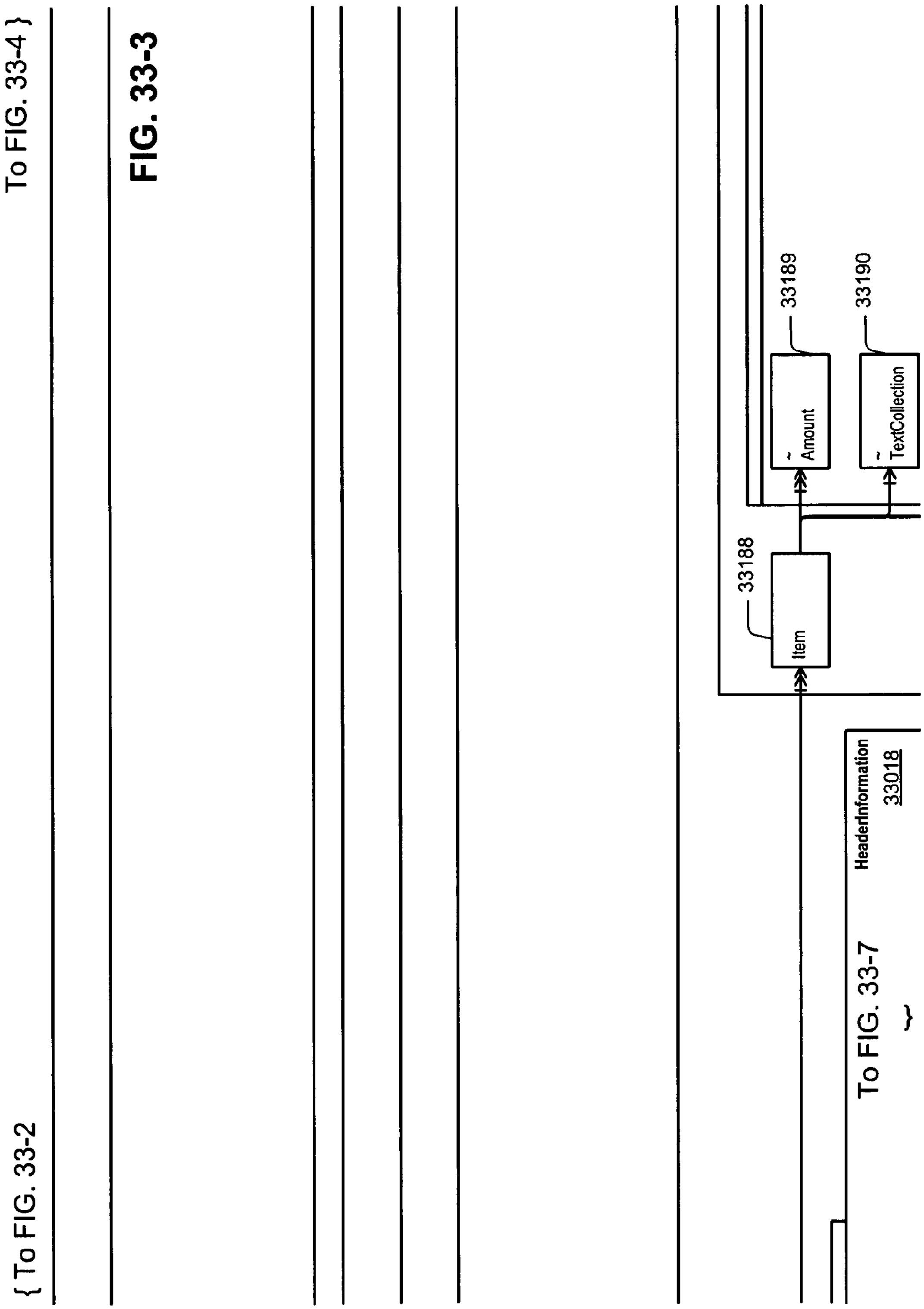
Figures 4, 33:
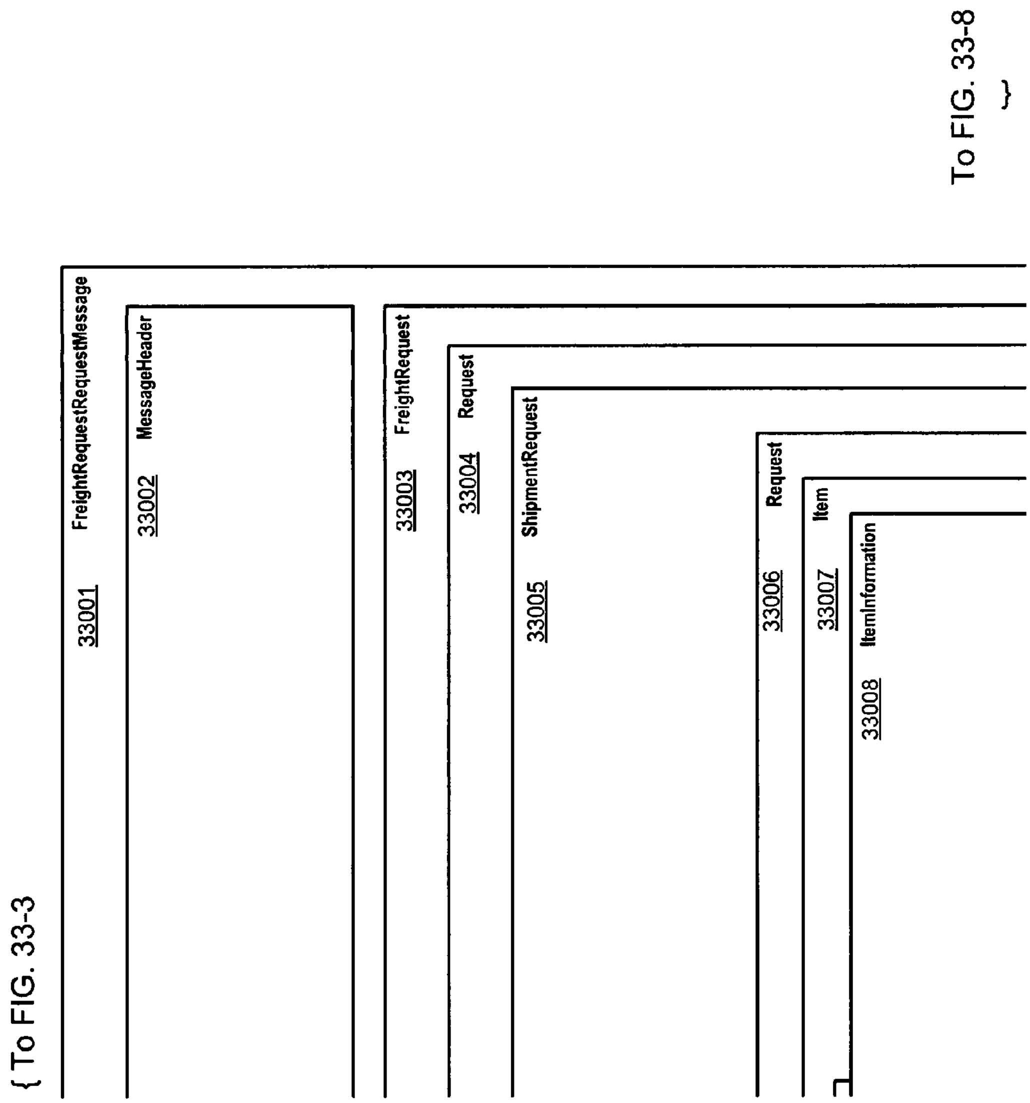

FIGS. 38-1 through 38-3 illustrate one example logical configuration of FreightRequestCancelRequestMessage 38000 element structure. Specifically, this figure depicts the arrangement and hierarchy of various components such as one or more levels of packages, entities, and datatypes, shown here as 38000 through 38088. As described above, packages may be used to represent hierarchy levels. Entities are discrete business elements that are used during a business transaction. Data types are used to type object entities and interfaces with a structure. For example, FreightRequestCancelRequestMessage 38000 includes, among other things, a FreightRequest 38014. Accordingly, heterogeneous applications may communicate using this consistent message configured as such.

FIGS. 39-1 through 39-153 illustrate one example logical configuration of a FreightRequestConfirmationMessage 390000 element structure. Specifically, this figure depicts the arrangement and hierarchy of various components such as one or more levels of packages, entities, and datatypes, shown here as 390000 through 394850. As described above, packages may be used to represent hierarchy levels. Entities are discrete business elements that are used during a business transaction. Data types are used to type object entities and interfaces with a structure. For example, the FreightRequestConfirmationMessage 390000 includes, among other things, a FreightRequestConfirmationMessage entity 390002. Accordingly, heterogeneous applications may communicate using this consistent message configured as such.

Figures 5, 33:
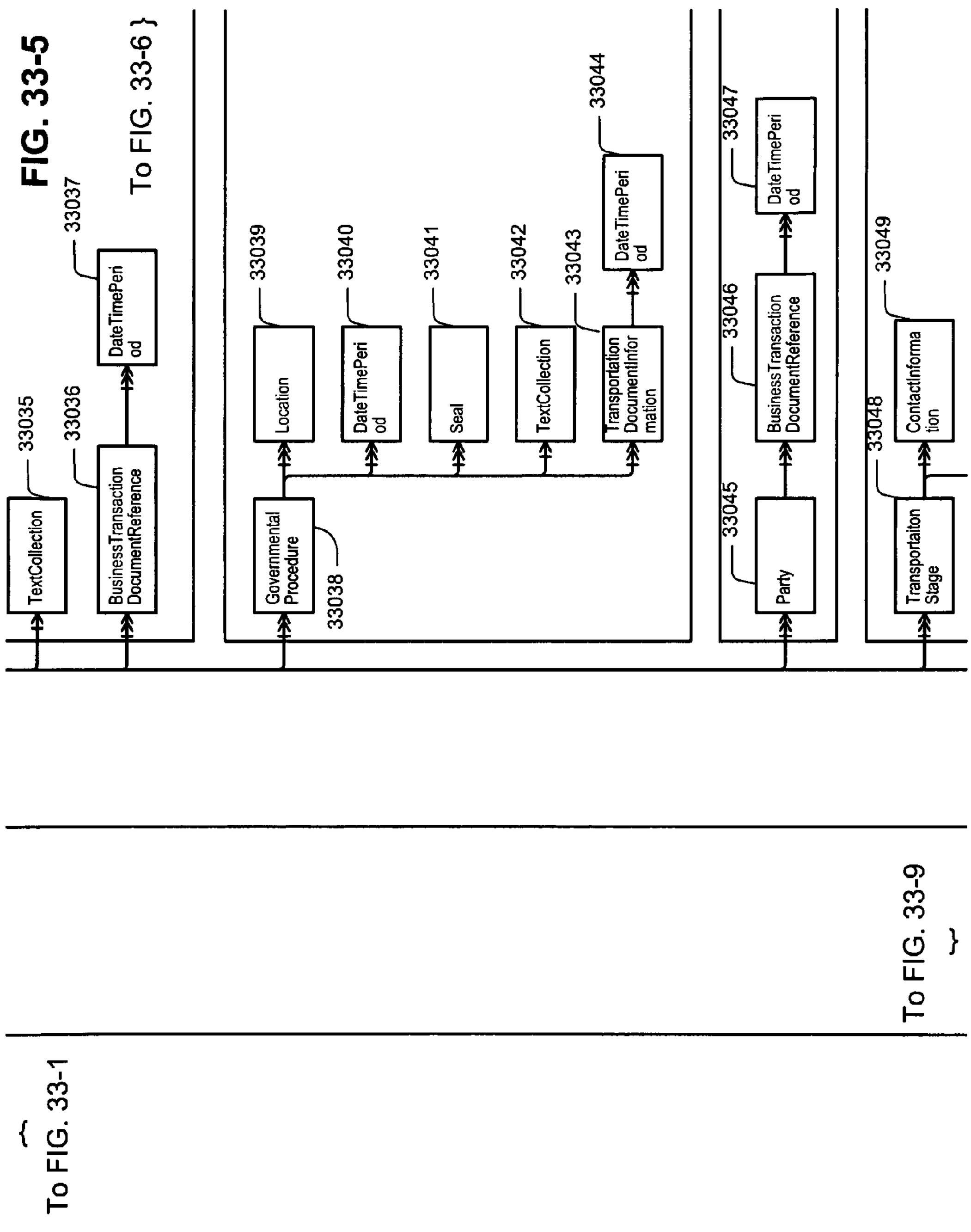
Figures 7, 33:
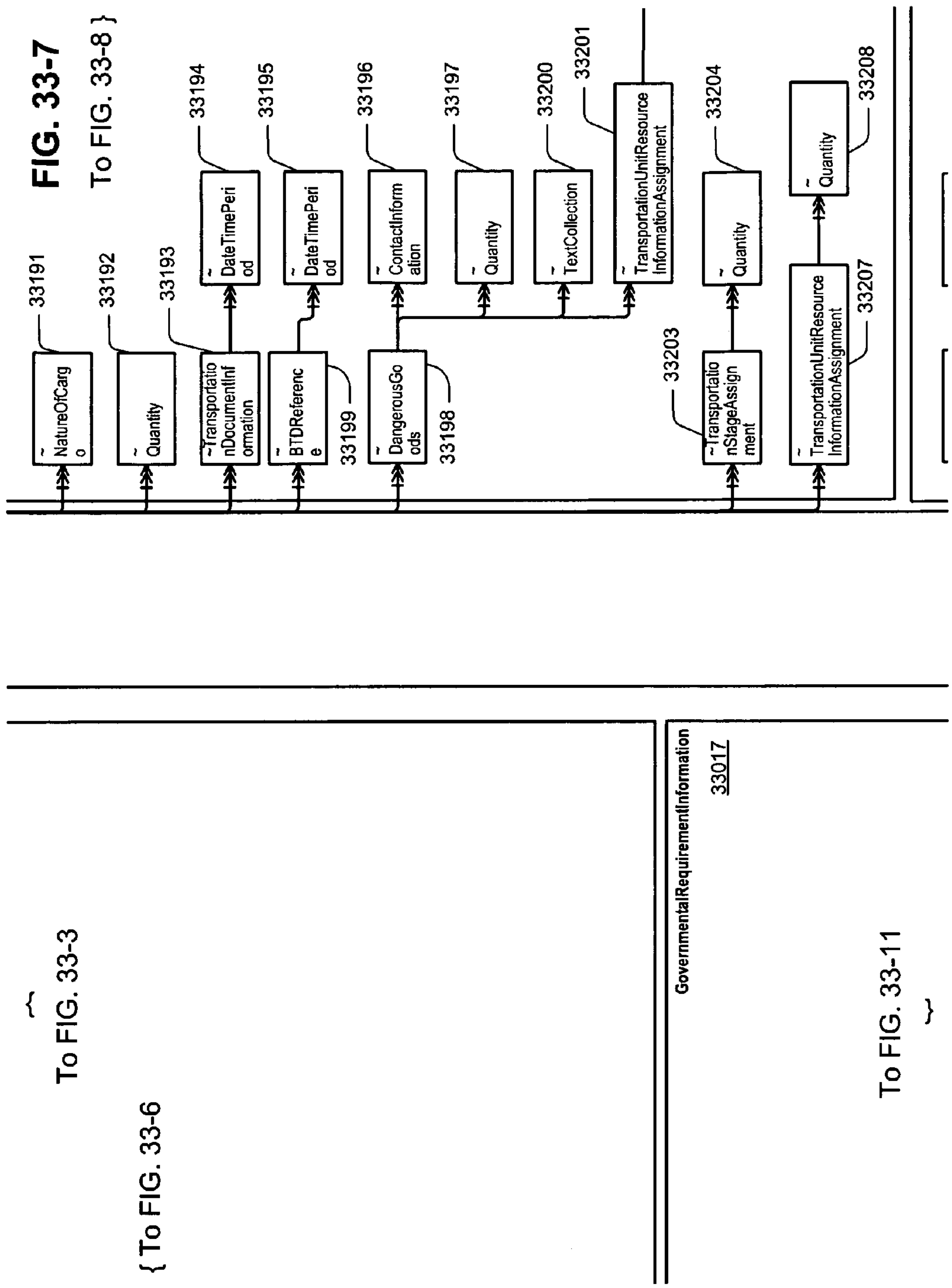
Figures 8, 33:
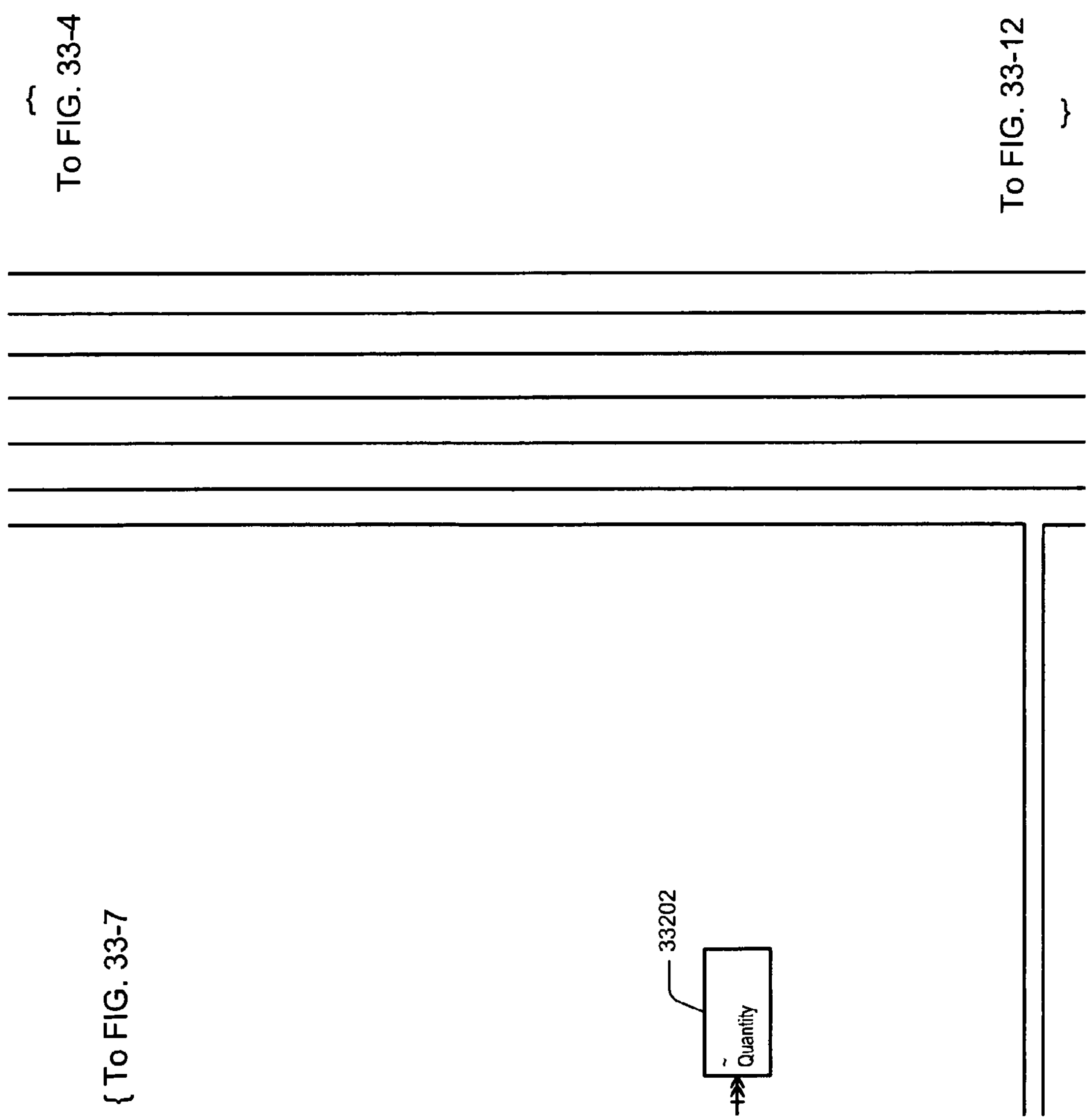
Figures 9, 33:
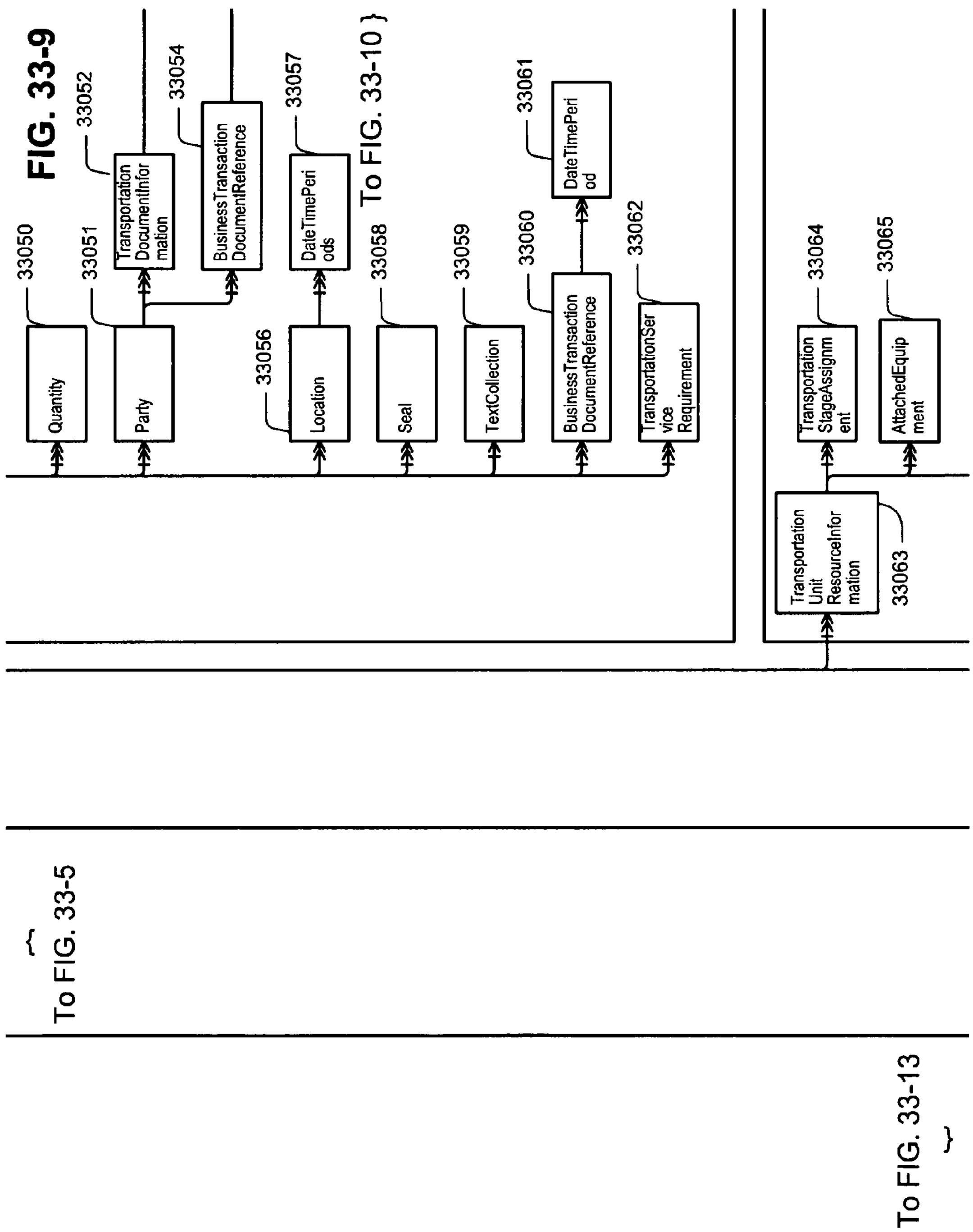
Figures 10, 33:
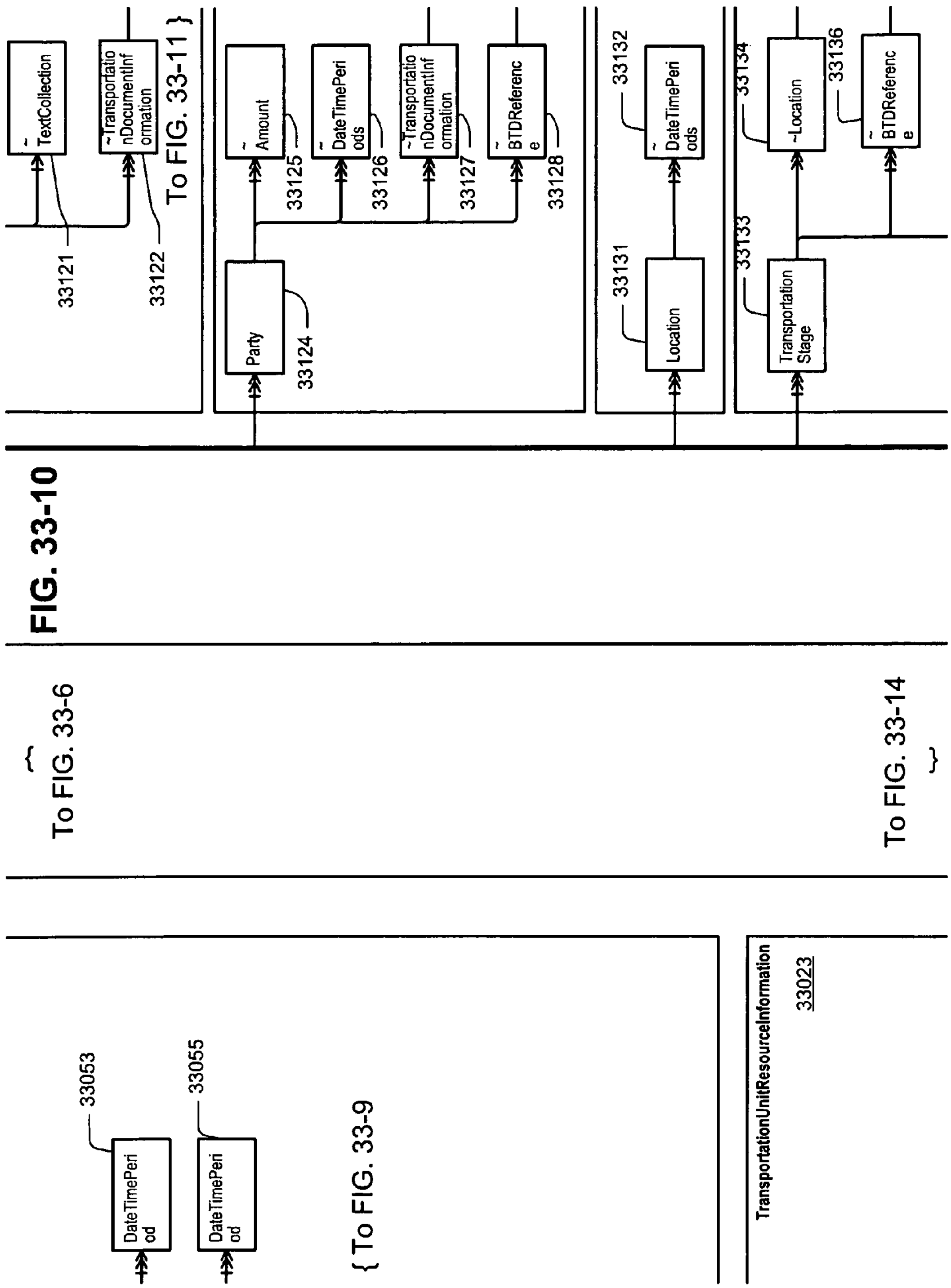
Figures 11, 33:
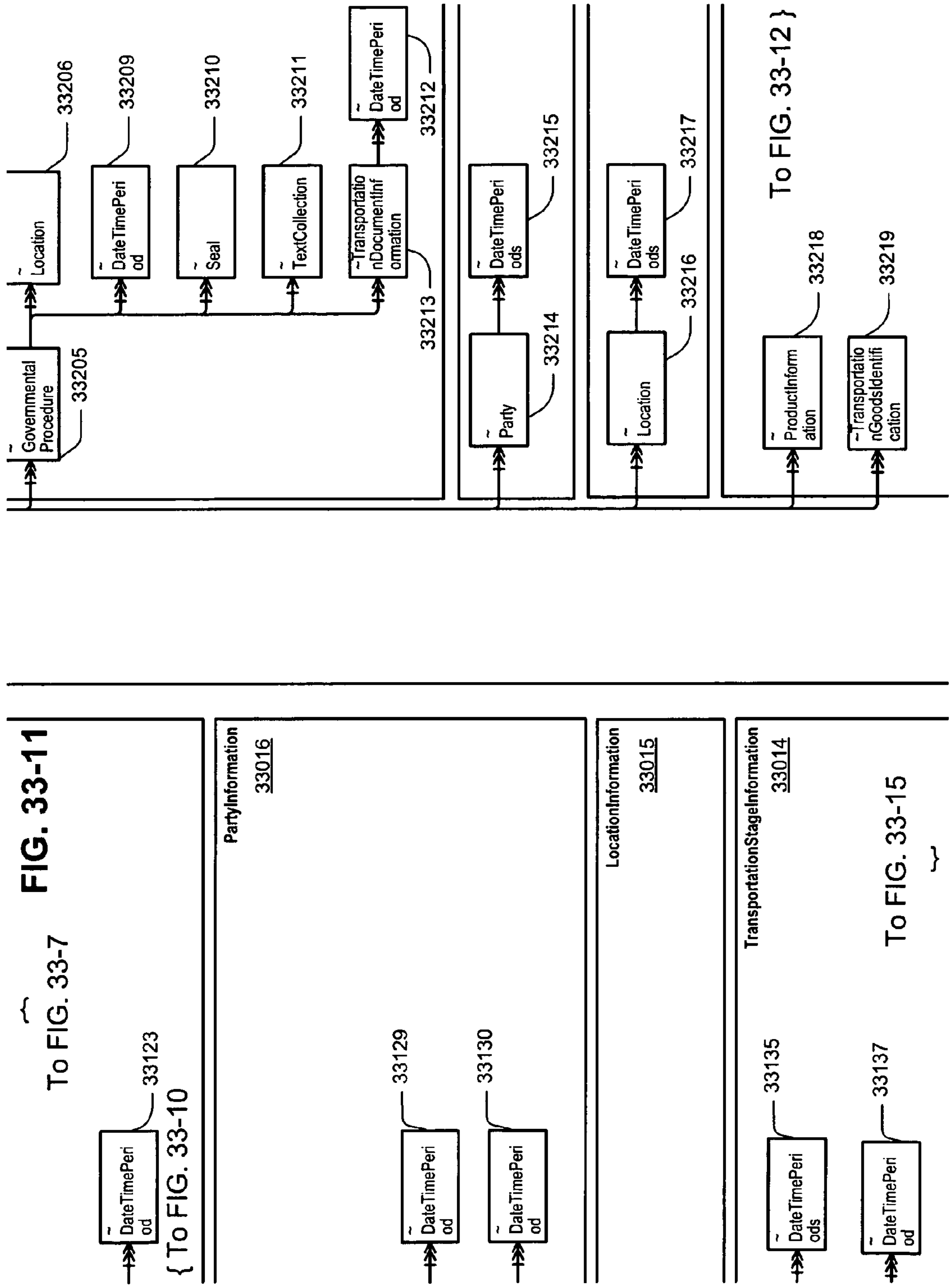
Figures 12, 33:
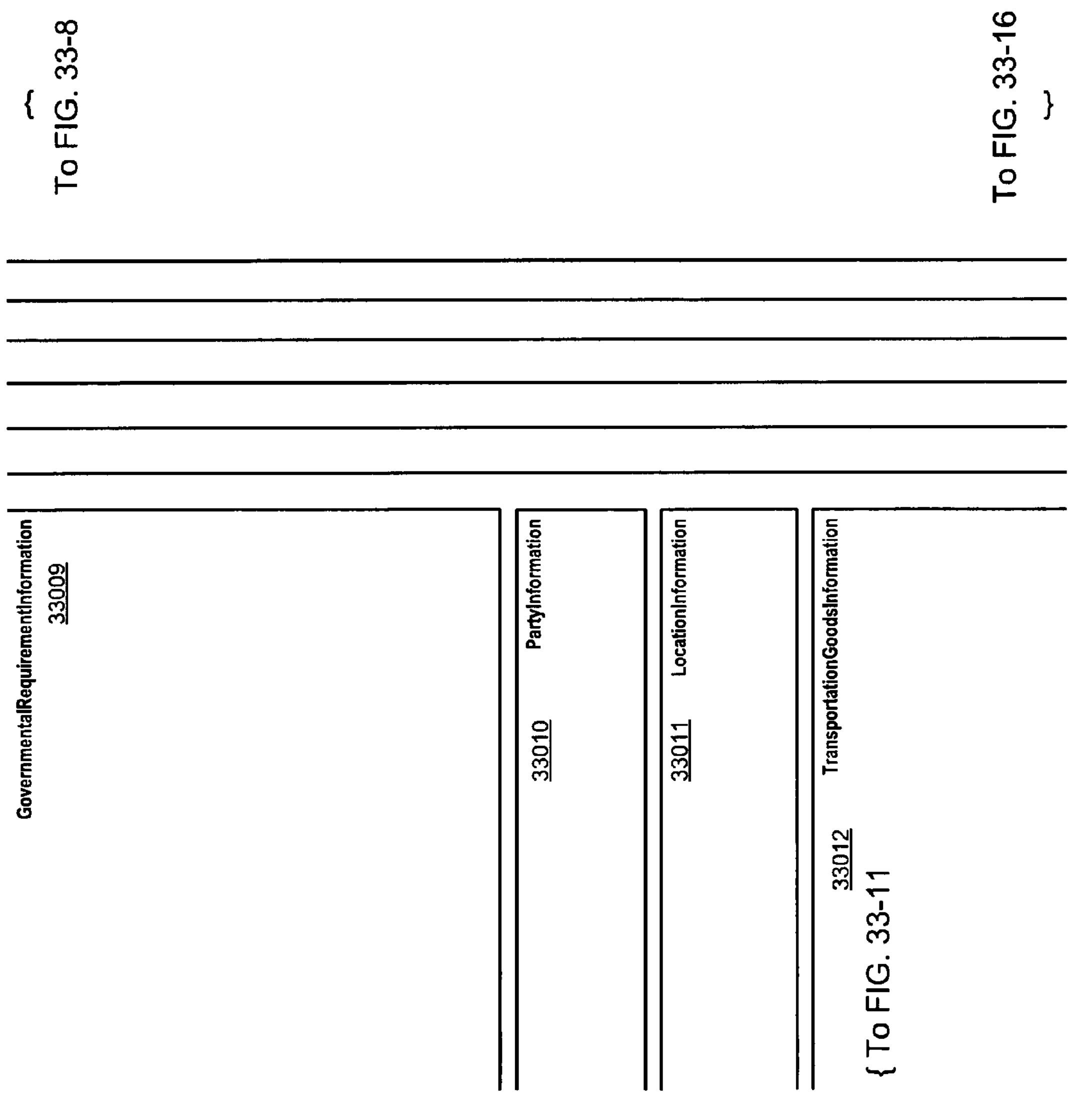
Figures 13, 33:
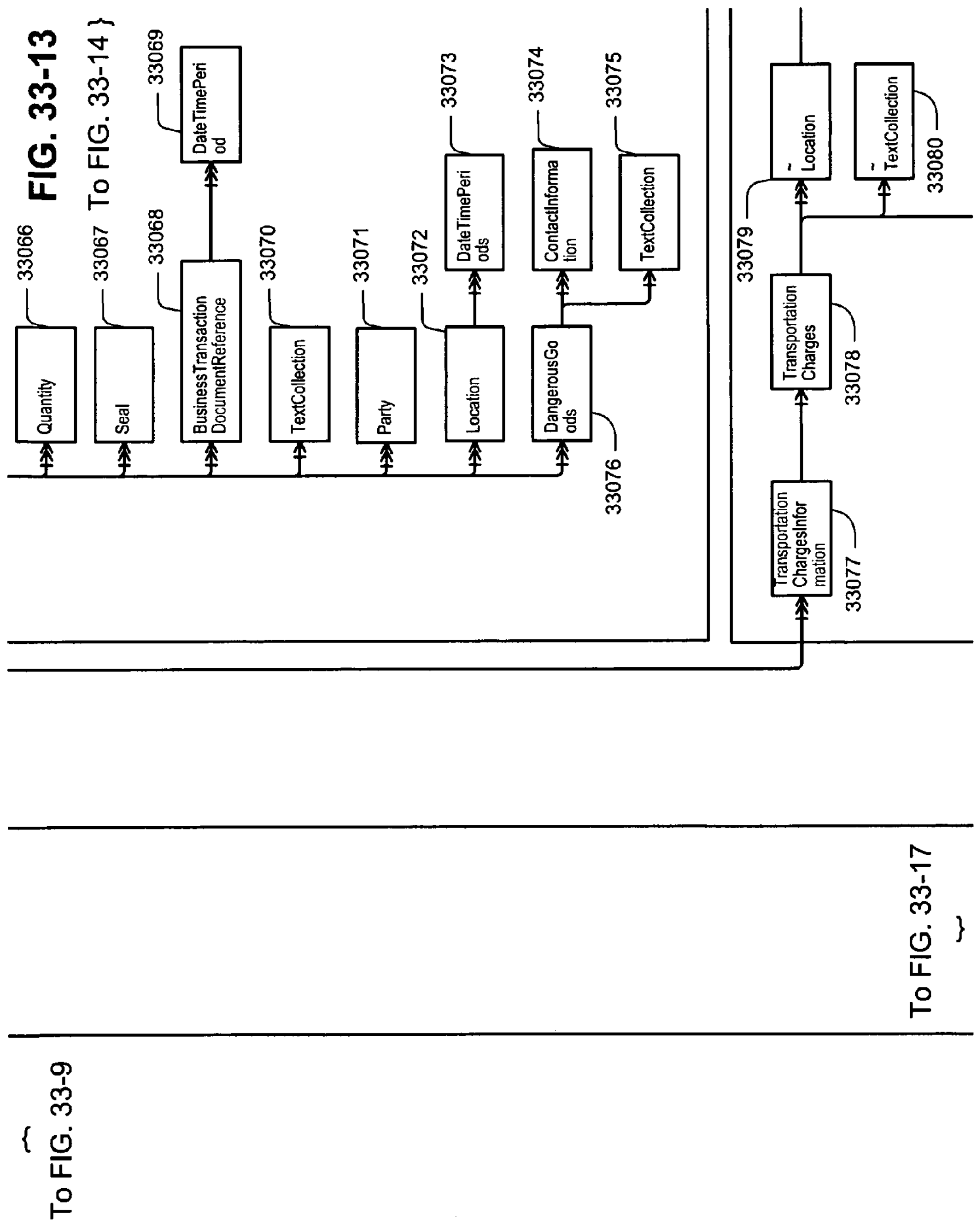
Figures 14, 33:
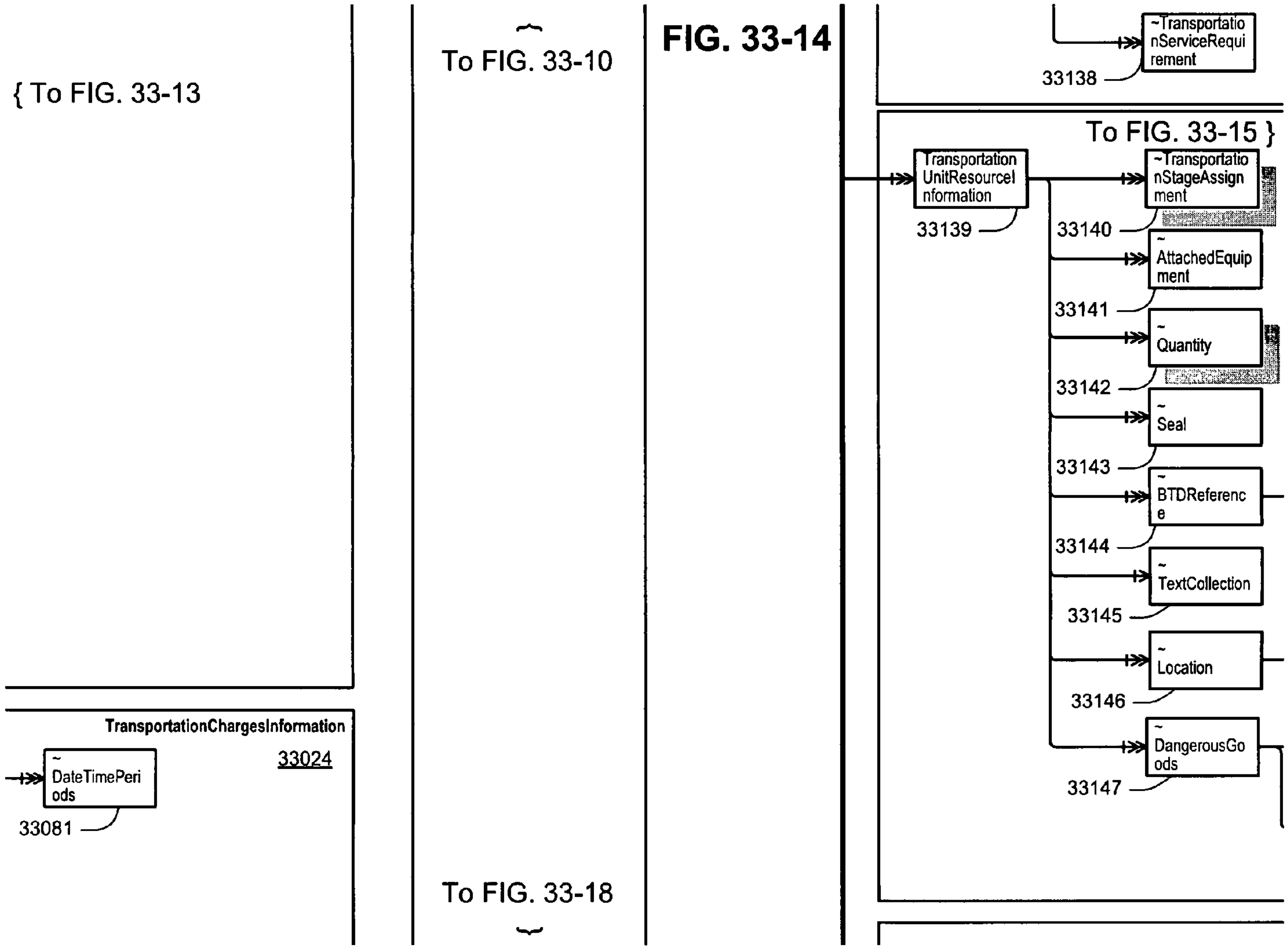
Figures 15, 33:
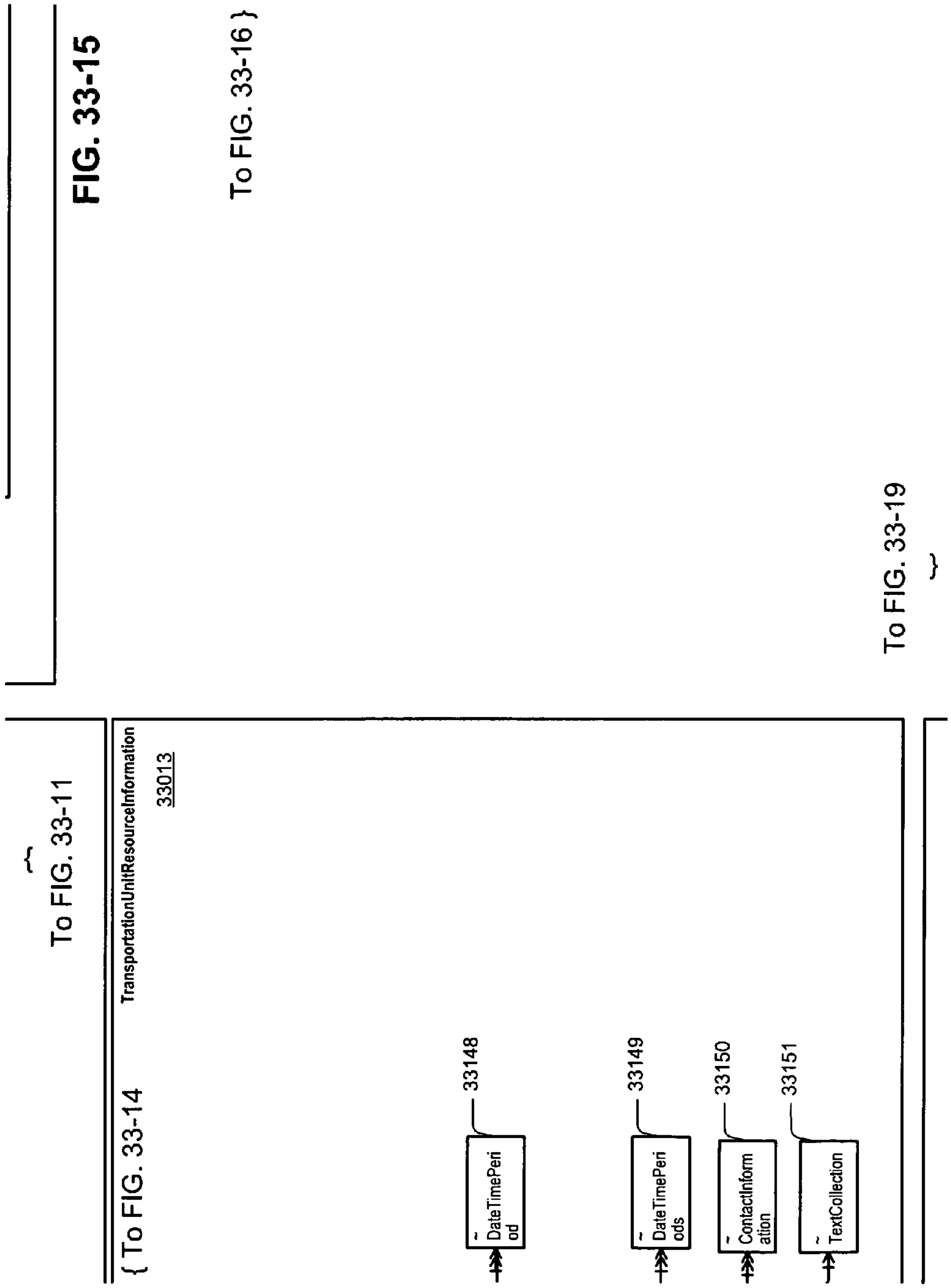
Figures 16, 33:
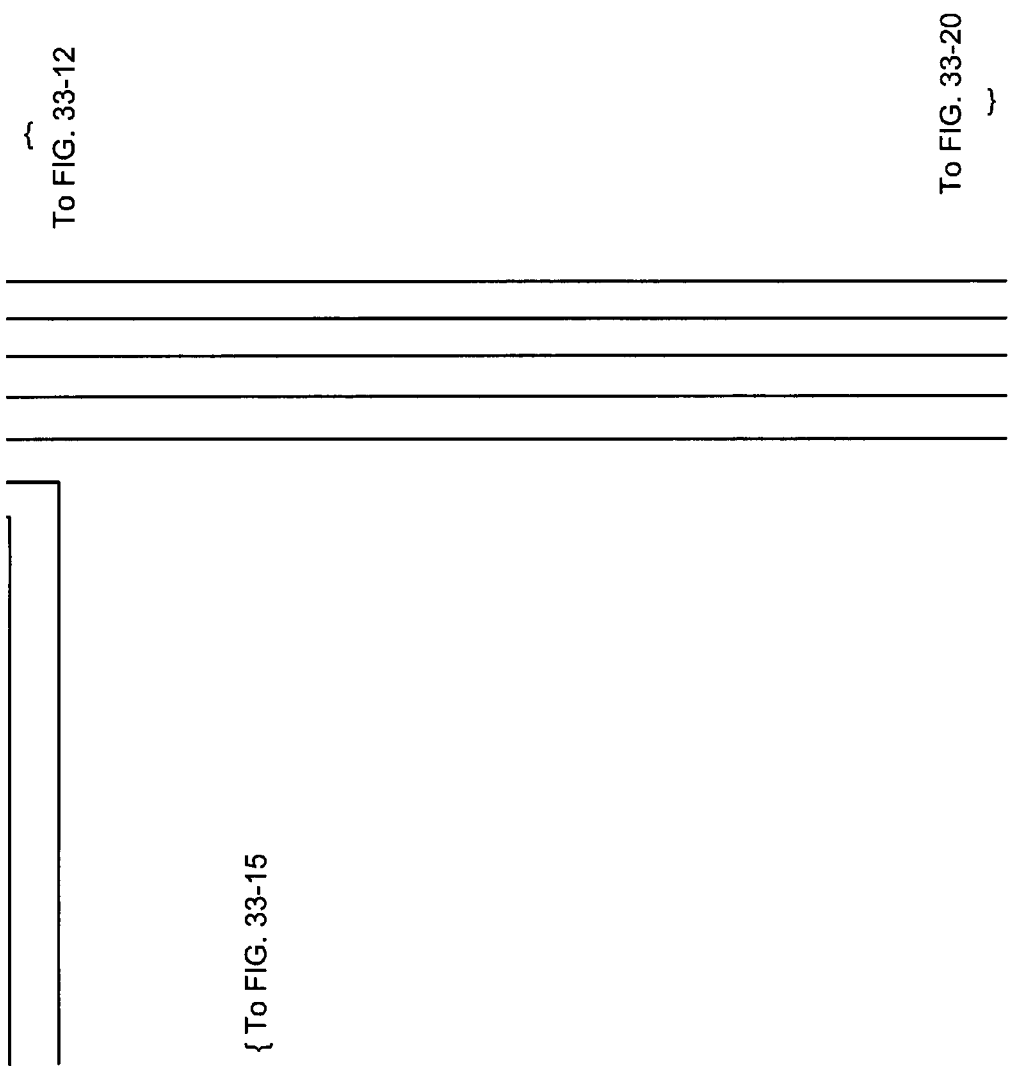
Figures 17, 33:
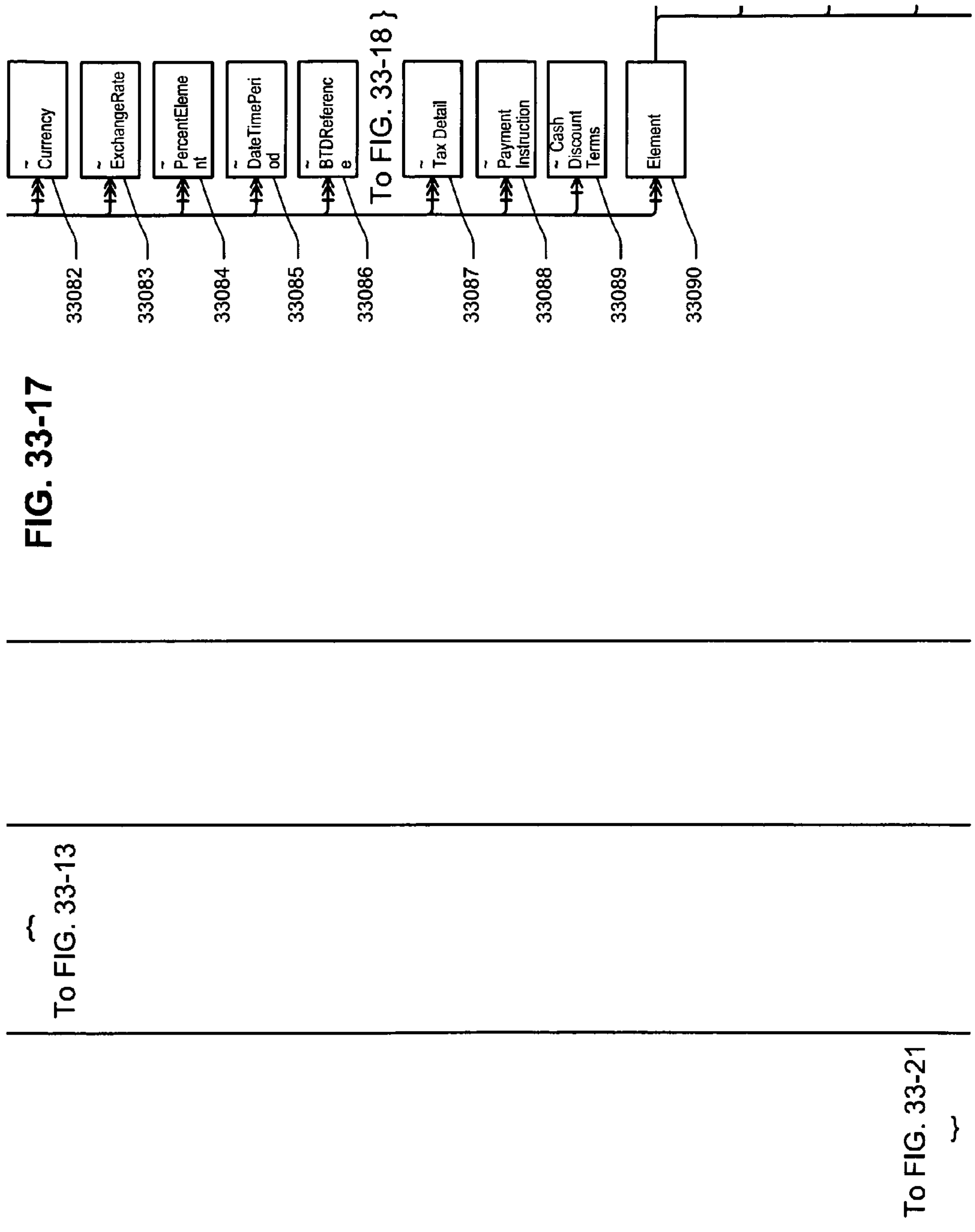
Figures 18, 33:
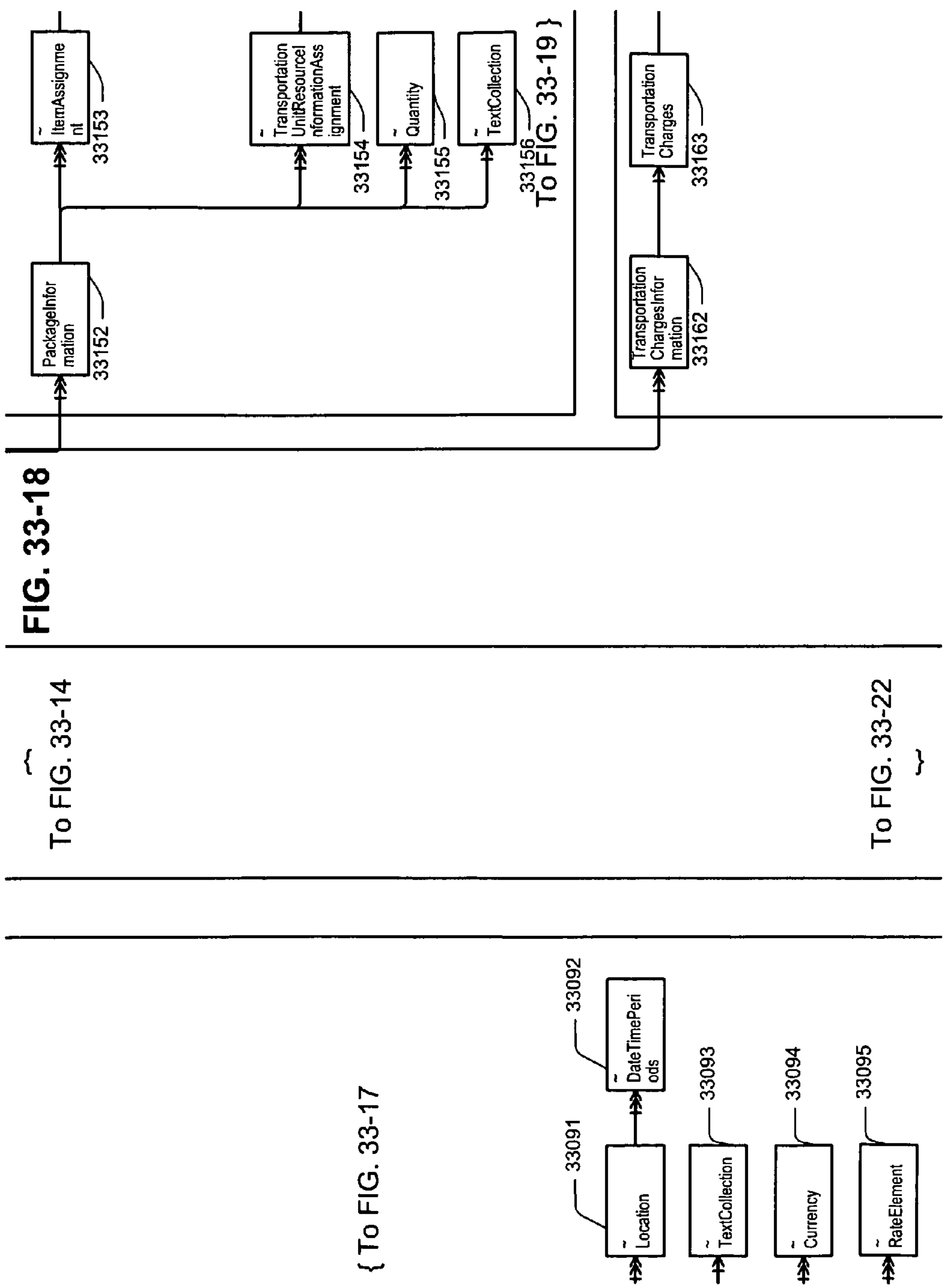
Figures 19, 33:
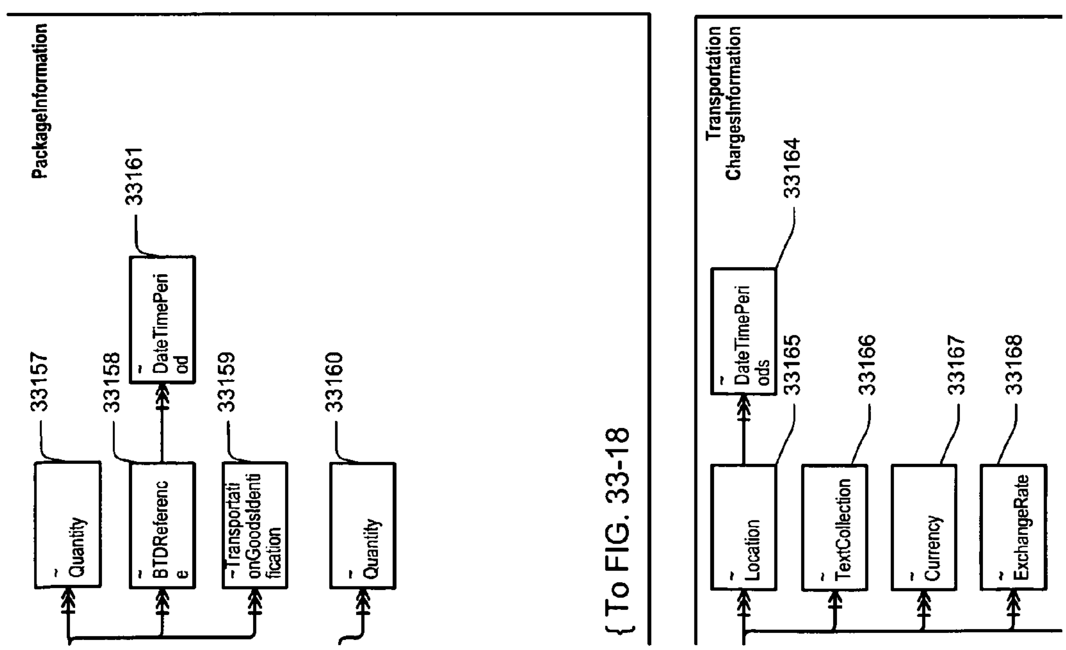
Figures 20, 33:
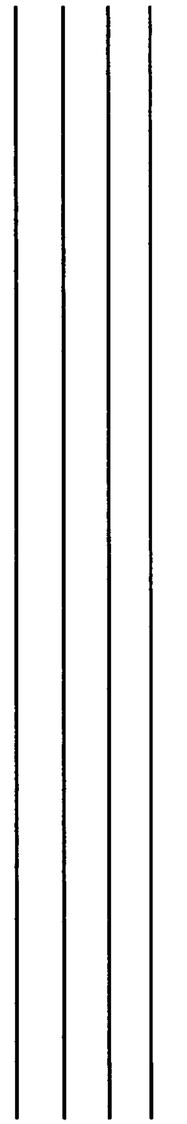
Figures 22, 33:
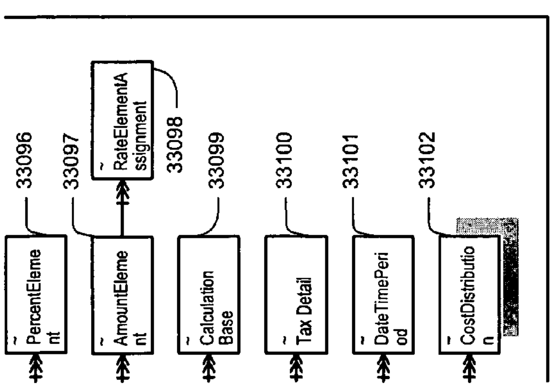
Figures 23, 33:
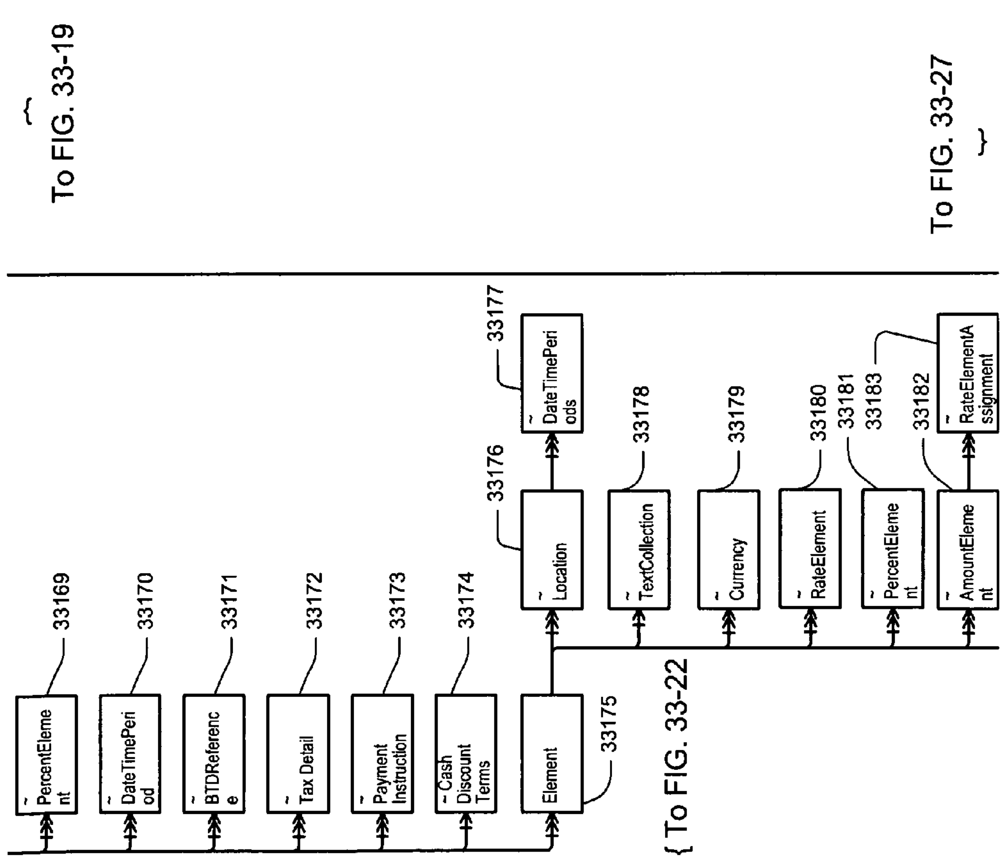
Figures 25, 33:
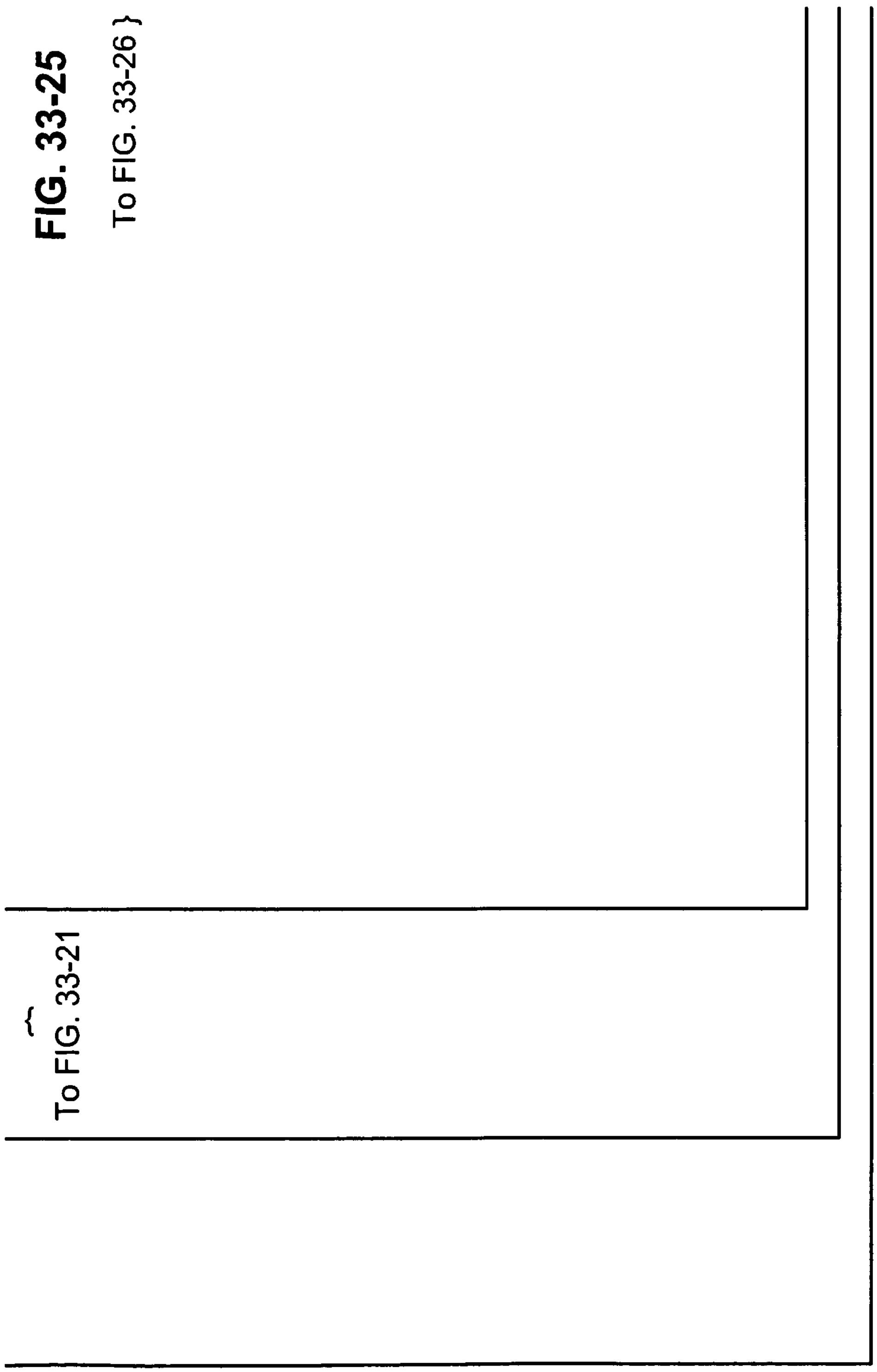
Figures 26, 33:
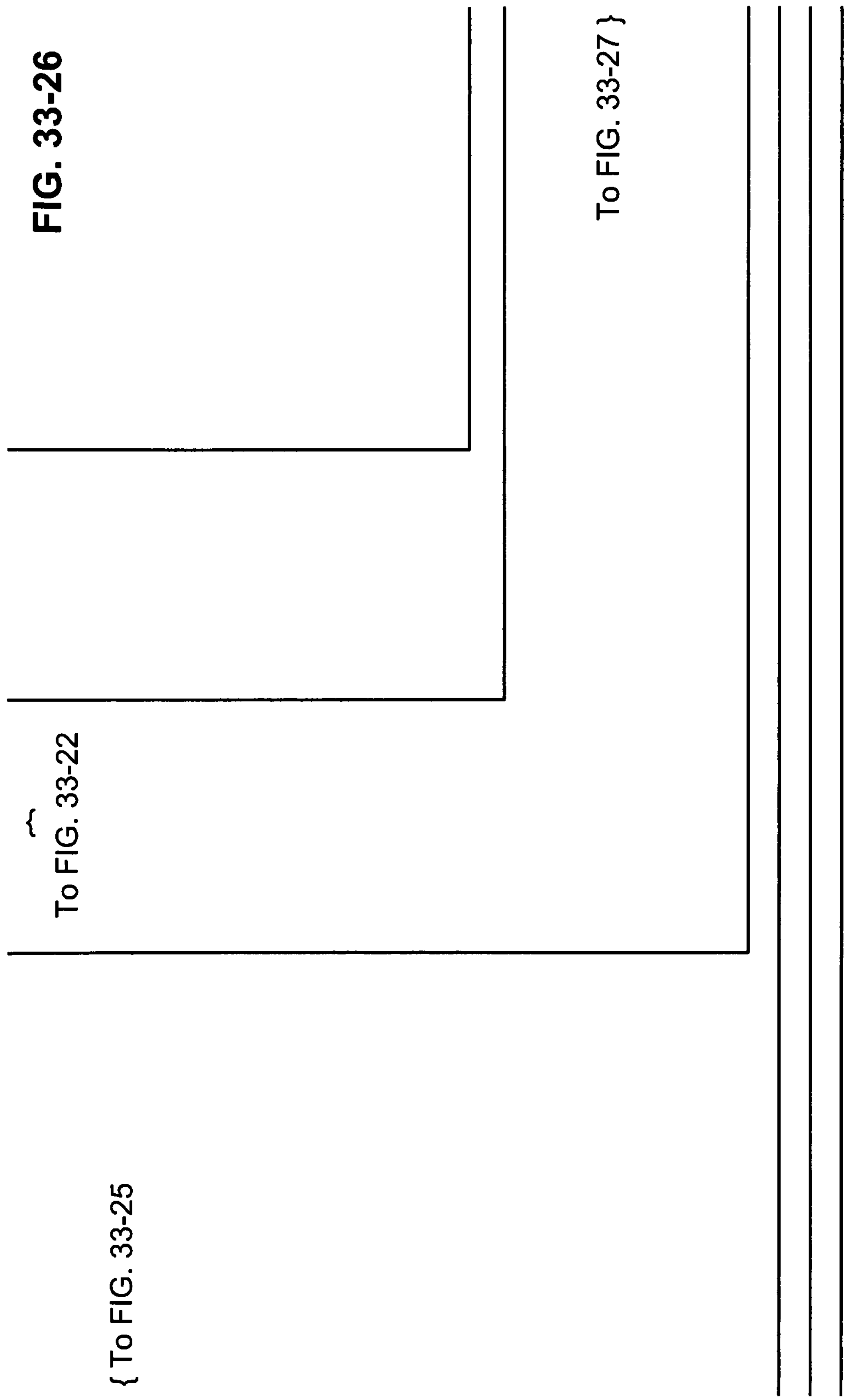
Figures 27, 33:
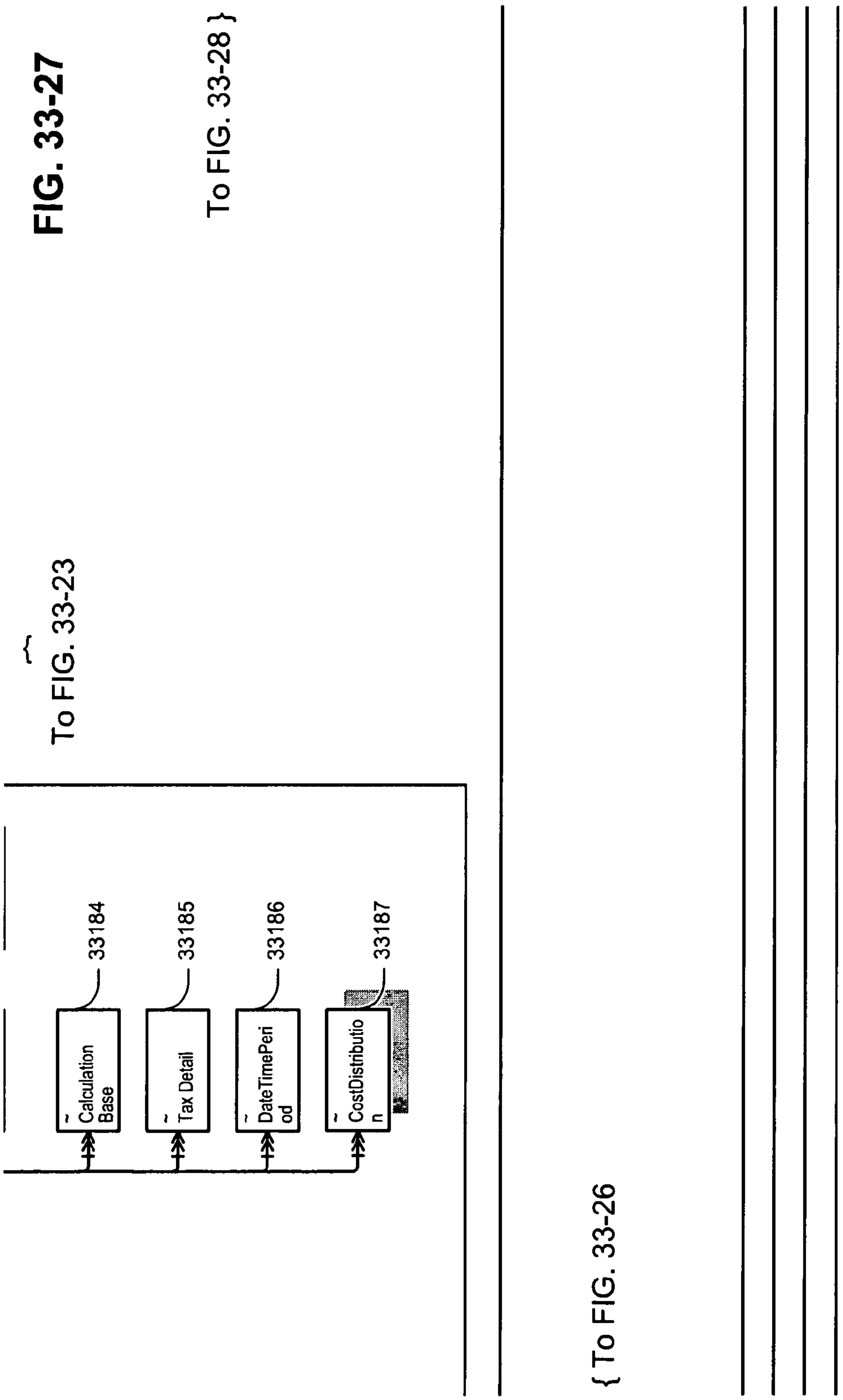
Figures 28, 33:
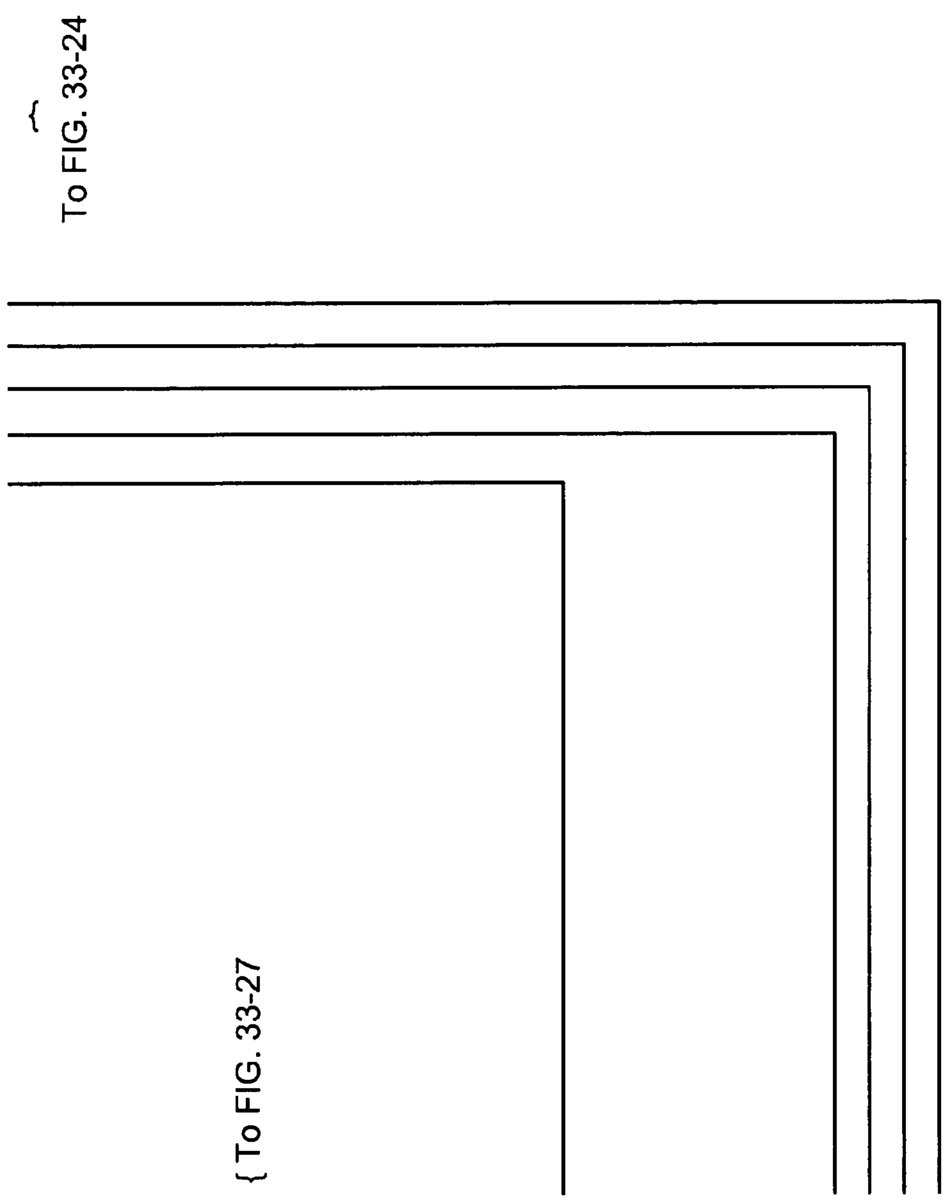

FIGS. 40-1 through 40-5 illustrate one example logical configuration of FreightRequestConfirmationReceiptNotificationMessage 40000 element structure. Specifically, this figure depicts the arrangement and hierarchy of various components such as one or more levels of packages, entities, and datatypes, shown here as 40000 through 40138. As described above, packages may be used to represent hierarchy levels. Entities are discrete business elements that are used during a business transaction. Data types are used to type object entities and interfaces with a structure. For example, FreightRequestConfirmationReceiptNotificationMessage 40000 includes, among other things, a FreightRequest 40014. Accordingly, heterogeneous applications may communicate using this consistent message configured as such.

FIGS. 41-1 through 41-5 illustrate one example logical configuration of FreightRequestReceiptNotificationMessage 41000 element structure. Specifically, this figure depicts the arrangement and hierarchy of various components such as one or more levels of packages, entities, and datatypes, shown here as 41000 through 41138. As described above, packages may be used to represent hierarchy levels. Entities are discrete business elements that are used during a business transaction. Data types are used to type object entities and interfaces with a structure. For example, FreightRequestReceiptNotificationMessage 41000 includes, among other things, a FreightRequest 41014. Accordingly, heterogeneous applications may communicate using this consistent message configured as such.

FIGS. 42-1 through 42-143 illustrate one example logical configuration of FreightRequestRequestMessage 420000 element structure. Specifically, this figure depicts the arrangement and hierarchy of various components such as one or more levels of packages, entities, and datatypes, shown here as 420000 through 424844. As described above, packages may be used to represent hierarchy levels. Entities are discrete business elements that are used during a business transaction. Data types are used to type object entities and interfaces with a structure. For example, FreightRequestRequestMessage 420000 includes, among other things, a FreightRequest 420014. Accordingly, heterogeneous applications may communicate using this consistent message configured as such.

Message Data Type FreightRequestRequestMessage

The message data type FreightRequestRequestMessage includes business information that is relevant for sending a business document in a message, and a FreightRequest included in a business document. It includes the MessageHeader and FreightRequest packages. The message data type FreightRequestRequestMessage can provide a structure for the message type FreightRequestRequest and for interfaces that are based on it.

A MessageHeader package can group together business information that is relevant for sending a business document in a message. It includes the MessageHeader entity. A MessageHeader can group together business information from the perspective of a sending application in order to identify a business document in a message, provide information about the sender, and to provide information about the recipient. The MessageHeader can be divided up into the SenderParty and RecipientParty entities. It can be of type GDT: BusinessDocumentMessageHeader. The MessageHeader can include the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty can include the following elements InternalID, StandardID, and ContactPerson. The SenderParty can be filled by the sending application to name a contact person for problems with the message. This can be useful if an additional infrastructure, such as a marketplace, is located between the sender and the recipient. The SenderParty can be used to transfer the message and can be ignored by the receiving application. In some implementations, SenderParty is filled by the sender, particularly if the participating parties are not transferred with the FreightRequest package.

A RecipientParty can be a party responsible for receiving a business document at a business application level. The RecipientParty can be of type GDT: BusinessDocumentMessageHeaderParty. The RecipientParty can include the following elements: InternalID, StandardID, and ContactPerson. The RecipientParty can be filled by a sending application to name a contact person for problems that may occur with the message. This can be useful if an additional infrastructure, such as a marketplace, is located between the sender and the recipient. The RecipientParty can be used to transfer a message and can be ignored by the receiving application. In some implementations, RecipientParty can be filled by the sender if the FreightRequest package cannot be used to transfer the participating parties.

The FreightRequest package groups the FreightRequest with its packages. It includes the FreightRequest entity and the Request package. FreightRequest can be an agreement between an ordering party and a transportation service provider on the shipment of goods from shippers to consignees. The attributes and elements located directly at the FreightRequest entity can include @actioncode and ID. @actioncode can be a coded representation of an instruction to a message recipient describing how to process a transmitted element, and can be based on GDT: ActionCode. ID can be a unique identifier of a FreightRequest, and can be based on GDT: BusinessTransactionDocumentID. In some implementations, the attribute @actioncode includes the two values "01—Create" and "02—Change. In some implementations, the ID is not changed once a FreightRequest has been created. In some implementations, the Complete Transmission Indicator is set to true, i.e., the complete message content is transmitted in every message. As a consequence, previously transferred data that is not sent with the change message may be deleted.

The Request package can group the Request with its packages. It includes the Request entity. It includes the packages HeaderInformation, GovernmentalRequirementInformation, PartyInformation, TransportationStageInformation, TransportationUnitResourceInformation, TransportationCharges-Information, and ShipmentRequest. The HeaderInformation package groups dates, total values, documents and references related to a freight request. It includes the entities DateTimePeriods, NatureOfCargo, TotalQuantity, TotalAmount, TextCollection, and BusinessTransactionDocumentReference. DateTimePeriods can specify a requested and an acceptable date, time and period applying to a shipment request (e.g., date and time of document issue). A requested period can be a period in which an event is requested to take place. An acceptable period can be a period in which an event may take place at an earliest start date/time to a latest end date/time.

The elements located directly at the DateTimePeriods entity can include RequestedFulfillmentPeriod, AcceptableFulfillmentPeriod, and PeriodRoleCode. RequestedFulfillmentPeriod can be a period which is requested depending on a semantic of a PeriodRoleCode, and can be based on GDT: DATETIMEPERIOD, Qualifier: RequestedFulfillment. AcceptableFulfillmentPeriod can be a period which is acceptable depending on a semantic of a PeriodRoleCode, and can be based on GDT: DATETIMEPERIOD, Qualifier: AcceptableFulfillment.

PeriodRoleCode can be a coded representation of a business semantic of the two periods defined by the entities RequestedFulfillmentPeriod and AcceptableFulfillmentPeriod, and can be based on GDT: PeriodRoleCode. In some implementations, RequestedFulfillmentPeriod and AcceptableFulfillmentPeriod are optional, but in every instance one of them can be filled. NatureOfCargo can indicate a nature of cargo related to a shipment request, for example, palletized, containerized, documents. The structure of the NatureOfCargo entity includes the ClassificationCode element. ClassificationCode can be a coded representation of a classification of a nature of cargo, and can be based on GDT: NatureOfCargoClassificationCode. TotalQuantity can specify the total quantity which is related to a whole shipment request, for example, total number of equipment, or total number of items. The structure of the TotalQuantity entity can include the elements Quantity, RoleCode, and TypeCode. Quantity can be a non-monetary numerical specification of an amount in a unit of measurement, and can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode. In some implementations, QuantityRoleCode and QuantityTypeCode are optional, but in every instance one of them can be filled.

TotalAmount can specify a cumulated monetary amount related to a shipment request, for example duty amount, insurance amount, total value. The structure of the TotalAmount entity can include the elements Amount and RoleCode. Amount can be an amount with a corresponding currency unit, and can be based on CDT: Amount. RoleCode can be a coded representation of a role of an amount, and can be based on GDT: AmountRoleCode. TextCollection can be a group of textual information that relates to a shipment request. The structure of the TextCollection entity can include the element TextCollection. TextCollection can be based on GDT: TextCollection. BusinessTransactionDocumentReference can specify a business document reference that is related to a whole shipment request. It includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID.

BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item has when set against another business document or business document item with a relationship, and can be based on GDT:

BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The GovernmentalProcedure package can specify applicable governmental procedures related to import, export and transport of the goods of the shipment request. It includes the entities: Location, DateTimePeriod, Seal, TextCollection, and TransportationDocumentInformation. TransportationGovernmentAgencyTypeCode can be a coded representation of a type of a government agency, and can be based on GDT: TransportationGovernmentAgencyTypeCode. TransportationMovementTypeCode can be a coded representation of a type of a transport movement. Examples can include Import, Export, Transit, and Transshipment. TransportationMovementTypeCode can be based on GDT: TransportationMovementTypeCode. TransportationGovernmentAgencyInvolvementStatusCode can be a coded representation for an involvement status of a transportation related government agency, and can be based on GDT: TransportationGovernmentAgencyInvolvementStatusCode. TransportationGovernmentAgencyActionCode can be a coded representation of an action of a transportation related government agency, and can be based on GDT: TransportationGovernmentAgencyActionCode. TransportationGovernmentAgencyProcedureStatusCode can be a coded representation of the status of a procedure related to a transportation government agency, and can be based on GDT: TransportationGovernmentAgencyProcedureStatusCode.

The PartyInformation package includes information regarding a party of a freight request (e.g., Shipper, Carrier, Agent). The PartyInformation package includes the Party entity. Party includes information that is exchanged, in accordance with common business understanding, in business documents, about a party involved in business transactions. This information can be used to identify a party and the party's address, as well as the party's contact person and the contact person's address. This identification can take place using an internal ID, a standardized ID, or IDs assigned by the parties involved. It includes the entities Amount, DateTimePeriods, TransportationDocumentInformation, and BusinessTransactionDocumentReference. The structure of the Party entity can include the elements Party, RoleCode, and FormattedName. A Party includes information that is exchanged, in accordance with common business understanding, in business documents, about a party involved in business transactions. This information is used to identify a party and the party's address, as well as the party's contact person and the contact person's address. This identification can take place using an internal ID, a standardized ID, or IDs assigned by the parties involved. Party can be based on GDT: BusinessTransactionDocumentParty.

RoleCode can be a coded representation of a PartyRoleCode which specifies which rights and obligations a party has regarding a business object and corresponding processes. In some implementations, a PartyRole is assigned to exactly one PartyRoleCategory and refines its semantics. RoleCode can be based on GDT: PartyRoleCode. FormattedName can be a complete, formatted name of a party, and can be based on GDT: LONG_Name, Qualifier: PartyFormatted. BusinessTransactionDocumentReference can specify a business document reference that is related to a whole shipment request. BusinessTransactionDocumentReference includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item has when set against another business document or business document item with a relationship, and can be based on GDT: BusinessTransactionDocumentRelationshipRoleCode.

BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The TransportationStageInformation package includes information regarding a stage of a freight request. A stage can represent a section of a transport. It includes the TransportationStage entity. TransportationStage can specify details related to a stage of a transport which is part of a freight request. It includes the entities ContactInformation, Quantity, Party, Location, Seal, TextCollection, BusinessTransactionDocumentReference, and TransportationServiceRequirement. The structure of the TransportationState entity can include the elements ID, OrdinalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure. ID can be a unique identifier of a stage in a shipment request, and can be based on GDT: TransportationStageID. OrdinalNumber- Value can be an ordinal number to indicate a position of a transportation stage in a set of transportation stages. OrdinalNumberValue can be based on GDT: OrdinalNumberValue, Qualifier: TransportationStage. TypeCode can be a coded representation of a type of a TransportationStage, and can be based on GDT: TransportationStageTypeCode. JourneyID can be an identifier of a Journey, and can be based on GDT: JourneyID. TransportModeCode can be a coded representation of a mode of transportation used for delivery, and can be based on GDT: TransportModeCode.

TransportMeansDescriptionCode can be a coded representation of a transport means type with which goods or persons are to be transported, and can be based on GDT: TransportMeansDescriptionCode. TransportMeansDescription can be a description of a means of transport, and can be based on GDT: SHORT_Description, Qualifier: TransportMeans. TransportMeansID can be a unique identifier of a means of transport, and can be based on GDT: TransportMeansID. TransportMeansHomeCountryCode can be a coded representation of the home country of a transport means, and can be based on GDT: CountryCode, Qualifier: TransportMeansHome. TransportMeansOwnershipTypeCode can be a coded representation of a type of ownership for a means of transport, and can be based on GDT: TransportMeansOwnershipTypeCode. CarrierStandardID can be a standard identifier of a carrier, and can be based on GDT: PartyStandardID. CarrierFormattedName can be a name of a carrier, and can be based on GDT: LONG_Name, Qualifier: PartyFormatted. TransportationTransitDirectionCode can be a coded representation for a transportation transit direction, and can be based on GDT: TransportationTransitDirectionCode. CalculatedDistanceMeasure can be a calculated distance measure, and can be based on GDT: Measure, Qualifier: CalculatedDistance. GivenDistanceMeasure can be a given distance measure, and can be based on GDT: Measure, Qualifier: GivenDistance.

ContactInformation can specify information on a department or person to whom information regarding a Stage can be directed. The structure of the ContactInformation entity can include the ContactPersonFunctionTypeCode and Address elements. ContactPersonFunctionTypeCode can be a coded representation of a type of function that a contact person has, and can be based on GDT: ContactPersonFunctionTypeCode. Address can be an address related to contact information defined by the corresponding FunctionTypeCode, and can be based on GDT: Address. Quantity can specify a quantity related to a Stage. The structure of the Quantity entity can include the elements Quantity, RoleCode, and TypeCode. Quantity can be a non-monetary numerical specification of an amount in a unit of measurement, and can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode.

Party includes information that is exchanged, in accordance with common business understanding, in business documents, about a party involved in the current stage. This information can be used to identify the party and the party's address. It includes the TransportationDocumentInformation and BusinessTransactionDocumentReference entities. The structure of the Party entity can include the elements Party, RoleCode, and FormattedName. A Party includes information that is exchanged, in accordance with common business understanding, in business documents, about a party involved in business transactions. This information is used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations a party has regarding a business object and corresponding processes. In some implementations, a PartyRole is assigned to exactly one PartyRoleCategory and refines its semantics. RoleCode can be based on GDT: PartyRoleCode.

FormattedName can be a complete, formatted name of a party, and can be based on GDT: LONG_Name, Qualifier: PartyFormatted. TransportationDocumentInformation can specify information on a transportation document related to a shipment request. It includes the DateTimePeriod entity. The structure of the TransportationDocumentInformation entity can include the elements TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. TransportationDocumentStatusCode can be a coded representation of the status of a transportation document (e.g., To be printed, Document Complete).

TransportationDocumentStatusCode can be based on GDT: TransportationDocumentStatusCode. LanguageCode can be a coded representation of the language of a document, and can be based on GDT: LanguageCode. CommunicationMediumTypeCode can be a coded representation of a type of a medium used for communication of the documentation, such as Fax, mail, EDI, or Letter. CommunicationMediumTypeCode can be based on GDT: CommunicationMediumTypeCode. RequiredIndicator can indicate whether documentation is required or not, and can be based on GDT: Indicator Qualifier: Required. OutputCopyNumberValue can be a number specifying the number of copies of the document that may be issued, and can be based on GDT: NumberValue, Qualifier: OutputCopy. OutputOriginalNumberValue can be a number specifying the number of originals of the document that can be issued, and can be based on GDT: NumberValue, Qualifier: OutputOriginal. In some implementations, TypeCode and TypeDescription are both optional, but at least one of them may be used. In some implementations, if the RequiredIndicator is set to true, at least one of the both NumberValues OutputCopyNumberValue or OutputOriginalNumberValue is filled.

BusinessTransactionDocumentReference can specify a business document reference that is related to the whole shipment request. It includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference.

BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode.

TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled. The Location can specify a physical place to which the TransportationCharges and their calculation can refer. It includes the DateTimePeriod entity. The structure of the Location entity can include the elements Location, RoleCode, TypeCode, and Name. Location includes information that is exchanged in business documents about a location relevant for business transactions. Location can be based on GDT: BusinessTransactionDocumentLocation. RoleCode can be a coded representation of a LocationRole, and can be based on GDT: LocationRoleCode.

TypeCode can be a coded representation of a type of a physical location. TypeCode can be based on GDT: LocationTypeCode. Name can be a name of a location, and can be based on GDT: MEDIUM_Name, Qualifier: Location. Seal can specify seal information related to a Stage. The structure of the Seal entity can include the elements ID, PartyRoleCode, PartyFormattedName, and StatusCode. ID can be a unique identifier of a seal, and can be based on GDT: SealID. PartyRoleCode can be a coded representation of a party role, such as a role of a sealing party. PartyRoleCode can be based on GDT: PartyRoleCode. PartyFormattedName can be a complete, formatted name of a party, such as a role of a sealing party. PartyFormattedName can be based on GDT: LONG_Name, Qualifier: PartyFormatted. StatusCode can be a coded representation of the status of a seal, and can be based on GDT: SealStatusCode. TextCollection can be a group of textual information of any type that relates to a Stage. The structure of the TextCollection entity includes the element TextCollection. TextCollection can be based on GDT: TextCollection.

BusinessTransactionDocumentReference can specify a business document reference that is related to a whole shipment request. It includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode.

TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled. TransportationServiceRequirement can specify a contract and carriage condition and service and priority requirements for a transport which apply to a whole shipment request. The structure of the TransportationServiceRequirement entity can include the elements TransportationServiceRequirementCode, AdditionalTransportationServiceRequirementCode, TransportationContractConditionCode, TransportServiceLevelCode, and NatureOfCargoClassificationCode.

TransportationServiceRequirementCode can be a coded representation of a requirement related to a transportation service, and can be based on GDT: TransportationServiceRequirementCode. AdditionalTransportationServiceRequirementCode can be a coded representation of an additional requirement related to a transportation service, and can be based on GDT: TransportationServiceRequirementCode, Qualifier: Additional. TransportationContractConditionCode can be a coded representation of a contract and carriage condition, and can be based on GDT: TransportationContractConditionCode. TransportServiceLevelCode can be a coded representation of agreed or defined services in terms of delivery of goods with respect to the speed of the delivery, and can be based on GDT: TransportServiceLevelCode. NatureOfCargoClassificationCode can be a coded representation of a classification of the nature of cargo, and can be based on GDT: NatureOfCargoClassificationCode.

The TransportationUnitResourceInformation package includes information regarding a transportation unit resource that is relevant for a freight request (e.g., a container). It includes the TransportationUnitResourceInformation entity. TransportationUnitResourceInformation includes information on one or more transportation unit resources, such as resource type and related properties. For example, TransportationUnitResourceInformation can be related measures or handling instructions. A Transportation Unit Resource can be a unit into which goods are loaded and/or from which goods are unloaded. In some implementations, this unit can provide transportation capacity for goods but might not move by itself. Transportation Unit Resource includes the entities TransportationStageAssignment, AttachedEquipment, Quantity, Seal, BusinessTransactionDocumentReference, TextCollection, Party, Location, and DangerousGoods. The structure of the TransportationUnitResourceInformation entity can include the elements ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote.

ID can be a unique identifier for a resource information, and can be based on GDT ResourceInformationID. ResourceNumberValue can be a count of resources, and can be based on GDT: NumberValue, Qualifier: Resource. ResourceID can be a unique identifier for a resource, and can be based on GDT: ResourceID. ResourceHomeCountryCode can be a coded representation of the home country of a resource, and can be based on GDT: CountryCode, Qualifier: ResourceHome. TransportationUnitResourceCategoryCode can be a coded representation of a category of transportation unit resources, and can be based on GDT: TransportationUnitResourceCategoryCode. TransportationUnitResourceTypeCode can be a coded representation of a type of a transportation unit resource, and can be based on GDT: TransportationUnitResourceTypeCode. FillLevelCode can be a coded representation of a fill level of a resource, and can be based on GDT: FillLevelCode. ShippingTypeCode can be a coded representation of a shipping type. The shipping type can specify how planning and execution of a transportation can be performed. Transportation terms can include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be an inland transport of cargo. HaulageArrangerCode can be based on GDT: HaulageArrangerCode. TransportationHandlingInstructionCode can be a coded representation of a type of a transportation handling instruction, and can be based on GDT: TransportationHandlingInstructionCode. TransportationHandlingInstructionNote can be a note regarding a transportation handling instruction, and can be based on GDT: LONG_Note, Qualifier: TransportationHandlingInstruction. TransportationStageAssignment can specify an assignment of a resource to a stage.

The structure of the TransportationStageAssignment entity includes the FreightRequestTransportationStageID element. FreightRequestTransportationStageID can be a unique identifier of a TransportationStage in a freight request, and can be based on GDT: TransportationStageID. AttachedEquipment can specify an equipment that is attached to a TransportationUnitResource. The structure of the AttachedEquipment entity can include the ShipmentRequestResourceInformationID element. ShipmentRequestResourceInformationID can be a unique identifier of a resource information in a ShipmentRequest, and can be based on GDT: ResourceInformationID. Quantity specifies a quantity related to TransportationUnitResourceInformation. The structure of the Quantity entity can include the elements Quantity, RoleCode, and TypeCode. Quantity can be a non-monetary numerical specification of an amount in a unit of measurement, and can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode. Seal specifies a seal related to a TransportationUnitResource. The structure of the Seal entity can include the elements ID, PartyRoleCode, PartyFormattedName, and StatusCode. ID can be a unique identifier of a seal, and can be based on GDT: SealID. PartyRoleCode can be a coded representation of a party role, such as the role of the sealing party. PartyRoleCode can be based on GDT: PartyRoleCode. PartyFormattedName can be a complete, formatted name of a party, such as the role of a sealing party. PartyFormattedName can be based on GDT: LONG_Name, Qualifier: PartyFormatted. StatusCode can be a coded representation of a status of a seal, and can be based on GDT: SealStatusCode.

BusinessTransactionDocumentReference specifies a business document reference that is related to a TransportationUnitResource. BusinessTransactionDocumentReference includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode.

BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled. TextCollection is a group of textual information that relates to the TransportationUnitResource. The structure of the TextCollection entity includes the element TextCollection. TextCollection can be based on GDT: TextCollection.

Party includes information that is exchanged, in accordance with common business understanding, in business documents, about a party involved in the current TransportationUnitResource. This information is used to identify the party and the party's address. The structure of the Party entity can include the elements Party, RoleCode, and FormattedName. A Party includes information that is exchanged, in accordance with common business understanding, in business documents, about a party involved in business transactions. This information is used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations a party has regarding a business object and corresponding processes. In some implementations, a PartyRole is assigned to exactly one PartyRoleCategory and refines its semantics.

RoleCode can be based on GDT: PartyRoleCode. FormattedName can be a complete, formatted name of a party, and can be based on GDT: LONG_Name, Qualifier: PartyFormatted. Location specifies a physical place related to a TransportationUnitResource. The structure of the Location entity can include the elements Location, RoleCode, TypeCode, and Name. Location includes information that is exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier: Location. DangerousGoods can specify dangerous goods included in a resource. DangerousGoods includes the ContactInformation and TextCollection entities. The structure of the DangerousGoods entity can include the elements ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode.

ID can be a unique identifier for a dangerous good, using the United Nations Dangerous Goods Number, and can be based on GDT: DangerousGoodsID. RegulationsCode can be a coded representation of national or international dangerous goods rules or regulations, and can be based on GDT: DangerousGoodsRegulationsCode. HazardCode can be a coded representation of a hazard that is imminent in a dangerous good, and can be based on GDT: DangerousGoodsHazardCode. FlashpointMeasureInterval can be an interval of measures defined by a lower and an upper boundary indicating the flashpoint of a dangerous good, and can be based on GDT: MeasureInterval, Qualifier: Flashpoint. PackagingGroupCode can be a coded representation of the effectiveness of a packaging to transport dangerous goods depending on the degree of danger of the goods, and can be based on GDT: DangerousGoodsPackagingGroupCode. EmergencySchedule can be a coded representation of an emergency schedule for dangerous goods. It can identify an emergency schedule. The DangerousGoodsEmergencySchedule can be used for transports of dangerous goods by sea similar to the Transport Emergency Card which is used for transports of dangerous goods by road.

EmergencySchedule can be based on GDT: DangerousGoodsEmergencySchedule. TransportEmergencyCardCode can be a coded representation of a transport emergency card which specifies how to react in case of an accident, and can be based on GDT: TransportEmergencyCardCode. DangerousGoodsLabelCode can be a coded representation of a label for a dangerous good. In some implementations, DangerousGoodsLabelCode's values are dependent on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependent on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependent on the DangerousGoodsRegulationsCode. DangerousGoodsLabelCode3 can be based on GDT: DangerousGoodsLabelCode. PackagingInstructionTypeCode can be a coded representation of a packaging instruction. A packaging instruction can be an instruction defining which packagings are used to pack a dangerous good. PackagingInstructionTypeCode can be based on GDT: PackagingInstructionTypeCode. TransportMeansDescriptionCode can be a coded representation of a transport means type with which goods or persons can be transported, and can be based on GDT: TransportMeansDescriptionCode. TransportAuthorisationCode can be a coded representation of an authorisation for a transportation of dangerous goods. This code can specify an authorisation for a transportation of a particular dangerous good. TransportAuthorisationCode can be based on GDT: DangerousGoodsTransportAuthorisationCode.

The TransportationChargesInformation package includes information regarding a transportation charge calculation specific to components related to a FreightRequest. The TransportationChargesInformation package includes the TransportationChargesInformation entity. The entity TransportationChargesInformation can define a relationship between transportation charges and an origin of these charges. TransportationChargesInformation includes the TransportationCharges entity. The structure of the TransportationChargesInformation entity can include the elements TransportationChargesUsageCode, FreightRequestPartyStandardID, FreightRequestTransportationUnitResourceID, and FreightRequestTransportationStageID. TransportationChargesUsageCode can be a coded representation of usage of TransportationCharges. A usage can point out if subsequent information represents a revenue view or cost view on transportation charges. TransportationChargesUsageCode can be based on GDT: TransportationChargesUsageCode.

FreightRequestPartyStandardID can be a unique identifier of a Party in a FreightRequest, and can be based on GDT: PartyStandardID. FreightRequestTransportationUnitResourceID can be a unique identification of a TransportationUnitResource in a FreightRequest, and can be based on GDT: ResourceID. FreightRequestTransportationStageID can be a unique identification of a TransportationStage in a FreightRequest, and can be based on GDT: TransportationStageID. In some implementations, if none of the IDs is maintained, the transportation charges are related to an entire freight request. TransportationCharges can be a summary of determined transportation charge specific components for a transportation business case. TransportationCharges includes the entities Location, TextCollection, Currency, ExchangeRate, PercentElement, DateTimePeriod, BusinessTransactionDocumentReference, TaxDetail, PaymentInstruction, CashDiscountTerms, and Element. The structure of the TransportationCharges entity can include the elements ID, FreightAgreementID, CalculationOriginCode, TariffID, and CalculationSheetID. ID can be a unique identifier of TransportationCharges in a ShipmentRequest, and can be based on GDT: TransportationChargesID. FreightAgreementID can be an identification of a Freight Agreement which includes and points to a configuration for a Transportation Charges Calculation.

FreightAgreementID can be based on GDT: FreightAgreementID. CalculationOriginCode can be a coded representation of the origin of a transportation charges calculation. A calculation can be done automatically based on a system configuration. Data for the calculation, including the results, can be manually entered or received from another business system via a message. In some implementations, there is a clear distinction of the origin of TransportationChargesCalculation details, such as the TransportationChargesCalculationSheet and its TransportationChargeElements. TransportationChargesCalculationSheet gives information about whether a calculation was done completely automatically, for example, or if the results were manually adopted. CalculationOriginCode can be based on GDT: TransportationChargesOriginCode. TariffID can be an identifier for a transportation charges tariff. A transportation charges tariff can be a specific combination of a transportation charges calculation sheet and terms and conditions. Terms and conditions can define if a certain transportation charges calculation sheet and its related rates are applicable for a transportation business case. TariffID can be based on GDT: TransportationChargesTariffID. CalculationSheetID can be a unique Identifier for a transportation charges calculation sheet. A TransportationChargesCalculationSheet can represent a configuration describing how to calculate transportation charges for a transportation business case. TransportationChargesCalculationSheet includes instructions, such as for which charges are applicable, which data from the transportation business case can be considered for the calculation, how the underlying transportation charge rates can be determined and which special calculation methods can be considered. CalculationSheetID can be based on GDT: TransportationChargesCalculationSheetID.

A ShipmentRequest package can specify or group together data related to a shipment request which is assigned to a freight request. The ShipmentRequest package includes the ShipmentRequest entity and the Request package. ShipmentRequest can be an agreement between an ordering party and a transportation service provider on the shipment of goods from a single shipper to a single consignee in accordance with agreed terms and conditions. ShipmentRequest includes the TransportationStageAssignment and TransportationUnitResourceInformationAssignment entities. The structure of the ShipmentRequest can include the ID element. ID can be a unique identifier of a ShipmentRequest, and can be based on GDT: BusinessTransactionDocumentID. TransportationStageAssignment can specify an assignment of a shipment request to a transportation stage of a freight request. The structure of the TransportationStageAssignment entity can include the FreightRequestTransportationStageID element. FreightRequestTransportationStageID can be a unique identifier of a TransportationStage in a freight request, and can be based on GDT: TransportationStageID. TransportationUnitResourceInformationAssignment can specify an assignment of a shipment request to a TransportationUnitResourceInformation of a freight request. The structure of the TransportationUnitResourceInformationAssignment entity can include the element FreightRequestTransportationUnitResourceID. FreightRequestTransportationUnitResourceID can be a unique identifier of a TransportationUnitResource in a freight request, and can be based on GDT: ResourceID.

The Request package can group the Request with its packages. It can include the Request entity. The Request package includes the packages HeaderInformation, TransportationChargesInformation, GovemmentalRequirementInformation, PartyInformation, LocationInformation, TransportationStageInformation, TransportationUnitResourceInformation, PackagingInformation, and Item. In some implementations, the Request package is filled either for none or for all of the shipment requests which are assigned to a freight request. In the first case, a short form message, ShipmentRequest and its sub entities, identify the ShipmentRequest requests that have been already sent. In the second case, an extended form message, the Request package includes all ShipmentRequest request data, and in a standard process the sub entities of entity ShipmentRequest may not be filled.

Message Data Type FreightRequestCancelRequestMessage

The message data type FreightRequestCancelRequestMessage can group together business information that is relevant for sending a business document in a message, and a FreightRequest object in a business document. FreightRequestCancelRequestMessage includes the MessageHeader and FreightRequest packages. The message data type FreightRequestCancelRequestMessage can provide a structure for the message type FreightRequestCancelRequest and for interfaces that are based on it.

A MessageHeader package can group together business information that is relevant for sending a business document in a message. The MessageHeader package includes the MessageHeader entity. A MessageHeader can group together business information from the perspective of a sending application to identify a business document in a message, to provide information about the sender, and to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by a sending application to name a contact person for problems with the message. This can be useful if an additional infrastructure, such as a marketplace, is located between the sender and the recipient. The SenderParty can be used to transfer a message and can be ignored by the receiving application. In some implementations, SenderParty can be filled by the sender, particularly if the participating parties are not transferred with the FreightRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by a sending application to name a contact person for problems that may occur with the message. This is can be useful if an additional infrastructure, such as a marketplace, is located between the sender and the recipient. The RecipientParty can be used to transfer a message and can be ignored by the receiving application. In some implementations, RecipientParty is filled by the sender if the FreightRequest package cannot be used to transfer the participating parties.

The FreightRequest package can group together information about a FreightRequest. The FreightRequest package includes the FreightRequest entity and the BusinessTransactionDocumentReference package. FreightRequest can be an agreement between an ordering party and a transportation service provider on the shipment of goods from shippers to consignees. The attributes and elements located directly at the FreightRequest entity include the ID element. ID can be a unique identifier of a FreightRequest, and can be based on GDT: BusinessTransactionDocumentID.

The Request package can group a Request with its packages. It includes the Request entity and the BusinessTransactionDocumentReference package. Request can be an agreement between a transportation service provider and an ordering party on the transportation of goods from a single ship-from party to a single ship-to party in accordance with agreed terms and conditions.

A BusinessTransactionDocumentReference package can group references to business documents. It includes the BusinessTransactionDocumentReference entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

Message Data Type FreightRequestConfirmationMessage

The message data type FreightRequestConfirmationMessage includes business information that is relevant for sending a business document in a message, and the FreightRequest included in a business document. It includes the MessageHeader and FreightRequest packages. The message data type FreightRequestConfirmationMessage can provide a structure for the message type FreightRequestConfirmation and for interfaces that are based on it.

A MessageHeader package can group together business information that is relevant for sending a business document in a message. It includes the MessageHeader entity. A MessageHeader can group together business information from the perspective of a sending application to identify a business document in a message, to provide information about the sender, and to provide information about the recipient. The MessageHeader can be divided up into the SenderParty and RecipientParty entities. It can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. This can be useful if an additional infrastructure, such as a marketplace, is located between the sender and the recipient. The SenderParty can be used to transfer a message and can be ignored by the receiving application. In some implementations, SenderParty can be filled by the sender particularly if the participating parties are not transferred with the FreightRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by a sending application to name a contact person for problems that may occur with the message. This can be useful if an additional infrastructure, such as a marketplace, is located between the sender and the recipient. The RecipientParty can be used to transfer a message and can be ignored by the receiving application. In some implementations, RecipientParty can be filled by the sender if the FreightRequest package cannot be used to transfer the participating parties.

The FreightRequest package can group a FreightRequest together with its packages. It includes the FreightRequest entity and the Confirmation package. FreightRequest can be an agreement between an ordering party and a transportation service provider on the shipment of goods from shippers to consignees. The attributes and elements located directly at the FreightRequest entity can include the ID element. ID can be a unique identifier of a FreightRequest, and can be based on GDT: BusinessTransactionDocumentID. In some implementations, the attribute @actioncode fits to the message process. In some implementations, a FreightRequest can have at most one Confirmation. In some implementations, several FreightRequest confirmation messages for the same FreightRequest may be sent successively. In some implementations, from the second confirmation message for a freight request on, the attribute @actioncode contains the value "02—Change". The first confirmation message may contain the value "01".

The Confirmation package can group a Confirmation with its packages. The Confirmation package includes the Confirmation entity and the packages HeaderInformation, GovernmentalRequirementInformation, PartyInformation, TransportationStageInformation, TransportationUnitResourceInformation, TransportationChargesInformation, and ShipmentRequest. Confirmation can be a confirmation of an agreement between an ordering party and a transportation service provider on the shipment of goods from shippers to consignees. The confirmation entity includes the AcceptanceStatusCode element. AcceptanceStatusCode can be a coded representation of the status of an acceptance by a communication partner regarding a business transaction that has been transmitted to that partner. AcceptanceStatusCode can be based on GDT: AcceptanceStatusCode.

The HeaderInformation package groups dates, total values, documents and references related to a freight request. It includes the following entities: DateTimePeriods, NatureOfCargo, TotalQuantity, TotalAmount, TextCollection, and BusinessTransactionDocumentReference. DateTimePeriods can specify a requested and an acceptable date, time and period applying to a shipment request (e.g., date and time of document issue). A requested period can be a period in which an event is requested to take place. An acceptable period can be a period in which an event may take place at an earliest start date/time to a latest end date/time. The elements located directly at the DateTimePeriods entity are RequestedFulfillmentPeriod, AcceptableFulfillmentPeriod, and PeriodRoleCode. RequestedFulfillmentPeriod can be a period which is requested depending on a semantic of a PeriodRoleCode, and can be based on GDT: DATETIMEPERIOD, Qualifier: RequestedFulfillment. AcceptableFulfillmentPeriod can be a period which is acceptable depending on the semantics of the PeriodRoleCode, and can be based on GDT: DATETIMEPERIOD, Qualifier: AcceptableFulfillment.

PeriodRoleCode can be a coded representation of the business semantics of the two periods defined by the entities RequestedFulfillmentPeriod and AcceptableFulfillmentPeriod, and can be based on GDT: PeriodRoleCode. In some implementations, RequestedFulfillmentPeriod and AcceptableFulfillmentPeriod are optional, but in every instance one of them may be filled. NatureOfCargo can indicate a nature of cargo related to a shipment request, for example, palletized, containerized, documents. The structure of the NatureOfCargo entity includes the ClassificationCode element. ClassificationCode can be a coded representation of a classification of a nature of cargo, and can be based on GDT: NatureOfCargoClassificationCode. TotalQuantity can specify a total quantity which is related to a whole shipment request, for example, total number of equipment, total number of items. The structure of the TotalQuantity entity can include the elements Quantity, RoleCode, and TypeCode. Quantity can be a non-monetary numerical specification of an amount in a unit of measurement, and can be based on GDT: Quantity.

RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode. In some implementations, QuantityRoleCode and QuantityTypeCode are optional, but in every instance one of may be filled. TotalAmount can specify a cumulated monetary amount related to a shipment request, for example duty amount, insurance amount, total value. The structure of the TotalAmount entity can include the elements Amount and RoleCode. Amount can be an amount with a corresponding currency unit, and can be based on CDT: Amount. RoleCode can be a coded representation of a role of an amount, and can be based on GDT: AmountRoleCode. TextCollection can be a group of textual information that relates to a shipment request. The structure of the TextCollection entity includes the element TextCollection. TextCollection can be based on GDT: TextCollection. BusinessTransactionDocumentReference can specify a business document reference that is related to a whole shipment request. BusinessTransactionDocumentReference includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID.

BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

GovernmentalProcedure can specify applicable governmental procedures related to import, export and transport of goods of a shipment request. GovernmentalProcedure includes the entities Location, DateTimePeriod, Seal, TextCollection, and TransportationDocumentInformation. TransportationGovernmentAgencyTypeCode can be a coded representation of a type of a government agency, and can be based on GDT: TransportationGovernmentAgencyTypeCode. TransportationMovementTypeCode can be a coded representation of a type of a transport movement. Examples can include Import, Export, Transit, Transshipment. TransportationMovementTypeCode can be based on GDT: TransportationMovementTypeCode. TransportationGovernmentAgencyInvolvementStatusCode can be a coded representation for an involvement status of a transportation related government agency, and can be based on GDT: TransportationGovernmentAgencyInvolvementStatusCode. TransportationGovernmentAgencyActionCode can be a coded representation of an action of a transportation related government agency, and can be based on GDT: TransportationGovernmentAgencyActionCode. TransportationGovernmentAgencyProcedureStatusCode can be a coded representation of a status of a procedure related to a transportation government agency, and can be based on GDT: TransportationGovernmentAgencyProcedureStatusCode.

The PartyInformation package includes information regarding a party of a freight request (e.g., Shipper, Carrier, Agent). The PartyInformation package includes the Party entity. Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. It includes the entities Amount, DateTimePeriods, TransportationDocumentInformation, and BusinessTransactionDocumentReference. The structure of the Party entity can include the elements Party, RoleCode, and FormattedName. A Party includes information that is exchanged, in accordance with common business understanding, in business documents about a party involved in business transactions. This information is used to identify the party and the party's address, as well as the party's contact person and the contact person's address. This identification can take place using an internal ID, a standardized ID, or IDs assigned by the parties involved. Party can be based on GDT: BusinessTransactionDocumentParty.

RoleCode can be a coded representation of a PartyRoleCode which specifies which rights and obligations the party has regarding the business object and corresponding processes. In some implementations, a PartyRole is assigned to exactly one PartyRoleCategory and refines its semantics. RoleCode can be based on GDT: PartyRoleCode. FormattedName can be a complete, formatted name of a party, and can be based on GDT: LONG_Name, Qualifier: PartyFormatted. BusinessTransactionDocumentReference can specify a business document reference that is related to a whole shipment request. It includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode.

TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The TransportationStageInformation package includes information regarding a stage of a freight request. A stage can represent a section of a transport. It includes the TransportationStage entity. TransportationStage can specify details related to a stage of a transport which is part of a freight request. TransportationStage includes the entities ContactInformation, Quantity, Party, Location, Seal, TextCollection, BusinessTransactionDocumentReference, and TransportationServiceRequirement. The structure of the TransportationState entity can include the elements ID, OrdinalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure. ID can be a unique identifier of a stage in a shipment request, and can be based on GDT: TransportationStageID. OrdinalNumberValue can be an ordinal number to indicate a position of a transportation stage in a set of transportation stages. OrdinalNumberValue can be based on GDT: OrdinalNumberValue, Qualifier: TransportationStage.

TypeCode can be a coded representation of a type of a TransportationStage, and can be based on GDT: TransportationStageTypeCode. JourneyID can be an identifier of a Journey, and can be based on GDT: JourneyID. TransportModeCode can be a coded representation of a mode of transportation used for delivery, and can be based on GDT: TransportModeCode. TransportMeansDescriptionCode can be a coded representation of a transport means type with which goods or persons can be transported, and can be based on GDT: TransportMeansDescriptionCode. TransportMeansDescription can be a description of a means of transport, and can be based on GDT: SHORT_Description, Qualifier: TransportMeans. TransportMeansID can be a unique identifier of a means of transport, and can be based on GDT: TransportMeansID. TransportMeansHomeCountryCode can be a coded representation of the home country of a transport means, and can be based on GDT: CountryCode, Qualifier: TransportMeansHome. TransportMeansOwnershipTypeCode can be a coded representation of a type of ownership for a means of transport, and can be based on GDT: TransportMeansOwnershipTypeCode. CarrierStandardID can be a standard identifier of a carrier, and can be based on GDT: PartyStandardID. CarrierFormattedName can be a name of a carrier, and can be based on GDT: LONG_Name, Qualifier: PartyFormatted. TransportationTransitDirectionCode can be a coded representation for a transportation transit direction, and can be based on GDT: TransportationTransitDirectionCode.

CalculatedDistanceMeasure can be a calculated distance measure, and can be based on GDT: Measure, Qualifier: CalculatedDistance. GivenDistanceMeasure can be a given distance measure, and can be based on GDT: Measure, Qualifier: GivenDistance. ContactInformation can specify information on a department or person to whom information regarding a Stage can be directed. The structure of the ContactInformation entity can include the ContactPersonFunctionTypeCode and Address elements. ContactPersonFunctionTypeCode can be a coded representation of a type of function that a contact person has, and can be based on GDT: ContactPersonFunctionTypeCode. Address can be an address related to contact information defined by a corresponding FunctionTypeCode, and can be based on GDT: Address. Quantity can specify a quantity related to a Stage. The structure of the Quantity entity can include the elements Quantity, RoleCode, and TypeCode. Quantity can be a non-monetary numerical specification of an amount in a unit of measurement, and can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode.

Party includes information that is exchanged, in accordance with common business understanding, in business documents, about a party involved in a current stage. This information can be used to identify the party and the party's address. It includes the TransportationDocumentInformation and BusinessTransactionDocumentReference entities. The structure of the Party entity can include the elements Party, RoleCode, and FormattedName. A Party includes information that is exchanged, in accordance with common business understanding, in business documents about a party involved in business transactions. This information is used to identify the party and the party's address, as well as the party's contact person and the contact person's address. This identification can take place using an internal ID, a standardized ID, or IDs assigned by the parties involved. Party can be based on GDT: BusinessTransactionDocumentParty.

RoleCode can be a coded representation of a PartyRoleCode which specifies which rights and obligations a party has regarding a business object and corresponding processes. In some implementations, a PartyRole is assigned to exactly one PartyRoleCategory and refines its semantics. RoleCode can be based on GDT: PartyRoleCode. FormattedName can be a complete, formatted name of a party, and can be based on GDT: LONG_Name, Qualifier: PartyFormatted. TransportationDocumentInformation can specify information on a transportation document related to a shipment request. It includes the DateTimePeriod entity. The structure of the TransportationDocumentInformation entity can include the elements TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of a type of a document, and can be based on GDT: TransportationDocumentTypeCode.

TransportationDocumentNote can be a short Note regarding documentation, and can be based on GDT: SHORT_Note. TransportationDocumentID can be a unique identifier for a transportation document, and can be based on GDT: TransportationDocumentID. TransportationDocumentStatusCode can be a coded representation of a status of a transportation document (e.g., To be printed, Document Complete). TransportationDocumentStatusCode can be based on GDT: TransportationDocumentStatusCode. LanguageCode can be a coded representation of the language of a document, and can be based on GDT: LanguageCode. CommunicationMediumTypeCode can be a coded representation of a type of a medium used for communication of documentation, such as Fax, mail, EDI, or Letter. CommunicationMediumTypeCode can be based on GDT: CommunicationMediumTypeCode. RequiredIndicator can indicate whether documentation is required or not, and can be based on GDT: Indicator Qualifier: Required.

OutputCopyNumberValue can be a number specifying a number of copies of a document that may be issued, and can be based on GDT: NumberValue, Qualifier: OutputCopy. OutputOriginalNumberValue can be a number specifying a number of originals of a document that may be issued, and can be based on GDT: NumberValue, Qualifier: OutputOriginal. In some implementations, TypeCode and TypeDescription are both optional, but at least one of them may be used. In some implementations, if the RequiredIndicator is set to true, at least one of the both NumberValues OutputCopyNumberValue or OutputOriginalNumberValue may be filled. BusinessTransactionDocumentReference can specify a business document reference that is related to a whole shipment request. BusinessTransactionDocumentReference includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID.

BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item has when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The Location can specify a physical place to which TransportationCharges and their calculation can refer. Location includes the DateTimePeriod entity. The structure of the Location entity can include the elements Location, RoleCode, TypeCode, and Name. Location includes information that is exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier: Location. Seal can specify seal information related to a Stage. The structure of the Seal entity can include the elements ID, PartyRoleCode, PartyFormattedName, and StatusCode. ID can be a unique identifier of a seal, and can be based on GDT: SealID. PartyRoleCode can be a coded representation of a party role, such as a role of a sealing party. PartyRoleCode can be based on GDT: PartyRoleCode.

PartyFormattedName can be a complete, formatted name of a party, such as the role of a sealing party. PartyFormattedName can be based on GDT: LONG_Name, Qualifier: PartyFormatted. StatusCode can be a coded representation of a status of a seal, and can be based on GDT: SealStatusCode. TextCollection can be a group of textual information that relates to a Stage. The structure of the TextCollection entity includes the element TextCollection. TextCollection can be based on GDT: TextCollection. BusinessTransactionDocumentReference can specify a business document reference that is related to a whole shipment request. BusinessTransactionDocumentReference includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference.

BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

TransportationServiceRequirement can specify a contract and carriage condition and service and priority requirements for a transport which may apply to a whole shipment request. The structure of the TransportationServiceRequirement entity includes the elements TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service, and can be based on GDT: TransportationServiceRequirementCode. AdditionalTransportationServiceRequirementCode can be a coded representation of an additional requirement related to a transportation service, and can be based on GDT: TransportationServiceRequirementCode, Qualifier: Additional. TransportationContractConditionCode can be a coded representation of a contract and carriage condition, and can be based on GDT: TransportationContractConditionCode. TransportServiceLevelCode can be a coded representation of agreed or defined services in terms of the delivery of goods with respect to the speed of the delivery, and can be based on GDT: TransportServiceLevelCode. NatureOfCargoClassificationCode can be a coded representation of a classification of a nature of cargo, and can be based on GDT NatureOfCargoClassificationCode.

The TransportationUnitResourceInformation package includes information regarding a transportation unit resource that is relevant for a freight request (e.g., a container). The TransportationUnitResourceInformation package includes the TransportationUnitResourceInformation entity. TransportationUnitResourceInformation includes information on one or more transportation unit resources, such as resource type and related properties. For example, it can be related measures or handling instructions. A Transportation Unit Resource can be a unit into which goods are loaded and/or from which goods are unloaded. In some implementations, this unit can provide transportation capacity for goods but may or may not move by itself. It includes the entities TransportationStageAssignment, AttachedEquipment, Quantity, Seal, BusinessTransactionDocumentReference, TextCollection, Party, Location, DangerousGoods. The structure of the TransportationUnitResourceInformation entity can include the elements ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote.

ID can be a unique identifier for a resource information, and can be based on GDT ResourceInformationID. ResourceNumberValue can be a number of resources, and can be based on GDT: NumberValue, Qualifier: Resource. ResourceID can be a unique identifier for a resource, and can be based on GDT: ResourceID. ResourceHomeCountryCode can be a coded representation of the home country of a resource, and can be based on GDT: CountryCode, Qualifier: ResourceHome. TransportationUnitResourceCategoryCode can be a coded representation of a category of transportation unit resources, and can be based on GDT: TransportationUnitResourceCategoryCode. TransportationUnitResourceTypeCode can be a coded representation of a type of a transportation unit resource, and can be based on GDT: TransportationUnitResourceTypeCode. FillLevelCode can be a coded representation of a fill level of a resource, and can be based on GDT: FillLevelCode.

ShippingTypeCode can be a coded representation of a shipping type. The shipping type can specify how planning and execution of a transportation can be performed. Transportation terms can include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be an inland transport of cargo. HaulageArrangerCode can be based on GDT: HaulageArrangerCode. TransportationHandlingInstructionCode can be a coded representation of a type of a transportation handling instruction, and can be based on GDT: TransportationHandlingInstructionCode. TransportationHandlingInstructionNote can be a note regarding a transportation handling instruction, and can be based on GDT: LONG_Note, Qualifier: TransportationHandlingInstruction. TransportationStageAssignment can specify an assignment of a resource to a stage. The structure of the TransportationStageAssignment entity includes a FreightRequestTransportationStageID element. FreightRequestTransportationStageID can be a unique identifier of a TransportationStage in a freight request, and can be based on GDT: TransportationStageID.

AttachedEquipment can specify an item of equipment that is attached to a TransportationUnitResource. The structure of the AttachedEquipment entity can include the ShipmentRequestResourceInformationID element. ShipmentRequestResourceInformationID can be a unique identifier of a resource information in a ShipmentRequest, and can be based on GDT: ResourceInformationID. Quantity specifies the quantity related to the TransportationUnitResourceInformation. The structure of the Quantity entity can include the elements Quantity, RoleCode, and TypeCode. Quantity can be a non-monetary numerical specification of an amount in a unit of measurement, and can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode. Seal specifies a seal related to a TransportationUnitResource. The structure of a Seal entity can include the elements ID, PartyRoleCode, PartyFormattedName, and StatusCode. ID can be a unique identifier of a seal, and can be based on GDT: SealID. PartyRoleCode can be a coded representation of a party role, such as a role of a sealing party. PartyRoleCode can be based on GDT: PartyRoleCode.

PartyFormattedName can be a complete, formatted name of a party, such as a role of a sealing party. PartyFormattedName can be based on GDT: LONG_Name, Qualifier: PartyFormatted. StatusCode can be a coded representation of a status of a seal, and can be based on GDT: SealStatusCode. BusinessTransactionDocumentReference specifies a business document reference that is related to a TransportationUnitResource. It includes the DateTimePeriod entity. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference.

BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both can be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

TextCollection is a group of textual information that relates to the TransportationUnitResource. The structure of the TextCollection entity includes the element TextCollection. TextCollection can be based on GDT: TextCollection. Party includes information that is exchanged, in accordance with common business understanding, in business documents, about a party involved in the current TransportationUnitResource. This information is used to identify the party and the party's address. The structure of the Party entity can include the elements Party, RoleCode, and FormattedName. A Party includes information that is exchanged, in accordance with common business understanding, in business documents, about a party involved in business transactions. This information is used to identify the party and the party's address, as well as the party's contact person and the contact person's address. This identification can take place using an internal ID, a standardized ID, or IDs assigned by the parties involved.

Party can be based on GDT: BusinessTransactionDocumentParty. RoleCode can be a coded representation of a PartyRoleCode which specifies which rights and obligations a party has regarding a business object and corresponding processes. In some implementations, a PartyRole is assigned to exactly one PartyRoleCategory and refines its semantics. RoleCode can be based on GDT: PartyRoleCode. FormattedName can be a complete, formatted name of a party, and can be based on GDT: LONG_Name, Qualifier: PartyFormatted. Location specifies a physical place related to the TransportationUnitResource. The structure of the Location entity can include the elements Location, RoleCode, TypeCode, and Name. Location includes information that is exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier: Location.

DangerousGoods can specify dangerous goods included in a resource. DangerousGoods includes the ContactInformation and TextCollection entities. The structure of the DangerousGoods entity can include the elements ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number, and can be based on GDT: DangerousGoodsID. RegulationsCode can be a coded representation of national or international dangerous goods rules or regulations, and can be based on GDT: DangerousGoodsRegulationsCode. HazardCode can be a coded representation of a hazard that is imminent in a dangerous good, and can be based on GDT: DangerousGoodsHazardCode. FlashpointMeasureInterval can be an interval of measures defined by a lower and an upper boundary indicating a flashpoint of a dangerous good, and can be based on GDT: MeasureInterval, Qualifier: Flashpoint. PackagingGroupCode can be a coded representation of the effectiveness of a packaging to transport dangerous goods depending on the degree of danger of the goods, and can be based on GDT: DangerousGoodsPackagingGroupCode.

EmergencySchedule can be a coded representation of an emergency schedule for dangerous goods. It can identify an emergency schedule. The DangerousGoodsEmergencySchedule can be used for transports of dangerous goods by sea similar to the Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident, and can be based on GDT: TransportEmergencyCardCode. DangerousGoodsLabelCode can be a coded representation of a label for a dangerous good. In some implementations, DangerousGoodsLabelCode's values are dependent on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependent on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode.

PackagingInstructionTypeCode can be a coded representation of a packaging instruction. A packaging instruction can be an instruction defining which packagings can be used to pack a dangerous good. PackagingInstructionTypeCode can be based on GDT: PackagingInstructionTypeCode. TransportMeansDescriptionCode can be a coded representation of a transport means type with which goods or persons are to be transported, and can be based on GDT: TransportMeansDescriptionCode. TransportAuthorisationCode can be a coded representation of an authorisation for a transportation of dangerous goods. This code can specify an authorisation for the transportation of a particular dangerous good. TransportAuthorisationCode can be based on GDT: DangerousGoodsTransportAuthorisationCode.

The TransportationChargesInformation package includes information regarding a transportation charge calculation specific to components related to a FreightRequest. The TransportationChargesInformation package includes the TransportationChargesInformation entity. The entity TransportationChargesInformation can define a relationship between transportation charges and an origin of these charges. TransportationChargesInformation includes the TransportationCharges entity. The structure of the TransportationChargesInformation entity can include the elements TransportationChargesUsageCode, FreightRequestPartyStandardID, FreightRequestTransportationUnitResourceID, and FreightRequestTransportationStageID. TransportationChargesUsageCode can be a coded representation of the usage of the TransportationCharges. The usage can point out if subsequent information represents a revenue view or cost view on transportation charges. TransportationChargesUsageCode can be based on GDT: TransportationChargesUsageCode. FreightRequestPartyStandardID can be a unique identifier of a Party in a FreightRequest, and can be based on GDT: PartyStandardID. FreightRequestTransportationUnitResourceID can be a unique identification of a TransportationUnitResource in a FreightRequest, and can be based on GDT: ResourceID. FreightRequestTransportationStageID can be a unique identification of a TransportationStage in a FreightRequest, and can be based on GDT: TransportationStageID.

In some implementations, if none of the IDs is maintained, the transportation charges are related to the entire freight request. TransportationCharges can be a summary of determined transportation charge specific components for a transportation business case. TransportationCharges includes the entities: Location, TextCollection, Currency, ExchangeRate, PercentElement, DateTimePeriod, BusinessTransactionDocumentReference, TaxDetail, PaymentInstruction, CashDiscountTerms, and Element. The structure of the TransportationCharges entity can include the elements ID, FreightAgreementID, CalculationOriginCode, TariffID, and CalculationSheetID. ID can be a unique identifier of TransportationCharges in a ShipmentRequest, and can be based on GDT: TransportationChargesID. FreightAgreementID can be an identification of a Freight Agreement which includes and points to a configuration for a Transportation Charges Calculation. FreightAgreementID can be based on GDT: FreightAgreementID.

CalculationOriginCode can be a coded representation of the origin of a transportation charges calculation. The calculation can be done automatically based on a system configuration. Data for a calculation, including results, can be manually entered or received from another business system via a message. In some implementations, there is a clear distinction of the origin of TransportationChargesCalculation details such as the TransportationChargesCalculationSheet and its TransportationChargeElements. TransportationChargesCalculationSheet gives information whether a calculation was done completely automatically, for example, or if results were manually adopted. CalculationOriginCode can be based on GDT: TransportationChargesOriginCode. TariffID can be an identifier for a transportation charges tariff. A transportation charges tariff can be a specific combination of a transportation charges calculation sheet and terms and conditions. Terms and conditions can define if a certain transportation charges calculation sheet and its related rates are applicable for a transportation business case. TariffID can be based on GDT: TransportationChargesTariffID. CalculationSheetID can be a unique Identifier for a transportation charges calculation sheet. A TransportationChargesCalculationSheet can represent a configuration which describes how to calculate transportation charges for a transportation business case. A TransportationChargesCalculationSheet includes instructions regarding which charges are applicable, which data from a transportation business case can be considered for a calculation, how underlying transportation charge rates can be determined, and which special calculation methods can be considered. CalculationSheetID can be based on GDT: TransportationChargesCalculationSheetID.

A ShipmentRequest package can specify or group together data related to a shipment request which is assigned to a freight request. A ShipmentRequest package includes the ShipmentRequest entity and the Confirmation package. ShipmentRequest can be an agreement between an ordering party and a transportation service provider on the shipment of goods from a single shipper to a single consignee in accordance with agreed terms and conditions. ShipmentRequest includes the TransportationStageAssignment and TransportationUnitResourceInformationAssignment entities. The structure of the ShipmentRequest entity includes the ID element. ID can be a unique identifier of a ShipmentRequest, and can be based on GDT: BusinessTransactionDocumentID. TransportationStageAssignment can specify an assignment of a shipment request to a transportation stage of a freight request.

The structure of the TransportationStageAssignment entity includes the FreightRequestTransportationStageID element. FreightRequestTransportationStageID can be a unique identifier of a TransportationStage in a freight request, and can be based on GDT: TransportationStageID. TransportationUnitResourceInformationAssignment can specify an assignment of a shipment request to a TransportationUnitResourceInformation of a freight request. The structure of the TransportationUnitResourceInformationAssignment entity includes the FreightRequestTransportationUnitResourceInformationID element. FreightRequestTransportationUnitResourceInformationID can be a unique identifier of a TransportationUnitResource in a freight request, and can be based on GDT: ResourceInformationID.

The Confirmation package can be a confirmation of an agreement between a transportation service provider and an ordering party on the transportation of goods from a single ship-from party to a single ship-to party in accordance with agreed terms and conditions. The Confirmation package includes the Confirmation entity. The Confirmation package includes the packages HeaderInformation, TransportationChargesInformation, GovernmentalRequirementInformation, PartyInformation, LocationInformation, TransportationStageInformation, TransportationUnitResourceInformation, PackagingInformation, and Item. In some implementations, the Confirmation package is filled either for none or for all of the shipment requests which are assigned to a freight request. In the first case, short form message, ShipmentRequest and its sub entities identify ShipmentRequest confirmations that have already been sent before. In the second case, extended form message, the Confirmation package includes ShipmentRequest confirmation data, and in a standard process the sub entities of entity ShipmentRequest may not be filled.

Message Data Type FreightRequestReceiptNotificationMessage

The message data type FreightRequestReceiptNotificationMessage includes business information that is relevant for sending a business document in a message, and a FreightRequest included in a business document. FreightRequestReceiptNotificationMessage includes the MessageHeader and FreightRequest packages. The message data type FreightRequestReceiptNotificationMessage can provide a structure for the message type FreightRequestReceiptNotification and for interfaces that are based on it.

A MessageHeader package can group together business information that is relevant for sending a business document in a message. The MessageHeader package includes the MessageHeader entity. A MessageHeader can group together business information from the perspective of a sending application, to identify a business document in a message, provide information about the sender, and provide information about the recipient. The MessageHeader can be divided up into the SenderParty and RecipientParty entities. It can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. This can be useful if an additional infrastructure, such as a marketplace, is located between the sender and the recipient. The SenderParty can be used to transfer the message and can be ignored by the receiving application. In some implementations, SenderParty is filled by the sender, particularly if the participating parties are not transferred with the FreightRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with the message. This can be useful if an additional infrastructure, such as a marketplace, is located between the sender and the recipient. The RecipientParty can be used to transfer a message and can be ignored by the receiving application. In some implementations, RecipientParty can be filled by the sender if a FreightRequest package cannot be used to transfer the participating parties.

The FreightRequest package can group a FreightRequest with its packages. It includes the FreightRequest entity and the Request package. FreightRequest can be an agreement between an ordering party and a transportation service provider on the shipment of goods from shippers to consignees. The structure of the FreightRequest entity includes the ID element. ID can be a unique identifier of a FreightRequest, and can be based on GDT: BusinessTransactionDocumentID. The Request package can group the Request with its packages. It includes the Request entity and the HeaderInformation and PartyInformation packages.

The HeaderInformation package can group dates, total values, documents and references related to a FreightRequest. The HeaderInformation package includes the entities DateTimePeriods, TextCollection, and BusinessTransactionDocumentReference. DateTimePeriods can specify a requested and an acceptable date, time and period applying to a FreightRequest (e.g., date and time of document issue). A requested period can be a period in which an event is requested to take place. An acceptable period can be a period in which an event may take place at an earliest start date/time to a latest end date/time. The elements located directly at the DateTimePeriods entity are RequestedFulfillmentPeriod, AcceptableFulfillmentPeriod, and PeriodRoleCode. RequestedFulfillmentPeriod can be a period which is requested depending on the semantics of the PeriodRoleCode, and can be based on GDT: DATETIMEPERIOD, Qualifier: RequestedFulfillment. AcceptableFulfillmentPeriod can be a period which is acceptable depending on the semantics of the PeriodRoleCode, and can be based on GDT: DATETIMEPERIOD, Qualifier: AcceptableFulfillment. PeriodRoleCode can be a coded representation of the business semantics of the two periods defined by the entities RequestedFulfillmentPeriod and AcceptableFulfillmentPeriod, and can be based on GDT: PeriodRoleCode. In some implementations, RequestedFulfillmentPeriod and AcceptableFulfillmentPeriod are optional, but in every instance one of them may be filled.

TextCollection can be a group of textual information that relates to a FreightRequest. The structure of the TextCollection entity can be based on the TextCollection element. TextCollection can be based on GDT: TextCollection. BusinessTransactionDocumentReference can specify a business document reference that is related to an entire FreightRequest. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference.

BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode. BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The PartyInformation package includes information regarding a party of a freight request, (e.g., Shipper, Carrier, Agent). The PartyInformation package includes the Party entity. Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. The structure of the Party entity includes the Party and RoleCode elements. A Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, PartyRole is assigned to exactly one PartyRoleCategory and refines its semantics. Party can be based on GDT: PartyRoleCode.

Message Data Type FreightRequestConfirmationReceiptNotificationMessage

The message data type FreightRequestConfirmationReceiptNotificationMessage includes business information that is relevant for sending a business document in a message and the FreightRequest included in the business document. It includes the MessageHeader and FreightRequest packages. The message data type FreightRequestConfirmationReceiptNotification can provide a structure for the message type FreightRequestConfirmationReceiptNotification and for interfaces that are based on it.

A MessageHeader package can group together business information that is relevant for sending a business document in a message. The MessageHeader package includes the MessageHeader entity. A MessageHeader can group together business information from the perspective of the sending application to identify a business document in a message, to provide information about the sender, and to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. This can be useful if an additional infrastructure, such as a marketplace, is located between the sender and the recipient. The SenderParty can be used to transfer a message and can be ignored by the receiving application. In some implementations, it can be filled by the sender, particularly if the participating parties are not transferred with the FreightRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with the message. This can be useful if an additional infrastructure, such as a marketplace, is located between the sender and the recipient. The RecipientParty can be used to transfer the message and can be ignored by the receiving application. In some implementations, RecipientParty can be filled by the sender if the FreightRequest package cannot be used to transfer the participating parties.

The FreightRequest package can group a FreightRequest with its packages. The FreightRequest package includes the FreightRequest entity and the Confirmation package. FreightRequest can be an agreement between an ordering party and a transportation service provider on the shipment of goods from shippers to consignees. The structure of the FreightRequest entity include the ID element. ID can be a unique identifier of a FreightRequest, and can be based on GDT: BusinessTransactionDocumentID.

The Confirmation package can group the Confirmation with its packages. The Confirmation package includes the Confirmation entity and the HeaderInformation and PartyInformation packages. Confirmation can be a confirmation of an agreement between an ordering party and a transportation service provider on the shipment of goods from a shipper to consignees.

The HeaderInformation package groups dates, total values, documents and references related to a freight request. The HeaderInformation package includes the following entities: DateTimePeriods, TextCollection, and BusinessTransactionDocumentReference. DateTimePeriods can specify a requested and an acceptable date, time and period applying to a freight request (e.g., date and time of document issue). A requested period can be a period in which an event is requested to take place. An acceptable period can be a period in which an event may take place at an earliest start date/time to a latest end date/time. The elements located directly at the DateTimePeriods entity can include RequestedFulfillment- Period, AcceptableFulfillmentPeriod, and PeriodRoleCode. RequestedFulfillmentPeriod can be a period which is requested depending on the semantics of the PeriodRoleCode, and can be based on GDT: DATETIMEPERIOD, Qualifier: RequestedFulfillment. AcceptableFulfillmentPeriod can be a period which is acceptable depending on the semantics of the PeriodRoleCode, and can be based on GDT: DATETIMEPERIOD, Qualifier: AcceptableFulfillment. PeriodRoleCode can be a coded representation of the business semantics of the two periods defined by the entities RequestedFulfillmentPeriod and AcceptableFulfillmentPeriod, and can be based on GDT: PeriodRoleCode. In some implementations, RequestedFulfillmentPeriod and AcceptableFulfillmentPeriod are optional, but in every instance one of them may be filled. TextCollection can be a group of textual information that relates to a FreightRequestConfirmation. The structure of the TextCollection entity includes the TextCollection element. TextCollection can be based on GDT: TextCollection.

BusinessTransactionDocumentReference can specify a business document reference that is related to an entire freight request. The structure of the BusinessTransactionDocumentReference entity can include the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process, and can be based on GDT: BusinessTransactionDocumentReference. BusinessTransactionDocumentRelationshipRoleCode can be a coded representation of a role that a business document or a business document item can have when set against another business document or business document item with a relationship, and can be based on GDT: BusinessTransactionDocumentRelationshipRoleCode.

BusinessTransactionDocumentRelationshipTypeCode can be a coded representation of a relationship between two business documents or business document items, and can be based on GDT: BusinessTransactionDocumentRelationshipTypeCode. TransportationDocumentTypeCode can be a coded representation of a type of a document, and can be based on GDT: TransportationDocumentTypeCode. TransportationDocumentNote can be a short Note regarding documentation, and can be based on GDT: SHORT_Note. TransportationDocumentID can be a unique identifier for a transportation document, and can be based on GDT: TransportationDocumentID. In some implementations, RelationshipTypeCode and RelationshipRoleCode are both optional. If used, both may be filled. In some implementations, either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The PartyInformation package includes information regarding a party of a freight request, (i.e., Shipper, Carrier, Agent). The PartyInformation package includes the Party entity. Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. The structure of the Party entity can include the Party and RoleCode elements. A Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to exactly one PartyRoleCategory and refines its semantics. RoleCode can be based on GDT: PartyRoleCode.

HouseShipment Interfaces

The HouseShipment interfaces can be part of the Shipper and Transportation Service Provision scenarios, where transportation services can be tendered between transportation service providers. A consignment of an ordering party can be specified in a WaybillNotification. A transportation service provider can issue a waybill for an ordering party by using the interfaces described in this document. A WaybillNotification can be a contractual document issued by a transportation service provider for a consignment of an ordering party. The structure of a WaybillNotification can be specified by the message data type WaybillNotificationMessage.

The waybill notification message can be implemented by the message interface Transportation Service Provider side: WaybillNotification_Out.

Figure 43:
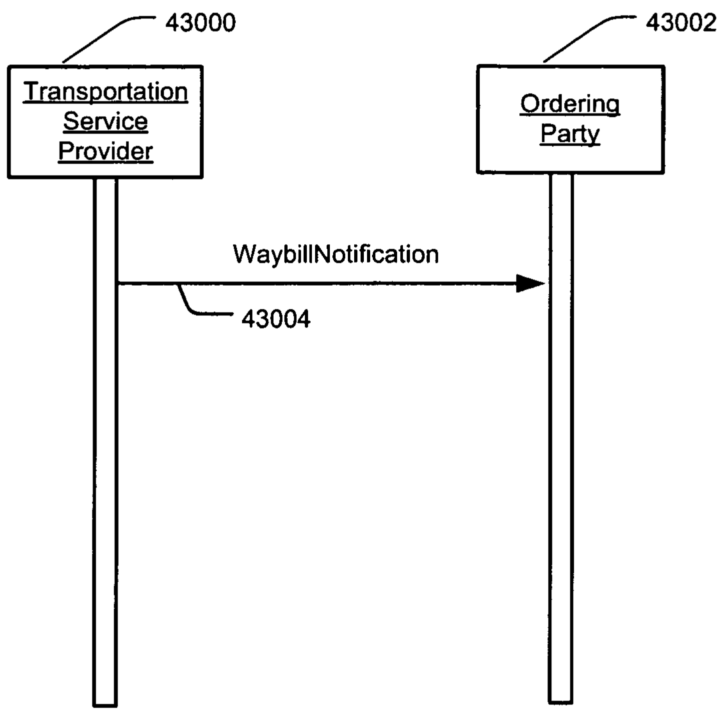
FIG. 43 shows an exemplary HouseShipment Message Choreography.

The message choreography of FIG. 43 describes a possible logical sequence of messages that can be used to realize a House Shipment business scenario.

A "Transportation Service Provider" system 43000 can issue a contractual document for a consignment to an "Ordering Party" system 43002, using a WaybillNotification message 43004 as shown, for example, in FIG. 43.

Figures 1, 44:
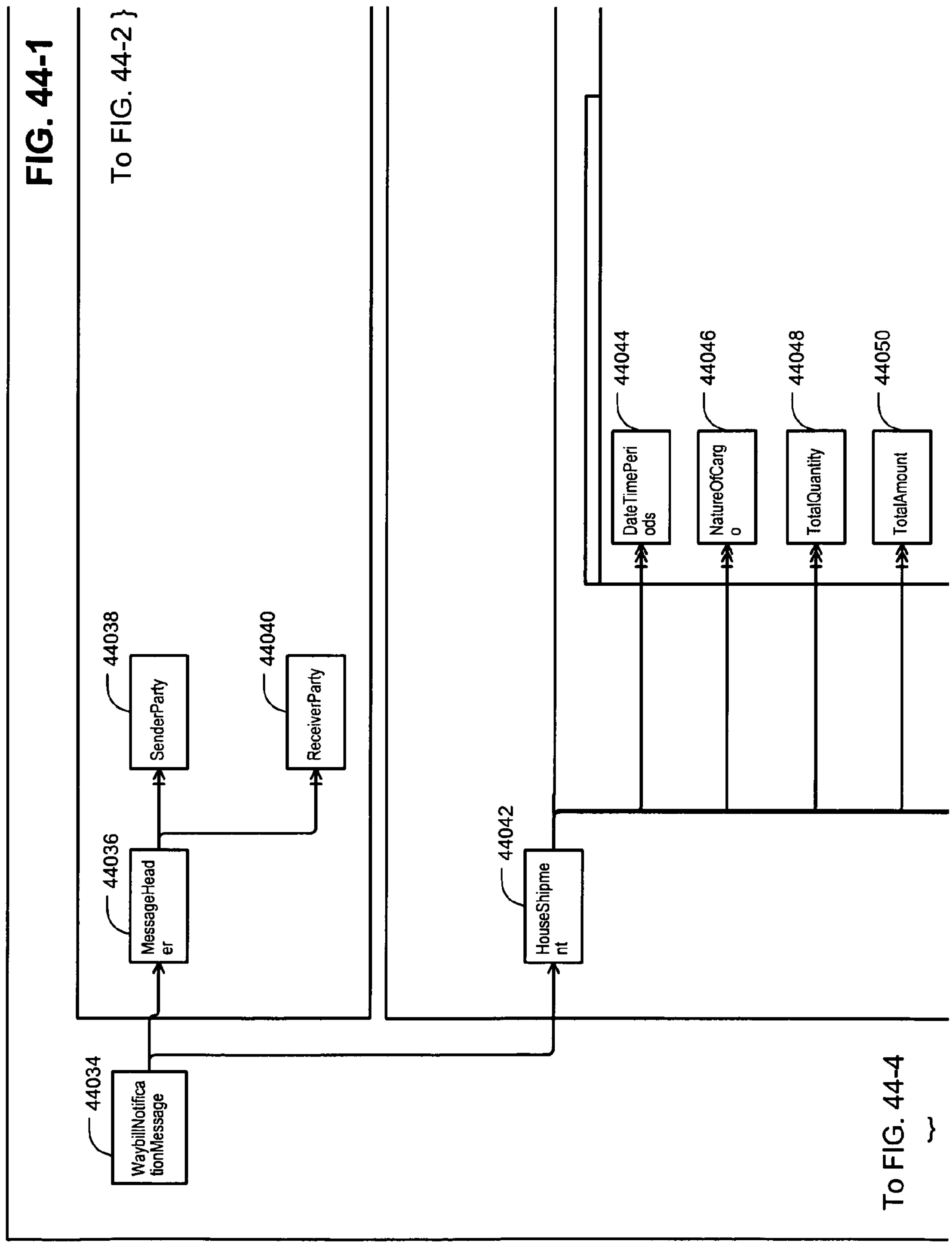
Figures 2, 44:
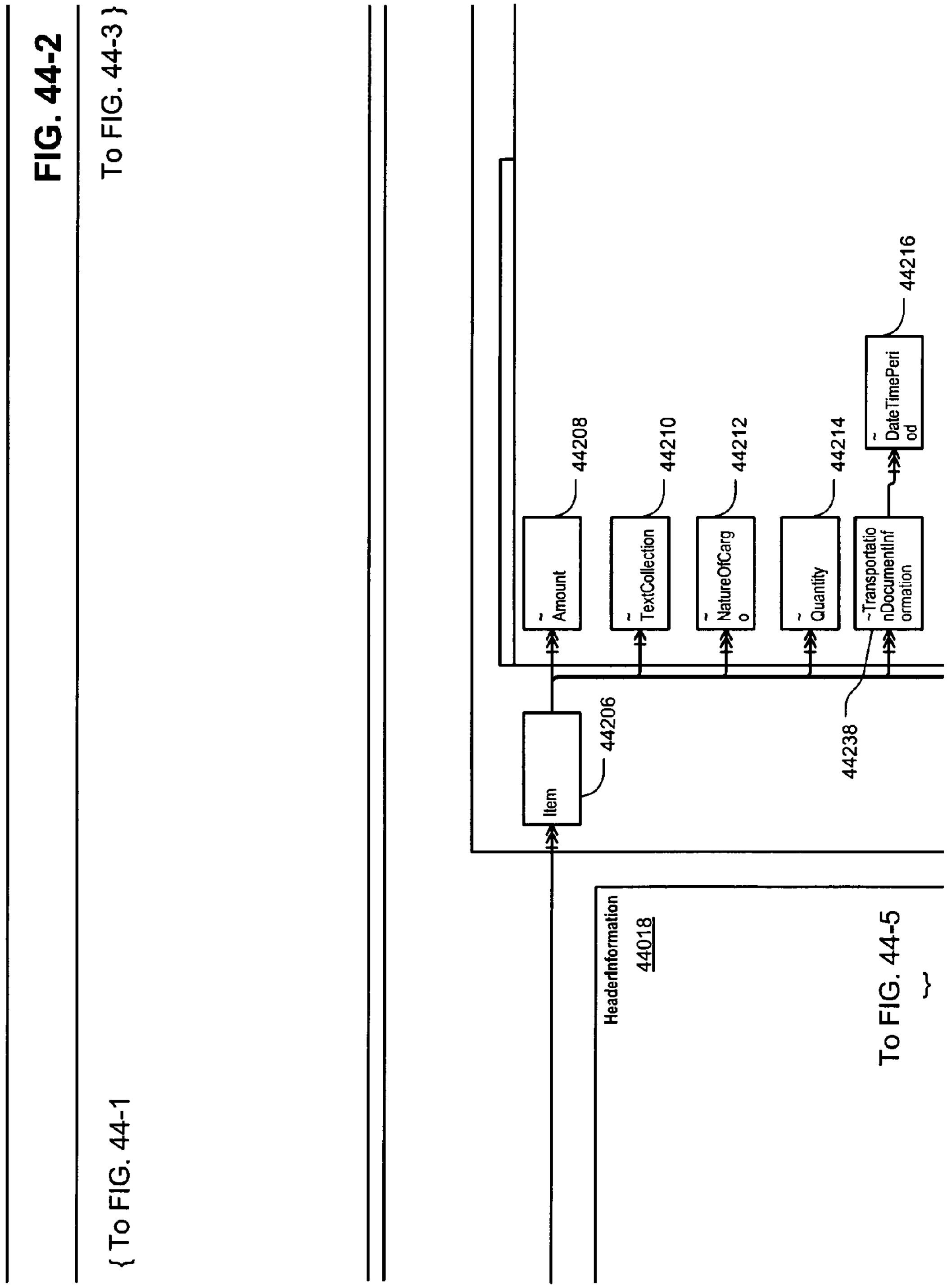
Figures 3, 44:
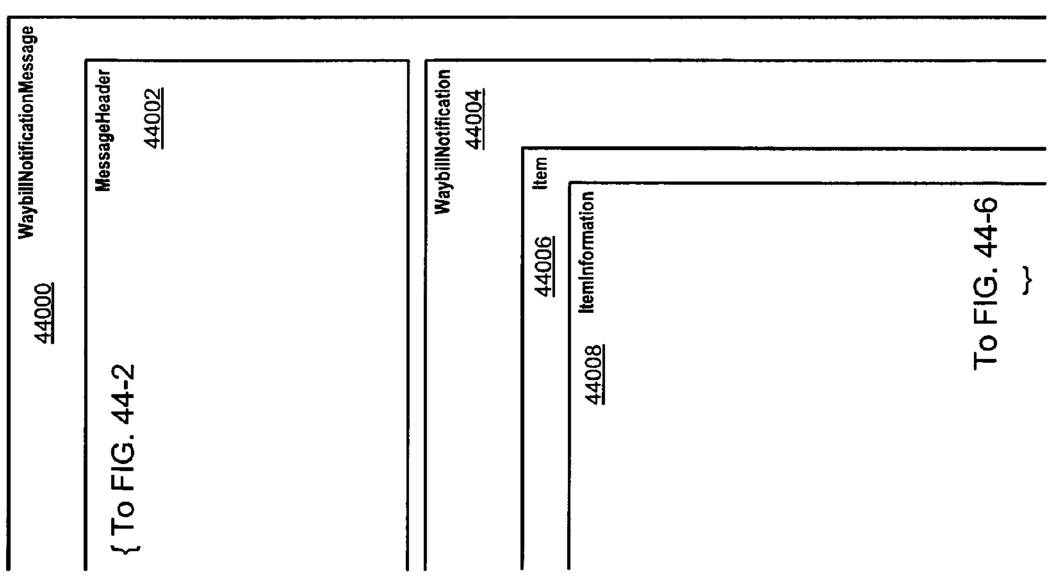
Figures 4, 44:
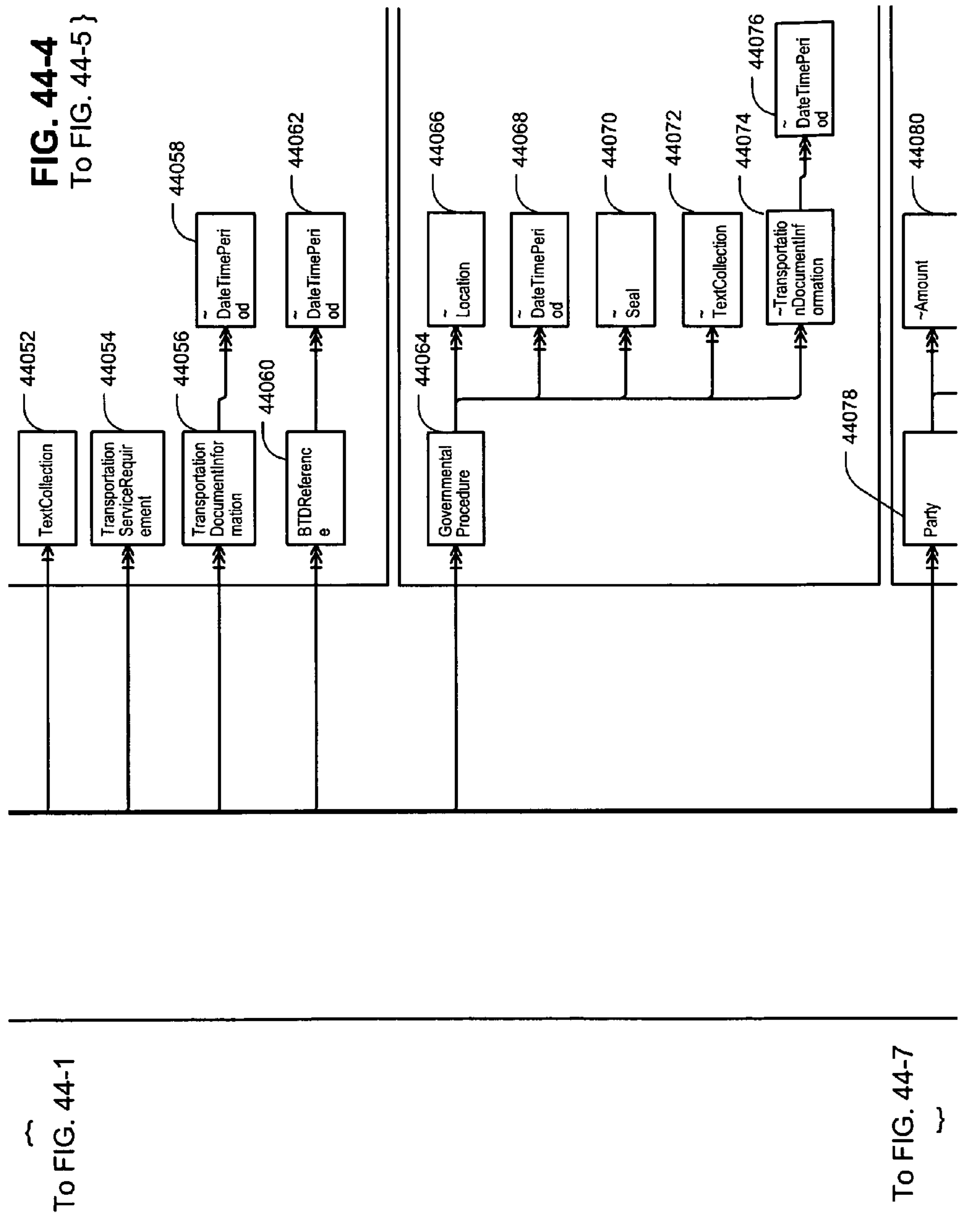
Figures 5, 44:
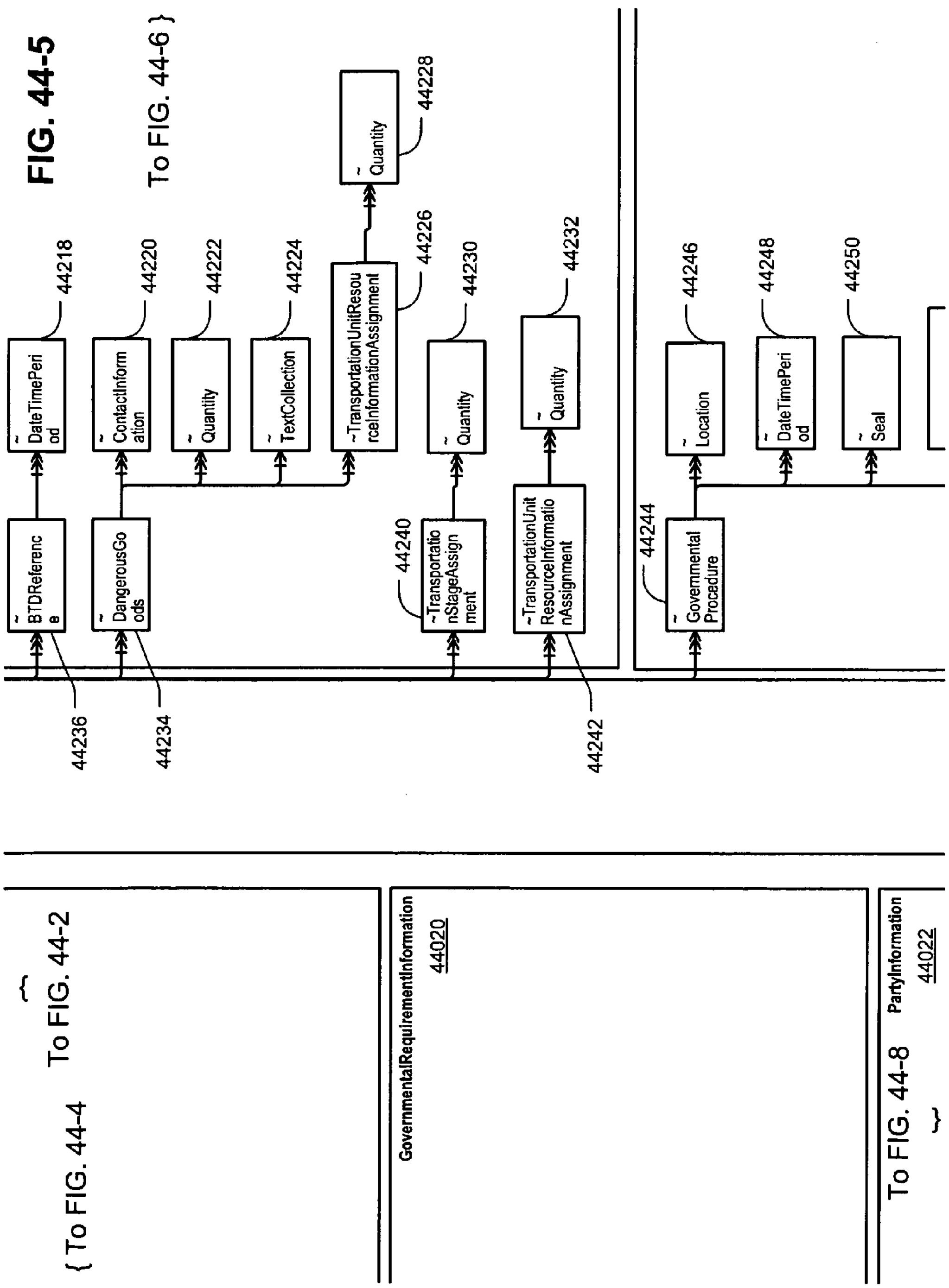
Figures 6, 44:
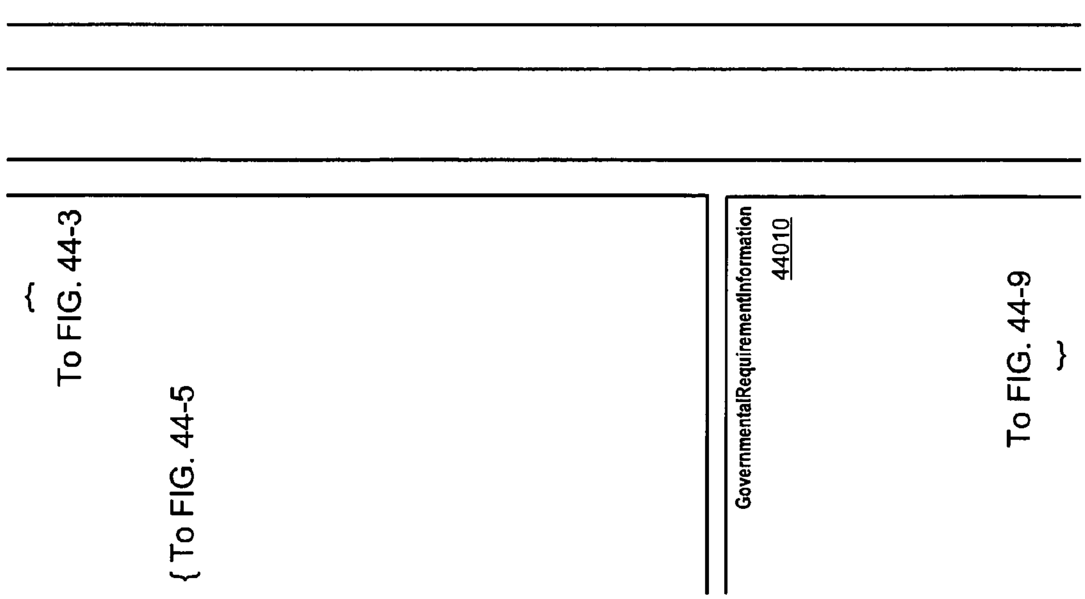
Figures 7, 44:
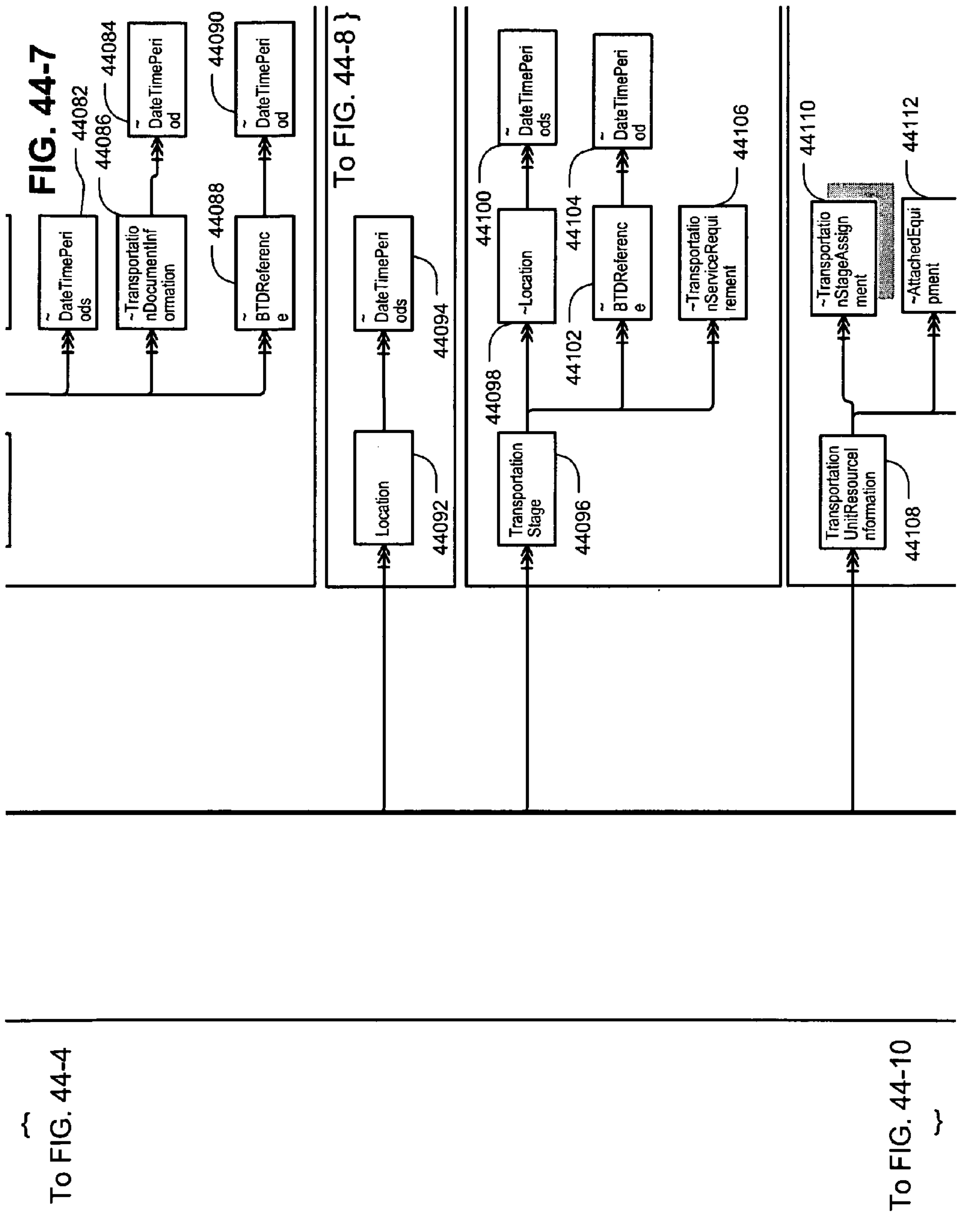
Figures 8, 44:
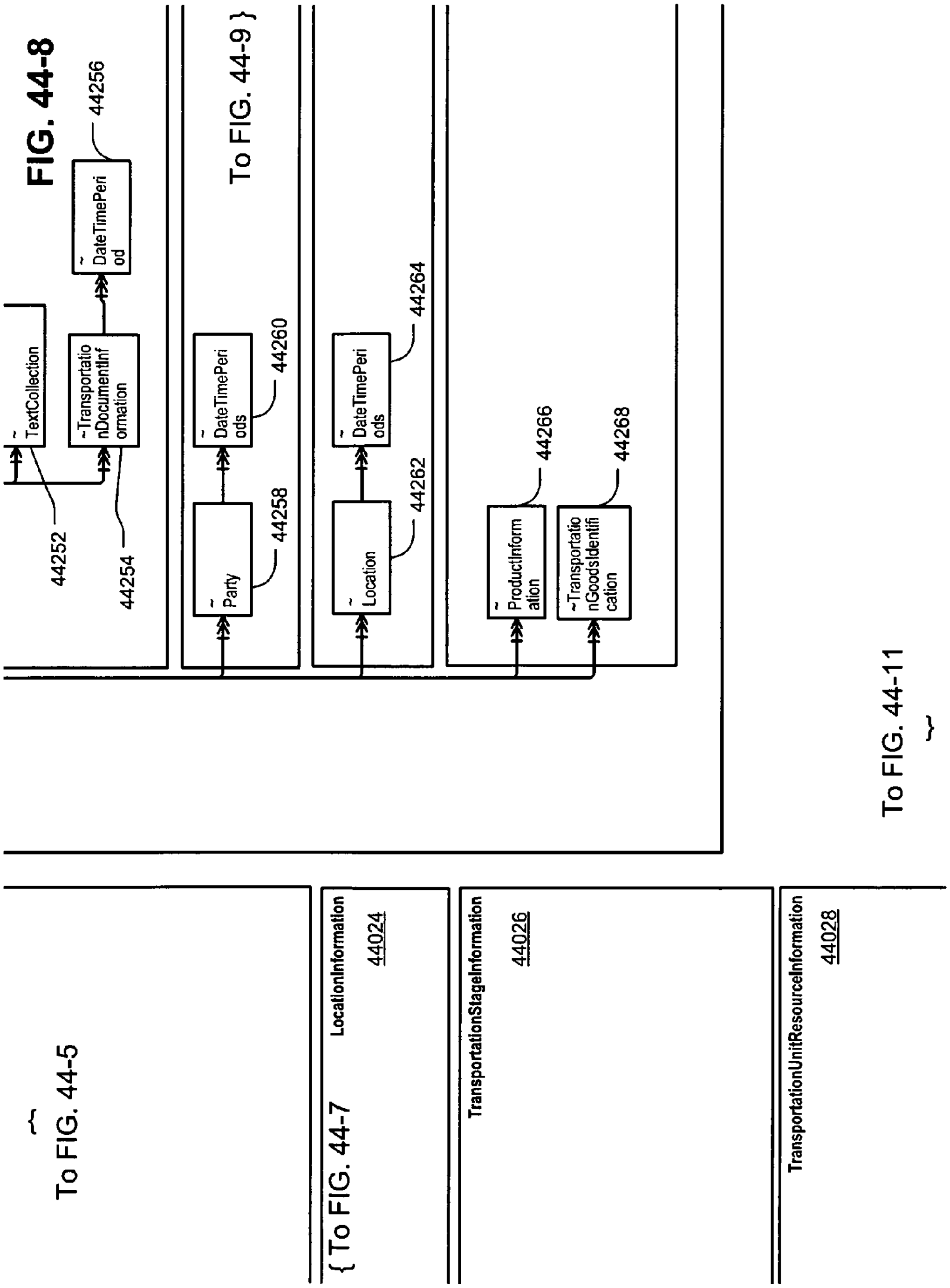
Figures 9, 44:
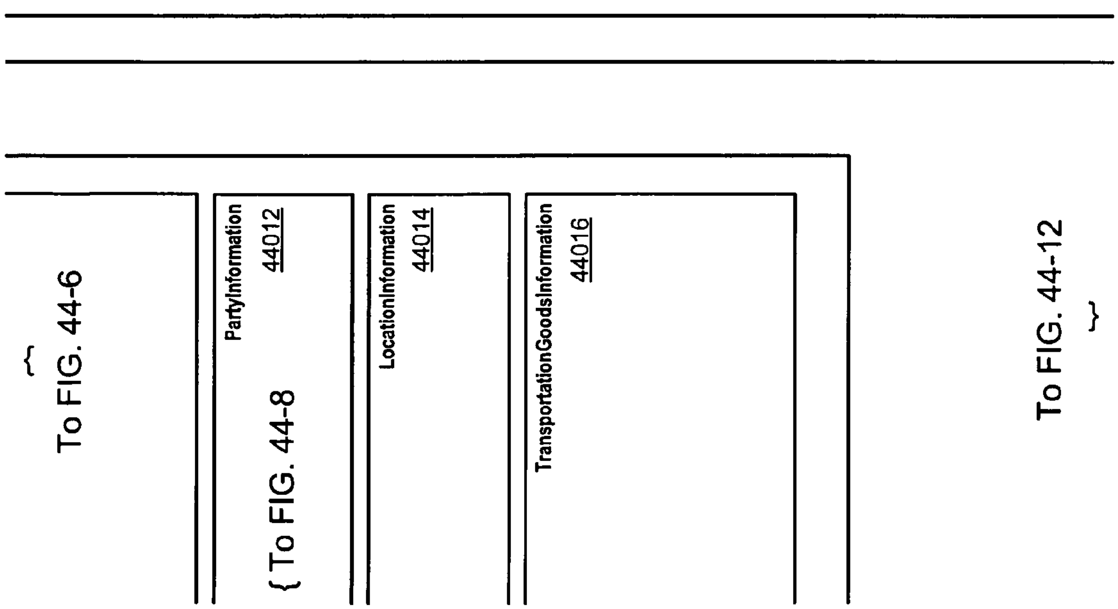
Figures 10, 44:
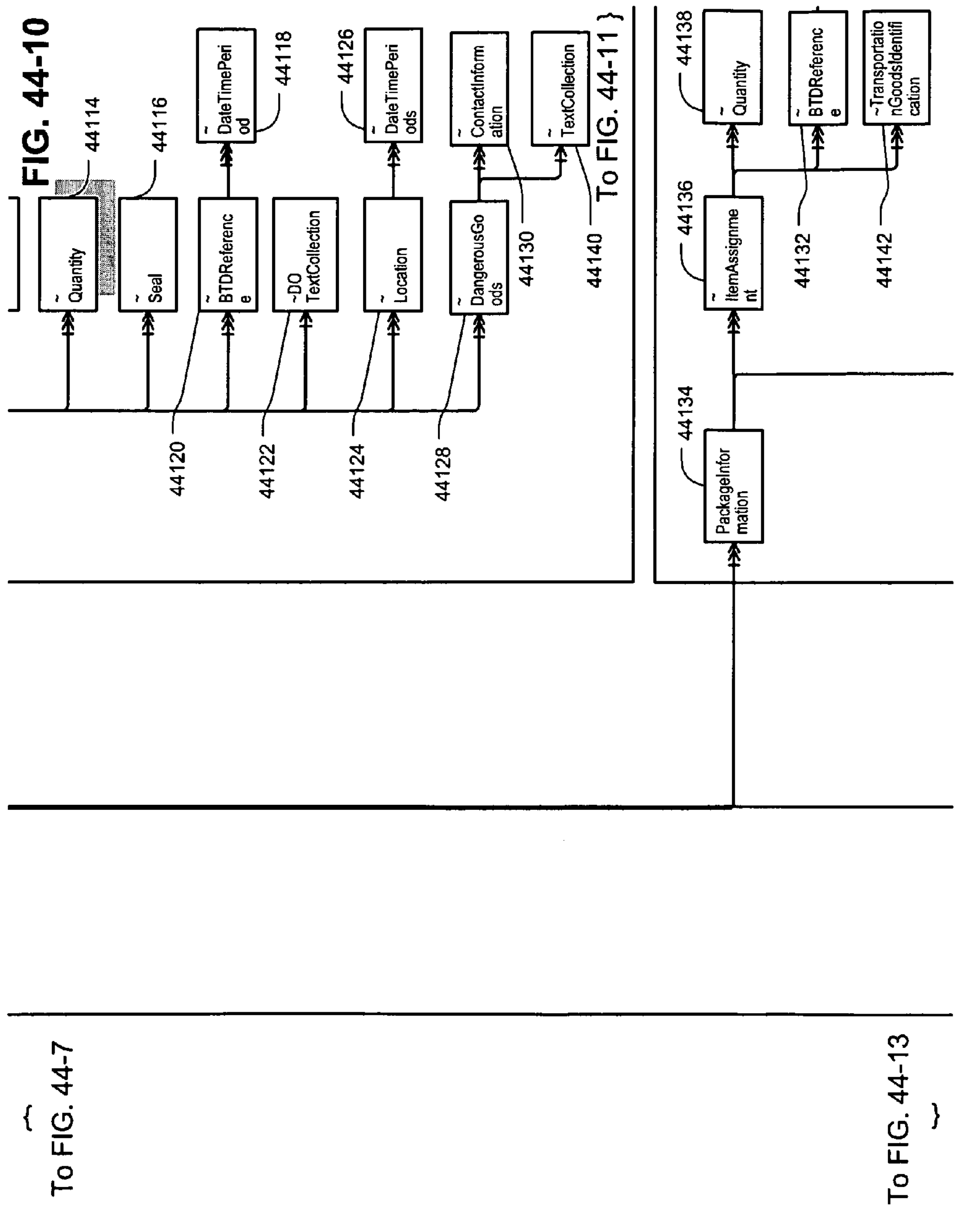
Figures 11, 44:
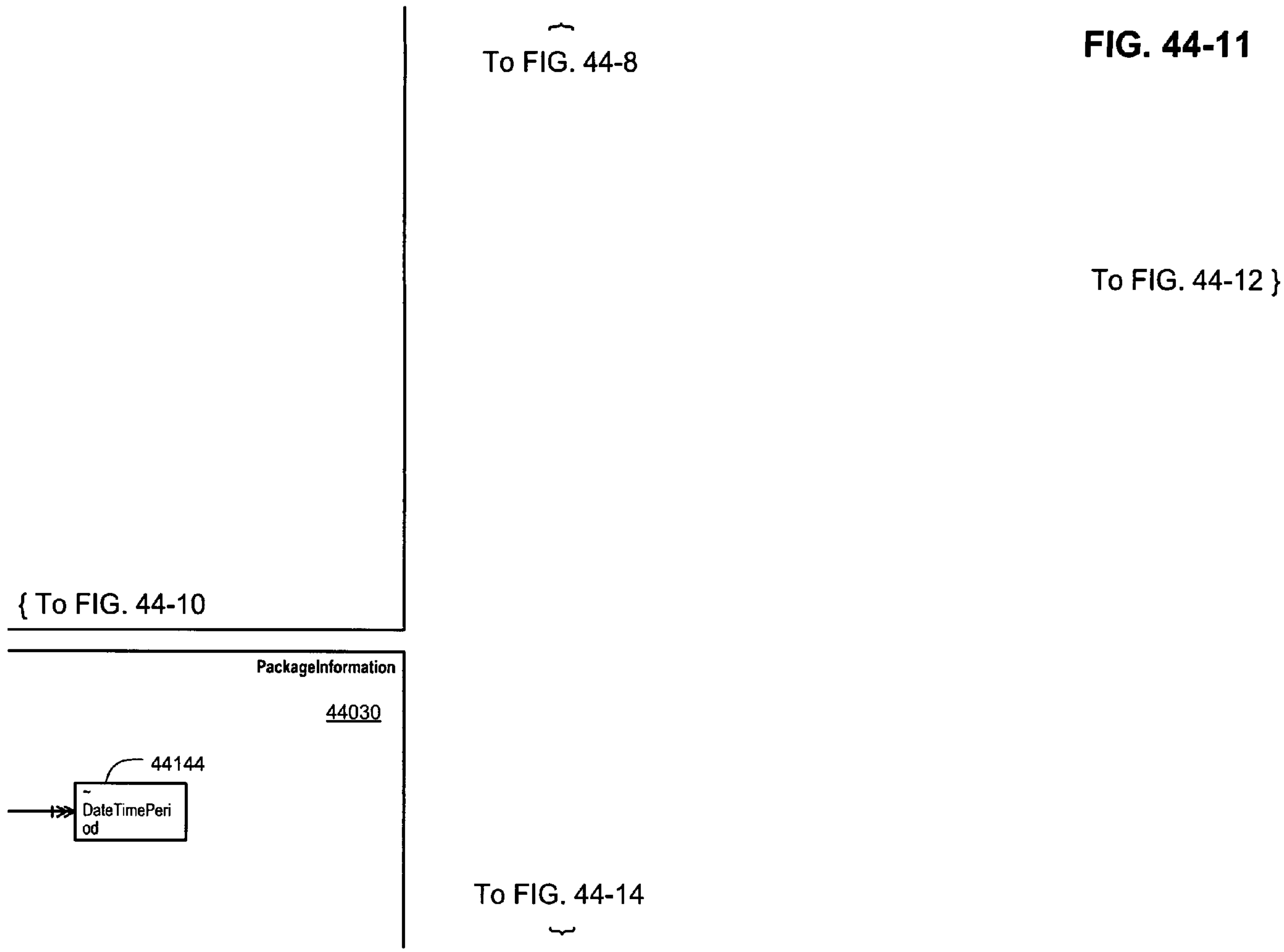
Figures 13, 44:
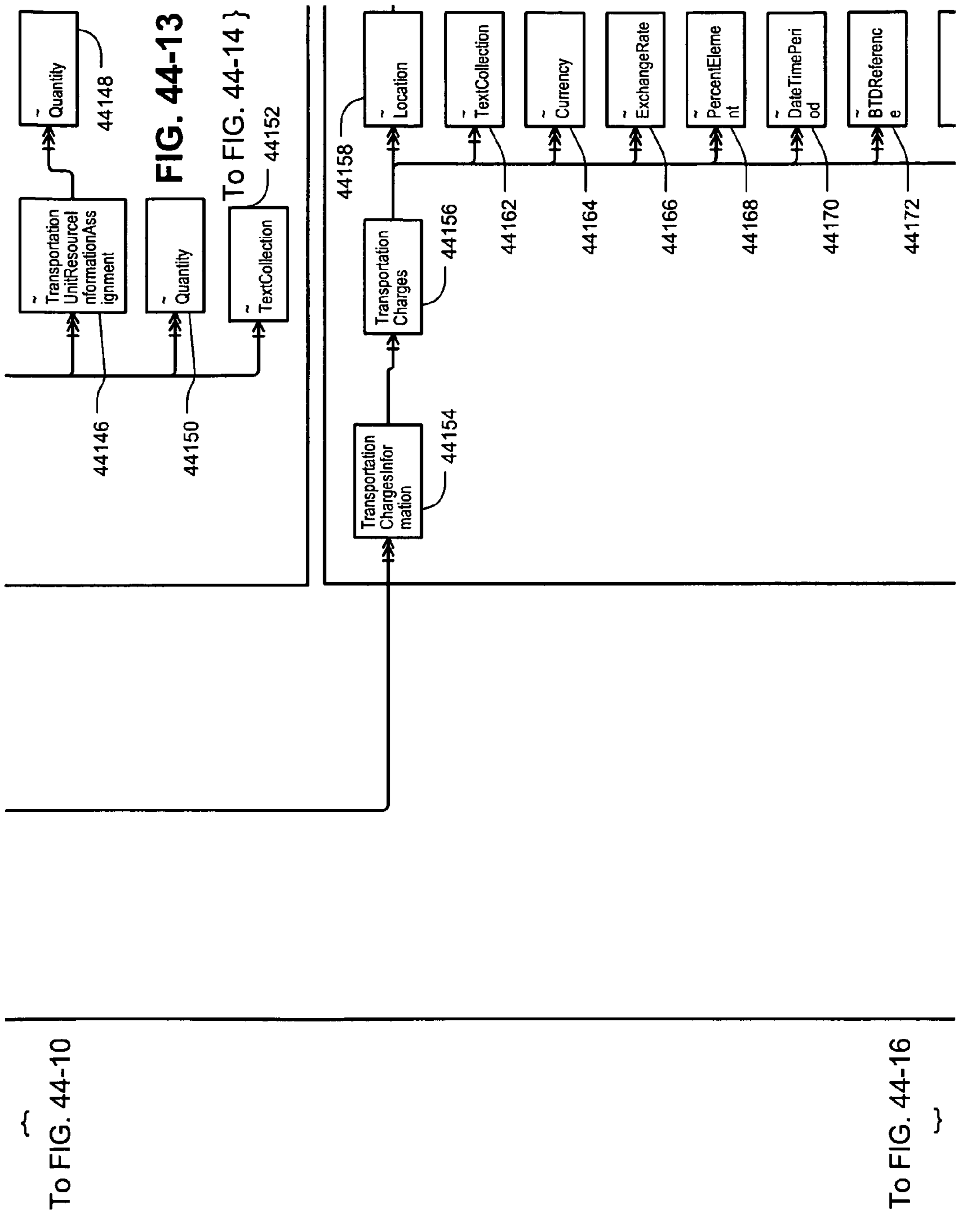
Figures 14, 44:
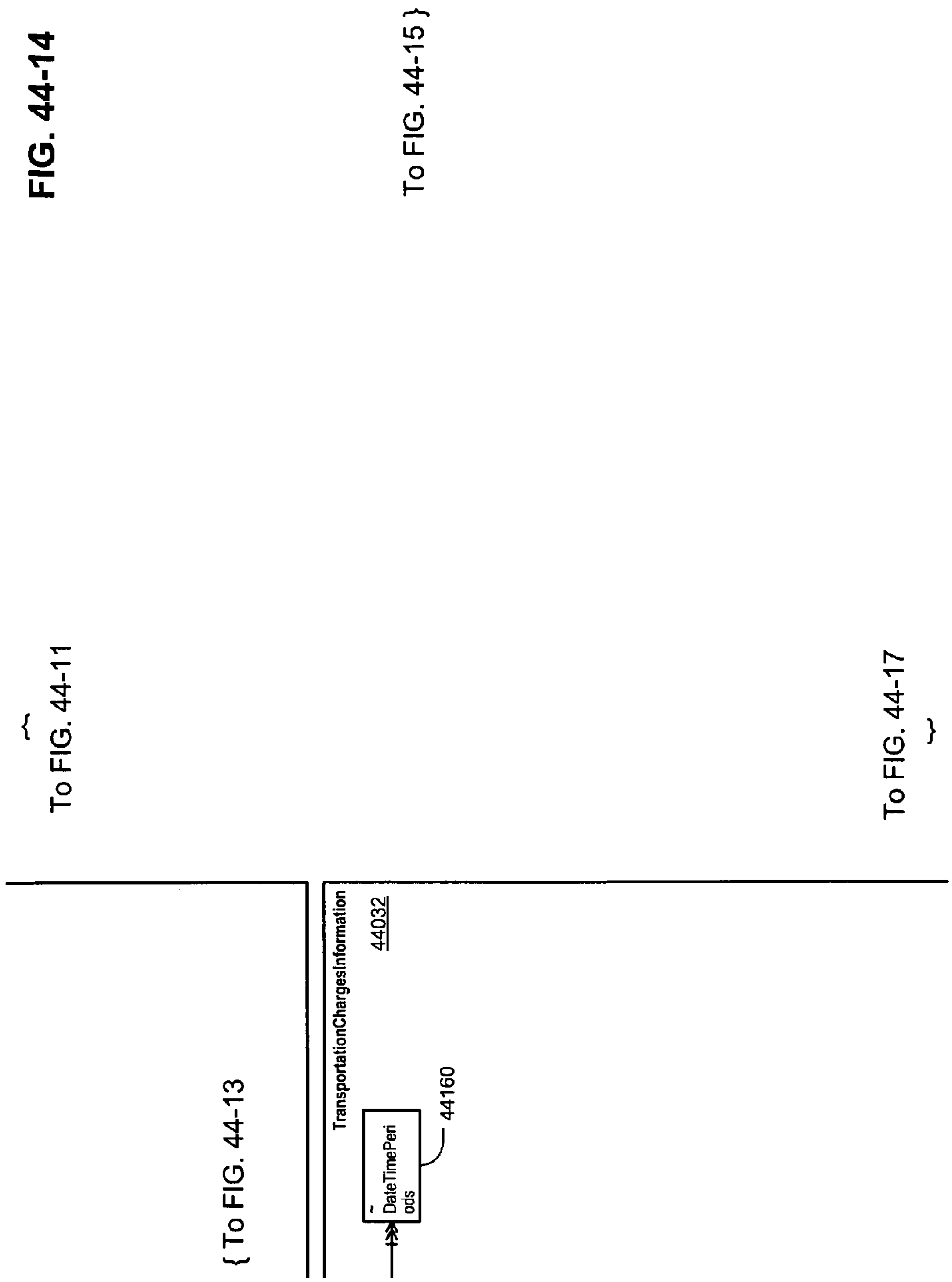
Figures 16, 44:
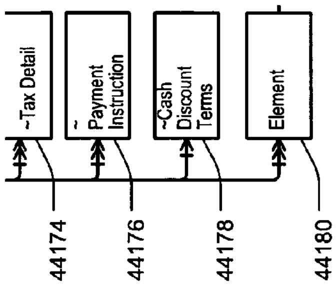
Figures 17, 44:
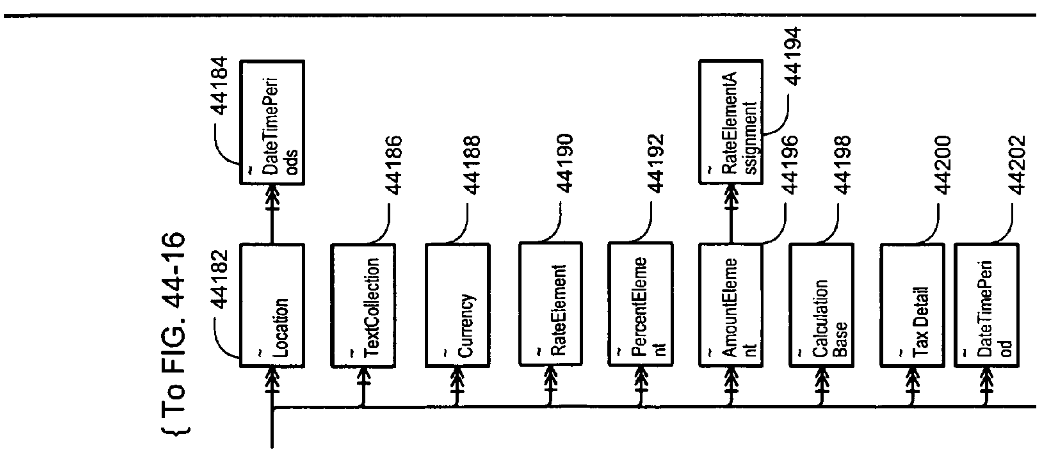
Figures 19, 44:
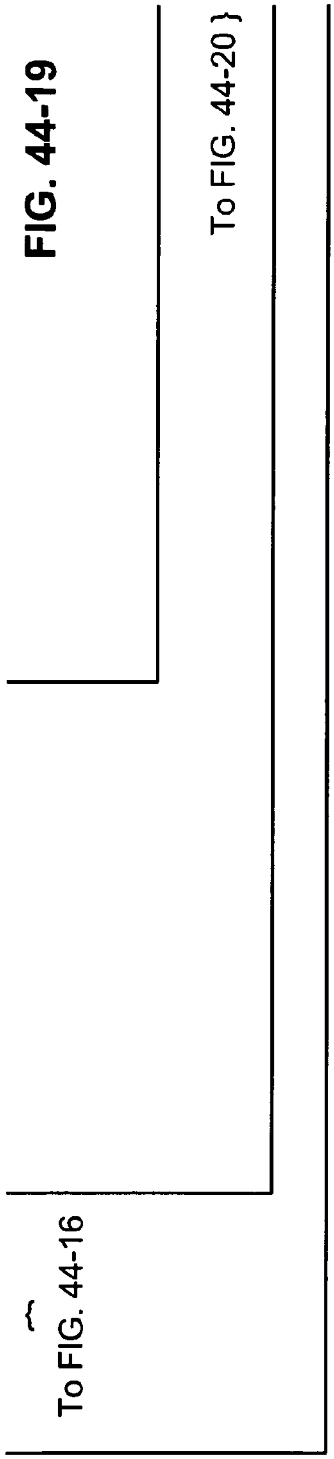
Figures 20, 44:
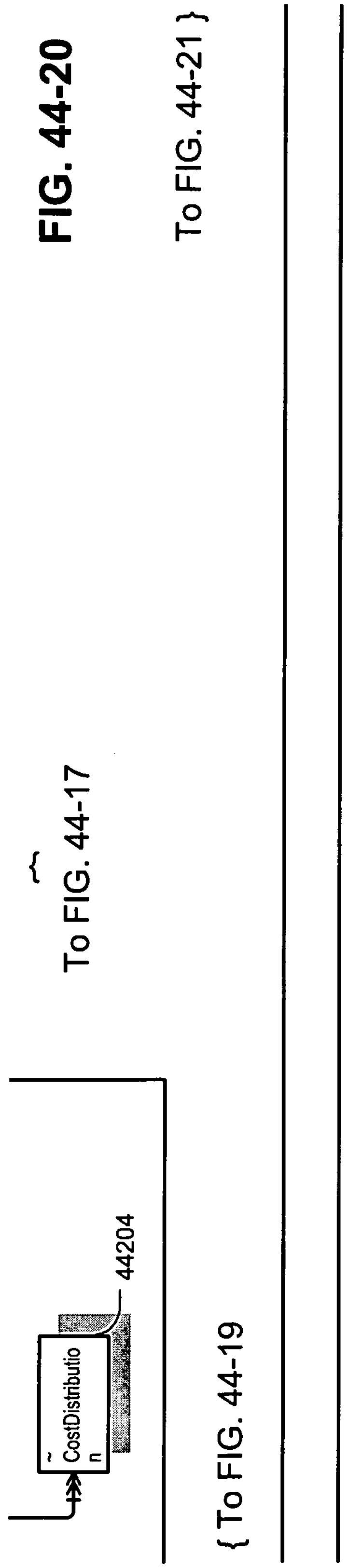
Figures 21, 44:
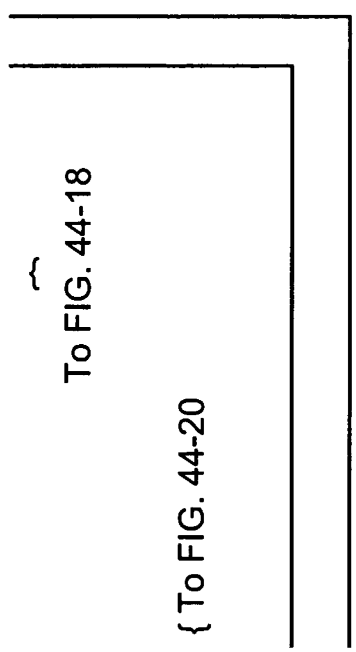

FIGS. 44-1 through 44-21 illustrate one example logical configuration of WaybillNotificationMessage message 44000. Specifically, this figure depicts the arrangement and hierarchy of various components such as one or more levels of packages, entities, and datatypes, shown here as 44002 through 44268. As described above, packages may be used to represent hierarchy levels. Entities are discrete business elements that are used during a business transaction. Data types are used to type object entities and interfaces with a structure. For example, WaybillNotificationMessage message 44000 includes, among other things, HouseShipment entity 44042. Accordingly, heterogeneous applications may communicate using this consistent message configured as such.

FIGS. 45-1 through 45-70 illustrate one example logical configuration of WaybillNotificationMessage 450000 element structure. Specifically, this figure depicts the arrangement and hierarchy of various components such as one or more levels of packages, entities, and datatypes, shown here as 450000 through 452952. As described above, packages may be used to represent hierarchy levels. Entities are discrete business elements that are used during a business transaction. Data types are used to type object entities and interfaces with a structure. For example, WaybillNotificationMessage 450000 includes, among other things, a HouseShipment 450014. Accordingly, heterogeneous applications may communicate using this consistent message configured as such.

Message Data Type WaybillNotificationMessage

The message data type WaybillNotificationMessage includes the business information that is relevant for sending a business document in a message and the WaybillNotification included in the business document. It includes the following packages: MessageHeader and WaybillNotification. The message data type WaybillNotificationMessage can provide the structure for the message type WaybillNotificationMessage and the interfaces that are based on it.

The WaybillNotification package groups the HouseShipment with its packages. It can include the HouseShipment entity. It includes the following packages: HeaderInformation, TransportationChargesInformation, GovemmentalRequirementInformation, PartyInformation, LocationInformation, TransportationStageInformation, TransportationUnitResourceInformation, PackagingInformation, and Item.

HouseShipment can be a logistic contractual document that can be sent from a transportation service provider to an ordering party. It includes information about goods which can be transported together across the entire transportation chain on one or multiple means of transport from a single ship-from party to a single ship-to party and in accordance with the agreed terms and conditions. It includes the following elements: @actioncode, ID, and DeliveryTerms. @actioncode can be a coded representation of an instruction to a message recipient telling it how it can process the transmitted element. @actioncode can be based on GDT: ActionCode. In some implementations, ID can be a unique identifier for a HouseShipment and can be based on GDT: BusinessTransactionDocumentID. DeliveryTerms can be based on GDT: DeliveryTerms.

The Item package can specify products included in the house shipment and additional information about the product. In some implementations, each house shipment item can be linked to exactly one item of a freight unit.

ShipmentRequest Interfaces

The ShipmentRequest interfaces can be part of the Shipper and Transportation Service Provision scenarios. In some implementations, ShipmentRequest interfaces are used to exchange agreements and corresponding confirmations and receipt notifications on the transportation of goods from a single ship-from party to a single ship-to party between an ordering party and a transportation service provider.

An ordering party can request a receipt notification from a transportation service provider to assure that the transportation service provider has received a ShipmentRequest and that the ShipmentRequest did not include any errors. At a later time, the transportation service provider can send a confirmation to the ordering party to confirm the shipment request. The confirmation can be an acceptance of the ShipmentRequest with its transport and carriage conditions, a rejection if the transportation service provider cannot ensure the transport service, or conditionally accepted in case the transportation service provider generally accepts the request, but may send more information about the way the provider intends to fulfill the requested transportation service, i.e., the transport details, at a later time. The transportation service provider can request a receipt notification from the ordering party about the ShipmentRequestConfirmation.

A ShipmentRequestRequest can be an ordering party's request to a transportation service provider to provide a transportation service. It can be an update to a previously received ShipmentRequest. The structure of the ShipmentRequestRequest can be specified by the message data type ShipmentRequestRequestMessage.

A ShipmentRequestCancelRequest can be a cancellation of an ordering party's request to a transportation service provider to provide a transportation service. The structure of the ShipmentRequestCancelRequest can be specified by the message data type ShipmentRequestCancelRequestMessage.

A ShipmentRequestConfirmation can be a confirmation of a ShipmentRequest from a transportation service provider to an ordering party. Through the confirmation, a ShipmentRequest can be Accepted, Rejected, or Conditionally Accepted. The confirmation can include information on the transport and carriage conditions such as carrier, mode of transport, or stages. The confirmation can also be related to a part of the shipment request (in the case of a split scenario). The structure of the ShipmentRequestConfirmation can be specified by the message data type ShipmentRequestConfirmationMessage.

A ShipmentRequestReceiptNotification can be a message from a transportation service provider to an ordering party confirming the receipt of the message and reporting any administrative errors included in the previous ShipmentRequestRequest message. The structure of the ShipmentRequestReceiptNotification can be specified by the message data type ShipmentRequestRequestMessage.

A ShipmentRequestConfirmationReceiptNotification can be a message from a transportation service provider to an ordering party confirming the receipt of the message and/or reporting administrative errors included in the previous ShipmentRequestRequest message. The structure of the ShipmentRequestConfirmationReceiptNotification can be specified by the message data type ShipmentRequestRequestMessage.

The shipment request messages are implemented by ten message interfaces: five on the ordering party side and five on the transportation service provider side. The message interfaces on the Ordering Party side include the following: ShipmentRequestRequest_Out, ShipmentRequestCancelRequest_Out, ShipmentRequestConfirmation_In, ShipmentRequestReceiptNotification_In, and ShipmentRequestConfirmationReceiptNotification_Out. The message interfaces on the Transportation Service Provider side include the following: ShipmentRequestRequest_In, ShipmentRequestCancelRequest_In, ShipmentRequestConfirmation_Out, ShipmentRequestReceiptNotification_Out, and ShipmentRequestConfirmationReceiptNotification_In.

Figure 46:
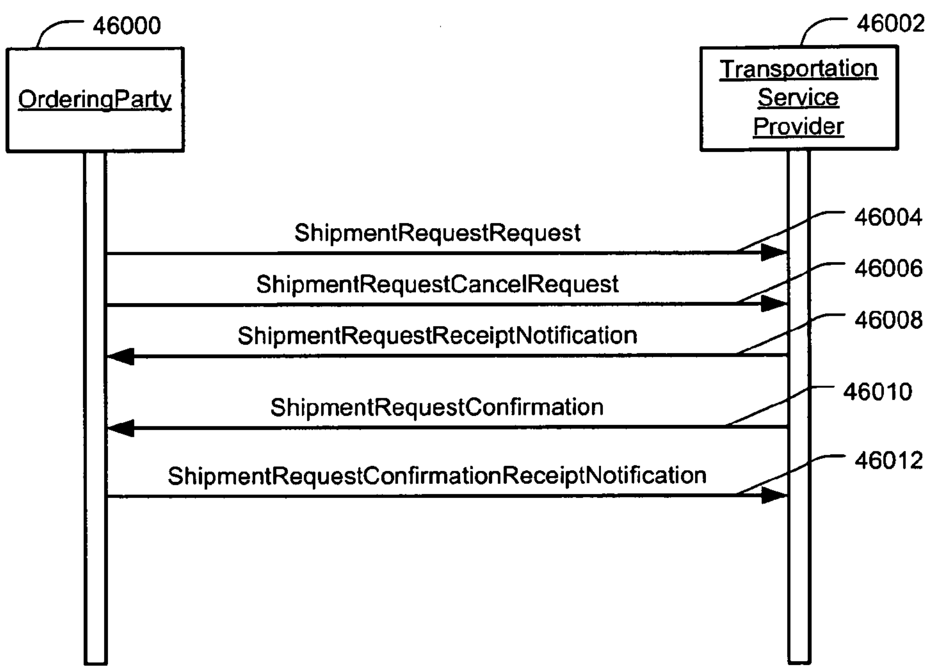

The message choreography of FIG. 46 describes a possible logical sequence of messages that can be used to realize a Shipment Request business scenario.

An "Ordering Party" system 46000 can request a shipment request, or update a previous request, using a ShipmentRequestRequest message 46004, as shown, for example, in FIG. 46. A "Transportation Service Provider" system 46002 can confirm the request, and report any administrative errors, using a ShipmentRequestReceiptNotification message 46008 as shown, for example, in FIG. 46.

The "Ordering Party" system 46000 can request the cancellation of a shipment request using a ShipmentRequestCancelRequest message 46006 as shown, for example, in FIG. 46. The "Transportation Service Provider" system 46002 can confirm the request, and report any administrative errors, using a ShipmentRequestReceiptNotification message 46008 as shown, for example, in FIG. 46.

The "Transportation Service Provider" system 46002 can confirm the shipment request using a ShipmentRequestConfirmation message 46010 as shown, for example, in FIG. 46. The "Ordering Party" system 46000 can confirm the receipt of the ShipmentRequestConfirmation message 46010, and report any administrative errors, using a ShipmentRequestConfirmationReceiptNotification message 46012 as shown, for example, in FIG. 46.

Figures 1, 47:
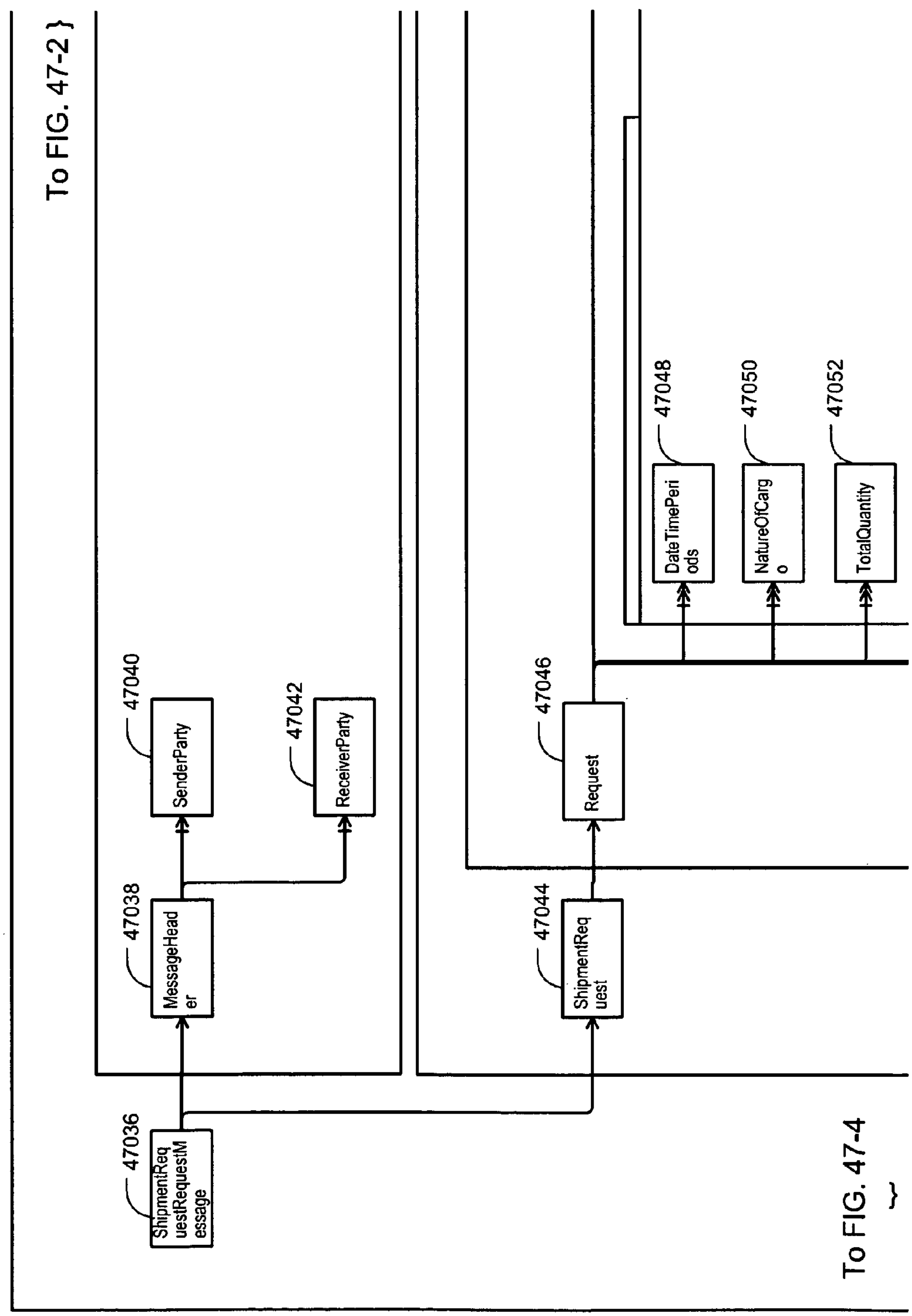
Figures 2, 47:
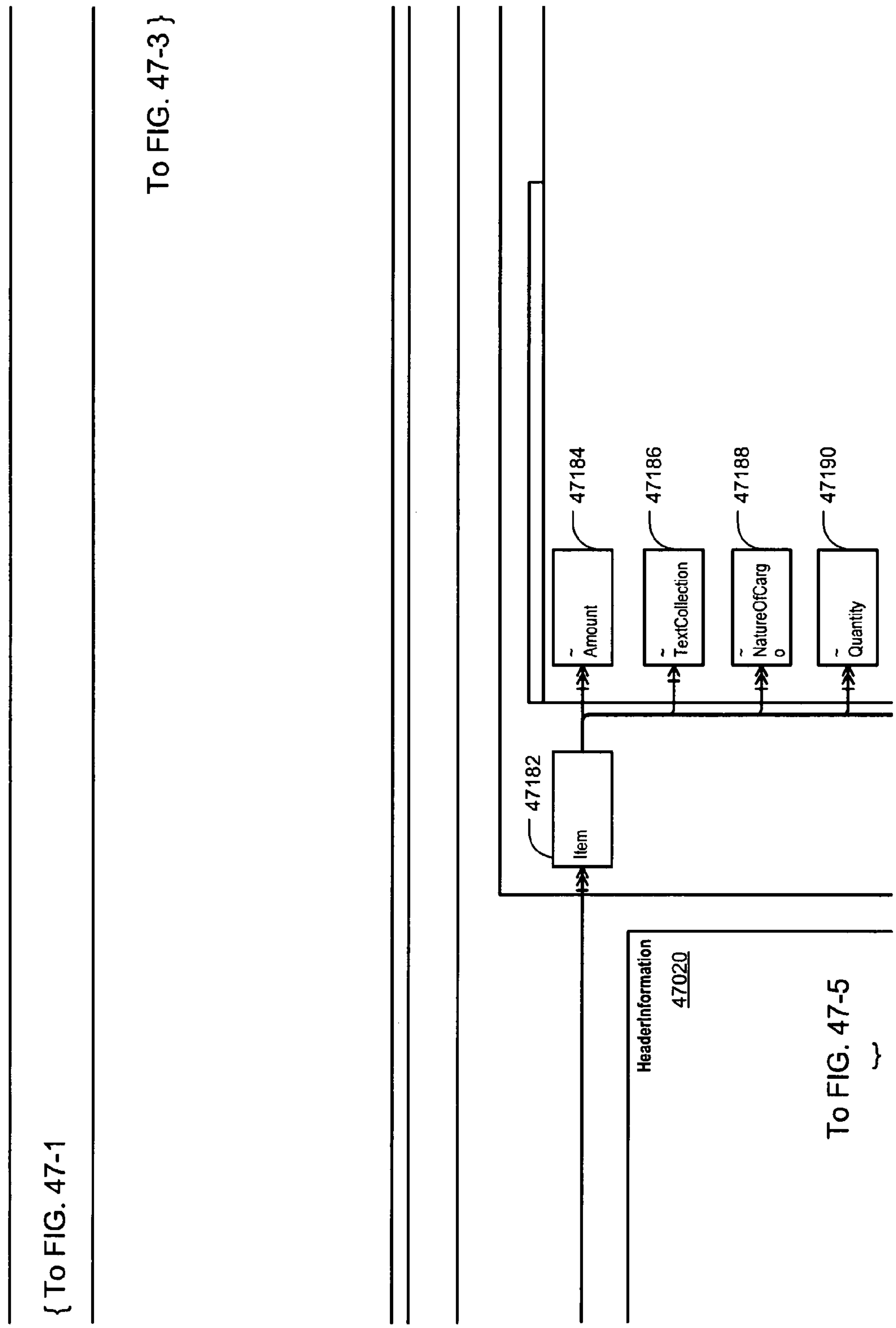
Figures 3, 47:
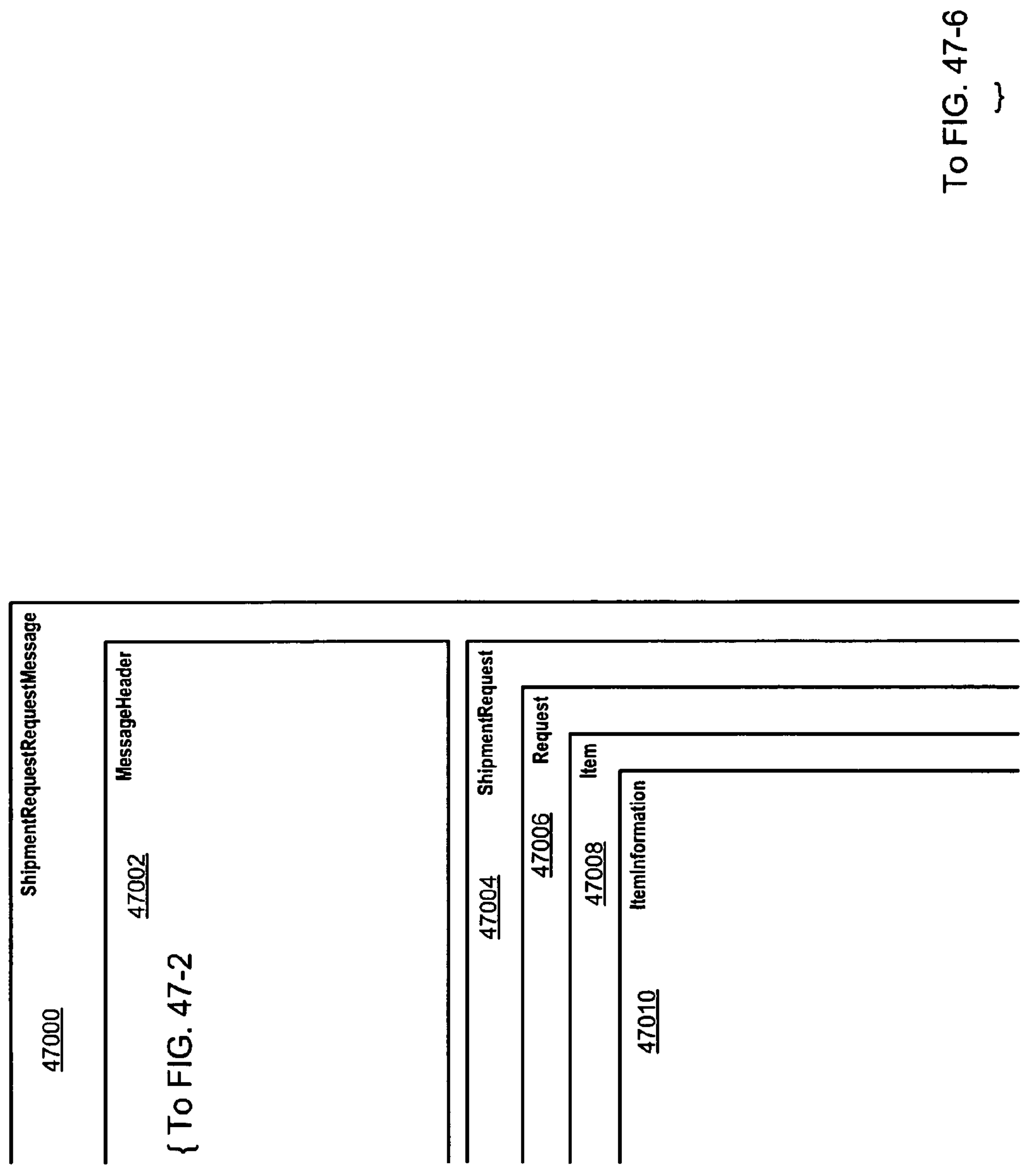
Figures 4, 47:
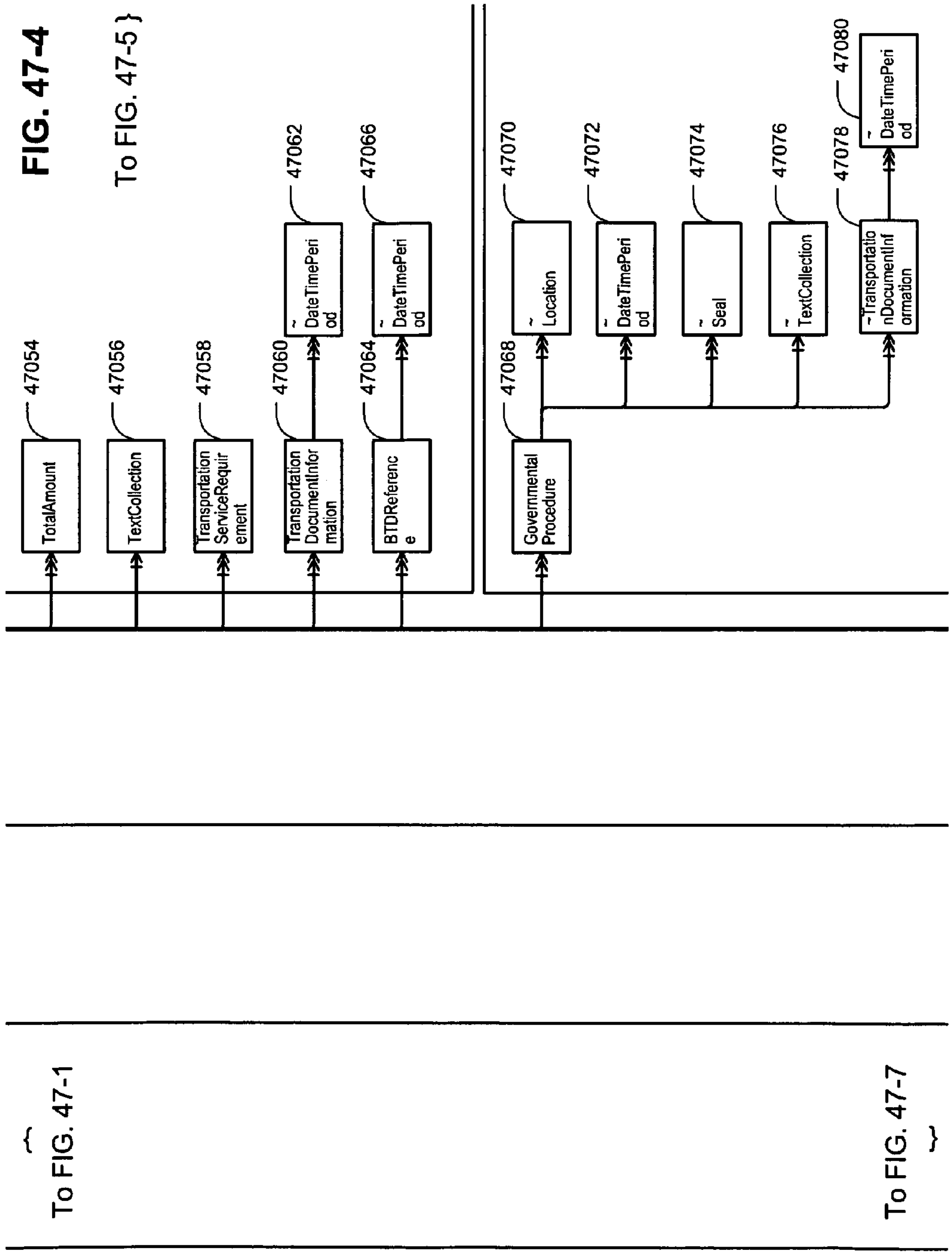
Figures 5, 47:
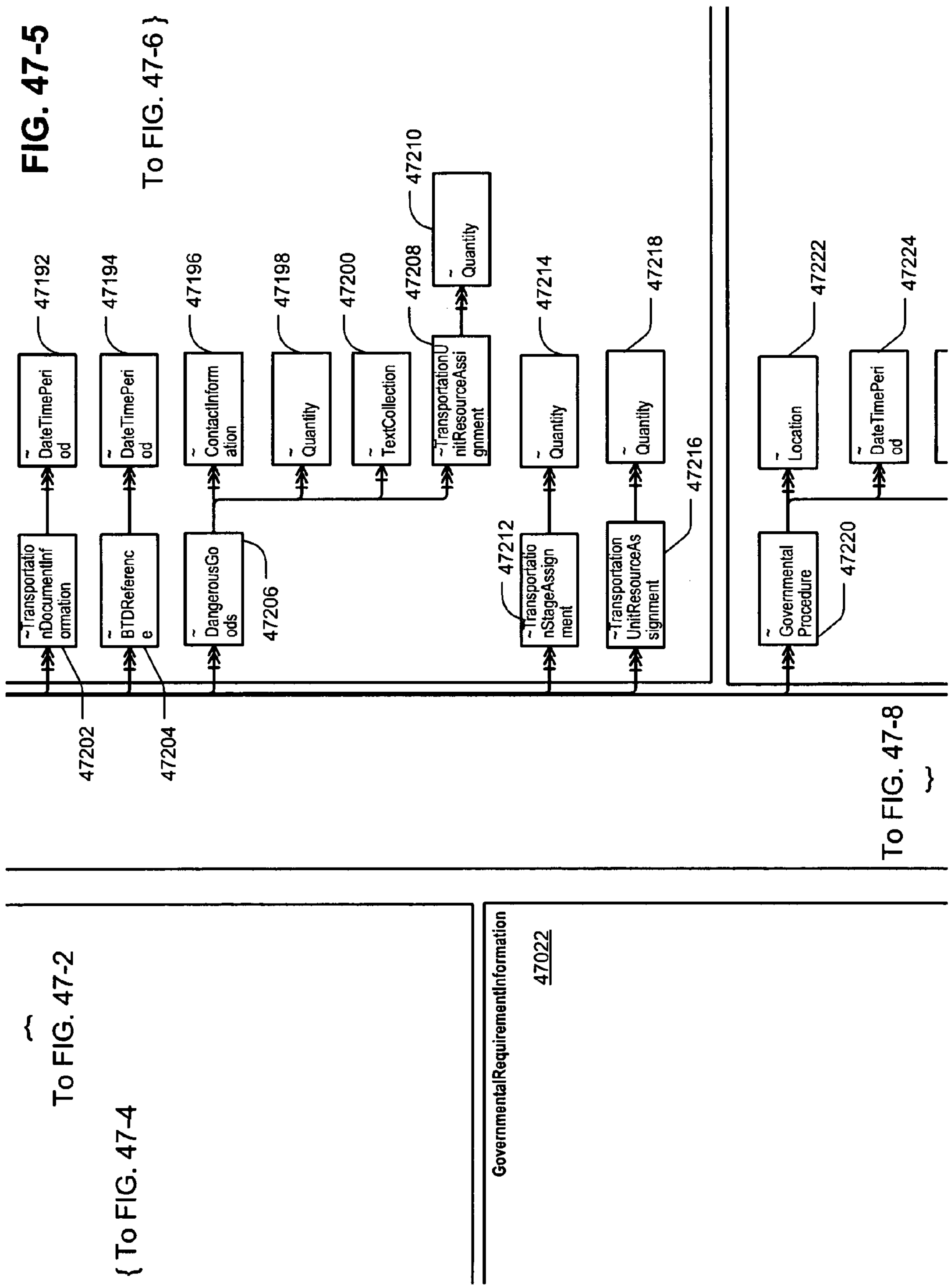
Figures 6, 47:
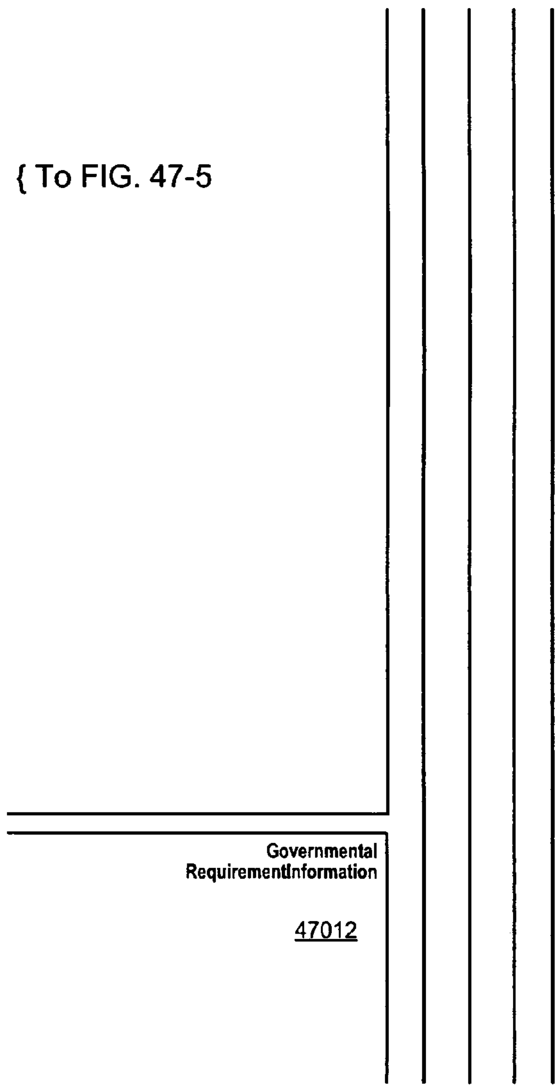
Figures 7, 47:
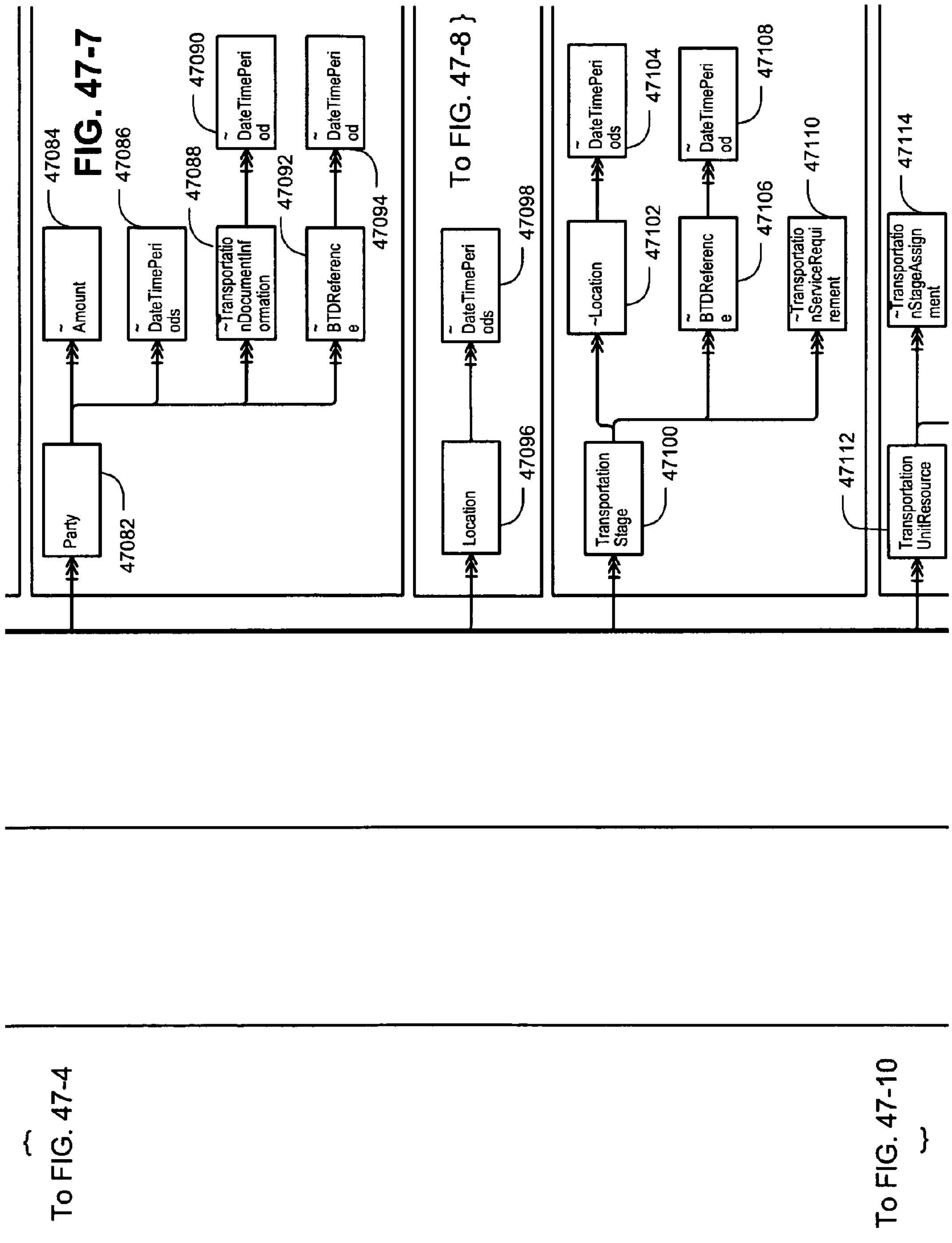
Figures 8, 47:
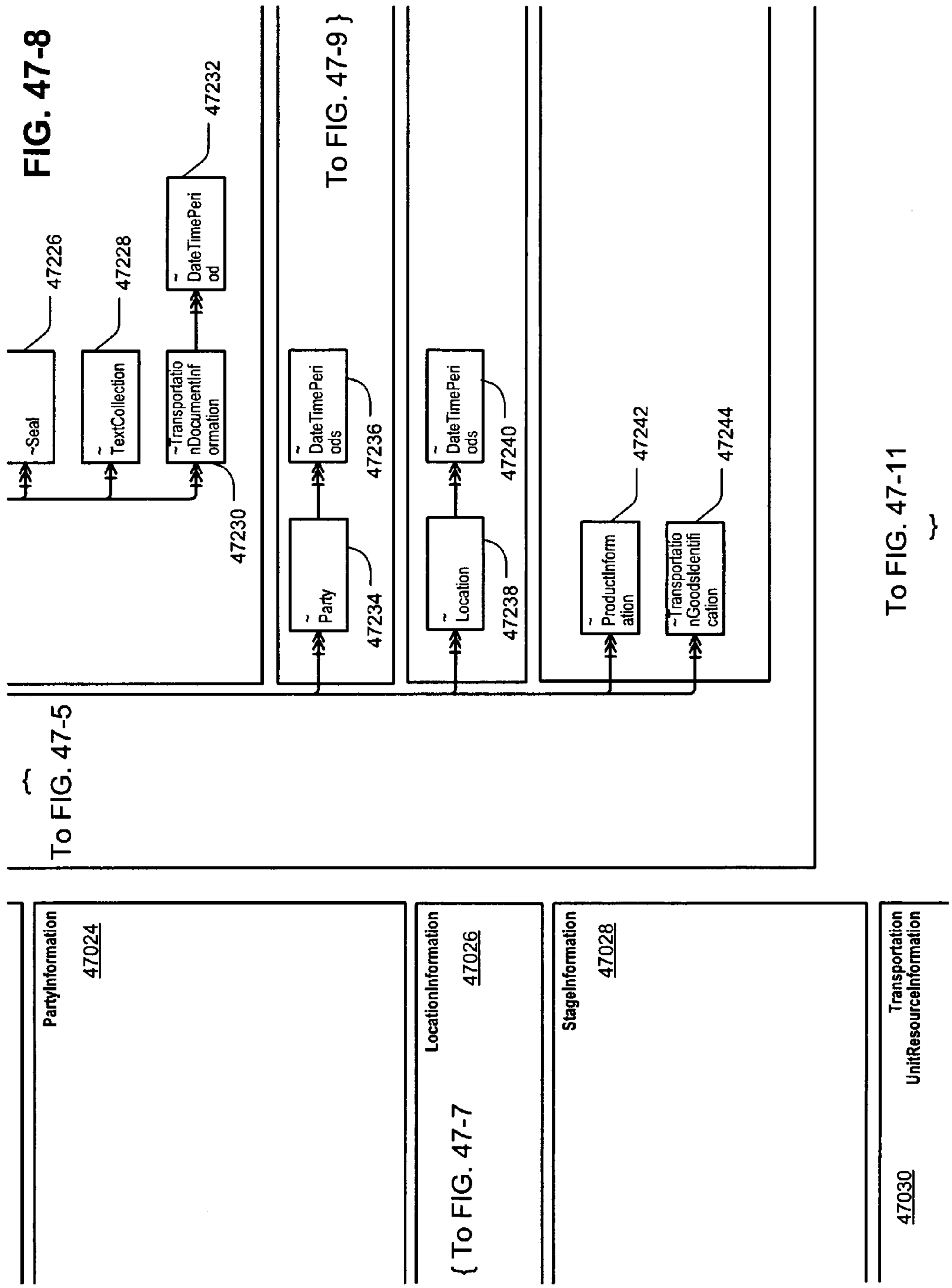
Figures 9, 47:
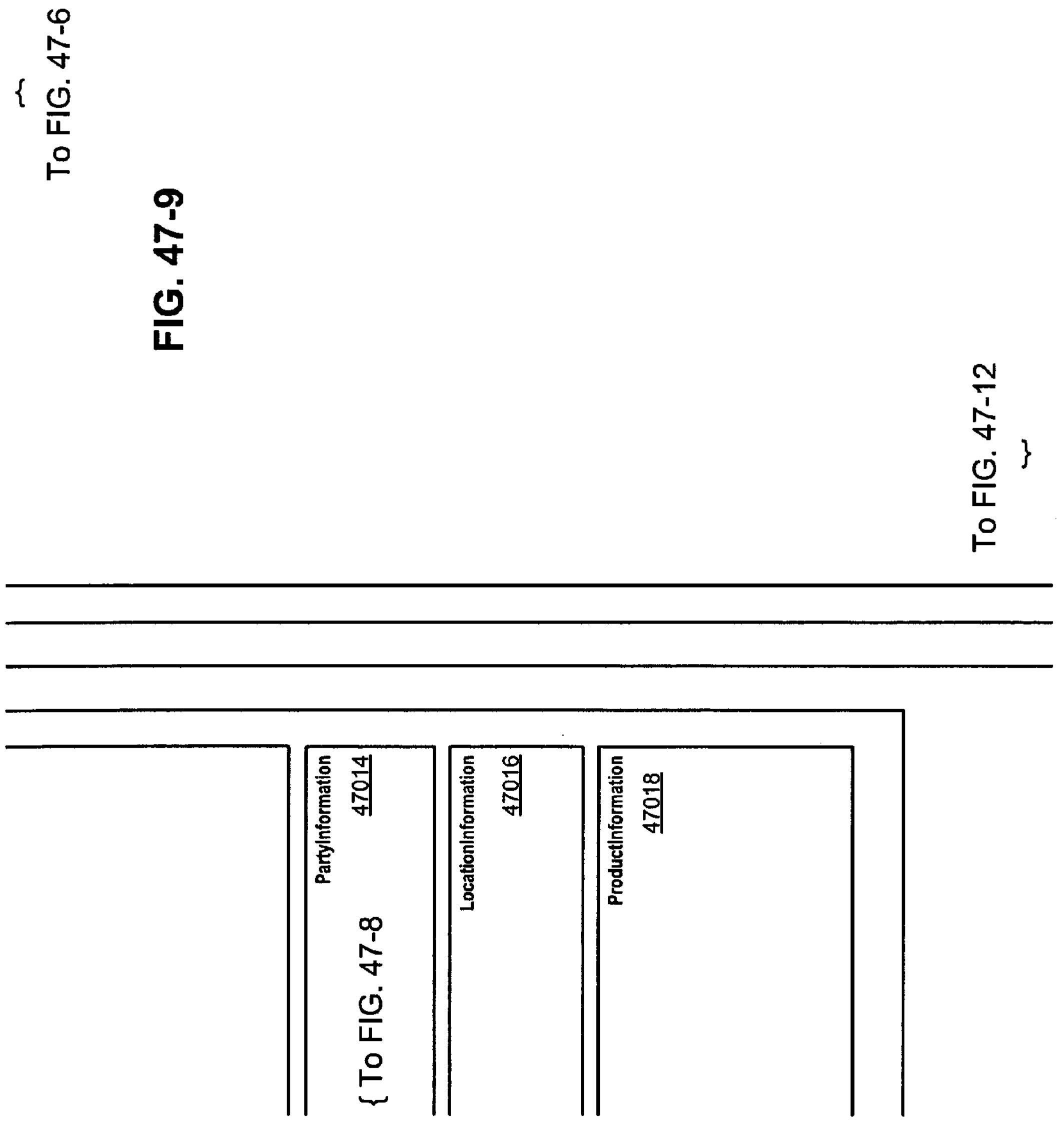
Figures 10, 47:
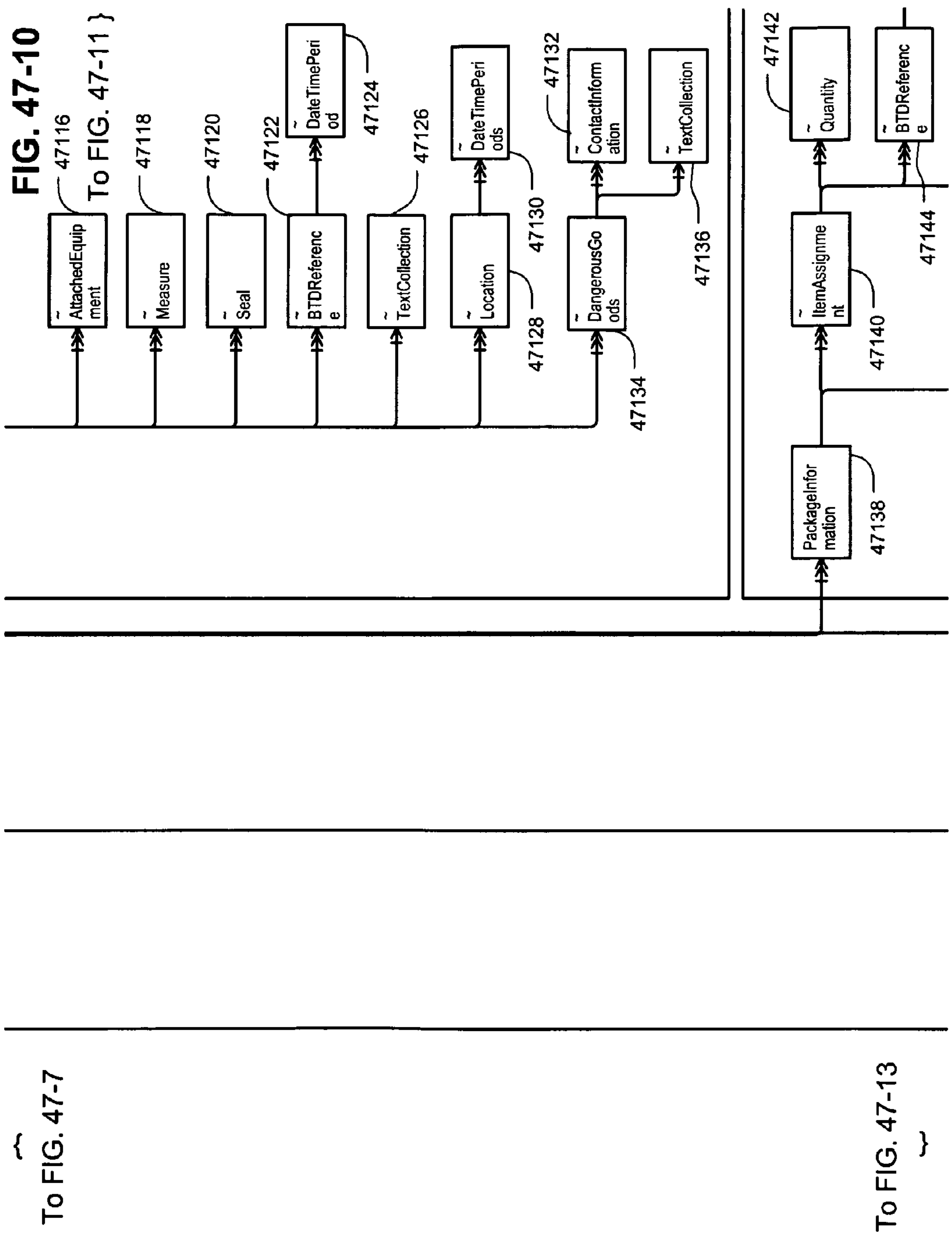
Figures 11, 47:
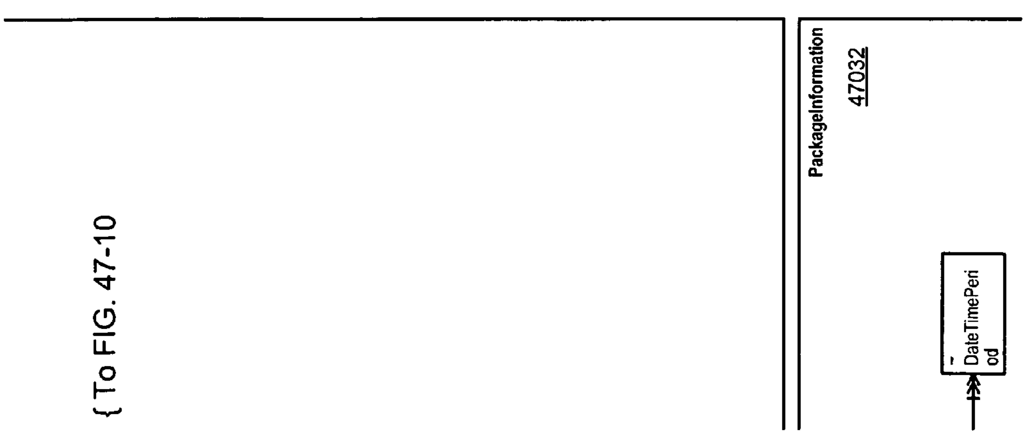
Figures 13, 47:
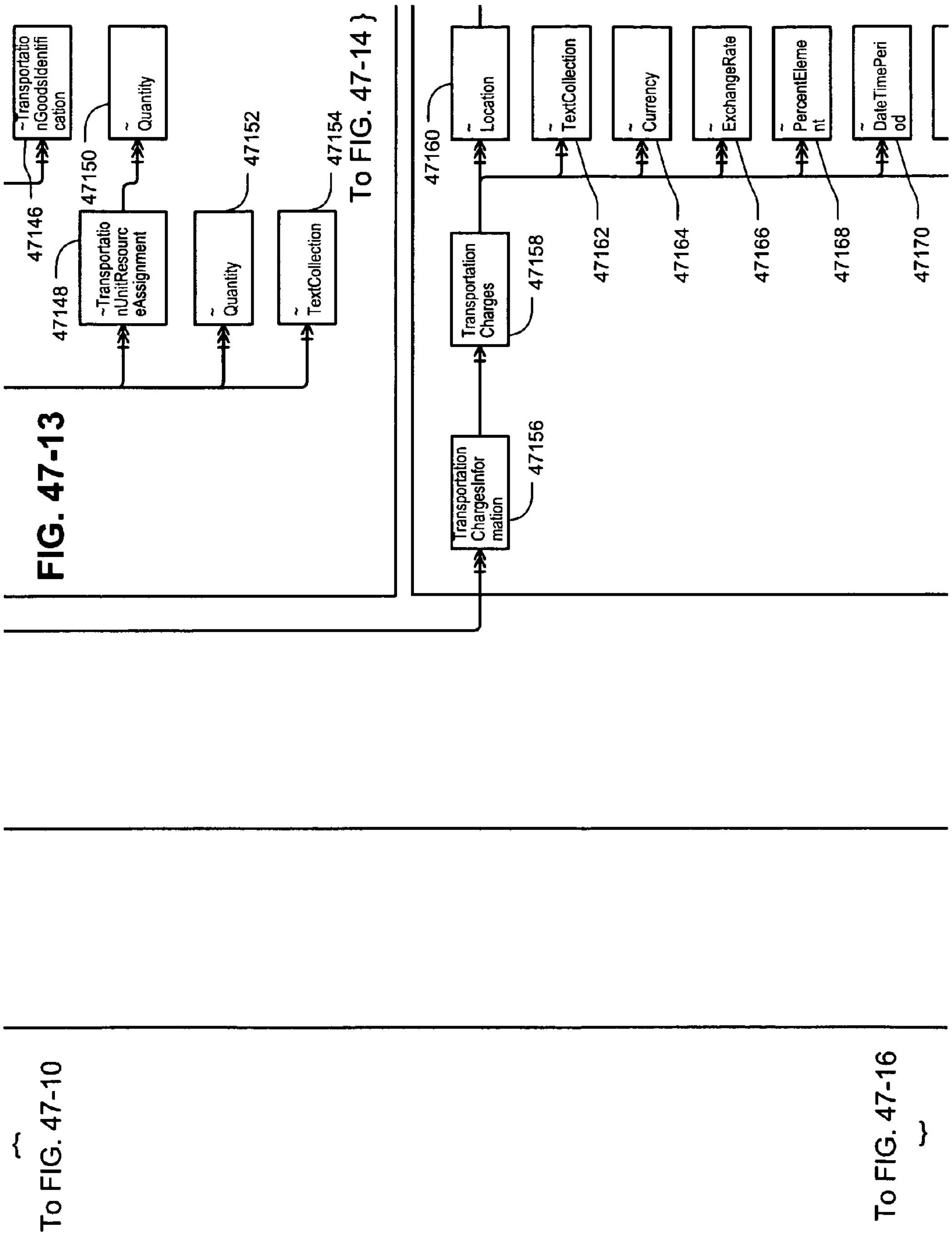
Figures 14, 47:
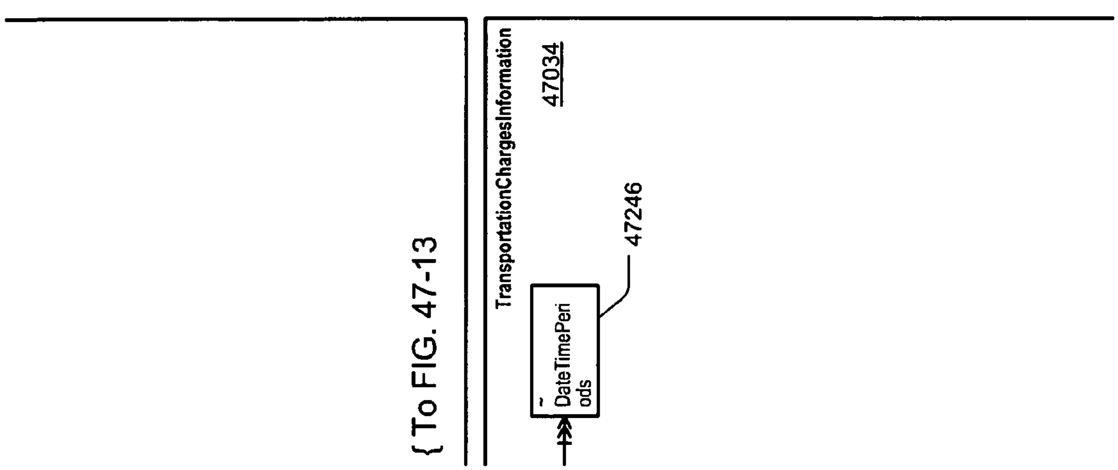
Figures 16, 47:
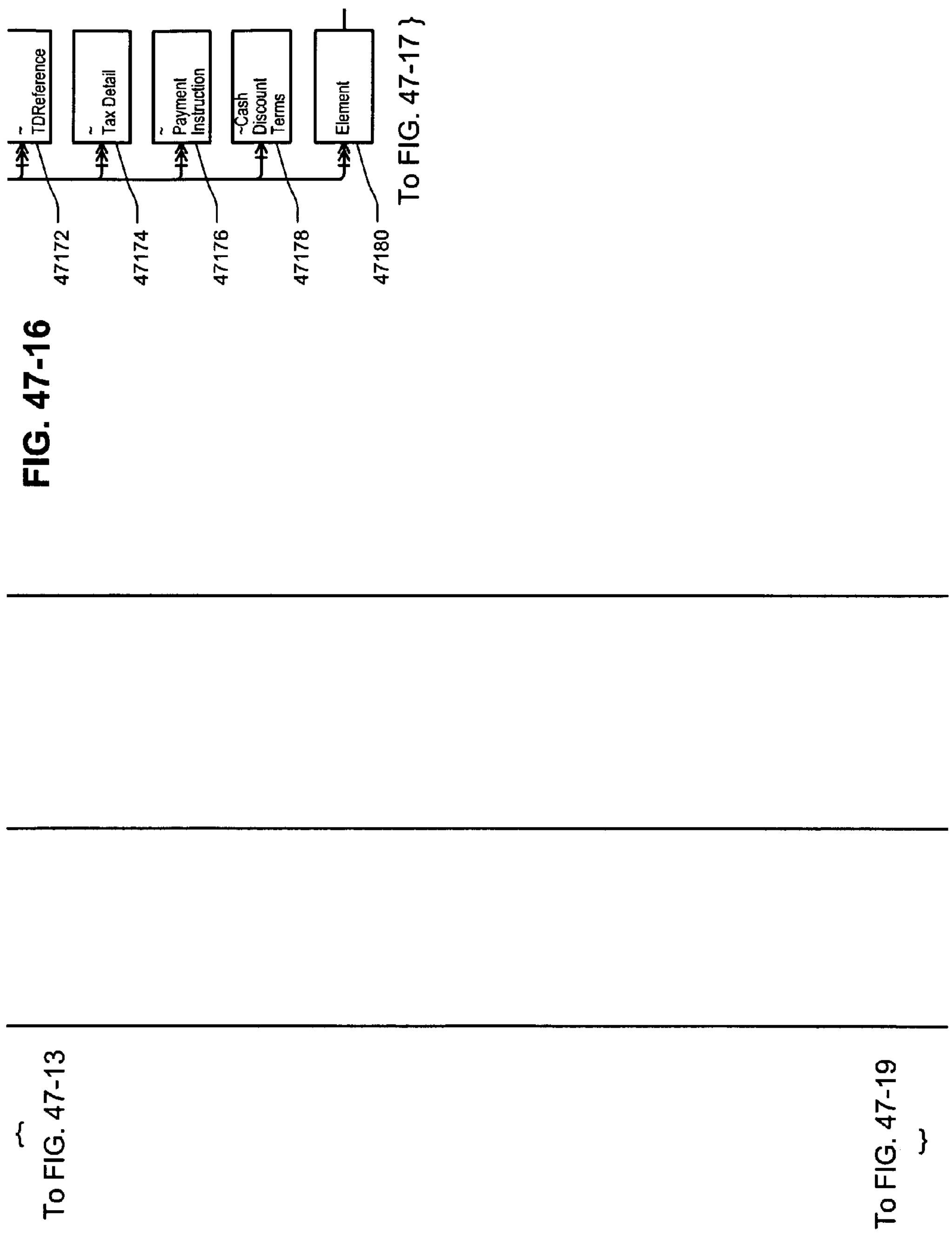
Figures 17, 47:
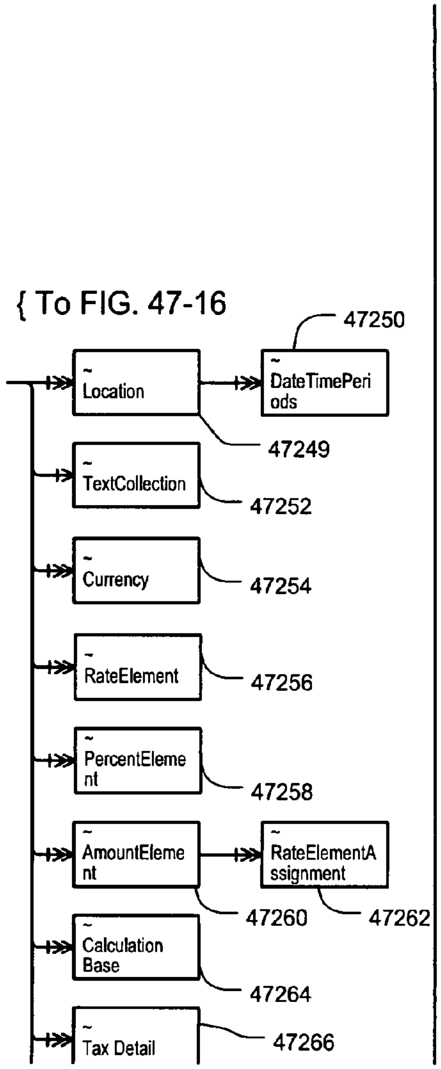
Figures 19, 47:
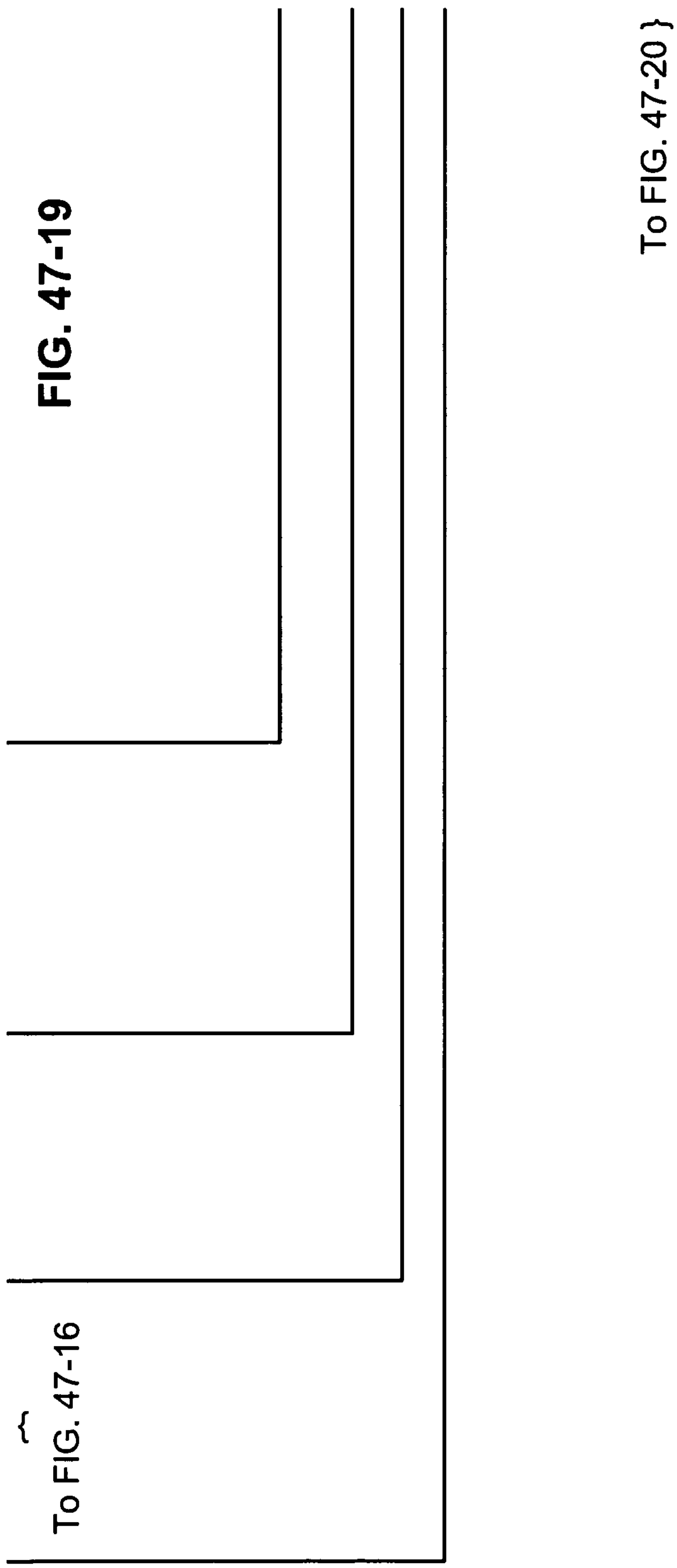
Figures 20, 47:
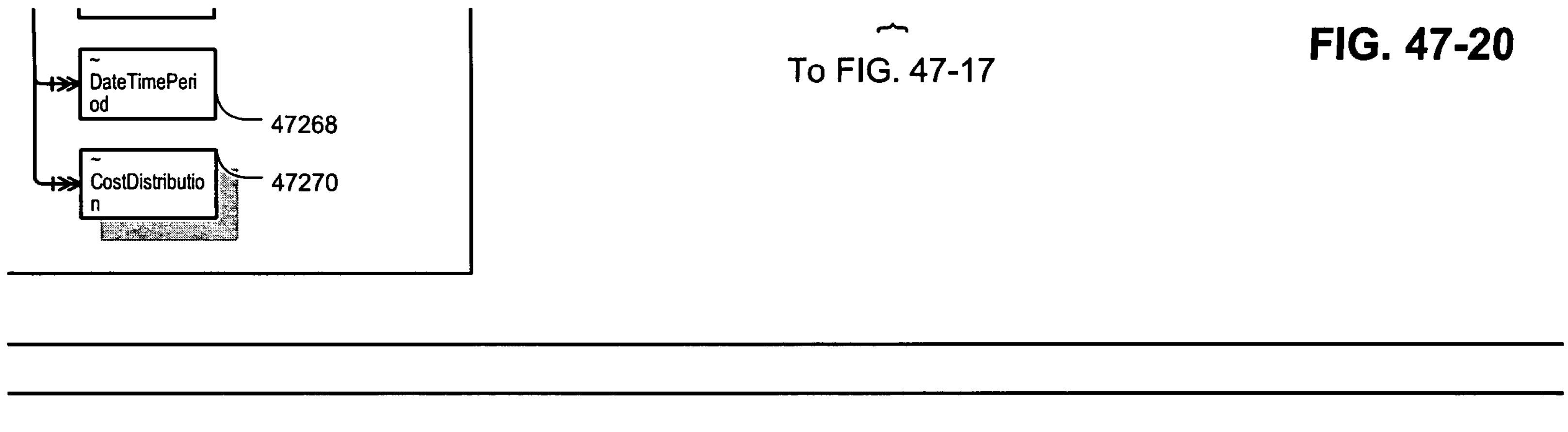
Figures 21, 47:
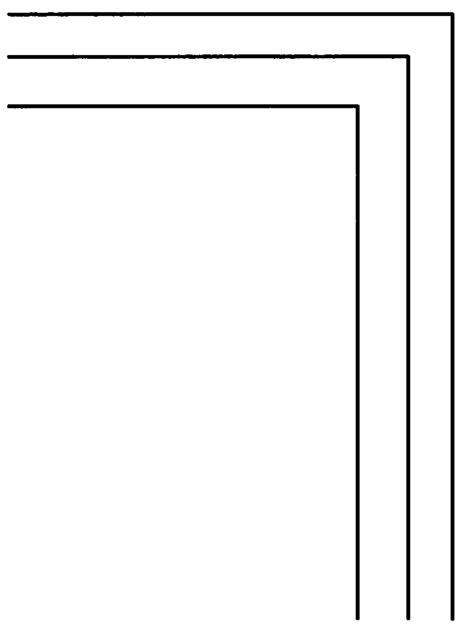

FIGS. 47-1 through 47-21 illustrate one example logical configuration of ShipmentRequestRequestMessage message 47000. Specifically, this figure depicts the arrangement and hierarchy of various components such as one or more levels of packages, entities, and datatypes, shown here as 47002 through 47270. As described above, packages may be used to represent hierarchy levels. Entities are discrete business elements that are used during a business transaction. Data types are used to type object entities and interfaces with a structure. For example, ShipmentRequestRequestMessage message 47000 includes, among other things, ShipmentRequest 47044. Accordingly, heterogeneous applications may communicate using this consistent message configured as such.

Figure 48:
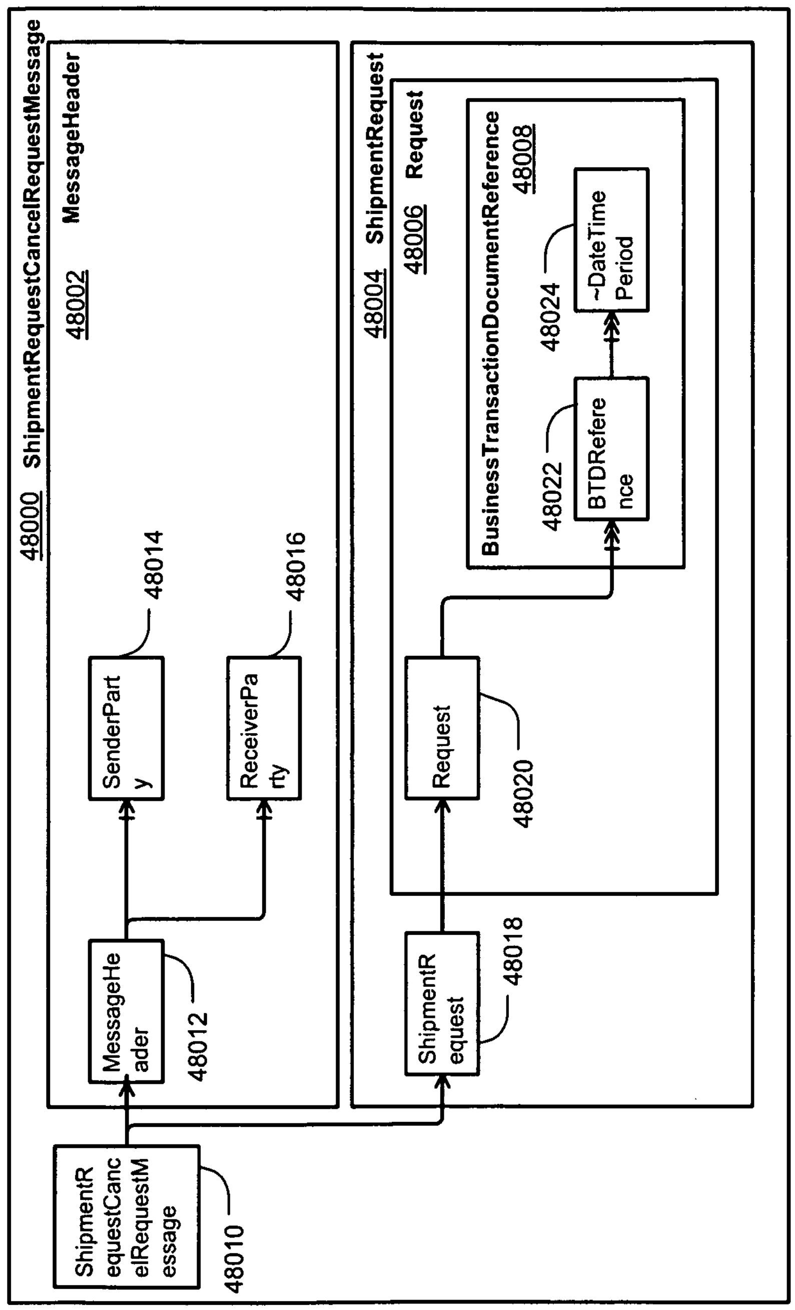

Additionally, FIG. 48 illustrates one example logical configuration of ShipmentRequestCancelRequestMessage message 48000. Specifically, this figure depicts the arrangement and hierarchy of various components such as one or more levels of packages, entities, and datatypes, shown here as 48002 through 48024. As described above, packages may be used to represent hierarchy levels. Entities are discrete business elements that are used during a business transaction. Data types are used to type object entities and interfaces with a structure. For example, ShipmentRequestCancelRequestMessage message 48000 includes, among other things, ShipmentRequest 48018. Accordingly, heterogeneous applications may communicate using this consistent message configured as such.

Figures 1, 49:
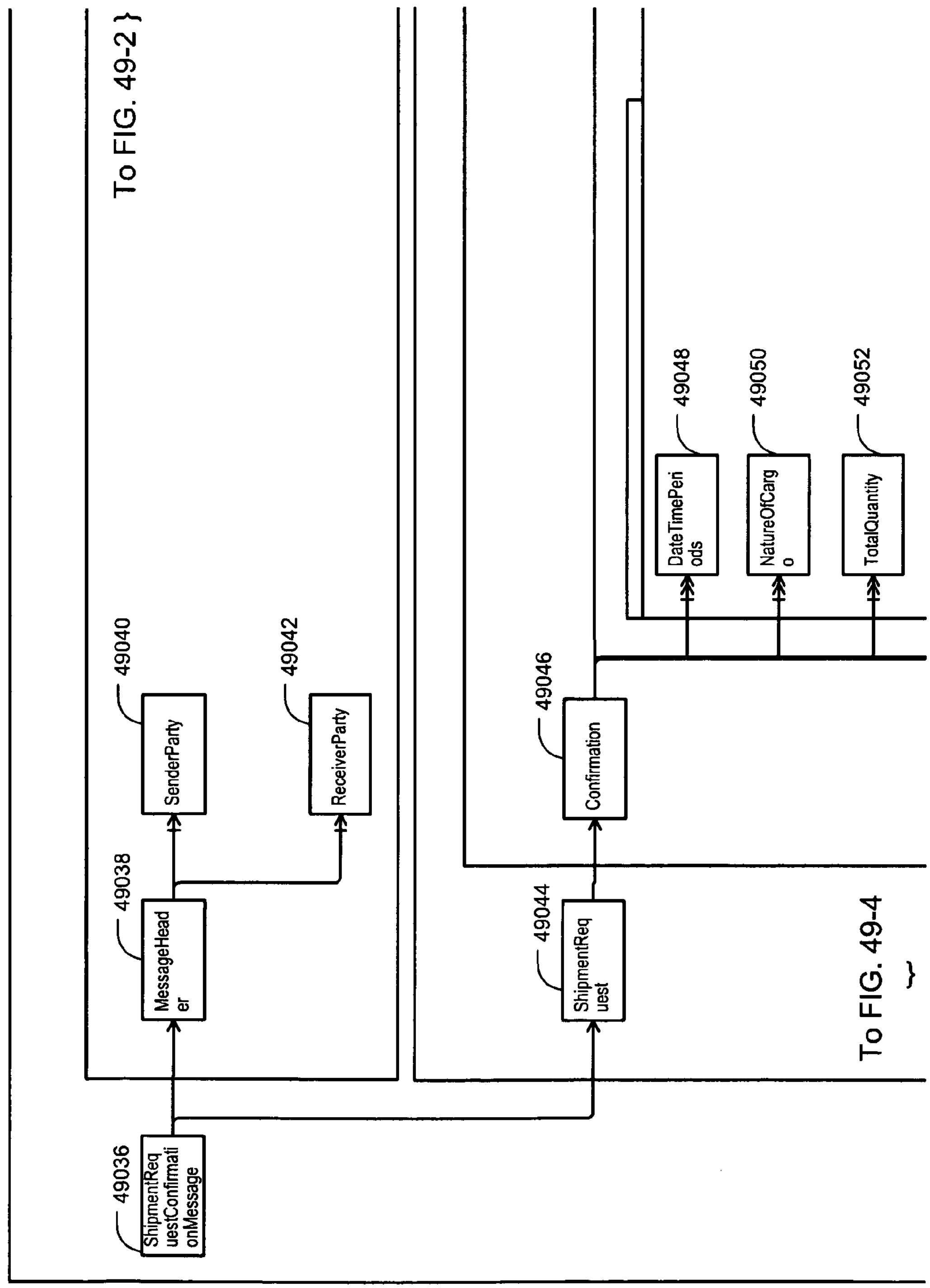
Figures 2, 49:
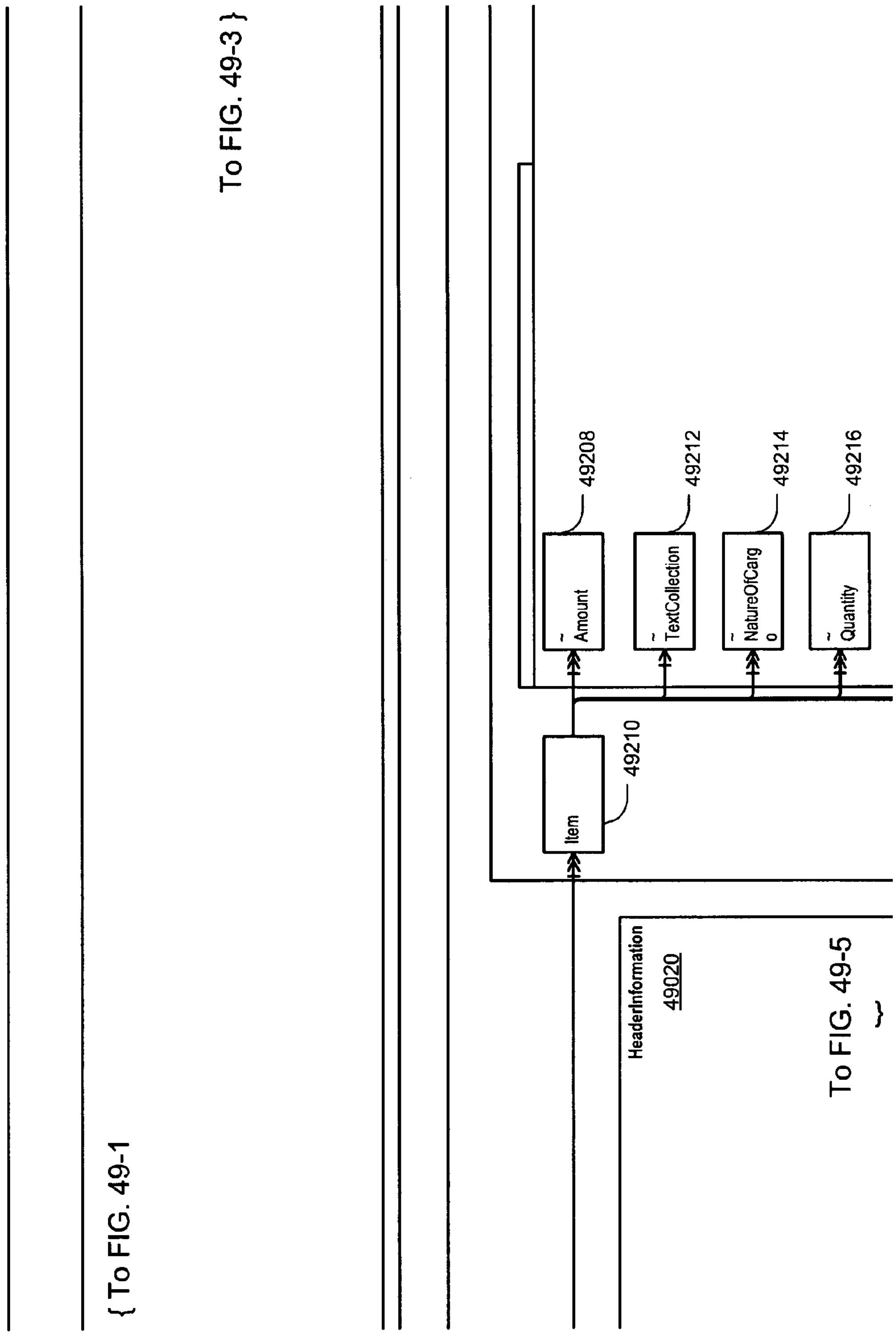
Figures 3, 49:
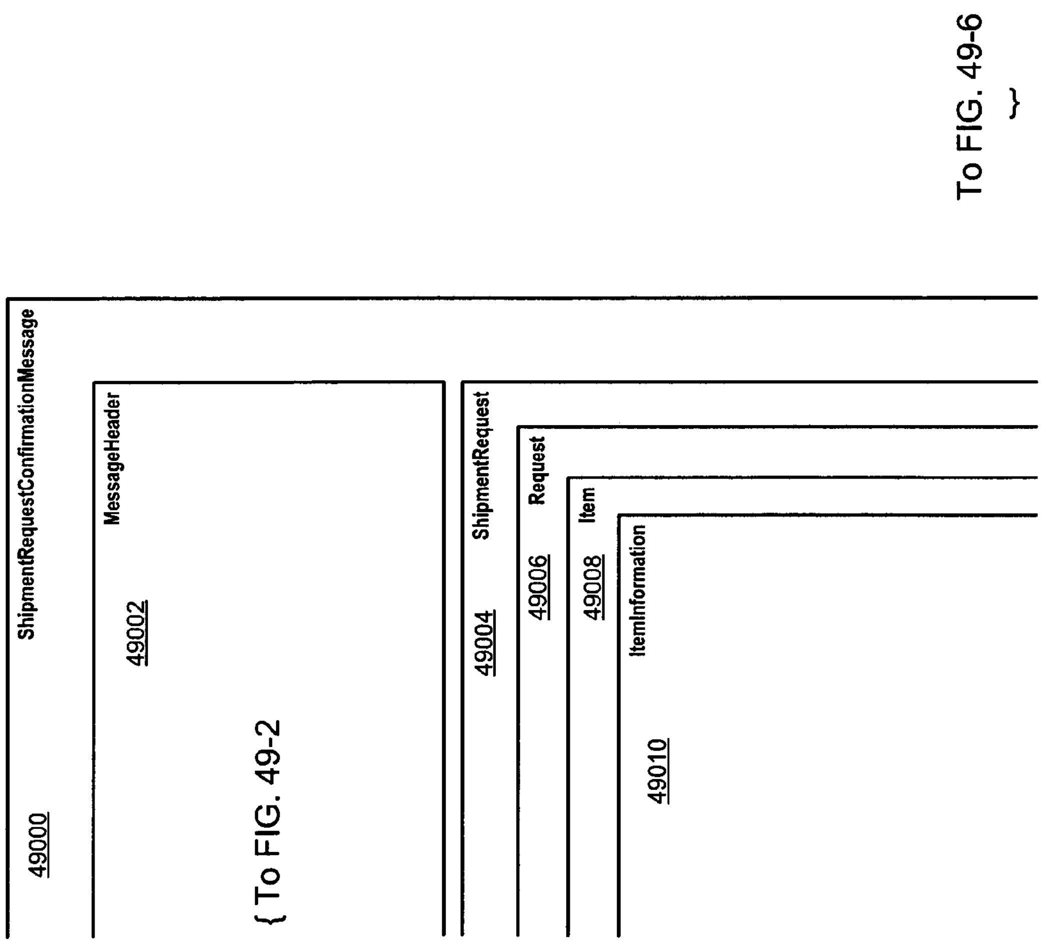
Figures 4, 49:
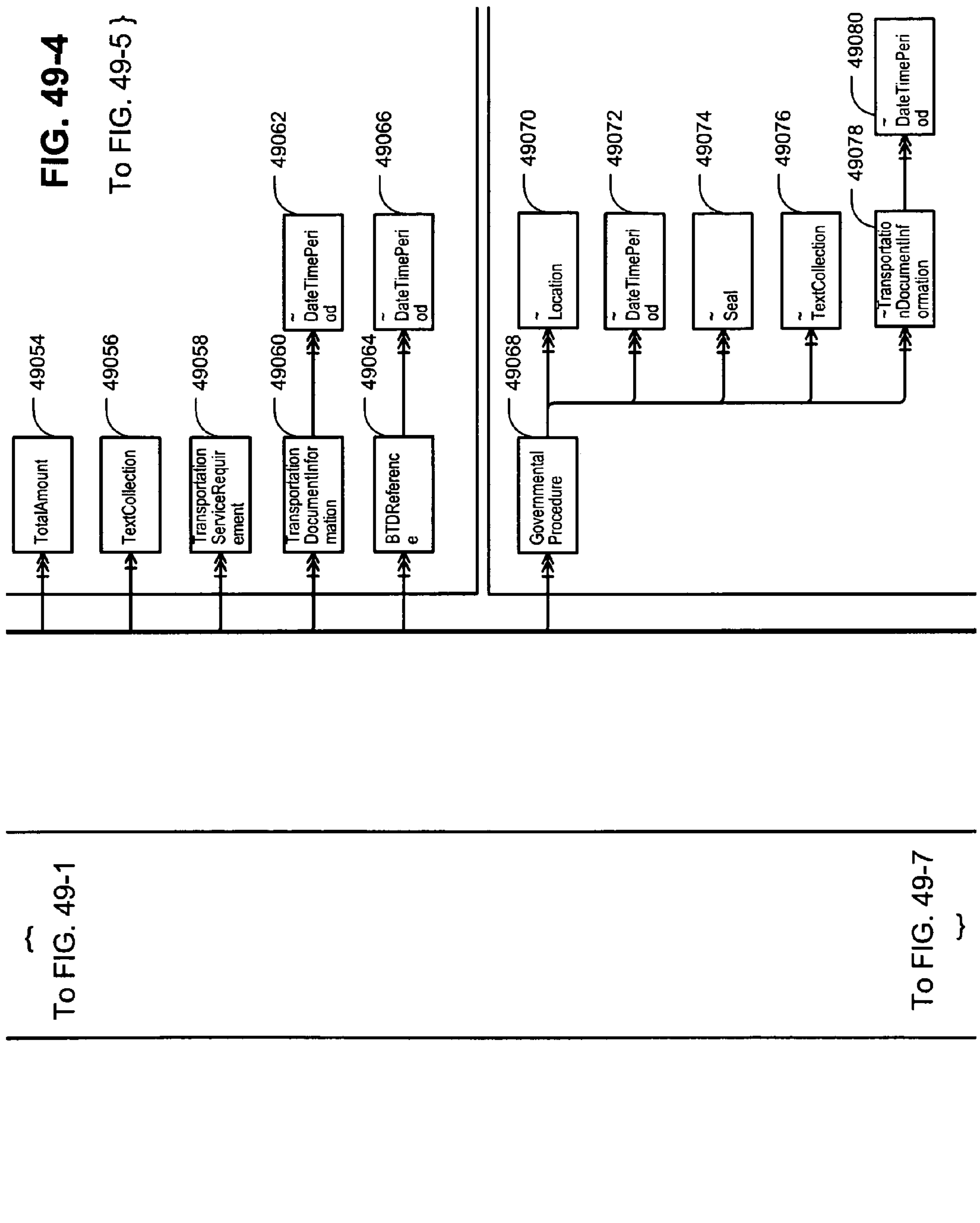
Figures 5, 49:
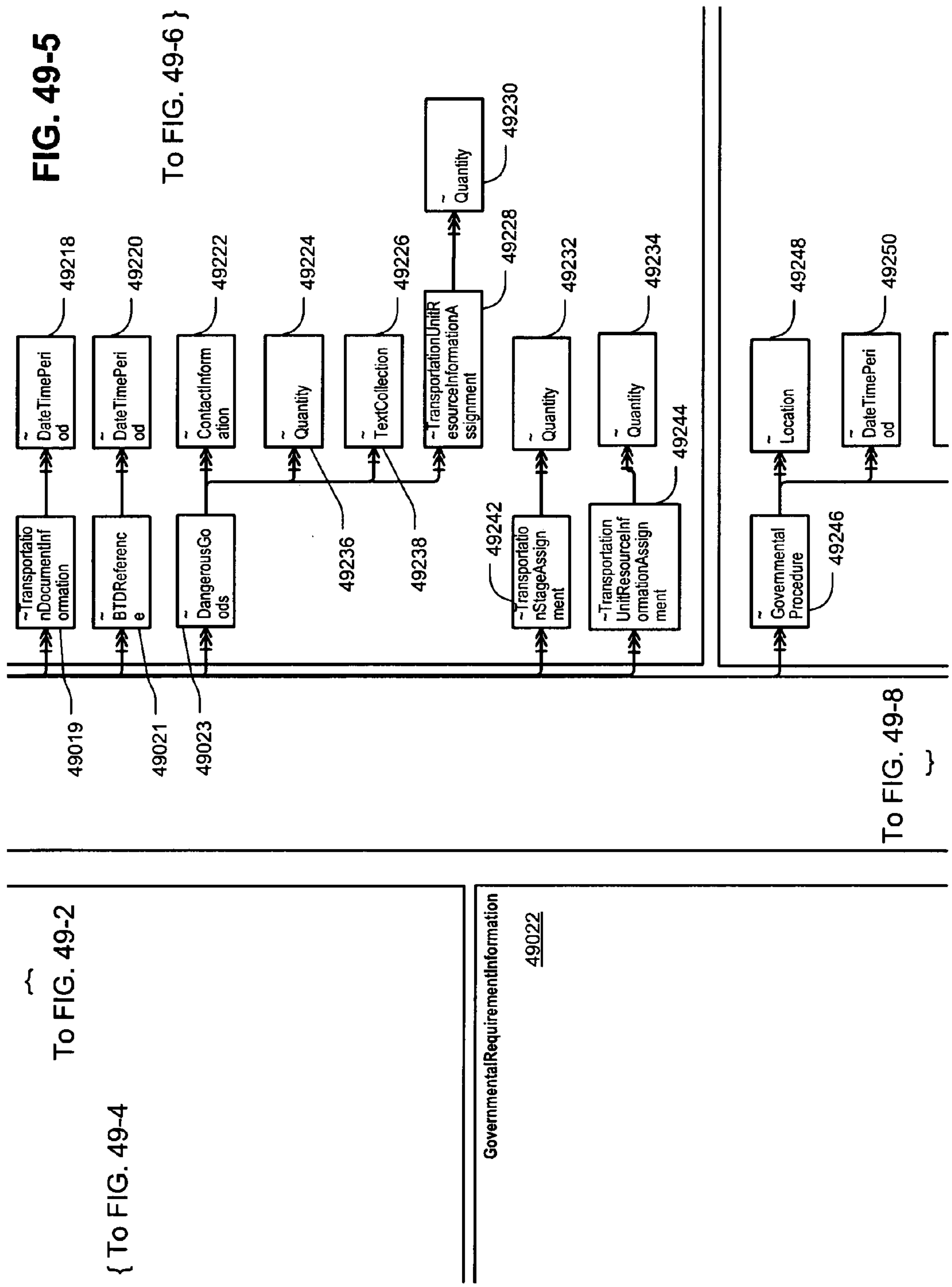
Figures 6, 49:
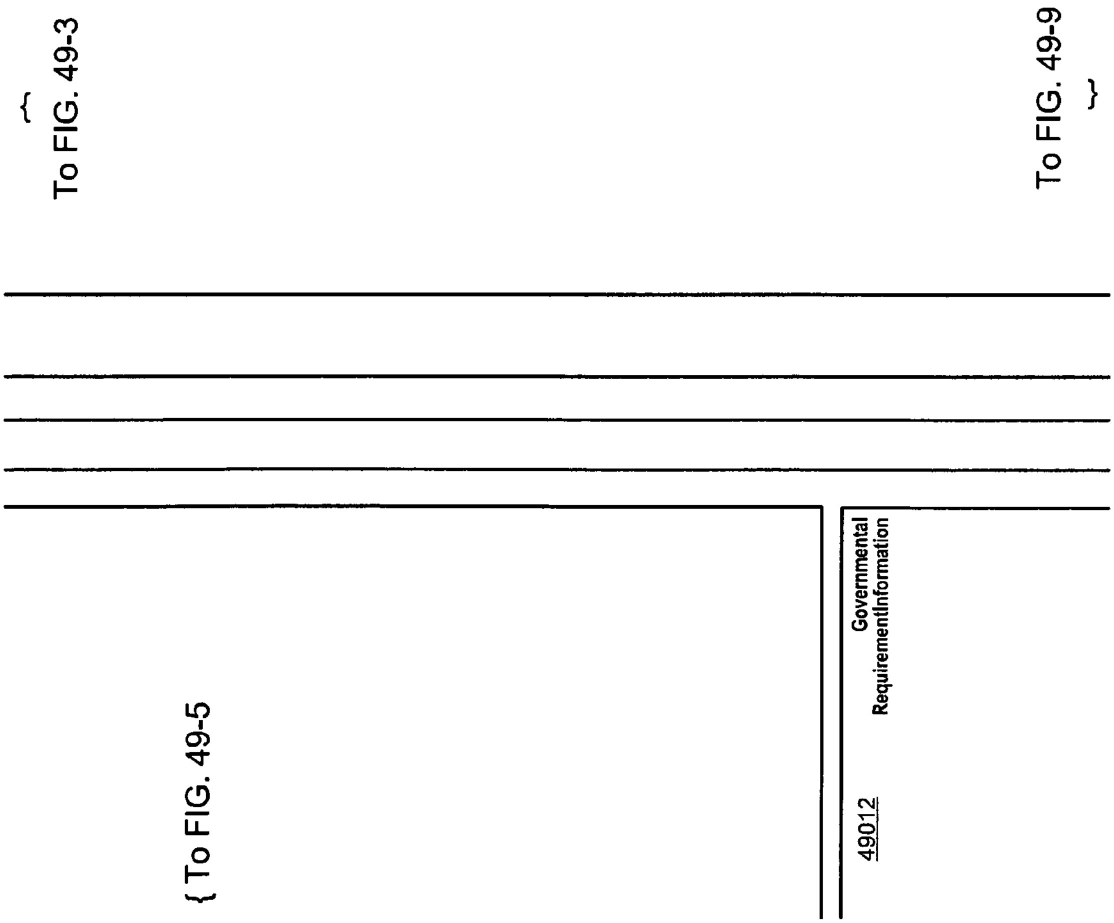
Figures 8, 49:
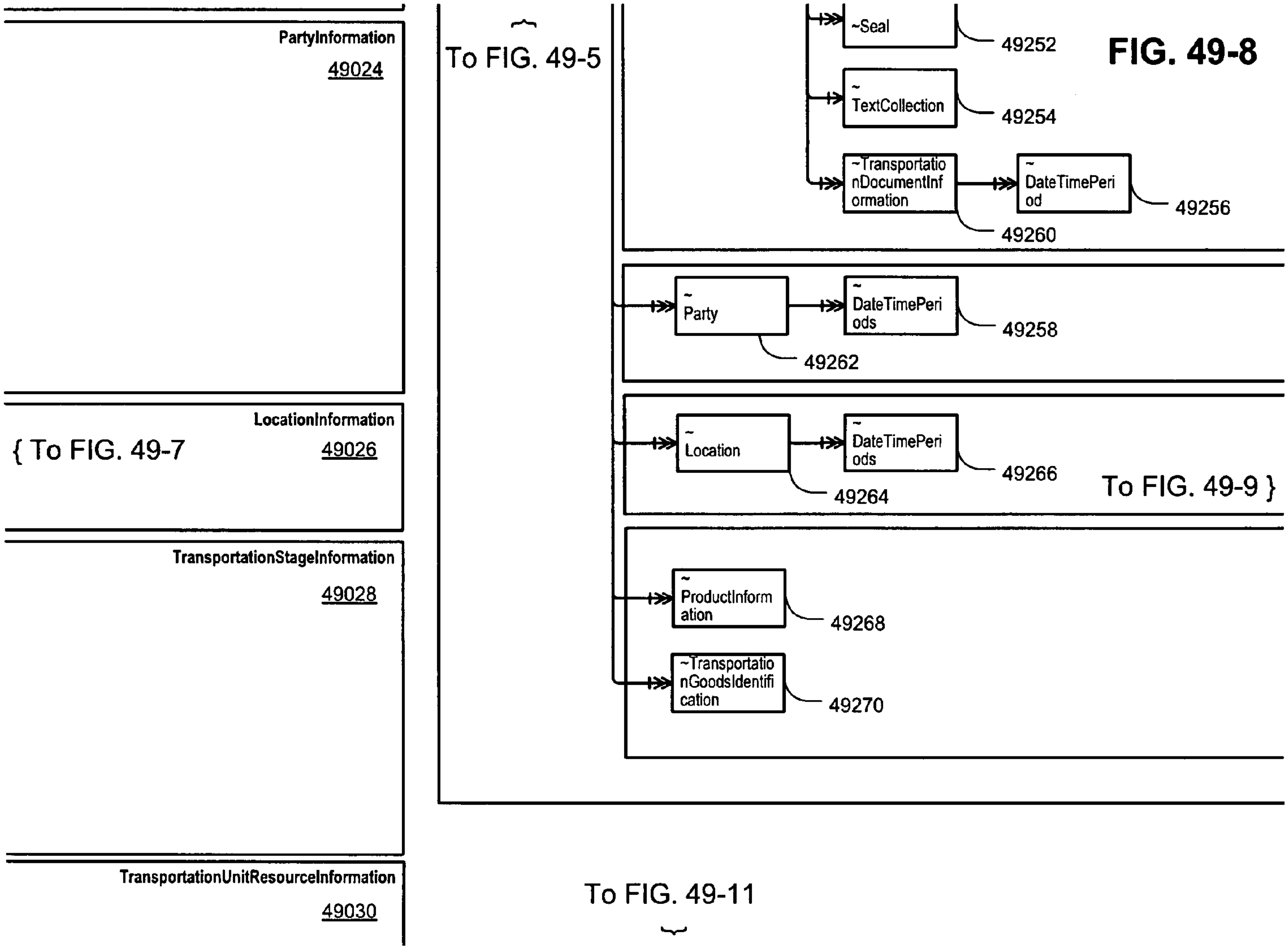
Figures 9, 49:
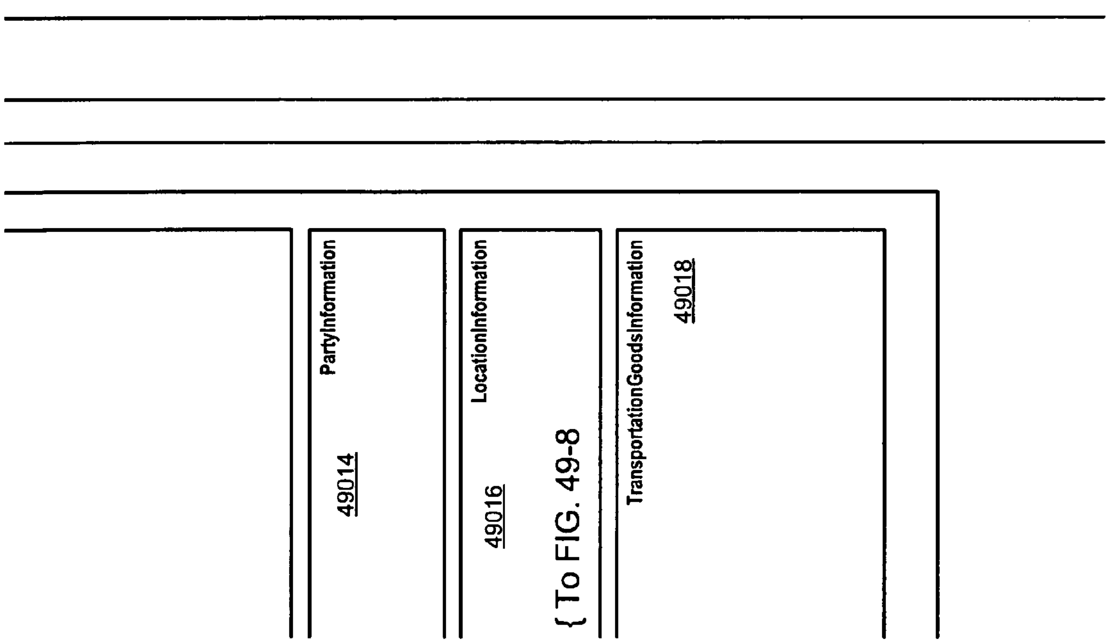
Figures 10, 49:
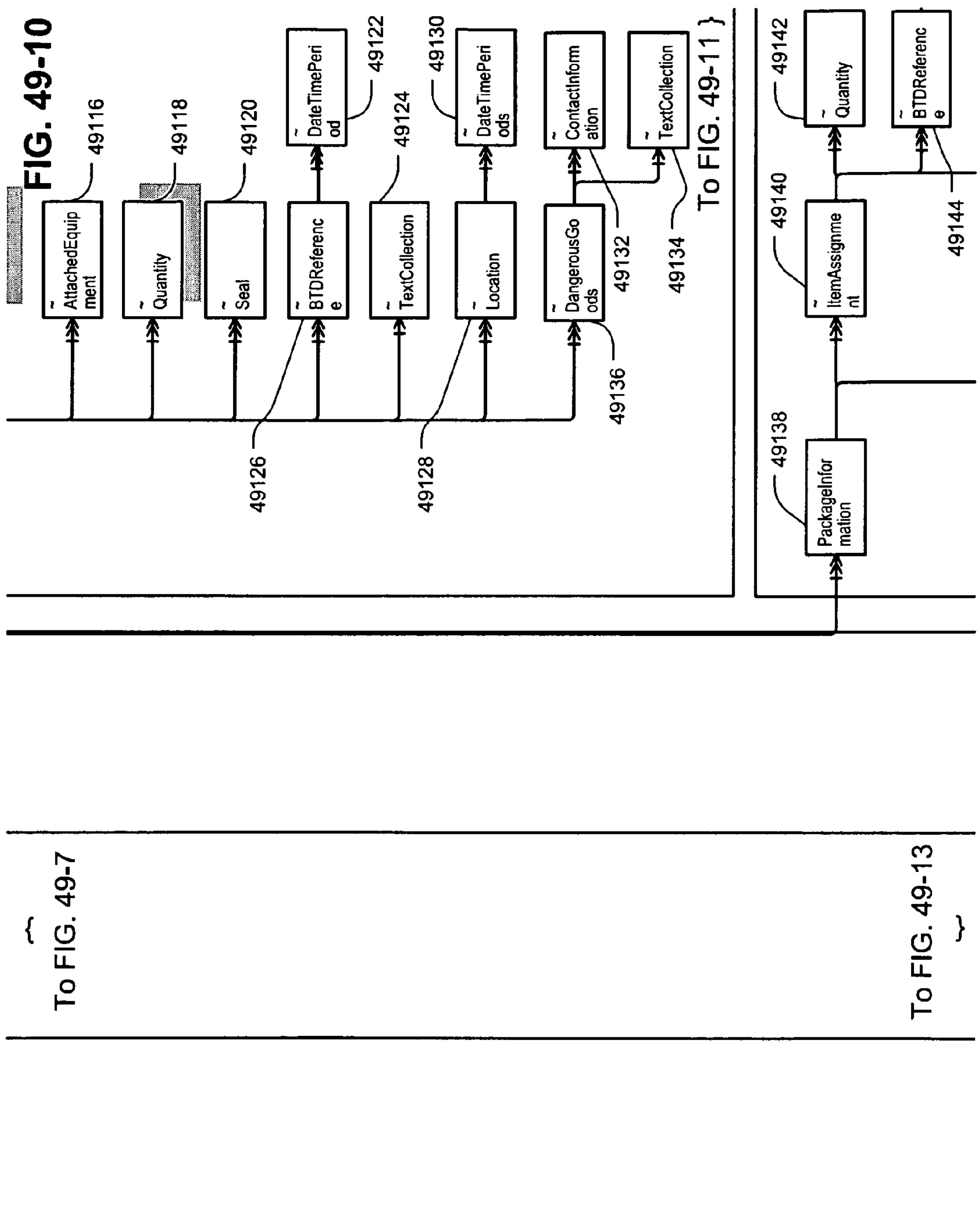
Figures 11, 49:
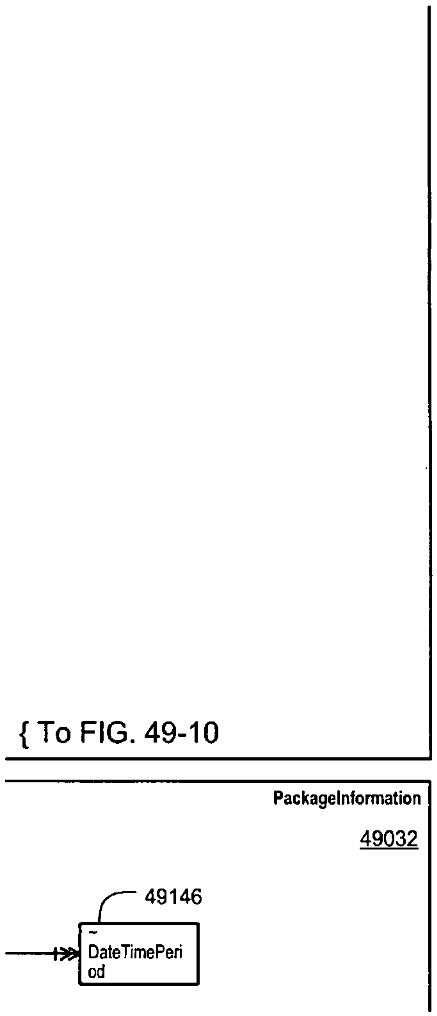
Figures 13, 49:
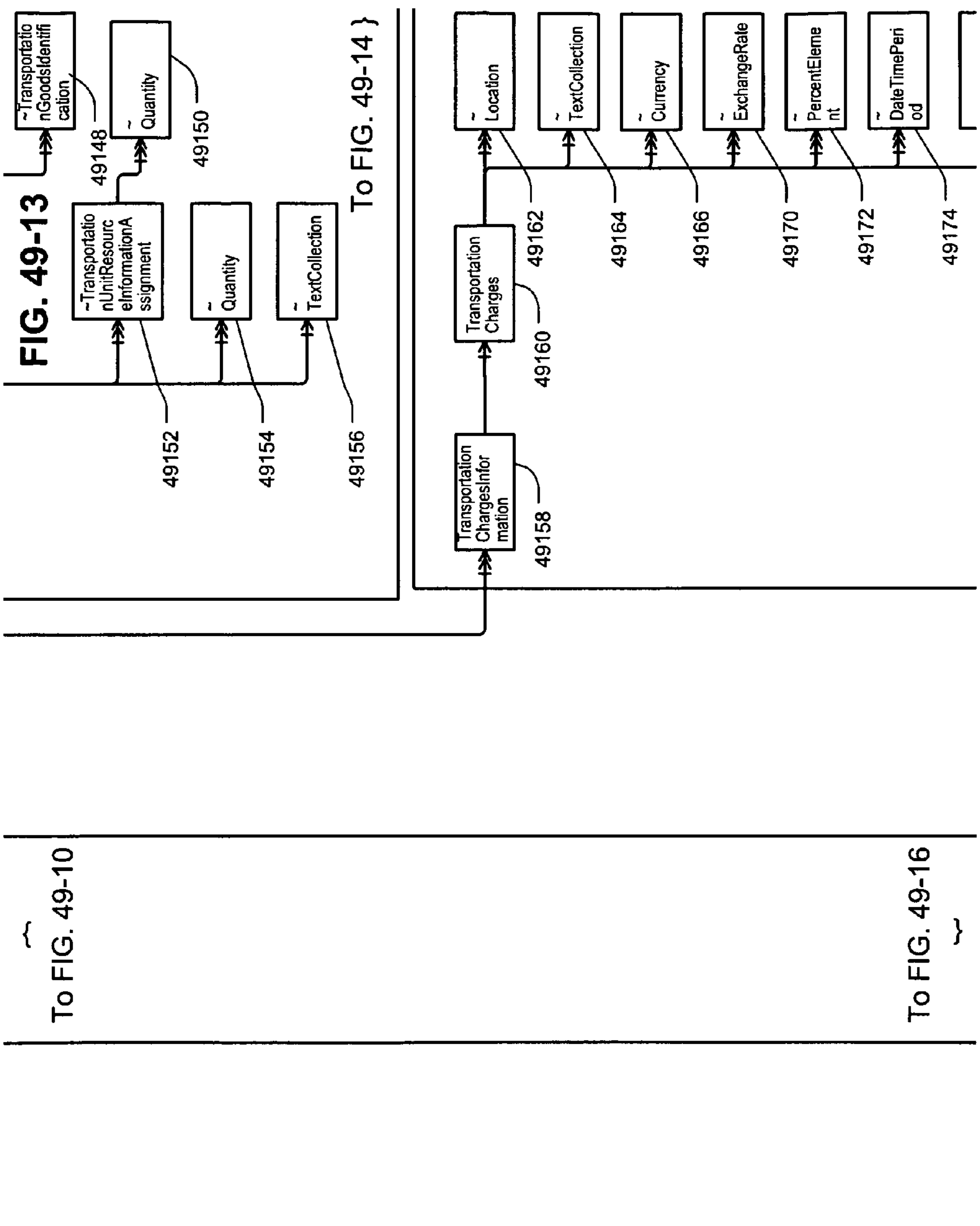
Figures 14, 49:
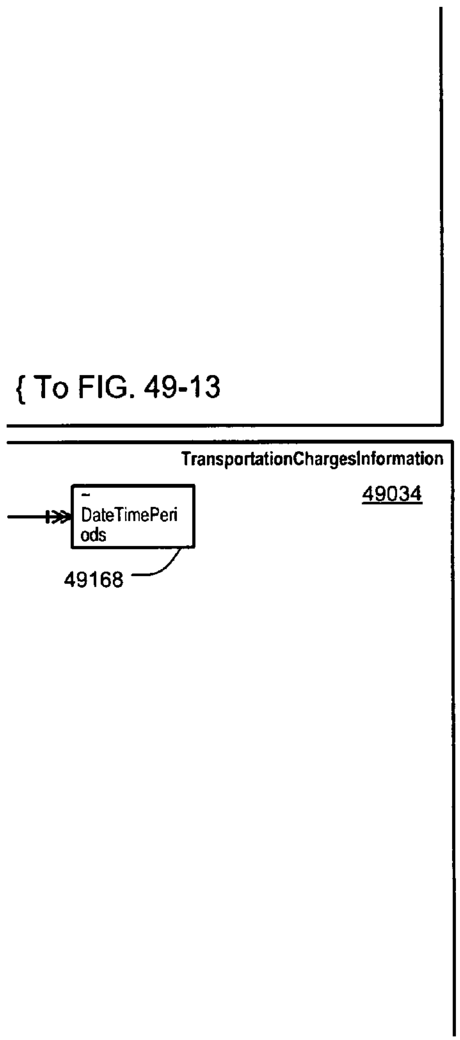
Figures 16, 49:
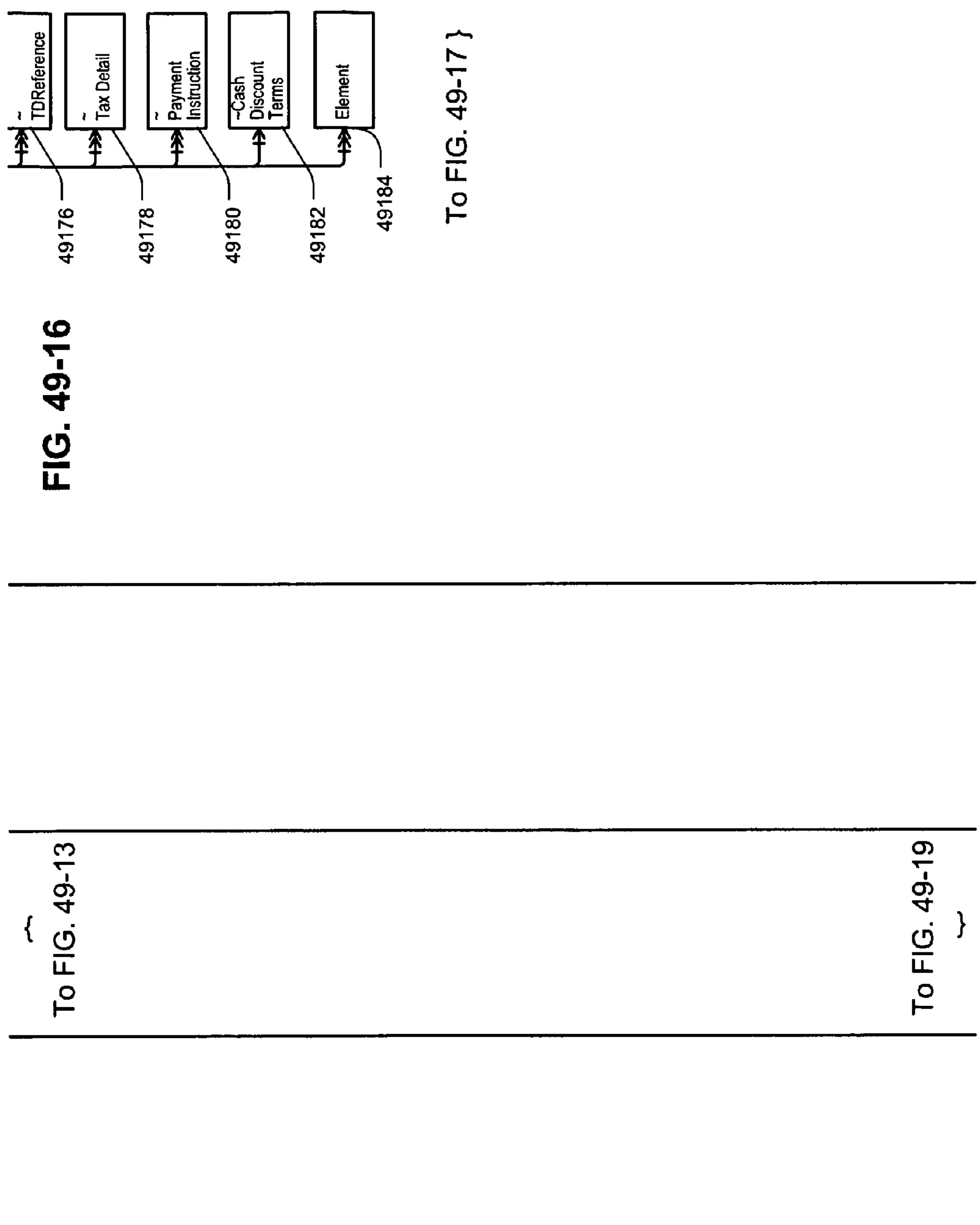
Figures 17, 49:
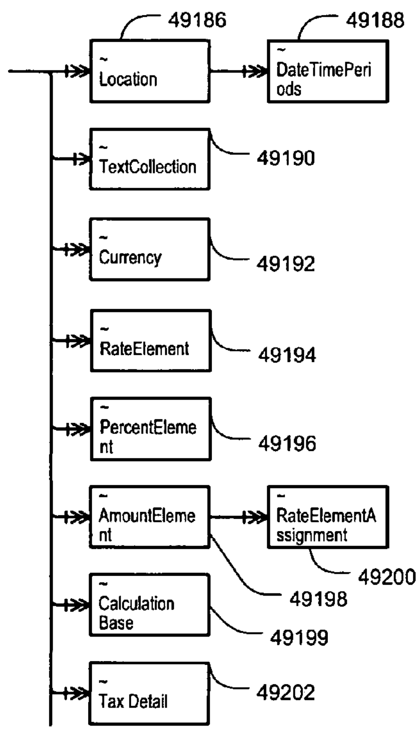
Figures 19, 49:
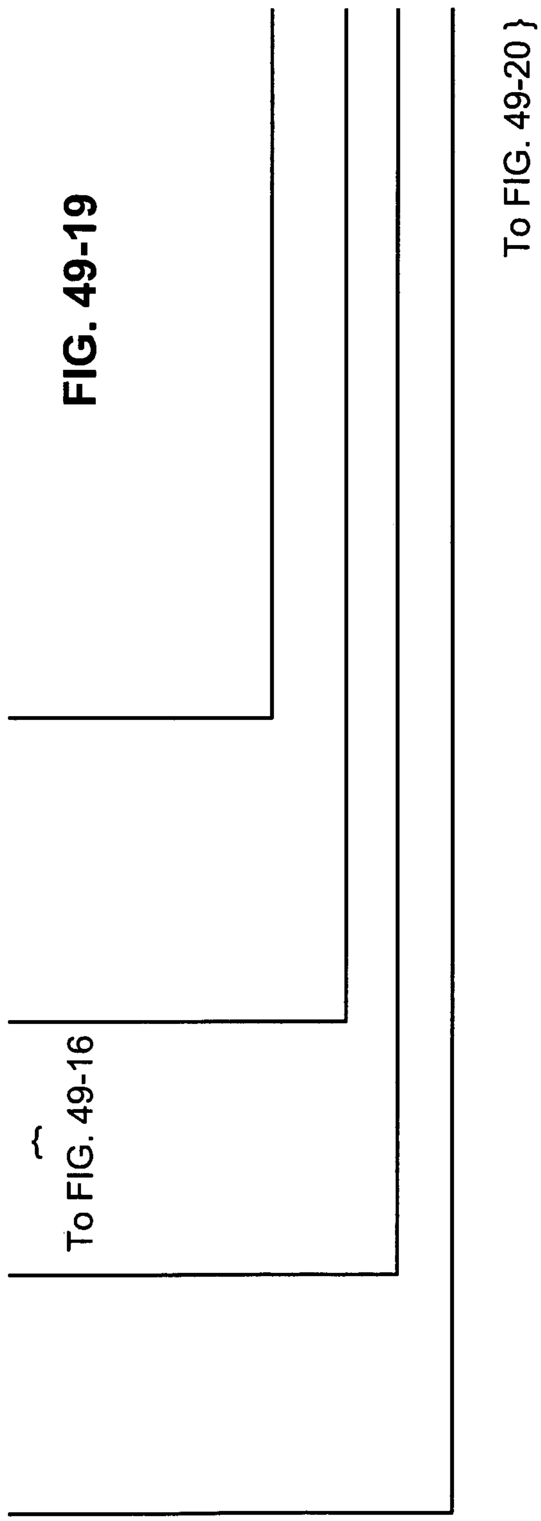
Figures 20, 49:
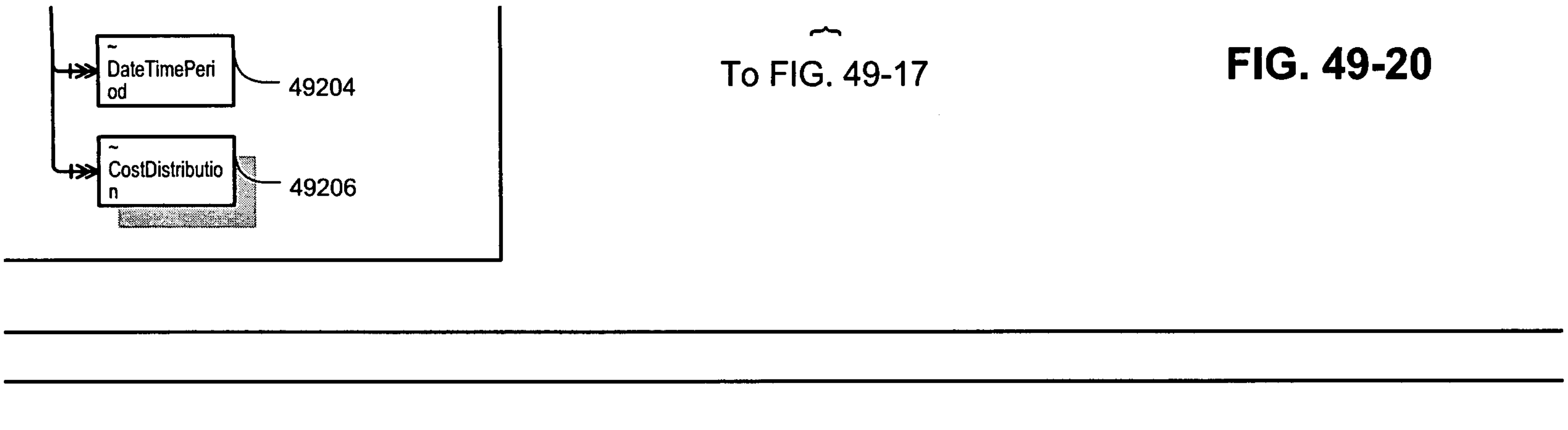
Figures 21, 49:
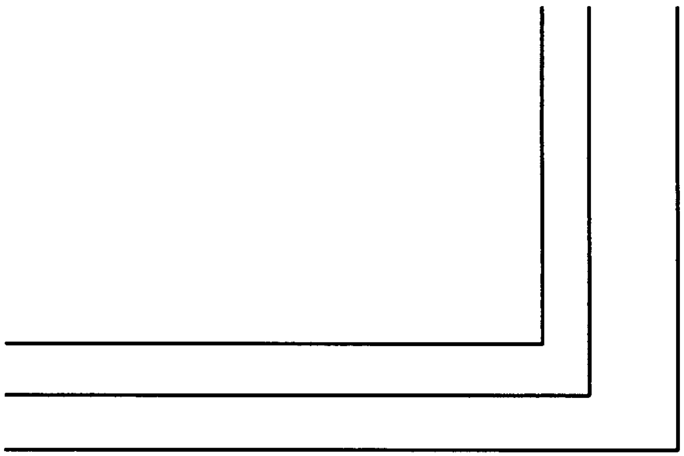

Additionally, FIGS. 49-1 through 49-21 illustrate one example logical configuration of ShipmentRequestConfirmationMessage message 49000. Specifically, this figure depicts the arrangement and hierarchy of various components such as one or more levels of packages, entities, and datatypes, shown here as 49002 through 49270. As described above, packages may be used to represent hierarchy levels. Entities are discrete business elements that are used during a business transaction. Data types are used to type object entities and interfaces with a structure. For example, ShipmentRequestConfirmationMessage message 49000 includes, among other things, ShipmentRequest 49044. Accordingly, heterogeneous applications may communicate using this consistent message configured as such.

Figure 50:
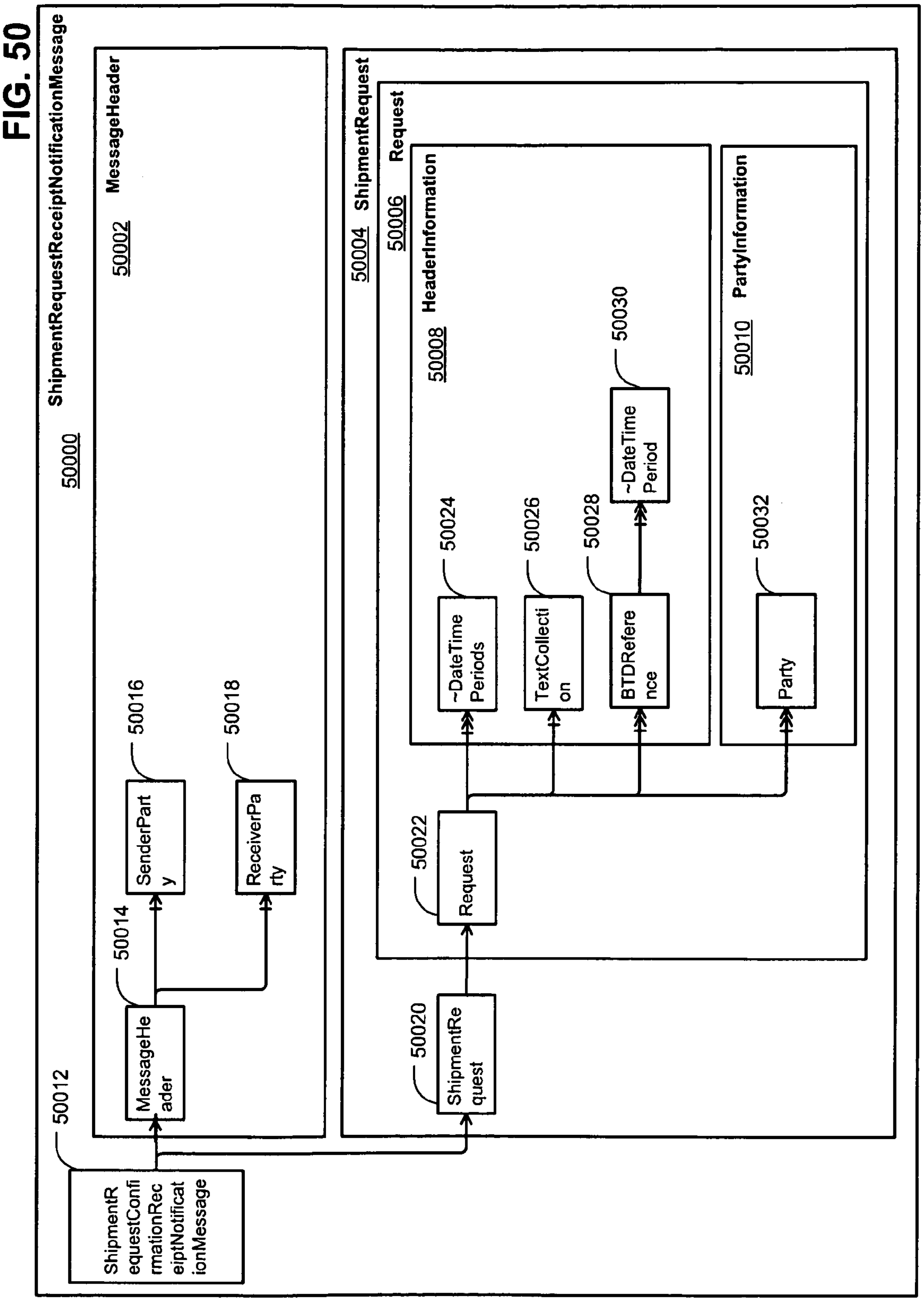

Additionally, FIG. 50 illustrates one example logical configuration of ShipmentRequestReceiptNotificationMessage message 50000. Specifically, this figure depicts the arrangement and hierarchy of various components such as one or more levels of packages, entities, and datatypes, shown here as 50002 through 50032. As described above, packages may be used to represent hierarchy levels. Entities are discrete business elements that are used during a business transaction. Data types are used to type object entities and interfaces with a structure. For example, ShipmentRequestReceiptNotificationMessage message 50000 includes, among other things, ShipmentRequest 50020. Accordingly, heterogeneous applications may communicate using this consistent message configured as such.

FIGS. 51-1 through 51-3 illustrate one example logical configuration of a ShipmentRequestCancelRequestMessage 51000 element structure. Specifically, these FIGS. depict the arrangement and hierarchy of various components such as one or more levels of packages, entities, and datatypes, shown here as 51000 through 51088. As described above, packages may be used to represent hierarchy levels. Entities are discrete business elements that are used during a business transaction. Data types are used to type object entities and interfaces with a structure. For example, the ShipmentRequestCancelRequestMessage 51000 includes, among other things, a ShipmentRequestCancelRequestMessage entity 51002. Accordingly, heterogeneous applications may communicate using this consistent message configured as such.

FIGS. 52-1 through 52-77 illustrate one example logical configuration of a ShipmentRequestConfirmationMessage 520000 element structure. Specifically, these figures depict the arrangement and hierarchy of various components such as one or more levels of packages, entities, and datatypes, shown here as 520000 through 522964. As described above, packages may be used to represent hierarchy levels. Entities are discrete business elements that are used during a business transaction. Data types are used to type object entities and interfaces with a structure. For example, the ShipmentRequestConfirmationMessage 520000 includes, among other things, a ShipmentRequest 520014. Accordingly, heterogeneous applications may communicate using this consistent message configured as such.

FIGS. 53-1 through 53-5 illustrate one example logical configuration of a ShipmentRequestConfirmationReceiptNotificationMessage 53000 element structure. Specifically, these figures depict the arrangement and hierarchy of various components such as one or more levels of packages, entities, and datatypes, shown here as 53000 through 53138. As described above, packages may be used to represent hierarchy levels. Entities are discrete business elements that are used during a business transaction. Data types are used to type object entities and interfaces with a structure. For example, the ShipmentRequestConfirmationReceiptNotificationMessage 53000 includes, among other things, a ShipmentRequestConfirmationReceiptNotificationMessage entity 53002. Accordingly, heterogeneous applications may communicate using this consistent message configured as such.

FIGS. 54-1 through 54-5 illustrate one example logical configuration of a ShipmentRequestReceiptNotificationMessage 54000 element structure. Specifically, these figures depict the arrangement and hierarchy of various components such as one or more levels of packages, entities, and datatypes, shown here as 54000 through 54138. As described above, packages may be used to represent hierarchy levels. Entities are discrete business elements that are used during a business transaction. Data types are used to type object entities and interfaces with a structure. For example, the ShipmentRequestReceiptNotificationMessage 54000 includes, among other things, a ShipmentRequestReceiptNotificationMessage entity 54002. Accordingly, heterogeneous applications may communicate using this consistent message configured as such.

Message Data Type ShipmentRequestRequest.

FIGS. 55-1 through 55-72 illustrate one example logical configuration of a ShipmentRequestRequestMessage 550000 element structure. Specifically, these figures depict the arrangement and hierarchy of various components such as one or more levels of packages, entities, and datatypes, shown here as 550000 through 552958. As described above, packages may be used to represent hierarchy levels. Entities are discrete business elements that are used during a business transaction. Data types are used to type object entities and interfaces with a structure. For example, the ShipmentRequestRequestMessage 550000 includes, among other things, a ShipmentRequest 550014. Accordingly, heterogeneous applications may communicate using this consistent message configured as such.

Message Data Type ShipmentRequestRequest

The message data type ShipmentRequestRequestMessage includes business information that is relevant for sending a business document in a message and the ShipmentRequest included in the business document. It includes the Message- Header and ShipmentRequest packages. The message data type ShipmentRequestRequestMessage can provide a structure for the message type ShipmentRequestRequestMessage and interfaces that are based on it.

A MessageHeader package can group together business information that can be relevant for sending a business document in a message. It includes the MessageHeader entity. A MessageHeader can group together business information from the perspective of a sending application to identify the business document in a message, to provide information about the sender, or to provide any information about the recipient. The MessageHeader can be divided up into the SenderParty and RecipientParty entities. It can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. In some implementations, the SenderParty can be filled by the sending application to name a contact person for problems with the message. This can be useful if an additional infrastructure, such as a marketplace, is located between the sender and the recipient. The SenderParty can be used to transfer a message and can be ignored by the receiving application. In some implementations, SenderParty can be filled by the sender, particularly if the participating parties are not transferred with the ShipmentRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that occur with the message. This can be useful if an additional infrastructure, such as a marketplace, is located between the sender and the recipient. The RecipientParty can be used to transfer a message and can be ignored by the receiving application. In some implementations, it can be filled by the sender if the ShipmentRequest package cannot be used to transfer the participating parties.

The ShipmentRequest package can group the ShipmentRequest with its packages. It includes the ShipmentRequest entity and the Request package. The ShipmentRequest can be an agreement between a transportation service provider and an ordering party on the transportation of goods from a single ship-from party to a single ship-to party in accordance with agreed terms and conditions. The attributes and elements located directly at the ShipmentRequest entity can include @actioncode and ID. @actioncode can be a coded representation of an instruction to a message recipient telling the message recipient how to process a transmitted element, and it can be based on GDT: ActionCode. ID can be a unique identifier of a ShipmentRequest and can be based on GDT: BusinessTransactionDocumentTypeCode. In some implementations, the attribute actioncode can include the two values, 01—Create, and 02—Change. In some implementations the ID may not be changed once a ShipmentRequest has been created. In some implementations, the Complete Transmission Indicator might not be included, as it may be set to true (i.e., there may be no delta transmissions, and the complete message content can be transmitted in every message). As a consequence, if an item is missing in the message, the corresponding item may be deleted.

The Request package can group the Request with its packages and it includes the Request entity. The packages include the following: HeaderInformation, TransportationChargesInformation, GovemmentalRequirementInformation, PartyInformation, LocationInformation, TransportationStageInformation, TransportationUnitResourceInformation, PackagingInformation, and Item. A Request can be an agreement between a transportation service provider and an ordering party on the transportation of goods from a single ship-from party to a single ship-to party in accordance with agreed terms and conditions. The element located directly at the Request entity can be the DeliveryTerms element. Collection of the conditions and agreements can apply when delivering the ordered goods and providing necessary services and activities of this element. The DeliveryTerms element can be based on GDT: DeliveryTerms.

HeaderInformation can group dates, total values, document and references related to a shipment request. It includes the entities: DateTimePeriods, NatureOfCargo, TotalQuantity, TotalAmount, TextCollection, TransportationServiceRequirement, TransportationDocumentInformation, and BusinessTransactionDocumentReference. In some implementations, DateTimePeriods can specify a requested and an acceptable date, time and period applying to a shipment request (e.g., date and time of document issue). A requested period can be a period in which an event is requested to take place. An acceptable period can be a period in which an event may take place at an earliest start date/time to a latest end date/time. The elements located at the DateTimePeriods entity can include RequestedFulfillmentPeriod, AcceptableFulfillmentPeriod, and PeriodRoleCode. The RequestedFulfillmentPeriod can be a period which is requested depending on the semantic of the PeriodRoleCode and can be based on GDT: DATETIMEPERIOD, Qualifier: RequestedFulfillment. The AcceptableFulfillmentPeriod can be a period which is acceptable depending on the semantic of the PeriodRoleCode. It can be based on GDT: DATETIMEPERIOD, Qualifier: AcceptableFulfillment. The PeriodRoleCode can be a coded representation of the business semantic of two periods defined by the entities RequestedFulfillmentPeriod and AcceptableFulfillmentPeriod. The PeriodRoleCode can be based on GDT: PeriodRoleCode. In some implementations, RequestedFulfillmentPeriod and AcceptableFulfillmentPeriod are optional, but in every instance one of them can be filled. NatureOfCargo can indicate a nature of cargo related to the shipment request. For example, cargo can be palletized, containerized, or documents. ClassificationCode can be a coded representation of a classification of the nature of cargo and can be based on GDT: NatureOfCargoClassificationCode. TotalQuantity can specify a total quantity which is related to a whole shipment request (e.g.,, total number of equipment, total number of items). The Quantity can be a non-monetary numerical specification of an amount in a unit of measurement and can be based on GDT: Quantity. The RoleCode can be a coded representation of the role of a quantity and can be based on GDT: QuantityRoleCode. The TypeCode can be a coded representation of a type of quantity that is based on the measurable characteristic of an object or physical phenomenon. It can be based on GDT: QuantityTypeCode. In some implementations, QuantityRoleCode and QuantityTypeCode are optional, but in every instance one of them can be filled. TotalAmount can specify a cumulated monetary amount related to a shipment request (e.g., duty amount, insurance amount, or total value). Amount can be an amount with a corresponding currency unit based on CDT: Amount. RoleCode can be a coded representation of a role of an amount and can be based on GDT: AmountRoleCode. TextCollection can be a group of textual information that relates to a shipment request. TextCollection can be based on GDT: TextCollection. TransportationServiceRequirement can specify a contract and carriage condition and the service and priority requirements for a transport which apply to a whole shipment request. The TransportationServiceRequirementCode can be a coded representation of a requirement related to a transportation service, and can be based on GDT: TransportationServiceRequirementCode. The AdditionalTransportationServiceRequirementCode can be a coded representation of an additional requirement related to a transportation service. It can be based on GDT: TransportationServiceRequirementCode, Qualifier: Additional. TransportationContractConditionCode can be a coded representation of a contract and carriage condition, and can be based on GDT: TransportationContractConditionCode. TransportServiceLevelCode can be a coded representation of agreed or defined services in terms of delivery of goods with respect to the speed of the delivery. TransportServiceLevelCode can be based on GDT: TransportServiceLevelCode. NatureOfCargoClassificationCode can be a coded representation of a classification of the nature of cargo. It can be based on GDT: NatureOfCargoClassificationCode. TransportationDocumentInformation can specify information on a transportation document related to a shipment request. It includes the DateTimePeriod entity. Its structure can be based on TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of the type of a documentation and can be based on GDT: TransportationDocumentTypeCode. TransportationDocumentNote can be a Short Note on documentation and can be based on GDT: SHORT_Note. TransportationDocumentID can be a unique identifier for a transportation document and can be based on GDT: TransportationDocumentID. TransportationDocumentStatusCode can be a coded representation of the status of a transportation document (e.g. To be printed, Document Complete). It can be based on GDT: TransportationDocumentStatusCode. LanguageCode can be a coded representation of the language of a documentation and can be based on GDT: LanguageCode. CommunicationMediumTypeCode can be a coded representation of the type of a medium used for communication of the documentation, such as Fax, mail, EDI, or Letter. CommunicationMediumTypeCode can be based on GDT: CommunicationMediumTypeCode. In some implementations, RequiredIndicator can indicate whether a documentation is required or not. It can be based on GDT: Indicator Qualifier: Required. OutputCopyNumberValue can be a number specifying the number of copies of a document that can be issued and can be based on GDT: NumberValue, Qualifier: OutputCopy. OutputOriginalNumberValue can be a number specifying the number of originals of a document that can be issued. It can be based on GDT: NumberValue, Qualifier: OutputOriginal. In some implementations, TypeCode and TypeDescription are both optional, but at least one of them can be used. In some implementations, if the RequiredIndicator is set to true, at least one of NumberValues OutputCopyNumberValue or OutputOriginalNumberValue are filled. DateTimePeriod can specify date, time and/or period (e.g., validity date related to the required business documentation). DateTimePeriod can be a period that is defined by two points in time and can be based on GDT: DateTimePeriod. PeriodRoleCode can be a coded representation of the business semantic of a period. It can be based on GDT: PeriodRoleCode. BusinessTransactionDocumentReference can specify a business document reference that is related to a whole shipment request. It includes the DateTimePeriod entity. BusinessTransactionDocumentReference can be a unique reference to other business documents or business document items that are of significance within each respective business process. It can be based on GDT: BusinessTransactionDocumentReference.

BusinessTransactionDocumentRelationshipRoleCode can be a coded representation of a role that a business document or a business document item has when set against another business document or business document item with a relationship. It can be based on GDT: BusinessTransactionDocumentRelationshipRoleCode. BusinessTransactionDocumentRelationshipTypeCode can be a coded representation of the relationship between two business documents or business document items. It can be based on GDT: BusinessTransactionDocumentRelationshipTypeCode. TransportationDocumentTypeCode can be a coded representation of a type of a documentation and can be based on GDT: TransportationDocumentTypeCode. TransportationDocumentNote can be a Short Note on documentation and can be based on GDT: SHORT_Note. TransportationDocumentID can be a unique identifier for a transportation document and can be based on GDT: TransportationDocumentID. In some implementations, RelationshipTypeCode and RelationshipRoleCode are both optional. If used, both can be filled. In some implementations, either the combination of BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled. DateTimePeriod can specify date, time and/or period information related to a DocumentReference.

GovemmentalProcedureInformation can specify applicable governmental procedures related to import, export and transport of the goods of the shipment request. It includes the GovernmentalProcedure entity. GovernmentalProcedure can specify applicable governmental procedures related to import, export and transport of the goods of the shipment request. It includes the entities Location, DateTimePeriod, Seal, TextCollection, and TransportationDocumentInformation. TransportationGovernmentAgencyTypeCode can be a coded representation of the type of a government agency and can be based on GDT: TransportationGovernmentAgencyTypeCode. TransportationMovementTypeCode can be a coded representation of the type of a transport movement. Examples are Import, Export, Transit, and Transshipment. TransportationMovementTypeCode can be based on GDT: TransportationMovementTypeCode. TransportationGovernmentAgencyInvolvementStatusCode can be a coded representation for an involvement status of a transportation related government agency and can be based on GDT: TransportationGovemmentAgencyInvolvementStatusCode. TransportationGovernmentAgencyActionCode can be a coded representation of an action of a transportation related government agency and can be based on GDT: TransportationGovernmentAgencyActionCode. TransportationGovernmentAgencyProcedureStatusCode can be a coded representation of the status of a procedure related to a transportation government agency and can be based on GDT: TransportationGovemmentAgencyProcedureStatusCode. Location can be a physical place related to the GovernmentalProcedure. DateTimePeriod can specify a date, time and/or period related to a GovernmentalProcedure. Seal can specify seal information related to a GovernmentalProcedure. ID can be a unique identifier of a seal and can be based on GDT: SealID. PartyRoleCode can be a coded representation of a party role, such as the role of a sealing party, and can be based on GDT: PartyRoleCode. PartyFormattedName can be a complete, formatted name of a party, such as of the sealing party, and can be a Name of the SealingParty. PartyFormattedName can be based on GDT: LONG_Name, Qualifier: PartyFormatted. StatusCode can be a coded representation of the status of a seal and can be based on GDT: SealStatusCode. TextCollection can be a group of textual information that relates to the GovernmentalProcedure. TextCollection can be based on GDT: TextCollection. TransportationDocumentInformation can specify information on a transportation document related to the GovernmentalProcedure. It includes the DateTimePeriod entity. DateTimePeriod can specify date, time and/or period information related to the Documentation.

The PartyInformation package includes information regarding a party of a shipment request (i.e., Shipper, Carrier, Agent). It includes the Party entity. Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. It includes the entities Amount, DateTimePeriods, TransportationDocumentInformation, and BusinessTransactionDocumentReference. A Party includes information that is exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. It can be based on GDT: BusinessTransactionDocumentParty. RoleCode can be a coded representation of a PartyRoleCode which specifies which rights and obligations the party has regarding the business object and corresponding processes. In some implementations, PartyRole can be assigned to exactly one PartyRoleCategory and can refine its semantics. PartyRole can be based on GDT: PartyRoleCode. FormattedName can be a complete, formatted name of a party and can be based on GDT: LONG_Name, Qualifier: PartyFormatted. Amount can specify an amount related to the party. DateTimePeriods can specify a requested and an acceptable date, time and period related to a party. A requested period can be a period in which an event is requested to take place. An acceptable period is a period in which an event may take place at an earliest start date/time to a latest end date/time. TransportationDocumentInformation can specify business documentation related to a party according to a documentation type. TransportationDocumentInformation includes the DateTimePeriod entity. DateTimePeriod can specify date, time and/or period information (e.g., validity date) related to business documentation of a party. BusinessTransactionDocumentReference can specify a business document reference that is related to a party. It includes the DateTimePeriod entity. DateTimePeriod can specify date, time and/or period information related to a document referenced by a party.

The LocationInformation package includes information regarding a location of a shipment request (i.e., Ship-from location). LocationInformation includes the Location entity. Location can specify a physical place a shipment request refers to as it is relevant for its processing. It includes the DateTimePeriod entity. DateTimePeriods can specify a requested and an acceptable date, time and period related to the location.

The TransportationStageInformation package includes information regarding a transportation stage of a shipment request. A transportation stage can represent a section of a transport. It includes the Stage entity. Transportation Stage can specify details related to a stage of a transport which is part of a shipment request. It includes the entities Location, TransportationDocumentInformation, and TransportationServiceRequirement. ID can be a unique identifier of a stage in a shipment request and can be based on GDT: TransportationStageID. OrdinalNumberValue can be used to indicate a position of a transportation stage in a set of transportation stages. It can be based on GDT: OrdinalNumberValue, Qualifier: TransportationStage. TypeCode can be a coded representation of a type of a TransportationStage and can be based on GDT: TransportationStageTypeCode. JourneyID can be an identifier of a Journey (Voyage) and can be based on GDT: JourneyID. TransportModeCode can be a coded representation of a mode of transportation used for delivery and can be based on GDT: TransportModeCode. TransportMeansDescriptionCode can be a coded representation of a transport means type with which goods or persons can be transported. TransportMeansDescriptionCode can be based on GDT: TransportMeansDescriptionCode. TransportMeansDescription can be a description of a means of transport and can be based on GDT: SHORT_Description, Qualifier: TransportMeans. TransportMeansID can be a unique identifier of a means of transport and can be based on GDT: TransportMeansID. TransportMeansHomeCountryCode can be a coded representation of the home country of a transport means and can be based on GDT: CountryCode, Qualifier: TransportMeansHome. TransportMeansOwnershipTypeCode can be a coded representation of a type of ownership for a means of transport and can be based on GDT: TransportMeansOwnershipTypeCode. CarrierStandardID can be a standard identifier of a carrier and can be based on GDT: PartyStandardID. CarrierFormattedName can be a name of a carrier and can be based on GDT: LONG_Name, Qualifier: PartyFormatted. TransportationTransitDirectionCode can be a coded representation for a transportation transit direction and can be based on GDT: TransportationTransitDirectionCode. CalculatedDistanceMeasure can be a calculated distance measure and can be based on GDT: Measure, Qualifier: CalculatedDistance. GivenDistanceMeasure can be a given distance measure and can be based on GDT: Measure, Qualifier: GivenDistance. StageLocation can specify a physical place related to a stage. StageLocation includes the DateTimePeriods entity. DateTimePeriods can specify a date, time and/or period related to the Location. BusinessTransactionDocumentReference can specify a business document reference that is related to a Stage. It includes the DateTimePeriod entity. DateTimePeriod can specify date, time and/or period information related to a BusinessTransactionDocumentReference. TransportationServiceRequirement can specify a contract and carriage condition and service and priority requirements related to a stage.

The TransportationUnitResourceInformation package includes information regarding a transportation unit resource that can be relevant for a shipment request (i.e., a container). TransportationUnitResourceInformation includes the TransportationUnitResourceInformation entity. Transportation Unit ResourceInformation includes information on one to multiple transportation unit resources, such as resource type and related properties. For example, related measures or handling instructions can be included. A Transportation Unit Resource can be a unit into which goods are loaded and/or from which goods are unloaded. In some implementations, this unit can provide transportation capacity for goods but cannot move by itself. It includes the entities TransportationStageAssignment, AttachedEquipment, Quantity, Seal, BusinessTransactionDocumentReference, TextCollection, Location, and DangerousGoods. ID can be a unique identifier for a resource information and can be based on GDT ResourceInformationID. ResourceNumberValue can be a number of resources and can be based on GDT: NumberValue, Qualifier: Resource. ResourceID can be a unique identifier for a resource and can be based on GDT: ResourceID. ResourceHomeCountryCode can be a coded representation of the home country of a resource and can be based on GDT: CountryCode, Qualifier: ResourceHome. TransportationUnitResourceCategoryCode can be a coded representation of a category of transportation unit resources and can be based on GDT: TransportationUnitResourceCategoryCode. TransportationUnitResourceTypeCode can be a coded representation of a type of a transportation unit resource and can be based on GDT: TransportationUnitResourceTypeCode. FillLevelCode can be a coded representation of a fill level of a resource and can be based on GDT: FillLevelCode. ShippingTypeCode can be a coded representation of a shipping type. In some implementations, the shipping type can specify the how the planning and execution of a transportation can be performed. The transportation terms include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be an inland transport of cargo. HaulageArrangerCode can be based on GDT: HaulageArrangerCode. TransportationHandlingInstructionCode can be a coded representation of a type of transportation handling instruction and can be based on GDT: TransportationHandlingInstructionCode. TransportationHandlingInstructionNote can be a note regarding a transportation handling instruction and can be based on GDT: LONG_Note, Qualifier: TransportationHandlingInstruction. TransportationStageAssignment can specify an assignment of a transportation stage to a transportation unit resource information. ShipmentRequestTransportationStageID can be a unique identifier of a TransportationStage in a shipment request and can be based on GDT: TransportationStageID. AttachedEquipment can specify an equipment that is attached to a TransportationUnitResource. ShipmentRequestResourceInformationID can be a unique identifier of a resource information in a ShipmentRequest and can be based on GDT: ResourceInformationID. Quantity can specify a quantity related to a TransportationUnitResourceInformation. Seal can specify a seal related to a TransportationUnitResource. BusinessTransactionDocumentReference can specify a business document reference that is related to a TransportationUnitResource. It includes the DateTimePeriod entity. DateTimePeriod can specify date, time and/or period related to a BusinessTransactionDocumentReference. TextCollection can be a group of textual information that relates to a TransportationUnitResource. TextCollection can be based on GDT: TextCollection. Location can specify a physical place related to a TransportationUnitResource. DateTimePeriods can specify a requested and an acceptable date, time and period related to a Location of a resource. DangerousGoods can specify dangerous goods included in a resource. DangerousGoods includes the ContactInformation and TextCollection entities. The structure of DangerousGoods includes ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based on GDT: DangerousGoodsID. RegulationsCode can be a coded representation of national or international dangerous goods rules or regulations. RegulationsCode can be based on GDT: DangerousGoodsRegulationsCode. HazardCode can be a coded representation of a hazard that is imminent in a dangerous good, and can be based on GDT: DangerousGoodsHazardCode. FlashpointMeasureInterval can be an interval of measures defined by a lower and an upper boundary indicating a flashpoint of a dangerous good. FlashpointMeasureInterval can be based on GDT: MeasureInterval, Qualifier: Flashpoint. PackagingGroupCode can be a coded representation of the effectiveness of a packaging to transport dangerous goods depending on the degree of danger of the goods. It can be based on GDT: DangerousGoodsPackagingGroupCode. EmergencySchedule can be a coded representation of an emergency schedule for dangerous goods. It can identify an emergency schedule. The DangerousGoodsEmergencySchedule can be used for transport of dangerous goods by sea similar to the Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident. It can be based on GDT: TransportEmergencyCardCode. DangerousGoodsLabelCode can be a coded representation of a label for a dangerous good. In some implementations, DangerousGoodsLabelCode's values are dependant on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependant on the DangerousGoodsRegulationsCode, and can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode, and can be based on GDT: DangerousGoodsLabelCode. PackagingInstructionTypeCode can be a coded representation of a packaging instruction. A packaging instruction can be an instruction defining which packagings can be used to pack a dangerous good. PackagingInstructionTypeCode can be based on GDT: PackagingInstructionTypeCode. TransportMeansDescriptionCode can be a coded representation of a transport means type with which goods or persons can be transported. It can be based on GDT: TransportMeansDescriptionCode. TransportAuthorisationCode can be a coded representation of an authorisation for the transportation of dangerous goods. This code can specify an authorisation for the transportation of a particular dangerous good. It can be based on GDT: DangerousGoodsTransportAuthorisationCode. ContactInformation can specify information on a department or person to whom information regarding dangerous goods can be directed. The structure of ContactInformation includes ContactPersonFunctionTypeCode and Address. ContactPersonFunctionTypeCode can be a coded representation of a type of function that a contact person has, and can be based on GDT: ContactPersonFunctionTypeCode. Address can be an address related to the contact information defined by the corresponding FunctionTypeCode, and can be based on GDT: Address. TextCollection can be a group of textual information that relates to the DangerousGoods. TextCollection can be based on GDT: TextCollection.

The PackageInformation package includes information regarding the packages of the goods that are to be transported. It includes the PackageInformation entity. PackageInformation can describe package information related to a whole shipment request. PackageInformation includes the entities ItemAssignment, TransportationUnitResourceInformationAssignment, Quantity, and TextCollection. The structure of PackageInformation includes ID, PackageID, PackageOrdinalNumberValue, PackageNumberValue, PackageTypeCode, PackagingLevelCode, PackageMarkingInstructionCode, and PredecessorPackageID. ID can be a unique identifier for a package information and can be based on GDT: PackageInformationID. PackageID can be a unique identifier of a package used in a packaging, and can be based on GDT: PackageID. PackageOrdinalNumberValue can be an ordinal Number to indicate the position of a package in a set of packages. In a transportation document, the position of a package can be a position that has been specified at shipping time. PackageOrdinalNumberValue can be based on GDT: OrdinalNumberValue, Qualifier: Package. PackageNumberValue can be the number of packages used in a packaging, and can be based on GDT: NumberValue, Qualifier: Package. PackageTypeCode can be a coded representation of a package type, and can be based on GDT: PackageTypeCode. PackagingLevelCode can be a coded representation of a packaging level. A packaging level can specify a rank of packaging in a packaging hierarchy. PackagingLevelCode can be based on GDT: PackagingLevelCode. PackageMarkingInstructionCode can be a coded representation of a marking instruction of a package, and can be based on GDT: PackageMarkingInstructionCode. PredecessorPackageID can be a unique identification of a related package, and can be based on GDT: PackageID. In some implementations, PredecessorPackageID may be filled in case a PackageID is available. ItemAssignment can specify an assignment of a packaging to an item with corresponding information on measures, quantities, contents and references on related documents. PredecessorPackageID includes the entities Quantity, BusinessTransactionDocumentReference, and TransportationGoodsIdentification. The structure of ItemAssignment includes ShipmentRequestItemID. ShipmentRequestItemID can be a unique identifier of an item of a ShipmentRequest, and can be based on GDT: BusinessTransactionDocumentItemID. Quantity can specify a quantity related to an assignment of a packaging to an item. BusinessTransactionDocumentReference can specify a business document reference that is related to an assignment of a packaging to an_Item. BusinessTransactionDocumentReference includes the DateTimePeriod entity. DateTimePeriod can describe date, time and/or period information related to a BusinessTransactionDocumentReference. TransportationGoodsIdentification can describe content identification related to a PackagingItem. The structure of TransportationGoodsIdentification includes TransportationGoodsIdentifierTypeCode, LowerBoundaryTransportationGoodsID, and UpperBoundaryTransportationGoodsID. TransportationGoodsIdentifierTypeCode can be a coded representation of a type of identifier for transportation goods. Goods can be movable property, merchandise or wares. Transportation Goods can be goods that are to be transported. TransportationGoodsIdentifierTypeCode can be based on GDT: TransportationGoodsIdentifierTypeCode. LowerBoundaryTransportationGoodsID can be a lower boundary of a TransportationGoodsID interval. In some implementations, it can also be used for intervals that contain a single value. LowerBoundaryTransportationGoodsID can be based on GDT: TransportationGoodsID, Qualifier: LowerBoundary. UpperBoundaryTransportationGoodsID can be an upper boundary of a TransportationGoodsID interval, and can be based on GDT: TransportationGoodsID, Qualifier: UpperBoundary. TransportationUnitResourceInformationAssignment can specify the assignment of a packaging to a TransportationUnitResourceInformation with corresponding quantity information. The structure of TransportationUnitResourceInformationAssignment can include ShipmentRequestResourceInformationID. ShipmentRequestResourceInformationID can be a unique identifier of a TransportationUnitResourceInformation in a shipment request, and can be based on GDT: ResourceInformationID. Quantity can specify a quantity related to the TransportationUnitResourceAssignment. Quantity can specify a quantity related to packaging. TextCollection can be a group of textual information of any type that relates to the Packaging. TextCollection can be based on GDT: TextCollection.

The TransportationChargesInformation package includes information regarding transportation charge calculation specific components related to the ShipmentRequest. It includes the TransportationChargesInformation entity. In some implementations, the TransportationChargesInformation entity defines a relationship between transportation charges and the origin of those charges. It includes the TransportationCharges entity. The structure of TransportationChargesInformation can include TransportationChargesUsageCode, ShipmentRequestItemID, ShipmentRequestPartyStandardID, ShipmentRequestPartyInternalID, ShipmentRequestResourceInformationID, ShipmentRequestPackageInformationID, and ShipmentRequestTransportationStageID. TransportationChargesUsageCode can be a coded representation of usage of TransportationCharges. The usage can point out if subsequent information represents a revenue or cost-view on transportation charges. TransportationChargesUsageCode can be based on GDT: TransportationChargesUsageCode. ShipmentRequestItemID can be a unique identifier of an Item in a ShipmentRequest, and can be based on GDT: BusinessTransactionDocumentItemID. ShipmentRequestPartyStandardID can be a unique identifier of a Party in a ShipmentRequest, and can be based on GDT: PartyStandardID. ShipmentRequestPartyInternalID can be based on GDT: PartyInternalID. ShipmentRequestResourceInformationID can be a unique identification of a TransportationUnitResource in a ShipmentRequest. It can be based on GDT: ResourceInformationID. ShipmentRequestPackageInformationID can be a unique identification of a PackageInformation in a ShipmentRequest, and can be based on GDT: PackageInformationID. ShipmentRequestTransportationStageID can be a unique identification of a TransportationStage in a ShipmentRequest, and can be based on GDT: TransportationStageID. In some implementations, the following Integrity Condition can exist: in case none of the IDs is maintained, the transportation charges are related to the whole shipment request. TransportationCharges can be a summary of determined transportation charge specific components for a transportation business case. It can include the entities Location, TextCollection, Currency, ExchangeRate, PercentElement, DateTimePeriod, BusinessTransactionDocumentReference, TaxDetail, PaymentInstruction, CashDiscountTerms, and Element. The structure of TransportationCharges includes ID, FreightAgreementID, CalculationOriginCode, TariffID, and CalculationSheetID. ID can be a unique identifier of TransportationCharges in a ShipmentRequest, and can be a GDT: TransportationChargesID. FreightAgreementID can be an identification of a Freight Agreement which includes and points to a configuration for a Transportation Charges Calculation. FreightAgreementID can be based on GDT: FreightAgreementID. CalculationOriginCode can be a coded representation of the origin of the transportation charges calculation. The calculation can be done automatically based on a system configuration. Data for a calculation including results can be manually entered or received from another business system via a message. In some implementations, there is a distinction of the origin of TransportationChargesCalculation details such as the TransportationChargesCalculationSheet and its TransportationChargeElements. It can give information whether the calculation was done completely automatically, or if the results were manually adopted. TransportationOriginCode can be based on GDT: TransportationChargesOriginCode. TariffID can be an identifier for a transportation charges tariff. A transportation charges tariff can be a specific combination of a transportation charges calculation sheet and terms and conditions. The terms and conditions can define if a certain transportation charges calculation sheet and its related rates can be applicable for a transportation business case. TariffID can be based on GDT: TransportationChargesTariffID. CalculationSheetID can be a unique Identifier for a transportation charges calculation sheet. A TransportationChargesCalculationSheet can represent a configuration for how to calculate transportation charges for a transportation business case. It includes instructions, which charges are applicable, which data from the transportation business case can be considered for the calculation, how the underlying transportation charge rates are determined, and which special calculation methods can be considered. CalculationSheetID can be based on GDT: TransportationChargesCalculationSheetID. The Location can specify a physical place to which the TransportationCharges and their calculation can refer. Location includes the DateTimePeriod entity. The structure of Location can include the elements Location, RoleCode, TypeCode, and Name. Location can include information that is exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location, and can be based on GDT: LocationTypeCode. Name can be a name of a location, and can be based on GDT: MEDIUM_Name, Qualifier: Location. DateTimePeriods can specify a date, time and/or period related to the TransportationChargesLocation. TextCollection can be a group of textual information that relates to the TransportationCharges. TextCollection can be based on GDT: TextCollection. Currency can be a currency which is valid for transportation charges. The structure of Currency includes Code, RoleCode, and UsageCode. Code can be a coded representation of a currency, and can be based on GDT: CurrencyCode. RoleCode can be a coded representation of the role of a Currency, and can be based on GDT: CurrencyRoleCode. UsageCode can be a coded representation of how a currency is used, and can be based on GDT: CurrencyUsageCode. In some implementations, this currency is valid for transportation charges, as long as there is no currency information on a charge element level. ExchangeRate can be an exchange rate that has been negotiated for transportation charges. The structure of ExchangeRate includes ExchangeRate and TypeCode. ExchangeRate can be a rate at which one unit of a currency can be changed into another currency, and can be based on GDT: ExchangeRate. TypeCode can be a coded representation of a type of an exchange rate. In some implementations, the actual exchange rate between two currencies depends on exchange rate type and currency conversion type. The exchange rate type can define characteristics of an exchange rate according to currencies that get converted. TypeCode can be based on GDT: ExchangeRateTypeCode. PercentElement can be a detail, represented as a percentage, about Transportation Charges. The structure of PercentElement can include PercentRoleCode, Percent, TransportationChargesCalculationsBaseCode, and StatusCode. PercentRoleCode can be a coded representation of the role of a percent, and can be based on GDT: PercentRoleCode. Percent can be a number that relates to the comparison FIG. 100, and can be based on GDT: Percent. TransportationChargesPercentCalculationBaseCode can be a coded representation of a calculation base for a transportation charges percent, and can be based on GDT: TransportationChargesPercentCalculationBaseCode. StatusCode can be a coded representation of a status for a transportation charges percent element, and can be based on GDT: TransportationChargesPercentElementStatusCode. DateTimePeriod can specify a date, time and/or period that can be relevant for the transportation charges calculation. A BusinessTransactionDocumentReference can specify a business document reference that can be related to the transportation charges calculation. A TaxDetail can be a tax-relevant information which can be applicable for each ChargeElement. ProductTax can be a tax that is incurred for product-related business transactions, such as purchasing, sales, or consumption. The ProductTax can be used to display different tax components in the calculated and invoiced amounts, and to inform about tax declarations and payments of a company to the responsible tax authorities. ProductTax can be based on GDT: ProductTax. In some implementations, within TaxDetail, the BusinessTransactionDocumentItemGroupID of the GDT ProductTax is not used. PaymentInstruction can be an instruction about how a payment can be carried out or which additional activities can be carried out within a payment. There can be a separate instance for each Charge Category Code such as Basic Freight, Origin haulage charges etc. The structure of PaymentInstruction can include PaymentInstruction, TransportationChargesElementCategoryCode, TransportationChargesElementSubCategoryCode, and TransportationChargesPaymentArrangementCode. PaymentInstruction can be an instruction about how a payment can be carried out or which additional activities can be carried out within a payment. It can be based on GDT: PaymentInstruction. TransportationChargesElementCategoryCode can be a coded representation of the category of a TransportationChargeElement. The TransportationChargeElementCategoryCode can be used to group TransportationChargeElements. In some implementations, PaymentInstructions may be different per TransportationChargeElementCategory. TransportationChargesElementCategoryCode can be based on GDT: TransportationChargesElementCategoryCode. TransportationChargesElementSubCategoryCode can be a coded representation of the subcategory of a transportation charges element, and can be based on GDT: TransportationChargesElementSubCategoryCode. TransportationChargesPaymentArrangementCode can be a coded representation of an arrangement of a payment for the transportation charges, and can be based on GDT: TransportationChargesPaymentArrangementCode. CashDiscountTerms can be an agreement on a percentage of cash discount that is granted during a transportation transaction when payment takes place within a certain number of days after a baseline date for payment has passed. The structure of CashDiscountTerms can include CashDiscountTerms, TransportationChargesElementCategoryCode, and TransportationChargesElementSubCategoryCode. CashDiscountTerms can be an agreement of cash discounts for a payment, and can be based on GDT: CashDiscountTerms. TransportationChargesElementCategoryCode can be a coded representation of a category of a TransportationChargesElement. The TransportationChargesElementCategoryCode can be used to group TransportationChargesElements. In some implementations, PaymentInstructions can be different per TransportationChargesElementCategory. TransportationChargesElementCategoryCode can be based on GDT: TransportationChargesElementCategoryCode. TransportationChargesElementSubCategoryCode can be a coded representation of a subcategory of a transportation charges element, and can be based on GDT: TransportationChargesElementSubCategoryCode.

Element can be, together with its sub nodes, a single 'building block' of a transportation charge calculation. A Charge Element can result from either a manually created charge, an automatically determined charge, or another Charge Element distributed from an entire document. Charge Element can include the entities Location, TextCollection, Currency, RateElement, PercentElement, AmountElement, CalculationBase, TaxDetail, DateTimePeriod, and CostDistribution. The structure of Element can include CategoryCode, SubCategoryCode, TypeCode, CalculationResolutionCode, and TransportationChargesPaymentArrangementCode. CategoryCode can be a coded representation of a category of a TransportationChargesElement. The TransportationChargesElementCategoryCode can be used to group TransportationChargesElements. In some implementations, PaymentInstructions can be different per TransportationChargesElementCategory. CategoryCode can be based on GDT: TransportationChargesElementCategoryCode. SubCategoryCode can be a coded representation of a subcategory of a transportation charges element, and can be based on GDT: TransportationChargesElementSubCategoryCode. TypeCode can be a coded representation of a type of a transportation charge element. TypeCode can be based on GDT: TransportationChargesElementTypeCode. CalculationResolutionCode can be a coded representation of a resolution for a transportation charges element calculation, and can be based on GDT: TransportationChargesElementCalculationResolutionCode. TransportationChargesPaymentArrangementCode can be a coded representation of an arrangement of a payment for transportation charges. It can be based on GDT: TransportationChargesPaymentArrangementCode. Location can specify a physical place a specific ChargeElement refers to. It includes the DateTimePeriod entity. DateTimePeriods can specify a date, time and/or period related to a location. TextCollection can be a group of textual information that relates to a ChargeElement. TextCollection can be based on GDT: TextCollection. Currency can emphasize if a ChargeElement can be considered with relation to a certain currency. RateElement can specify a rate with which a ChargeElement is calculated. The structure of RateElement can include ID, Amount, BaseQuantity, TransportationChargesRateTypeCode, TransportationChargesRateRoleCode, and TransportationChargesRateElementStatusCode. ID can be a unique Identifier of a rate element of a transportation charges element, and can be based on GDT: TransportationChargesElementRateElementID. Amount can be an amount with a corresponding currency unit. It can be a monetary amount of a rate. Amount can be based on CDT: Amount. BaseQuantity can be a non-monetary numerical specification of an amount in a unit of measurement. It can be a quantity to which an amount refers. BaseQuantity can be based on CDT: Quantity, Qualifier: Base. TransportationChargesRateTypeCode can be a coded representation of a TransportationChargeRate type. Examples can include 'gross weight rate' or 'net weight rate'. TransportationChargesRateTypeCode can be based on GDT: TransportationChargesRateTypeCode. TransportationChargesRateRoleCode can be a coded representation of a role of a TransportationChargeRate. Examples can include an 'invoice rate' or a 'rate only for calculation purpose'. TransportationChargesRateRoleCode can be based on GDT: TransportationChargesRateRoleCode. TransportationChargesRateElementStatusCode can be a coded representation of a status of a transportation charges rate element, and can be based on GDT: TransportationChargesRateElementStatusCode. PercentElement can be a detail about a transportation charges element, represented as a percentage. AmountElement can represent a monetary aspect of a Transportation Charge. It can be a result of a transportation charge calculation. In some implementations, there can be a separate instance for each monetary amount per AmountRoleCode. AmountElement includes the RateElementAssignment entity. The structure of AmountElement can include Amount, AmountRoleCode, and TransportationChargesAmountElementStatusCode. Amount can be an amount with a corresponding currency unit, and can be based on CDT: Amount. AmountRoleCode can be a coded representation of a role of an amount, and can be based on GDT: AmountRoleCode. TransportationChargesAmountElementStatusCode can be a coded representation of a status of an amount element of transportation charges or its transportation charges element. TransportationChargesAmountElementStatusCode can be based on GDT: TransportationChargesAmountElementStatusCode. RateElementAssignment can be an assignment of an amount to a RateElement. TransportationChargesElementRateElementID can be a unique Identifier of a rate element of a transportation charges element. TransportationChargesElementRateID can be based on GDT: TransportationChargesElementRateElementID.

CalculationBase can be data which was together with the RateDetail the basis for calculating the Amount. The structure of CalculationBase can include TransportationChargesElementCalculationBaseCode, BaseQuantity, BaseQuantityRoleCode, and BaseQuantityTypeCode. TransportationChargesElementCalculationBaseCode can be a coded representation of a calculation base of a transportation charges element, and can be based on GDT: TransportationChargesElementCalculationBaseCode. BaseQuantity can be a non-monetary numerical specification of an amount in a unit of measurement. It can be a value of a calculation base as a quantity. BaseQuantity can be based on GDT: Quantity, Qualifier: Base. BaseQuantityRoleCode can be a coded representation of a role of a quantity, and can be based on GDT: QuantityRoleCode. BaseQuantityTypeCode can be a coded representation of a type of quantity that is based on a measurable characteristic of an object or physical phenomenon, and can be based on GDT: QuantityTypeCode. TaxDetail can be tax-relevant information which can be applicable for each ChargeElement. DateTimePeriod can specify a date, time and/or period related to a ChargeElement. CostDistribution can be information on how a ChargeElement can be allocated, or distributed, from a financial accounting point of view. An AccountingCodingBlockAssignment can be an assignment of something to a coding block. Items that can be assigned to a coding block can be an amount that is known from a context, a quantity, or a company resource such as office space or working time. A coding block can be a set of account assignment objects of different types. An account assignment object can be a business object to which value changes from business transactions can be assigned in Accounting. AccountCodingBlockAssignment can be based on GDT: AccountingCodingBlockAssignment.

The Item package includes information regarding products included in a shipment request and additional information on those products. It includes the Item entity. It includes the packages ItemInformation, GovernmentalRequirementInformation, PartyInformation, LocationInformation, and TransportGoodsInformation. Item can specify products included in a shipment request and additional information about those products. The structure of Item can include ID, OriginCountryCode, DestinationCountryCode, ShippingTypeCode, HaulageArrangerCode, TemperatureMeasureInterval, TransportationHandlingInstructionCode, and TransportationHandlingInstructionNote. ID can be a unique identifier of an Item in a shipment request and can be based on GDT: BusinessTransactionDocumentItemID. OriginCountryCode can be a country of origin of goods that are considered in a shipment request. OriginCountryCode can be based on GDT: CountryCode, Qualifier: Origin. DestinationCountryCode can be the ultimate country of destination of goods that are considered in a shipment request. It can be based on GDT: CountryCode, Qualifier: Destination. ShippingTypeCode can be a coded representation of a shipping type. In some implementations, the shipping type can specify how planning and execution of a transportation can be performed. Transportation terms include detailed specifications on agreed means of transportation, such as shipping or transport type, and means of transport to be used. ShippingTypeCode can be based on GDT: ShippingTypeCode. HaulageArrangerCode can be a coded representation of an arranger of a haulage. Haulage can be an inland transportation of cargo. It can be based on GDT: HaulageArrangerCode. TemperatureMeasureInterval can be an interval of temperature measures defined by a lower and an upper boundary and a measure type code. It can be based on GDT: MeasureInterval, Qualifier: Temperature. TransportationHandlingInstructionCode can be a coded representation of a transportation handling instruction, and can be based GDT: TransportationHandlingInstructionCode. TransportationHandlingInstructionNote can be a note regarding a transportation handling instruction, and can be based on GDT: TransportationHandlingInstructionNote. In some implementations, for a measure related to a temperature, only the units of measurement Celsius and Fahrenheit are allowed.

The ItemInformation package can specify products included in a shipment request and additional information related to a transportation of these products. It includes the entities Amount, TextCollection, NatureOfCargo, Quantity, TransportationDocumentInformation, BusinessTransactionDocumentReference, DangerousGoods, TransportationStageAssignment, and TransportationUnitResourceInformationAssignment. The Amount can specify a monetary amount associated with an item, for example, a declared value or insured value. TextCollection can be a group of textual information of any type that relates to an item. TextCollection can be based on GDT: TextCollection. NatureOfCargo can indicate a nature of cargo related to an item, for example, palletized, containerized, documents. Quantity can specify a quantity related to an item. TransportationDocumentInformation can specify information on a transportation document. It includes the DateTimePeriod entity. DateTimePeriod can specify a date, time and/or Period related to Documentation. BusinessTransactionDocumentReference can specify a business document reference that is related to an item. It includes the DateTimePeriod entity. DateTimePeriod can specify a date, time and/or Period related to a BusinessTransactionDocumentReference. DangerousGoods can specify identification, description and classification of dangerous goods related to an item. It includes the entities ContactInformation, Quantity, TextCollection, and TransportationUnitResourceInformationAssignment. ContactInformation can specify information on a department or person to whom information regarding dangerous goods can be directed. Quantity can specify a quantity of the DangerousGoods. TextCollection can be a group of textual information that relates to a ItemDangerousGoods. TextCollection can be based on GDT: TextCollection. TransportationUnitResourceAssignment can specify an assignment of dangerous goods of an item to a TransportationUnitResource with corresponding quantity information. It includes the Quantity entity. ShipmentRequestResourceInformationID can be a unique identifier of a TransportationUnitResource, and can be based on GDT: ResourceInformationID. Quantity can specify a quantity related to dangerous goods assigned to a Resource. The TransportationStageAssignment can specify an assignment of an item to a transportation stage with corresponding quantity information. ShipmentRequestTransportationStageID can be a unique Identifier of a TransportationStage, and can be based on GDT: TransportationStageID. The Quantity can specify a quantity related to an item assigned to a transportation stage. TransportationUnitResourceInformationAssignment can specify an assignment of an item to a transportation unit resource information with corresponding quantity information. It includes the Quantity entity. ShipmentRequestTransportationUnitResourceID can be a unique identifier of a TransportationUnitResource, and can be based on GDT: ResourceID. Quantity can specify a quantity related to an item which is assigned to a TransportationUnitResource.

The GovernmentalRequirementInformation Package can specify governmental requirements related to an item.

The ItemPartyInformation package includes information regarding a party of an item. It includes the Party and DateTimePeriods entities. Party includes information that is exchanged, in accordance with common business understanding, in business documents about a party involved in business transactions. This information can be used to identify a party and the party's address, as well as a party's contact person and the contact person's address. This identification can take place using an internal ID, a standardized ID, or IDs assigned by the parties involved. It includes the DateTimePeriods entity. DateTimePeriods can specify a requested and an acceptable date, time and period related to the Party.

A requested period can be a period in which an event is requested to take place. An acceptable period can be a period in which an event may take place at an earliest start date/time) to a latest end date/time.

The ItemLocationInformation package includes information regarding a location that is related to an item. It includes the Location and LocationDateTimePeriods entities. Location can specify a physical place which is part of a shipment request item. It includes the DateTimePeriods entity. The DateTimePeriods can specify a requested and an acceptable date, time and period related to a Location. A requested period can be a period in which an event is requested to take place. An acceptable period can be a period in which an event may take place at an earliest start date/time to a latest end date/time.

The TransportationGoodsInformation package can group information on goods that can be transported according to an item. It includes the ProductInformation and TransportationGoodsIdentification entities. ProductInformation includes information on a commodity that is an object of business activity of a company and serves to generate value for the company. It can be tangible or intangible. A product can have relationships to other products or objects. For example, there can be a service for a specially manufactured product. The structure of ProductInformation can include Product and ProductDescription. Product can include information that is exchanged, in accordance with common business understanding, in business documents about a product. Product can be based on GDT: BusinessTransactionDocumentProduct. ProductDescription can be a natural-language representation of the properties of a product, and can be based on GDT: SHORT Description, Qualifier: Product. TransportationGoodsIdentification can describe content identification related to the PackagingItem.

Message Data Type ShipmentRequestCancelRequestMessage

The message data type ShipmentRequestCancelMessage can group together business information that can be relevant for sending a business document in a message and a ShipmentRequest object in a business document. It includes the BusinessDocumentMessageHeader and ShipmentRequest packages.

A MessageHeader package can group together business information that can be relevant for sending a business document in a message. It includes the MessageHeader entity. A MessageHeader can group together business information from a perspective of a sending application to identify a business document in a message, to provide information about the sender, or to provide information about the recipient. The MessageHeader can be divided up into the SenderParty and RecipientParty entities. It can be of type GDT: BusinessDocumentMessageHeader. The MessageHeader can include the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty can include the following elements: InternalID, StandardID, and ContactPerson. The SenderParty can be filled by the sending application to name a contact person for problems with the message. This can be useful if an additional infrastructure, such as a marketplace, is located between the sender and the recipient. The SenderParty can be used to transfer a message and can be ignored by the receiving application. In some implementations, SenderParty can be filled by the sender, particularly if the participating parties are not transferred with the ShipmentRequest package.

A RecipientParty can be a party responsible for receiving a business document at a business application level. The RecipientParty can be of type GDT: BusinessDocumentMessageHeaderParty. The RecipientParty can include the following elements: InternalID, StandardID, and ContactPerson. The RecipientParty can be filled by the sending application to name a contact person for problems that may occur with the message. This can be useful if an additional infrastructure, such as a marketplace, is located between the sender and the recipient. The RecipientParty can be used to transfer the message and can be ignored by the receiving application. In some implementations, RecipientParty can be filled by the sender if the ShipmentRequest package cannot be used to transfer the participating parties.

The ShipmentRequest package can group together information about a ShipmentRequest. ShipmentRequest includes the ShipmentRequest entity and the BusinessTransactionDocumentReference package. ShipmentRequest can be an agreement between a transportation service provider and an ordering party on the transportation of goods from a single ship-from party to a single ship-to party in accordance with agreed terms and conditions. The attributes and elements located directly at the ShipmentRequest entity can include ID. ID can be a unique identifier of a ShipmentRequest, and can be based on GDT: BusinessTransactionDocumentID.

The Request package can group the Request with its packages. It includes the Request entity and the BusinessTransactionDocumentReference package. Request can be an agreement between a transportation service provider and an ordering party on the transportation of goods from a single ship-from party to a single ship-to party in accordance with agreed terms and conditions.

A BusinessTransactionDocumentReference Package can group references to business documents. It includes the BusinessTransactionDocumentReference entity.

Message Data Type ShipmentRequestConfirmation

The message data type ShipmentRequestConfirmationMessage includes business information that is relevant for sending a business document in a message and the ShipmentRequest included in a business document. In some implementations, the message data type ShipmentRequestConfirmationMessage provides a structure for the message type ShipmentRequestConfirmationMessage and interfaces that are based on it.

A MessageHeader package can group together business information that is relevant for sending a business document in a message. It includes the MessageHeader entity. A MessageHeader can group together business information from the perspective of the sending application to identify a business document in a message, to provide information about the sender, or to provide information about the recipient. The MessageHeader can be divided up into the SenderParty and RecipientParty elements. MessageHeader can be of type GDT: BusinessDocumentMessageHeader. The MessageHeader can include the following elements: ID, ReferenceID, and CreationDateTime. The MessageID can be set by the sending application. With the ReferencedMessageID, reference can be made in the current BusinessDocument to a previous BusinessDocument. A SenderParty can be a party responsible for sending a business document at a business application level. The SenderParty is of type GDT: BusinessDocumentMessageHeaderParty. The SenderParty can include the following elements: InternalID, StandardID, and ContactPerson. The SenderParty can be filled by the sending application to name a contact person for problems with the message. This can be useful if an additional infrastructure, such as a marketplace, is located between the sender and the recipient. The SenderParty can be used to transfer a message and can be ignored by the receiving application. In some implementations, SenderParty can be filled by the sender, particularly if the participating parties are not transferred with the ShipmentRequest package. A RecipientParty can be a party responsible for receiving a business document at a business application level. The RecipientParty can be of type GDT: BusinessDocumentMessageHeaderParty. The RecipientParty can include the following elements: InternalID, StandardID, and ContactPerson. The RecipientParty can be filled by the sending application to name a contact person for problems that occur with the message. This can be useful if an additional infrastructure, such as a marketplace, is located between the sender and the recipient. The RecipientParty can be used to transfer a message and can be ignored by the receiving application. In some implementations, RecipientParty can be filled by the sender if the ShipmentRequest package cannot be used to transfer the participating parties.

The ShipmentRequest package can group the ShipmentRequest together with its packages. It includes the ShipmentRequest entity and the Confirmation package. ShipmentRequest can be an agreement between a transportation service provider and an ordering party on the transportation of goods from a single ship-from party to a single ship-to party in accordance with agreed terms and conditions.

The Confirmation package can be a confirmation of an agreement between a transportation service provider and an ordering party on the transportation of goods from a single ship-from party to a single ship-to party in accordance with agreed terms and conditions. The Confirmation package includes the Confirmation entity, which includes the packages HeaderInformation, TransportationChargesInformation, GovernmentalRequirementInformation, PartyInformation, LocationInformation, TransportationStageInformation, TransportationUnitResourceInformation, PackagingInformation, and Item. Confirmation can be a confirmation of an agreement between a transportation service provider and an ordering party on the transportation of goods from a single ship-from party to a single ship-to party in accordance with agreed terms and conditions. The structure of Confirmation includes DeliveryTerms and AcceptanceStatusCode. DeliveryTerms can be a collection of conditions and agreements that apply when delivering ordered goods and providing necessary services and activities. DeliveryTerms can be based on GDT: DeliveryTerms. AcceptanceStatusCode can be a coded representation of the status of an acceptance by a communication partner regarding a business transaction that has been transmitted to that partner. AcceptanceStatusCode can be based on GDT: AcceptanceStatusCode.

Message Data Type ShipmentRequestReceiptNotification

The message data type ShipmentRequestReceiptNotificationMessage includes business information that is relevant for sending a business document in a message and a ShipmentRequest included in a business document. In some implementations, the message data type ShipmentRequestReceiptNotificationMessage provides a structure for the message type ShipmentRequestReceiptNotificationMessage and for interfaces that are based on it.

A MessageHeader package can group together business information that is relevant for sending a business document in a message. It includes the MessageHeader entity. A MessageHeader can group together business information from the perspective of a sending application to identify a business document in a message, to provide information about the sender, or to provide information about the recipient. The MessageHeader can be divided up into the SenderParty and RecipientParty entities. MessageHeader can be of type GDT: BusinessDocumentMessageHeader. The MessageHeader can include the following elements: ID, ReferenceID, and CreationDateTime. The MessageID can be set by the sending application. With the ReferencedMessageID, reference can be made in the current BusinessDocument to a previous BusinessDocument. A SenderParty can be a party responsible for sending a business document at a business application level. The SenderParty can be of type GDT: BusinessDocumentMessageHeaderParty. The SenderParty can include the following elements: InternalID, StandardID, and ContactPerson. The SenderParty can be filled by a sending application to name a contact person for problems with the message. This can be useful if an additional infrastructure, such as a marketplace, is located between the sender and the recipient. The SenderParty can be used to transfer the message and can be ignored by the receiving application. In some implementations, SenderParty can be filled by the sender particularly if the participating parties are not transferred with the ShipmentRequest package. A RecipientParty can be a party responsible for receiving a business document at a business application level. The RecipientParty can be of type GDT: BusinessDocumentMessageHeaderParty. The RecipientParty can include the following elements: InternalID, StandardID, and ContactPerson. The RecipientParty can be filled by a sending application to name a contact person for problems that occur with a message. This can be useful if an additional infrastructure, such as a marketplace, is located between the sender and the recipient. The RecipientParty can be used to transfer a message and can be ignored by the receiving application. In some implementations, it can be filled by the sender if the ShipmentRequest package cannot be used to transfer the participating parties.

The ShipmentRequest package can group a ShipmentRequest with its packages. It includes the ShipmentRequest entity and the Request package. ShipmentRequest can be an agreement between a transportation service provider and an ordering party on the transportation of goods from a single ship-from party to a single ship-to party in accordance with agreed terms and conditions. ID can be a unique identifier of a ShipmentRequest, and can be based on GDT: BusinessTransactionDocumentID.

The Request package can group a Request with its packages. It includes the Request entity, and the HeaderInformation and PartyInformation packages. Request can be an agreement between a transportation service provider and an ordering party on the transportation of goods from a single ship-from party to a single ship-to party in accordance with agreed terms and conditions.

The HeaderInformation package can group dates, total values, documents and references related to the shipment request. It includes the entities: DateTimePeriods, TextCollection, and BusinessTransactionDocumentReference. DateTimePeriods can specify a requested and an acceptable date, time and period applying to a shipment request (e.g., date and time of document issue). A requested period can be a period in which an event is requested to take place. An acceptable period can be a period in which an event may take place at an earliest start date/time to a latest end date/time. TextCollection can be a group of textual information that relates to a ShipmentRequestConfirmation. TextCollection can be based on GDT: TextCollection. BusinessTransactionDocumentReference can specify a business document reference that is related to a whole shipment request. DateTimePeriod can specify date, time and/or period information related to a DocumentReference.

The PartyInformation package includes information regarding a party of a shipment request (i.e., Shipper, Carrier, Agent). PartyInformation includes the Party entity. Party includes information that is exchanged, in accordance with common business understanding, in business documents, about a party involved in business transactions. This information can be used to identify a party and the party's address, as well as the party's contact person and the contact person's address. This identification can take place using an internal ID, a standardized ID, or IDs assigned by the parties involved. The structure of the Party entity includes Party and RoleCode. A Party includes information that is exchanged, in accordance with common business understanding, in business documents about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, PartyRole is assigned to exactly one PartyRoleCategory and refines its semantics. RoleCode can be based on GDT: PartyRoleCode.

Message Data Type ShipmentRequestConfirmationReceiptNotification

The message data type ShipmentRequestConfirmationReceiptNotificationMessage includes business information that can be relevant for sending a business document in a message and a ShipmentRequest included in a business document. The message data type ShipmentRequestConfirmationReceiptNotificationMessage can provide a structure for the message type ShipmentRequestConfirmationReceiptNotificationMessage and for interfaces that are based on it.

A MessageHeader package can group together business information that is relevant for sending a business document in a message. It includes the MessageHeader entity. A MessageHeader can group together business information from the perspective of the sending application to identify a business document in a message, to provide information about the sender, and to provide information about the recipient. The MessageHeader can be divided up into the SenderParty and RecipientParty entities. MessageHeader can be of type GDT: BusinessDocumentMessageHeader. The MessageHeader can include the following elements: ID, ReferenceID, and CreationDateTime. The MessageID can be set by the sending application. With the ReferencedMessageID, reference can be made in the current BusinessDocument to a previous BusinessDocument. A SenderParty can be a party responsible for sending a business document at a business application level. The SenderParty can be of type GDT: BusinessDocumentMessageHeaderParty. The SenderParty can includes the following elements: InternalID, StandardID, and ContactPerson. The SenderParty can be filled by a sending application to name a contact person for problems with the message. This can be useful if an additional infrastructure, such as a marketplace, is located between the sender and the recipient. The SenderParty can be used to transfer a message and can be ignored by the receiving application. In some implementations, SenderParty is filled by the sender particularly if the participating parties are not transferred with the ShipmentRequest package. A RecipientParty can be a party responsible for receiving a business document at a business application level. The RecipientParty can be of type GDT: BusinessDocumentMessageHeaderParty. The RecipientParty can include the following elements: InternalID, StandardID, and ContactPerson. The RecipientParty can be filled by the sending application to name a contact person for problems that may occur with the message. This can be useful if an additional infrastructure, such as a marketplace, is located between the sender and the recipient. The RecipientParty can be used to transfer a message and can be ignored by the receiving application. In some implementations, RecipientParty can be filled by the sender if the ShipmentRequest package cannot be used to transfer the participating parties.

The ShipmentRequest package can group the ShipmentRequest with its packages. ShipmentRequest includes the ShipmentRequest entity and the Confirmation package. ShipmentRequest can be an agreement between a transportation service provider and an ordering party on the transportation of goods from a single ship-from party to a single ship-to party in accordance with agreed terms and conditions. ID can be a unique identifier of a ShipmentRequest, and can be based on GDT: BusinessTransactionDocumentID.

The Confirmation package can be a confirmation of an agreement between a transportation service provider and an ordering party on the transportation of goods from a single ship-from party to a single ship-to party in accordance with agreed terms and conditions. It includes the Confirmation entity and the HeaderInformation and PartyInformation packages. Confirmation can be a confirmation of an agreement between a transportation service provider and an ordering party on the transportation of goods from a single ship-from party to a single ship-to party in accordance with agreed terms and conditions.

The HeaderInformation package can group dates, total values, documents and references related to the shipment request. It can include the following entities: DateTimePeriods, TextCollection, and BusinessTransactionDocumentReference. DateTimePeriods can specify a requested and an acceptable date, time and period applying to a shipment request (e.g., date and time of document issue). A requested period can be a period in which an event is requested to take place. An acceptable period can be a period in which an event may take place at an earliest start date/time to a latest end date/time). TextCollection can be a group of textual information of that relates to a ShipmentRequestConfirmation. TextCollection can be based on GDT: TextCollection. BusinessTransactionDocumentReference can specify a business document reference that is related to a shipment request. DateTimePeriod can specify date, time and/or period information related to a DocumentReference. The PartyInformation package includes information regarding a party of a shipment request (i.e., Shipper, Carrier, Agent). PartyInformation includes the Party entity. Party includes information that is exchanged, in accordance with common business understanding, in business documents, about a party involved in business transactions. This information can be used to identify a party and the party's address, as well as the party's contact person and the contact person's address. This identification can take place using an internal ID, a standardized ID, or IDs assigned by the parties involved. The structure of the Party entity includes Party and RoleCode. Party includes information that is exchanged, in accordance with common business understanding, in business documents, about a party involved in business transactions. This information can be used to identify a party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations a party has regarding a business object and corresponding processes. In some implementations, PartyRole is assigned to exactly one PartyRoleCategory and refines its semantics. RoleCode can be based on GDT: PartyRoleCode.

SupplierFreightInvoiceRequest Interfaces

The Supplier Freight Invoice Request interfaces are part of the Shipper and Transportation Service Provision scenarios. They can trigger supplier invoice processing with calculated transportation charges and transportation data. A confirmation can be sent from supplier invoice processing with data of a created invoice document. A SupplierFreightInvoiceRequestRequest is a request for freight invoicing from supplier freight invoice request processing to supplier invoice processing. The structure of the SupplierFreightInvoiceRequestRequest can be specified by the message data type SupplierFreightInvoiceRequestRequestMessage. A SupplierFreightInvoiceRequestCancelRequest is a cancellation of a request for freight invoicing from supplier freight invoice request processing to supplier invoice processing. The structure of the SupplierFreightInvoiceRequestCancelRequest can be specified by the message data type SupplierFreightInvoiceRequestCancelRequestMessage.

A SupplierFreightInvoiceRequestConfirmation is a confirmation of a request for freight invoicing from supplier invoice processing to supplier freight invoice request processing. The structure of the SupplierFreightRequestConfirmation can be specified by the message data type SupplierFreightInvoiceRequestConfirmationMessage. The supplier freight invoice request messages can be implemented by six message interfaces (for example, three on the supplier freight invoice request processing side and three on the supplier invoice processing side). The supplier freight invoice request processing side can include SupplierFreightInvoiceRequestRequest_Out, SupplierFreightInvoiceRequestCancelRequest_Out and SupplierFreightInvoiceRequestConfirmation_In. The supplier invoice processing side can include SupplierFreightInvoiceRequestRequest_In, SupplierFreightInvoiceRequestCancelRequest_In, and SupplierFreightInvoiceRequestConfirmation_Out.

Figure 56:
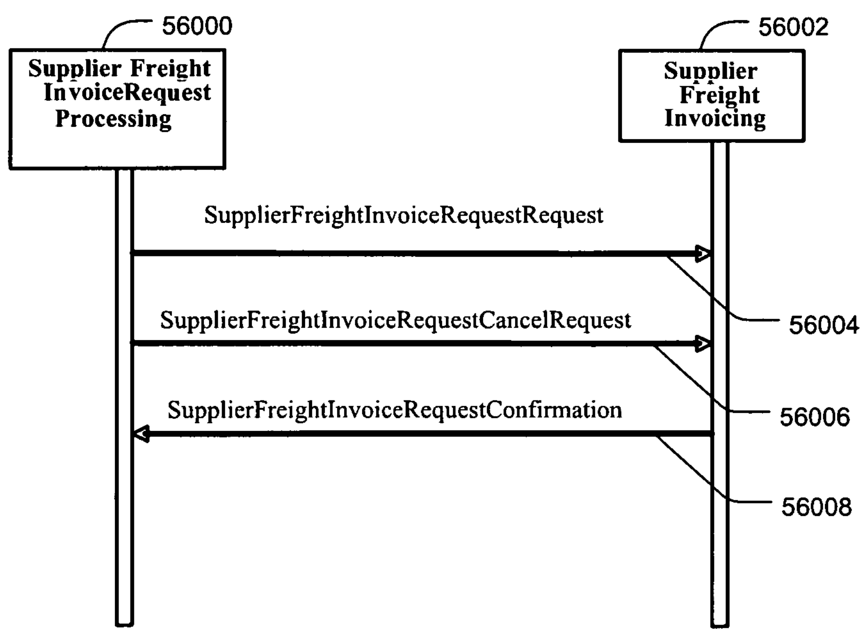

The message choreography of FIG. 56 describes a possible logical sequence of messages that can be used to realize a Supplier Freight Invoicing business scenario. A "Supplier Freight Invoice Request Processing" system 56000 can request a supplier freight invoice using a SupplierFreightInvoiceRequestRequest message 56004 as shown, for example in FIG. 56. A "Supplier Freight Invoicing" system 56002 can confirm the request using a SupplierFreightInvoiceRequestConfirmation message 56008 as shown, for example, in FIG. 56. The "Supplier Freight Invoice Request Processing" system 56000 can request the cancellation of a supplier freight invoice using a SupplierFreightCancelRequest message 56006 as shown, for example, in FIG. 56. The "Supplier Freight Invoicing" system 56002 can confirm the request for cancellation using a SupplierFreightInvoiceRequestConfirmation message 56008 as shown, for example, in FIG. 56.

Figures 1, 57:
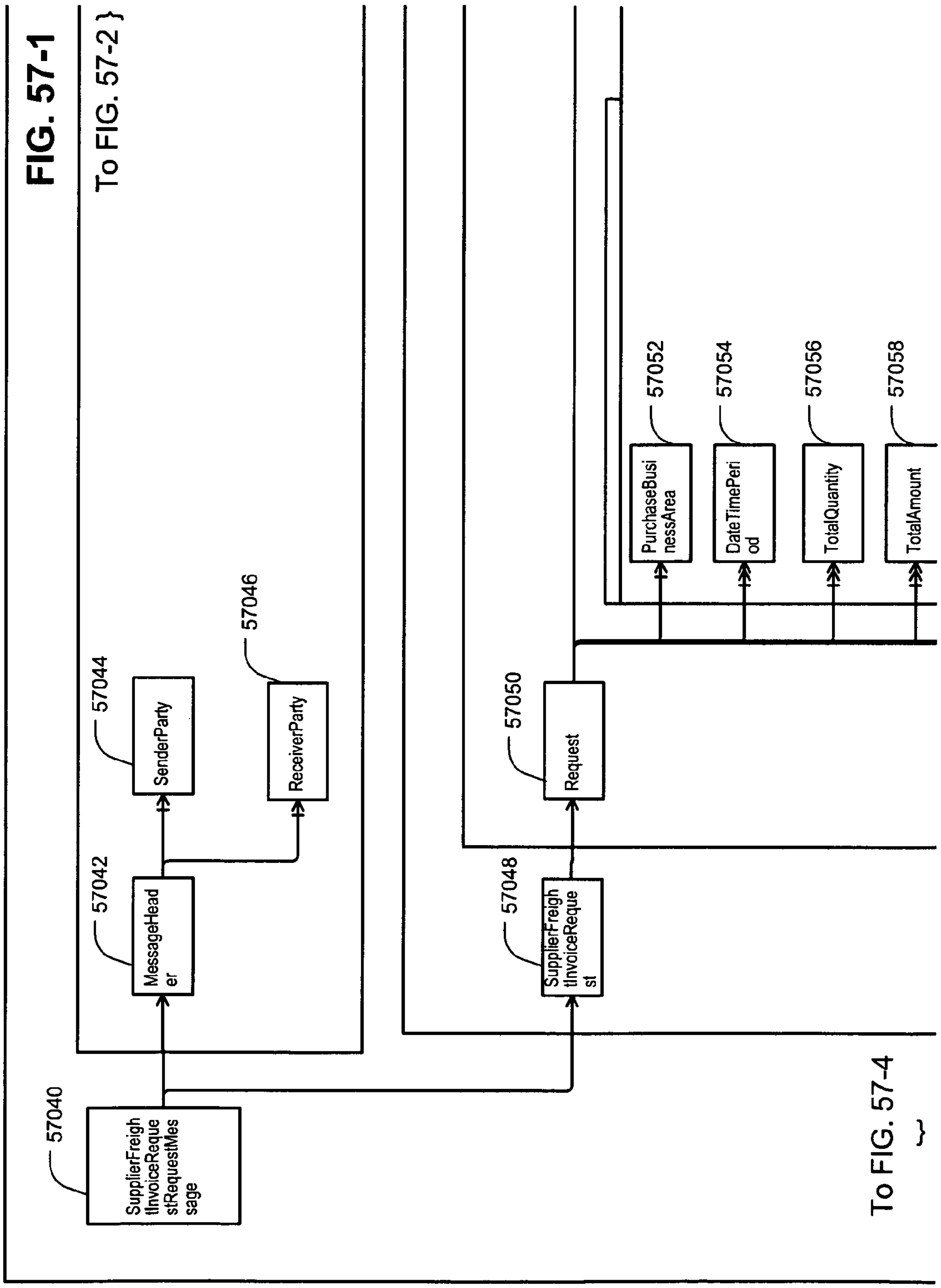
Figures 2, 57:
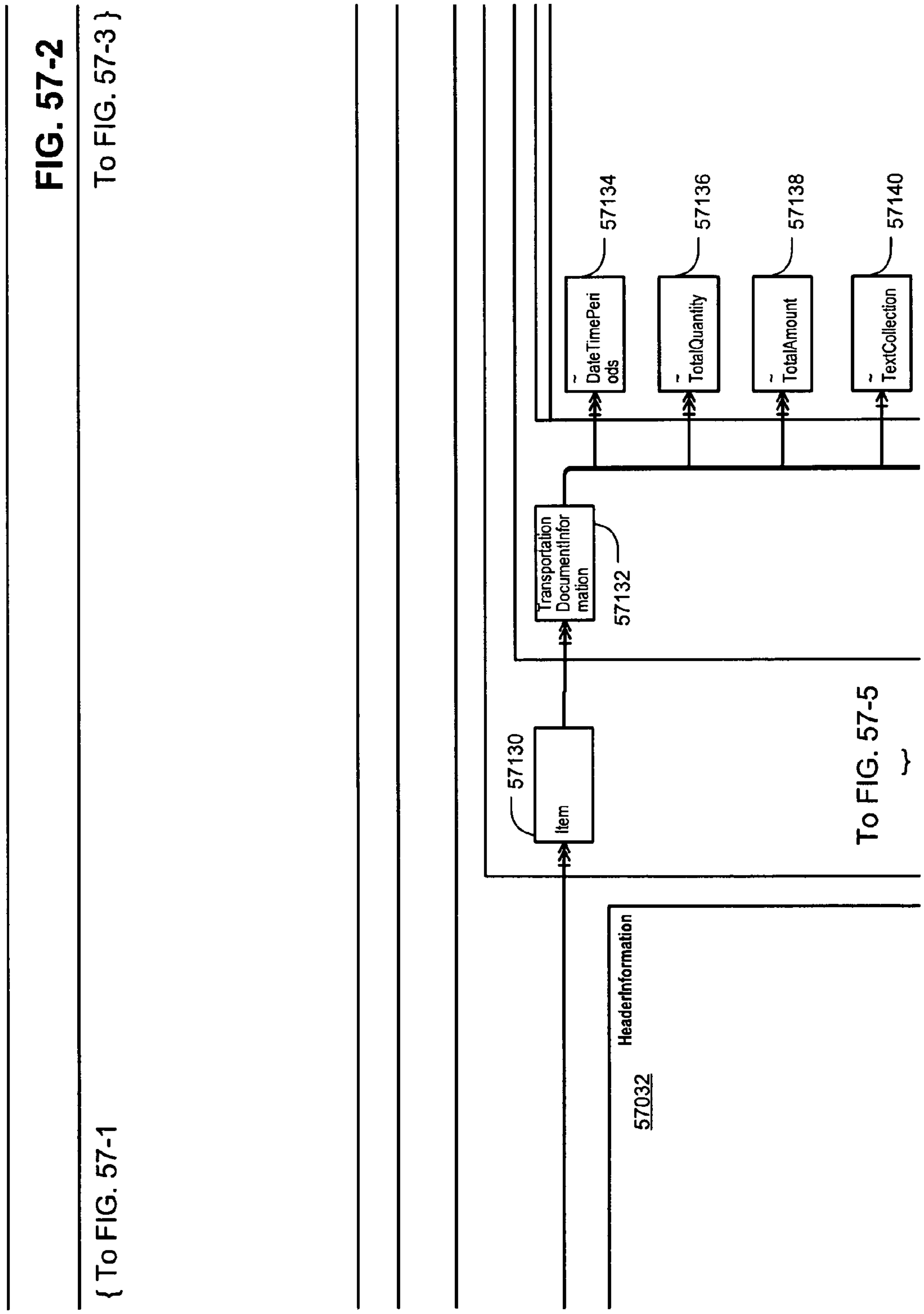
Figures 3, 57:
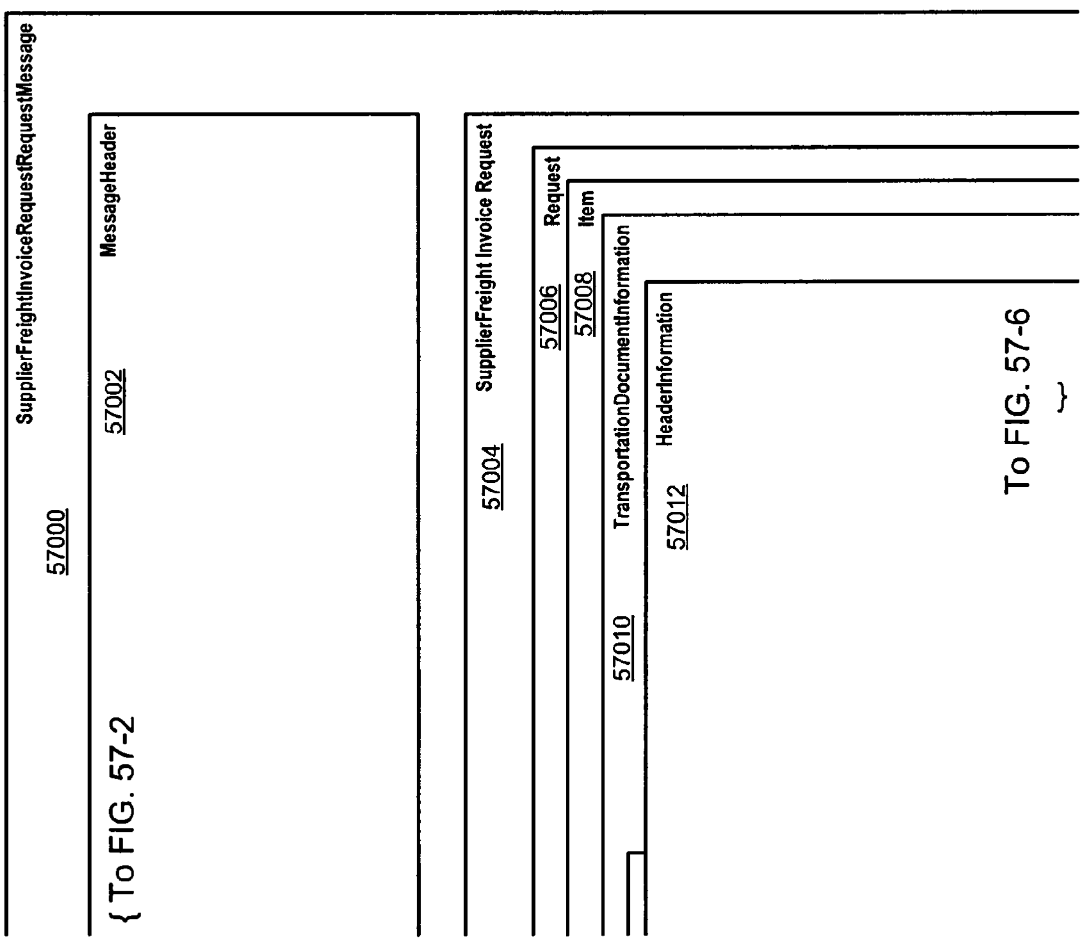
Figures 4, 57:
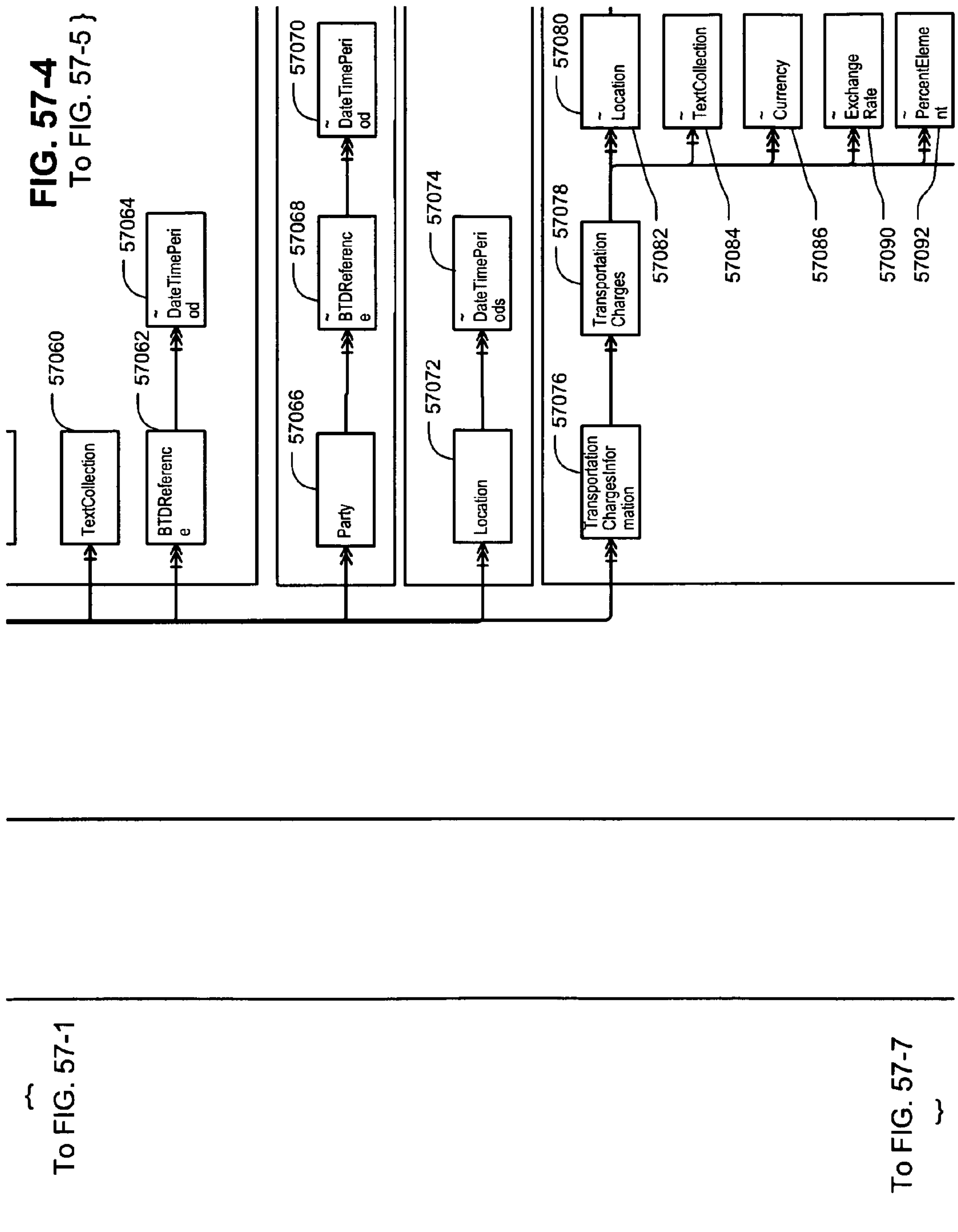
Figures 5, 57:
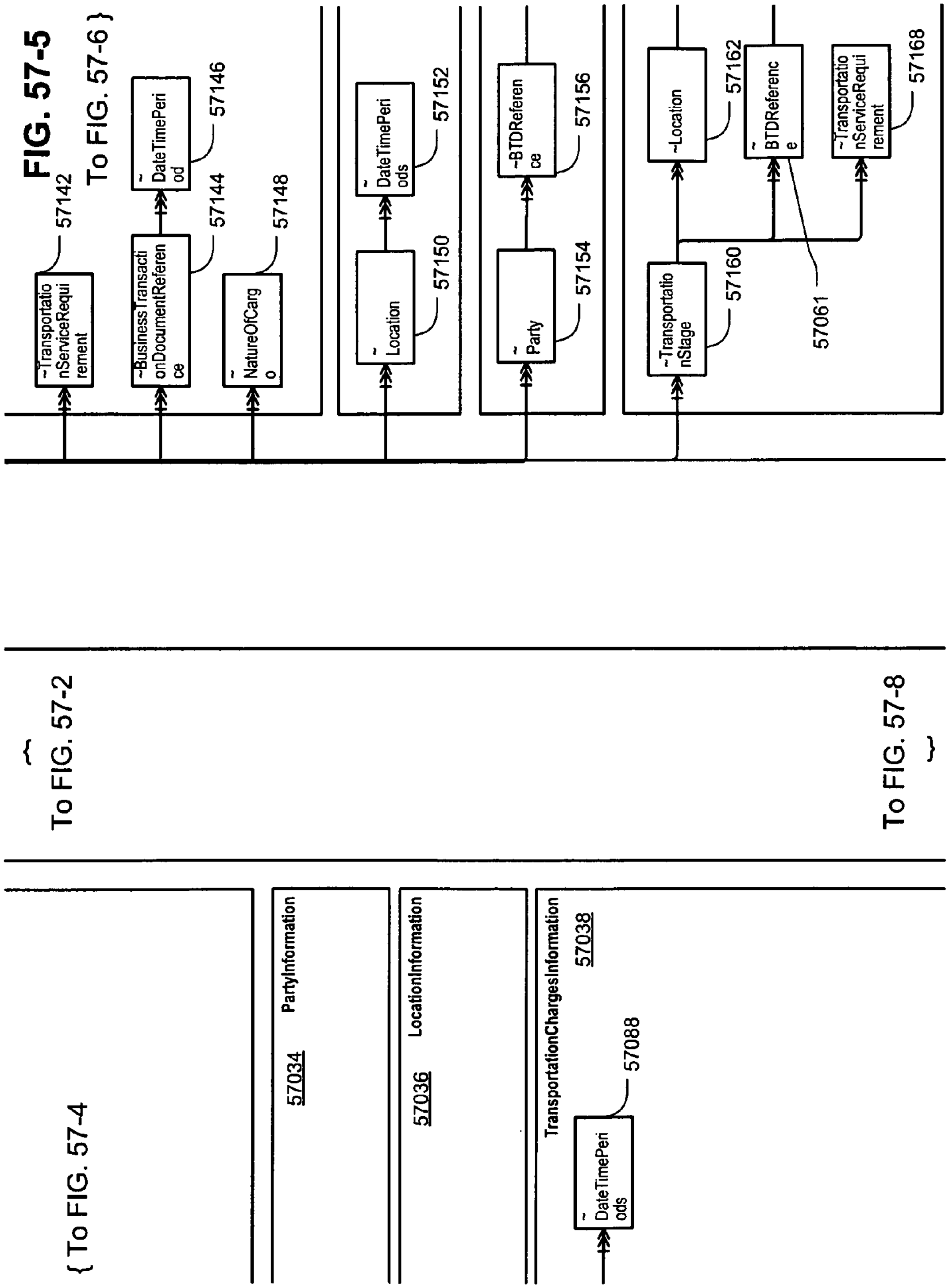
Figures 6, 57:
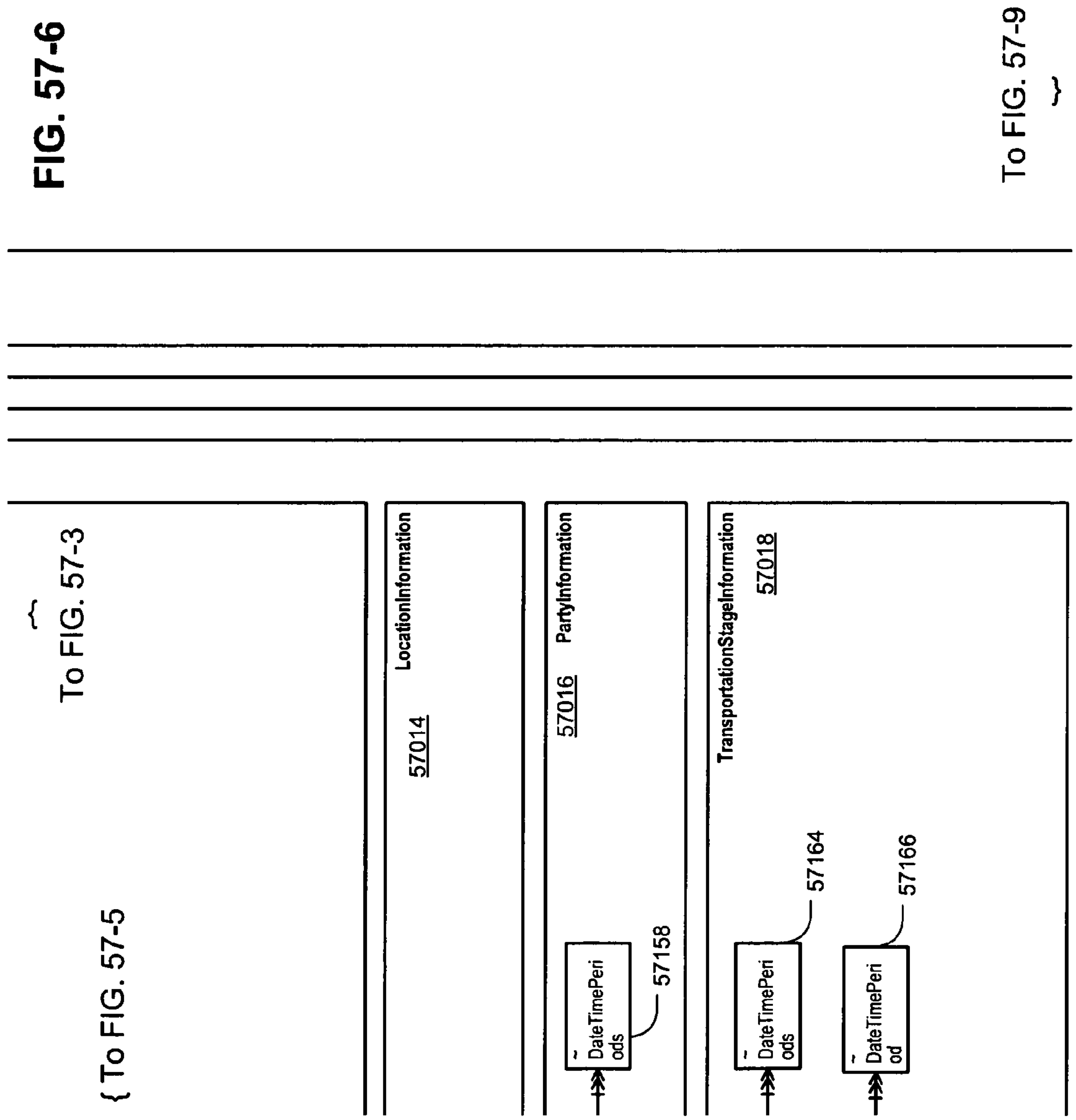
Figures 7, 57:
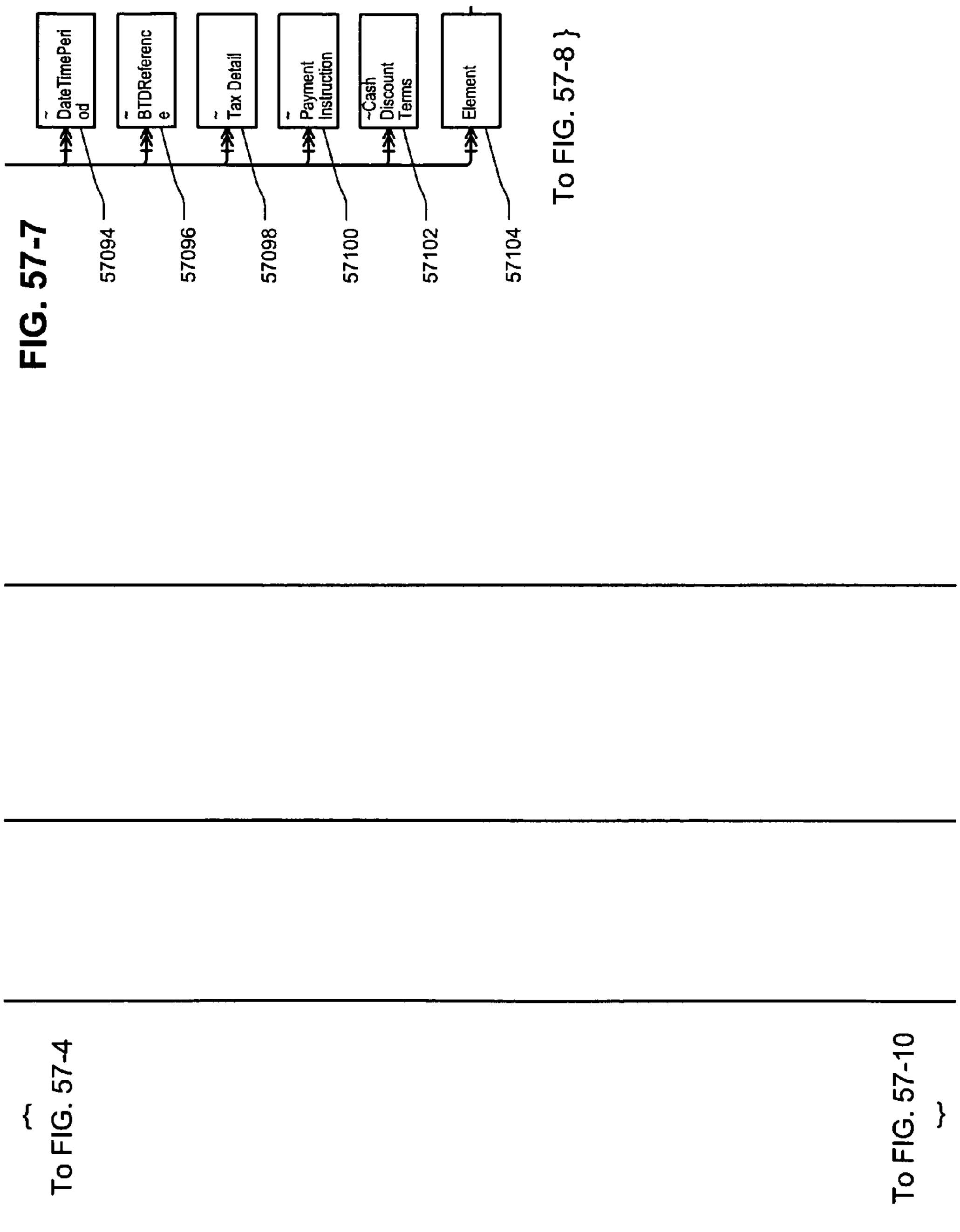
Figures 8, 57:
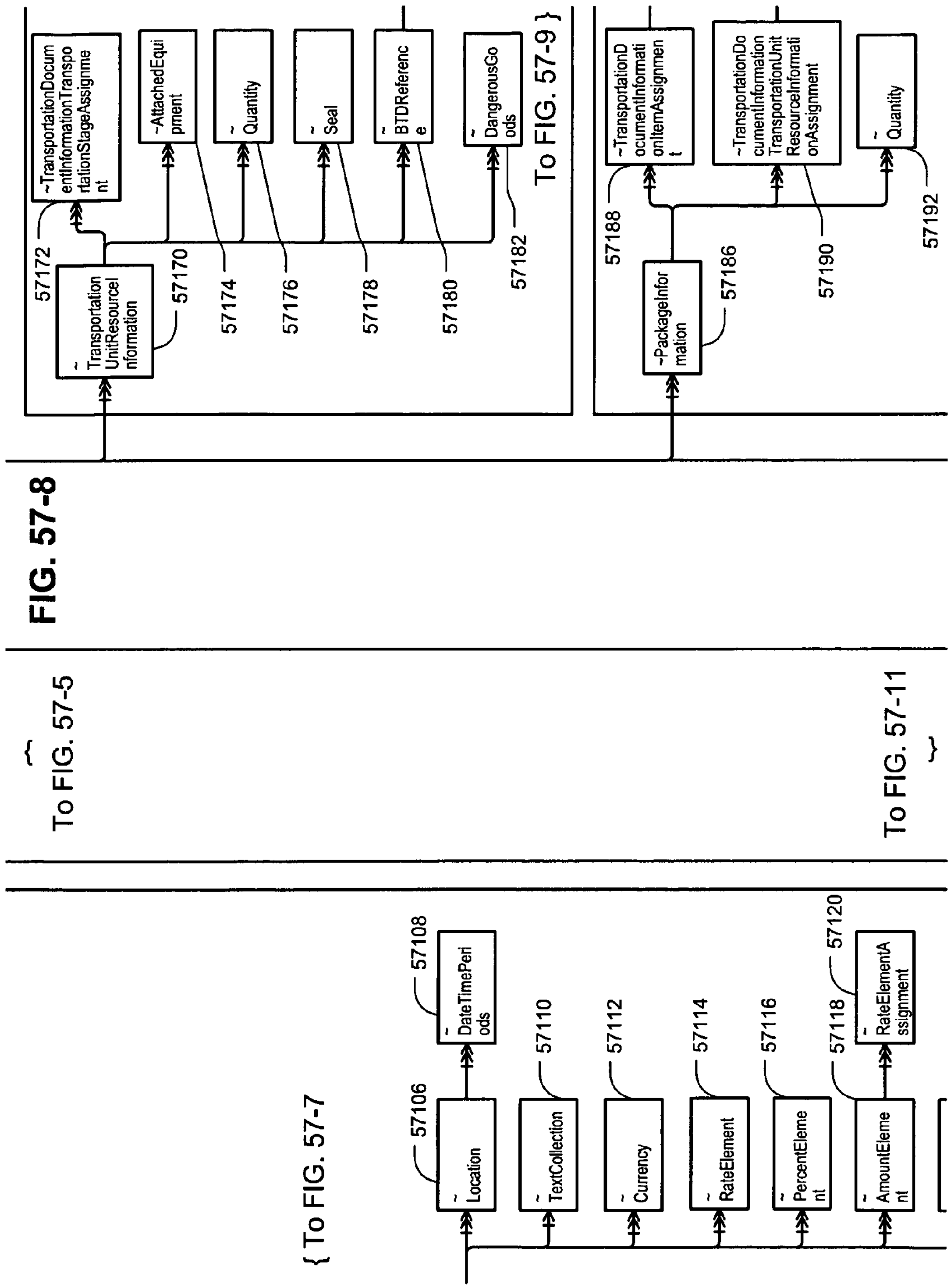
Figures 9, 57:
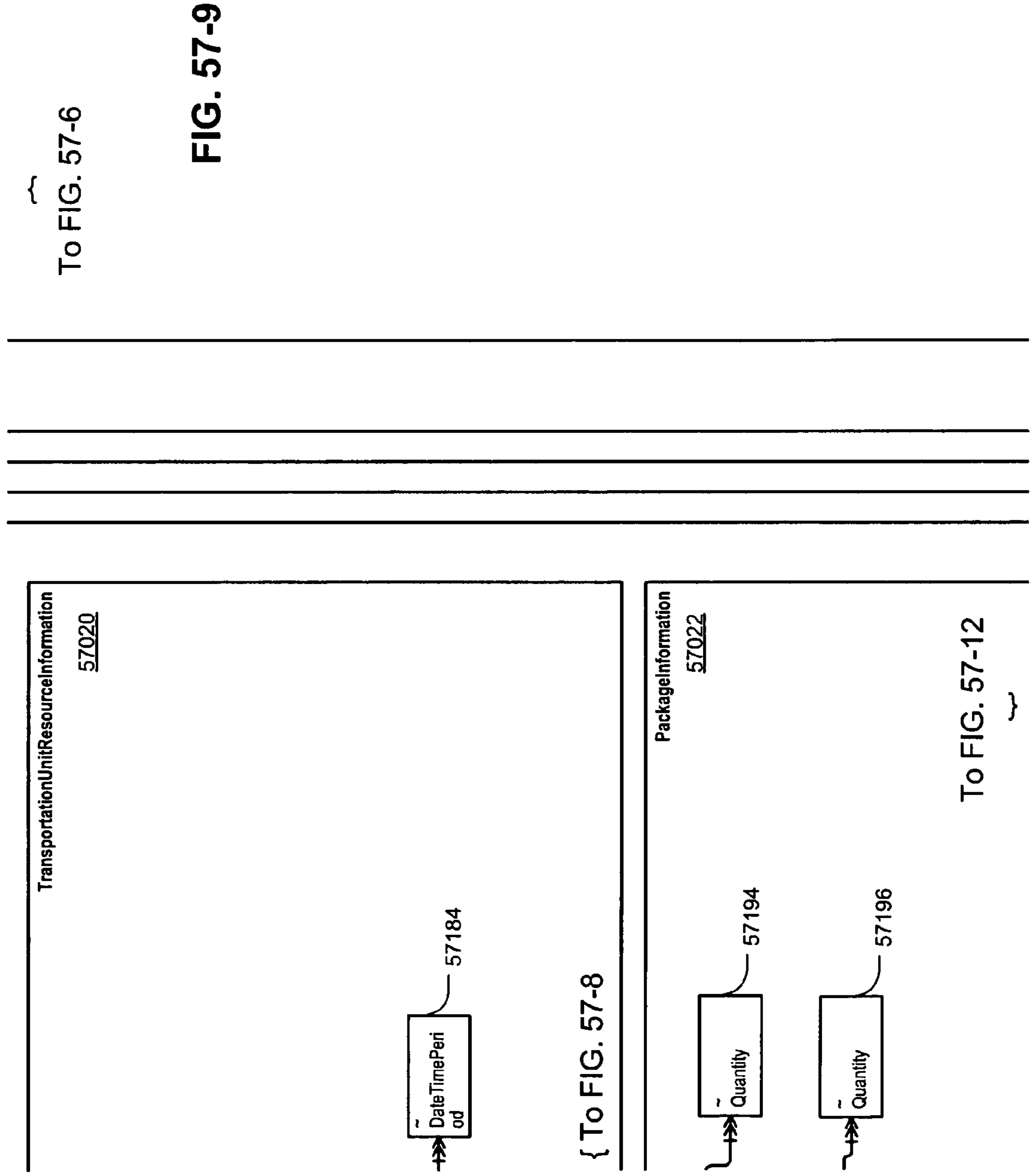
Figures 11, 57:
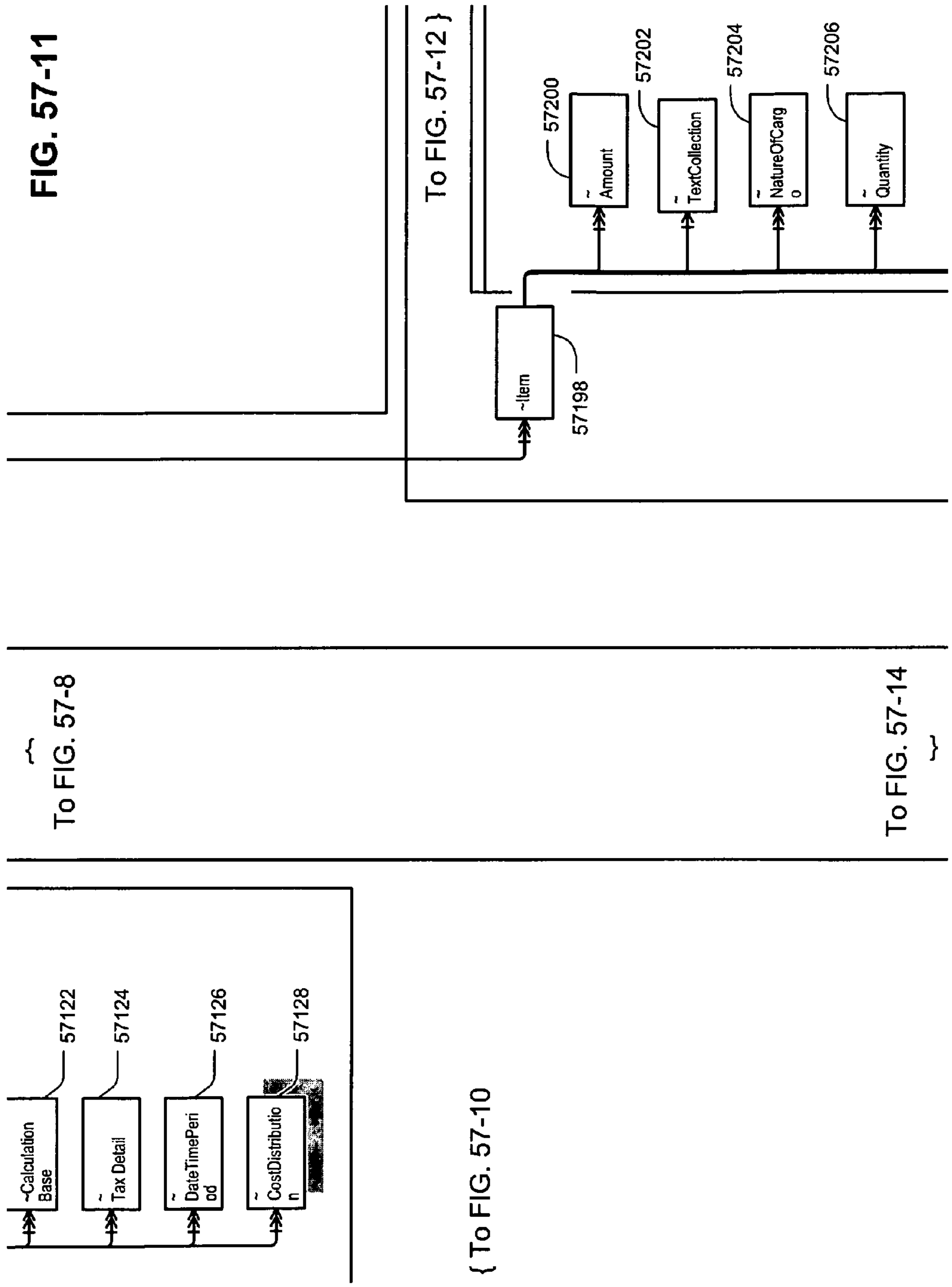
Figures 12, 57:
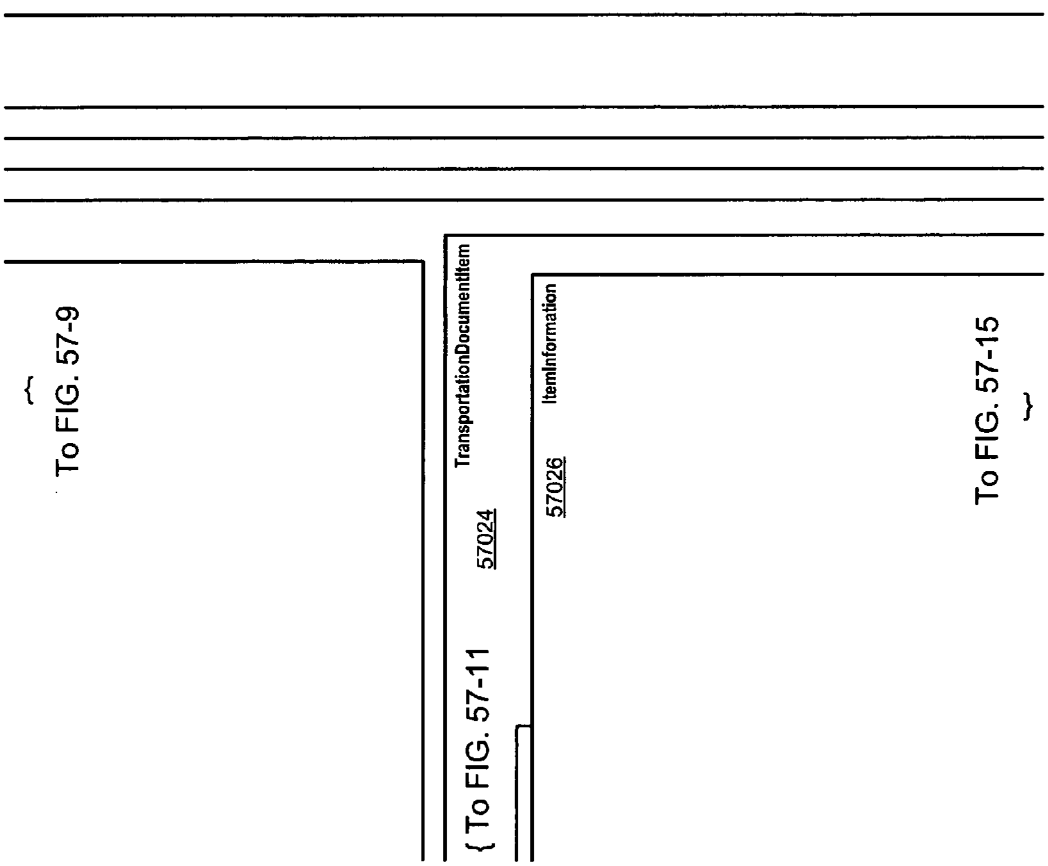
Figures 15, 57:
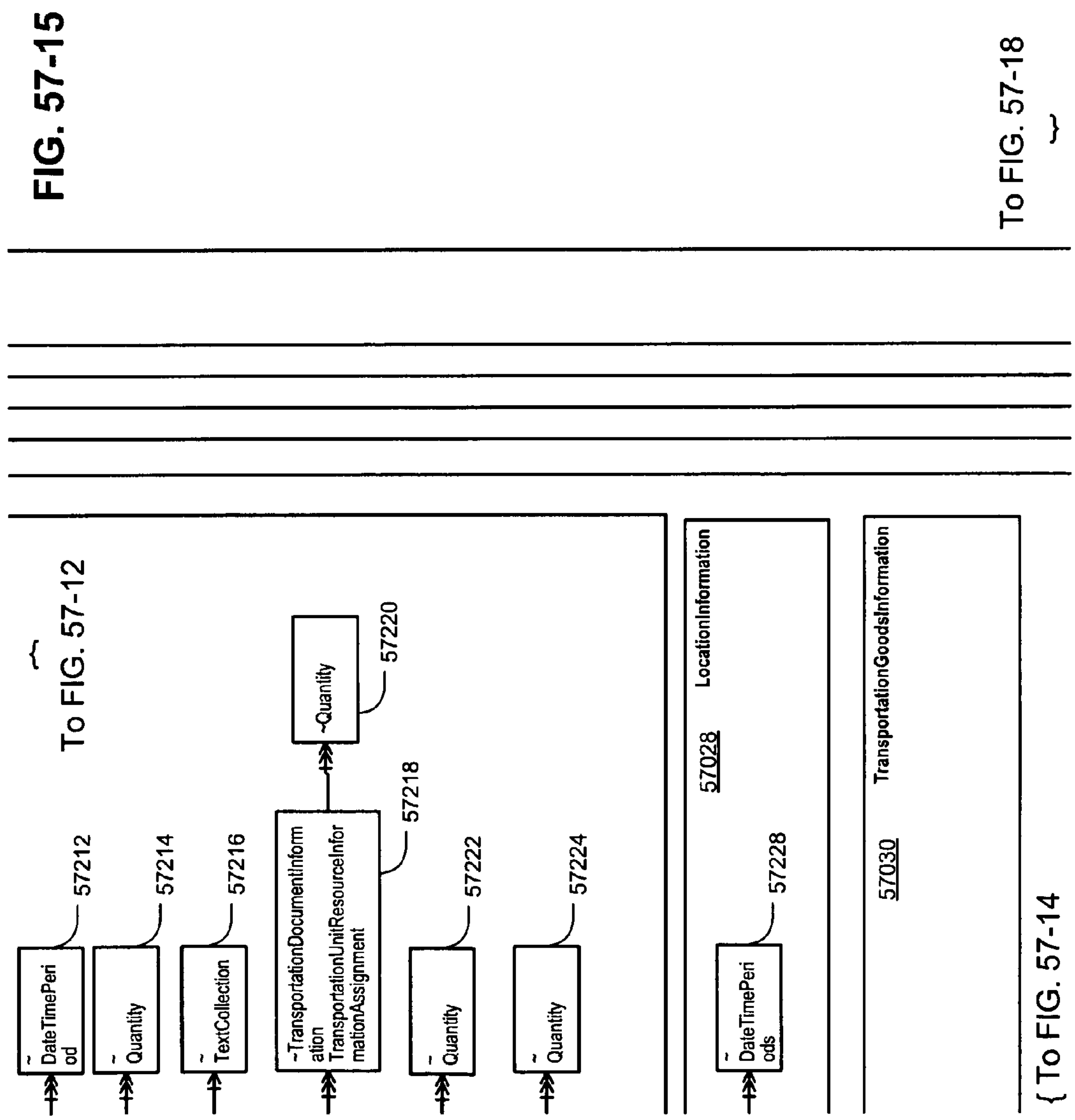
Figures 16, 57:
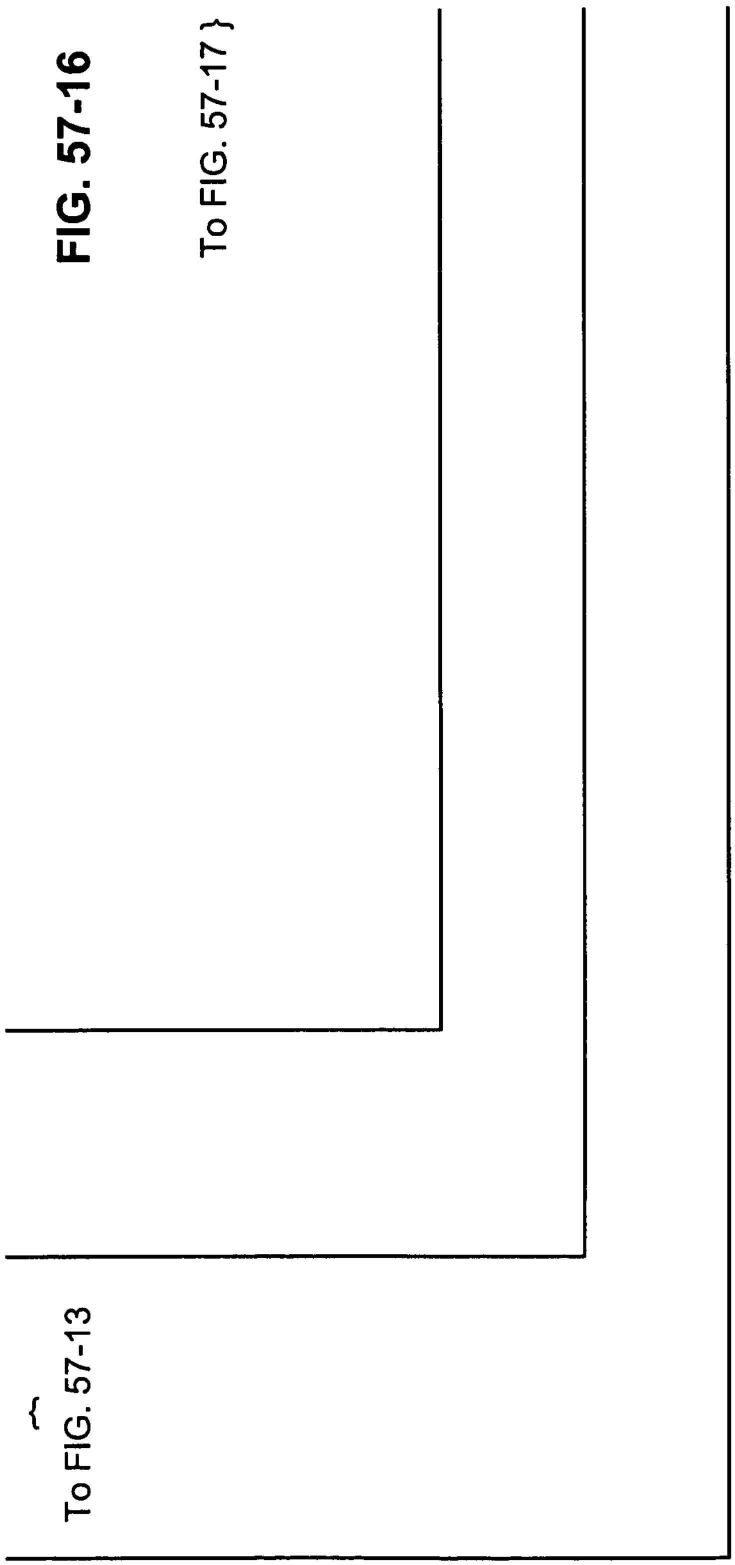
Figures 17, 57:
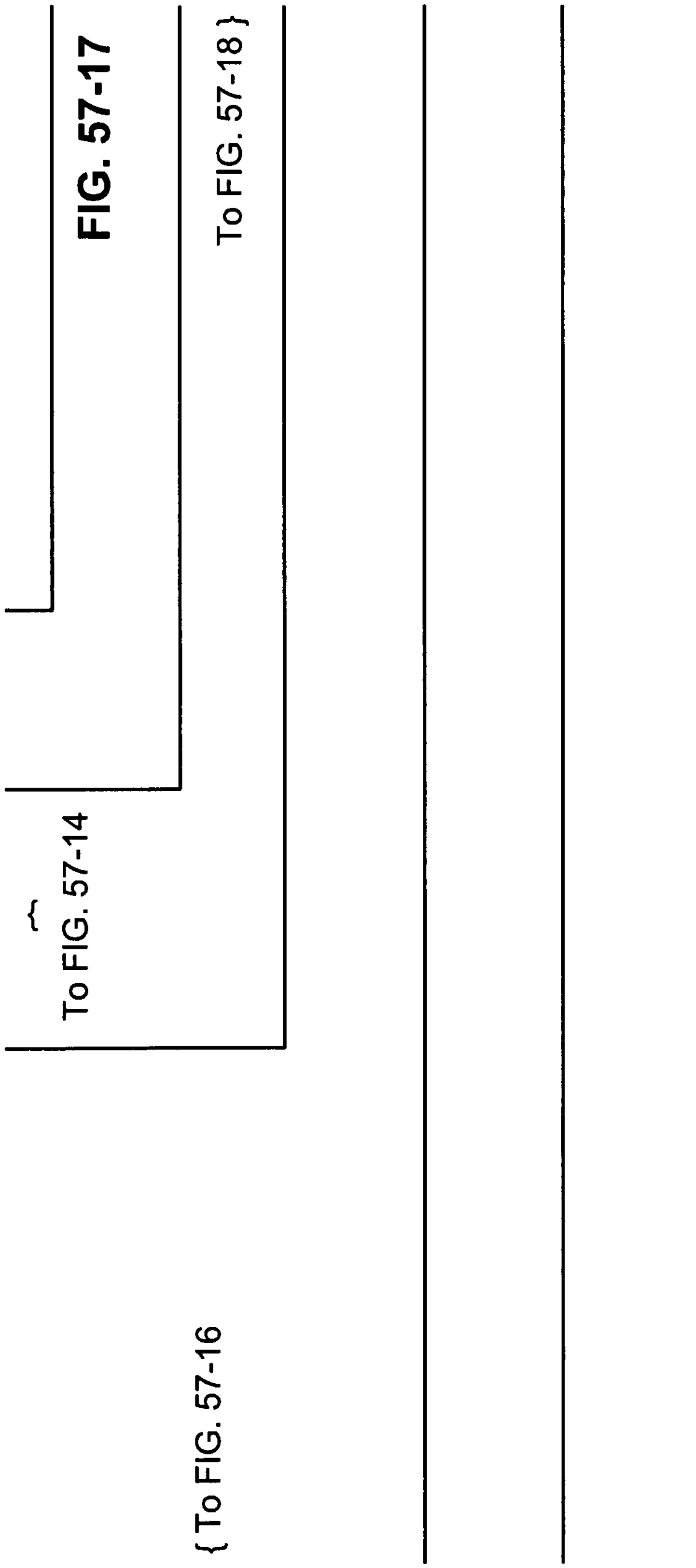
Figures 18, 57:
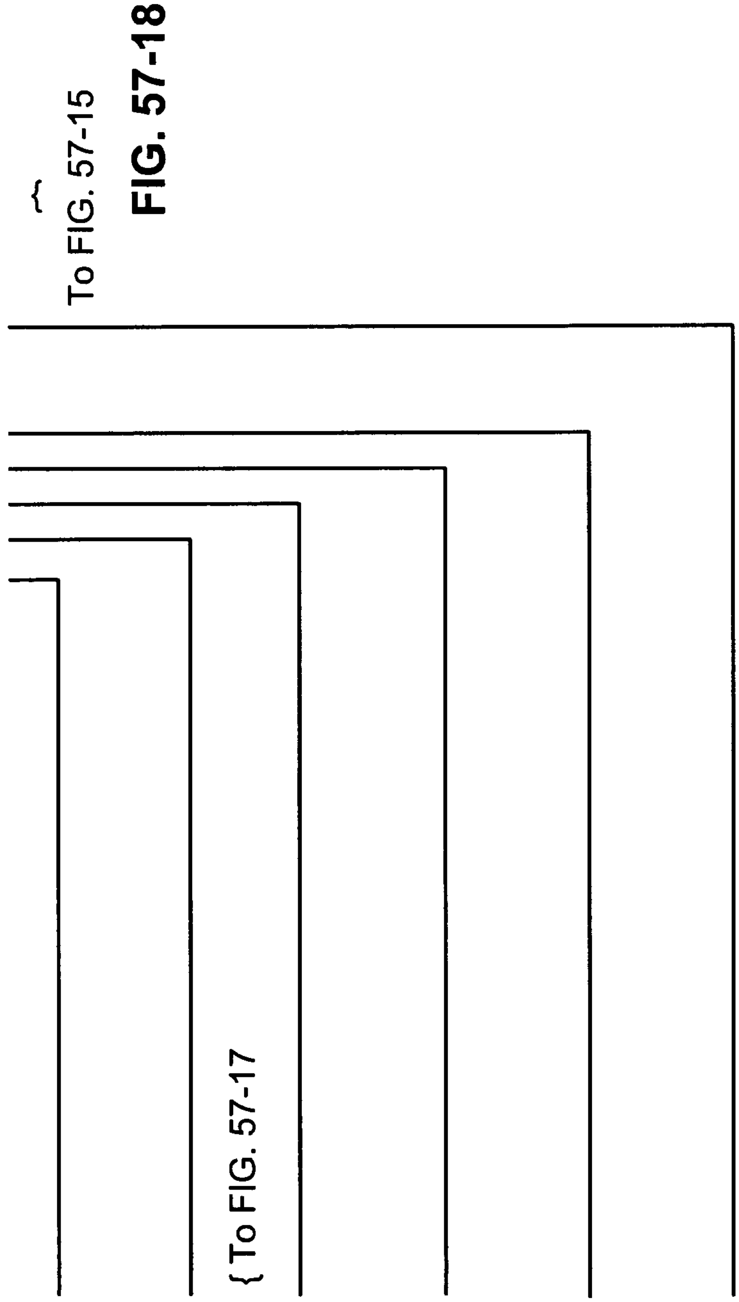

FIGS. 57-1 through 57-18 illustrate one example logical configuration of SupplierFreightInvoiceRequestRequestMessage message 57000. Specifically, this figure depicts the arrangement and hierarchy of various components such as one or more levels of packages, entities, and datatypes, shown here as 57002 through 57230. As described above, packages may be used to represent hierarchy levels. Entities are discrete business elements that are used during a business transaction. Data types are used to type object entities and interfaces with a structure. For example, SupplierFreightInvoiceRequestRequestMessage message 57000 includes, among other things, SupplierFreightInvoiceRequest 57048. Accordingly, heterogeneous applications may communicate using this consistent message configured as such.

Figure 58:
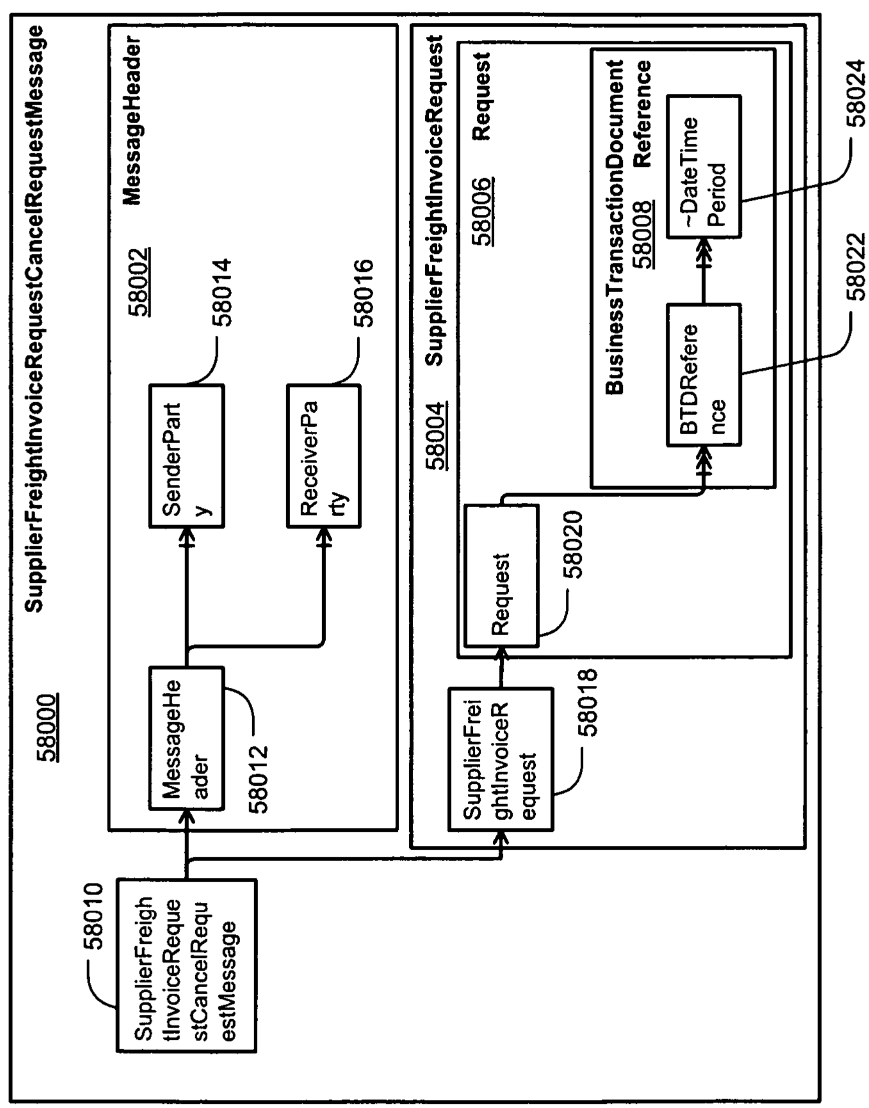

Additionally, FIG. 58 illustrates one example logical configuration of SupplierFreightInvoiceRequestCancelRequestMessage message 58000. Specifically, this figure depicts the arrangement and hierarchy of various components such as one or more levels of packages, entities, and datatypes, shown here as 58002 through 58024. As described above, packages may be used to represent hierarchy levels. Entities are discrete business elements that are used during a business transaction. Data types are used to type object entities and interfaces with a structure. For example, SupplierFreightInvoiceRequestCancelRequestMessage message 58000 includes, among other things, SupplierFreightInvoiceRequest 58018. Accordingly, heterogeneous applications may communicate using this consistent message configured as such.

Figure 59:
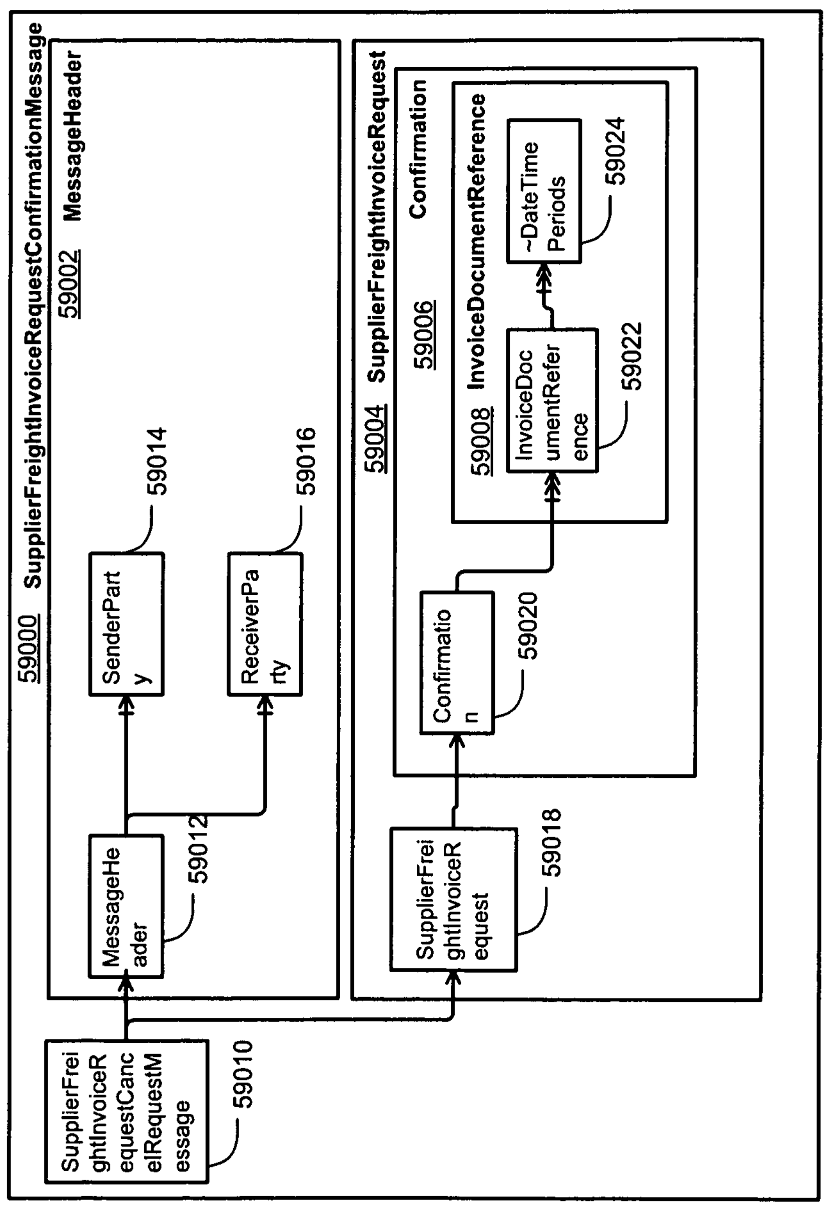

Additionally, FIG. 59 illustrates one example logical configuration of SupplierFreightInvoiceRequestConfirmationMessage message 59000. Specifically, this figure depicts the arrangement and hierarchy of various components such as one or more levels of packages, entities, and datatypes, shown here as 59002 through 59024. As described above, packages may be used to represent hierarchy levels. Entities are discrete business elements that are used during a business transaction. Data types are used to type object entities and interfaces with a structure. For example, SupplierFreightInvoiceRequestConfirmationMessage message 59000 includes, among other things, SupplierFreightInvoiceRequest 59018. Accordingly, heterogeneous applications may communicate using this consistent message configured as such.

FIGS. 60-1 through 60-3 illustrate one example logical configuration of a SupplierFreightInvoiceRequestCancelRequestMessage 60000 element structure. Specifically, these figures depict the arrangement and hierarchy of various components such as one or more levels of packages, entities, and datatypes, shown here as 60000 through 60094. As described above, packages may be used to represent hierarchy levels. Entities are discrete business elements that are used during a business transaction. Data types are used to type object entities and interfaces with a structure. For example, the SupplierFreightInvoiceRequestCancelRequestMessage 60000 includes, among other things, a SupplierFreightInvoiceRequestCancelRequestMessage entity 60002. Accordingly, heterogeneous applications may communicate using this consistent message configured as such.

FIGS. 61-1 through 61-3 illustrate one example logical configuration of a SupplierFreightInvoiceRequestConfirmationMessage 61000 element structure. Specifically, these figures depict the arrangement and hierarchy of various components such as one or more levels of packages, entities, and datatypes, shown here as 61000 through 61094. As described above, packages may be used to represent hierarchy levels. Entities are discrete business elements that are used during a business transaction. Data types are used to type object entities and interfaces with a structure. For example, the SupplierFreightInvoiceRequestConfirmationMessage 61000 includes, among other things, a SupplierFreightInvoiceRequestConfirmationMessage entity 61002. Accordingly, heterogeneous applications may communicate using this consistent message configured as such.

FIGS. 62-1 through 62-74 illustrate one example logical configuration of a SupplierFreightInvoiceRequestRequestMessage 620000 element structure. Specifically, these figures depict the arrangement and hierarchy of various components such as one or more levels of packages, entities, and datatypes, shown here as 620000 through 622386. As described above, packages may be used to represent hierarchy levels. Entities are discrete business elements that are used during a business transaction. Data types are used to type object entities and interfaces with a structure. For example, the SupplierFreightInvoiceRequestRequestMessage 620000 includes, among other things, a SupplierFreightInvoiceRequest 620014. Accordingly, heterogeneous applications may communicate using this consistent message configured as such.

Message Data Type SupplierFreightInvoiceRequestRequest

The message data type SupplierFreightInvoiceRequestRequestMessage includes business information that is relevant for sending a business document in a message and the SupplierFreightInvoiceRequest included in the business document. It includes the packages MessageHeader and SupplierFreightInvoiceRequest. The message data type SupplierFreightInvoiceRequestRequestMessage provides a structure for the message type SupplierFreightInvoiceRequestRequestMessage and for interfaces that are based on it.

A MessageHeader package groups together business information that is relevant for sending a business document in a message. It includes the entity MessageHeader. A MessageHeader groups together business information from the perspective of a sending application, for example, to identify a business document in a message, to provide information about the sender, and/or to provide information about the recipient. The MessageHeader is divided up into the entities SenderParty and RecipientParty. MessageHeader is of type GDT: BusinessDocumentMessageHeader. The MessageHeader can include the elements ID, ReferenceID, and CreationDateTime. In some implementations, the MessageID is set by the sending application. With the ReferencedMessageID, reference can be made in the current BusinessDocument to a previous BusinessDocument.

A SenderParty is a party responsible for sending a business document at a business application level. The SenderParty is of type GDT: BusinessDocumentMessageHeaderParty. The SenderParty can include the elements InternalID, StandardID, and ContactPerson. The SenderParty can be filled by the sending application to name a contact person for problems with the message. This can be particularly useful if an additional infrastructure, for example a marketplace, is located between the sender and the recipient. The SenderParty can be used to transfer a message and can be ignored by the receiving application. It can be filled by the sender, for example, if the participating parties are not transferred with the SupplierFreightInvoiceRequest package.

A RecipientParty is a party responsible for receiving a business document at a business application level. The RecipientParty is of type GDT: BusinessDocumentMessageHeaderParty. The RecipientParty can include the elements InternalID, StandardID, and ContactPerson. The RecipientParty can be filled by the sending application to name a contact person for problems that occur with the message. This can be useful if an additional infrastructure (such as a marketplace) is located between the sender and the recipient. The RecipientParty can be used to transfer a message and in some implementations can be ignored by the receiving application. RecipientParty can be filled by the sender, for example, if the SupplierFreightInvoiceRequest package cannot be used to transfer the participating parties.

The SupplierFreightInvoiceRequest package groups the SupplierFreightInvoiceRequest with its packages. It includes the entity SupplierFreightInvoiceRequest and the package Request. A SupplierFreightInvoiceRequest is a request sent to invoice verification advising that a freight invoice for specified quantities and prices, for example, is expected and/or is to be created through evaluation settlement. The attributes and elements located directly at the SupplierFreightInvoiceRequest entity can include @actioncode and ID. @actioncode is a coded representation of an instruction to a message recipient describing how to process a transmitted element, and is of type GDT: ActionCode. ID is a unique identifier of a SupplierFreightInvoiceRequest and is of type GDT: BusinessTransactionDocumentID. In some implementations, the attribute actioncode can include the two values "01—Create" and "02—Change". In some implementations, the ID is not changed once a SupplierFreightInvoiceRequest has been created.

A Request package groups the Request with its packages. It includes the entity Request and the packages HeaderInformation, PartyInformation, LocationInformation, TransportationChargesInformation, and ItemInformation. Request is a request sent to invoice verification advising that a freight invoice for specified quantities and prices, in some implementations is expected, and/or is to be created through evaluation settlement. The elements located at the Request entity can include TypeCode and DeliveryTerms. The BusinessTransactionDocumentTypeCode is a coded representation of a document type that occurs in business transactions. The document type describes the (business) nature of similar documents and defines the basic features of this type of documents. It is of type GDT: BusinessTransactionDocumentTypeCode. In some implementations, invoice-related document types are allowed, such as 128 Supplier Invoice Request. DeliveryTerms is a collection of conditions and agreements that apply when delivering ordered goods and providing necessary services and activities. DeliveryTerms is of type GDT: DeliveryTerms, and in some implementations is optional.

HeaderInformation groups dates, total values, documents and references related to a supplier freight invoice request. HeaderInformation includes the entities PurchaseBusinessArea, DateTimePeriod, TotalQuantity, TotalAmount, TextCollection, and BusinessTransactionDocumentReference. A PurchaseBusinessArea is a purchase specific area within an enterprise, for example, a purchasing organisation, and/or a purchasing group. A PurchasingOrganisationID is an identifier for a purchasing organisation, and is of type GDT: OrganisationalCentreID. A PurchasingGroupID is an identifier for a purchasing group and is of type GDT: OrganisationalCentreID, and in some implementations is optional. A DateTimePeriod specifies a date, time and/or period related to a SupplierFreightInvoiceRequest.

A PartyInformation package includes information regarding a party of a supplier freight invoice request, for example an invoicing party. It includes the entity Party. Party includes the entity BusinessTransactionDocumentReference. The LocationInformation package includes information regarding a location relevant for a supplier freight invoice request, for example a Ship-from location. LocationInformation includes the entity Location. The TransportationChargesInformation package includes information regarding a transportation charge calculation specific to components related to the SupplierFreightInvoiceRequest. It includes the entity TransportationChargesInformation.

The TransportationChargesInformation entity defines a relationship between transportation charges and an origin of those charges. It includes the entity TransportationCharges. A TransportationChargesUsageCode is a coded representation of the usage of the TransportationCharges. The usage points out if subsequent information represents a revenue- or cost-view on transportation charges. TransportationChargesUsageCode is of type GDT: TransportationChargesUsageCode. A SupplierFreightInvoiceRequestItemID is a unique identifier of an Item in a SupplierFreightInvoiceRequest. SupplierFreightInvoiceRequestItemID is of type GDT: BusinessTransactionDocumentItemID and in some implementations is optional. A TransportationDocumentInformationID is a unique identifier of a Transportation Document Information. TransportationDocumentInformationID is of type GDT: TransportationDocumentInformationID and in some implementations is optional.

A TransportationDocumentInformationTransportationUnitResourceID is a unique identification of a TransportationUnitResource in assigned transportation document information. It is of type GDT: ResourceInformationID and in some implementations is optional. A TransportationDocumentInformationPackagingID is a unique identification of a Packaging in assigned transportation document information. TransportationDocumentInformationPackagingID is of type GDT: PackageInformationID and is optional. A TransportationDocumentInformationTransportationStageID is a unique identification of a TransportationStage in assigned transportation document information. TransportationDocumentInformationTransportationStageID is of type GDT: TransportationStageID and in some implementations is optional. In case none of the IDs is maintained, the transportation charges can be related to an entire supplier freight invoice request.

The Item package includes information regarding items of a supplier freight invoice request and it includes the Transportation Document Information package with additional information of assigned transportation documents. It includes the entity Item, and the package TransportationDocumentInformation. The SupplierFreightInvoiceRequest item specifies cost components for a supplier freight invoicing and information that the cost components are based on. This includes information regarding assigned transportation documents. An ID is a unique identifier of an item in a SupplierFreightInvoiceRequest and is of type GDT: BusinessTransactionDocumentItemID. A TypeCode, namely, the BusinessTransactionDocumentItemTypeCode, is a coded representation of an item type in a document that occurs in business transactions. It is of type GDT: BusinessTransactionDocumentItemTypeCode.

A Transportation Document Information package includes information of assigned transportation documents that form a basis of a supplier freight invoice. It includes the entity TransportationDocumentInformation and the packages HeaderInformation, PartyInformation, LocationInformation, TransportationStageInformation, TransportationUnitResourceInformation, PackageInformation and TransportationDocumentItemInformation. A TransportationDocumentInformation includes information of an assigned transportation document that forms a basis of a supplier freight invoice. ID is a unique identifier of a TransportationDocumentInformation and is of type GDT: TransportationDocumentInformationID. BusinessTransactionDocumentID is a unique identifier of a Transportation Document, for example a Shipment Order and Freight Order. It is of type GDT: BusinessTransactionDocumentID and in some implementations is optional. A BusinessTransactionDocumentTypeCode is a coded representation of a document type that occurs in business transactions. The document type describes the (business) nature of similar documents and defines the basic features of this type of document. It is of type GDT: BusinessTransactionDocumentTypeCode and in some implementations is optional. DeliveryTerms is a collection of conditions and agreements that can apply when delivering ordered goods and providing necessary services and activities. It is of type GDT: DeliveryTerms and in some implementations is optional.

A HeaderInformation groups dates, total values, documents and references related to assigned transportation document information. It includes the entities DateTimePeriods, TotalQuantity, TotalAmount, TextCollection, TransportationServiceRequirement, BusinessTransactionDocumentReference, and NatureOfCargo. The PartyInformation package includes information regarding a party of assigned transportation document information, for example a customer, and/or supplier. It includes the entity Party. Party includes the entity BusinessTransactionDocumentReference. The LocationInformation package includes information regarding a location relevant to assigned transportation document information, for example a Ship-from location. It includes the entity Location.

A TransportationStageInformation package includes information regarding a stage of assigned transportation document information. A stage represents a section of a transport. It includes the entity TransportationStage. TransportationStage specifies details related to a stage of a transport which are part of assigned transportation document information. TransportationStage includes the entities Location, BusinessTransactionDocumentReference, and TransportationServiceRequirement.

The TransportationUnitResourceInformation package includes information regarding a transportation unit resource that is relevant for assigned transportation document information, for example a container. It includes the entity TransportationUnitResourceInformation. TransportationUnitResourceInformation includes information on one or more transportation unit resources, such as resource type and related properties (e.g., related measures or handling instructions). A Transportation Unit Resource is a unit into which goods are loaded and/or from which goods are unloaded. This unit can provide transportation capacity for goods, but in some implementations may not move by itself The unit includes the entities TransportationDocumentInformationTransportationStageAssignment, AttachedEquipment, Quantity, Seal, BusinessTransactionDocumentReference and DangerousGoods.

A TransportationDocumentInformationTransportationStageAssignment specifies an assignment of a transportation stage to a transportation unit resource information. TransportationDocumentInformationTransportationStageID is a unique identifier of a TransportationStage of assigned transportation document information. It is of type GDT: TransportationStageID. AttachedEquipment specifies an equipment that is attached to a TransportationUnitResource. The structure can include TransportationDocumentInformationResourceInformationID, a unique identifier of a resource in assigned transportation document information. It is of type GDT: ResourceInformationID.

The PackageInformation package includes information regarding the packages of the goods that are to be transported in the assigned transportation document information. It includes the entity PackageInformation. PackageInformation describes package information related to an assigned transportation document information. It includes the entities TransportationDocumentInformationItemAssignment, TransportationDocumentInformationTransportationUnitResourceInformationAssignment, and Quantity.

TransportationDocumentInformationItemAssignment specifies an assignment of a packaging to an item of an assigned transportation document information with corresponding information on quantities. TransportationDocumentInformationItemAssignment includes the entity Quantity. The structure can include TransportationDocumentInformationItemID, a unique identifier of an item of assigned transportation document information. TransportationDocumentInformationItemID is of type GDT: TransportationDocumentInformationItemID. TransportationDocumentInformationTransportationUnitResourceInformationAssignment specifies an assignment of a packaging to a TransportationUnitResourceInformation of an assigned transportation document information with corresponding quantity information. TransportationDocumentInformationResourceInformationID is a unique identifier of a TransportationUnitResource and is of type GDT: ResourceInformationID.

The TransportationDocumentInformationItem package includes information regarding products included in assigned transportation document information and additional information on these products. It includes the entity TransportationDocumentInformationItem and the packages ItemInformation, LocationInformation, and TransportGoodsInformation. TransportationDocumentInformationItem specifies products included in an assigned transportation document information and additional information about these products. The structure can include ID, BusinessTransactionDocumentItemID, OriginCountryCode, DestinationCountryCode, ShippingTypeCode, HaulageArrangerCode, TemperatureMeasureInterval, TransportationHandlingInstructionCode, and TransportationHandlingInstructionNote. ID is a unique identifier of an Item in assigned transportation document information and is of type GDT: TransportationDocumentInformationItemID. BusinessTransactionDocumentItemID is a unique identifier of a Transportation Document Item, for example a Shipment Order Item. BusinessTransactionDocumentItemID is of type GDT: BusinessTransactionDocumentItemID and in some implementations is optional. OriginCountryCode is the country of origin of goods that are considered in a shipment request. OriginCountryCode is of type GDT: CountryCode with a Qualifier: Origin, and in some implementations is optional.

DestinationCountryCode is the ultimate country of destination of goods that are considered in a shipment request. DestinationCountryCode is of type GDT: CountryCode and has a Qualifier: Destination, and in some implementations is optional. ShippingTypeCode is a coded representation of a shipping type. A shipping type specifies how planning and execution of a transportation can be performed, whereas transportation terms can include detailed specifications on agreed means of transportation, for example, shipping/transport type and means of transport to be used. ShippingTypeCode is of type GDT: ShippingTypeCode and in some implementations is optional. HaulageArrangerCode is a coded representation of an arranger of a haulage. Haulage is an inland transportation of cargo. Haulage is of type GDT: HaulageArrangerCode and in some implementations, is optional. TemperatureMeasureInterval is an interval of temperature measures defined by a lower and an upper boundary and a measure type code. TemperatureMeasureInterval is of type GDT: MeasureInterval and has a Qualifier: Temperature, and in some implementations is optional. TransportationHandlingInstructionCode is a coded representation of a transportation handling instruction. TransportationHandlingInstructionCode is of type GDT: TransportationHandlingInstructionCode, and in some implementations is optional. TransportationHandlingInstructionNote is a note regarding a transportation handling instruction. It is of type GDT: TransportationHandlingInstructionNote, and in some implementations is optional. A constraint can, in some implementations, exist that for a measure related to temperature, the units of measurement Celsius and Fahrenheit are allowed.

The TransportationDocumentItemInformation package specifies products included in an assigned transportation document information and additional information related to transportation of these products. TransportationDocumentItemInformation includes the entities Amount, TextCollection, NatureOfCargo, Quantity, BusinessTransactionDocumentReference, DangerousGoods, TransportationDocumentInformationTransportationStageAssignment, TransportationDocumentInformationTransportationUnitResourceInformationAssignment, Location, and ProductInformation.

DangerousGoods specifies the identification, description and classification of dangerous goods related to an item of an assigned transportation document information. It includes the entities Quantity, TextCollection, and TransportationDocumentInformationTransportationUnitResourceInformationAssignment. TransportationDocumentInformationTransportationUnitResourceInformationAssignment specifies an assignment of dangerous goods of an assigned transportation document information item to a TransportationUnitResource with corresponding quantity information. TransportationDocumentInformationTransportationUnitResourceInformationAssignment includes the entity Quantity. The structure can include TransportationDocumentInformationResourceInformationID, a unique identifier of a TransportationUnitResource, which is of type GDT: ResourceInformationID.

The TransportationDocumentInformationStageAssignment specifies an assignment of assigned transportation document information item to a transportation stage with corresponding quantity information. The structure can include TransportationDocumentInformationTransportationStageID, a unique identifier of a TransportationStage. TransportationDocumentInformationTransportationStageID is of type GDT: TransportationStageID. A TransportationDocumentInformationTransportationUnitResourceInformationAssignment specifies an assignment of assigned transportation document information item to a transportation unit resource information with corresponding quantity information. It includes the entity Quantity. The structure can include TransportationDocumentInformationResourceInformationID, a unique identifier of a TransportationUnitResource information, which is of type GDT: ResourceInformationID.

The LocationInformation package includes information regarding a location that is related to an item of an assigned transportation document information. The LocationInformation package includes the entity Location. A TransportationGoodsInformation package groups information on goods that are to be transported according to a transportation document information item. The TransportationGoodsInformation package includes the entity ProductInformation. ProductInformation includes information on a commodity that is the object of a business activity of a company and serves to generate value for the company. ProductInformation can be tangible or intangible. A product can have relationships to other products or objects. For example, there can be a service for a specially manufactured product.

Message Data Type SupplierFreightInvoiceRequestCancelRequestMessage

The message data type SupplierFreightInvoiceRequestCancelRequestMessage groups together business information that is relevant for sending a business document in a message, and a SupplierFreightInvoiceRequest object in a business document. SupplierFreightInvoiceRequestCancelRequestMessage includes the packages BusinessDocumentMessageHeader and SupplierFreightInvoiceRequest. A MessageHeader package groups together business information that is relevant for sending a business document in a message. The MessageHeader package includes the entity MessageHeader.

A MessageHeader groups together business information from the perspective of a sending application to identify a business document in a message, to provide information about the sender, and to provide information about the recipient. The MessageHeader is divided up into the following entities: SenderParty and RecipientParty. MessageHeader is of type GDT: BusinessDocumentMessageHeader. The MessageHeader can include the following elements: ID, ReferenceID, and CreationDateTime. The MessageID can be set by the sending application.

With the ReferencedMessageID, reference is made in the current BusinessDocument to a previous BusinessDocument. A SenderParty is a party responsible for sending a business document at a business application level. The SenderParty is of type GDT: BusinessDocumentMessageHeaderParty. The SenderParty can include the following elements: InternalID, StandardID, and ContactPerson. The SenderParty can be filled by the sending application to name a contact person for problems with the message. This is particularly useful if an additional infrastructure, for example a marketplace, is located between the sender and the recipient.

The SenderParty is used to transfer the message and can be ignored by the receiving application. It can be filled by the sender, particularly if the participating parties are not transferred with the SupplierFreightInvoiceRequest package. A RecipientParty is a party responsible for receiving a business document at a business application level. The RecipientParty is of type GDT: BusinessDocumentMessageHeaderParty. The RecipientParty can include the following elements: InternalID, StandardID, and ContactPerson. The RecipientParty can be filled by the sending application to name a contact person for problems that occur with the message. This is particularly useful if an additional infrastructure, for example a marketplace, is located between the sender and the recipient. The RecipientParty is used to transfer a message and can be ignored by the receiving application. RecipientParty can be filled by the sender if the SupplierFreightInvoiceRequest package cannot be used to transfer the participating parties.

The SupplierFreightInvoiceRequest package groups together information about the SupplierFreightInvoiceRequest. SupplierFreightInvoiceRequest includes the entity SupplierFreightInvoiceRequest and the package BusinessTransactionDocumentReference. A SupplierFreightInvoiceRequest is a request sent to invoice verification advising that a freight invoice for specified quantities and prices is expected, and/or is to be created through evaluation settlement. The attributes and elements located directly at the SupplierFreightInvoiceRequest entity can include ID, which is a unique identifier of a SupplierFreightInvoiceRequest. ID is of type GDT: BusinessTransactionDocumentID.

The Request package groups a Request with its packages. The Request package includes the entity Request and the package BusinessTransactionDocumentReference. A Request is a request sent to invoice verification advising that a freight invoice for specified quantities and prices is expected, and/or is to be created through evaluation settlement. The structure can include RequestedCancellationDate, a requested date for a cancellation. RequestedCancellationDate is of type GDT: Date and has a Qualifier: Cancellation, and in some implementations, is optional. A BusinessTransactionDocumentReference package groups references to business documents. It includes the entities BusinessTransactionDocumentReference.

SupplierFreightInvoiceRequestConfirmationMessage.

The message data type SupplierFreightInvoiceRequestConfirmationMessage includes business information that is relevant for sending a business document in a message and/or SupplierFreightInvoiceRequest included in a business document. The message data type SupplierFreightInvoiceRequestConfirmationMessage provides a structure for the message type SupplierFreightInvoiceRequestConfirmationMessage and for interfaces that are based on it.

A MessageHeader package groups together business information that is relevant for sending a business document in a message. It includes the entity MessageHeader. A MessageHeader groups together business information from the perspective of a sending application to identify a business document in a message, to provide information about the sender, and to provide information about the recipient. The MessageHeader is divided up into the following entities: SenderParty and RecipientParty. MessageHeader is of type GDT: BusinessDocumentMessageHeader. The MessageHeader can include the elements ID, ReferenceID, and CreationDateTime. The MessageID can be set by the sending application. With the ReferencedMessageID, reference is made in the current BusinessDocument to a previous BusinessDocument.

A SenderParty is a party responsible for sending a business document at a business application level. The SenderParty is of type GDT: BusinessDocumentMessageHeaderParty. The SenderParty can include the elements InternalID, StandardID, and ContactPerson. The SenderParty can be filled by a sending application to name a contact person for problems with a message. This is particularly useful if an additional infrastructure, for example, a marketplace, is located between the sender and the recipient.

The SenderParty is used to transfer a message and can be ignored by the receiving application. SenderParty can be filled by the sender, particularly if the participating parties are not transferred with the SupplierFreightInvoiceRequest package. A RecipientParty is a party responsible for receiving a business document at a business application level. The RecipientParty is of type GDT: BusinessDocumentMessageHeaderParty. The RecipientParty includes the elements InternalID, StandardID, and ContactPerson. The RecipientParty can be filled by a sending application to name a contact person for problems that occur with the message. This is particularly useful if an additional infrastructure, for example a marketplace, is located between the sender and the recipient. The RecipientParty is used to transfer a message and can be ignored by the receiving application. RecipientParty can be filled by the sender if the SupplierFreightInvoiceRequest package cannot be used to transfer the participating parties.

The SupplierFreightInvoiceRequest package groups a SupplierFreightInvoiceRequest together with its packages. It includes the entity SupplierFreightInvoiceRequest and the package Confirmation. A SupplierFreightInvoiceRequest is a request sent to invoice verification advising that a freight invoice for specified quantities and prices is expected and can be created through evaluation settlement. A Confirmation package is part of a SupplierFreightInvoiceRequest which confirms Supplier Freight Invoice Request. The Confirmation package includes the entity Confirmation and the package InvoiceDocumentReference. A Confirmation is part of a SupplierFreightInvoiceRequest which confirms Supplier Freight Invoice Request. The elements located directly at the Confirmation entity can include AcceptanceStatusCode. The AcceptanceStatusCode is a coded representation of a status of an acceptance by a communication partner regarding a business transaction that has been transmitted to that partner. It is of type GDT: AcceptanceStatusCode. A InvoiceDocumentReference package groups references to invoice documents.

The InvoiceDocumentReference package includes the entity InvoiceDocumentReference. InvoiceDocumentReference specifies an invoice document reference that is related to a supplier freight invoice request. InvoiceDocumentReference includes the entity DateTimePeriod. DateTimePeriod specifies date, time and/or period information related to an InvoiceDocumentReference.

TransportationBookingRequest Interfaces

The TransportationBookingRequest interfaces are part of the Shipper and Transportation Service Provision scenarios. They are used, for example, to exchange agreements and the corresponding confirmations and receipt notifications to provide transportation services from an ordering party to another party.

An ordering party can request a receipt notification from the transportation service provider to assure that the transportation service provider has received the TransportationBookingRequest and that it did not include any errors.

At a later time, the transportation service provider can send a confirmation to the ordering party to confirm the transportation booking request. The confirmation can be an acceptance of the TransportationBookingRequest with its transport and carriage conditions (if any), a rejection if the transportation service provider cannot ensure the transport service, and/or conditionally accepted in case the transportation service provider generally accepts the request, but sends more information about the way the requested transportation service is intended to be fulfilled (i.e., the transport details).

The transportation service provider can request a receipt notification from the ordering party about a TransportationBookingRequestConfirmation.

The information of the TransportationBookingRequest are on a rough level. It can be expected, that at a later time a ShipmentRequest can follow a confirmed TransportationBookingRequest with more detailed information.

A TransportationBookingRequestRequest is an ordering party's request to a transportation service provider to book a transportation service. It can also be an update to a previously received TransportationBookingRequest. The structure of the TransportationBookingRequestRequest is specified by the message data type TransportationBookingRequestRequestMessage.

A TransportationBookingRequestCancelRequest is a cancellation of an ordering party's request to a transportation service provider to cancel the booking of a transportation service. The structure of the TransportationBookingRequestCancelRequest is specified by the message data type TransportationBookingRequestCancelRequestMessage.

A TransportationBookingRequestConfirmation is the confirmation of the TransportationBookingRequest from the transportation service provider to the ordering party. Through the confirmation, a TransportationBookingRequest can be Accepted, Rejected, and/or Conditionally Accepted. The confirmation can include information on the transport and carriage conditions such as carrier, mode of transport, stages, to name a few examples. The confirmation can also be related to a part of the transportation booking request, for example, in case of a split scenario. The structure of the TransportationBookingRequestConfirmation is specified by the message data type TransportationBookingRequestConfirmationMessage.

A TransportationBookingRequestReceiptNotification is a message from a transportation service provider to an ordering party confirming the receipt of a message and reporting any administrative errors included in the previous TransportationBookingRequestRequest message. The structure of the TransportationBookingRequestReceiptNotification is specified by the message data type TransportationBookingRequestReceiptNotificationMessage.

A TransportationBookingRequestConfirmationReceiptNotification is a message from a transportation service provider to an ordering party confirming the receipt of the message and/or reporting any administrative errors included in the previous TransportationBookingRequestConfirmationMessage. The structure of the TransportationBookingRequestConfirmationReceiptNotification is specified by the message data type TransportationBookingRequestConfirmationReceiptNotificationMessage.

The transportation booking request messages can be implemented by ten message interfaces (five on the ordering party side and five on the transportation service provider side). The Ordering Party side can include TransportationBookingRequestRequest_Out, TransportationBookingRequestCancelRequest_Out, TransportationBookingRequestConfirmation_In, TransportationBookingRequestReceiptNotification_In, and/or TransportationBookingRequestConfirmationReceiptNotification_Out. The Transportation Service Provider side can include TransportationBookingRequestRequest_In, TransportationBookingRequestCancelRequest_In, TransportationBookingRequestConfirmation_Out, TransportationBookingRequestReceiptNotification_Out, and/or TransportationBookingRequestConfirmationReceiptNotification_In.

Figure 63:
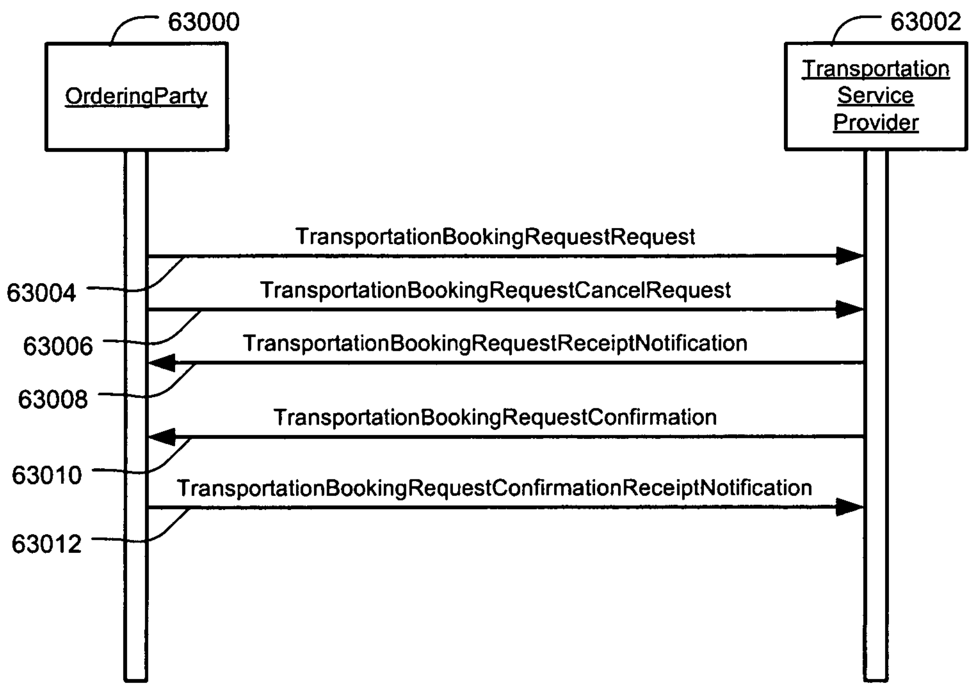

The message choreography of FIG. 63 describes a possible logical sequence of messages that can be used to realize a Transportation Booking business scenario.

An "Ordering Party" system 63000 can request a transportation booking, or update a previous request, using a TransportationBookingRequestRequest message 63004 as shown, for example in FIG. 63. A "Transportation Service Provider" system 63002 can confirm the request, and report any administrative errors, using a TransportationBookingRequestReceiptNotification message 63008 as shown, for example, in FIG. 63.

The "Ordering Party" system 63000 can request the cancellation of a transportation booking request using a TransportationBookingRequestCancelRequest message 63006 as shown, for example, in FIG. 63. The "Transportation Service Provider" system 63002 can confirm the request, and report any administrative errors, using the TransportationBookingRequestReceiptNotification message 63008 as shown, for example, in FIG. 63.

The "Transportation Service Provider" system 63002 can confirm the transportation booking request using a TransportationRequestConfirmation message 63010 as shown, for example, in FIG. 63. The "Ordering Party" system 63000 can confirm the receipt of the TransportationBookingRequestConfirmation message 63010, and report any administrative errors, using a TransportationBookingRequestConfirmationReceiptNotification message 63012 as shown, for example, in FIG. 63.

Figures 1, 64:
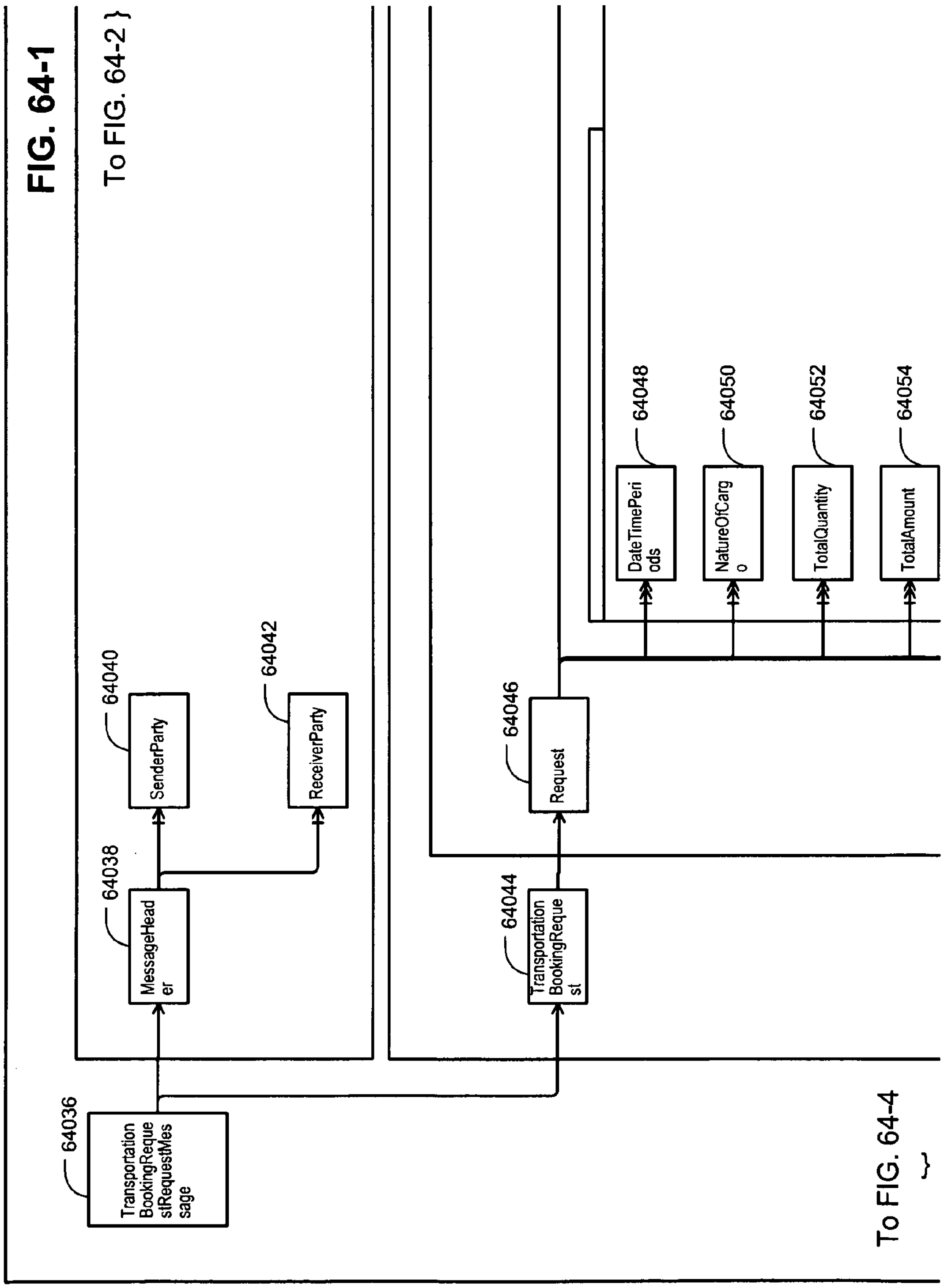
Figures 2, 64:
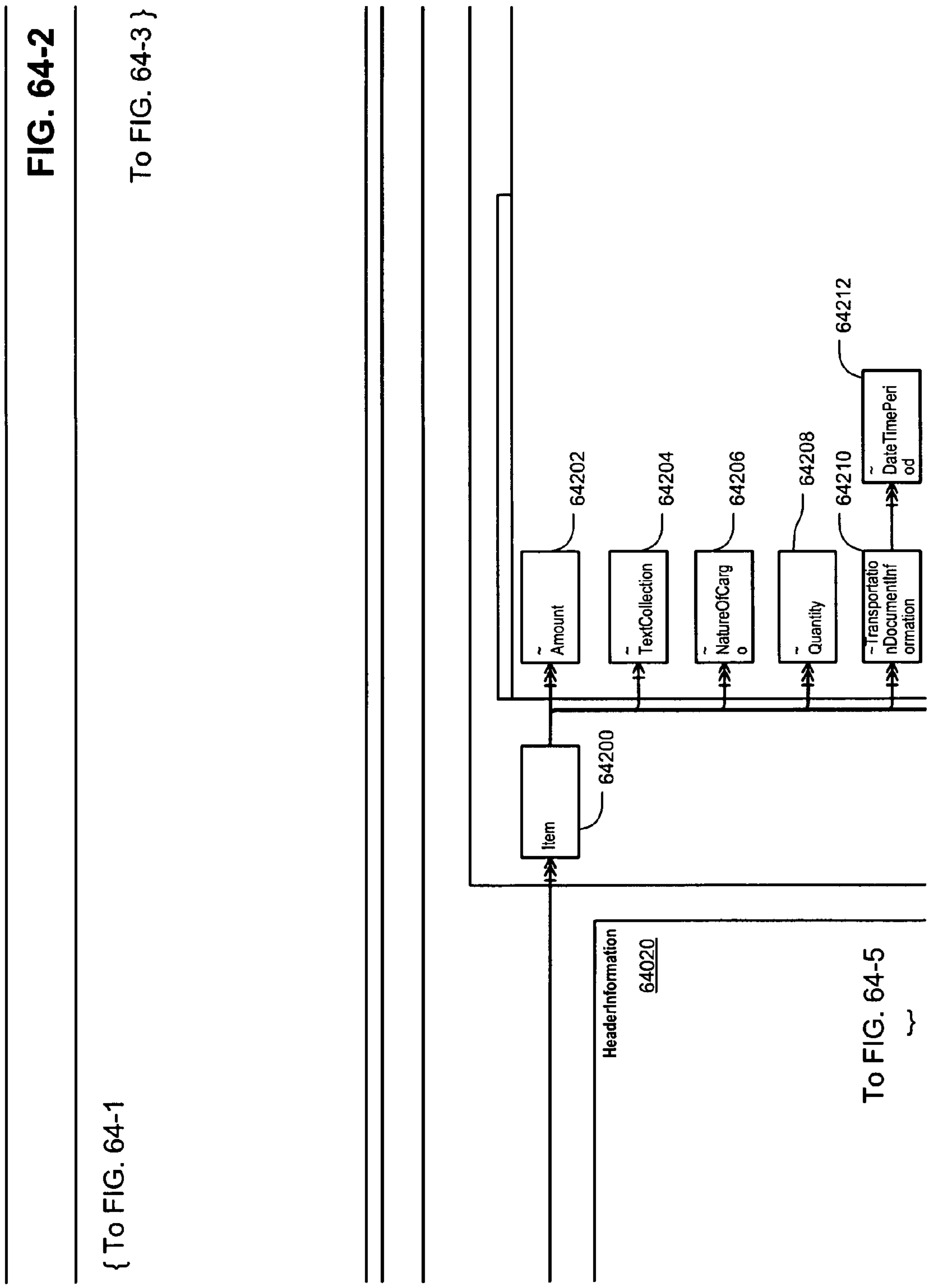
Figures 3, 64:
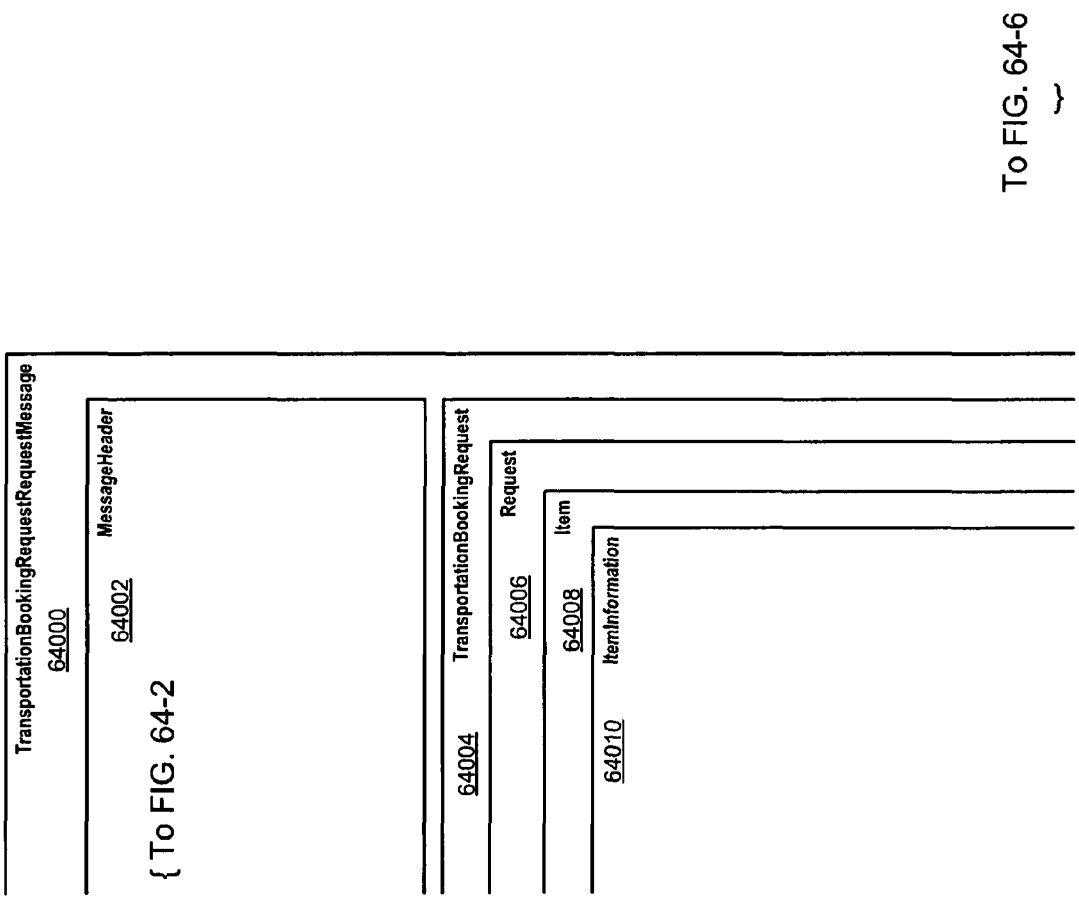
Figures 4, 64:
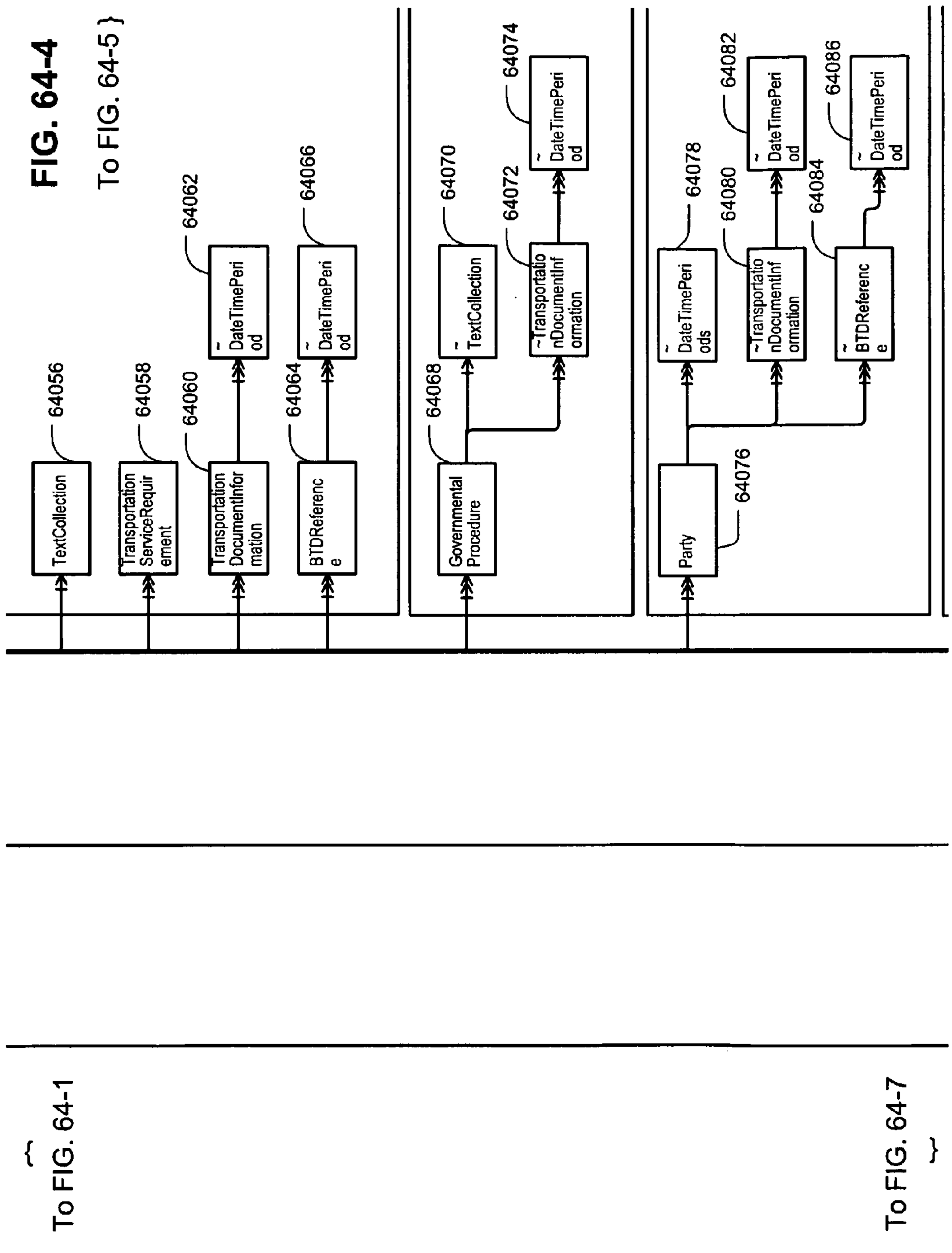
Figures 5, 64:
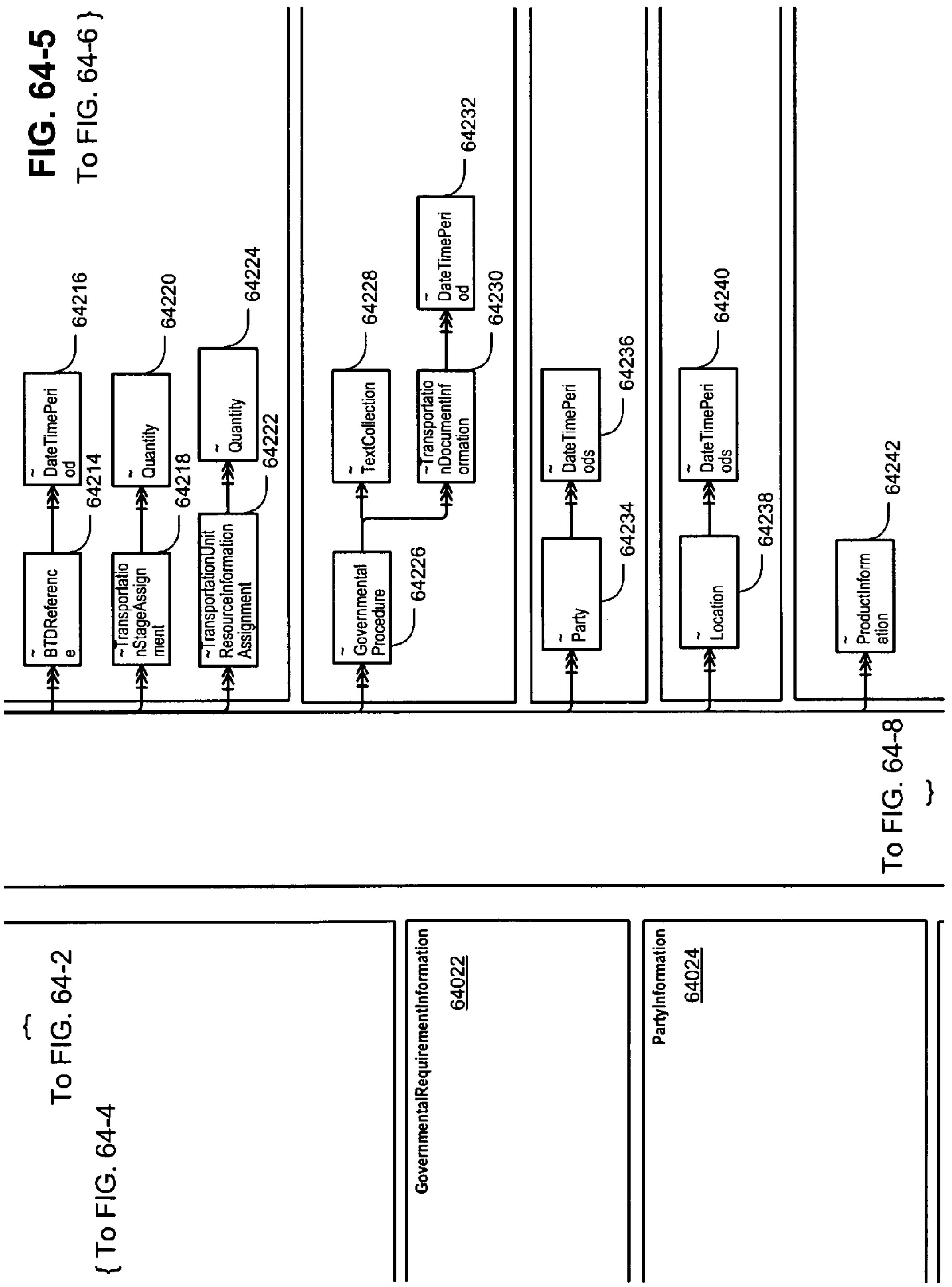
Figures 6, 64:
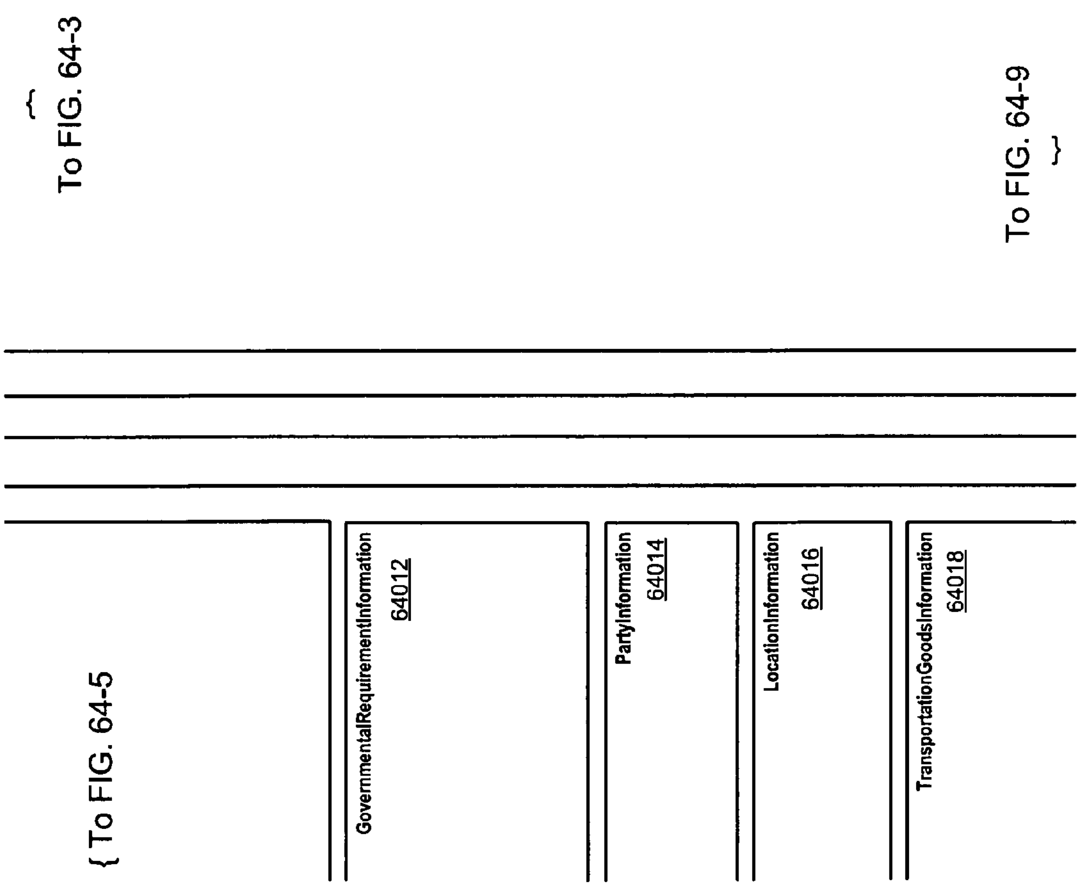
Figures 7, 64:
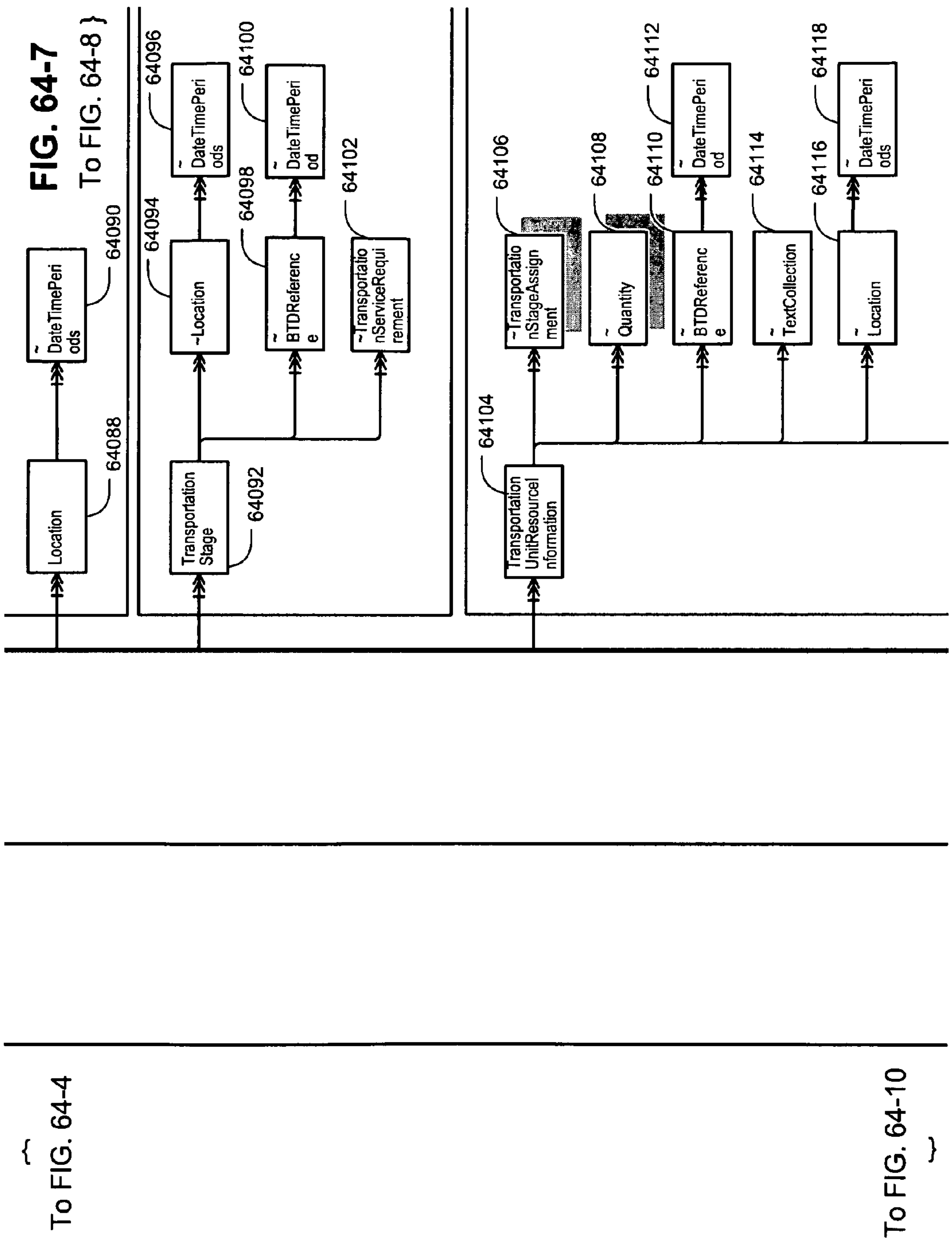
Figures 8, 64:
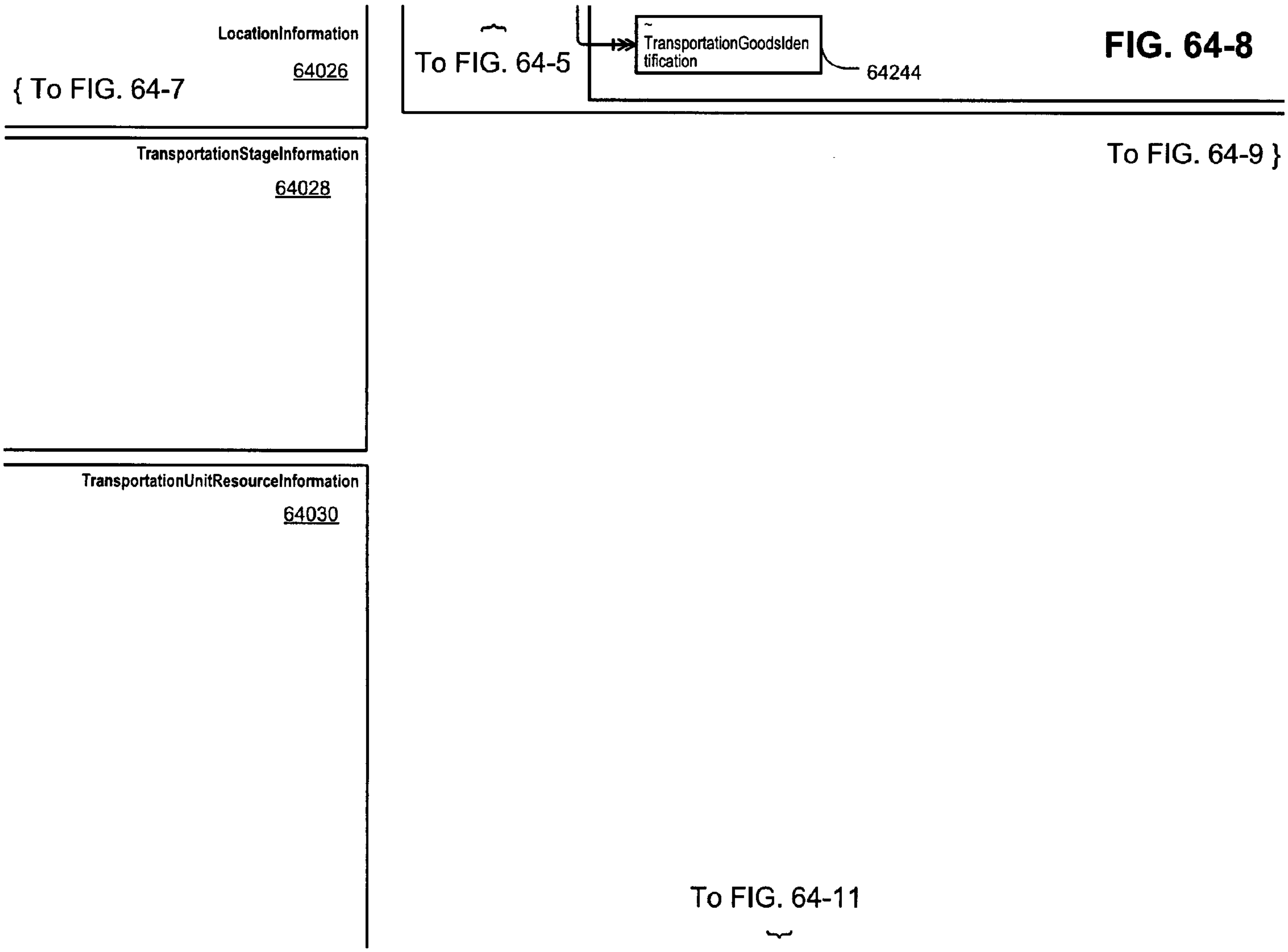
Figures 9, 64:
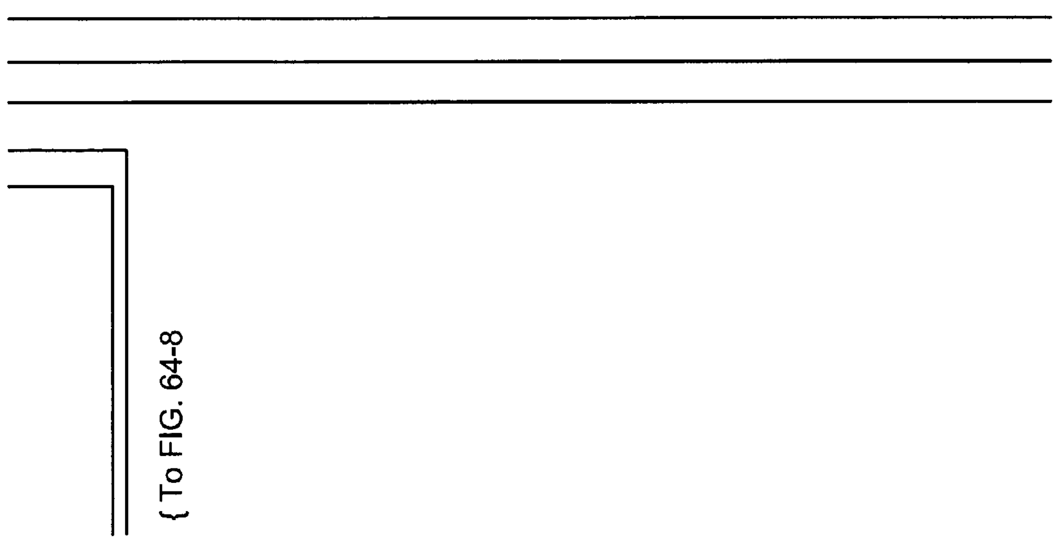
Figures 10, 64:
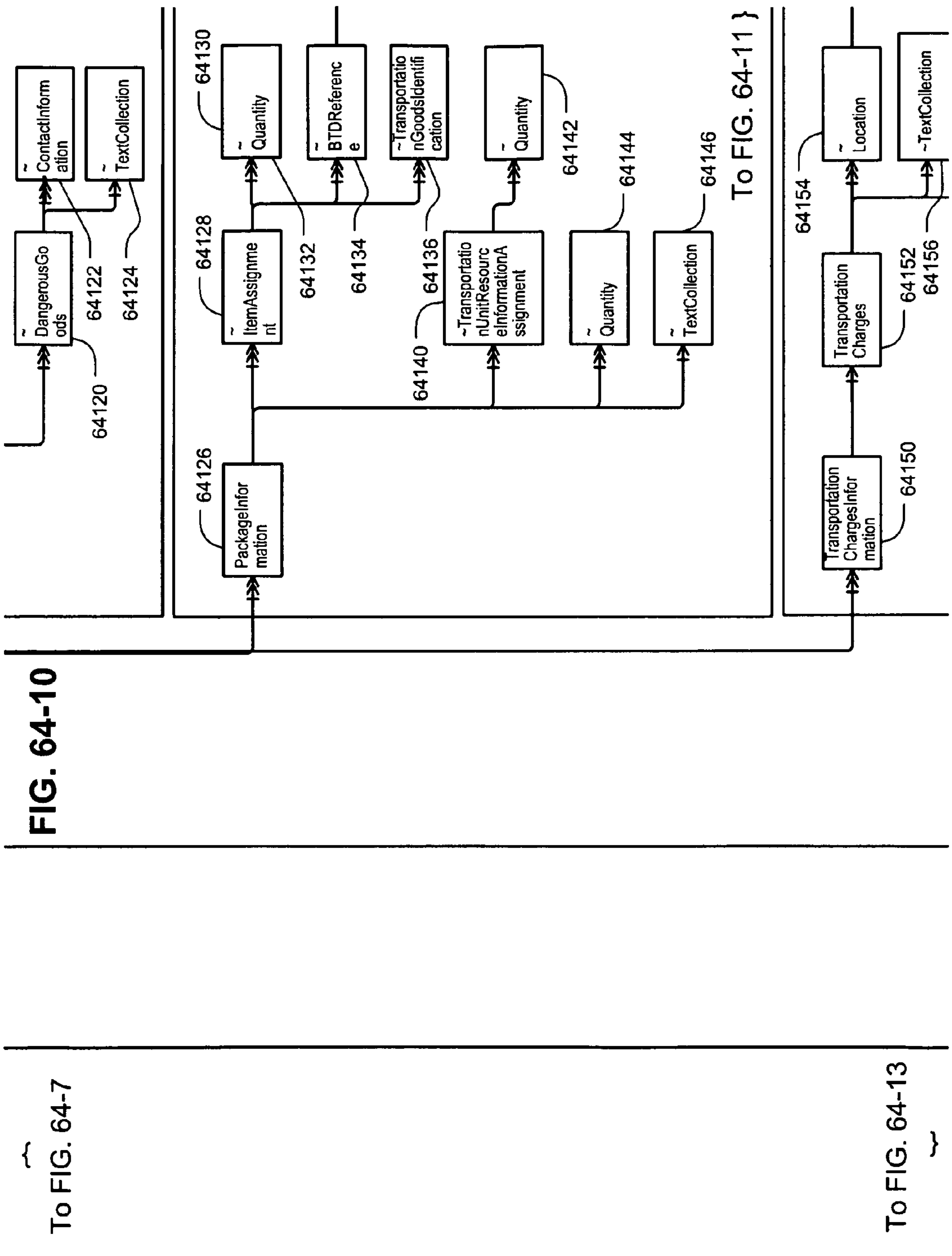
Figures 11, 64:
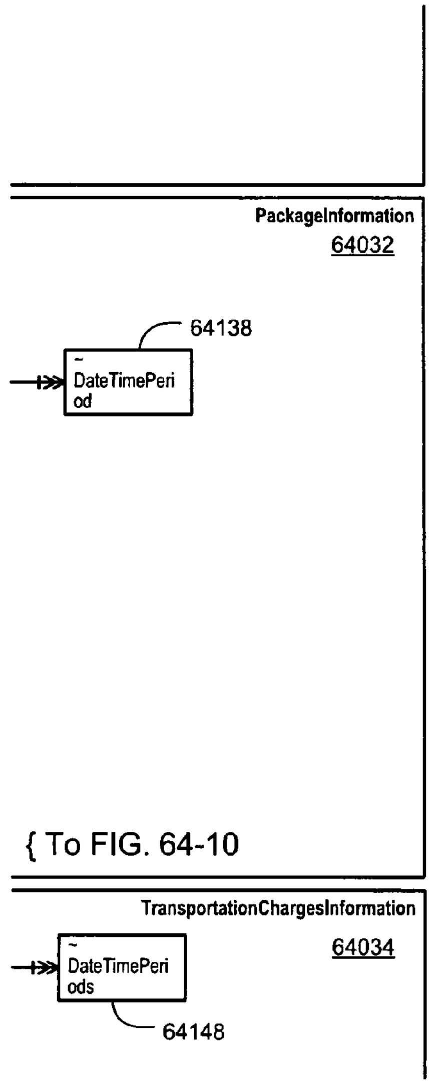
Figures 13, 64:
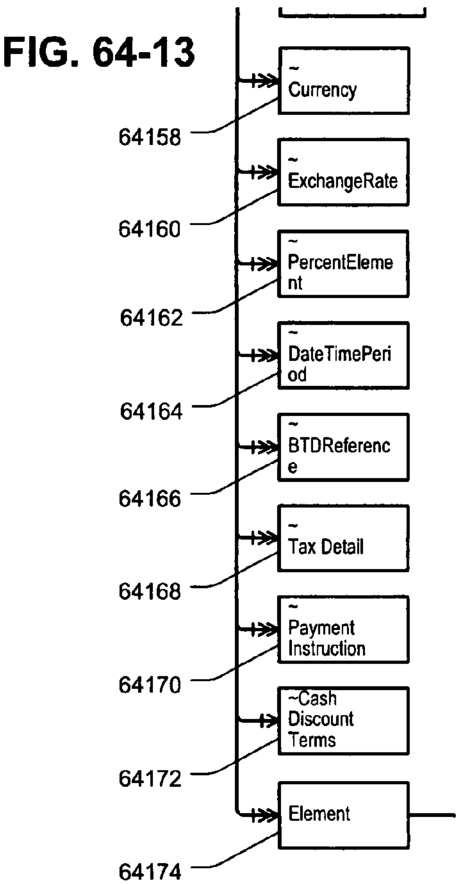
Figures 14, 64:
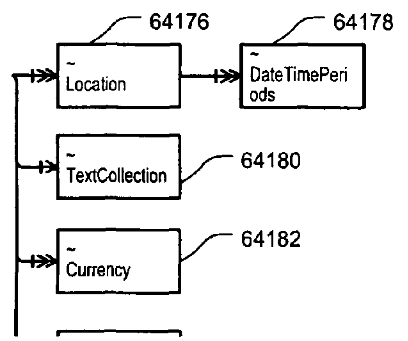
Figures 16, 64:
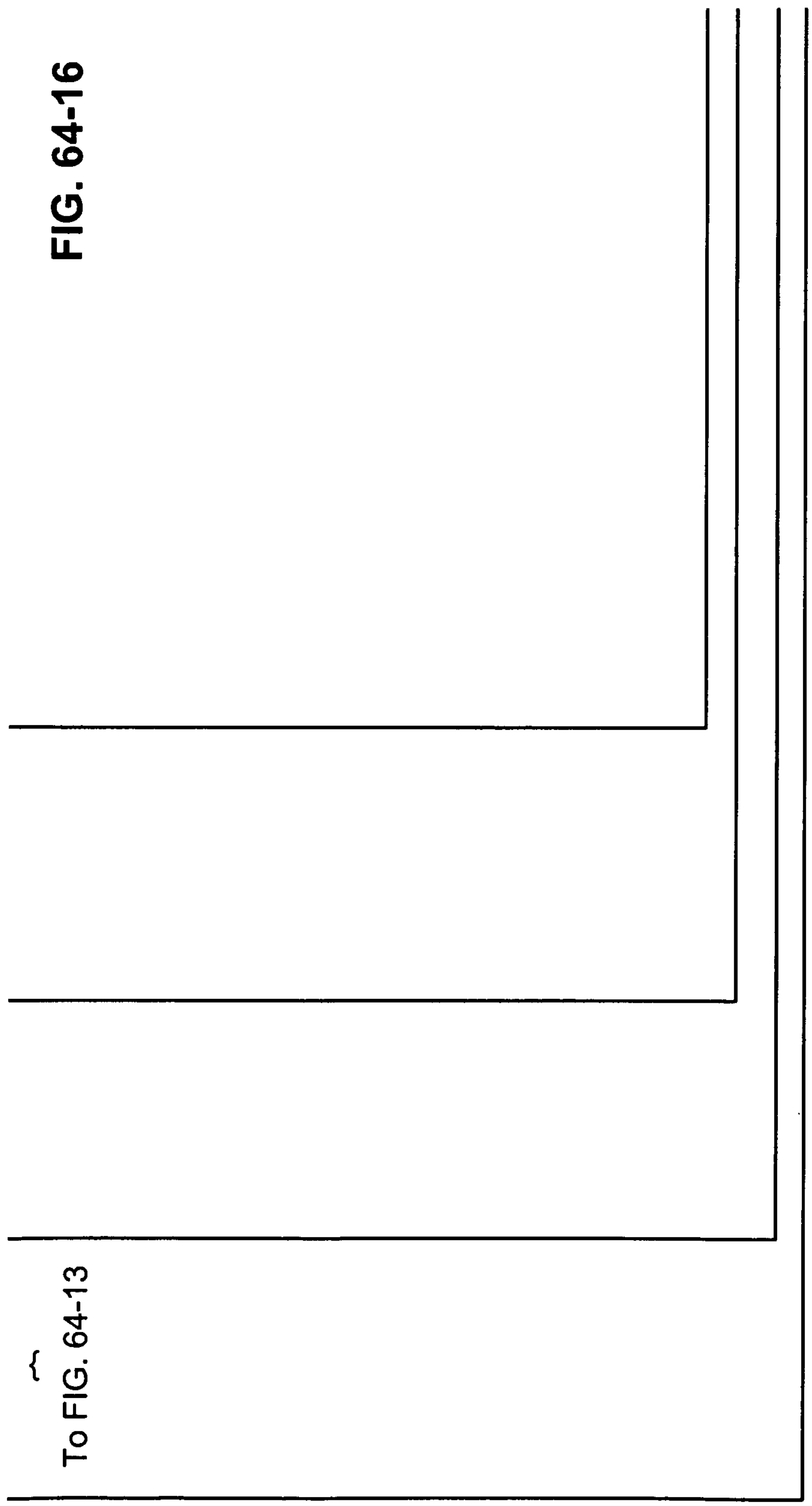
Figures 17, 64:
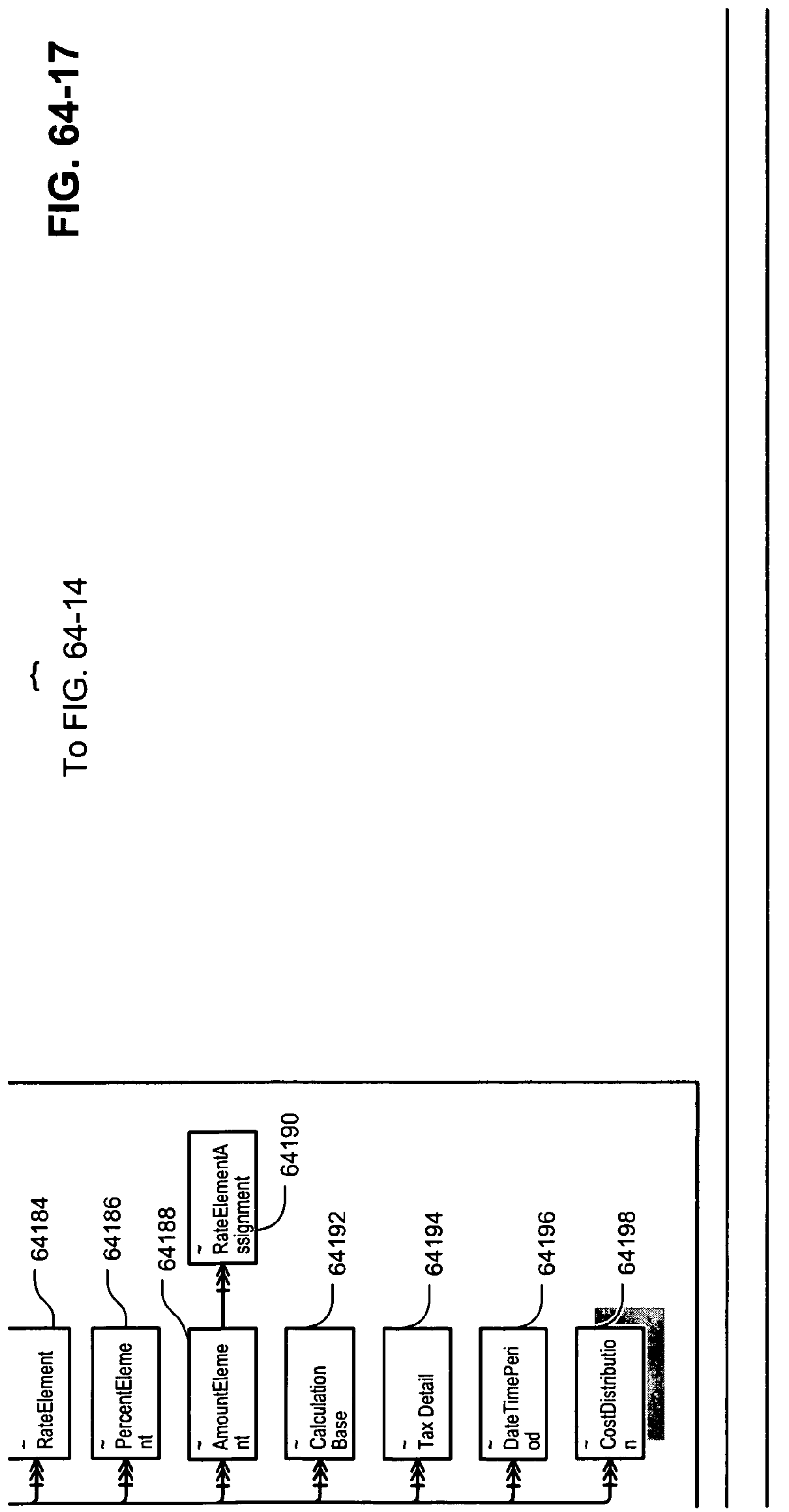
Figures 18, 64:
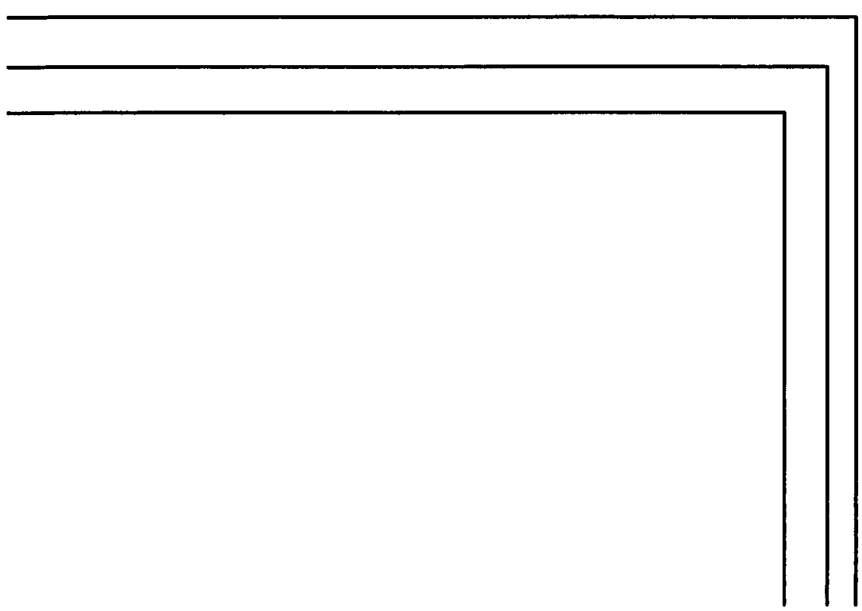

FIGS. 64-1 through 64-18 illustrate one example logical configuration of TransportationBookingRequestRequestMessage message 64000. Specifically, this figure depicts the arrangement and hierarchy of various components such as one or more levels of packages, entities, and datatypes, shown here as 64002 through 64244. As described above, packages may be used to represent hierarchy levels. Entities are discrete business elements that are used during a business transaction. Data types are used to type object entities and interfaces with a structure. For example, TransportationBookingRequestRequestMessage message 64000 includes, among other things, TransportationBookingRequest 64044. Accordingly, heterogeneous applications may communicate using this consistent message configured as such.

Figure 65:
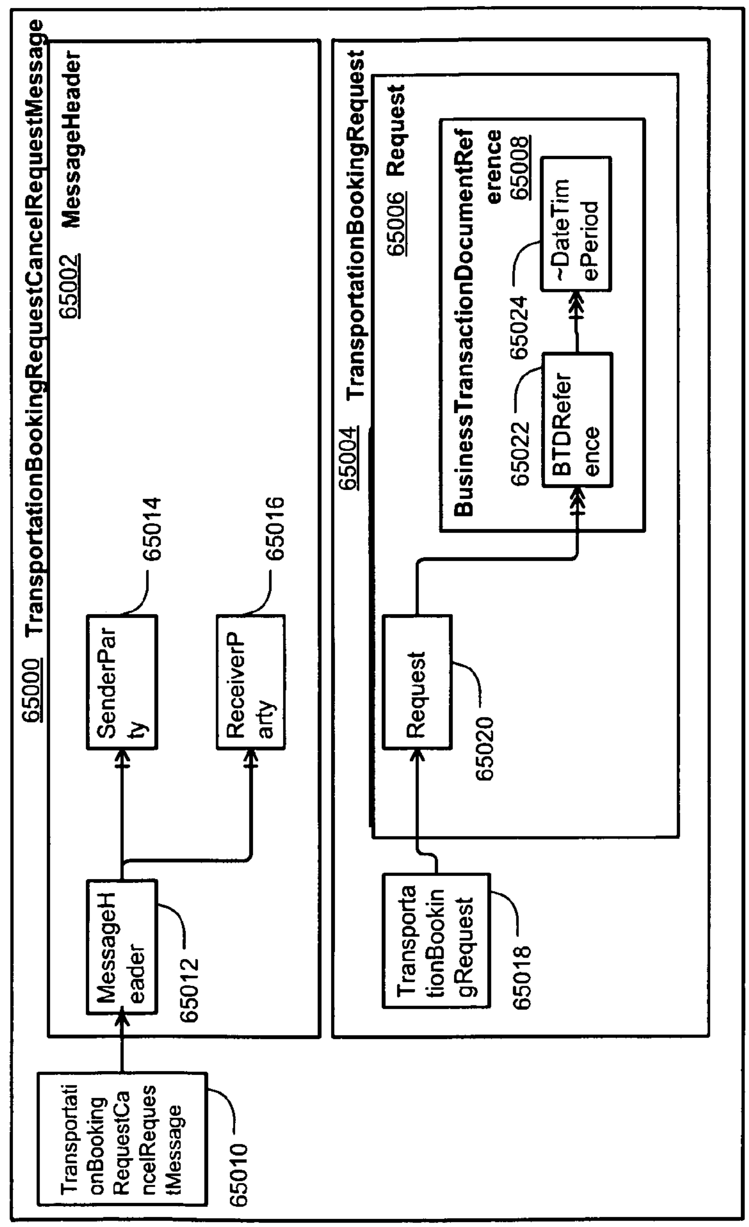

Additionally, FIG. 65 illustrates one example logical configuration of TransportationBookingRequestCancelRequestMessage message 65000. Specifically, this figure depicts the arrangement and hierarchy of various components such as one or more levels of packages, entities, and datatypes, shown here as 65002 through 65024. As described above, packages may be used to represent hierarchy levels. Entities are discrete business elements that are used during a business transaction. Data types are used to type object entities and interfaces with a structure. For example, TransportationBookingRequestCancelRequestMessage message 65000 includes, among other things, TransportationBookingRequest 65018. Accordingly, heterogeneous applications may communicate using this consistent message configured as such.

Figures 1, 66:
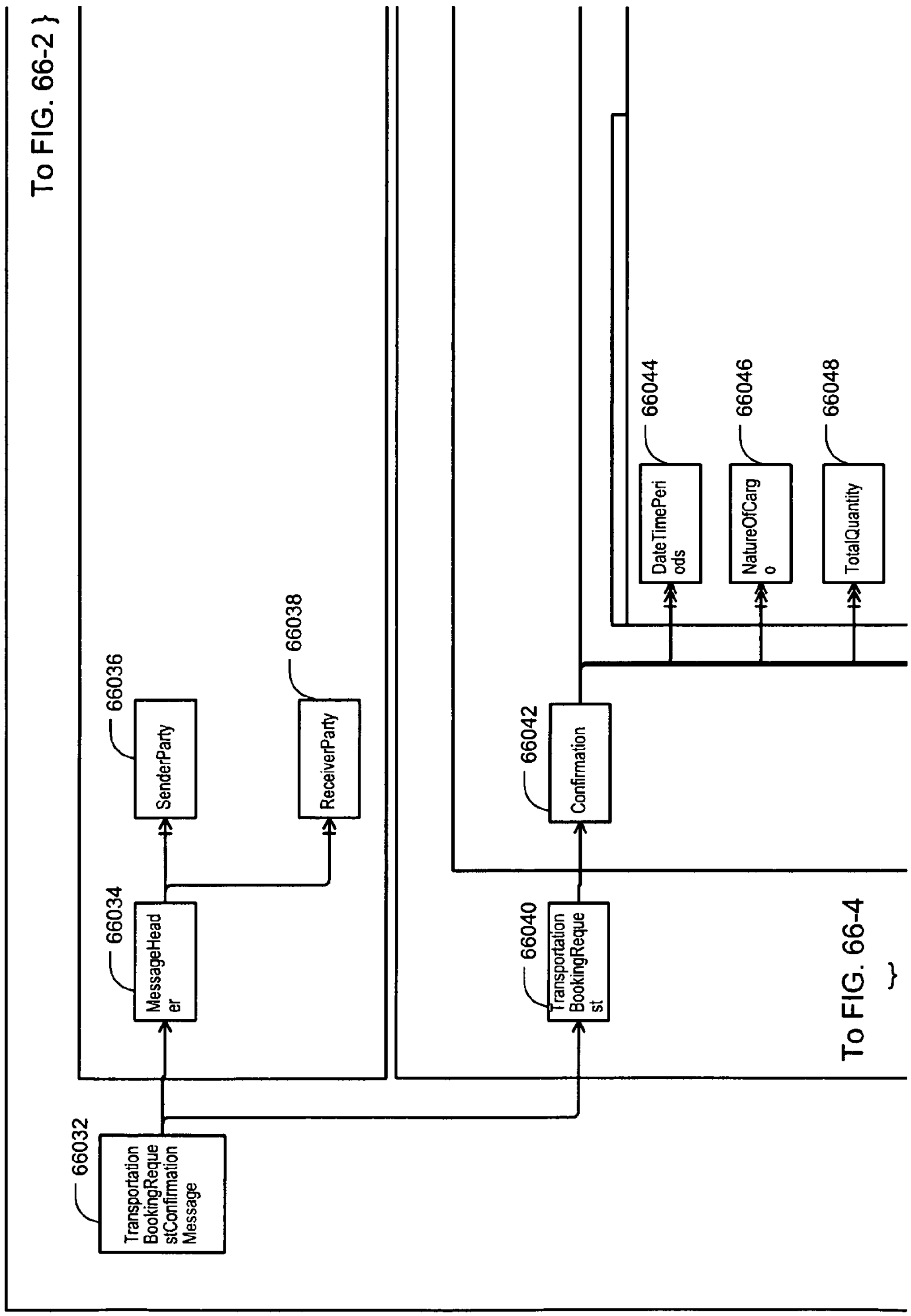
Figures 2, 66:
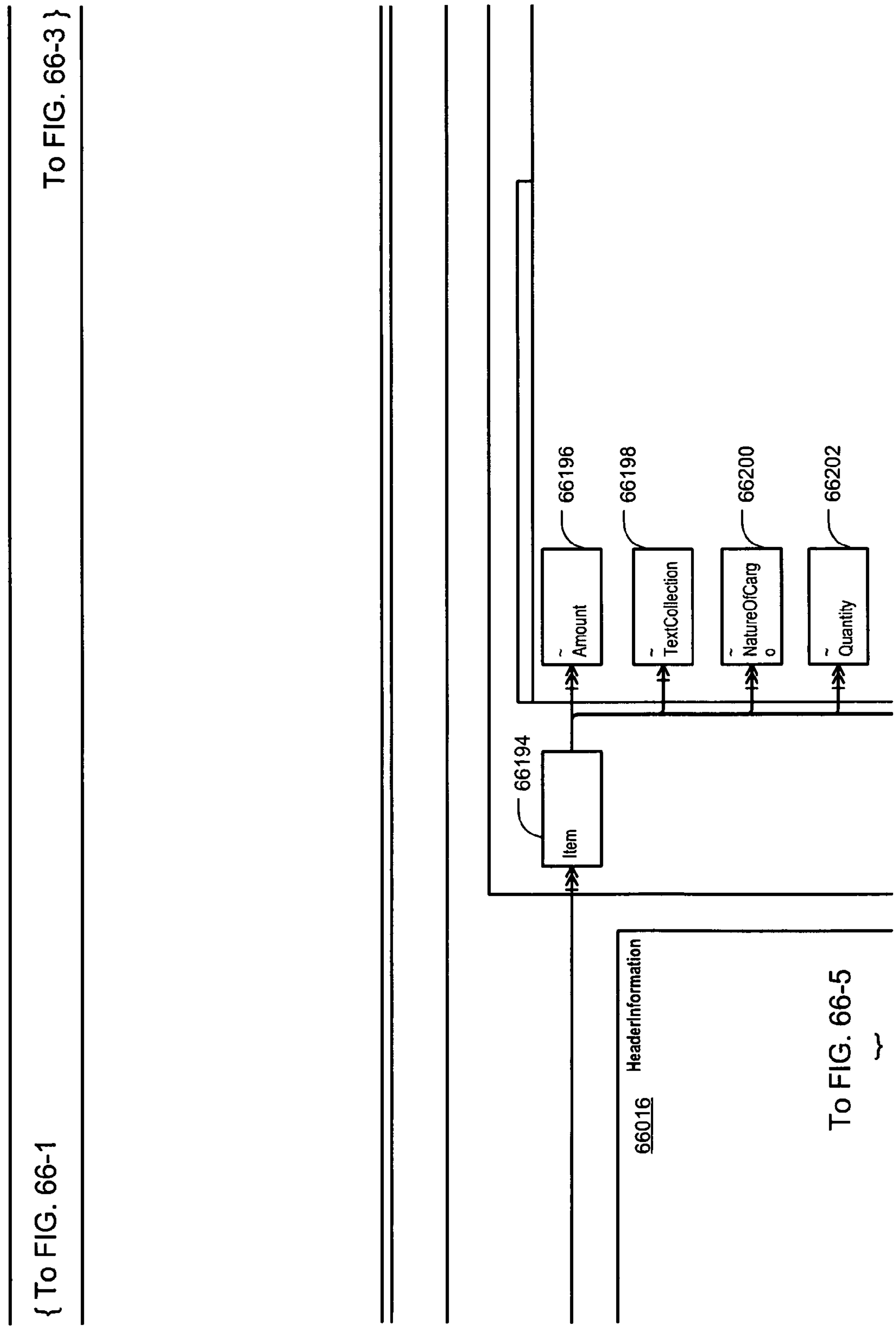
Figures 3, 66:
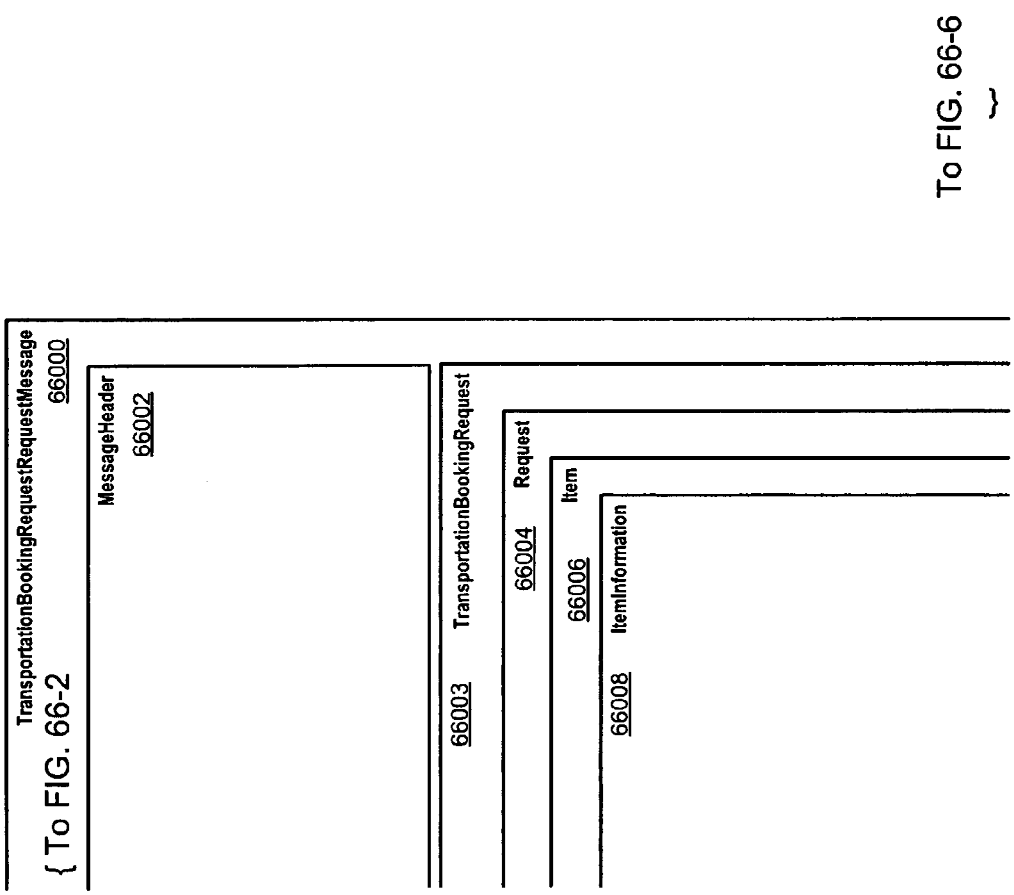
Figures 4, 66:
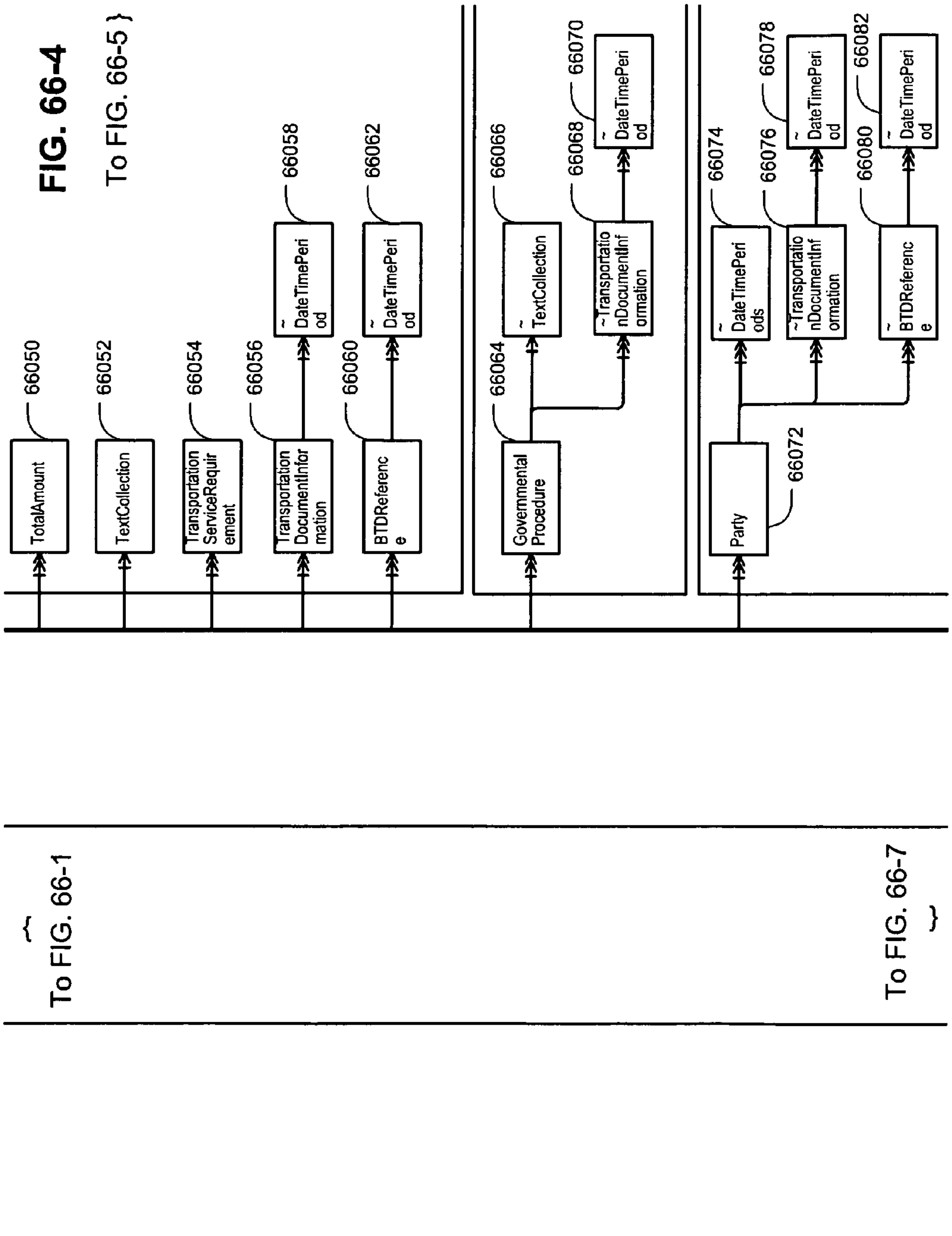
Figures 5, 66:
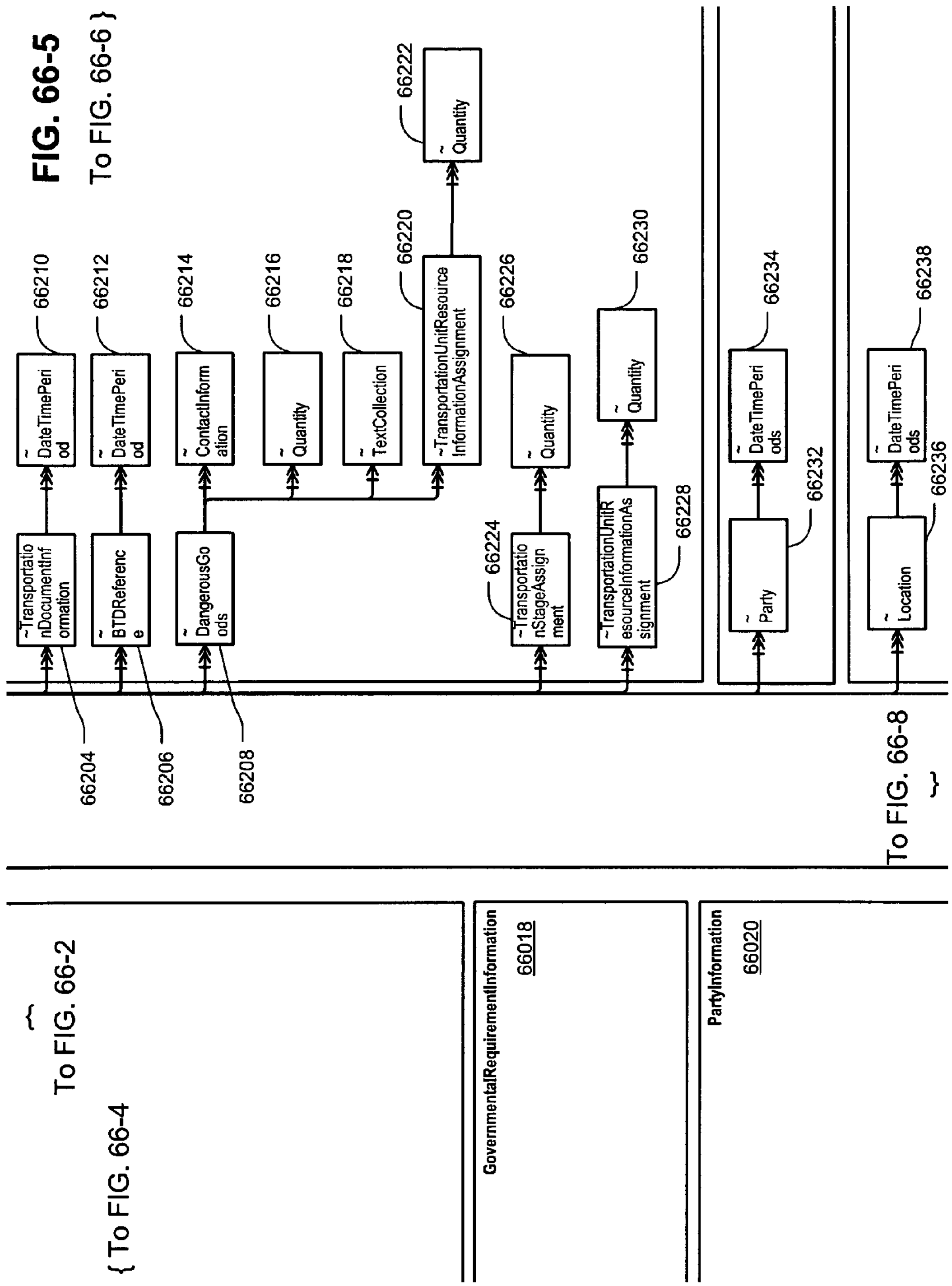
Figures 6, 66:
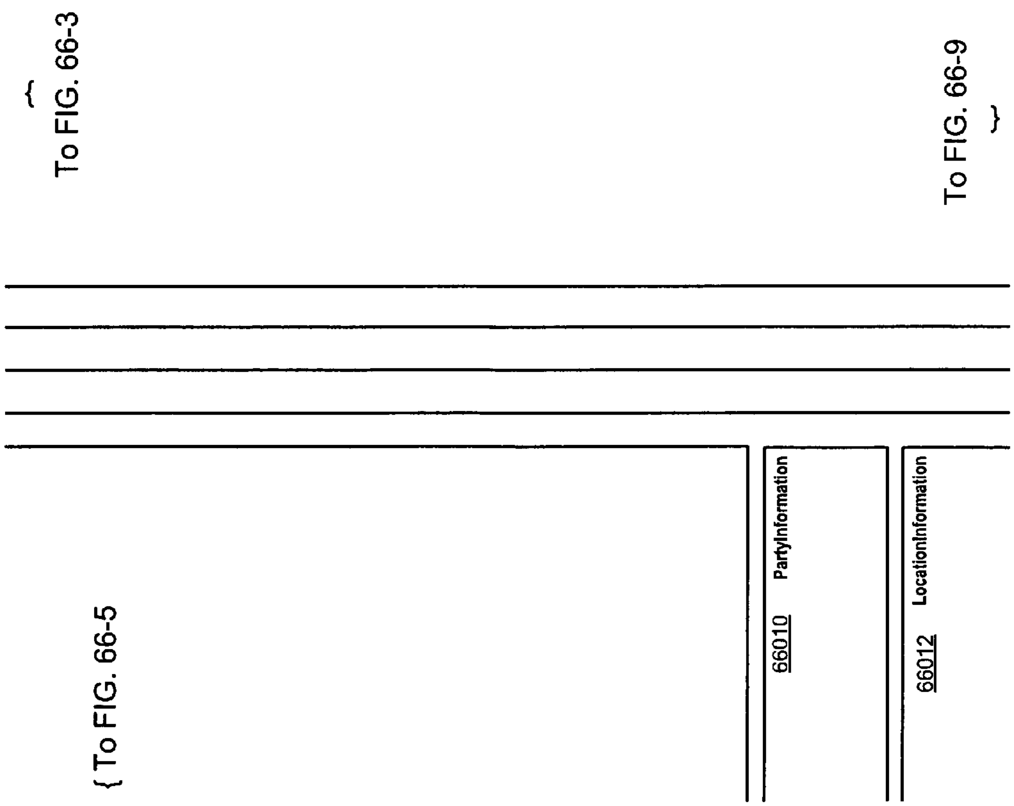
Figures 7, 66:
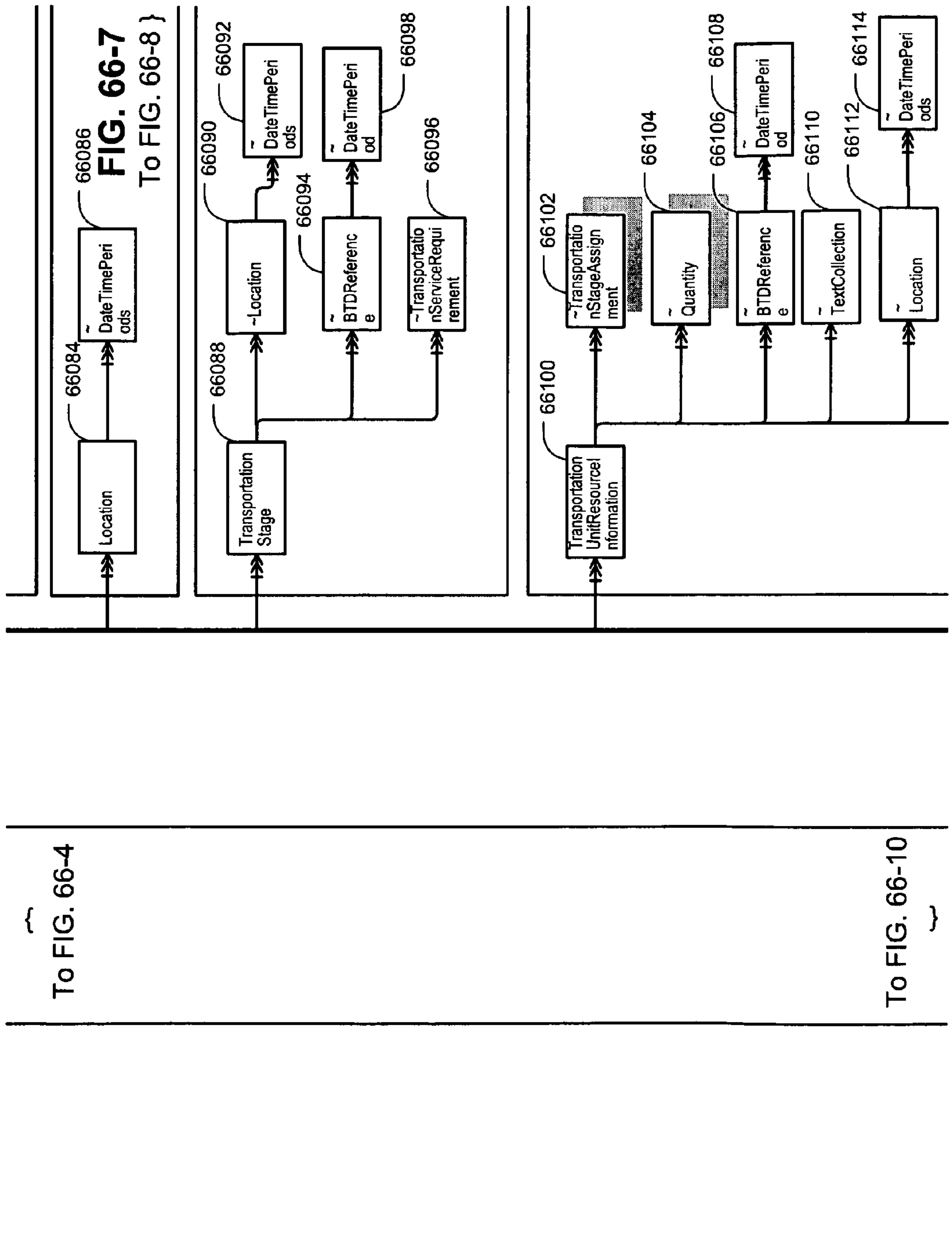
Figures 8, 66:
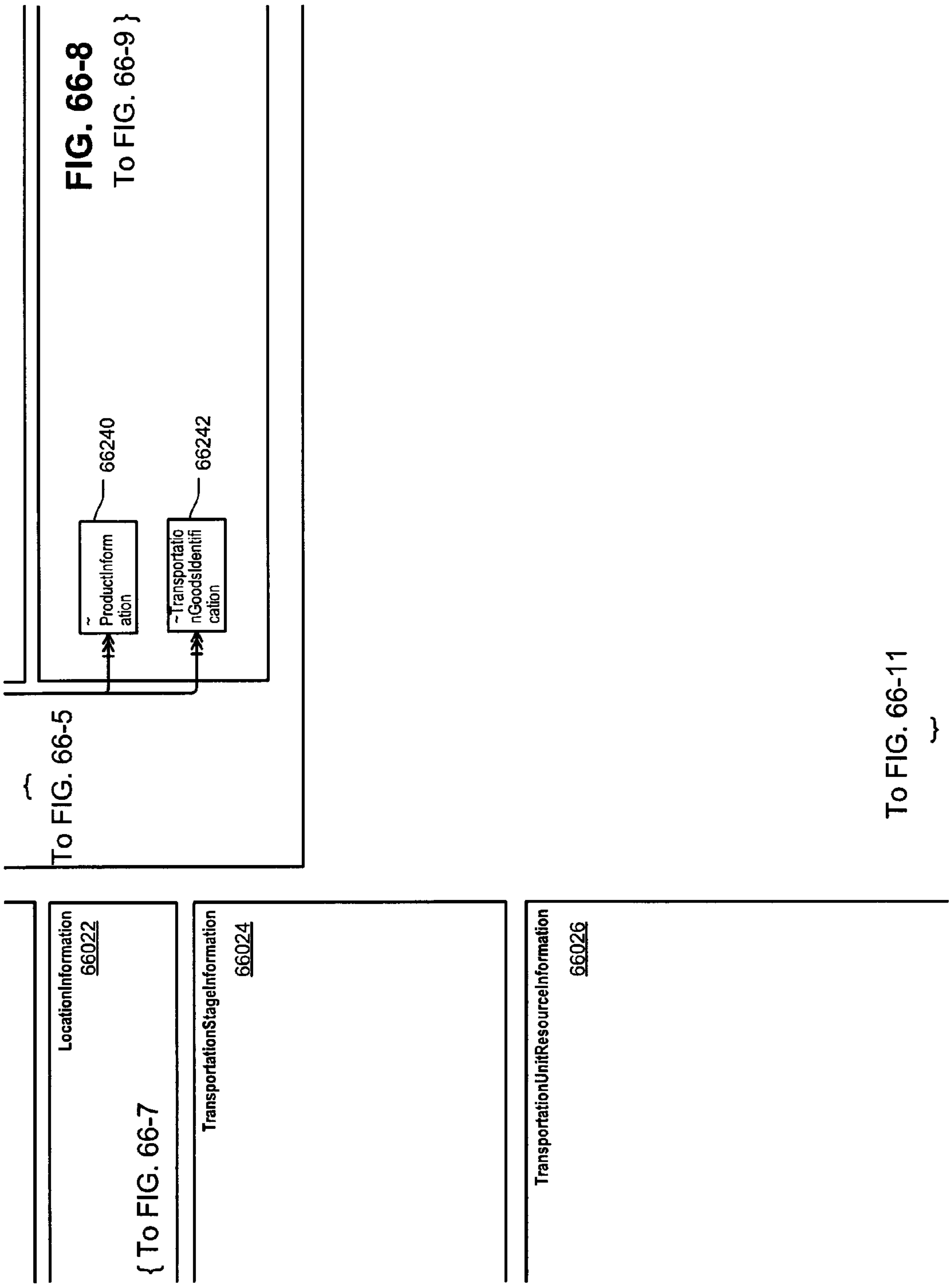
Figures 9, 66:
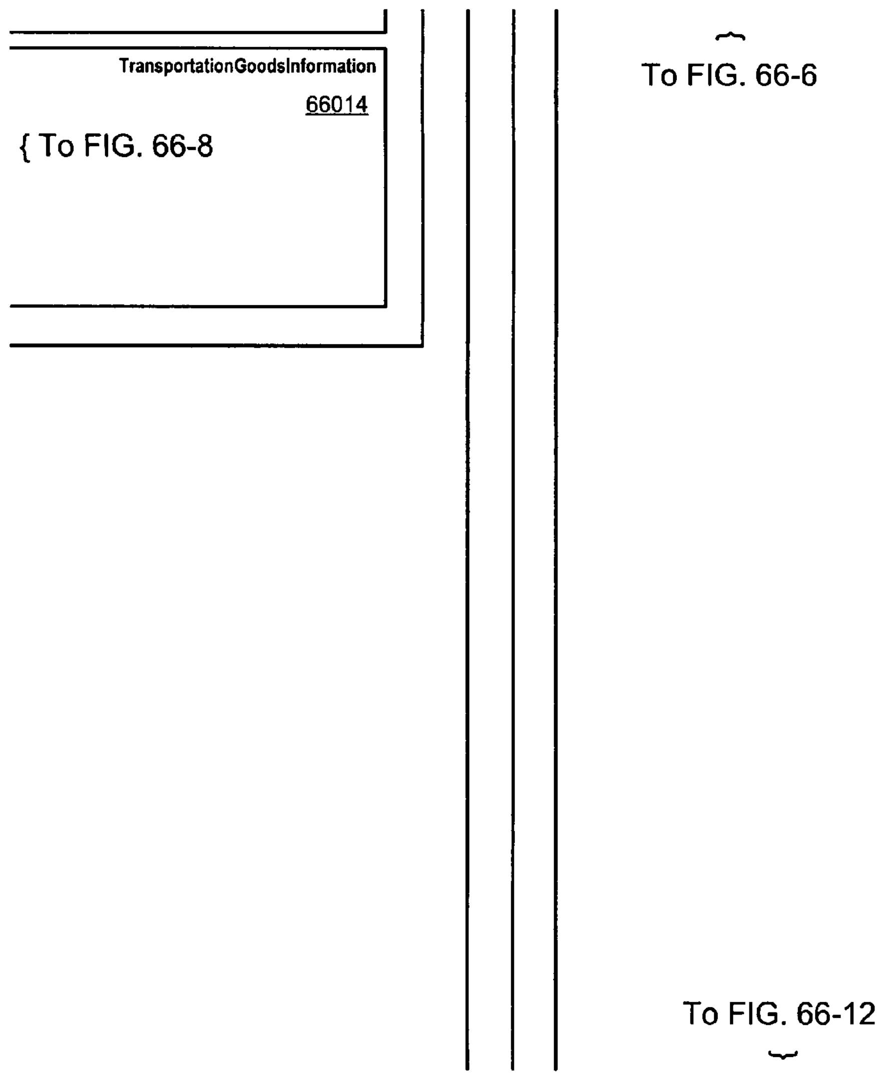
Figures 10, 66:
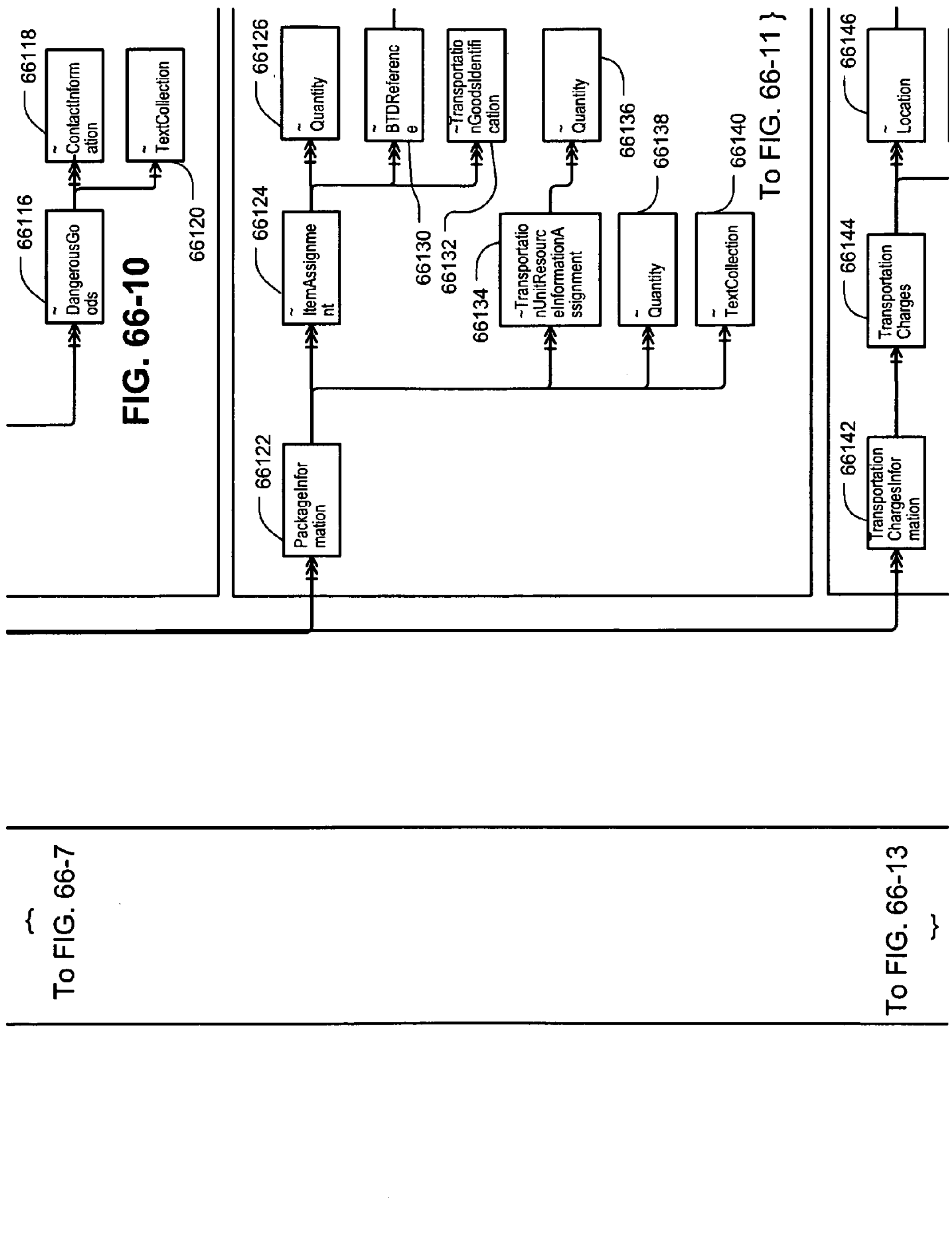
Figures 11, 66:
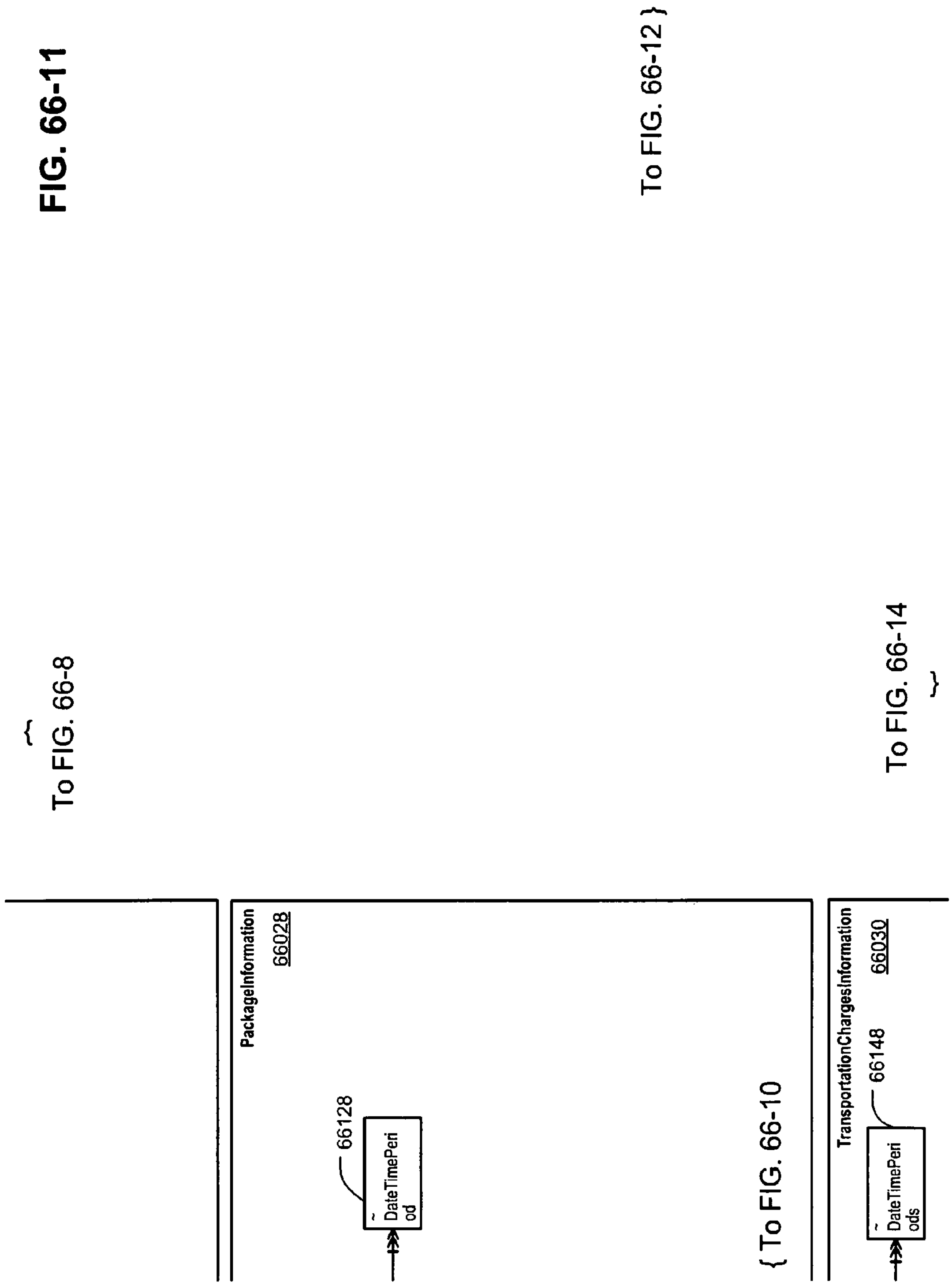
Figures 13, 66:
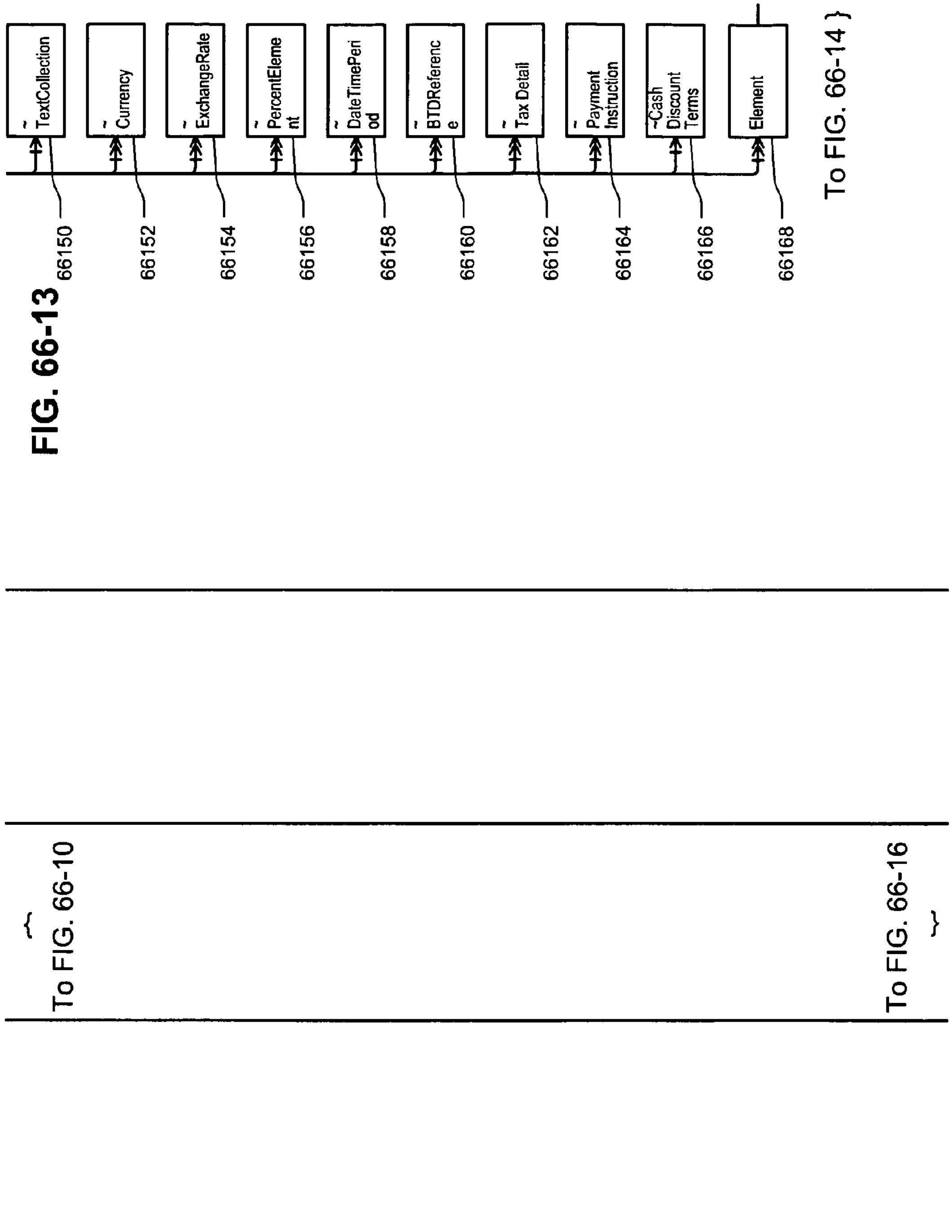
Figures 14, 66:
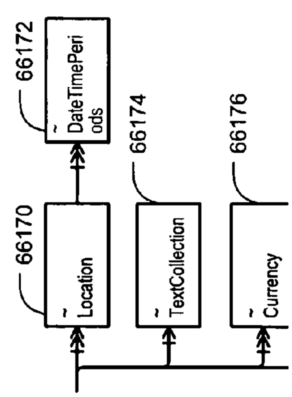
Figures 16, 66:
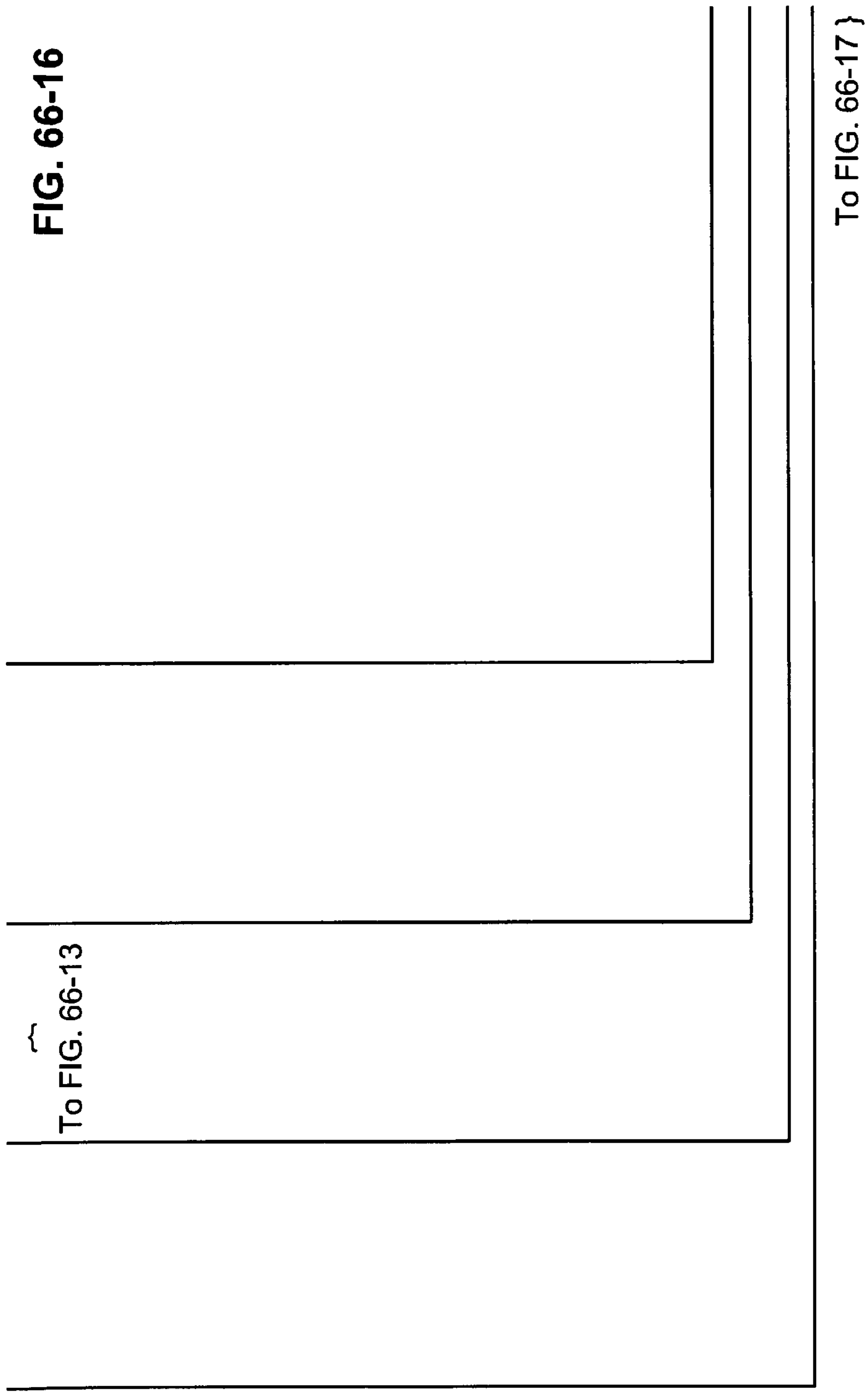
Figures 17, 66:
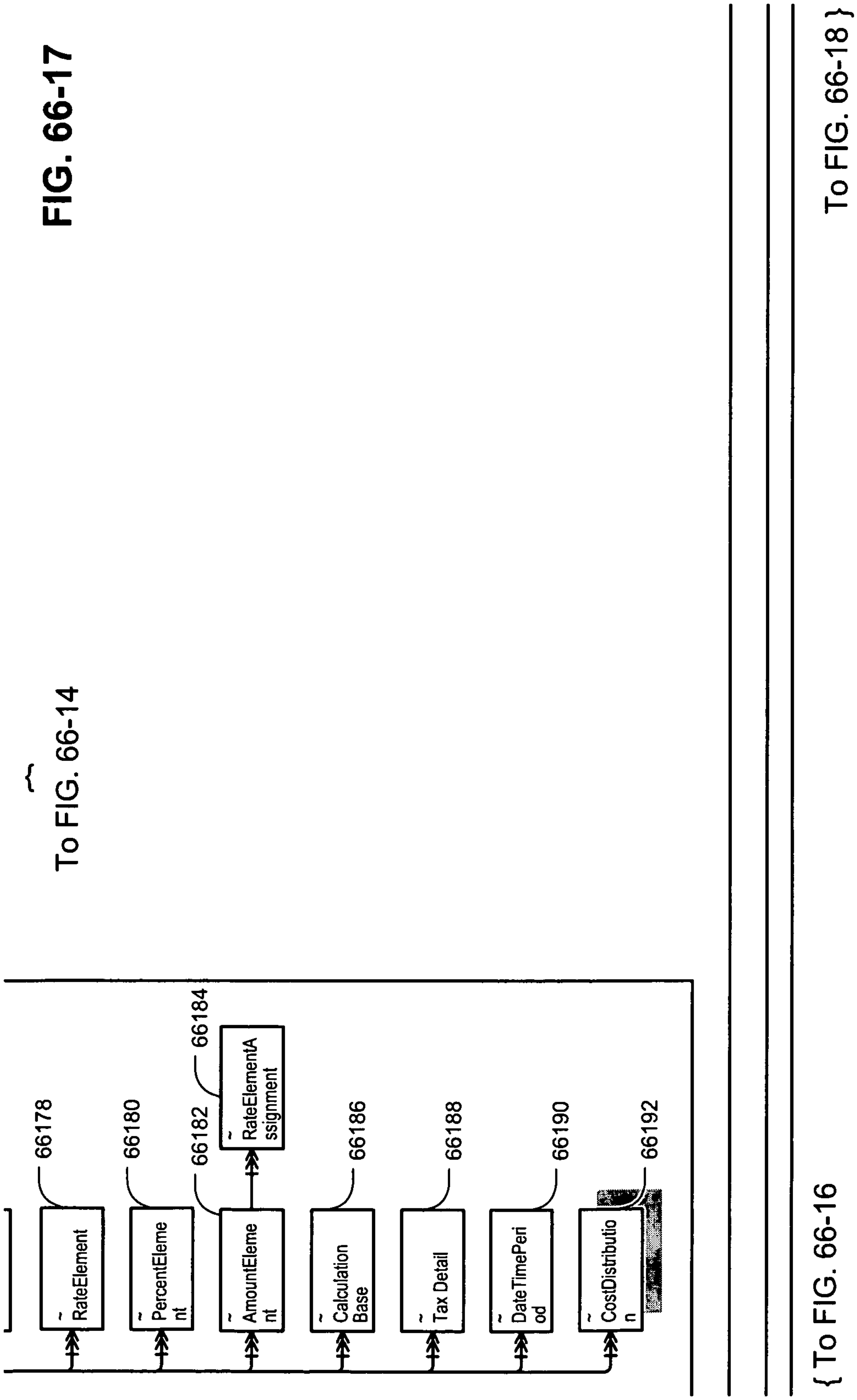
Figures 18, 66:
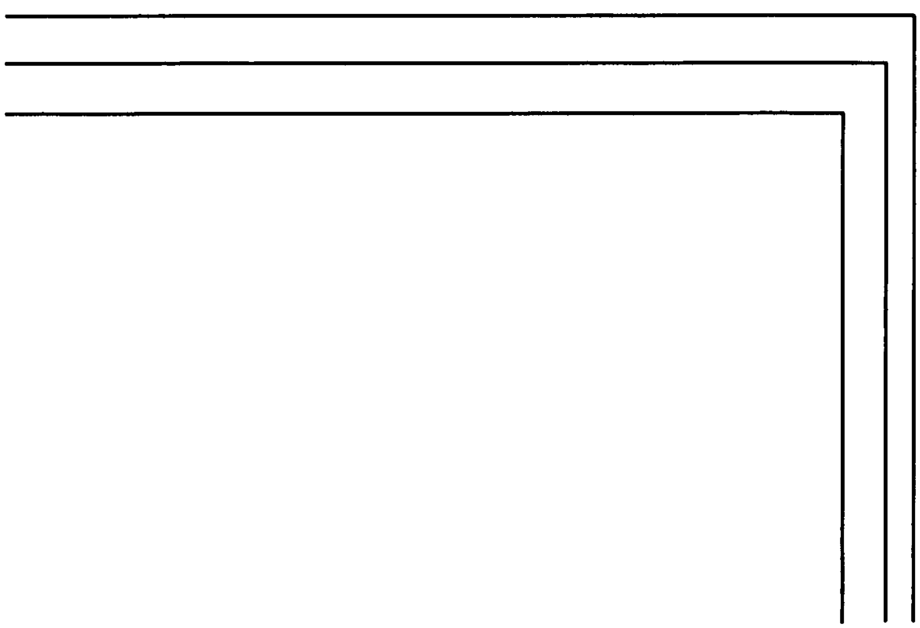

Additionally, FIGS. 66-1 through 66-18 illustrate one example logical configuration of TransportationBookingRequestRequestMessage message 66000. Specifically, this figure depicts the arrangement and hierarchy of various components such as one or more levels of packages, entities, and datatypes, shown here as 66002 through 66242. As described above, packages may be used to represent hierarchy levels. Entities are discrete business elements that are used during a business transaction. Data types are used to type object entities and interfaces with a structure. For example, TransportationBookingRequestRequestMessage message 66000 includes, among other things, TransportationBookingRequest 66040. Accordingly, heterogeneous applications may communicate using this consistent message configured as such.

Figure 67:
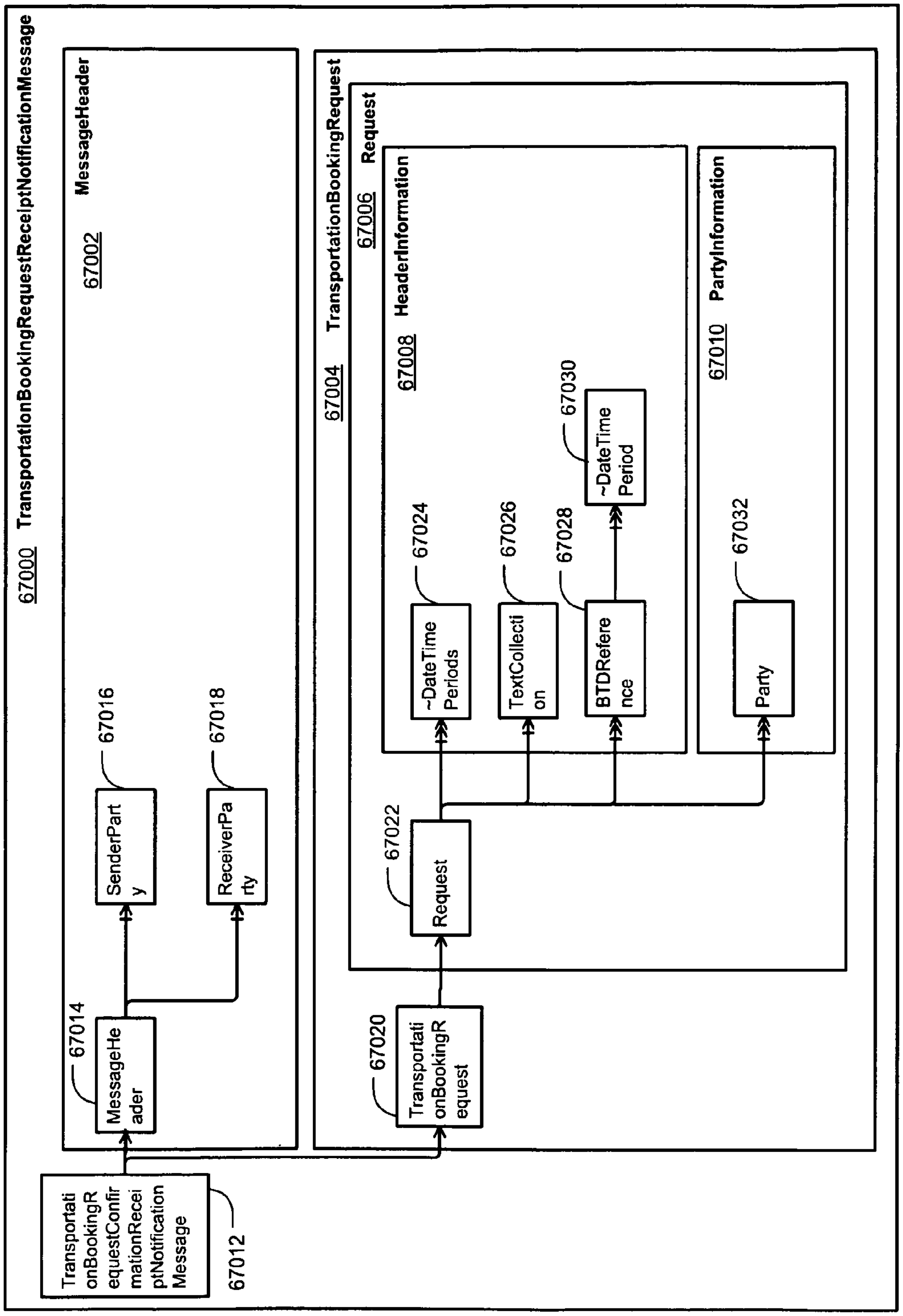

Additionally, FIG. 67 illustrates one example logical configuration of TransportationBookingRequestReceiptNotificationMessage message 67000. Specifically, this figure depicts the arrangement and hierarchy of various components such as one or more levels of packages, entities, and datatypes, shown here as 67002 through 67032. As described above, packages may be used to represent hierarchy levels. Entities are discrete business elements that are used during a business transaction. Data types are used to type object entities and interfaces with a structure. For example, TransportationBookingRequestReceiptNotificationMessage message 67000 includes, among other things, TransportationBookingRequest 67020. Accordingly, heterogeneous applications may communicate using this consistent message configured as such.

Figure 68:
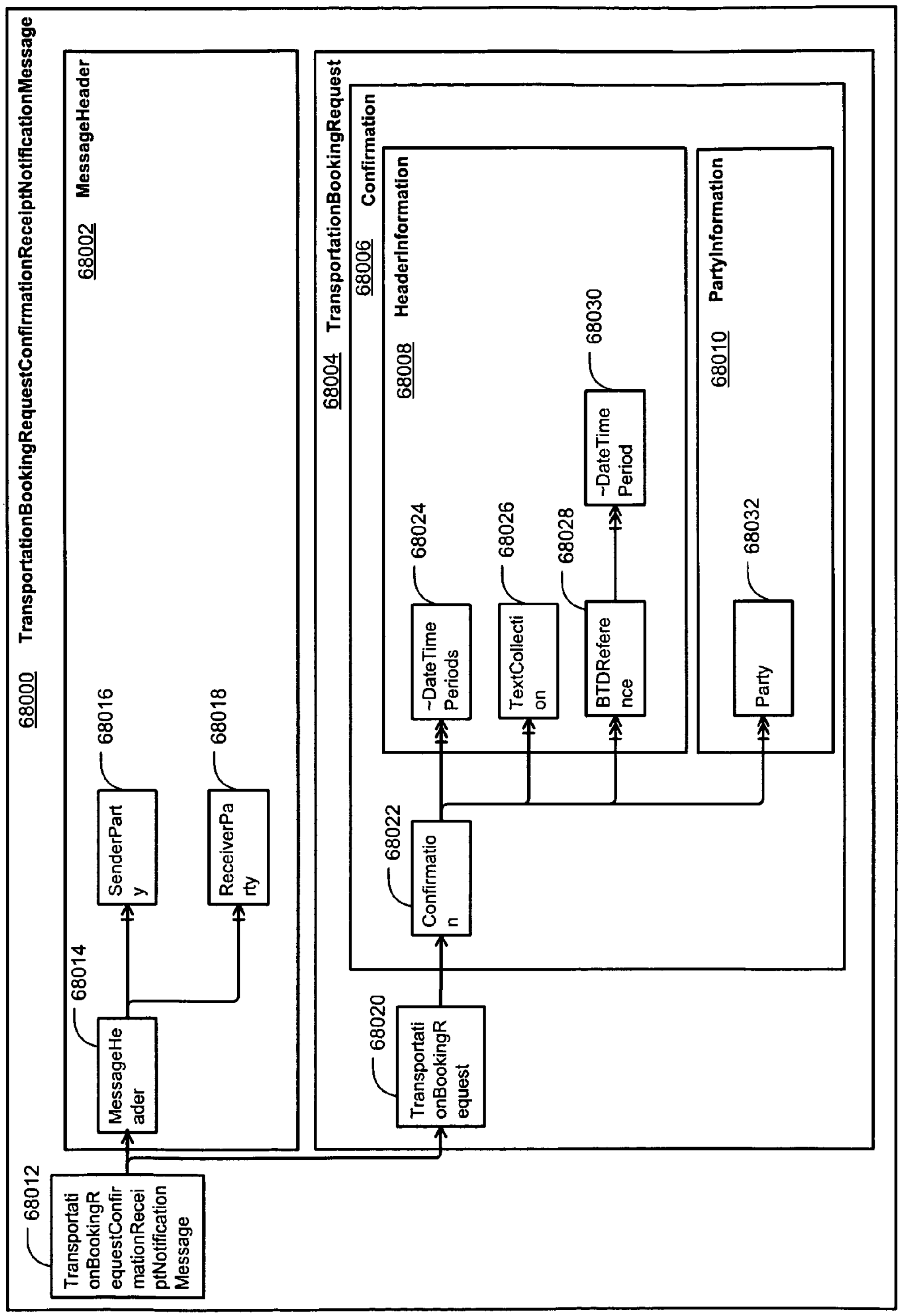

Additionally, FIG. 68 illustrates one example logical configuration of TransportationBookingRequestConfirmationReceiptNotificationMessage message 68000. Specifically, this figure depicts the arrangement and hierarchy of various components such as one or more levels of packages, entities, and datatypes, shown here as 68002 through 68032. As described above, packages may be used to represent hierarchy levels. Entities are discrete business elements that are used during a business transaction. Data types are used to type object entities and interfaces with a structure. For example, TransportationBookingRequestConfirmationReceiptNotificationMessage message 68000 includes, among other things, TransportationBookingRequest 68020. Accordingly, heterogeneous applications may communicate using this consistent message configured as such.

FIGS. 69-1 through 69-3 illustrate one example logical configuration of a TransportationBookingRequestCancelRequestMessage 69000 element structure. Specifically, these figures depict the arrangement and hierarchy of various components such as one or more levels of packages, entities, and datatypes, shown here as 69000 through 69088. As described above, packages may be used to represent hierarchy levels. Entities are discrete business elements that are used during a business transaction. Data types are used to type object entities and interfaces with a structure. For example, the TransportationBookingRequestCancelRequestMessage 69000 includes, among other things, a TransportationBookingRequestCancelRequestMessage entity 69002. Accordingly, heterogeneous applications may communicate using this consistent message configured as such.

FIGS. 70-1 through 70-83 illustrate one example logical configuration of a TransportationBookingRequestConfirmationMessage 700000 element structure. Specifically, these figures depict the arrangement and hierarchy of various components such as one or more levels of packages, entities, and datatypes, shown here as 700000 through 702646. As described above, packages may be used to represent hierarchy levels. Entities are discrete business elements that are used during a business transaction. Data types are used to type object entities and interfaces with a structure. For example, the TransportationBookingRequestConfirmationMessage 700000 includes, among other things, a TransportationBookingRequest 700014. Accordingly, heterogeneous applications may communicate using this consistent message configured as such.

FIGS. 71-1 through 71-5 illustrate one example logical configuration of a TransportationBookingRequestConfirmationReceiptNotificationMessage 71000 element structure. Specifically, these figures depict the arrangement and hierarchy of various components such as one or more levels of packages, entities, and datatypes, shown here as 71000 through 71138. As described above, packages may be used to represent hierarchy levels. Entities are discrete business elements that are used during a business transaction. Data types are used to type object entities and interfaces with a structure. For example, the TransportationBookingRequestConfirmationReceiptNotificationMessage 71000 includes, among other things, a TransportationBookingRequestConfirmationReceiptNotificationMessage 71002. Accordingly, heterogeneous applications may communicate using this consistent message configured as such.

FIGS. 72-1 through 72-5 illustrate one example logical configuration of a TransportationBookingRequestReceiptNotificationMessage 72000 element structure. Specifically, these figures depict the arrangement and hierarchy of various components such as one or more levels of packages, entities, and datatypes, shown here as 72000 through 72138. As described above, packages may be used to represent hierarchy levels. Entities are discrete business elements that are used during a business transaction. Data types are used to type object entities and interfaces with a structure. For example, the TransportationBookingRequestReceiptNotificationMessage 72000 includes, among other things, a TransportationBookingRequestReceiptNotificationMessage entity 72002. Accordingly, heterogeneous applications may communicate using this consistent message configured as such.

FIGS. 73-1 through 73-84 illustrate one example logical configuration of a TransportationBookingRequestRequestMessage 730000 element structure. Specifically, these figures depict the arrangement and hierarchy of various components such as one or more levels of packages, entities, and datatypes, shown here as 730000 through 732640. As described above, packages may be used to represent hierarchy levels. Entities are discrete business elements that are used during a business transaction. Data types are used to type object entities and interfaces with a structure. For example, the TransportationBookingRequestRequestMessage 730000 includes, among other things, a TransportationBookingRequest 700014. Accordingly, heterogeneous applications may communicate using this consistent message configured as such.

Message Data Type TransportationBookingRequestRequest

The message data type TransportationBookingRequestRequestMessage includes the business information that is relevant for sending a business document in a message, and/or the TransportationBookingRequest included in the business document. It includes the packages MessageHeader and TransportationBookingRequest. The message data type TransportationBookingRequestRequestMessage provides a structure for the message type TransportationBookingRequestRequestMessage and interfaces that are based on it.

A MessageHeader package can be included with this message data type. The TransportationBookingRequest package groups the TransportationBookingRequest with its packages. It includes the entity TransportationBookingRequest and the package Request.

TransportationBookingRequest is a request from an ordering party to another party to book transportation services. A corresponding confirmation to the ordering party is part of the TransportationBookingRequest. The attributes and elements located at the TransportationBookingRequest entity can include @actioncode and ID. @actioncode is a coded representation of an instruction to the message recipient telling it how to process the transmitted element. It is of type GDT: ActionCode. ID is a unique identifier of a TransportationBookingRequest, and is of type GDT: BusinessTransactionDocumentTypeCode. In some implementations, the attribute actioncode can include the two values 01—Create and 02—Change. In some implementations, the ID can not be changed once a TransportationBookingRequest has been created. In some implementations, the Complete Transmission Indicator (CTI) might not be included as it can always be set to true, such that there may be no delta transmissions, and the complete message content can be transmitted in every message. In some implementations, if an item is missing in the message, the corresponding item can be deleted.

The Request package groups the Request with its packages. It includes the entity Request and the packages HeaderInformation, TransportationChargesInformation, GovernmentalRequirementInformation, PartyInformation, LocationInformation, TransportationStageInformation, TransportationUnitResourceInformation, PackageInformation, and Item.

Message Data Type TransportationBookingRequestCancelRequestMessage

A message data type TransportationBookingRequestCancelMessage groups together the business information that is relevant for sending a business document in a message and the TransportationBookingRequest object in the business document. It includes the packages BusinessDocumentMessageHeader and TransportationBookingRequest.

A MessageHeader package can be included with this message data type. The TransportationBookingRequest package groups together information about the TransportationBookingRequest. It includes the entity TransportationBookingRequest. It includes the package BusinessTransactionDocumentReference.

TransportationBookingRequest is a request from an ordering party to another party to book transportation services. A corresponding confirmation to the ordering party is part of the TransportationBookingRequest. The attributes and elements located directly at the TransportationBookingRequest entity can include ID, which is a unique identifier of a TransportationBookingRequest. ID is of type GDT: BusinessTransactionDocumentID. A Request package can be included with this message data type.

Message Data Type TransportationBookingRequestConfirmation

The message data type TransportationBookingRequestConfirmationMessage includes business information that is relevant for sending a business document in a message and the TransportationBookingRequest included in the business document. The message data type TransportationBookingRequestConfirmationMessage provides the structure for the message type TransportationBookingRequestConfirmationMessage and the interfaces that are based on it.

A MessageHeader package can be included with this message data type. The TransportationBookingRequest package groups the TransportationBookingRequest together with its packages. It includes the entity TransportationBookingRequest and the package Confirmation.

TransportationBookingRequest is a request from an ordering party to another party to book transportation services. A corresponding confirmation to the ordering party is part of the TransportationBookingRequest. The confirmation package is a confirmation of a request from an ordering party to another party to book transportation services.

Message Data Type TransportationBookingRequestReceiptNotificationMessage

The message data type TransportationBookingRequestReceiptNotificationMessage includes the business information that is relevant for sending a business document in a message and the TransportationBookingRequest included in the business document. The message data type TransportationBookingRequestReceiptNotificationMessage provides the structure for the message type TransportationBookingRequestReceiptNotificationMessage and the interfaces that are based on it.

A MessageHeader package can be included with this message data type. The TransportationBookingRequest package groups the TransportationBookingRequest with its packages. It includes the entity TransportationBookingRequest and the package Request. TransportationBookingRequest is a request from an ordering party to another party to book transportation services. A corresponding confirmation to the ordering party is part of the TransportationBookingRequest. The structure can include ID, which is a unique identifier of a TransportationBookingRequest. ID is of type GDT: BusinessTransactionDocumentID.

Message Data type TransportationBookingRequestConfirmationReceiptNotificationMessage The message data type TransportationBookingRequestConfirmationReceiptNotificationMessage includes the business information that is relevant for sending a business document in a message and the TransportationBookingRequest included in the business document. The message data type TransportationBookingRequestConfirmationReceiptNotificationMessage provides the structure for the message type TransportationBookingRequestConfirmationReceiptNotificationMessage and the interfaces that are based on it.

A MessageHeader package can be included with this message data type. The TransportationBookingRequest package groups the TransportationBookingRequest with its packages. It includes the entity TransportationBookingRequest, and the package Confirmation. TransportationBookingRequest is a request from an ordering party to another party to book transportation services. A corresponding confirmation to the ordering party is part of the TransportationBookingRequest. The structure can include ID, which is a unique identifier of a TransportationBookingRequest. It is of type GDT: BusinessTransactionDocumentID. The Confirmation package is a confirmation of a request from an ordering party to another party to book transportation services.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for performing a freight request service, the interface exposing at least one service as defined in a service registry, wherein upon execution the program code executes in an environment of computer systems providing message-based services and comprises:

program code for receiving, from a service consumer, a first message for processing freight requests from an ordering party to a transportation service provider to ship goods from shippers to consignees;

program code for invoking a freight request business object, wherein the business object is a logically centralized, semantically disjointed object for representing a request from an ordering party to a transportation service provider to ship goods from shippers to consignees, and comprises data logically organized as:

a freight request root node; and a confirmation subordinate node and wherein the confirmation node contains:

a date time periods subordinate node;

a nature of cargo subordinate node;

a total quantity subordinate node;

a total amount subordinate node;

a text collection subordinate node;

a business transaction document reference subordinate node and wherein the business transaction document reference node contains:

a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains a transportation document information subordinate node and wherein the transportation document information node contains a date time period subordinate node, and a business transaction document reference subordinate node and wherein the business transaction document reference node contains a date time period subordinate node;

a location subordinate node and wherein the location node contains a date time periods subordinate node;

a seal subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a seal subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node;

a dangerous goods subordinate node and wherein the dangerous goods node contains a contact information subordinate node and a text collection subordinate node;

a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node;

a shipment request subordinate node and wherein the shipment request node contains:

a transportation stage assignment subordinate node;

a transportation unit resource information assignment subordinate node;

a confirmation subordinate node and wherein the confirmation node contains a date time periods subordinate node, a nature of cargo subordinate node, a total quantity subordinate node, a total amount subordinate node, a text collection subordinate node, a transportation service requirement subordinate node, a transportation document information subordinate node and wherein the transportation document information node contains a date time period subordinate node, a business transaction document reference subordinate node and wherein the business transaction document reference node contains a date time period subordinate node, a governmental procedure subordinate node a party subordinate node, a location subordinate node and wherein the location node contains a date time periods subordinate node, a transportation stage subordinate node, a transportation unit resource information subordinate node, a package information subordinate node, and an item subordinate node and wherein the item node contains an amount subordinate node, a text collection subordinate node a nature of cargo subordinate node, a quantity subordinate node, a transportation document information subordinate node and wherein the transportation document information node contains a date time period subordinate node, a business transaction document reference subordinate node and wherein the business transaction document reference node contains a date time period subordinate node, a dangerous goods subordinate node, a transportation stage assignment subordinate node and wherein the transportation stage assignment node contains a quantity subordinate node, a transportation unit resource information assignment subordinate node and wherein the transportation unit resource information assignment node contains a quantity subordinate node, a governmental procedure subordinate node, a party subordinate node and wherein the party node contains a date time period subordinate node, a location subordinate node and wherein the location node contains a date time period subordinate node, a product information subordinate node, and a transportation goods identification subordinate node; and program code for initiating transmission of a message to a heterogeneous second application, executing in the environment of computer systems providing message-based services, based on the data in the freight request business object, the message comprising a freight request request message entity, a message header package, and a freight request package.

2. The program code of claim 1, wherein processing includes at least one of creating, updating, and retrieving.

3. The program code of claim 1, wherein the element node of the transportation charges node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node.

4. The program code of claim 1, wherein:

the governmental procedure node of the confirmation node contains a location subordinate node, a date time period subordinate node, a seal subordinate node, a text collection subordinate node; and a transportation document information subordinate node and wherein the transportation document information node contains a date time period subordinate node;

the party node of the confirmation node contains an amount subordinate node, a date time periods subordinate node, a transportation document information subordinate node and wherein the transportation document information node contains a date time period subordinate node, and a business transaction document reference subordinate node and wherein the business transaction document reference node contains a date time period subordinate node;

the transportation stage node of the confirmation node contains a location subordinate node and wherein the location node contains a date time periods subordinate node, a business transaction document reference subordinate node and wherein the business transaction document reference node contains a date time period subordinate node, and a transportation service requirement subordinate node;

the transportation unit resource information node of the confirmation node contains a transportation stage assignment subordinate node, an attached equipment subordinate node, a quantity subordinate node, a seal subordinate node, a business transaction document reference subordinate node and wherein the business transaction document reference node contains a date time period subordinate node, a text collection subordinate node, a location subordinate node and wherein the location node contains a date time periods subordinate node, and a dangerous goods subordinate node; and the package information node of the confirmation node contains an item assignment subordinate node, a transportation unit resource information assignment subordinate node, a quantity subordinate node, and a text collection subordinate node.

5. A non-transitory computer readable medium including program code for providing a message-based interface for performing a freight request service, the interface exposing at least one service as defined in a service registry, wherein upon execution the program code executes in an environment of computer systems providing message-based services and comprises:

program code for initiating transmission of a message to a heterogeneous second application, executing in the environment of computer systems providing message-based services, based on data in a freight request business object invoked by the second application, wherein the business object is a logically centralized, semantically disjointed object for representing a request from an ordering party to a transportation service provider to ship goods from shippers to consignees, and comprises data logically organized as:

a freight request root node; and a confirmation subordinate node and wherein the confirmation node contains:

a date time periods subordinate node;

a nature of cargo subordinate node;

a total quantity subordinate node;

a total amount subordinate node;

a text collection subordinate node;

a business transaction document reference subordinate node and wherein the business transaction document reference node contains:

a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains a transportation document information subordinate node and wherein the transportation document information node contains a date time period subordinate node, and a business transaction document reference subordinate node and wherein the business transaction document reference node contains a date time period subordinate node;

a location subordinate node and wherein the location node contains a date time periods subordinate node;

a seal subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a seal subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node;

a dangerous goods subordinate node and wherein the dangerous goods node contains a contact information subordinate node and a text collection subordinate node;

a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node;

a shipment request subordinate node and wherein the shipment request node contains:

a transportation stage assignment subordinate node;

a transportation unit resource information assignment subordinate node;

a confirmation subordinate node and wherein the confirmation node contains a date time periods subordinate node, a nature of cargo subordinate node, a total quantity subordinate node, a total amount subordinate node, a text collection subordinate node, a transportation service requirement subordinate node, a transportation document information subordinate node and wherein the transportation document information node contains a date time period subordinate node, a business transaction document reference subordinate node and wherein the business transaction document reference node contains a date time period subordinate node, a governmental procedure subordinate node a party subordinate node, a location subordinate node and wherein the location node contains a date time periods subordinate node, a transportation stage subordinate node, a transportation unit resource information subordinate node, a package information subordinate node, and an item subordinate node and wherein the item node contains an amount subordinate node, a text collection subordinate node a nature of cargo subordinate node, a quantity subordinate node, a transportation document information subordinate node and wherein the transportation document information node contains a date time period subordinate node, a business transaction document reference subordinate node and wherein the business transaction document reference node contains a date time period subordinate node, a dangerous goods subordinate node, a transportation stage assignment subordinate node and wherein the transportation stage assignment node contains a quantity subordinate node, a transportation unit resource information assignment subordinate node and wherein the transportation unit resource information assignment node contains a quantity subordinate node, a governmental procedure subordinate node, a party subordinate node and wherein the party node contains a date time period subordinate node, a location subordinate node and wherein the location node contains a date time period subordinate node, a product information subordinate node, and a transportation goods identification subordinate node; and and the message comprising a freight request request message entity, a message header package, and a freight request package; and program code for receiving a second message from the second application, the second message associated with the invoked freight request business object and in response to the first message.

6. A distributed system operating in a landscape of computer systems providing message-based services, the system processing business objects involving processing freight requests from an ordering party to a transportation service provider to ship goods from shippers to consignees and comprising:

at least one processor operable to execute computer readable instructions embodied on tangible media;

memory storing a business object repository storing a plurality of business objects, wherein each business object is a logically centralized, semantically disjointed object of a particular business object type and at least one of the business objects is for representing a request from an ordering party to a transportation service provider to ship goods from shippers to consignees, and comprises data logically organized as:

a freight request root node; and a confirmation subordinate node and wherein the confirmation node contains:

a date time periods subordinate node;

a nature of cargo subordinate node;

a total quantity subordinate node;

a total amount subordinate node;

a text collection subordinate node;

a business transaction document reference subordinate node and wherein the business transaction document reference node contains:

a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains a transportation document information subordinate node and wherein the transportation document information node contains a date time period subordinate node, and a business transaction document reference subordinate node and wherein the business transaction document reference node contains a date time period subordinate node;

a location subordinate node and wherein the location node contains a date time periods subordinate node;

a seal subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a seal subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node;

a dangerous goods subordinate node and wherein the dangerous goods node contains a contact information subordinate node and a text collection subordinate node;

a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node;

a shipment request subordinate node and wherein the shipment request node contains:

a transportation stage assignment subordinate node;

a transportation unit resource information assignment subordinate node;

a confirmation subordinate node and wherein the confirmation node contains a date time periods subordinate node, a nature of cargo subordinate node, a total quantity subordinate node, a total amount subordinate node, a text collection subordinate node, a transportation service requirement subordinate node, a transportation document information subordinate node and wherein the transportation document information node contains a date time period subordinate node, a business transaction document reference subordinate node and wherein the business transaction document reference node contains a date time period subordinate node, a governmental procedure subordinate node a party subordinate node, a location subordinate node and wherein the location node contains a date time periods subordinate node, a transportation stage subordinate node, a transportation unit resource information subordinate node, a package information subordinate node, and an item subordinate node and wherein the item node contains an amount subordinate node, a text collection subordinate node a nature of cargo subordinate node, a quantity subordinate node, a transportation document information subordinate node and wherein the transportation document information node contains a date time period subordinate node, a business transaction document reference subordinate node and wherein the business transaction document reference node contains a date time period subordinate node, a dangerous goods subordinate node, a transportation stage assignment subordinate node and wherein the transportation stage assignment node contains a quantity subordinate node, a transportation unit resource information assignment subordinate node and wherein the transportation unit resource information assignment node contains a quantity subordinate node, a governmental procedure subordinate node, a party subordinate node and wherein the party node contains a date time period subordinate node, a location subordinate node and wherein the location node contains a date time period subordinate node, a product information subordinate node, and a transportation goods identification subordinate node; and a graphical user interface remote from the memory for presenting data associated with an invoked instance of the freight request business object, the interface comprising computer readable instructions embodied on tangible media and executable by the at least one processor.

7. A non-transitory computer readable medium including program code for providing a message-based interface for performing a house shipment service, the interface exposing at least one service as defined in a service registry, wherein upon execution the program code executes in an environment of computer systems providing message-based services and comprises:

program code for receiving, from a service consumer, a first message for processing information for transportation services tendered between transportation service providers;

program code for invoking a house shipment business object, wherein the business object is a logically centralized, semantically disjointed object for representing information for transportation services tendered between transportation service providers, and comprises data logically organized as:

a house shipment root node;

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node; a date time period subordinate node;

a seal subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node; and a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a seal subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains:

a contact information subordinate node; and a text collection subordinate node;

a package information subordinate node and wherein the package information node contains:

an item assignment subordinate node and wherein the item assignment node contains:

a quantity subordinate node;

a business transaction document reference subordinate node and wherein the business transaction document reference node contains a date time period subordinate node; and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains:

a contact information subordinate node;

a quantity subordinate node;

a text collection subordinate node; and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains a date time periods subordinate node;

a location subordinate node and wherein the location node contains a date time periods a product information subordinate node; and a transportation goods identification subordinate node; and a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node; and program code for initiating transmission of a message to a heterogeneous second application, executing in the environment of computer systems providing message-based services, based on the data in the house shipment business object, the message comprising a waybill notification message entity, a message header package, and a house shipment package.

8. The program code of claim 7, wherein the element node of the transportation charges node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node.

9. A non-transitory computer readable medium including program code for providing a message-based interface for performing a house shipment service, the interface exposing at least one service as defined in a service registry, wherein upon execution the program code executes in an environment of computer systems providing message-based services and comprises:

program code for initiating transmission of a message to a heterogeneous second application, executing in the environment of computer systems providing message-based services, based on data in a house shipment business object invoked by the second application, wherein the business object is a logically centralized, semantically disjointed object for representing transportation services tendered between transportation service providers, and comprises data logically organized as:

a house shipment root node;

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node; and a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a seal subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains:

a contact information subordinate node; and a text collection subordinate node;

a package information subordinate node and wherein the package information node contains:

an item assignment subordinate node and wherein the item assignment node contains:

a quantity subordinate node;

a business transaction document reference subordinate node and wherein the business transaction document reference node contains a date time period subordinate node; and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains:

a contact information subordinate node;

a quantity subordinate node;

a text collection subordinate node; and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains a date time periods subordinate node;

a location subordinate node and wherein the location node contains a date time periods a product information subordinate node; and a transportation goods identification subordinate node; and a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node; and and the message comprising a waybill notification message entity, a message header package, and a house shipment package; and program code for receiving a second message from the second application, the second message associated with the invoked house shipment business object and in response to the first message.

10. A distributed system operating in a landscape of computer systems providing message-based services, the system processing business objects involving processing information for transportation services tendered between transportation service providers and comprising:

at least one processor operable to execute computer readable instructions embodied on tangible media;

memory storing a business object repository storing a plurality of business objects, wherein each business object is a logically centralized, semantically disjointed object of a particular business object type and at least one of the business objects is for representing transportation services tendered between transportation service providers, and comprises data logically organized as:

a house shipment root node;

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node; and a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a seal subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains:

a contact information subordinate node; and a text collection subordinate node;

a package information subordinate node and wherein the package information node contains:

an item assignment subordinate node and wherein the item assignment node contains:

a quantity subordinate node;

a business transaction document reference subordinate node and wherein the business transaction document reference node contains a date time period subordinate node; and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains:

a contact information subordinate node;

a quantity subordinate node;

a text collection subordinate node; and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains a date time periods subordinate node;

a location subordinate node and wherein the location node contains a date time periods a product information subordinate node; and a transportation goods identification subordinate node; and a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node; and a graphical user interface remote from the memory for presenting data associated with an invoked instance of the house shipment business object, the interface comprising computer readable instructions embodied on tangible media and executable by the at least one processor.

11. A non-transitory computer readable medium including program code for providing a message-based interface for performing a shipment request service, the interface exposing at least one service as defined in a service registry, wherein upon execution the program code executes in an environment of computer systems providing message-based services and comprises:

program code for receiving, from a service consumer, a first message for processing information used for exchange agreements and corresponding confirmations and receipt notifications on the transportation of goods from a single ship-from party to a single ship-to party between an ordering party and a transportation service provider;

program code for invoking a shipment request business object, wherein the business object is a logically centralized, semantically disjointed object for representing exchange agreements and corresponding confirmations and receipt notifications on the transportation of goods from a single ship-from party to a single ship-to party between an ordering party and a transportation service provider, and comprises data logically organized as:

a shipment request root node;

a request subordinate node and wherein request node contains:

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a measure subordinate node;

a seal subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains:

a contact information subordinate node; and a text collection subordinate node; and a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein governmental procedure node contains a location subordinate node, a date time period subordinate node, a seal subordinate node, a text collection subordinate node, and a transportation document information subordinate node and wherein the transportation document information node contains a date time period subordinate node;

a party subordinate node and wherein the part subordinate node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and program code for initiating transmission of a message to a heterogeneous second application, executing in the environment of computer systems providing message-based services, based on the data in the shipment request business object, the message comprising a shipment request request message entity, a message header package, and a shipment request package.

12. The program code of claim 11, wherein the element node of the transportation charges node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node.

13. A non-transitory computer readable medium including program code for providing a message-based interface for performing a shipment request service, the interface exposing at least one service as defined in a service registry, wherein upon execution the program code executes in an environment of computer systems providing message-based services and comprises:

program code for initiating transmission of a message to a heterogeneous second application, executing in the environment of computer systems providing message-based services, based on data in a shipment request business object invoked by the second application, wherein the business object is a logically centralized, semantically disjointed object for representing exchange agreements and corresponding confirmations and receipt notifications on the transportation of goods from a single ship-from party to a single ship-to party between an ordering party and a transportation service provider, and comprises data logically organized as:

a shipment request root node;

a request subordinate node and wherein request node contains:

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a measure subordinate node;

a seal subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains:

a contact information subordinate node; and a text collection subordinate node; and a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein governmental procedure node contains a location subordinate node, a date time period subordinate node, a seal subordinate node, a text collection subordinate node, and a transportation document information subordinate node and wherein the transportation document information node contains a date time period subordinate node;

a party subordinate node and wherein the part subordinate node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and and the message comprising a shipment request request message entity, a message header package, and a shipment request package; and program code for receiving a second message from the second application, the second message associated with the invoked shipment request business object and in response to the first message.

14. A distributed system operating in a landscape of computer systems providing message-based services, the system processing business objects involving processing information used for exchange agreements and corresponding confirmations and receipt notifications on the transportation of goods from a single ship-from party to a single ship-to party between an ordering party and a transportation service provider and comprising:

at least one processor operable to execute computer readable instructions embodied on tanible media:

memory storing a business object repository storing a plurality of business objects, wherein each business object is a logically centralized, semantically disjointed object of a particular business object type and at least one of the business objects is for exchange agreements and corresponding confirmations and receipt notifications on the transportation of goods from a single ship-from party to a single ship-to party between an ordering party and a transportation service provider, and comprises data logically organized as:

a shipment request root node;

a request subordinate node and wherein request node contains:

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a seal subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a measure subordinate node;

a seal subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains:

a contact information subordinate node; and a text collection subordinate node; and a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein governmental procedure node contains a location subordinate node, a date time period subordinate node, a seal subordinate node, a text collection subordinate node, and a transportation document information subordinate node and wherein the transportation document information node contains a date time period subordinate node;

a party subordinate node and wherein the part subordinate node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and a graphical user interface remote from the memory for presenting data associated with an invoked instance of the shipment request business object, the interface comprising computer readable instructions embodied on tangible media and executable by the at least one processor.

15. A non-transitory computer readable medium including program code for providing a message-based interface for performing a supplier freight invoice request service, the interface exposing at least one service as defined in a service registry, wherein upon execution the program code executes in an environment of computer systems providing message-based services and comprises:

program code for receiving, from a service consumer, a first message for processing information for supplier invoice processing, including calculated transportation charges and transportation data;

program code for invoking a supplier freight invoice request business object, wherein the business object is a logically centralized, semantically disjointed object for representing supplier invoice processing, including calculated transportation charges and transportation data, and comprises data logically organized as:

a supplier freight invoice request root node; and a request subordinate node and wherein the request node contains:

a purchase business area subordinate node;

a date time period subordinate node;

a total quantity subordinate node;

a total amount subordinate node;

a text collection subordinate node;

a business transaction document reference and wherein the business transaction document reference node contains a date time period subordinate node;

a party subordinate node and wherein the party node contains:

a business transaction document reference subordinate node and wherein the business transaction document reference node contains a date time period subordinate node;

a location subordinate node and wherein the location node contains a date time periods subordinate node;

an item subordinate node and wherein the item node contains:

a transportation document information subordinate node and wherein the transportation document information node contains a date time periods subordinate node, a total quantity subordinate node, a total amount subordinate node, a text collection subordinate node, a transportation service requirement subordinate node, a business transaction document reference subordinate node and wherein the business transaction document reference node contains a date time period subordinate node, a nature of cargo subordinate node, a location subordinate node and wherein the location node contains a date time periods subordinate node, a party subordinate node and wherein the party node contains a business transaction document reference subordinate node and wherein the business transaction document reference node contains a date time period subordinate node, a transportation stage subordinate node, a transportation unit resource information subordinate node, a package information subordinate node, a transportation document information item subordinate node a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node; and an element subordinate node; and program code for initiating transmission of a message to a heterogeneous second application, executing in the environment of computer systems providing message-based services, based on the data in the supplier freight invoice request business object, the message comprising a supplier freight invoice request request message entity, a message header package, and a supplier freight invoice request package.

16. The program code of claim 15, wherein:

the transportation stage node of the item node contains a location subordinate node and wherein the location node contains a date time periods subordinate node, a business transaction document reference subordinate node and wherein the business transaction document reference node contains a date time period subordinate node, and a transportation service requirement subordinate node;

the transportation unit resource information node of the item node contains a transportation document information transportation stage assignment subordinate node, an attached equipment subordinate node, a quantity subordinate node, a seal subordinate node, a business transaction document reference subordinate node and wherein the business transaction document reference subordinate node contains a date time period subordinate node, and a dangerous goods subordinate node;

the package information node of the item node contains a transportation document information item assignment subordinate node and wherein the transportation document information item assignment node contains a quantity subordinate node, a transportation document information transportation unit resource information assignment subordinate node and wherein the transportation document information transportation unit resource information assignment node contains a quantity subordinate node, and a quantity subordinate node the transportation document information item subordinate node contains an amount subordinate node, a text collection subordinate node, a nature of cargo subordinate node, a quantity subordinate node, a business transaction document reference subordinate node and wherein the business transaction document reference node contains a date time period subordinate node, a dangerous goods subordinate node, a transportation document information transportation stage assignment subordinate node and wherein the transportation document information transportation stage assignment node contains a quantity subordinate node, a transportation document information transportation unit resource information assignment subordinate node and wherein the transportation document information transportation unit resource information assignment node contains a quantity subordinate node; a location subordinate node and wherein the location node contains a date time periods subordinate node; and a product information subordinate node.

17. The program code of claim 15, wherein the element node of the transportation charges node of the transportation charges information node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node.

18. A non-transitory computer readable medium including program code for providing a message-based interface for performing a supplier freight invoice request service, the interface exposing at least one service as defined in a service registry, wherein upon execution the program code executes in an environment of computer systems providing message-based services and comprises:

program code for initiating transmission of a message to a heterogeneous second application, executing in the environment of computer systems providing message-based services, based on data in a supplier freight invoice request business object invoked by the second application, wherein the business object is a logically centralized, semantically disjointed object for representing supplier invoice processing, including calculated transportation charges and transportation data, and comprises data logically organized as:

a supplier freight invoice request root node; and a request subordinate node and wherein the request node contains:

a purchase business area subordinate node;

a date time period subordinate node;

a total quantity subordinate node;

a total amount subordinate node;

a text collection subordinate node;

a business transaction document reference and wherein the business transaction document reference node contains a date time period subordinate node;

a party subordinate node and wherein the party node contains:

a business transaction document reference subordinate node and wherein the business transaction document reference node contains a date time period subordinate node;

a location subordinate node and wherein the location node contains a date time periods subordinate node;

an item subordinate node and wherein the item node contains:

a transportation document information subordinate node and wherein the transportation document information node contains a date time periods subordinate node, a total quantity subordinate node, a total amount subordinate node, a text collection subordinate node, a transportation service requirement subordinate node, a business transaction document reference subordinate node and wherein the business transaction document reference node contains a date time period subordinate node, a nature of cargo subordinate node, a location subordinate node and wherein the location node contains a date time periods subordinate node, a party subordinate node and wherein the party node contains a business transaction document reference subordinate node and wherein the business transaction document reference node contains a date time period subordinate node, a transportation stage subordinate node, a transportation unit resource information subordinate node, a package information subordinate node, a transportation document information item subordinate node a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node; and an element subordinate node; and and the message comprising a supplier freight invoice request request message entity, a message header package, and a supplier freight invoice request package; and program code for receiving a second message from the second application, the second message associated with the invoked supplier freight invoice request business object and in response to the first message.

19. A distributed system operating in a landscape of computer systems providing message-based services, the system processing business objects involving processing information for supplier invoice processing, including calculated transportation charges and transportation data, and comprising:

at least one processor operable to execute computer readable instructions embodied on tangible media;

memory storing a business object repository storing a plurality of business objects, wherein each business object is a logically centralized, semantically disjointed object of a particular business object type and at least one of the business objects is for representing supplier invoice processing, including calculated transportation charges and transportation data, and comprises data logically organized as:

a supplier freight invoice request root node; and a request subordinate node and wherein the request node contains:

a purchase business area subordinate node;

a date time period subordinate node;

a total quantity subordinate node;

a total amount subordinate node;

a text collection subordinate node;

a business transaction document reference and wherein the business transaction document reference node contains a date time period subordinate node;

a party subordinate node and wherein the party node contains:

a business transaction document reference subordinate node and wherein the business transaction document reference node contains a date time period subordinate node;

a location subordinate node and wherein the location node contains a date time periods subordinate node;

an item subordinate node and wherein the item node contains:

a transportation document information subordinate node and wherein the transportation document information node contains a date time periods subordinate node, a total quantity subordinate node, a total amount subordinate node, a text collection subordinate node, a transportation service requirement subordinate node, a business transaction document reference subordinate node and wherein the business transaction document reference node contains a date time period subordinate node, a nature of cargo subordinate node, a location subordinate node and wherein the location node contains a date time periods subordinate node, a party subordinate node and wherein the party node contains a business transaction document reference subordinate node and wherein the business transaction document reference node contains a date time period subordinate node, a transportation stage subordinate node, a transportation unit resource information subordinate node, a package information subordinate node, a transportation document information item subordinate node a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node; and an element subordinate node; and a graphical user interface remote from the memory for presenting data associated with an invoked instance of the supplier freight invoice request business object, the interface comprising computer readable instructions embodied on tangible media and executable by the at least one processor.

20. A non-transitory computer readable medium including program code for providing a message-based interface for performing a transportation booking request service, the interface exposing at least one service as defined in a service registry, wherein upon execution the program code executes in an environment of computer systems providing message-based services and comprises:

program code for receiving, from a service consumer, a first message for processing information used to exchange agreements and the corresponding confirmations and receipt notifications to provide transportation services from an ordering party to another party;

program code for invoking a transportation booking request business object, wherein the business object is a logically centralized, semantically disjointed object for representing information used to exchange agreements and the corresponding confirmations and receipt notifications to provide transportation services from an ordering party to another party, and comprises data logically organized as:

a transportation booking request root node;

a request subordinate node and wherein the request node contains:

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a text collection subordinate node; and a transportation document information subordinate node and wherein the transportation document information node contains a date time period subordinate node;

a party subordinate node and wherein the party node contains:

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node, and a text collection subordinate node; and a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node and wherein the element node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node; and program code for initiating transmission of a message to a heterogeneous second application, executing in the environment of computer systems providing message-based services, based on the data in the transportation booking request business object, the message comprising a transportation booking request request message entity, a message header package, and a transportation booking request package.

21. A non-transitory computer readable medium including program code for providing a message-based interface for performing a transportation booking request service, the interface exposing at least one service as defined in a service registry, wherein upon execution the program code executes in an environment of computer systems providing message-based services and comprises:

program code for initiating transmission of a message to a heterogeneous second application, executing in the environment of computer systems providing message-based services, based on data in a transportation booking request business object invoked by the second application, wherein the business object is a logically centralized, semantically disjointed object for representing information used to exchange agreements and the corresponding confirmations and receipt notifications to provide transportation services from an ordering party to another party, and comprises data logically organized as:

a transportation booking request root node;

a request subordinate node and wherein the request node contains:

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a text collection subordinate node; and a transportation document information subordinate node and wherein the transportation document information node contains a date time period subordinate node;

a party subordinate node and wherein the party node contains:

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node, and a text collection subordinate node; and a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node and wherein the element node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node; and and the message comprising a transportation booking request request message entity, a message header package, and a transportation booking request package; and program code for receiving a second message from the second application, the second message associated with the invoked transportation booking request business object and in response to the first message.

22. A distributed system operating in a landscape of computer systems providing message-based services, the system processing business objects involving processing information used to exchange agreements and the corresponding confirmations and receipt notifications to provide transportation services from an ordering party to another party and comprising:

at least one processor operable to execute computer readable instructions embodied on tangible media;

memory storing a business object repository storing a plurality of business objects, wherein each business object is a logically centralized, semantically disjointed object of a particular business object type and at least one of the business objects is for representing information used to exchange agreements and the corresponding confirmations and receipt notifications to provide transportation services from an ordering party to another party, and comprises data logically organized as:

a transportation booking request root node;

a request subordinate node and wherein the request node contains:

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a text collection subordinate node; and a transportation document information subordinate node and wherein the transportation document information node contains a date time period subordinate node;

a party subordinate node and wherein the party node contains:

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node, and a text collection subordinate node; and a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node and wherein the element node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node; and a graphical user interface remote from the memory for presenting data associated with an invoked instance of the transportation booking request business object, the interface comprising computer readable instructions embodied on tangible media and executable by the at least one processor.

* * * * *